US012608115B2

(12) United States Patent
Pazmino et al.

(10) Patent No.: US 12,608,115 B2
(45) Date of Patent: Apr. 21, 2026

(54) METHODS FOR CONTROLLING AND INTERACTING WITH A THREE-DIMENSIONAL ENVIRONMENT

(71) Applicant: Apple Inc., Cupertino, CA (US)

(72) Inventors: Lorena S. Pazmino, San Francisco, CA (US); Karen El Asmar, San Francisco, CA (US); Matan Stauber, San Francisco, CA (US); Danielle M. Price, Los Gatos, CA (US); Hugo D. Verweij, Portola Valley, CA (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/473,179

(22) Filed: Sep. 22, 2023

(65) Prior Publication Data

US 2024/0103685 A1 Mar. 28, 2024

Related U.S. Application Data

(60) Provisional application No. 63/506,042, filed on Jun. 2, 2023, provisional application No. 63/505,690, filed
(Continued)

(51) Int. Cl.
G06F 3/04815 (2022.01)
G06F 3/01 (2006.01)
(Continued)

(52) U.S. Cl.
CPC .......... G06F 3/04815 (2013.01); G06F 3/013 (2013.01); G06F 3/02 (2013.01);
(Continued)

(58) Field of Classification Search
None
See application file for complete search history.

(56) References Cited

U.S. PATENT DOCUMENTS 1,173,824 A 2/1916 McKee
5,015,188 A 5/1991 Pellosie et al.
(Continued)

FOREIGN PATENT DOCUMENTS

AU 2022348895 A1 4/2024
CA 3033344 A1 2/2018
(Continued)

OTHER PUBLICATIONS

International Search Report received for PCT Patent Application No. PCT/US2023/074957, mailed on Jan. 30, 2024, 7 pages.
(Continued)

*Primary Examiner* — Toan H Vu
(74) *Attorney, Agent, or Firm* — Kubota & Basol LLP

(57) ABSTRACT

A computer system displays an immersion control, a volume control, an element configured to permit or restrict breakthrough in different modes of operation of the computer system, and/or an option selectable to cause initiation of display of a representation of content from a second computer system via a display generation component of the computer system. While a second computer system is displaying content, a first computer system detects an input corresponding to a request to display a representation of the content from the second computer system via a display generation component of the first computer system, and in response, initiates a process to display the representation of content and to de-emphasize the content displayed by the second computer system. A first computer system facilitates disambiguation of a second computer system from a plurality of computer systems for display of a representation of content from the second computer system.

50 Claims, 104 Drawing Sheets

Related U.S. Application Data on Jun. 1, 2023, provisional application No. 63/377, 028, filed on Sep. 24, 2022.

(51) Int. Cl.

| | |
|---|---|
| *G06F 3/02* | (2006.01) |
| *G06F 3/0482* | (2013.01) |
| *G06F 3/0488* | (2022.01) |
| *G06F 3/14* | (2006.01) |
| *G06T 19/00* | (2011.01) |
| *H04W 76/10* | (2018.01) |

(52) U.S. Cl.

CPC .......... *G06F 3/0482* (2013.01); *G06F 3/0488* (2013.01); *G06F 3/1454* (2013.01); *G06T 19/006* (2013.01); *H04W 76/10* (2018.02)

(56) References Cited

U.S. PATENT DOCUMENTS

| | | | |
|---|---|---|---|
| 5,422,812 | A | 6/1995 | Knoll et al. |
| 5,515,488 | A | 5/1996 | Hoppe et al. |
| 5,524,195 | A | 6/1996 | Clanton et al. |
| 5,610,828 | A | 3/1997 | Kodosky et al. |
| 5,731,805 | A | 3/1998 | Tognazzini et al. |
| 5,737,553 | A | 4/1998 | Bartok |
| 5,740,440 | A | 4/1998 | West |
| 5,751,287 | A | 5/1998 | Hahn et al. |
| 5,758,122 | A | 5/1998 | Corda et al. |
| 5,794,178 | A | 8/1998 | Caid et al. |
| 5,809,267 | A | 9/1998 | Moran et al. |
| 5,877,766 | A | 3/1999 | Bates et al. |
| 5,900,849 | A | 5/1999 | Gallery |
| 5,933,143 | A | 8/1999 | Kobayashi |
| 5,990,886 | A | 11/1999 | Serdy et al. |
| 6,061,060 | A | 5/2000 | Berry et al. |
| 6,078,310 | A | 6/2000 | Tognazzini |
| 6,108,004 | A | 8/2000 | Medl |
| 6,112,015 | A | 8/2000 | Planas et al. |
| 6,154,559 | A | 11/2000 | Beardsley |
| 6,167,433 | A | 12/2000 | Maples et al. |
| 6,295,069 | B1 | 9/2001 | Shirur |
| 6,323,846 | B1 | 11/2001 | Westerman et al. |
| 6,426,745 | B1 | 7/2002 | Isaacs et al. |
| 6,456,296 | B1 | 9/2002 | Cataudella et al. |
| 6,570,557 | B1 | 5/2003 | Westerman et al. |
| 6,584,465 | B1 | 6/2003 | Zhu et al. |
| 6,677,932 | B1 | 1/2004 | Westerman |
| 6,714,201 | B1 | 3/2004 | Grinstein et al. |
| 6,750,873 | B1 | 6/2004 | Bernardini et al. |
| 6,756,997 | B1 | 6/2004 | Ward et al. |
| 6,968,511 | B1 | 11/2005 | Robertson et al. |
| 7,035,903 | B1 | 4/2006 | Baldonado |
| 7,096,120 | B2 | 8/2006 | Hull |
| 7,134,130 | B1 | 11/2006 | Thomas |
| 7,137,074 | B1 | 11/2006 | Newton et al. |
| 7,230,629 | B2 | 6/2007 | Reynolds et al. |
| 7,298,370 | B1 | 11/2007 | Middler et al. |
| 7,580,576 | B2 | 8/2009 | Wang et al. |
| 7,614,008 | B2 | 11/2009 | Ording |
| 7,633,076 | B2 | 12/2009 | Huppi et al. |
| 7,634,718 | B2 | 12/2009 | Nakajima |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,706,579 | B2 | 4/2010 | Oijer |
| 7,721,226 | B2 | 5/2010 | Barabe et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,046,721 | B2 | 10/2011 | Chaudhri et al. |
| 8,122,341 | B1 | 2/2012 | Dayan et al. |
| 8,239,784 | B2 | 8/2012 | Hotelling et al. |
| 8,279,180 | B2 | 10/2012 | Hotelling et al. |
| 8,341,541 | B2 | 12/2012 | Holecek et al. |
| 8,381,135 | B2 | 2/2013 | Hotelling et al. |
| 8,436,872 | B2 | 5/2013 | Wright et al. |
| 8,479,122 | B2 | 7/2013 | Hotelling et al. |
| 8,593,558 | B2 | 11/2013 | Gardiner et al. |
| 8,724,856 | B1 | 5/2014 | King |
| 8,730,156 | B2 | 5/2014 | Weising et al. |
| 8,767,045 | B2 | 7/2014 | Kitazato et al. |
| 8,793,620 | B2 | 7/2014 | Stafford |
| 8,793,729 | B2 | 7/2014 | Adimatyam et al. |
| 8,803,873 | B2 | 8/2014 | Yoo et al. |
| 8,866,880 | B2 | 10/2014 | Tan et al. |
| 8,896,632 | B2 | 11/2014 | Macdougall et al. |
| 8,947,323 | B1 | 2/2015 | Raffle et al. |
| 8,970,478 | B2 | 3/2015 | Johansson |
| 8,970,629 | B2 | 3/2015 | Kim et al. |
| 8,994,718 | B2 | 3/2015 | Latta et al. |
| 9,007,301 | B1 | 4/2015 | Raffle et al. |
| 9,108,109 | B2 | 8/2015 | Pare et al. |
| 9,158,115 | B1 | 10/2015 | Worley et al. |
| 9,164,975 | B2 | 10/2015 | Milewski et al. |
| 9,183,672 | B1 | 11/2015 | Hickman et al. |
| 9,185,062 | B1 | 11/2015 | Yang et al. |
| 9,189,611 | B2 | 11/2015 | Wssingbo |
| 9,196,072 | B2 | 11/2015 | Oh et al. |
| 9,201,500 | B2 | 12/2015 | Srinivasan et al. |
| 9,214,137 | B2 | 12/2015 | Bala et al. |
| 9,222,787 | B2 | 12/2015 | Blumenberg et al. |
| 9,230,368 | B2 | 1/2016 | Keane et al. |
| 9,237,334 | B2 | 1/2016 | Cheng et al. |
| 9,241,149 | B2 | 1/2016 | Redmann |
| 9,245,388 | B2 | 1/2016 | Poulos et al. |
| 9,256,785 | B2 | 2/2016 | Qvarfordt |
| 9,293,118 | B2 | 3/2016 | Matsui |
| 9,294,757 | B1 | 3/2016 | Lewis et al. |
| 9,298,334 | B1 | 3/2016 | Zimmerman et al. |
| 9,316,827 | B2 | 4/2016 | Lindley et al. |
| 9,348,458 | B2 | 5/2016 | Hotelling et al. |
| 9,383,189 | B2 | 7/2016 | Bridges et al. |
| 9,384,594 | B2 | 7/2016 | Maciocci et al. |
| 9,396,580 | B1 | 7/2016 | Nowrouzezahrai et al. |
| 9,400,559 | B2 | 7/2016 | Latta et al. |
| 9,426,193 | B2 | 8/2016 | Goodman |
| 9,436,357 | B2 | 9/2016 | Pallakoff et al. |
| 9,437,047 | B2 | 9/2016 | Chang et al. |
| 9,448,635 | B2 | 9/2016 | Macdougall et al. |
| 9,448,687 | B1 | 9/2016 | Mckenzie et al. |
| 9,465,479 | B2 | 10/2016 | Cho et al. |
| 9,491,374 | B1 | 11/2016 | Avrahami et al. |
| 9,519,371 | B2 | 12/2016 | Nishida |
| 9,526,127 | B1 | 12/2016 | Taubman et al. |
| 9,544,257 | B2 | 1/2017 | Ogundokun et al. |
| 9,563,331 | B2 | 2/2017 | Poulos et al. |
| 9,575,559 | B2 | 2/2017 | Andrysco |
| 9,588,651 | B1 | 3/2017 | Buchanan et al. |
| 9,612,722 | B2 | 4/2017 | Miller et al. |
| 9,619,105 | B1 | 4/2017 | Dal Mutto |
| 9,619,519 | B1 | 4/2017 | Dorner |
| 9,672,588 | B1 | 6/2017 | Doucette et al. |
| 9,681,112 | B2 | 6/2017 | Son |
| 9,684,372 | B2 | 6/2017 | Xun et al. |
| 9,704,230 | B2 | 7/2017 | Hofmann et al. |
| 9,734,402 | B2 | 8/2017 | Jang et al. |
| 9,778,814 | B2 | 10/2017 | Ambrus et al. |
| 9,779,512 | B2 | 10/2017 | Tomlin et al. |
| 9,829,708 | B1 | 11/2017 | Asada |
| 9,851,866 | B2 | 12/2017 | Goossens et al. |
| 9,864,498 | B2 | 1/2018 | Olsson et al. |
| 9,870,130 | B2 | 1/2018 | Schubert et al. |
| 9,886,087 | B1 | 2/2018 | Wald et al. |
| 9,911,232 | B2 | 3/2018 | Shapira et al. |
| 9,933,833 | B2 | 4/2018 | Tu et al. |
| 9,933,937 | B2 | 4/2018 | Lemay et al. |
| 9,934,614 | B2 | 4/2018 | Ramsby et al. |
| 9,952,042 | B2 | 4/2018 | Abovitz et al. |
| 10,026,209 | B1 | 7/2018 | Dagley et al. |
| 10,049,460 | B2 | 8/2018 | Romano et al. |
| 10,101,803 | B2 | 10/2018 | Faaborg et al. |
| 10,139,985 | B2 | 11/2018 | Mildrew et al. |
| 10,163,198 | B2 | 12/2018 | Rochford et al. |

(56) References Cited

U.S. PATENT DOCUMENTS

| 10,175,483 B2 | 1/2019 | Salter et al. |
| 10,186,086 B2 | 1/2019 | Giraldi et al. |
| 10,192,347 B2 | 1/2019 | Bui et al. |
| 10,203,764 B2 | 2/2019 | Katz et al. |
| 10,210,664 B1 | 2/2019 | Chaturvedi |
| 10,303,427 B2 | 5/2019 | Shintani et al. |
| 10,307,671 B2 | 6/2019 | Barney et al. |
| 10,311,543 B2 | 6/2019 | Energin et al. |
| 10,318,034 B1 | 6/2019 | Hauenstein et al. |
| 10,331,205 B2 | 6/2019 | Kim et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,389,977 B1 | 8/2019 | Van Os et al. |
| 10,394,320 B2 | 8/2019 | George-Svahn et al. |
| 10,401,958 B2 | 9/2019 | Peana et al. |
| 10,402,081 B1 | 9/2019 | Andersen et al. |
| 10,424,124 B2 | 9/2019 | Takahashi |
| 10,448,189 B2 | 10/2019 | Link |
| 10,475,253 B2 | 11/2019 | Yerkes et al. |
| 10,484,641 B2 | 11/2019 | Zhou et al. |
| 10,488,941 B2 | 11/2019 | Lam et al. |
| 10,499,044 B1 | 12/2019 | Giokaris et al. |
| 10,534,439 B2 | 1/2020 | Raffa et al. |
| 10,540,005 B2 | 1/2020 | Yoon et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,565,761 B2 | 2/2020 | Deluca et al. |
| 10,573,067 B1 | 2/2020 | Naik et al. |
| 10,599,570 B1 | 3/2020 | Ding et al. |
| 10,630,803 B2 | 4/2020 | Hwang et al. |
| 10,642,368 B2 | 5/2020 | Chen |
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,671,243 B2 | 6/2020 | Ryu et al. |
| 10,678,403 B2 | 6/2020 | Duarte et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,852,814 B1 | 12/2020 | Caron et al. |
| 10,861,242 B2 | 12/2020 | Lacey et al. |
| 10,877,645 B2 | 12/2020 | Lee et al. |
| 10,885,701 B1 | 1/2021 | Patel |
| 10,885,716 B1 | 1/2021 | Evertt et al. |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,937,244 B2 | 3/2021 | Kim et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,062,520 B2 | 7/2021 | Smets |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,132,840 B2 | 9/2021 | Sarangdhar et al. |
| 11,138,798 B2 | 10/2021 | Paul et al. |
| 11,146,909 B1 | 10/2021 | Pinto et al. |
| 11,150,730 B1 | 10/2021 | Anderson et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,228,805 B2 | 1/2022 | Hardy |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,263,824 B2 | 3/2022 | Forbes et al. |
| 11,266,919 B2 | 3/2022 | Bear et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,314,376 B2 | 4/2022 | Agarawala et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,348,300 B2 | 5/2022 | Zimmermann et al. |
| 11,379,033 B2 | 7/2022 | O'hern et al. |
| 11,380,323 B2 | 7/2022 | Shin et al. |
| 11,382,611 B1 | 7/2022 | Westling et al. |
| 11,406,896 B1 | 8/2022 | Cheung et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,500,510 B2 | 11/2022 | Tokuchi et al. |
| 11,520,456 B2 | 12/2022 | Kawashima et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,604,080 B2 | 3/2023 | Paoletti et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,682,180 B1 | 6/2023 | Willkie |
| 11,687,224 B2 | 6/2023 | Manzari et al. |
| 11,689,632 B2 | 6/2023 | Raisher et al. |
| 11,720,171 B2 | 8/2023 | Pastrana Vicente et al. |
| 11,726,577 B2 | 8/2023 | Katz |
| 11,730,226 B2 * | 8/2023 | Stolarz ................... A42B 3/042 348/158 |
| 11,733,824 B2 | 8/2023 | Iskandar et al. |
| 11,743,215 B1 | 8/2023 | Murillo et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,842,454 B1 | 12/2023 | Lin et al. |
| 11,847,748 B2 | 12/2023 | Liu et al. |
| 11,853,536 B2 | 12/2023 | Napolitano et al. |
| 11,861,056 B2 | 1/2024 | Burns et al. |
| 11,861,136 B2 | 1/2024 | Faulkner et al. |
| 11,868,582 B2 | 1/2024 | Kim et al. |
| 11,875,013 B2 | 1/2024 | Lemay et al. |
| 11,875,162 B2 | 1/2024 | Garstenauer et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 | 4/2024 | Rudman et al. |
| 11,954,242 B2 | 4/2024 | Dascola et al. |
| 11,972,092 B2 | 4/2024 | Zurmoehle et al. |
| 11,983,326 B2 | 5/2024 | Lacey |
| 11,988,832 B2 | 5/2024 | Singh et al. |
| 11,989,965 B2 | 5/2024 | Tarighat Mehrabani |

(56) References Cited

U.S. PATENT DOCUMENTS

| | | |
|---|---|---|
| 11,995,230 B2 | 5/2024 | Holder et al. |
| 11,995,301 B2 | 5/2024 | Hylak et al. |
| 12,020,387 B2 | 6/2024 | Maharaja |
| 12,023,579 B2 | 7/2024 | Azmandian et al. |
| 12,032,803 B2 | 7/2024 | Pastrana Vicente et al. |
| 12,062,127 B2 | 8/2024 | Park et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,182,325 B2 | 12/2024 | Calderone et al. |
| 12,211,161 B2 | 1/2025 | Favale et al. |
| 12,236,546 B1 | 2/2025 | Lipton |
| 12,254,127 B2 | 3/2025 | Burns et al. |
| 12,321,515 B2 | 6/2025 | Calderone et al. |
| 12,394,167 B1 | 8/2025 | Scully et al. |
| 12,408,804 B2 | 9/2025 | Schneider et al. |
| 12,456,271 B1 | 10/2025 | Bernstein et al. |
| 2001/0047250 A1 | 11/2001 | Schuller et al. |
| 2002/0015024 A1 | 2/2002 | Westerman et al. |
| 2002/0024675 A1 | 2/2002 | Foxlin |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0073136 A1 | 4/2005 | Larsson et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2005/0231532 A1 | 10/2005 | Suzuki et al. |
| 2005/0248299 A1 | 11/2005 | Chemel et al. |
| 2006/0017692 A1 | 1/2006 | Wehrenberg et al. |
| 2006/0028400 A1 | 2/2006 | Lapstun et al. |
| 2006/0033724 A1 | 2/2006 | Chaudhri et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0197753 A1 | 9/2006 | Hotelling |
| 2006/0256083 A1 | 11/2006 | Rosenberg |
| 2006/0283214 A1 | 12/2006 | Donadon et al. |
| 2007/0172112 A1 | 7/2007 | Paley et al. |
| 2007/0259716 A1 | 11/2007 | Mattice et al. |
| 2008/0120568 A1 | 5/2008 | Jian et al. |
| 2008/0132249 A1 | 6/2008 | Hamilton |
| 2008/0181502 A1 | 7/2008 | Yang |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0146961 A1 | 6/2009 | Cheung et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2009/0326810 A1 | 12/2009 | Callaghan et al. |
| 2010/0097375 A1 | 4/2010 | Tadaishi et al. |
| 2010/0115459 A1 | 5/2010 | Kinnunen et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0309140 A1 | 12/2010 | Widgor |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0032365 A1 | 2/2011 | Yett |
| 2011/0066981 A1 | 3/2011 | Chmielewski et al. |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0202834 A1 | 8/2011 | Mandryk et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0124525 A1 | 5/2012 | Kang |
| 2012/0131631 A1 | 5/2012 | Bhogal et al. |
| 2012/0159386 A1 | 6/2012 | Kang et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0223885 A1 | 9/2012 | Perez |
| 2012/0249416 A1 | 10/2012 | Maciocci et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1 | 11/2012 | Neven |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0103313 A1 | 4/2013 | Moore et al. |
| 2013/0127850 A1 | 5/2013 | Bindon |
| 2013/0147820 A1 | 6/2013 | Kalai et al. |
| 2013/0148850 A1 | 6/2013 | Matsuda et al. |
| 2013/0167092 A1 | 6/2013 | Yu et al. |
| 2013/0169533 A1 | 7/2013 | Jahnke |
| 2013/0169649 A1 | 7/2013 | Bates et al. |
| 2013/0190044 A1 | 7/2013 | Kulas |
| 2013/0191160 A1 | 7/2013 | Oran |
| 2013/0207963 A1 | 8/2013 | Stirbu et al. |
| 2013/0211843 A1 | 8/2013 | Clarkson |
| 2013/0212470 A1 | 8/2013 | Karunamuni et al. |
| 2013/0222227 A1 | 8/2013 | Johansson et al. |
| 2013/0222410 A1 | 8/2013 | Kameyama et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0293468 A1 | 11/2013 | Perez et al. |
| 2013/0300648 A1 | 11/2013 | Kim et al. |

(56)  References Cited

U.S. PATENT DOCUMENTS

| | | |
|---|---|---|
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0335301 A1 | 12/2013 | Wong et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0022243 A1 | 1/2014 | Loberg |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0125585 A1 | 5/2014 | Song et al. |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168267 A1 | 6/2014 | Kim et al. |
| 2014/0168453 A1 | 6/2014 | Shoemake et al. |
| 2014/0181683 A1 | 6/2014 | Lim et al. |
| 2014/0184759 A1 | 7/2014 | Lee |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0247210 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267130 A1 | 9/2014 | Hwang et al. |
| 2014/0267400 A1 | 9/2014 | Mabbutt et al. |
| 2014/0268054 A1 | 9/2014 | Olsson et al. |
| 2014/0268925 A1 | 9/2014 | Lee et al. |
| 2014/0280603 A1 | 9/2014 | Rideout et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333535 A1 | 11/2014 | Stafford |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0143251 A1 | 5/2015 | Bailiang et al. |
| 2015/0145887 A1 | 5/2015 | Forutanpour et al. |
| 2015/0149929 A1 | 5/2015 | Shepherd et al. |
| 2015/0149961 A1 | 5/2015 | Karakotsios |
| 2015/0153833 A1 | 6/2015 | Pinault et al. |
| 2015/0169506 A1 | 6/2015 | Leventhal et al. |
| 2015/0177937 A1 | 6/2015 | Poletto et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0212576 A1 | 7/2015 | Ambrus et al. |
| 2015/0212684 A1 | 7/2015 | Sabia et al. |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0253957 A1 | 9/2015 | Crocker |
| 2015/0254905 A1 | 9/2015 | Ramsby et al. |
| 2015/0262428 A1 | 9/2015 | Tatzgern et al. |
| 2015/0277699 A1 | 10/2015 | Algreatly |
| 2015/0286741 A1 | 10/2015 | Zhu et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0041391 A1 | 2/2016 | Van et al. |
| 2016/0050642 A1 | 2/2016 | Brown et al. |
| 2016/0062615 A1 | 3/2016 | Price et al. |
| 2016/0062636 A1 | 3/2016 | Jung et al. |
| 2016/0070448 A1 | 3/2016 | Krol |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0104235 A1 | 4/2016 | Benkar et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0279516 A1 | 9/2016 | Gupta et al. |
| 2016/0291692 A1 | 10/2016 | Yasuda et al. |
| 2016/0291698 A1 | 10/2016 | Niinuma et al. |
| 2016/0291922 A1 | 10/2016 | Montgomerie et al. |

(56) References Cited

U.S. PATENT DOCUMENTS

| | | |
|---|---|---|
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |
| 2016/0349063 A1 | 12/2016 | Maurer et al. |
| 2016/0350973 A1 | 12/2016 | Shapira et al. |
| 2016/0357266 A1 | 12/2016 | Patel et al. |
| 2016/0363774 A1 | 12/2016 | Kawasima |
| 2016/0370858 A1 | 12/2016 | LeppÄnen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2016/0379418 A1 | 12/2016 | Osborn et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0052373 A1 | 2/2017 | Memmott et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0185276 A1 | 6/2017 | Lee et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0024681 A1 | 1/2018 | Bernstein et al. |
| 2018/0045963 A1 | 2/2018 | Hoover et al. |
| 2018/0046363 A1 | 2/2018 | Miller et al. |
| 2018/0052518 A1 | 2/2018 | Zhu et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1 | 4/2018 | Mallinson |
| 2018/0095634 A1 | 4/2018 | Alexander |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0004683 A1 | 1/2019 | Pahud et al. |
| 2019/0005055 A1 | 1/2019 | Andrew et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0037137 A1 | 1/2019 | Toksvig et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |

(56) References Cited

U.S. PATENT DOCUMENTS

| | | |
|---|---|---|
| 2019/0227763 A1 | 7/2019 | Kaufthal |
| 2019/0228503 A1* | 7/2019 | Tokuchi ................ G06T 3/4038 |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0304166 A1 | 10/2019 | Yu et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0332250 A1 | 10/2019 | Lee et al. |
| 2019/0333278 A1 | 10/2019 | Palangie et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1* | 11/2019 | Choi ........................ G06F 3/011 |
| 2019/0369569 A1 | 12/2019 | Olsen et al. |
| 2019/0369836 A1 | 12/2019 | Faulkner et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2019/0385368 A1 | 12/2019 | Cartwright et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0026922 A1 | 1/2020 | Pekelny et al. |
| 2020/0038120 A1* | 2/2020 | Ziraknejad .............. G06F 3/013 |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0112711 A1* | 4/2020 | Enriquez ............... G06T 19/006 |
| 2020/0117213 A1 | 4/2020 | Tian et al. |
| 2020/0126291 A1 | 4/2020 | Nguyen et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1 | 6/2020 | Stoyles et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-Zeev et al. |
| 2020/0225747 A1 | 7/2020 | Bar-Zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0258481 A1 | 8/2020 | Woo et al. |
| 2020/0267326 A1 | 8/2020 | Mm |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0301513 A1 | 9/2020 | Mejia Cobo |
| 2020/0318955 A1 | 10/2020 | Sharapov et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357184 A1 | 11/2020 | Paul et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2020/0410960 A1 | 12/2020 | Saito et al. |
| 2020/0412862 A1 | 12/2020 | Oh et al. |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0240332 A1 | 8/2021 | Walkin et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1 | 9/2021 | Eder et al. |
| 2021/0279967 A1 | 9/2021 | Gernoth et al. |
| 2021/0286502 A1 | 9/2021 | Lemay et al. |
| 2021/0286510 A1 | 9/2021 | Tyler et al. |
| 2021/0287439 A1* | 9/2021 | Goodrich .............. G06F 3/0488 |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |

(56) References Cited

U.S. PATENT DOCUMENTS

| | | |
|---|---|---|
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2021/0409903 A1 | 12/2021 | Shapiro et al. |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0027115 A1 | 1/2022 | Haapoja et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1 | 3/2022 | Lebeau et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0122303 A1 | 4/2022 | Sasikumar et al. |
| 2022/0124130 A1 | 4/2022 | Punwani et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0148274 A1 | 5/2022 | Brown, IV |
| 2022/0155853 A1 | 5/2022 | Fan et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179497 A1 | 6/2022 | Jung et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0206588 A1 | 6/2022 | Canberk et al. |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0252882 A1 | 8/2022 | Berliner et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0286488 A1 | 9/2022 | Berliner et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0317776 A1 | 10/2022 | Sundstrom et al. |
| 2022/0319134 A1 | 10/2022 | Rodrigues et al. |
| 2022/0319453 A1 | 10/2022 | Llull et al. |
| 2022/0326837 A1 | 10/2022 | Dessero et al. |
| 2022/0335697 A1 | 10/2022 | Harding et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1 | 12/2022 | Lemmens et al. |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2022/0417604 A1 | 12/2022 | Chandrashekar et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0145592 A1 | 5/2023 | Singh et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |

(56)          References Cited

U.S. PATENT DOCUMENTS

| | | |
|---|---|---|
| 2023/0206572 A1 | 6/2023 | Pazmino et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0315270 A1 | 10/2023 | Hylak et al. |
| 2023/0316634 A1 | 10/2023 | Chiu et al. |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333645 A1 | 10/2023 | Palangie et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0360264 A1 | 11/2023 | Wu et al. |
| 2023/0368475 A1 | 11/2023 | Chan et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1 | 12/2023 | Morrison et al. |
| 2023/0409271 A1 | 12/2023 | Agrawal et al. |
| 2024/0012530 A1 | 1/2024 | Lin et al. |
| 2024/0037886 A1 | 2/2024 | Chiu et al. |
| 2024/0061513 A1 | 2/2024 | Reisman et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0126362 A1 | 4/2024 | Burns et al. |
| 2024/0135612 A1* | 4/2024 | Hold-Geoffroy ......... G06T 7/50 |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0189507 A1 | 6/2024 | Bailey et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0256032 A1 | 8/2024 | Holder et al. |
| 2024/0265656 A1 | 8/2024 | Victor-Faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0302948 A1 | 9/2024 | Hylak et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0361901 A1 | 10/2024 | Ravasz et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0111626 A1 | 4/2025 | Deliz Centeno et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |
| 2025/0200901 A1 | 6/2025 | Ren et al. |

(56)                References Cited

U.S. PATENT DOCUMENTS

| | | |
|---|---|---|
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |
| 2025/0232541 A1 | 7/2025 | Chand et al. |
| 2025/0245938 A1 | 7/2025 | Kim et al. |
| 2025/0258577 A1 | 8/2025 | Palangie et al. |
| 2025/0278134 A1 | 9/2025 | Pastrana Vicente et al. |
| 2025/0278166 A1 | 9/2025 | Mckenzie et al. |
| 2025/0278907 A1 | 9/2025 | Pazmino et al. |
| 2025/0284344 A1 | 9/2025 | Sundstrom et al. |
| 2025/0291470 A1 | 9/2025 | Hylak et al. |
| 2025/0306727 A1 | 10/2025 | Kawashima et al. |
| 2025/0322612 A1 | 10/2025 | Cerra et al. |
| 2025/0348186 A1 | 11/2025 | Krivoruchko |
| 2025/0350902 A1 | 11/2025 | Keatch et al. |
| 2025/0356596 A1 | 11/2025 | O'leary et al. |
| 2025/0377719 A1 | 12/2025 | Ravasz et al. |
| 2025/0377759 A1 | 12/2025 | Pazmino et al. |
| 2025/0377760 A1 | 12/2025 | Mckenzie et al. |
| 2025/0378595 A1 | 12/2025 | Ford et al. |
| 2025/0378629 A1 | 12/2025 | Ravasz et al. |
| 2025/0378645 A1 | 12/2025 | Holder et al. |

FOREIGN PATENT DOCUMENTS

| | | |
|---|---|---|
| CN | 102298493 A | 12/2011 |
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108563335 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 110830786 A | 2/2020 |
| CN | 111033572 A | 4/2020 |
| CN | 111213183 A | 5/2020 |
| CN | 111488056 A | 8/2020 |
| CN | 111580652 A | 8/2020 |
| CN | 111641843 A | 9/2020 |
| CN | 111913565 A | 11/2020 |
| CN | 112068757 A | 12/2020 |
| CN | 113168737 A | 7/2021 |
| CN | 114327026 A | 4/2022 |
| CN | 114546102 A | 5/2022 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020101675 A1 | 7/2020 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3306444 A1 | 4/2018 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H064596 A | 1/1994 |
| JP | H1051711 A | 2/1998 |
| JP | H1078845 A | 3/1998 |
| JP | H11289555 A | 10/1999 |
| JP | 2004510239 A | 4/2004 |
| JP | 2005215144 A | 8/2005 |
| JP | 2005333524 A | 12/2005 |
| JP | 2006004093 A | 1/2006 |
| JP | 2006107048 A | 4/2006 |
| JP | 2006146803 A | 6/2006 |
| JP | 2006295236 A | 10/2006 |
| JP | 2011203880 A | 10/2011 |
| JP | 2012234550 A | 11/2012 |
| JP | 2013178639 A | 9/2013 |
| JP | 2013196158 A | 9/2013 |
| JP | 2013254358 A | 12/2013 |
| JP | 2013257716 A | 12/2013 |
| JP | 2014021565 A | 2/2014 |
| JP | 2014059840 A | 4/2014 |
| JP | 2014071663 A | 4/2014 |
| JP | 2014099184 A | 5/2014 |
| JP | 2014514652 A | 6/2014 |
| JP | 2014514653 A | 6/2014 |
| JP | 2015056173 A | 3/2015 |
| JP | 2015515040 A | 5/2015 |
| JP | 2015118332 A | 6/2015 |
| JP | 2015222565 A | 12/2015 |
| JP | 2016096513 A | 5/2016 |
| JP | 2016194744 A | 11/2016 |
| JP | 2017027206 A | 2/2017 |
| JP | 2017058528 A | 3/2017 |
| JP | 2017126009 A | 7/2017 |
| JP | 2017525002 A | 8/2017 |
| JP | 2017531221 A | 10/2017 |
| JP | 2018005516 A | 1/2018 |
| JP | 2018005517 A | 1/2018 |
| JP | 2018041477 A | 3/2018 |
| JP | 2018514005 A | 5/2018 |
| JP | 2018088118 A | 6/2018 |
| JP | 2018101019 A | 6/2018 |
| JP | 2018106499 A | 7/2018 |
| JP | 6438869 B2 | 12/2018 |
| JP | 2019040333 A | 3/2019 |
| JP | 2019515361 A | 6/2019 |
| JP | 2019169154 A | 10/2019 |
| JP | 2019175449 A | 10/2019 |
| JP | 2019527881 A | 10/2019 |
| JP | 2019532382 A | 11/2019 |
| JP | 2019536131 A | 12/2019 |
| JP | 2020503595 A | 1/2020 |
| JP | 2020086913 A | 6/2020 |
| JP | 2022053334 A | 4/2022 |
| JP | 2022175629 A | 11/2022 |
| JP | 2023052278 A | 4/2023 |
| KR | 20110017236 A | 2/2011 |
| KR | 20110128487 A | 11/2011 |
| KR | 10-2013-0010012 A | 1/2013 |
| KR | 10-2014-0073730 A | 6/2014 |
| KR | 20140097654 A | 8/2014 |
| KR | 20160012139 A | 2/2016 |
| KR | 20170027240 A | 3/2017 |
| KR | 20180102171 A | 9/2018 |
| KR | 20190100957 A | 8/2019 |
| KR | 20200010296 A | 1/2020 |
| KR | 20200035103 A | 4/2020 |
| KR | 20200110788 A | 9/2020 |
| KR | 10-2020-0140378 A | 12/2020 |
| KR | 20200135496 A | 12/2020 |
| KR | 20210083016 A | 7/2021 |
| KR | 20210123530 A | 10/2021 |
| KR | 10-2022-0030177 A | 3/2022 |
| KR | 10-2025-0117234 A | 8/2025 |

(56) References Cited

FOREIGN PATENT DOCUMENTS

| WO | 2010026519 A1 | 3/2010 |
| WO | 2011008638 A1 | 1/2011 |
| WO | 2012145180 A1 | 10/2012 |
| WO | 2013/169849 A2 | 11/2013 |
| WO | 2013184447 A2 | 12/2013 |
| WO | 2014/105276 A1 | 7/2014 |
| WO | 2014190106 A1 | 11/2014 |
| WO | 2014203301 A1 | 12/2014 |
| WO | 2015130150 A1 | 9/2015 |
| WO | 2015192117 A1 | 12/2015 |
| WO | 2015195216 A1 | 12/2015 |
| WO | 2016014877 A1 | 1/2016 |
| WO | 2016118344 A1 | 7/2016 |
| WO | 2016126522 A1 | 8/2016 |
| WO | 2017024142 A1 | 2/2017 |
| WO | 2017088487 A1 | 6/2017 |
| WO | 2018005557 A1 | 1/2018 |
| WO | 2018046957 A2 | 3/2018 |
| WO | 2018/090060 A1 | 5/2018 |
| WO | 2018106299 A1 | 6/2018 |
| WO | 2018116556 A1 | 6/2018 |
| WO | 2018125428 A1 | 7/2018 |
| WO | 2018175735 A1 | 9/2018 |
| WO | 2018213801 A1 | 11/2018 |
| WO | 2018/224847 A2 | 12/2018 |
| WO | 2019067902 A1 | 4/2019 |
| WO | 2019074771 A1 | 4/2019 |
| WO | 2019142560 A1 | 7/2019 |
| WO | 2019152286 A2 | 8/2019 |
| WO | 2019172678 A1 | 9/2019 |
| WO | 2019213111 A1 | 11/2019 |
| WO | 2019217163 A1 | 11/2019 |
| WO | 2020066682 A1 | 4/2020 |
| WO | 2020105349 A1 | 5/2020 |
| WO | 2020121483 A1 | 6/2020 |
| WO | 2020179027 A1 | 9/2020 |
| WO | 2020247256 A1 | 12/2020 |
| WO | 2021/061349 A1 | 4/2021 |
| WO | 2021061351 A1 | 4/2021 |
| WO | 2021133053 A1 | 7/2021 |
| WO | 2021173839 A1 | 9/2021 |
| WO | 2021/203856 A1 | 10/2021 |
| WO | 2021202783 A1 | 10/2021 |
| WO | 2022/055821 A1 | 3/2022 |
| WO | 2022/067343 A2 | 3/2022 |
| WO | 2022046340 A1 | 3/2022 |
| WO | 2022055822 A1 | 3/2022 |
| WO | 2022066399 A1 | 3/2022 |
| WO | 2022066535 A2 | 3/2022 |
| WO | 2022067075 A1 | 3/2022 |
| WO | 2022072187 A2 | 4/2022 |
| WO | 2022146936 A1 | 7/2022 |
| WO | 2022146938 A1 | 7/2022 |
| WO | 2022147146 A1 | 7/2022 |
| WO | 2022164881 A1 | 8/2022 |
| WO | 2022192040 A1 | 9/2022 |
| WO | 2022204664 A1 | 9/2022 |
| WO | 2022/208797 A1 | 10/2022 |
| WO | 2022225795 A1 | 10/2022 |
| WO | 2023043646 A1 | 3/2023 |
| WO | 2023096940 A2 | 6/2023 |
| WO | 2023141535 A1 | 7/2023 |
| WO | 2024/064036 A1 | 3/2024 |
| WO | 2024/064373 A1 | 3/2024 |
| WO | 2025/159543 A1 | 7/2025 |

OTHER PUBLICATIONS

Extended European Search Report received for European Patent Application No. 24158036.4, mailed on Jul. 18, 2024, 12 pages.

Non-Final Office Action received for U.S. Appl. No. 18/429,301, mailed on Jun. 12, 2024, 28 pages.

Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.

Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.

Writtenhouse, Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.

International Search Report received for PCT Patent Application No. PCT/US2022/082379, mailed on May 30, 2023, 7 pages.

International Search Report received for PCT Patent Application No. PCT/US2023/019309, mailed on Sep. 1, 2023, 6 pages.

International Search Report received for PCT Patent Application No. PCT/US2023/074968, mailed on Feb. 26, 2024, 7 pages.

Notice of Allowance received for U.S. Appl. No. 18/429,294, mailed on Jun. 21, 2024, 10 pages.

Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.

Didehkhorshid et al., "Text Input in Virtual Reality Using a Tracked Drawing Tablet", HCII 2020, LNCS 12428, 2020, pp. 314-329.

Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Wood, Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxl>, 2 pages.

Extended European Search Report received for European Patent Application No. 24171800.6, mailed on Sep. 5, 2024, 15 pages.

Extended European Search Report received for European Patent Application No. 24171804.8, mailed on Sep. 5, 2024, 13 pages.

International Search Report received for PCT Patent Application No. PCT/US2024/030661, mailed on Nov. 4, 2024, 5 pages.

Notice of Allowance received for U.S. Appl. No. 18/429,294, mailed on Oct. 31, 2024, 10 pages.

Notice of Allowance received for U.S. Appl. No. 18/429,301, mailed on Nov. 22, 2024, 8 pages.

Huang, et al., Proxy-Based Security Audit System for Remote Desktop Access, Computer Communications And Networks, ICCCN 2009. Proceedings of 18th International Conference On, IEEE, Piscataway, NJ, USA, Aug. 3, 2009, 5 pages.

Non-Final Office Action received for U.S. Appl. No. 18/473,176, mailed on May 14, 2025, 23 pages.

Notice of Allowance received for U.S. Appl. No. 18/473,182, mailed on Apr. 23, 2025, 8 pages.

Adding Environments, Available online at: https://manual.keyshot.com/manual/environments/adding-environments/, [retrieved on Jun. 9, 2023], 2 pages.

AquaSnap Window Manager: dock, snap, tile, organize [online], Nurgo Software, Available online at: <https://www.nurgo-software.com/products/aquasnap>, [retrieved on Jun. 27, 2023], 5 pages.

Area Light, Available online at: https://manual.keyshot.com/manual/materials/material-types/light-sources/area-light/, [retrieved on Jun. 9, 2023], 24 pages.

Artec Leo, Artec 3D [online], 2018 [retrieved on Apr. 25, 2024]. Retrieved from the Internet: <URL: https://artec3d.com/portable-3d-scanners/artec-leo>, 39 pages.

(56) References Cited

OTHER PUBLICATIONS

Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.

Curious Blocks Alternatives 12, progsoft [online]. Profsoft, Available Online at: <URL: https://progsoft.net/en/software/curious-blocks>, [retrieved on Apr. 25, 2024], 2024, 7 pages.

Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/Eye Tracking/EyeTracking_Positioning.html>, 2 pages.

Feature Highlights, Available online at: https://manual.keyshot.com/manual/whats-new/feature-highlights/, [retrieved on Jun. 9, 2023], 28 pages.

Home | Virtual Desktop [online], Virtual Desktop, Available online at: <https://www.vrdesktop.net>, [retrieved on Jun. 29, 2023], 4 pages.

Kitasenju Design, X [online], X Corp., Available Online at: <URL: https://twitter.com/kitasenjudesign/status/12826654028126085 13>, [retrieved on Apr. 25, 2024], 2024, 1 page.

Light Manager, Available online at: https://manual.keyshot.com/manual/lighting/lighting-manager/, [retrieved on Jun. 9, 2023], 3 pages.

MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.

Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.

POP 2 3D Scanner (Infrared Light | Precision 0.05mm), Revpoint [online]. Revopoint 3D, <URL: https://global.revopoint3d.com/products/face-3d-scanner-pop2 ?_ ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.

ShareVOX, Phoria [online]. Phoria Pty Ltd, Available Online at: <URL: https://www.phoria.com.au/projects/sharevox/>, [retrieved on Apr. 25, 2024], 2024, 2 pages.

Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.

Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.

VoxEdit Beta Tutorial—Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.

Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.

Voxelize, Rossiev [online]. Denis Rossiev 2018-2024, Available Online at: <URL: https://www.rossiev.pro/voxelize/>, [retrieved on Apr. 25, 2024], 2024, 16 pages.

VR Design Best Practices, LeapMotion, 2015, 31 pages.

Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.

Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.

Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.

Berard Francois, "A Study on Two-Dimensional Scrolling with Head Motion", Clips- Imag Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.

Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.

Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.

Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.

Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.

Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.

Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.

Capturing Reality, "RealityCapture tutorial: Complete model in PPI", Youtube, https://www.youtube.com/watch?v=tw6wNNEbH_M, Oct. 14, 2021, 2 pages.

Cas and Chary XR, "Oculus Go & Your Phone as 2nd Controller!!—An Inexpensive Way to Play PC VR Games", posted on Mar. 8, 2019, https://www.youtube.com/watch?v=i_iRVa0kemw, 2019, 4 pages.

Chatterjee et al., "Gaze+Gesture: Expressive, Precise and Targeted Free-Space Interactions", ICMI '15, Nov. 9-13, 2015, 8 pages.

Choe et al., "Augmented-Reality-Based 3D Emotional Messenger for Dynamic User Communication with Smart Devices", Electronics, vol. 9, No. 1127, Jul. 10, 2020, 15 pages.

Dhakal et al., "SLAM-Share: Visual Simultaneous Localization and Mapping for Real-time Multi-user Augmented Reality", CoNEXT '22, Dec. 6-9, 2022, Roma, Italy, 14 pages.

Dudley et al., "Fast and Precise Touch-Based Text Entry for Head-Mounted Augmented Reality with Variable Occlusion", ACM Transactions on Computer-Human Interaction (TOCHI), vol. 25, No. 5, Article 30, Dec. 13, 2018, 40 pages.

Fatima et al., "Eye Movement Based Human Computer Interaction", 3rd International Conference on Recent Advances in Information Technology (RAIT), Mar. 3, 2016, pp. 489-494.

Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.

Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.

(56) References Cited

OTHER PUBLICATIONS

Headmaster Introduction, "If You Can Move Your Head, You Can Move Your World", Retrieved from: <https://www.microsoft.com/buxtoncollection/a/pdf/HeadMaster%20Introduction.pdf>, Retrieved on Dec. 26, 2024, 4 pages.

Jones et al., "The Future of Virtual Museums: On-Line, Immersive, 3D Environments", ProQuest (Technology Collection Database, Dissertations and Theses Database): Technical Literature Search, Jul. 26, 2002, 12 pages.

Kim et al., "Pseudo-haptic Button for Improving User Experience of Mid-air Interaction in VR", International Journal of Human-Computer Studies. Dec. 1, 2022; 168:102907, Available online Aug. 2022 (Year: 2022), 11 pages.

Kim et al., "Virtual Object Sizes for Efficient and Convenient Mid-air Manipulation", The Visual Computer, vol. 38, No. 9, Jul. 1, 2022, pp. 3463-3474.

Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.

Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.

Lin et al., "Towards Naturally Grabbing and Moving Objects in VR", IS&T International Symposium on Electronic Imaging and the Engineering Reality of Virtual Reality, 2016, 6 pages.

Lin et al., "Ubii: Physical World Interaction Through Augmented Reality", Publisher: IEEE, vol. 16, No. 3, DOI:10.1109/TMC.2016.2567378, May 13, 2016, pp. 872-885.

Locher et al., "Mobile Phone and Cloud—a Dream Team for 3D Reconstruction", 2016 IEEE Winter Conference on Applications of Computer Vision (WACV), 2016, pp. 1-8.

Lor Cas, "Reality Capture: Exporting Mesh", Youtube, https://www.youtube.com/watch?v=PdvTRa2B_s0, Dec. 10, 2020, 2 pages.

Macmostvideo, "A Beginner's Guide to Selecting Items on Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.

McGill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.

Mendes et al., "Mid-Air Interactions Above Stereoscopic Interactive Tables", IEEE Symposium on 3D User Interfaces (3DUI), Mar. 29-30, 2014, pp. 3-10.

Nunez Angulo et al., "Manual for the Design of Didactic Units in Augmented Reality Using the Cospaces EDU Application", 2020, 75 pages.

Pfeuffer et al., "Gaze + Pinch Interaction in Virtual Reality", In Proceedings of SUI '17, Brighton, United Kingdom, Oct. 16-17, 2017, pp. 99-108.

Pfeuffer et al., "Gaze and Touch Interaction on Tablets", UIST '16, Tokyo, Japan, ACM, Oct. 16-19, 2016, pp. 301-311.

Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.

Qi et al., "PointNet++: Deep Hierarchical Feature Learning on Point Sets in a Metric Space", Stanford University, Jun. 7, 2017, 14 pages.

Ran et al., "Multi-User Augmented Reality with Communication Efficient and Spatially Consistent Virtual Objects", CoNEXT '20, Dec. 1-4, 2020, Barcelona, Spain, 13 pages.

Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.

Schenk et al., "SPOCK: A Smooth Pursuit Oculomotor Control Kit", CHI'16 Extended Abstracts, San Jose, CA, USA, ACM, May 7-12, 2016, pp. 2681-2687.

Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, "Interactive Exploration of Point Clouds", Technische Universitat Wien, reposiTUm, https://doi.org/10.34726/hss.2021.91668, Mar. 8, 2021, 119 pages.

Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

Speicher et al., "Pseudo-haptic Controls for Mid-air Finger-based Menu Interaction", CHI'19 Extended Abstracts, May 4-9, 2019, Conference on Human Factors in Computing Systems, 2019, pp. 1-6.

Strand Robin, "Surface Skeletons in Grids With Non-cubic Voxels", 2004 IEEE Xplore, Available Online at: <DOI: 10.1109/ICPR.2004.1334195>, Sep. 2004, 5 pages.

Tolle et al., "Design of Head Movement Controller System (HEMOCS) for Control Mobile Application through Head Pose Movement Detection", Retrieved from: <https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.

Simple Modal Window With Background Blur Effect, Available online at: <http://web.archive.org/web/20160313233427/https://www.cssscript.com/simple-modal-window-with-background-blur-effect/>, Mar. 13, 2016, 5 pages.

Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html >[Search Date Aug. 22, 2023], Sep. 20, 2021, 8 pages (1 page of English Abstract and 7 pages of Official Copy).

Yue et al., "Optimal Region Selection for Stereoscopic Video Subtitle Insertion", IEEE Transactions on Circuits and Systems for Video Technology, vol. 28, No. 11, Nov. 2018, 13 pages.

Extended European Search Report received for European Patent Application No. 25200319.9, mailed on Nov. 24, 2025, 10 pages.

Notice of Allowance received for U.S. Appl. No. 18/427,434, mailed on Sep. 17, 2025, 10 pages.

Non-Final Office Action received for U.S. Appl. No. 18/668,049, mailed on Dec. 16, 2025, 11 pages.

Notice of Allowance received for U.S. Appl. No. 18/057,172, mailed on Jul. 15, 2025, 12 pages.

Notice of Allowance received for U.S. Appl. No. 18/894,997, mailed on Dec. 23, 2025, 12 pages.

Non-Final Office Action received for U.S. Appl. No. 18/902,541, mailed on Nov. 28, 2025, 13 pages.

Notice of Allowance received for U.S. Appl. No. 18/174,403, mailed on Aug. 21, 2025, 13 pages.

Notice of Allowance received for U.S. Appl. No. 18/894,997, mailed on Aug. 12, 2025, 13 pages.

Notice of Allowance received for U.S. Appl. No. 18/322,469, mailed on Jul. 7, 2025, 14 pages.

Notice of Allowance received for U.S. Appl. No. 18/322,469, mailed on Mar. 19, 2025, 14 pages.

Notice of Allowance received for U.S. Appl. No. 18/473,184, mailed on Dec. 2, 2025, 14 pages.

Non-Final Office Action received for U.S. Appl. No. 18/587,815, mailed on Sep. 25, 2025, 16 pages.

Final Office Action received for U.S. Appl. No. 18/473,195, mailed on Nov. 26, 2025, 17 pages.

Non-Final Office Action received for U.S. Appl. No. 18/473,242, mailed on Sep. 5, 2025, 17 pages.

Non-Final Office Action received for U.S. Appl. No. 18/472,073, mailed on Dec. 3, 2025, 18 pages.

Non-Final Office Action received for U.S. Appl. No. 18/473,190, mailed on Dec. 10, 2025, 18 pages.

(56) References Cited

OTHER PUBLICATIONS

Non-Final Office Action received for U.S. Appl. No. 18/916,583, mailed on Oct. 2, 2025, 18 pages.

Corrected Notice of Allowability received for U.S. Appl. No. 18/157,040, mailed on Oct. 30, 2025, 2 pages.

Corrected Notice of Allowability received for U.S. Appl. No. 18/157,040, mailed on Sep. 25, 2025, 2 pages.

Supplemental Notice of Allowability received for U.S. Appl. No. 18/473,261, mailed on Sep. 30, 2025, 2 pages.

Final Office Action received for U.S. Appl. No. 18/518,340, mailed on Oct. 31, 2025, 20 pages.

Non-Final Office Action received for U.S. Appl. No. 18/515,191, mailed on Oct. 21, 2025, 20 pages.

Final Office Action received for U.S. Appl. No. 18/317,890, mailed on Sep. 3, 2025, 22 pages.

Non-Final Office Action received for U.S. Appl. No. 18/057,172, mailed on Mar. 14, 2025, 22 pages.

Final Office Action received for U.S. Appl. No. 18/473,176, mailed on Dec. 3, 2025, 24 pages.

Non-Final Office Action received for U.S. Appl. No. 17/933,020, mailed on Oct. 1, 2025, 28 pages.

Non-Final Office Action received for U.S. Appl. No. 18/894,984, mailed on Nov. 28, 2025, 28 pages.

Non-Final Office Action received for U.S. Appl. No. 17/934,104, mailed on Nov. 14, 2025, 30 pages.

Final Office Action received for U.S. Appl. No. 18/298,994, mailed on Sep. 12, 2025, 32 pages.

Non-Final Office Action received for U.S. Appl. No. 18/731,022, mailed on Dec. 15, 2025, 33 pages.

Non-Final Office Action received for U.S. Appl. No. 18/587,739, mailed on Sep. 16, 2025, 34 pages.

Final Office Action received for U.S. Appl. No. 18/317,886, mailed on Dec. 17, 2025, 35 pages.

Final Office Action received for U.S. Appl. No. 18/473,260, mailed on Oct. 22, 2025, 38 pages.

Non-Final Office Action received for U.S. Appl. No. 18/473,239, mailed on Sep. 10, 2025, 38 pages.

Non-Final Office Action received for U.S. Appl. No. 18/473,256, mailed on Nov. 4, 2025., 38 pages.

International Search Report received for PCT Application No. PCT/US2025/028705, mailed on Aug. 5, 2025, 4 pages.

Search Report received for Chinese Patent Application No. 202210728190.3, mailed on Aug. 29, 2025, 5 pages (2 pages of English Translation and 3 pages of Official Copy).

Corrected Notice of Allowability received for U.S. Appl. No. 18/919,095, mailed on Nov. 12, 2025, 5 pages.

Notice of Allowance received for U.S. Appl. No. 18/988,115, mailed on Oct. 7, 2025, 5 pages.

International Search Report received for PCT Patent Application No. PCT/US2025/032533, mailed on Oct. 30, 2025, 6 pages.

International Search Report received for PCT Patent Application No. PCT/US2025/032549, mailed on Oct. 23, 2025, 7 pages.

Notice of Allowance received for U.S. Appl. No. 18/304,290, mailed on Aug. 20, 2025, 7 pages.

Notice of Allowance received for U.S. Appl. No. 18/471,729, mailed on Oct. 10, 2025, 7 pages.

Notice of Allowance received for U.S. Appl. No. 18/473,196, mailed on Dec. 2, 2025, 7 pages.

Restriction Requirement received for U.S. Appl. No. 18/473,259, mailed on Oct. 30, 2025, 7 pages.

International Search Report received for PCT Patent Application No. PCT/US2025/029736, mailed on Nov. 6, 2025, 8 pages.

Notice of Allowance received for U.S. Appl. No. 18/174,403, mailed on Dec. 17, 2025, 8 pages.

Notice of Allowance received for U.S. Appl. No. 18/473,182, mailed on Oct. 21, 2025, 8 pages.

Notice of Allowance received for U.S. Appl. No. 18/473,262, mailed on Oct. 7, 2025, 8 pages.

Notice of Allowance received for U.S. Appl. No. 18/645,292, mailed on Nov. 4, 2025, 8 pages.

Notice of Allowance received for U.S. Appl. No. 18/882,622, mailed on Aug. 27, 2025, 8 pages.

Notice of Allowance received for U.S. Appl. No. 18/919,095, mailed on Oct. 23, 2025, 8 pages.

International Search Report received for PCT Patent Application No. PCT/US2025/029209, mailed on Nov. 5, 2025, 9 pages.

Notice of Allowance received for U.S. Appl. No. 18/153,943, mailed on Oct. 7, 2025, 9 pages.

Notice of Allowance received for U.S. Appl. No. 18/473,261, mailed on Sep. 23, 2025, 9 pages.

Common Menus in Microsoft Windows, Wikipedia, Sep. 15, 2019, Retrieved from the Internet: URL: https://en.wikipedia.org/w/index.php?title=Common_menus_in_Microsoft_Windows&oldid=921467305, 2 pages.

Drawing and Painting in VR by Using a Graphics Tablet as Virtual Paper, Reddit [online]. Reddit, Aug. 1, 2012. Available online at _a_graphics/>, [Retrieved from Internet on Nov. 18, 2025], 6 pages.

Non-Final Office Action received for U.S. Appl. No. 18/322,469, mailed on Nov. 15, 2024, 34 pages.

You Can Bring Your Real Phone With You Into VR!, YouTube [online]. YouTube, Mar. 28, 2023. Available online at <https://www.youtube.com/watch?v=2niOsrGVUq8>, [Retrieved from Internet on Nov. 11, 2025], 2 pages.

Cybersence, "Leap Motion—Virtual Wearables", YouTube, Mar. 26, 2018, Retrieved from the Internet: URL: https://www.youtube.com/watch?v=j81-Y60q-zl, 2 pages.

Ghosh et al., "NotifiVIR: Exploring Interruptions and Notifications in Virtual Reality", IEEE transactions on visualization and computer graphics, vol. 24, No. 4, Apr. 2018, pp. 1447-1456.

Lang, "Leap Motion 'Virtual Wearable' AR Prototype is a Potent Glimpse at the Future of Your Smartphone", Mar. 24, 2018, Retrieved from the Internet: URL: https://www.roadtovr.com/leap-motion-virtual-wearable-ar-prototype-glimpse-of-future-smartphone/, [retrieved on Sep. 1, 2020], 6 pages.

Medeiros et al., "Promoting Reality Awareness in Virtual Reality through Proxemics", IEEE Virtual Reality and 3D User Interfaces (VR), Mar. 27-Apr. 1, 2021, 11 pages.

Pfeuffer et al., "Gaze+touch vs. Touch: What's the Trade-off When Using Gaze to Extend Touch to Remote Displays?", Advances In Databases and Information Systems, Aug. 30, 2015, pp. 349-367.

Zhuang et al., "Distributed Architecture for 3D Graphics Rendering in Collaborative System", Computer and Modernization, Issue 4, 2017, 5 pages (1 page of English Abstract and 4 pages of Official Copy).

Notice of Allowance received for U.S. Appl. No. 18/394,823, mailed on Dec. 29, 2025, 8 pages.

* cited by examiner

Display Generation Component 120

Memory 320

Operating System 330

CGR Experience Module 340

Data Obtaining Unit 342

CGR Presenting Unit 344

CGR Map Generating Unit 346

Data Transmitting Unit 348

CGR Display(s) 312

Image Sensor(s) 314

Comm. Interface(s) 308

Programming Interface(s) 310

304

Processing Unit(s) 302

I/O Devices & Sensors 306

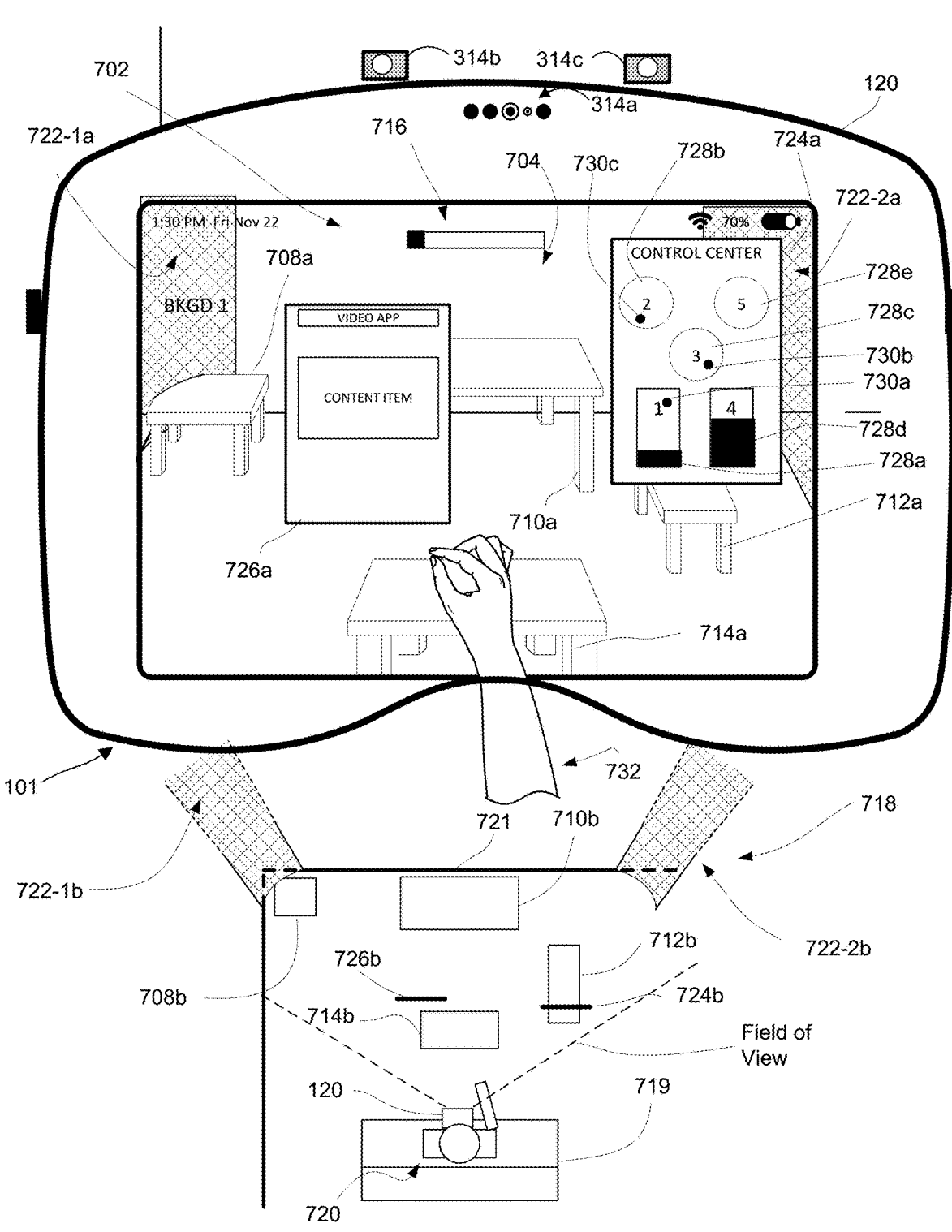
FIG. 7A1

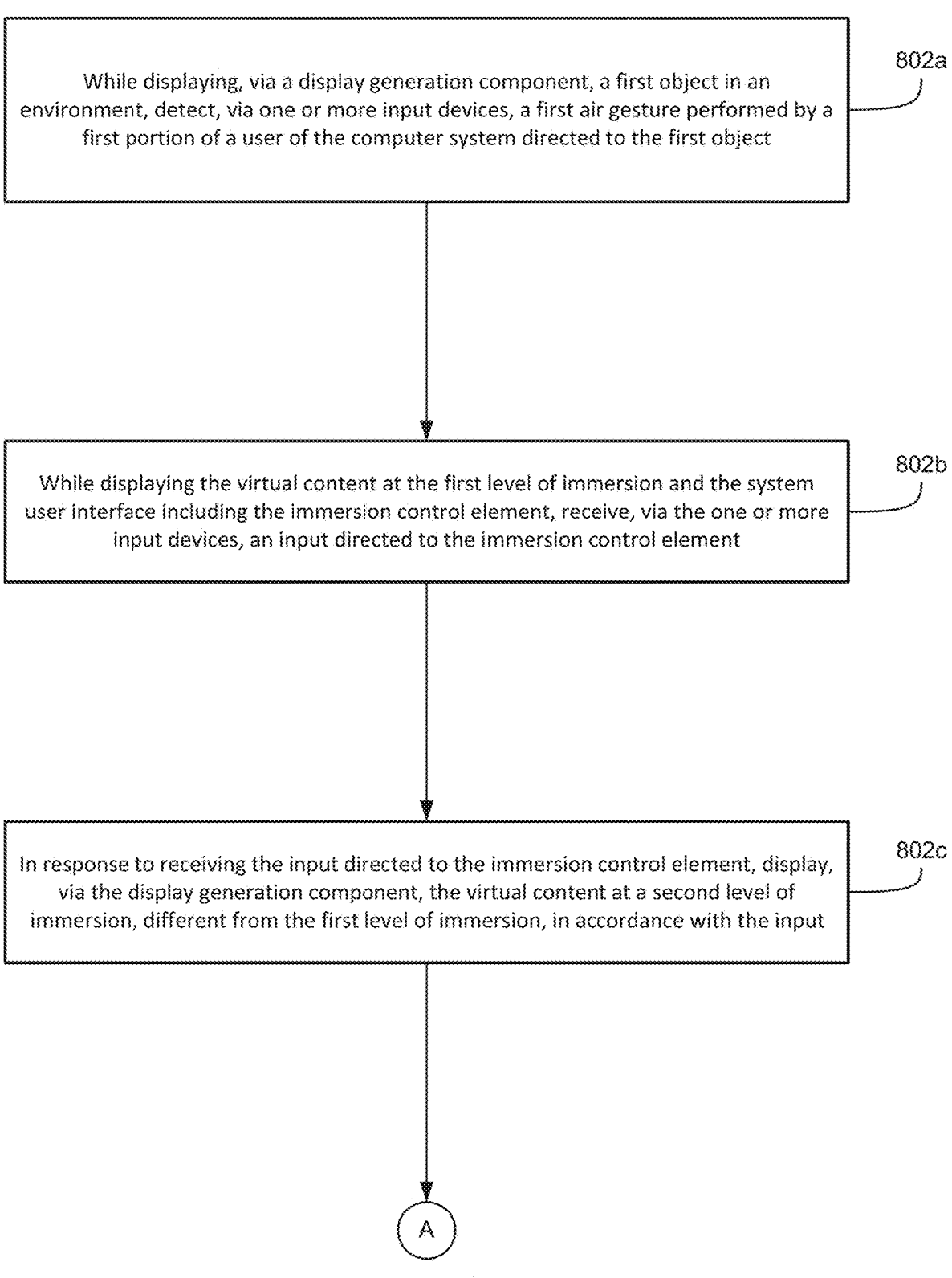

800

While displaying, via a display generation component, a first object in an environment, detect, via one or more input devices, a first air gesture performed by a first portion of a user of the computer system directed to the first object 802a While displaying the virtual content at the first level of immersion and the system user interface including the immersion control element, receive, via the one or more input devices, an input directed to the immersion control element 802b In response to receiving the input directed to the immersion control element, display, via the display generation component, the virtual content at a second level of immersion, different from the first level of immersion, in accordance with the input 802c

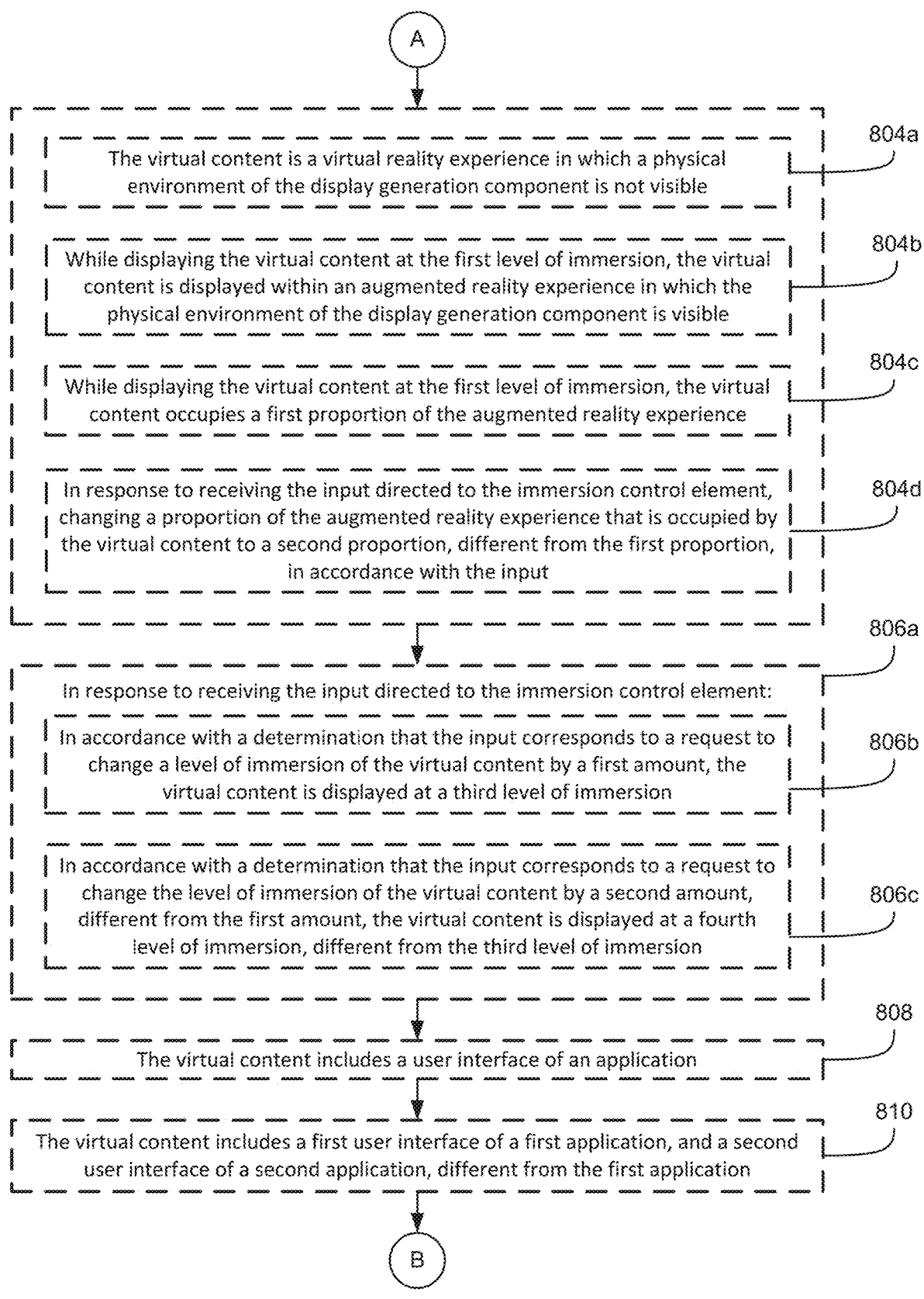

The virtual content is a virtual reality experience in which a physical environment of the display generation component is not visible — 804a While displaying the virtual content at the first level of immersion, the virtual content is displayed within an augmented reality experience in which the physical environment of the display generation component is visible — 804b While displaying the virtual content at the first level of immersion, the virtual content occupies a first proportion of the augmented reality experience — 804c In response to receiving the input directed to the immersion control element, changing a proportion of the augmented reality experience that is occupied by the virtual content to a second proportion, different from the first proportion, in accordance with the input — 804d In response to receiving the input directed to the immersion control element: — 806a In accordance with a determination that the input corresponds to a request to change a level of immersion of the virtual content by a first amount, the virtual content is displayed at a third level of immersion — 806b In accordance with a determination that the input corresponds to a request to change the level of immersion of the virtual content by a second amount, different from the first amount, the virtual content is displayed at a fourth level of immersion, different from the third level of immersion — 806c The virtual content includes a user interface of an application — 808

The virtual content includes a first user interface of a first application, and a second user interface of a second application, different from the first application — 810

FIG. 8B

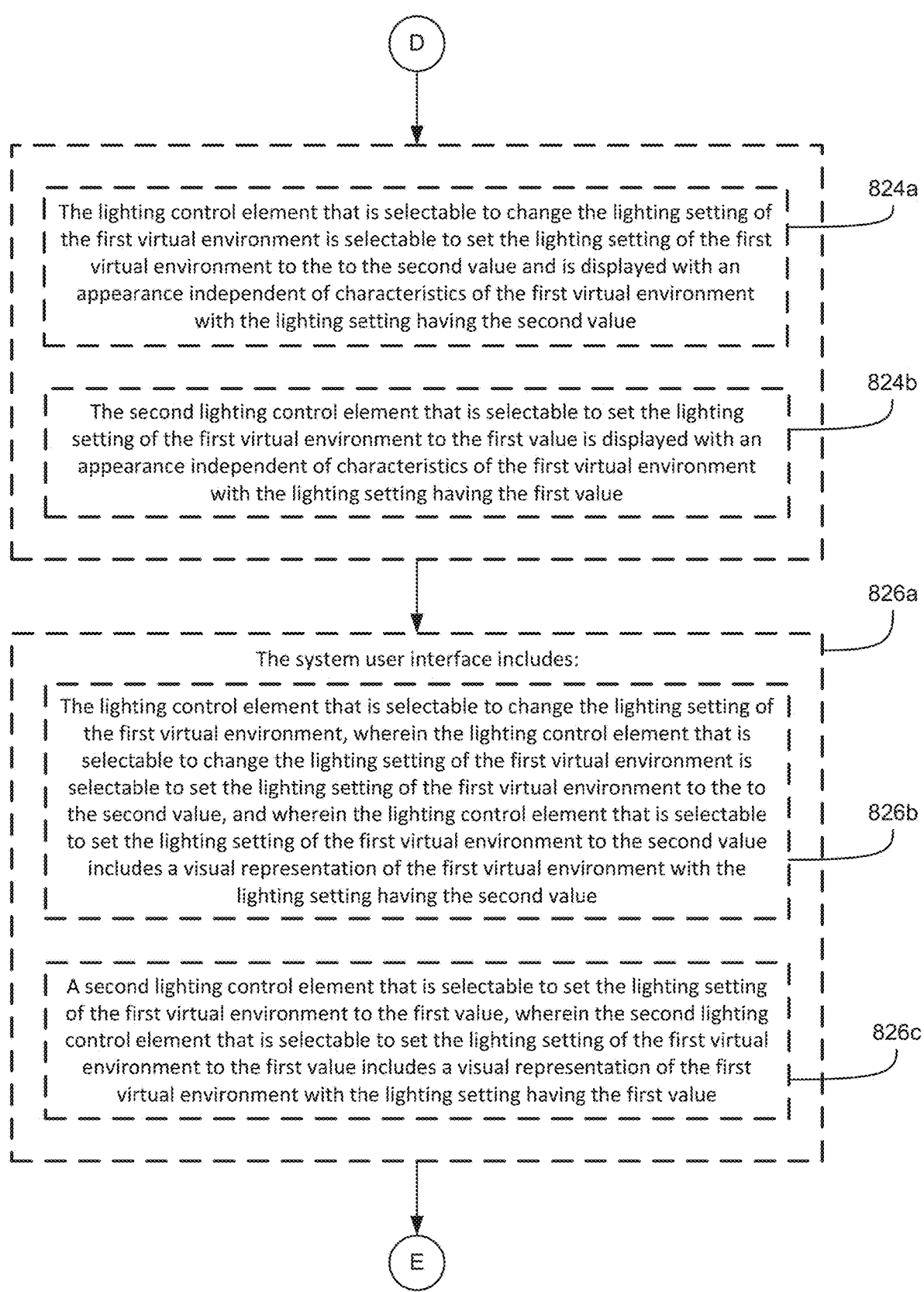

D

The lighting control element that is selectable to change the lighting setting of the first virtual environment is selectable to set the lighting setting of the first virtual environment to the to the second value and is displayed with an appearance independent of characteristics of the first virtual environment with the lighting setting having the second value 824a The second lighting control element that is selectable to set the lighting setting of the first virtual environment to the first value is displayed with an appearance independent of characteristics of the first virtual environment with the lighting setting having the first value 824b 826a The system user interface includes:

The lighting control element that is selectable to change the lighting setting of the first virtual environment, wherein the lighting control element that is selectable to change the lighting setting of the first virtual environment is selectable to set the lighting setting of the first virtual environment to the to the second value, and wherein the lighting control element that is selectable to set the lighting setting of the first virtual environment to the second value includes a visual representation of the first virtual environment with the lighting setting having the second value 826b A second lighting control element that is selectable to set the lighting setting of the first virtual environment to the first value, wherein the second lighting control element that is selectable to set the lighting setting of the first virtual environment to the first value includes a visual representation of the first virtual environment with the lighting setting having the first value 826c

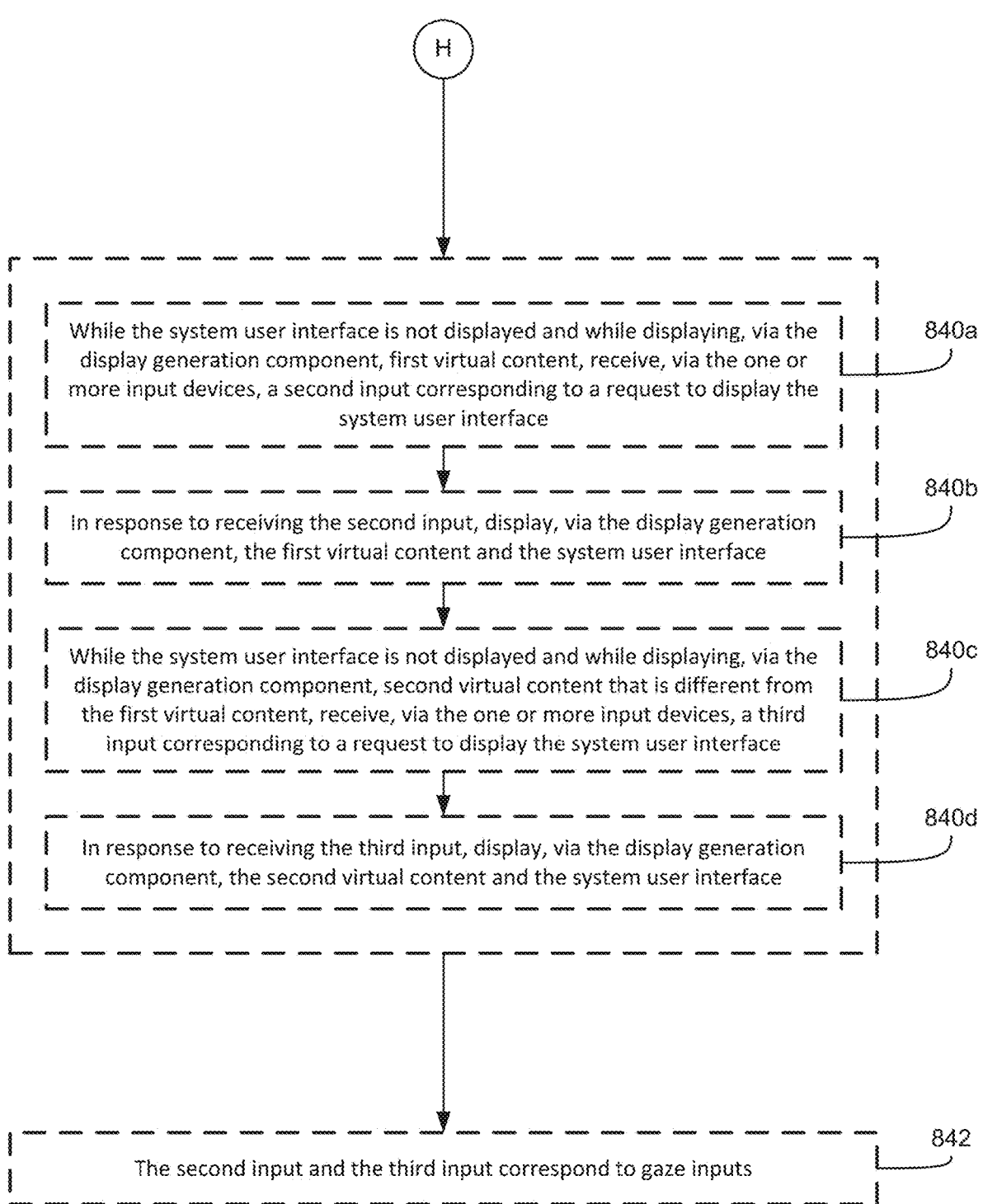

H

While the system user interface is not displayed and while displaying, via the display generation component, first virtual content, receive, via the one or more input devices, a second input corresponding to a request to display the system user interface     840a In response to receiving the second input, display, via the display generation component, the first virtual content and the system user interface     840b While the system user interface is not displayed and while displaying, via the display generation component, second virtual content that is different from the first virtual content, receive, via the one or more input devices, a third input corresponding to a request to display the system user interface     840c In response to receiving the third input, display, via the display generation component, the second virtual content and the system user interface     840d The second input and the third input correspond to gaze inputs     842

FIG. 8I

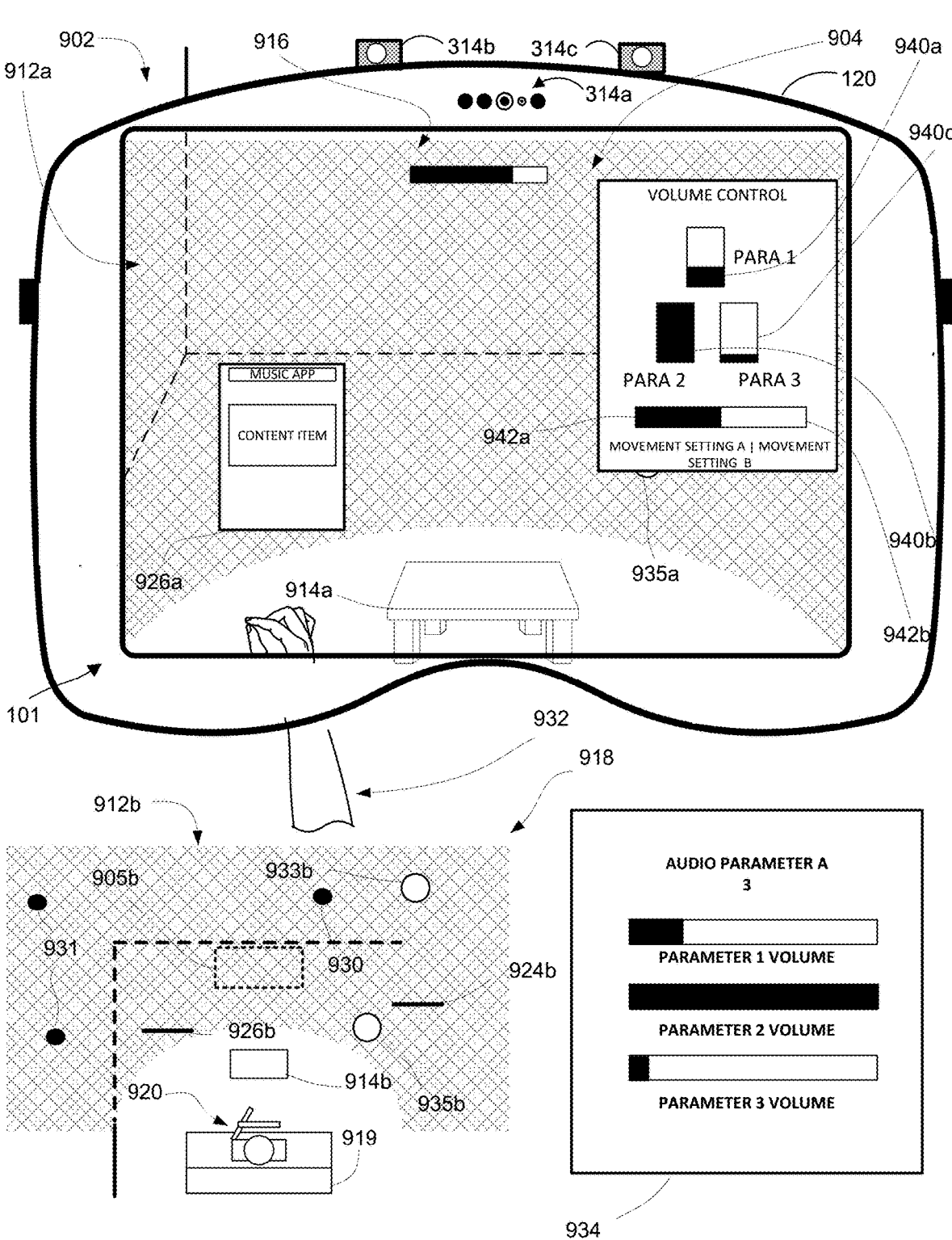
FIG. 9D1

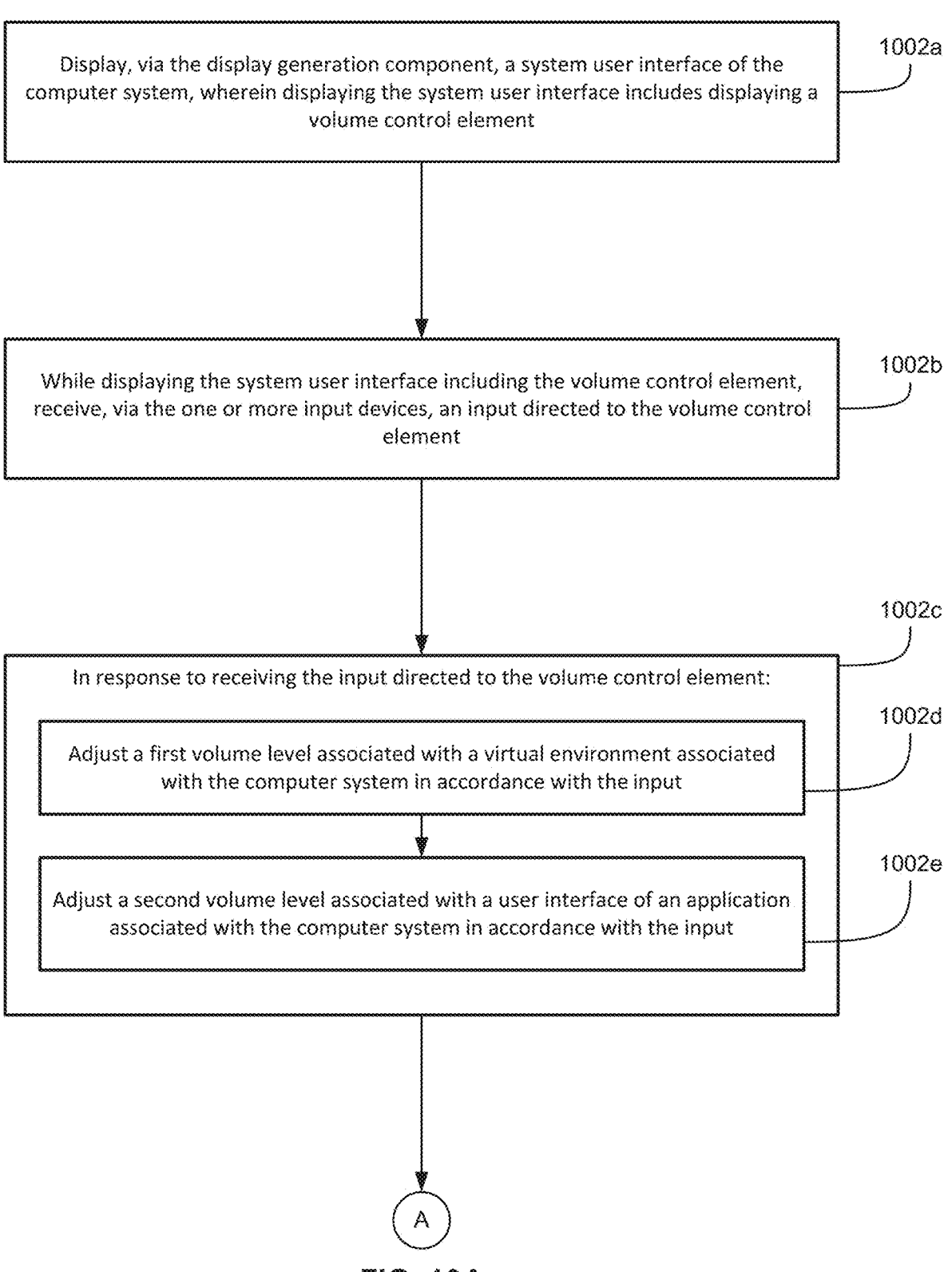

1000

Display, via the display generation component, a system user interface of the computer system, wherein displaying the system user interface includes displaying a volume control element                                                                           1002a While displaying the system user interface including the volume control element, receive, via the one or more input devices, an input directed to the volume control element                                                                           1002b In response to receiving the input directed to the volume control element:                                                                           1002c Adjust a first volume level associated with a virtual environment associated with the computer system in accordance with the input                                                                           1002d Adjust a second volume level associated with a user interface of an application associated with the computer system in accordance with the input                                                                           1002e

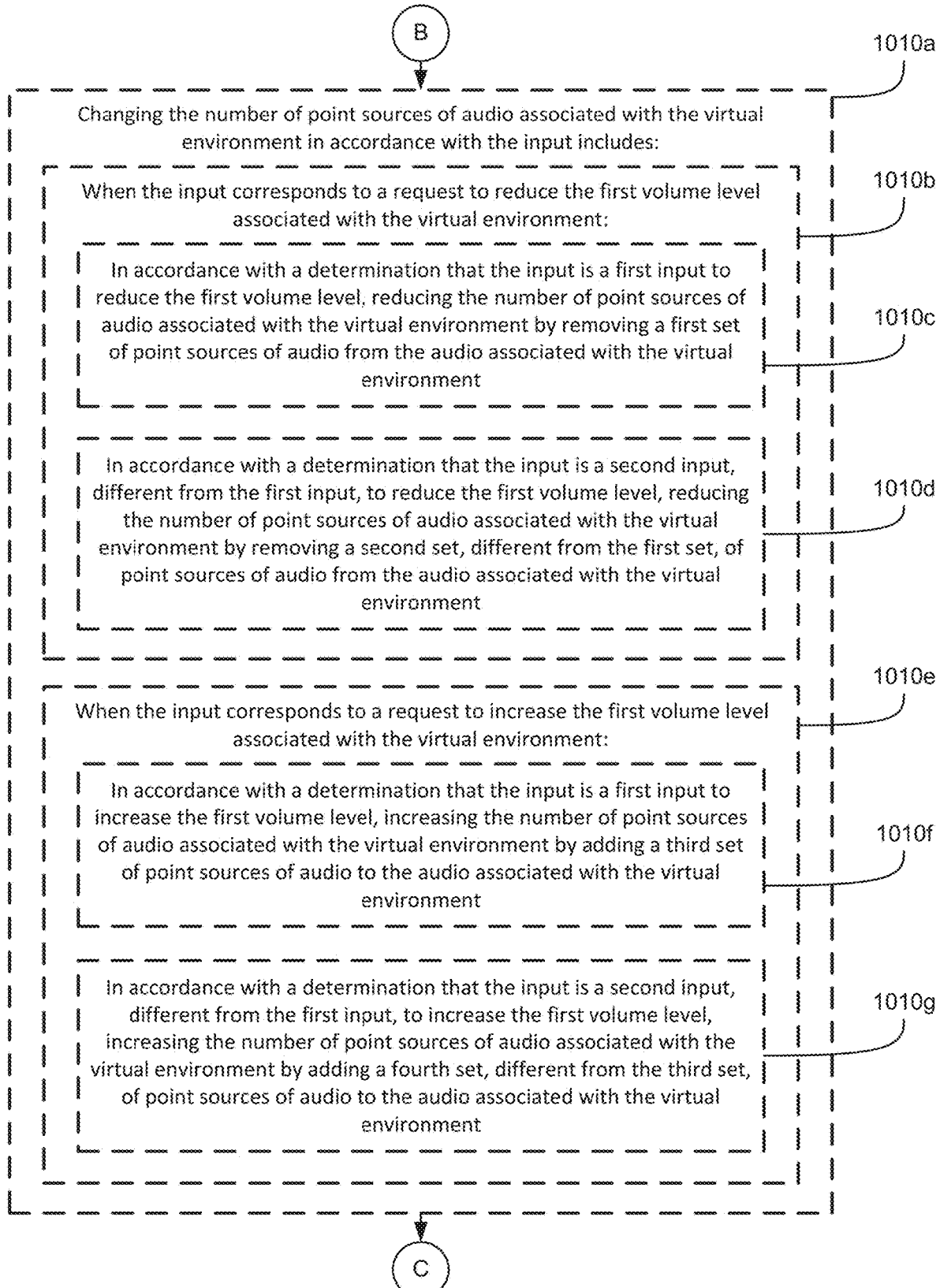

B

1010a

Changing the number of point sources of audio associated with the virtual environment in accordance with the input includes:

When the input corresponds to a request to reduce the first volume level associated with the virtual environment:

1010b

In accordance with a determination that the input is a first input to reduce the first volume level, reducing the number of point sources of audio associated with the virtual environment by removing a first set of point sources of audio from the audio associated with the virtual environment 1010c In accordance with a determination that the input is a second input, different from the first input, to reduce the first volume level, reducing the number of point sources of audio associated with the virtual environment by removing a second set, different from the first set, of point sources of audio from the audio associated with the virtual environment 1010d When the input corresponds to a request to increase the first volume level associated with the virtual environment:

1010e

In accordance with a determination that the input is a first input to increase the first volume level, increasing the number of point sources of audio associated with the virtual environment by adding a third set of point sources of audio to the audio associated with the virtual environment 1010f In accordance with a determination that the input is a second input, different from the first input, to increase the first volume level, increasing the number of point sources of audio associated with the virtual environment by adding a fourth set, different from the third set, of point sources of audio to the audio associated with the virtual environment 1010g

D

Adjusting the first volume level associated with the virtual environment includes adjusting a rate of occurrence of one or more audio outputs of one or more point sources of audio associated with the virtual environment — 1018

Adjusting the first volume level associated with the virtual environment includes adjusting a volume level of an audio track for the virtual environment — 1020

While a volume level of the virtual environment is the first volume level and the virtual environment is displayed at a first level of immersion, receive, via the one or more input devices, a second input corresponding to a request to change a level of immersion of the virtual environment away from the first level of immersion — 1022a In response to receiving the second input: — 1022b In accordance with a determination that the second input corresponds to a request to display the virtual environment at a second level of immersion, greater than the first level of immersion: — 1022c Display the virtual environment at the second level of immersion — 1022d Present the audio associated with the virtual environment at a third volume level, greater than the first volume level — 1022e In accordance with a determination that the second input corresponds to a request to display the virtual environment at a third level of immersion, less than the first level of immersion: — 1022f Display the virtual environment at the third level of immersion — 1022g Present the audio associated with the virtual environment at a fourth volume level, less than the first volume level — 1022h

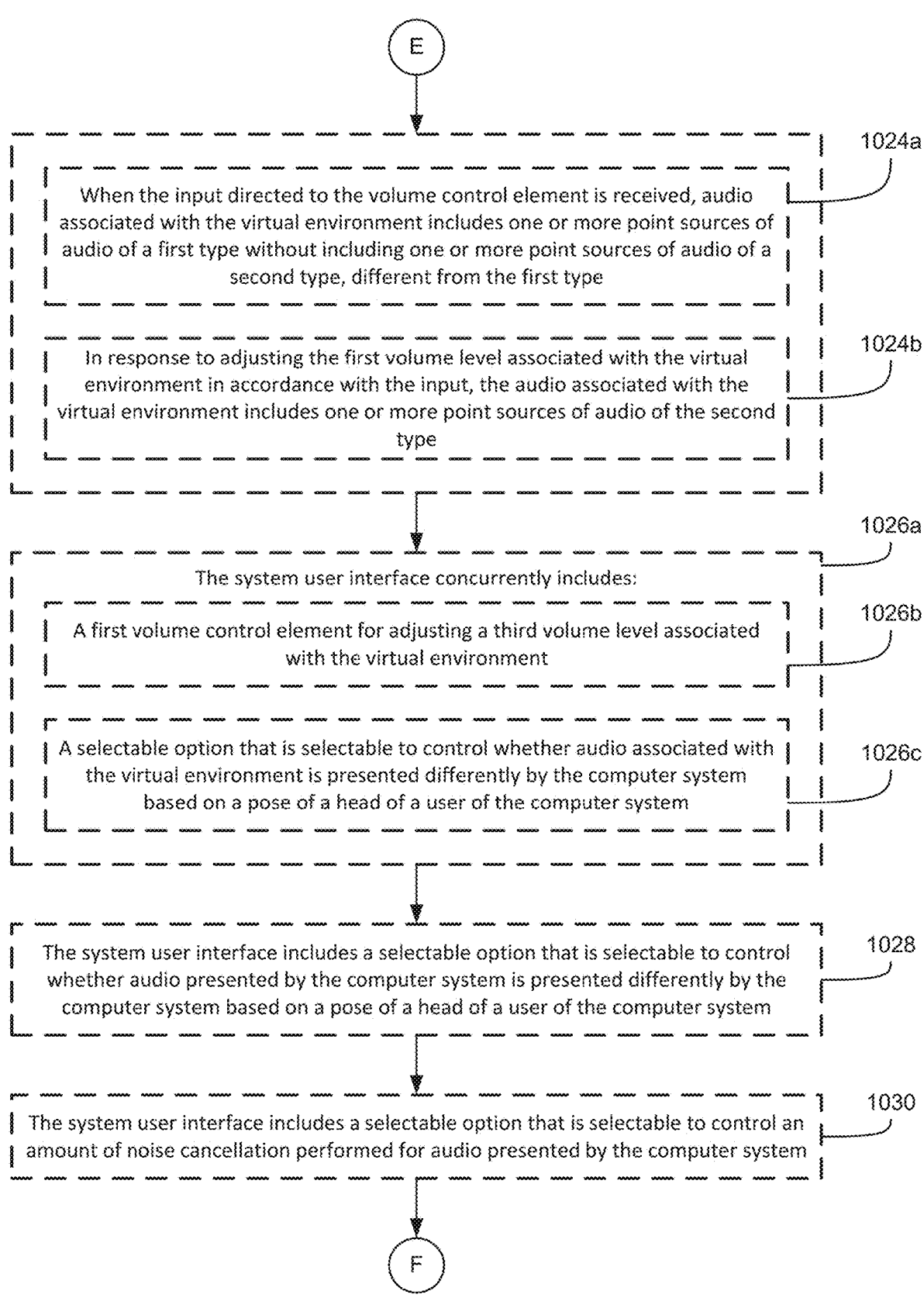

E

When the input directed to the volume control element is received, audio associated with the virtual environment includes one or more point sources of audio of a first type without including one or more point sources of audio of a second type, different from the first type
1024a In response to adjusting the first volume level associated with the virtual environment in accordance with the input, the audio associated with the virtual environment includes one or more point sources of audio of the second type
1024b The system user interface concurrently includes:
1026a A first volume control element for adjusting a third volume level associated with the virtual environment
1026b A selectable option that is selectable to control whether audio associated with the virtual environment is presented differently by the computer system based on a pose of a head of a user of the computer system
1026c The system user interface includes a selectable option that is selectable to control whether audio presented by the computer system is presented differently by the computer system based on a pose of a head of a user of the computer system
1028

The system user interface includes a selectable option that is selectable to control an amount of noise cancellation performed for audio presented by the computer system
1030

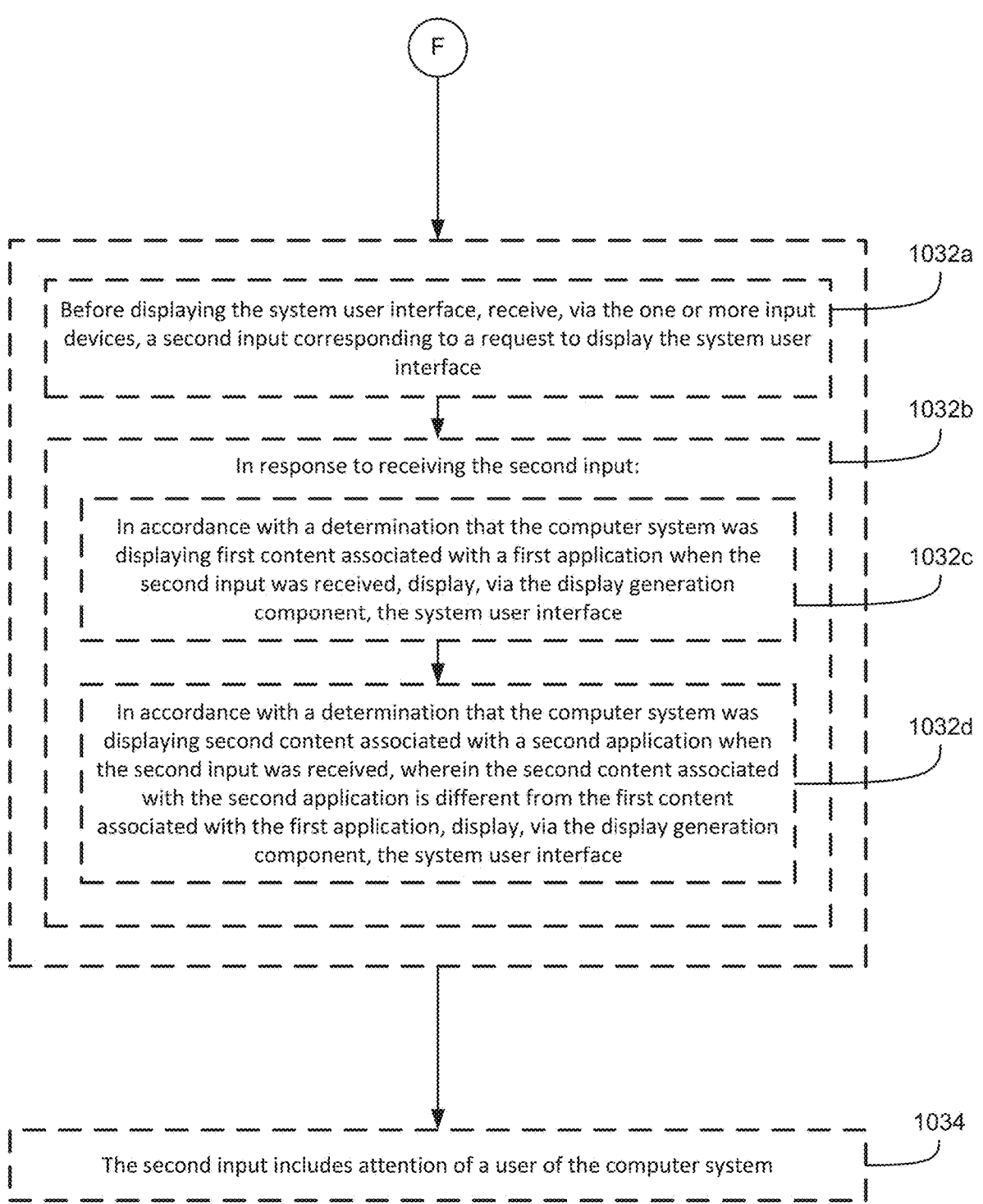

F

Before displaying the system user interface, receive, via the one or more input devices, a second input corresponding to a request to display the system user interface                                                                                          1032a In response to receiving the second input:                                                                                          1032b In accordance with a determination that the computer system was displaying first content associated with a first application when the second input was received, display, via the display generation component, the system user interface                                                                                          1032c In accordance with a determination that the computer system was displaying second content associated with a second application when the second input was received, wherein the second content associated with the second application is different from the first content associated with the first application, display, via the display generation component, the system user interface                                                                                          1032d The second input includes attention of a user of the computer system                                                                                          1034

FIG. 10G

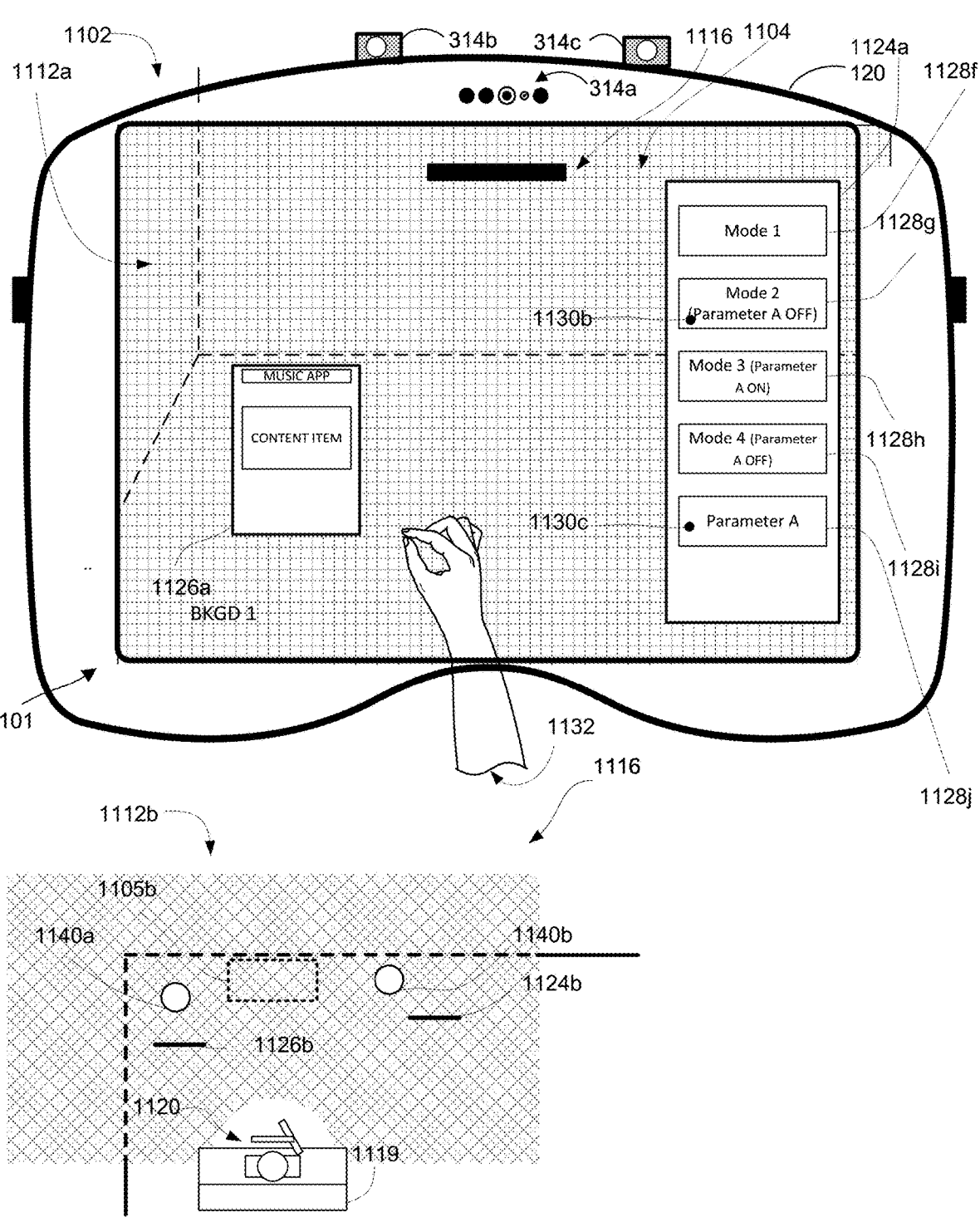
FIG. 11B1

1200

While the computer system is operating in a first mode of operation and displaying first virtual content, detect a first event — 1202a In response to detecting the first event during the first mode of operation: — 1202b In accordance with a determination that the first event satisfies one or more first criteria, reduce a prominence of at least a portion of the first virtual content generated by the computer system relative to a representation of at least a portion of a physical environment in which the computer system is operating — 1202c In accordance with a determination that the first event does not satisfy the one or more first criteria, continue to display the first virtual content without decreasing a prominence of at least a portion of the first virtual content generated by the computer system relative to a representation of at least a portion of the physical environment in which the computer system is operating — 1202d While the computer system is operating in the first mode of operation, display, via the display generation component, a first selectable element — 1202e While the computer system is operating in the first mode of operation and while displaying the first selectable element, receive, via the one or more input devices, a first input directed to the first selectable element — 1202f In response to receiving the first input directed to the first selectable element, operate the computer system in a second mode of operation, different from the first mode of operation — 1202g While operating the computer system in the second mode of operation and displaying second virtual content, detect a second event — 1202h In response to detecting the second event, and in accordance with a determination that the second event does not satisfy one or more second criteria, different from the one or more first criteria, continue to display the second virtual content without decreasing a prominence of at least a portion of the second virtual content generated by the computer system relative to a representation of at least a portion of the physical environment in which the computer system is operating without regard to whether or not the second event satisfies the one or more first criteria — 1202i

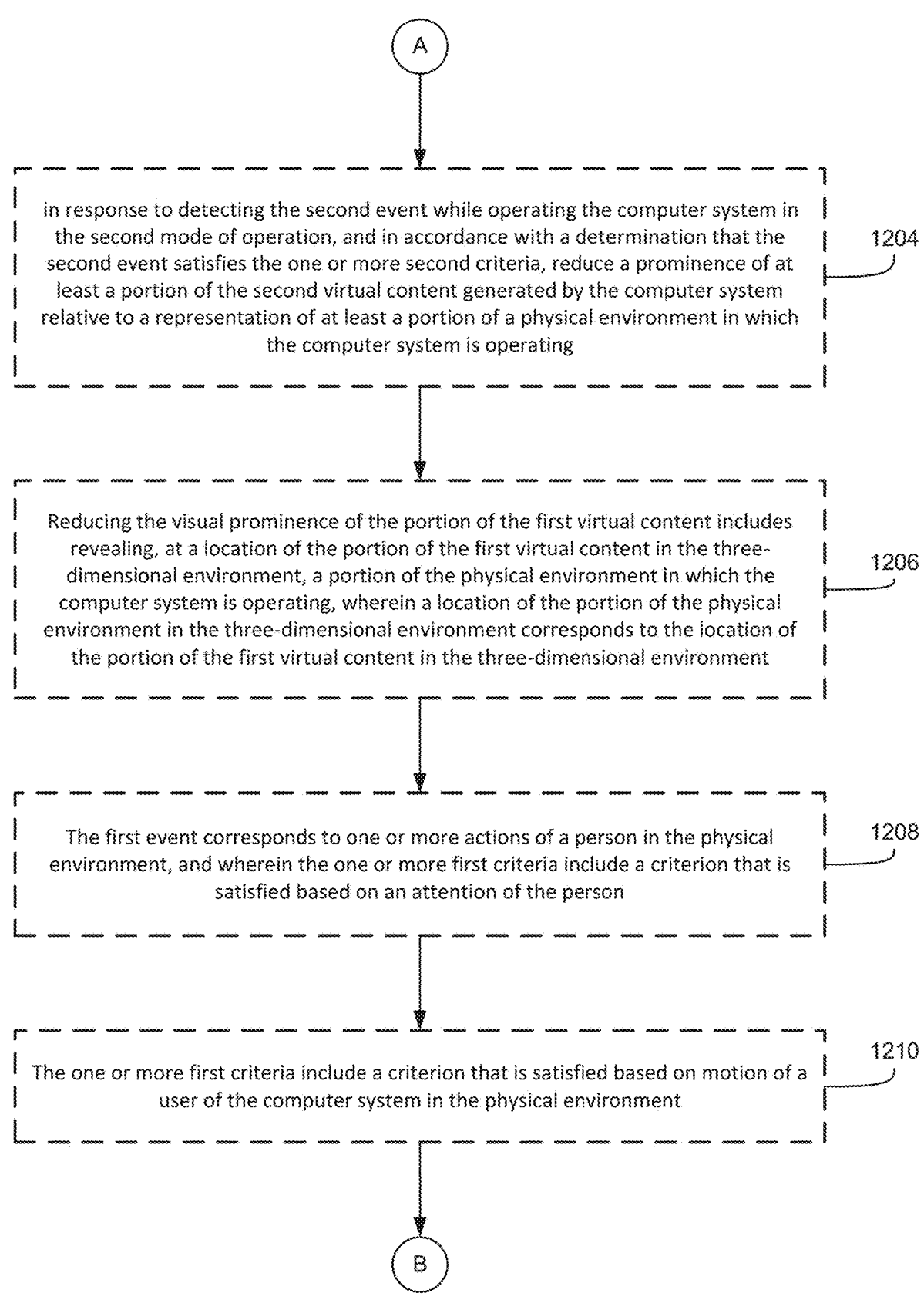

A in response to detecting the second event while operating the computer system in the second mode of operation, and in accordance with a determination that the second event satisfies the one or more second criteria, reduce a prominence of at least a portion of the second virtual content generated by the computer system relative to a representation of at least a portion of a physical environment in which the computer system is operating    1204

Reducing the visual prominence of the portion of the first virtual content includes revealing, at a location of the portion of the first virtual content in the three-dimensional environment, a portion of the physical environment in which the computer system is operating, wherein a location of the portion of the physical environment in the three-dimensional environment corresponds to the location of the portion of the first virtual content in the three-dimensional environment    1206

The first event corresponds to one or more actions of a person in the physical environment, and wherein the one or more first criteria include a criterion that is satisfied based on an attention of the person    1208

The one or more first criteria include a criterion that is satisfied based on motion of a user of the computer system in the physical environment    1210

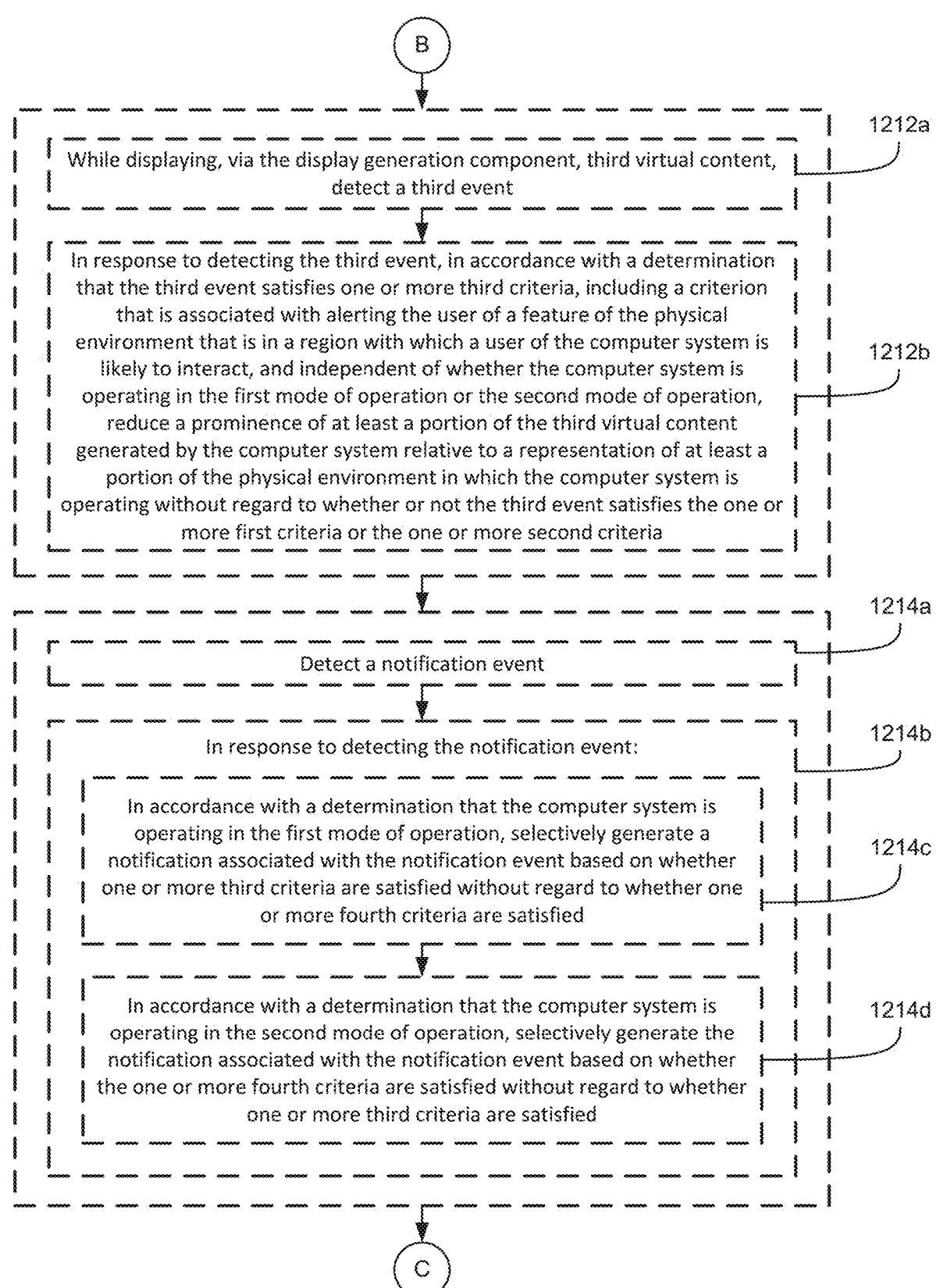

B

While displaying, via the display generation component, third virtual content, detect a third event 1212a In response to detecting the third event, in accordance with a determination that the third event satisfies one or more third criteria, including a criterion that is associated with alerting the user of a feature of the physical environment that is in a region with which a user of the computer system is likely to interact, and independent of whether the computer system is operating in the first mode of operation or the second mode of operation, reduce a prominence of at least a portion of the third virtual content generated by the computer system relative to a representation of at least a portion of the physical environment in which the computer system is operating without regard to whether or not the third event satisfies the one or more first criteria or the one or more second criteria 1212b Detect a notification event 1214a In response to detecting the notification event:

1214b

In accordance with a determination that the computer system is operating in the first mode of operation, selectively generate a notification associated with the notification event based on whether one or more third criteria are satisfied without regard to whether one or more fourth criteria are satisfied 1214c In accordance with a determination that the computer system is operating in the second mode of operation, selectively generate the notification associated with the notification event based on whether the one or more fourth criteria are satisfied without regard to whether one or more third criteria are satisfied 1214d

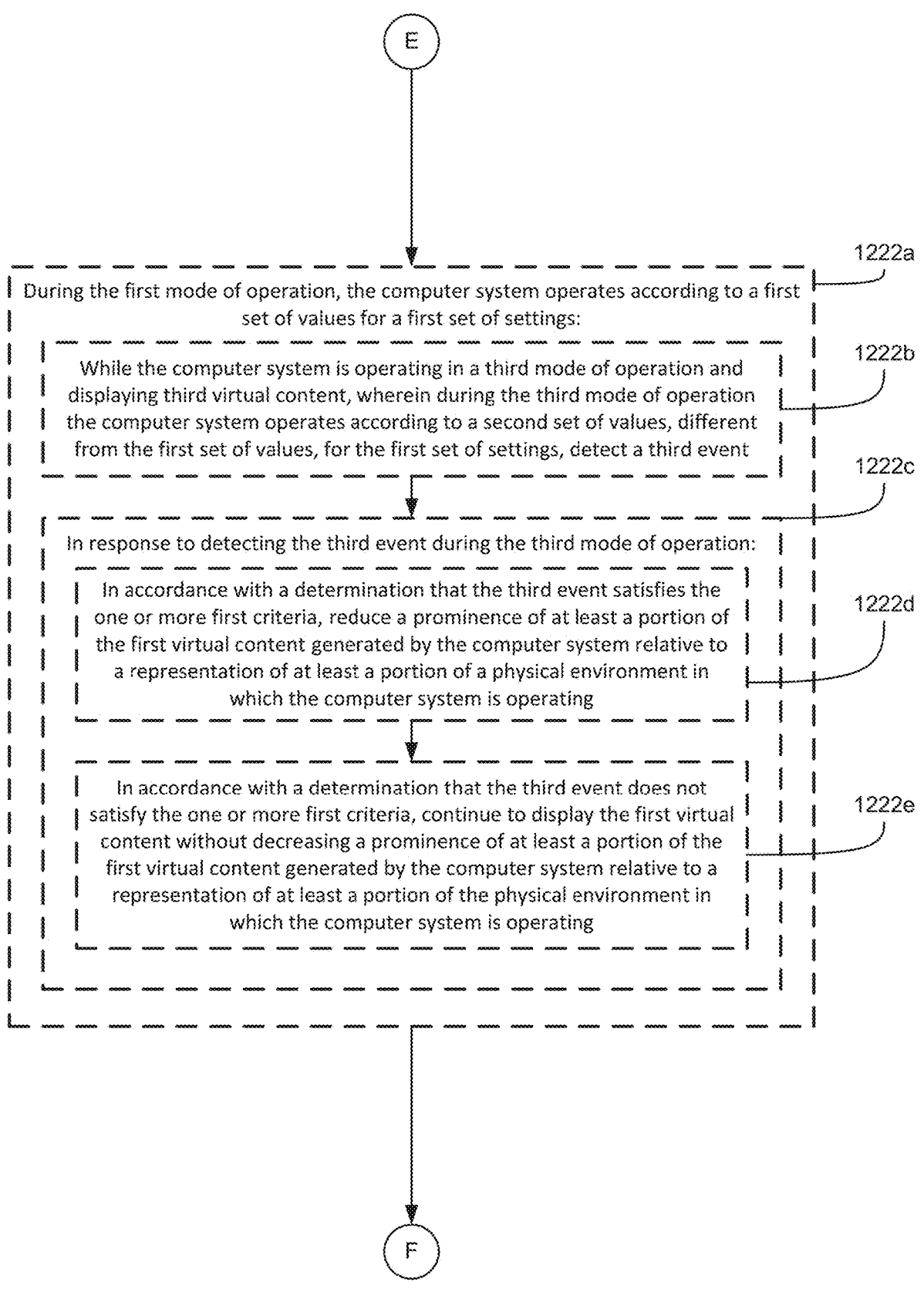

E

During the first mode of operation, the computer system operates according to a first set of values for a first set of settings:      1222a While the computer system is operating in a third mode of operation and displaying third virtual content, wherein during the third mode of operation the computer system operates according to a second set of values, different from the first set of values, for the first set of settings, detect a third event      1222b In response to detecting the third event during the third mode of operation:      1222c In accordance with a determination that the third event satisfies the one or more first criteria, reduce a prominence of at least a portion of the first virtual content generated by the computer system relative to a representation of at least a portion of a physical environment in which the computer system is operating      1222d In accordance with a determination that the third event does not satisfy the one or more first criteria, continue to display the first virtual content without decreasing a prominence of at least a portion of the first virtual content generated by the computer system relative to a representation of at least a portion of the physical environment in which the computer system is operating      1222e

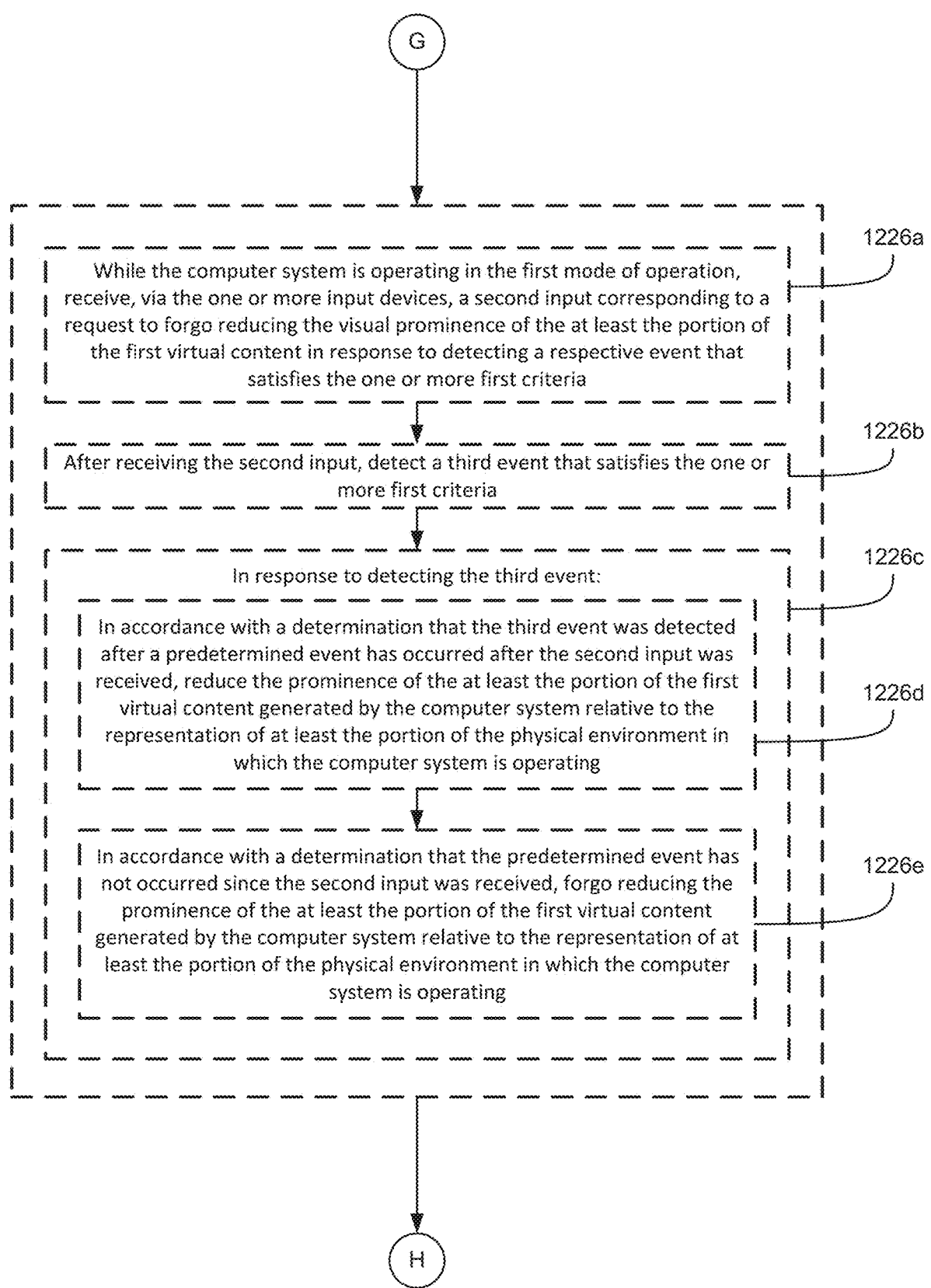

While the computer system is operating in the first mode of operation, receive, via the one or more input devices, a second input corresponding to a request to forgo reducing the visual prominence of the at least the portion of the first virtual content in response to detecting a respective event that satisfies the one or more first criteria 1226a After receiving the second input, detect a third event that satisfies the one or more first criteria 1226b In response to detecting the third event:

1226c

In accordance with a determination that the third event was detected after a predetermined event has occurred after the second input was received, reduce the prominence of the at least the portion of the first virtual content generated by the computer system relative to the representation of at least the portion of the physical environment in which the computer system is operating 1226d In accordance with a determination that the predetermined event has not occurred since the second input was received, forgo reducing the prominence of the at least the portion of the first virtual content generated by the computer system relative to the representation of at least the portion of the physical environment in which the computer system is operating 1226e

FIG. 12H

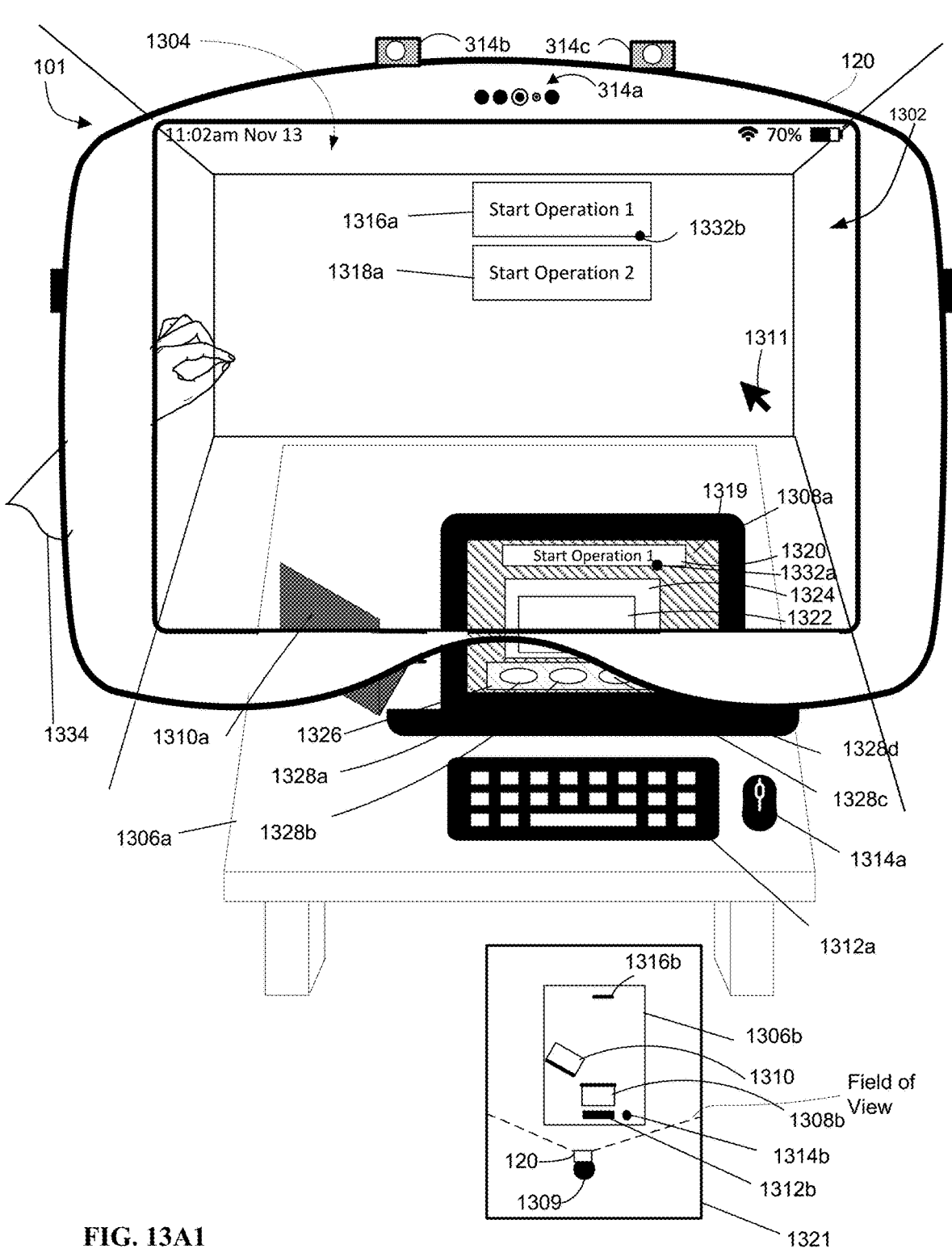
FIG. 13A1

1400

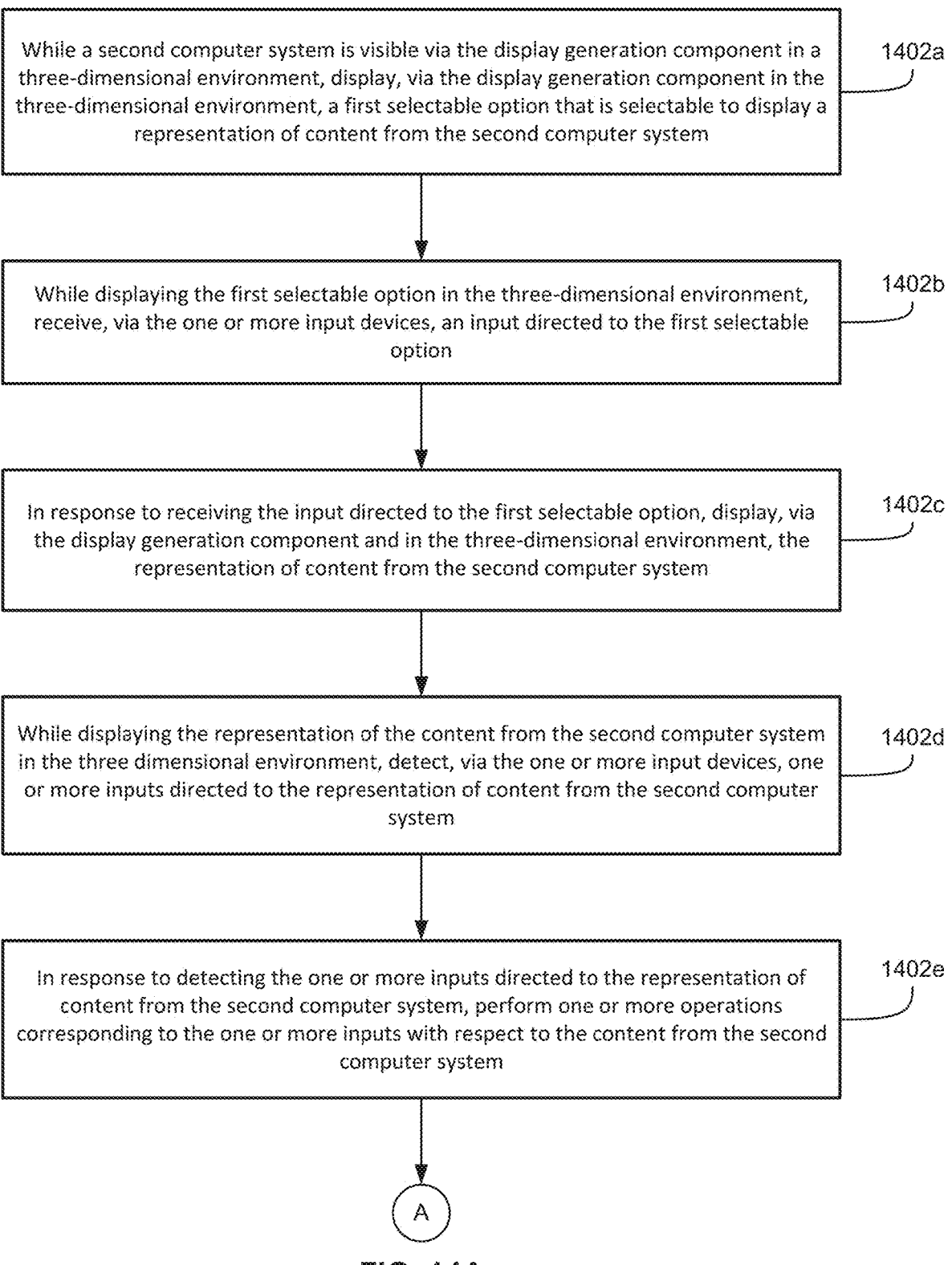

While a second computer system is visible via the display generation component in a three-dimensional environment, display, via the display generation component in the three-dimensional environment, a first selectable option that is selectable to display a representation of content from the second computer system ──── 1402a While displaying the first selectable option in the three-dimensional environment, receive, via the one or more input devices, an input directed to the first selectable option ──── 1402b In response to receiving the input directed to the first selectable option, display, via the display generation component and in the three-dimensional environment, the representation of content from the second computer system ──── 1402c While displaying the representation of the content from the second computer system in the three dimensional environment, detect, via the one or more input devices, one or more inputs directed to the representation of content from the second computer system ──── 1402d In response to detecting the one or more inputs directed to the representation of content from the second computer system, perform one or more operations corresponding to the one or more inputs with respect to the content from the second computer system ──── 1402e

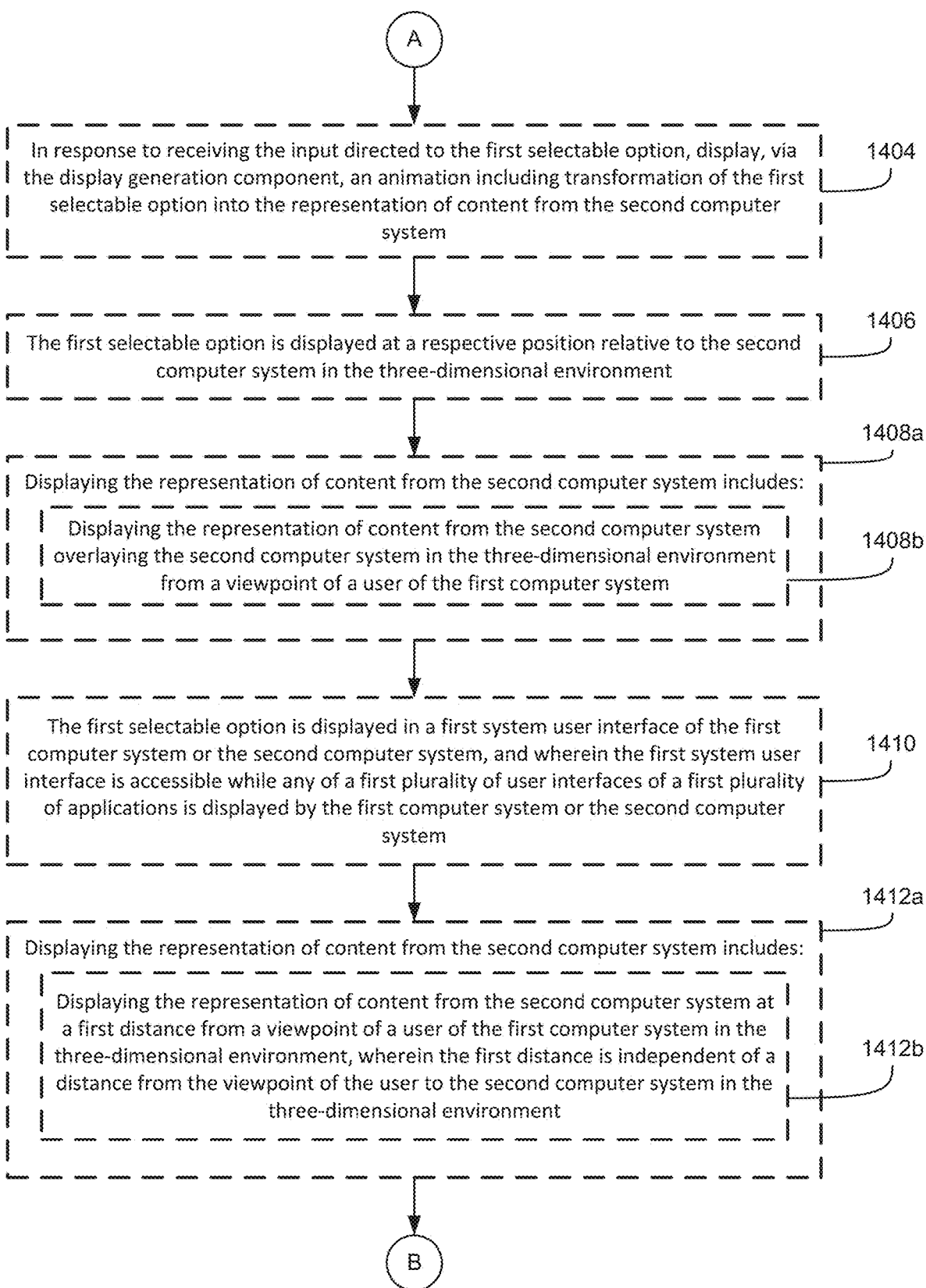

A

In response to receiving the input directed to the first selectable option, display, via the display generation component, an animation including transformation of the first selectable option into the representation of content from the second computer system    1404

The first selectable option is displayed at a respective position relative to the second computer system in the three-dimensional environment    1406

Displaying the representation of content from the second computer system includes:    1408a Displaying the representation of content from the second computer system overlaying the second computer system in the three-dimensional environment from a viewpoint of a user of the first computer system    1408b The first selectable option is displayed in a first system user interface of the first computer system or the second computer system, and wherein the first system user interface is accessible while any of a first plurality of user interfaces of a first plurality of applications is displayed by the first computer system or the second computer system    1410

Displaying the representation of content from the second computer system includes:    1412a Displaying the representation of content from the second computer system at a first distance from a viewpoint of a user of the first computer system in the three-dimensional environment, wherein the first distance is independent of a distance from the viewpoint of the user to the second computer system in the three-dimensional environment    1412b

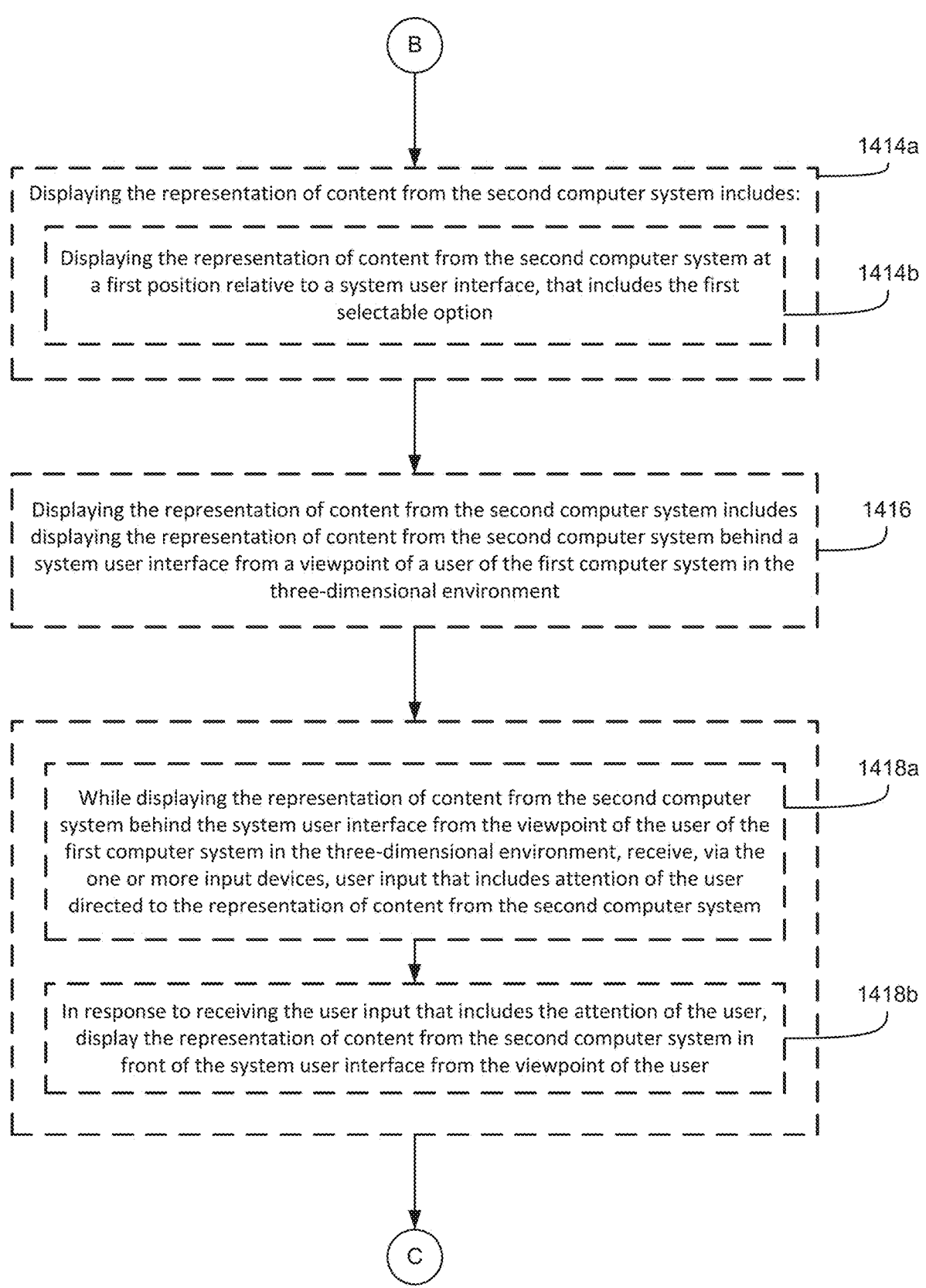

B

Displaying the representation of content from the second computer system includes:          1414a Displaying the representation of content from the second computer system at a first position relative to a system user interface, that includes the first selectable option          1414b Displaying the representation of content from the second computer system includes displaying the representation of content from the second computer system behind a system user interface from a viewpoint of a user of the first computer system in the three-dimensional environment          1416

While displaying the representation of content from the second computer system behind the system user interface from the viewpoint of the user of the first computer system in the three-dimensional environment, receive, via the one or more input devices, user input that includes attention of the user directed to the representation of content from the second computer system          1418a In response to receiving the user input that includes the attention of the user, display the representation of content from the second computer system in front of the system user interface from the viewpoint of the user          1418b

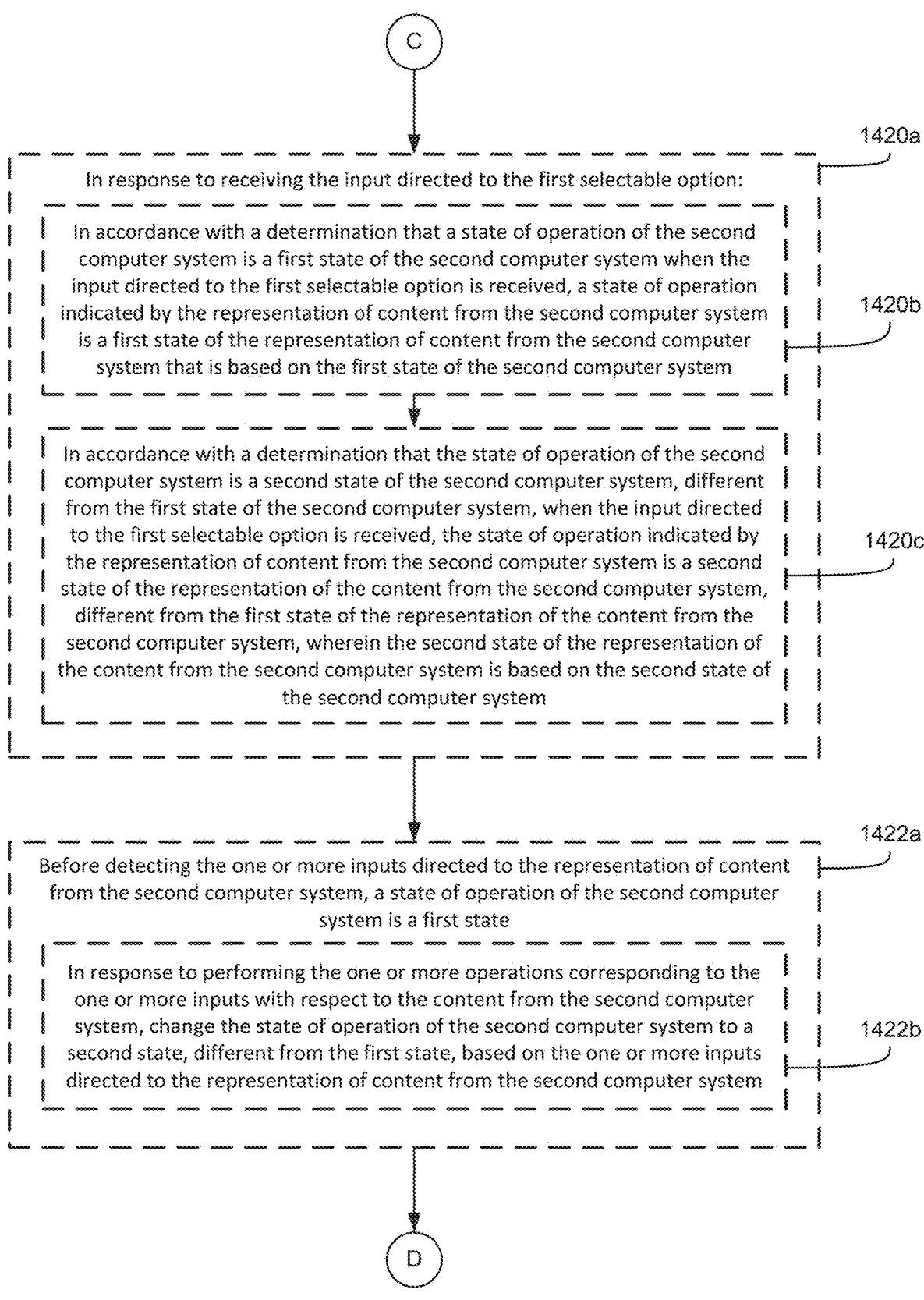

C

In response to receiving the input directed to the first selectable option:

In accordance with a determination that a state of operation of the second computer system is a first state of the second computer system when the input directed to the first selectable option is received, a state of operation indicated by the representation of content from the second computer system is a first state of the representation of content from the second computer system that is based on the first state of the second computer system In accordance with a determination that the state of operation of the second computer system is a second state of the second computer system, different from the first state of the second computer system, when the input directed to the first selectable option is received, the state of operation indicated by the representation of content from the second computer system is a second state of the representation of the content from the second computer system, different from the first state of the representation of the content from the second computer system, wherein the second state of the representation of the content from the second computer system is based on the second state of the second computer system Before detecting the one or more inputs directed to the representation of content from the second computer system, a state of operation of the second computer system is a first state In response to performing the one or more operations corresponding to the one or more inputs with respect to the content from the second computer system, change the state of operation of the second computer system to a second state, different from the first state, based on the one or more inputs directed to the representation of content from the second computer system 1420a 1420b 1420c 1422a 1422b

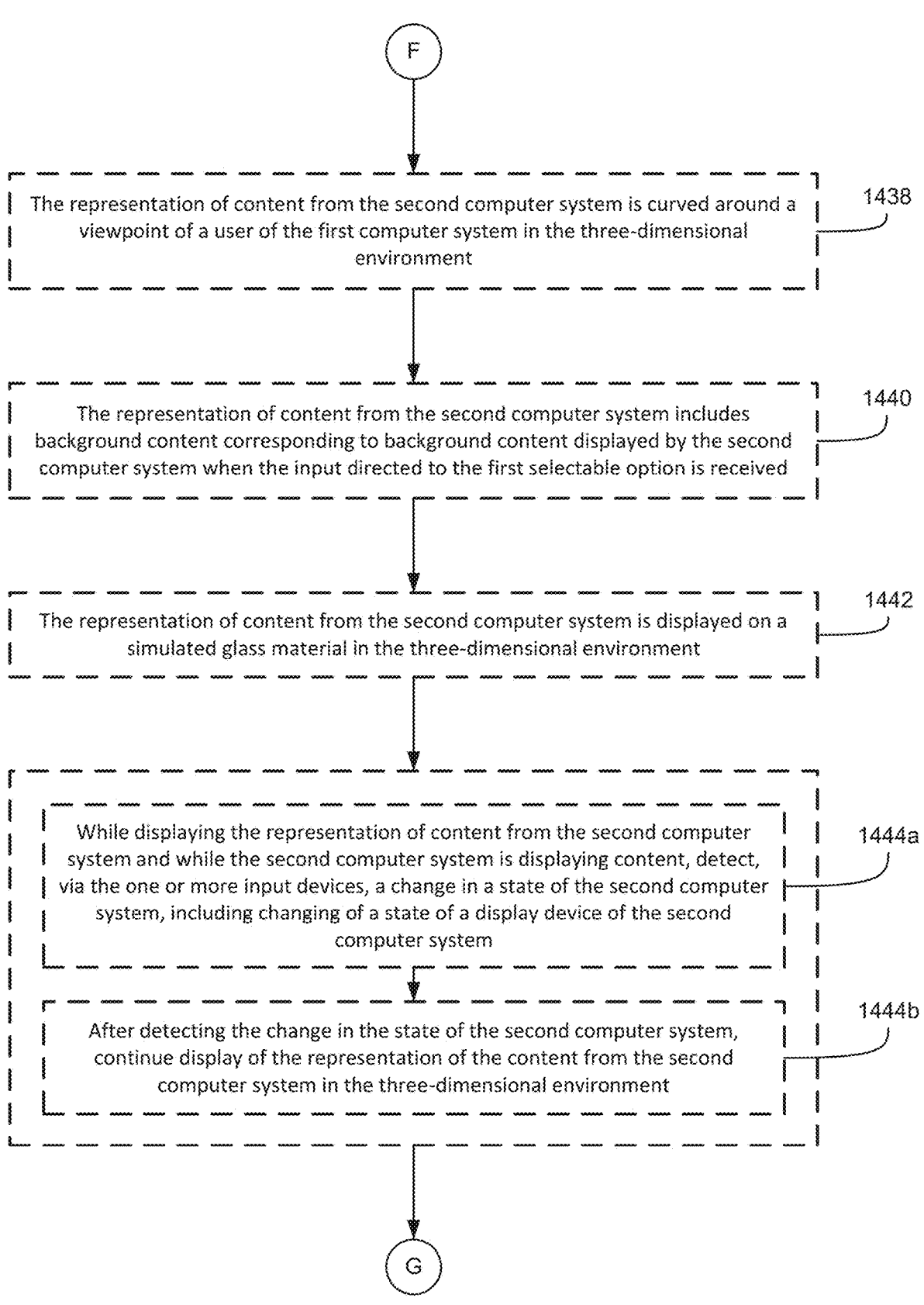

F

The representation of content from the second computer system is curved around a viewpoint of a user of the first computer system in the three-dimensional environment — 1438

The representation of content from the second computer system includes background content corresponding to background content displayed by the second computer system when the input directed to the first selectable option is received — 1440

The representation of content from the second computer system is displayed on a simulated glass material in the three-dimensional environment — 1442

While displaying the representation of content from the second computer system and while the second computer system is displaying content, detect, via the one or more input devices, a change in a state of the second computer system, including changing of a state of a display device of the second computer system — 1444a After detecting the change in the state of the second computer system, continue display of the representation of the content from the second computer system in the three-dimensional environment — 1444b

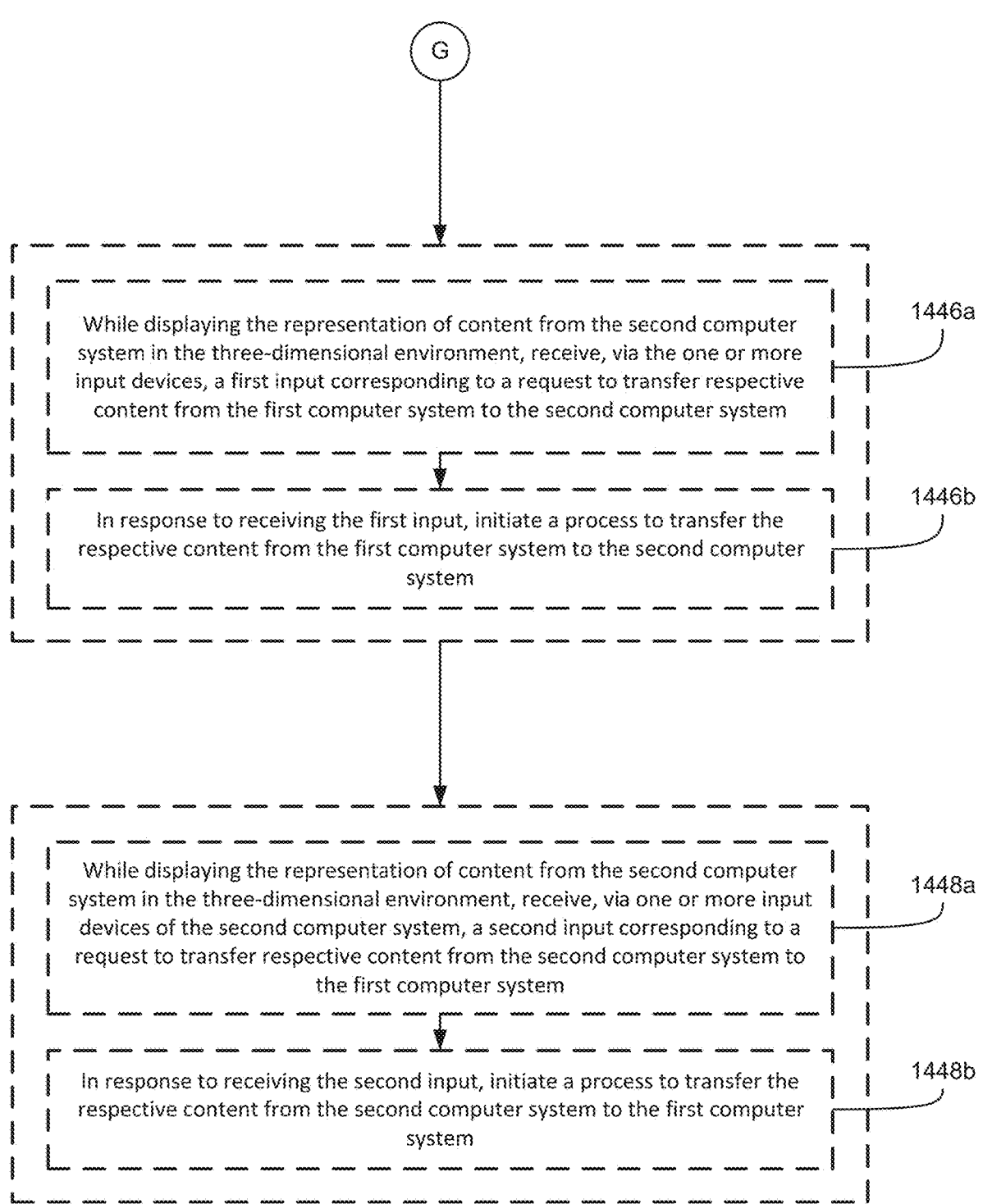

G

While displaying the representation of content from the second computer system in the three-dimensional environment, receive, via the one or more input devices, a first input corresponding to a request to transfer respective content from the first computer system to the second computer system 1446a In response to receiving the first input, initiate a process to transfer the respective content from the first computer system to the second computer system 1446b While displaying the representation of content from the second computer system in the three-dimensional environment, receive, via one or more input devices of the second computer system, a second input corresponding to a request to transfer respective content from the second computer system to the first computer system 1448a In response to receiving the second input, initiate a process to transfer the respective content from the second computer system to the first computer system 1448b

FIG. 14H

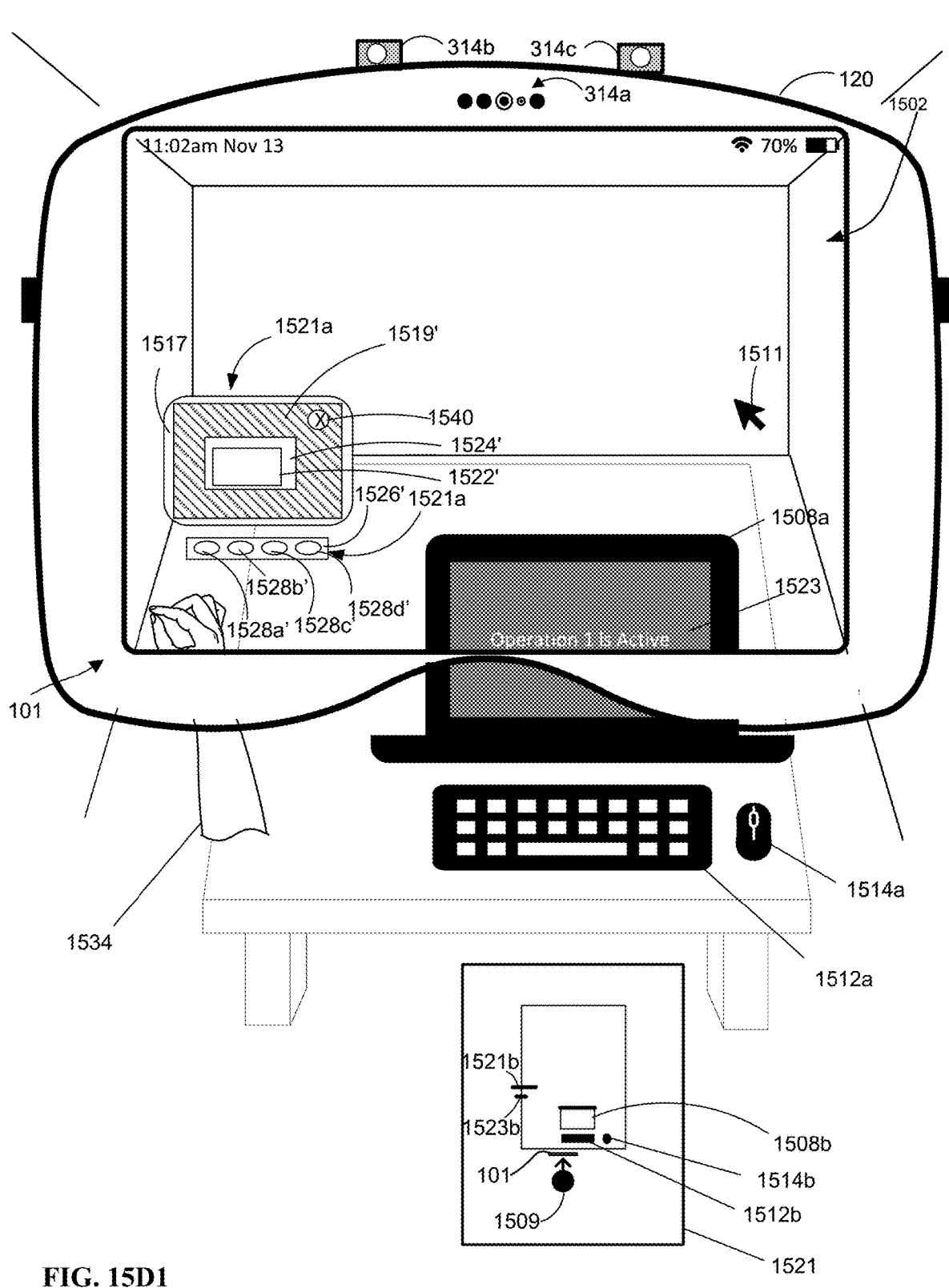
FIG. 15D1

1600

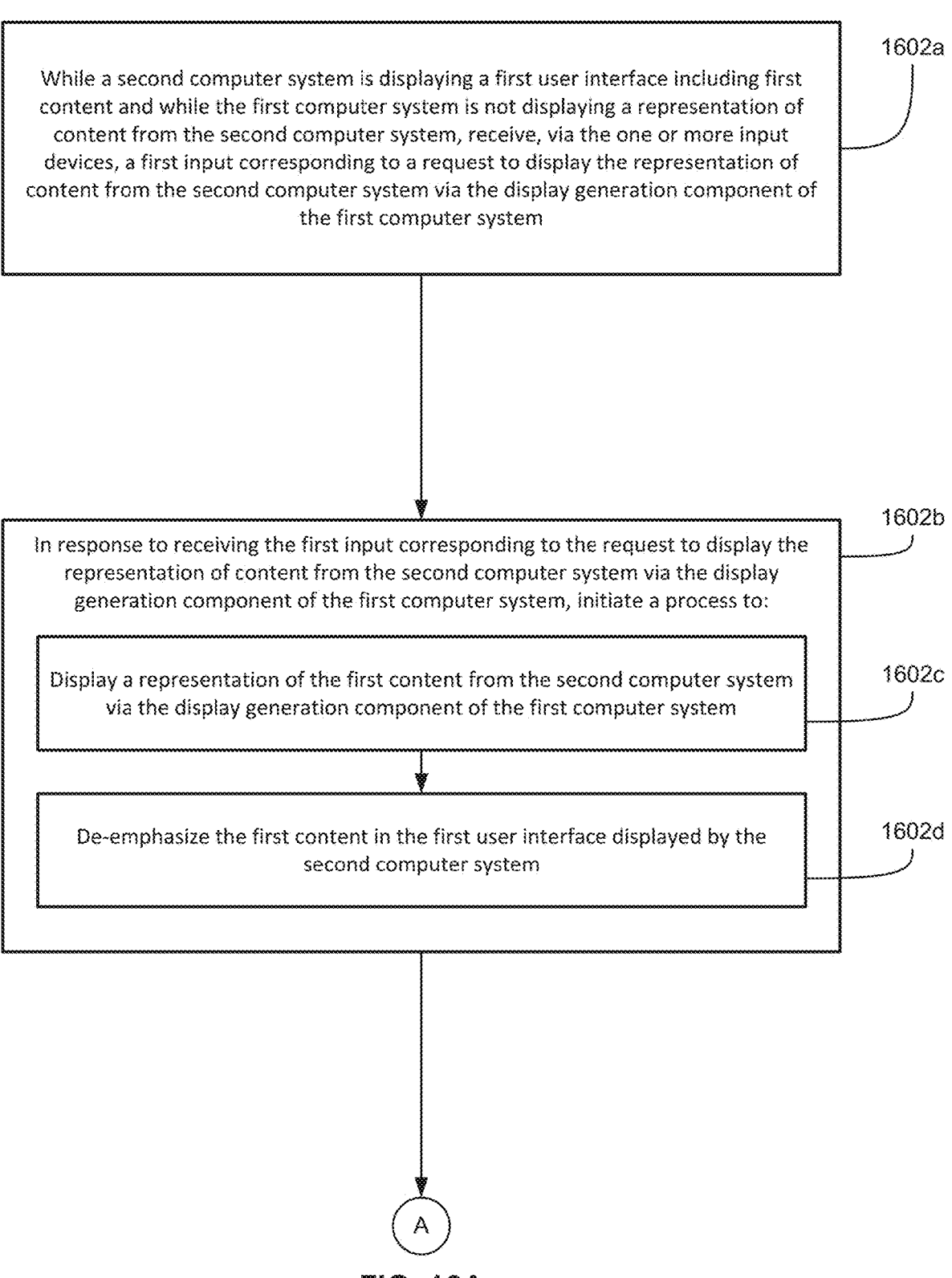

While a second computer system is displaying a first user interface including first content and while the first computer system is not displaying a representation of content from the second computer system, receive, via the one or more input devices, a first input corresponding to a request to display the representation of content from the second computer system via the display generation component of the first computer system 1602a In response to receiving the first input corresponding to the request to display the representation of content from the second computer system via the display generation component of the first computer system, initiate a process to:

1602b

Display a representation of the first content from the second computer system via the display generation component of the first computer system 1602c De-emphasize the first content in the first user interface displayed by the second computer system 1602d

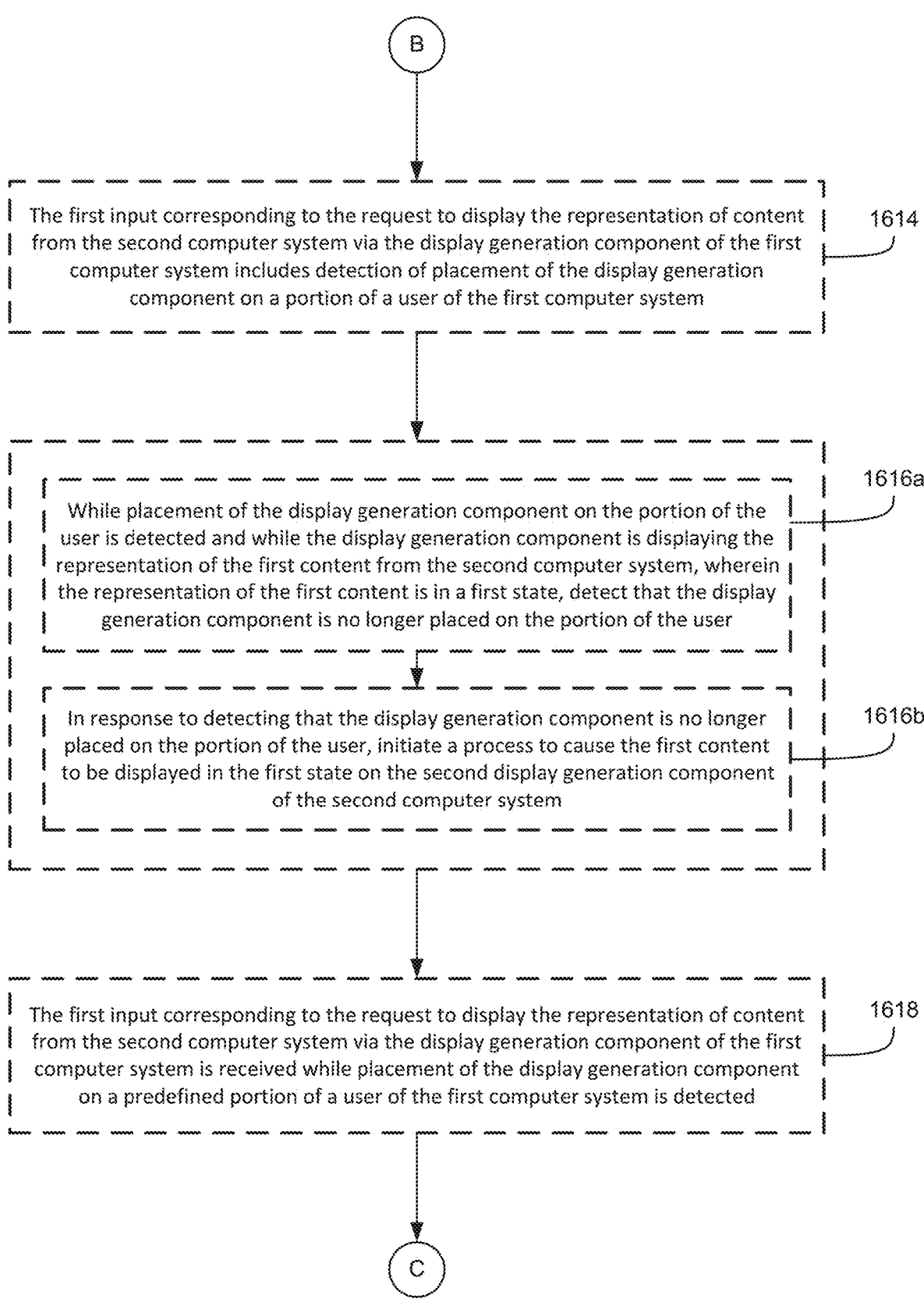

B

The first input corresponding to the request to display the representation of content from the second computer system via the display generation component of the first computer system includes detection of placement of the display generation component on a portion of a user of the first computer system          1614

While placement of the display generation component on the portion of the user is detected and while the display generation component is displaying the representation of the first content from the second computer system, wherein the representation of the first content is in a first state, detect that the display generation component is no longer placed on the portion of the user          1616a In response to detecting that the display generation component is no longer placed on the portion of the user, initiate a process to cause the first content to be displayed in the first state on the second display generation component of the second computer system          1616b The first input corresponding to the request to display the representation of content from the second computer system via the display generation component of the first computer system is received while placement of the display generation component on a predefined portion of a user of the first computer system is detected          1618

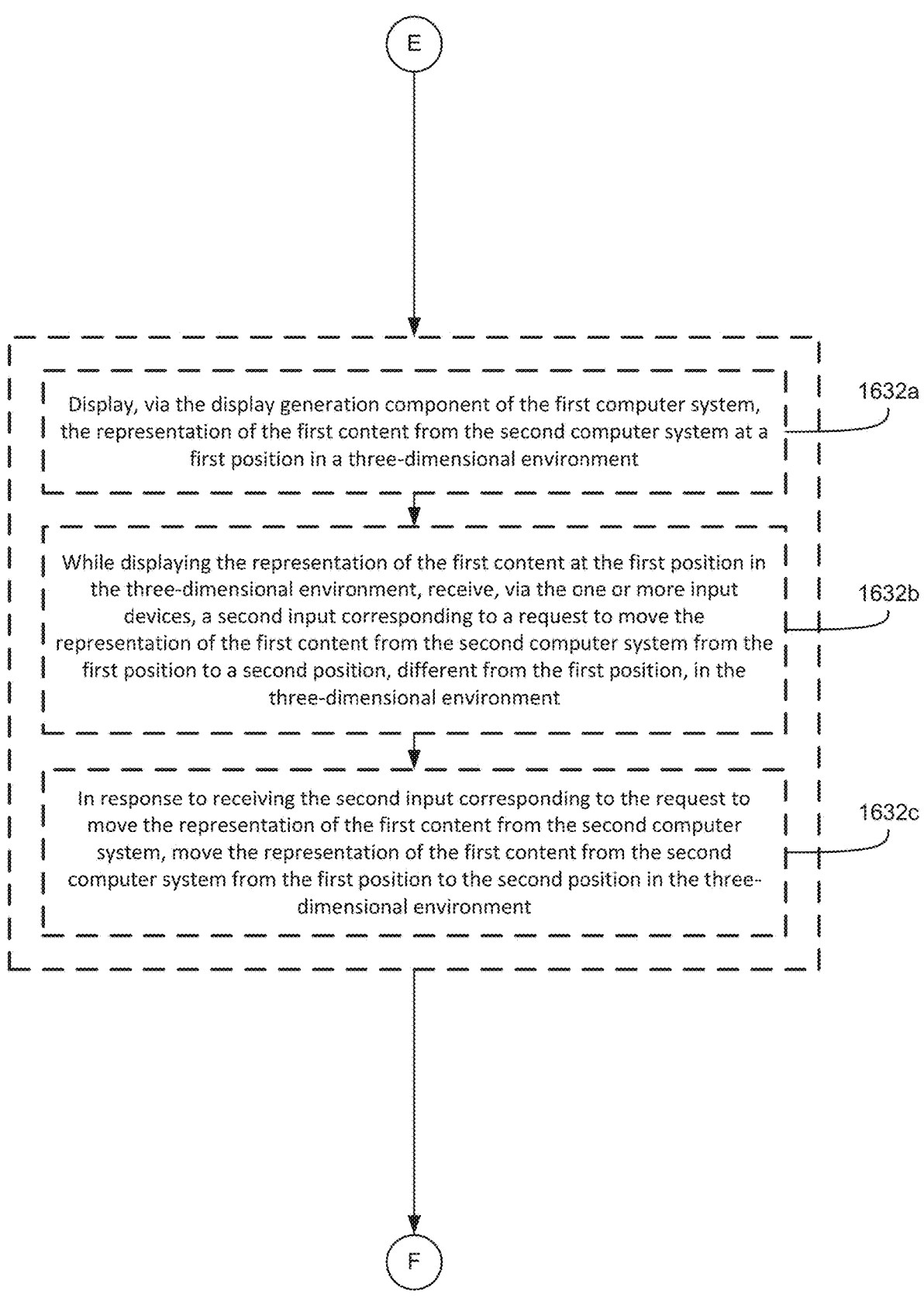

E

Display, via the display generation component of the first computer system, the representation of the first content from the second computer system at a first position in a three-dimensional environment 1632a While displaying the representation of the first content at the first position in the three-dimensional environment, receive, via the one or more input devices, a second input corresponding to a request to move the representation of the first content from the second computer system from the first position to a second position, different from the first position, in the three-dimensional environment 1632b In response to receiving the second input corresponding to the request to move the representation of the first content from the second computer system, move the representation of the first content from the second computer system from the first position to the second position in the three-dimensional environment 1632c

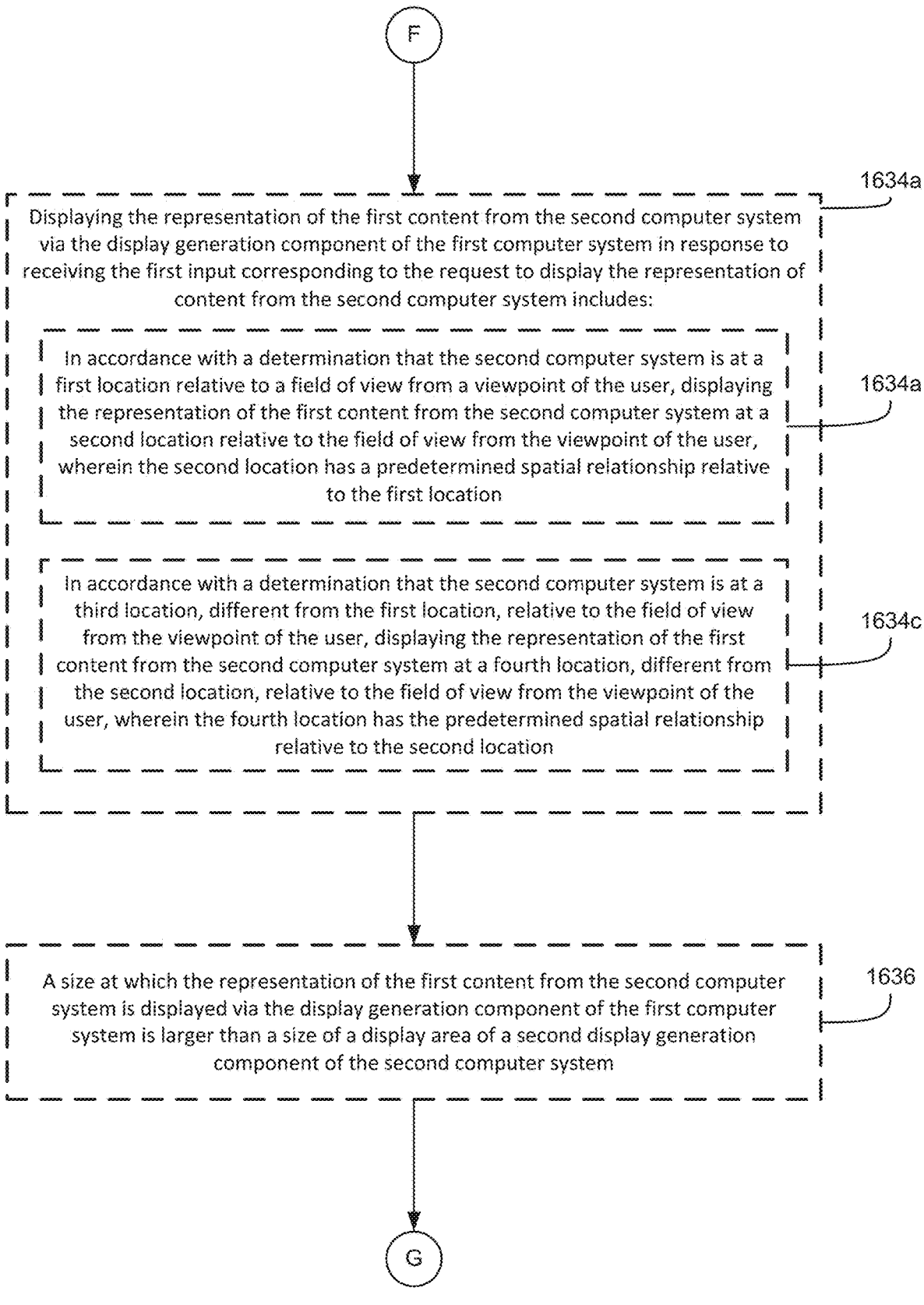

F

Displaying the representation of the first content from the second computer system via the display generation component of the first computer system in response to receiving the first input corresponding to the request to display the representation of content from the second computer system includes:

1634a

In accordance with a determination that the second computer system is at a first location relative to a field of view from a viewpoint of the user, displaying the representation of the first content from the second computer system at a second location relative to the field of view from the viewpoint of the user, wherein the second location has a predetermined spatial relationship relative to the first location 1634a In accordance with a determination that the second computer system is at a third location, different from the first location, relative to the field of view from the viewpoint of the user, displaying the representation of the first content from the second computer system at a fourth location, different from the second location, relative to the field of view from the viewpoint of the user, wherein the fourth location has the predetermined spatial relationship relative to the second location 1634c A size at which the representation of the first content from the second computer system is displayed via the display generation component of the first computer system is larger than a size of a display area of a second display generation component of the second computer system

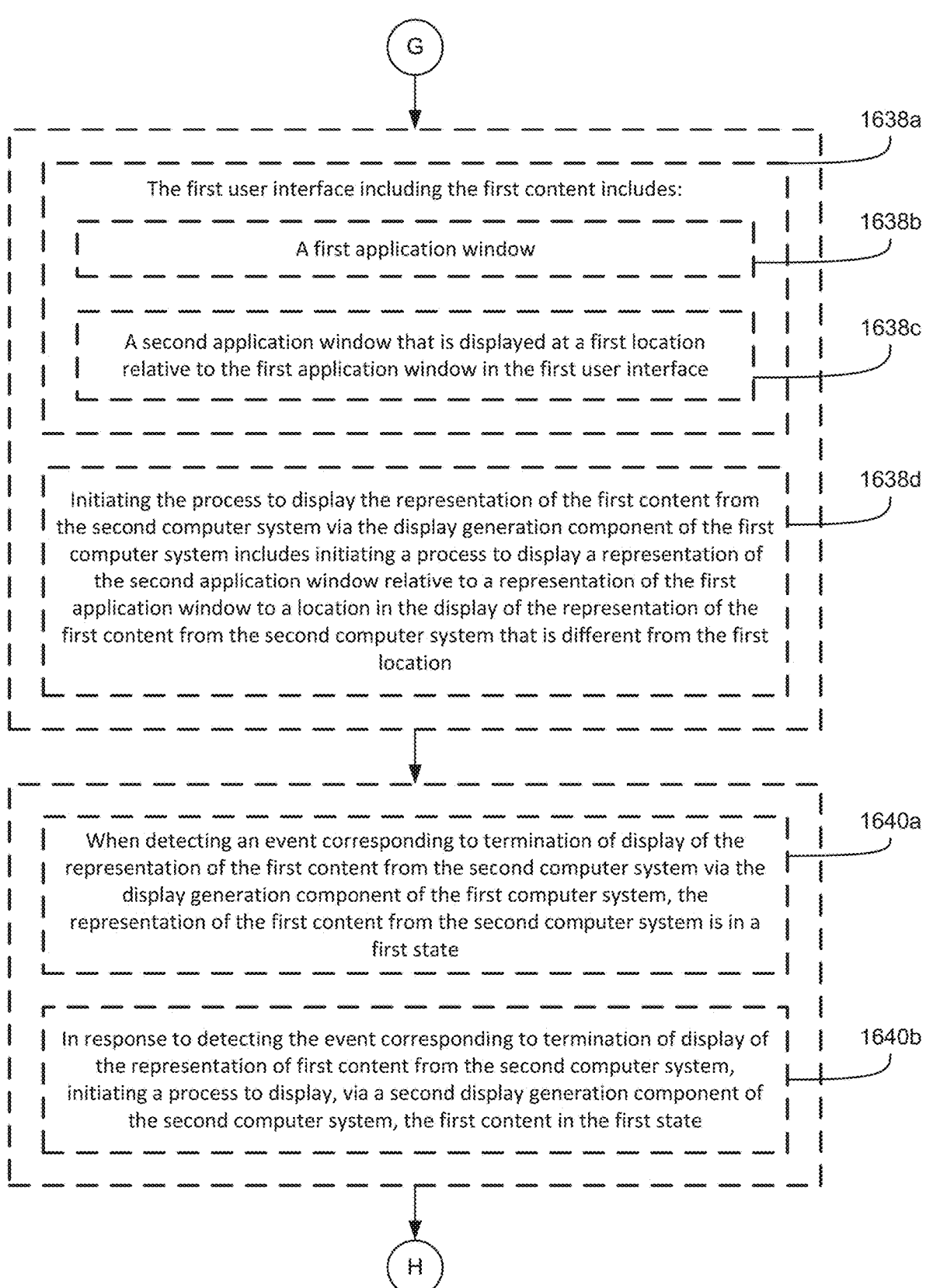

G

1638a

The first user interface including the first content includes:

1638b

A first application window

1638c

A second application window that is displayed at a first location relative to the first application window in the first user interface

1638d

Initiating the process to display the representation of the first content from the second computer system via the display generation component of the first computer system includes initiating a process to display a representation of the second application window relative to a representation of the first application window to a location in the display of the representation of the first content from the second computer system that is different from the first location

1640a

When detecting an event corresponding to termination of display of the representation of the first content from the second computer system via the display generation component of the first computer system, the representation of the first content from the second computer system is in a first state

1640b

In response to detecting the event corresponding to termination of display of the representation of first content from the second computer system, initiating a process to display, via a second display generation component of the second computer system, the first content in the first state

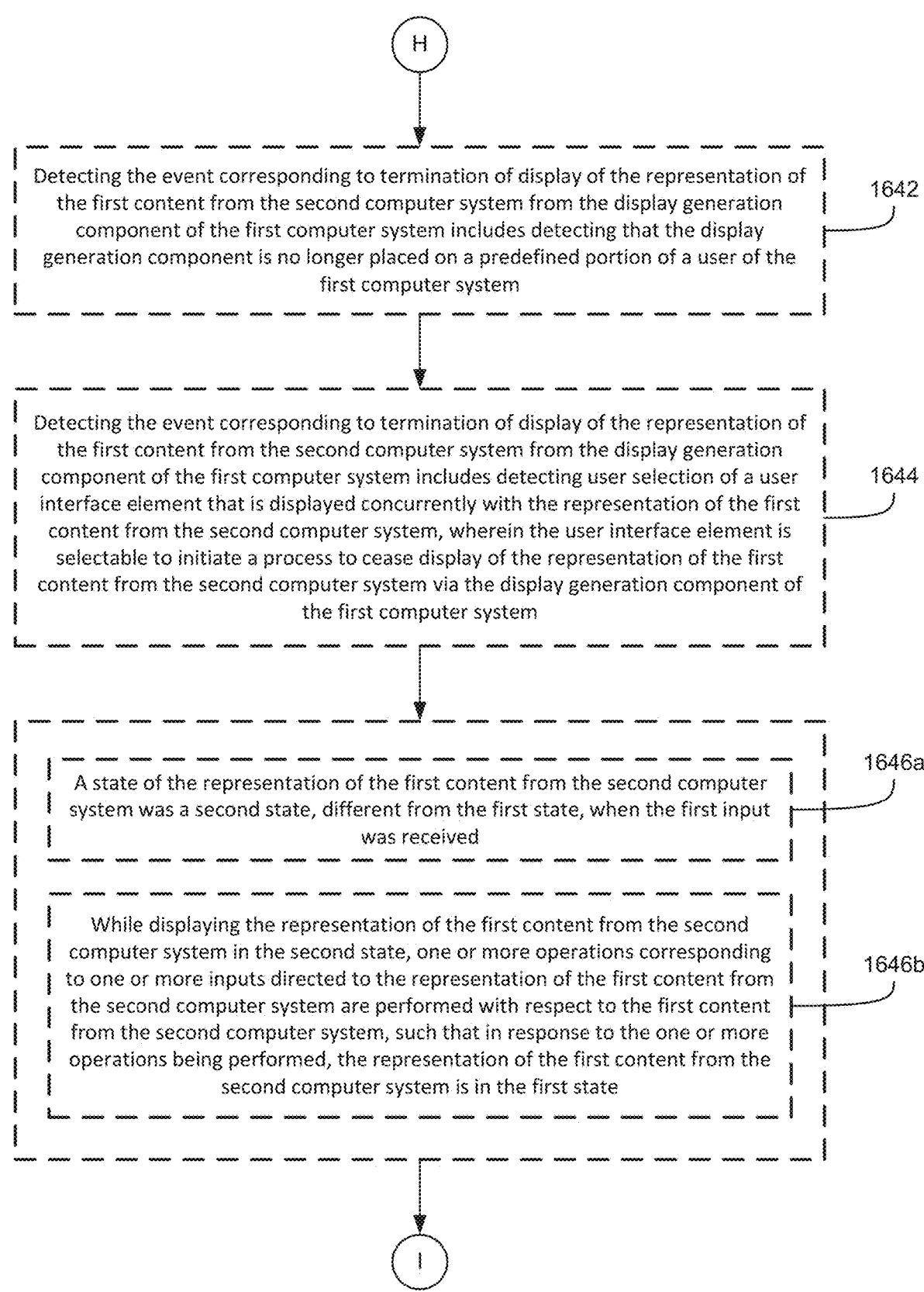

(H)

Detecting the event corresponding to termination of display of the representation of the first content from the second computer system from the display generation component of the first computer system includes detecting that the display generation component is no longer placed on a predefined portion of a user of the first computer system

1642

Detecting the event corresponding to termination of display of the representation of the first content from the second computer system from the display generation component of the first computer system includes detecting user selection of a user interface element that is displayed concurrently with the representation of the first content from the second computer system, wherein the user interface element is selectable to initiate a process to cease display of the representation of the first content from the second computer system via the display generation component of the first computer system

1644

A state of the representation of the first content from the second computer system was a second state, different from the first state, when the first input was received 1646a While displaying the representation of the first content from the second computer system in the second state, one or more operations corresponding to one or more inputs directed to the representation of the first content from the second computer system are performed with respect to the first content from the second computer system, such that in response to the one or more operations being performed, the representation of the first content from the second computer system is in the first state 1646b (I)

FIG. 16I

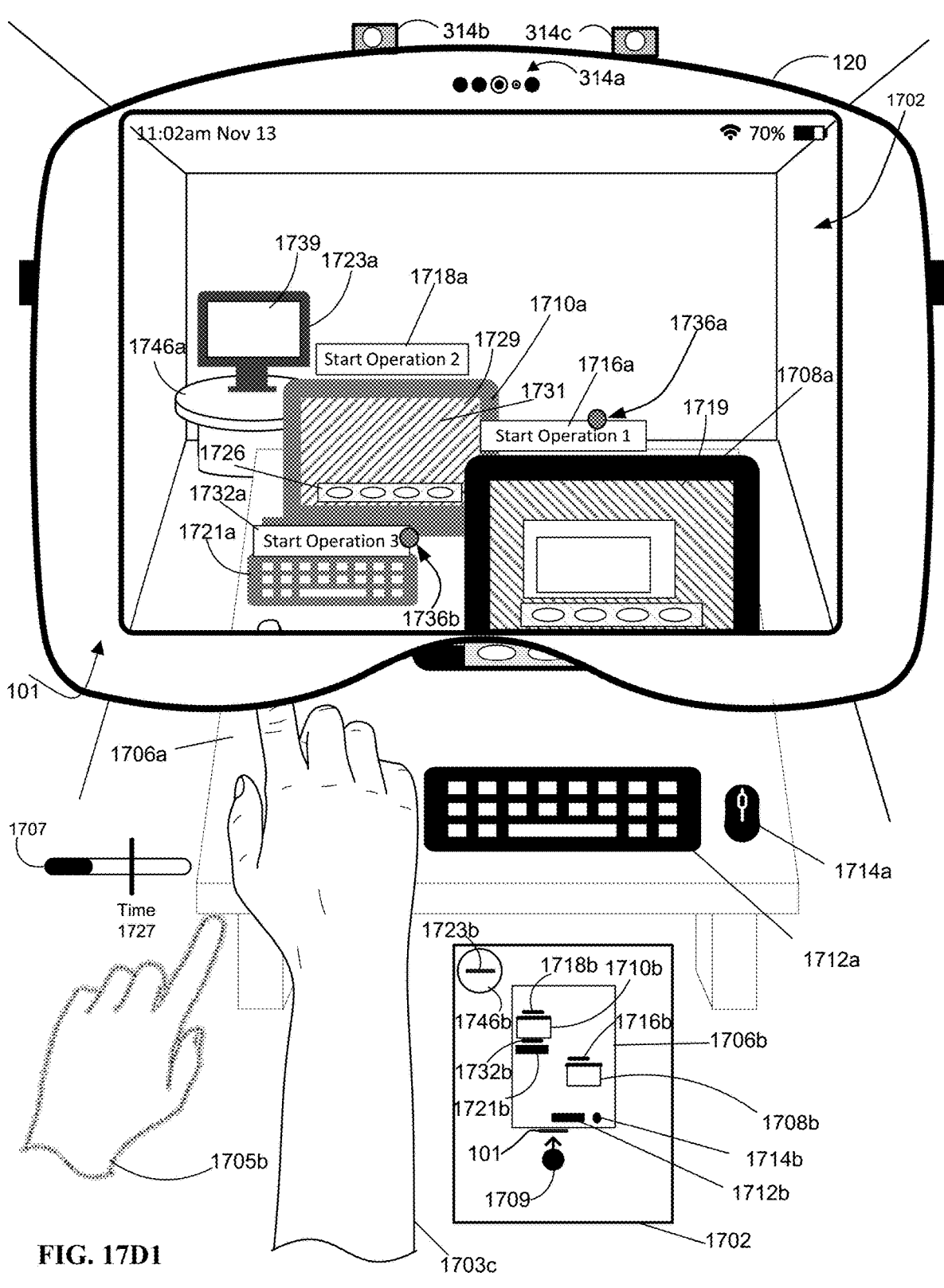
FIG. 17D1

1800

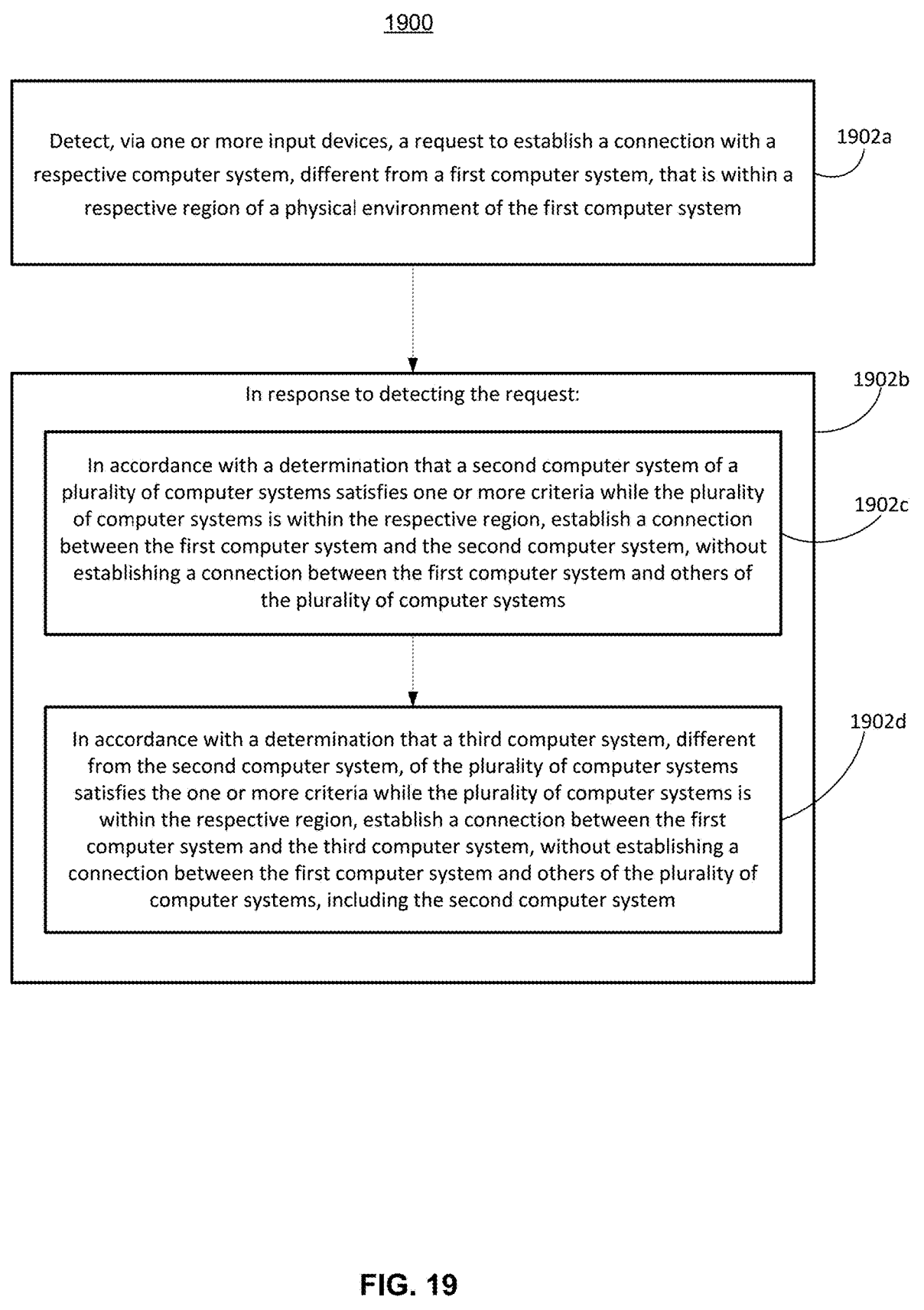

1900

Detect, via one or more input devices, a request to establish a connection with a respective computer system, different from a first computer system, that is within a respective region of a physical environment of the first computer system    1902a In response to detecting the request:    1902b In accordance with a determination that a second computer system of a plurality of computer systems satisfies one or more criteria while the plurality of computer systems is within the respective region, establish a connection between the first computer system and the second computer system, without establishing a connection between the first computer system and others of the plurality of computer systems    1902c In accordance with a determination that a third computer system, different from the second computer system, of the plurality of computer systems satisfies the one or more criteria while the plurality of computer systems is within the respective region, establish a connection between the first computer system and the third computer system, without establishing a connection between the first computer system and others of the plurality of computer systems, including the second computer system    1902d

FIG. 19

METHODS FOR CONTROLLING AND INTERACTING WITH A THREE-DIMENSIONAL ENVIRONMENT

CROSS REFERENCE TO RELATED APPLICATIONS

This application claims the benefit of U.S. Provisional Application No. 63/377,028, filed Sep. 24, 2022, U.S. Provisional Application No. 63/505,690, filed Jun. 1, 2023, and U.S. Provisional Application No. 63/506,042, filed Jun. 2, 2023, the contents of which are herein incorporated by reference in their entireties for all purposes.

TECHNICAL FIELD

This relates generally to computer systems that provide computer-generated experiences, including, but no limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays an immersion control element for controlling a level of immersion at which the computer system displays virtual content. In some embodiments, a computer system displays a volume control element for controlling a volume level of a virtual environment and/or and for controlling a volume level of a user interface of an application. In some embodiments, a computer system displays a focus mode control element that is selectable to permit or restrict reducing a prominence of at least a portion of virtual content relative to at least a portion of a physical environment. In some embodiments, a computer system displays an option that is selectable to cause initiation of display of a representation of content from a second computer system via a display generation component of the computer system. In some embodiments, while a second computer system is displaying content, a first computer system detects an input corresponding to a request to display a representation of the content from a second computer system via a display generation component of the first computer system, and in response, initiates a process to display the representation of content from the second computer system and to de-emphasize the content displayed by the second computer system. In some embodiments, a first computer system facilitates disambiguation of a second computer system from a plurality of computer systems for display of a representation of content from the second computer system.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8I is a flowchart illustrating an exemplary method of facilitating immersion control for a virtual environment in accordance with some embodiments.

FIGS. 10A-10G is a flowchart illustrating a method of controlling audio settings of a virtual environment in accordance with some embodiments.

FIGS. 12A-12J is a flowchart illustrating a method of controlling breakthrough settings of a computer system that displays, via a display generation component, a three-dimensional environment in accordance with some embodiments.

FIGS. 14A-14H is a flowchart illustrating a method of facilitating display of a representation of content from a second computer system in a three-dimensional environment in accordance with some embodiments.

FIGS. 16A-16J is a flowchart illustrating a method of facilitating initiation of a virtual computer experience in a three-dimensional environment in accordance with some embodiments.

FIG. 19 is a flowchart illustrating a method of facilitating disambiguation of a second computer system from a plurality of computer systems for display of a representation of content from the second computer system in a three-dimensional environment in accordance with some embodiments.

DESCRIPTION OF EMBODIMENTS

Figure 1B:
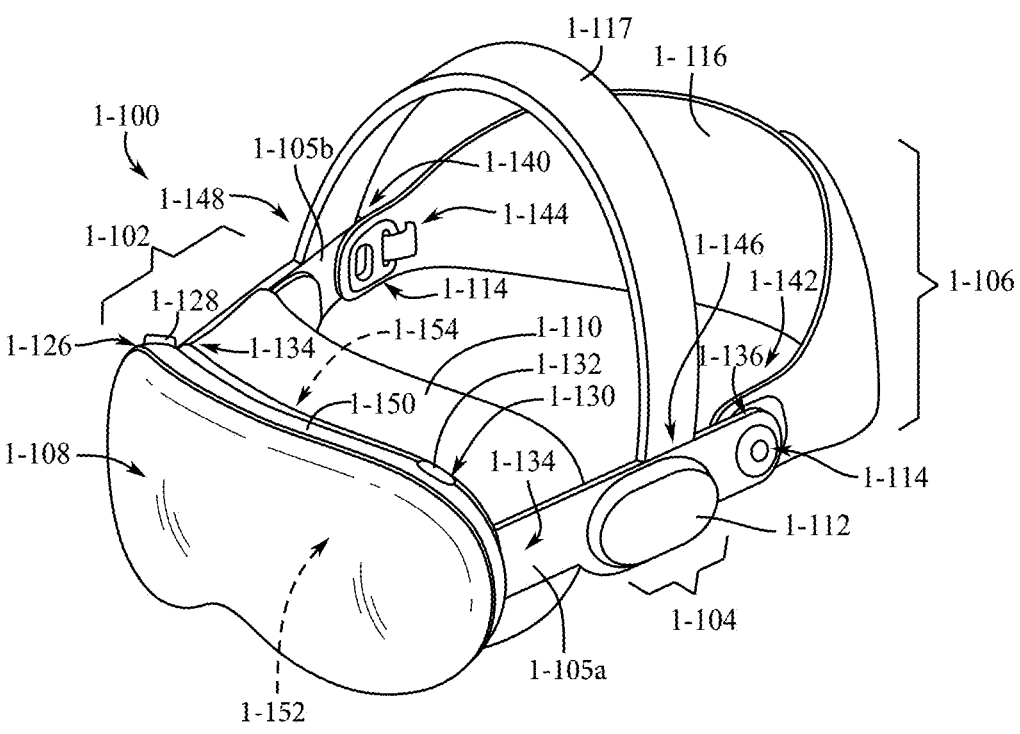
FIGS. 1B-1P are examples of a computer system for providing XR experiences in the operating environment of FIG. 1A.

The present disclosure relates to user interfaces for providing a computer generated (CGR) experience to a user, in accordance with some embodiments.

The systems, methods, and GUIs described herein provide improved ways for an electronic device to facilitate interaction with and manipulate objects in a three-dimensional environment.

In some embodiments, a computer system displays an immersion control element for controlling a level of immersion at which the computer system displays virtual content. The level of immersion at which the computer system displays the virtual content can increase and/or decrease in accordance with input directed to the immersion control element.

In some embodiments, a computer system displays a volume control element for controlling a volume level of a virtual environment and/or and for controlling a volume level of a user interface of an application. The volume level of the virtual environment and/or the user interface of the application can increase and/or decrease in accordance with input directed to the volume control element.

In some embodiments, a computer system displays a focus mode control element that is selectable to permit or restrict reducing a prominence of at least a portion of virtual content relative to at least a portion of a physical environment. In response to selection of the focus mode control element, a mode of operation of the computer system can be changed. For example, in a first mode of operation of the computer system, reducing a prominence of at least a portion of virtual content relative to at least a portion of a physical environment in response to a first event satisfying of one or more first criteria is optionally performed. In a second mode of operation of the computer system, reducing a prominence of at least a portion of virtual content relative to at least a portion of a physical environment in response to a second event satisfying one or more second criteria is optionally not performed.

In some embodiments, a computer system displays an option that is selectable to cause initiation of display of a representation of content from a second computer system via a display generation component of the computer system. In response to selection of the option, display of a representation of content from a second computer system via a display generation component of the computer system is optionally initiated and operations can be performed on the representation of content from the second computer system.

In some embodiments, while a second computer system is displaying content, a first computer system detects an input corresponding to a request to display a representation of the content from a second computer system via a display generation component of the first computer system, and in response, initiates a process to display the representation of content from the second computer system and to de-emphasize the content displayed by the second computer system. De-emphasizing the content displayed by the second computer system optionally includes displaying different content or ceasing display of any content from display by the second computer system.

In some embodiments, a first computer system visually detects, via one or more cameras, a second computer system in a physical environment that corresponds to a three-dimensional environment that is visible via the display generation component. In some embodiments, in response to visually detecting the second computer system, in accordance with a determination that the second computer system satisfies one or more connection criteria, the first computer system displays, in the three-dimensional environment, a first selectable option that is selectable to initiate a process to establish a connection between the first computer system and the second computer system. In some embodiments, in accordance with a determination that the second computer system does not satisfy the one or more connection criteria, the first computer system forgoes displaying the first selectable option in the three-dimensional environment.

In some embodiments, a first computer system detects, via one or more input devices, a request to establish a connection with a respective computer system, different from the first computer system, that is within a respective region of a physical environment of the first computer system. In some embodiments, in response to detecting the request, in accordance with a determination that a second computer system of a plurality of computer systems satisfies one or more criteria while the plurality of computer systems is within the respective region, the first computer system establishes a connection between the first computer system and the second computer system, without establishing a connection between the first computer system and others of the plurality of computer systems. In some embodiments, in accordance with a determination that a third computer system, different from the second computer system, of the plurality of computer systems satisfies the one or more criteria while the plurality of computer systems is within the respective region, the first computer system establishes a connection between the first computer system and the third computer system, without establishing a connection between the first computer system and others of the plurality of computer systems, including the second computer system.

FIGS. 1A-6 provide a description of example computer systems for providing XR experiences to users (such as described below with respect to methods 800, 1000, 1200, 1400, 1600, 1800, and/or 1900). FIGS. 7A-7H illustrate examples of a computer system facilitating immersion control for a virtual environment in accordance with some embodiments. FIGS. 8A-8I is a flowchart illustrating an exemplary method of facilitating immersion control for a virtual environment in accordance with some embodiments. The user interfaces in FIGS. 7A-7H are used to illustrate the processes in FIGS. 8A-8I. FIGS. 9A-9E illustrate examples of a computer system controlling audio settings of a virtual environment in accordance with some embodiments. FIGS. 10A-10G is a flowchart illustrating a method of controlling audio settings of a virtual environment in accordance with some embodiments. The user interfaces in FIGS. 9A-9E are used to illustrate the processes in FIGS. 10A-10G. FIGS. 11A-11F illustrate example techniques for controlling breakthrough settings of a computer system that displays, via a display generation component, a three-dimensional environment in accordance with some embodiments. FIGS. 12A-12J is a flow diagram of methods of controlling breakthrough settings of a computer system that displays, via a display generation component, a three-dimensional environment in accordance with various embodiments. The user interfaces in FIGS. 11A-11F are used to illustrate the processes in FIGS. 12A-12J. FIGS. 13A-13D illustrate example techniques for facilitating display of a representation of content from a second computer system in a three-dimensional environment in accordance with some embodiments. FIGS. 14A-14H is a flow diagram of methods of facilitating display of a representation of content from a second computer system in a three-dimensional environment in accordance with various embodiments. The user interfaces in FIGS. 13A-13D are used to illustrate the processes in FIGS. 14A-14H. FIGS. 15A-15E illustrate example techniques for facilitating initiation of a virtual computer experience in a three-dimensional environment in accordance with some embodiments. FIGS. 16A-16J is a flow diagram of methods of facilitating initiation of a virtual computer experience in a three-dimensional environment in accordance with various embodiments. The user interfaces in FIGS. 15A-15E are used to illustrate the processes in FIGS. 16A-16J. FIGS. 17A-17H illustrate example techniques for facilitating disambiguation of a second computer system from a plurality of computer systems for display of a representation of content from the second computer system in a three-dimensional environment, in accordance with some embodiments. FIG. 18 is a flow diagram of methods of facilitating disambiguation of a second computer system from a plurality of computer systems for display of a representation of content from the second computer system in a three-dimensional environment, in accordance with some embodiments. The user interfaces in FIGS. 17A-17H are used to illustrate the processes in FIG. 18. FIG. 19 is a flow diagram of methods of facilitating disambiguation of a second computer system from a plurality of computer systems for display of a representation of content from the second computer system in a three-dimensional environment, in accordance with some embodiments. The user interfaces in FIGS. 17A-17H are used to illustrate the processes in FIG. 19.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1A:
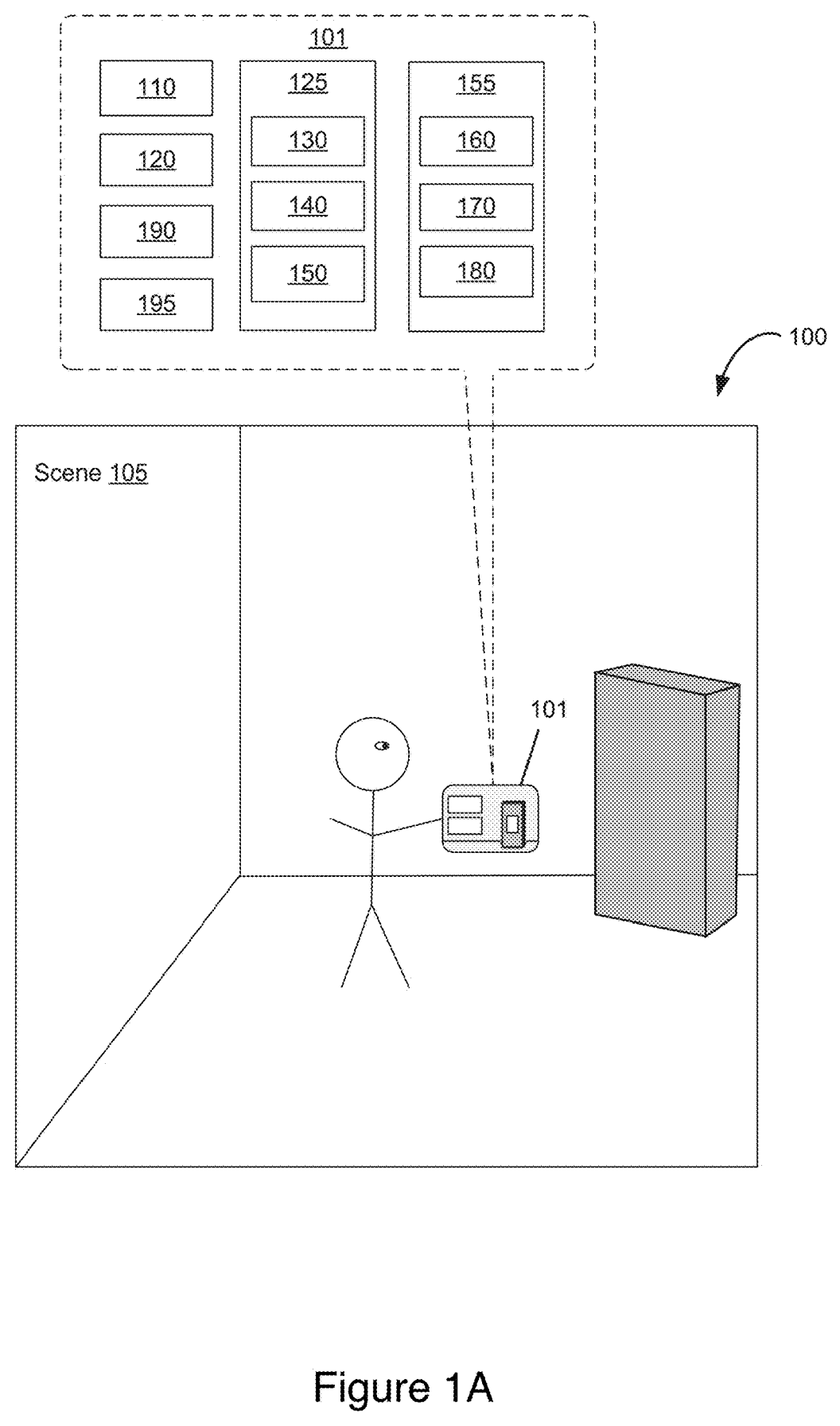
Figure 1C:
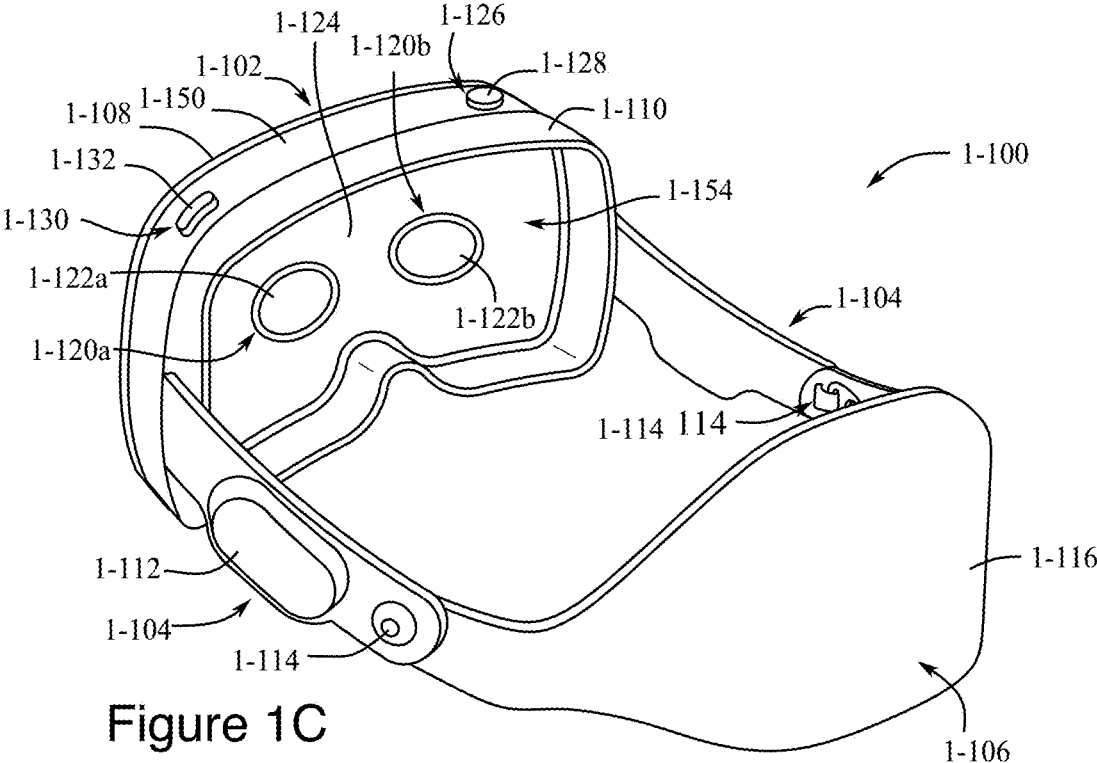
FIG. 1A is a block diagram illustrating an operating environment of a computer system for providing XR experiences in accordance with some embodiments.
Figure 1D:
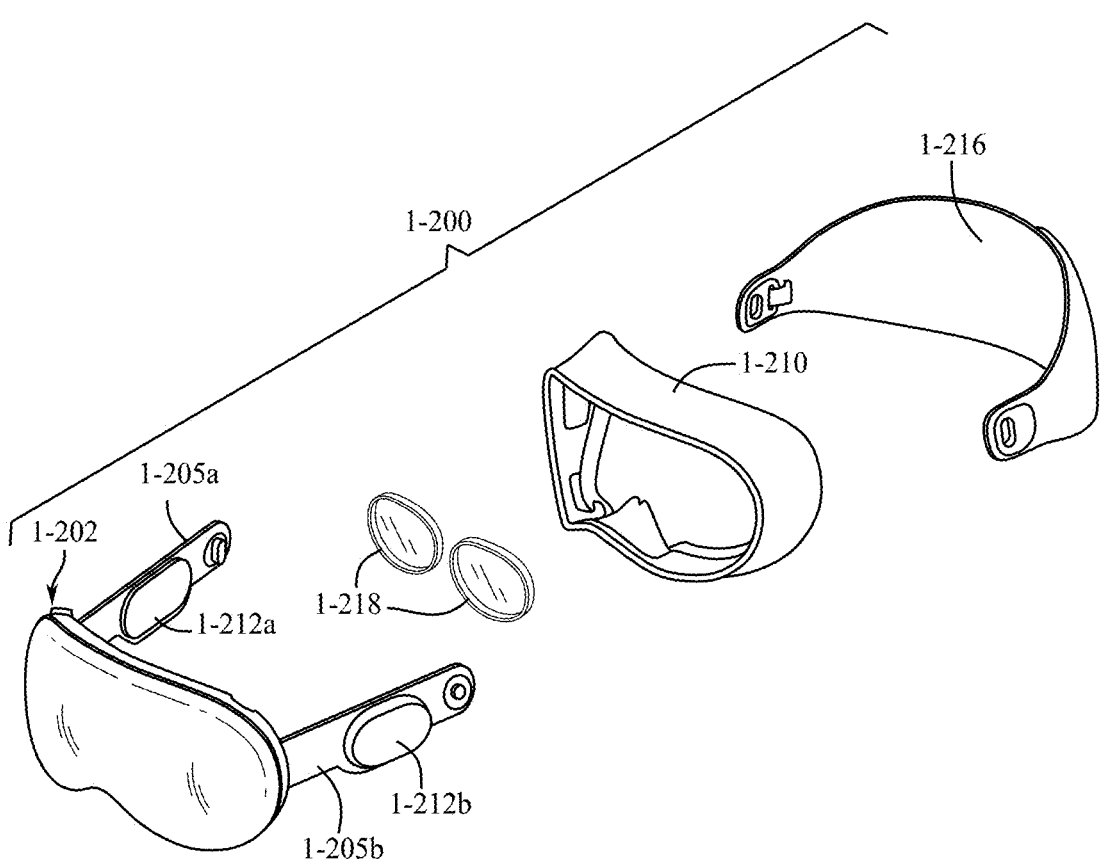
Figure 1E:
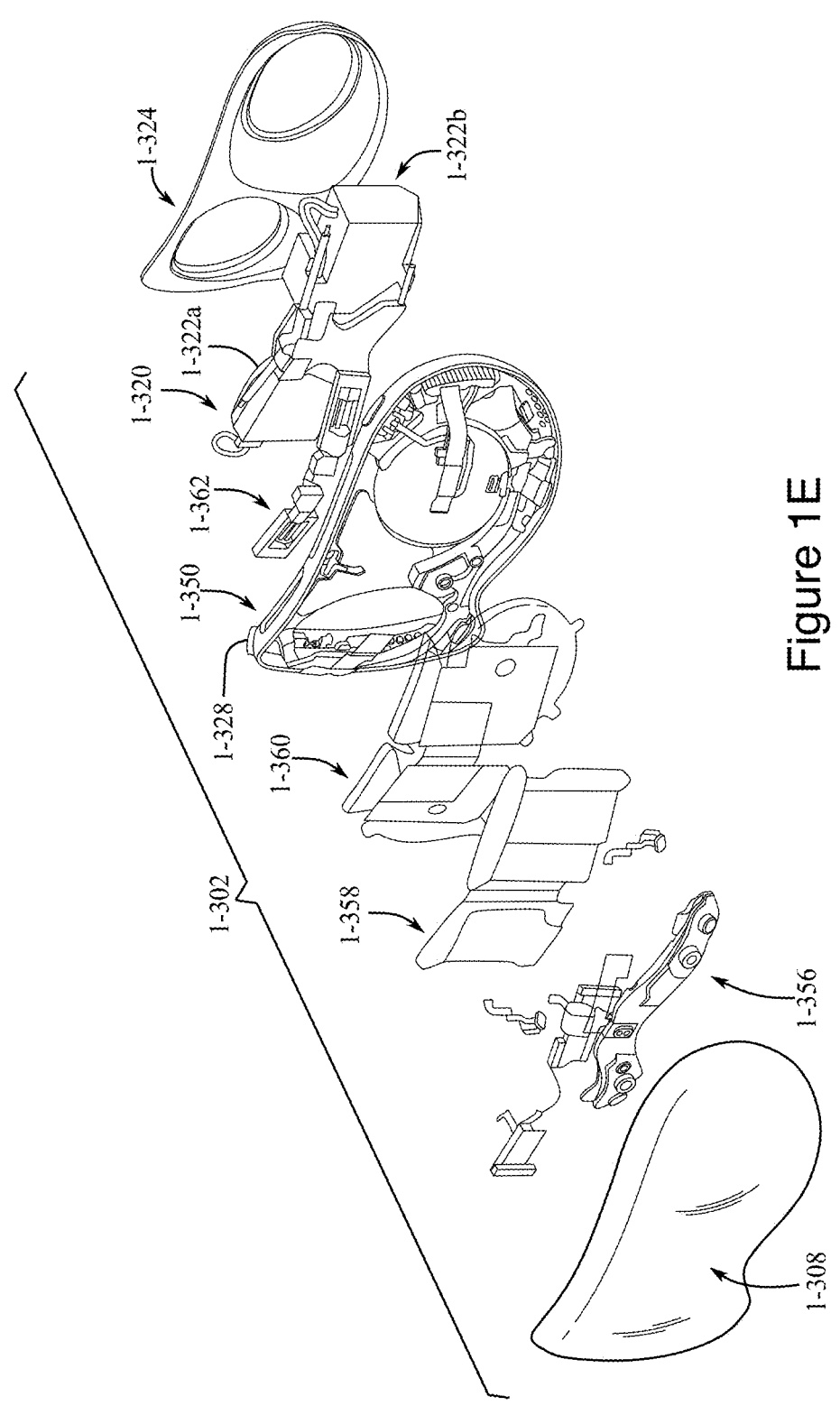
Figure 1F:
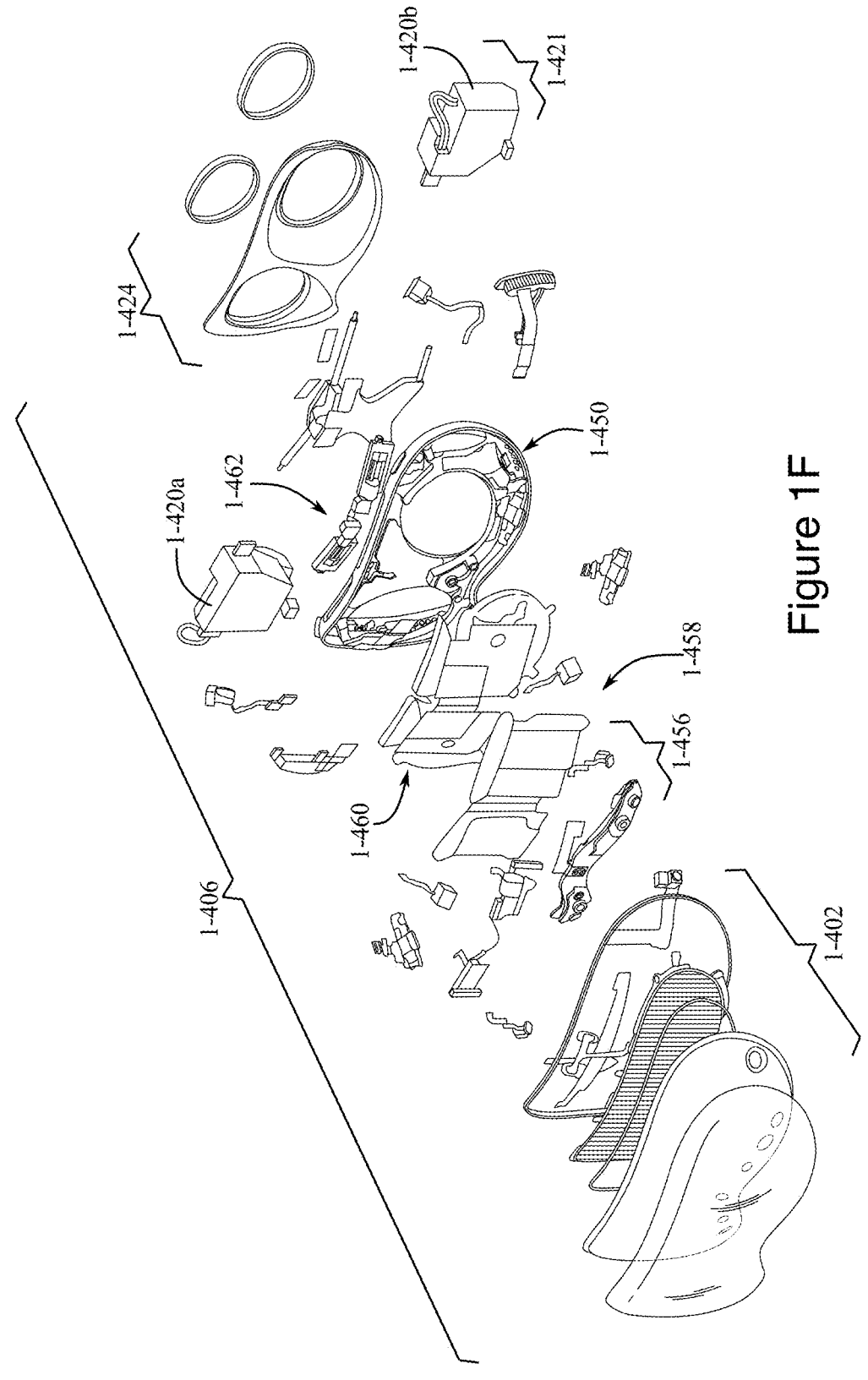
Figure 1G:
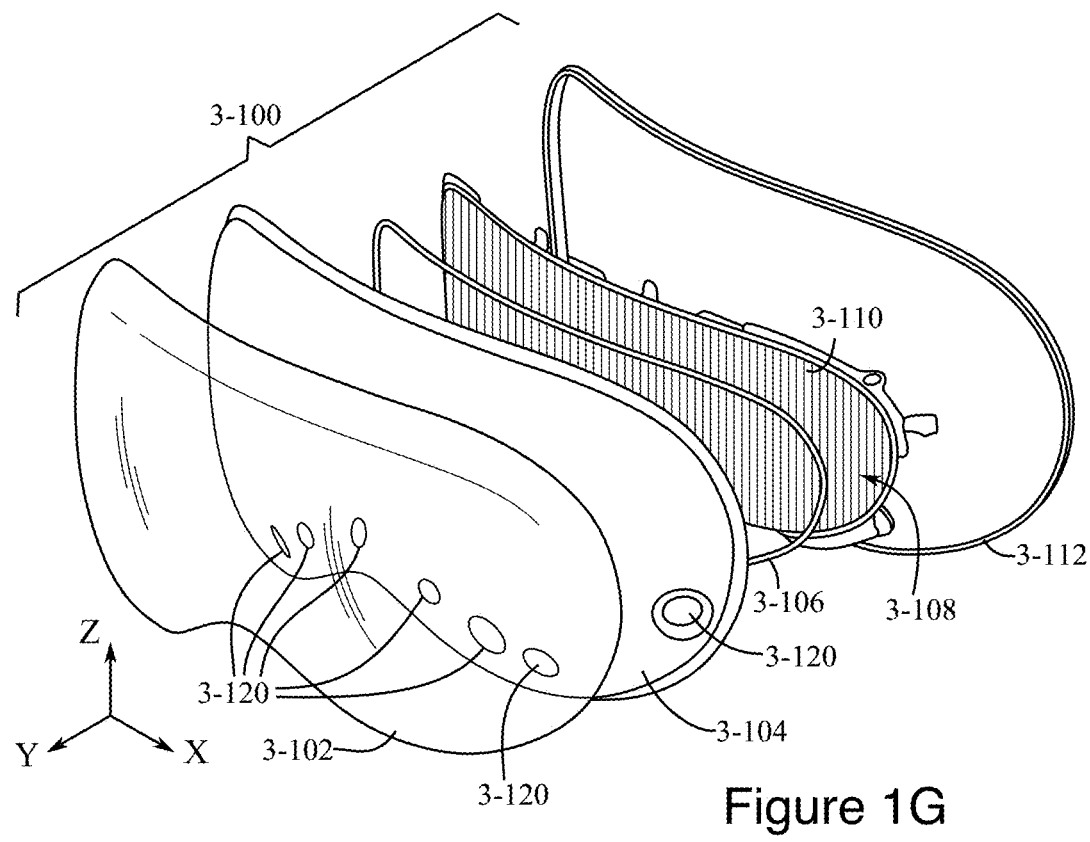
Figure 1H:
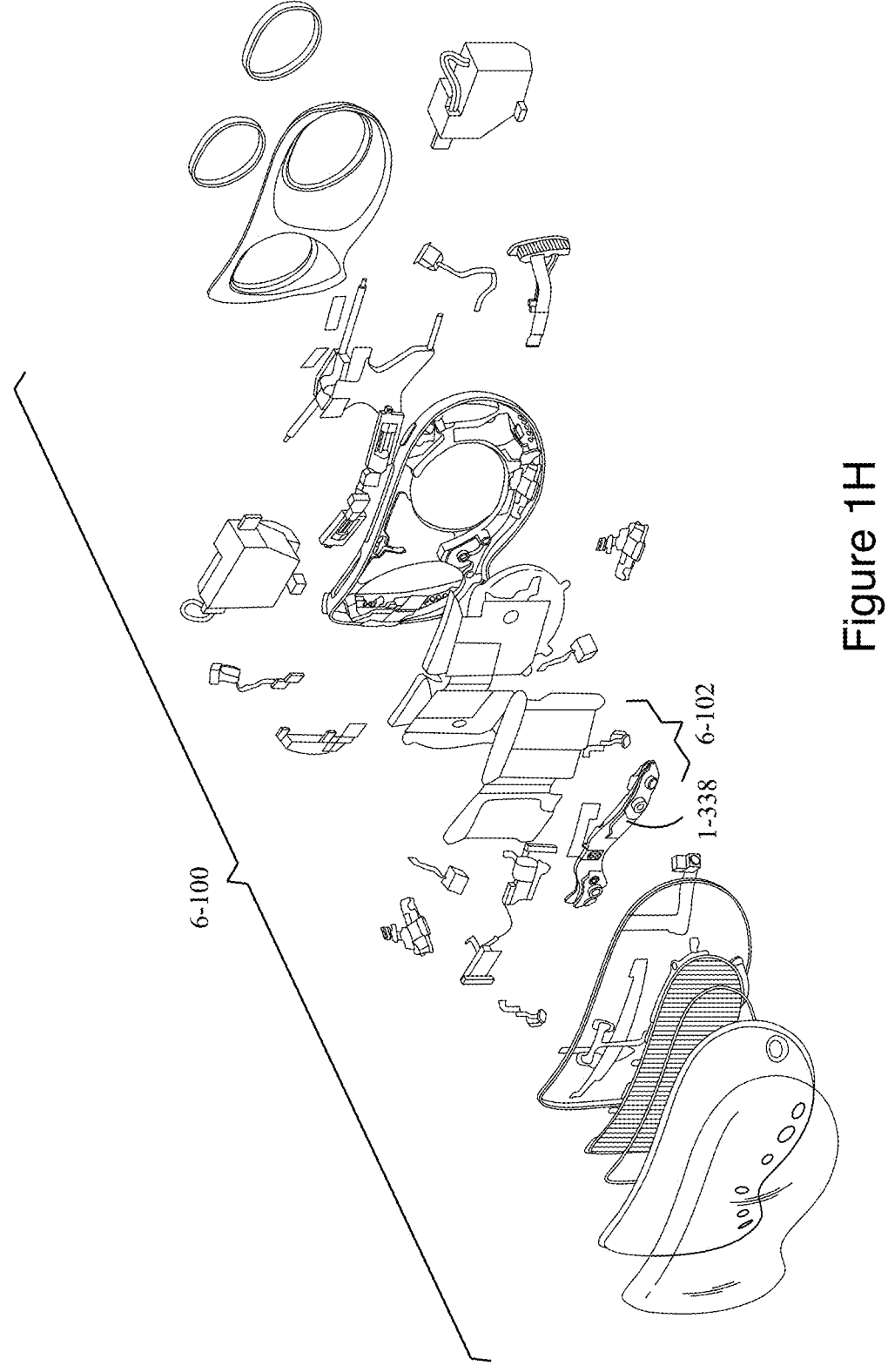
Figure 1I:
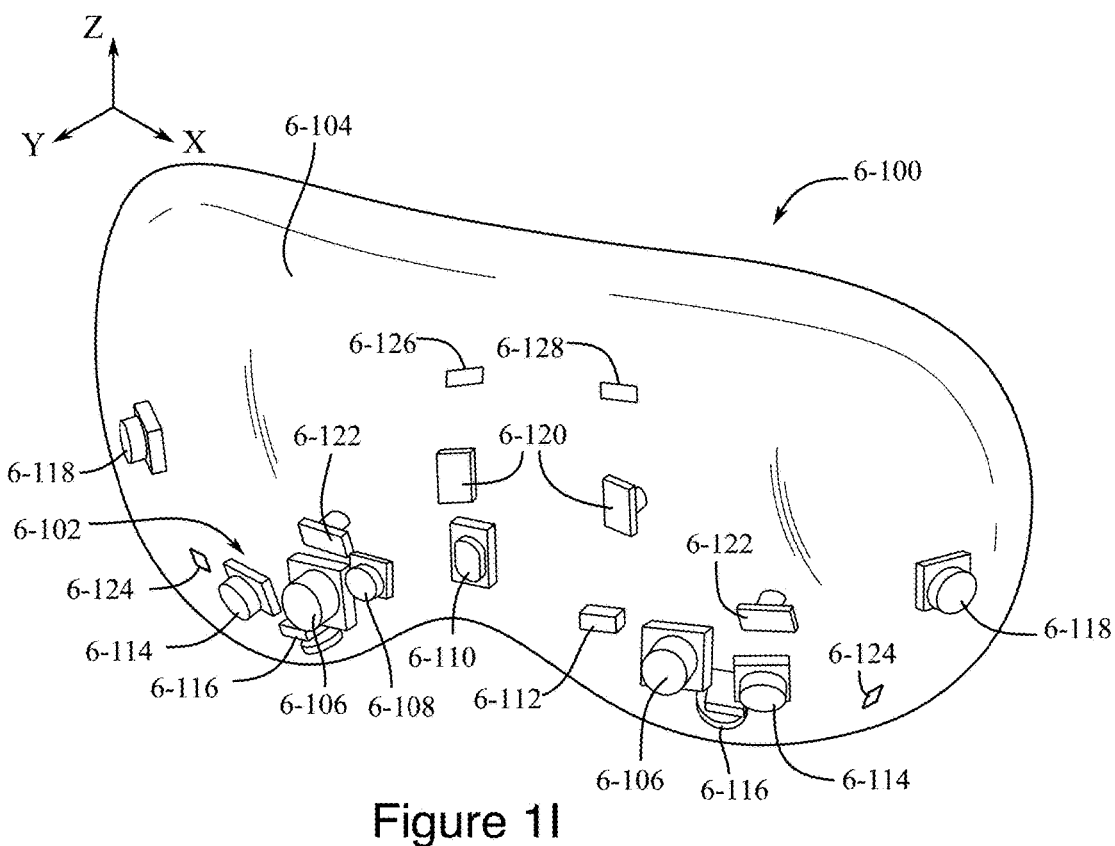
Figure 1J:
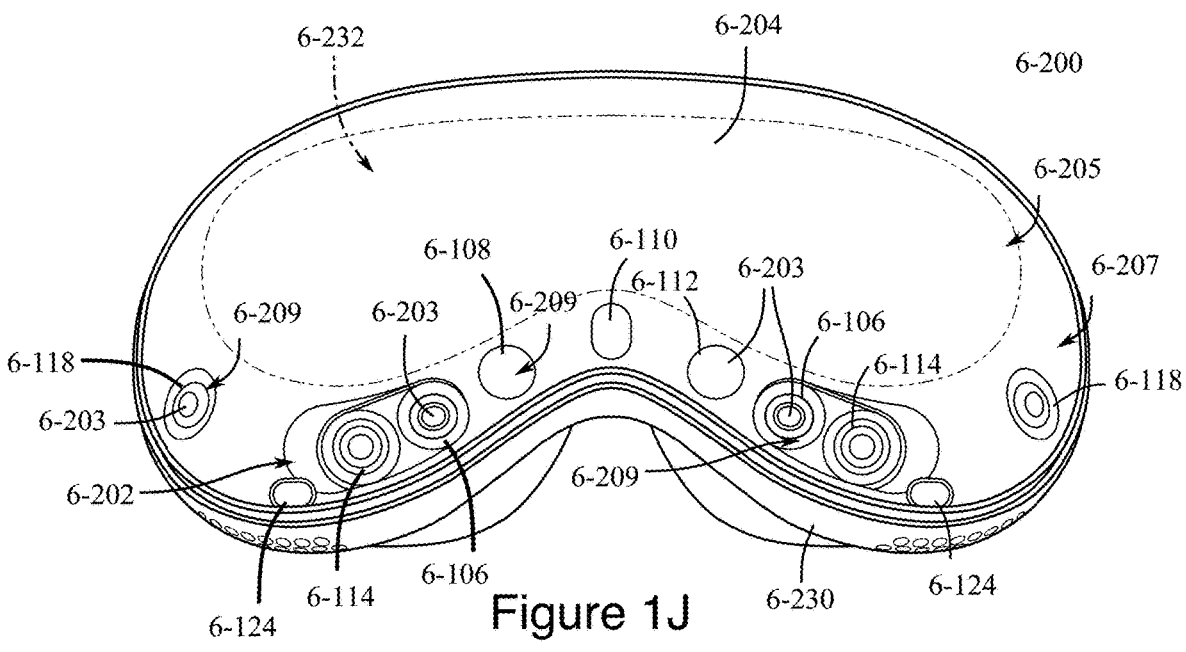
Figure 1K:
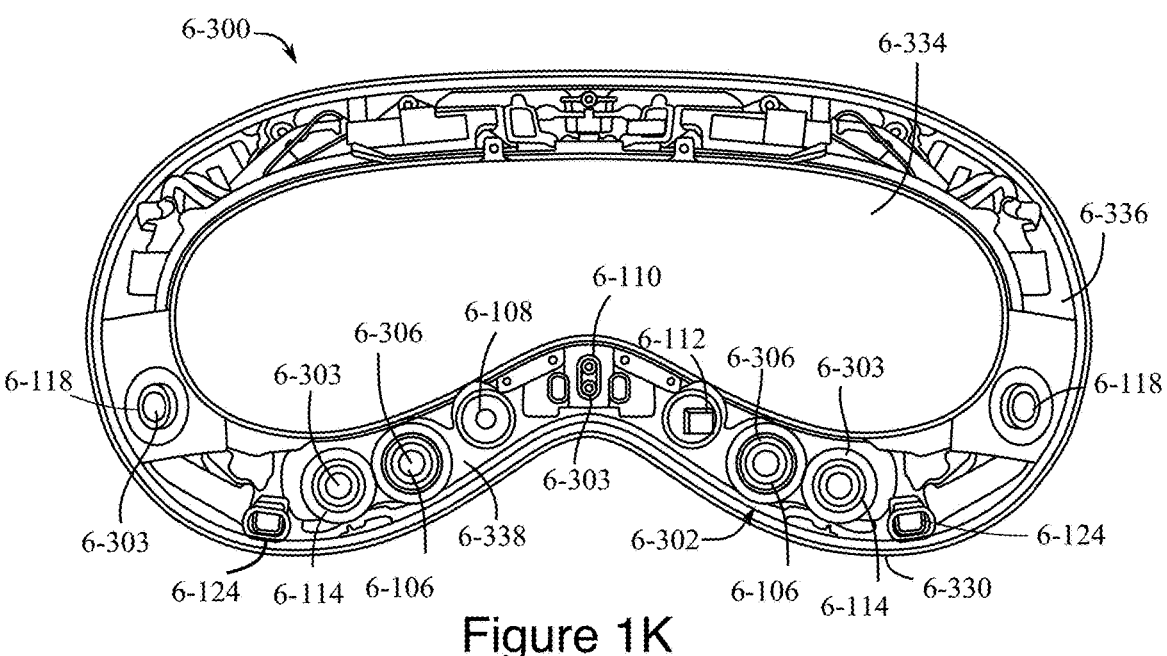
Figure 1L:
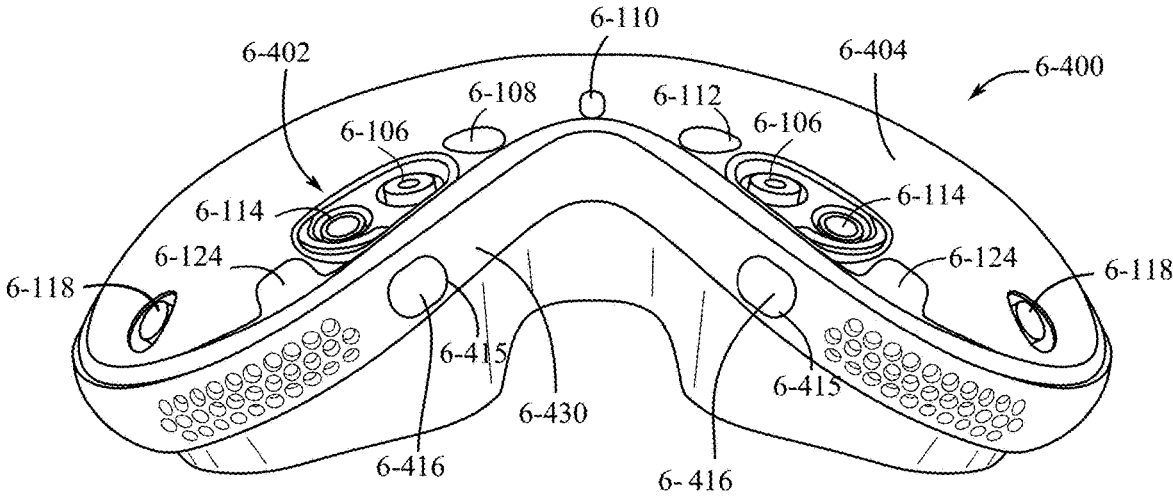
Figure 1M:
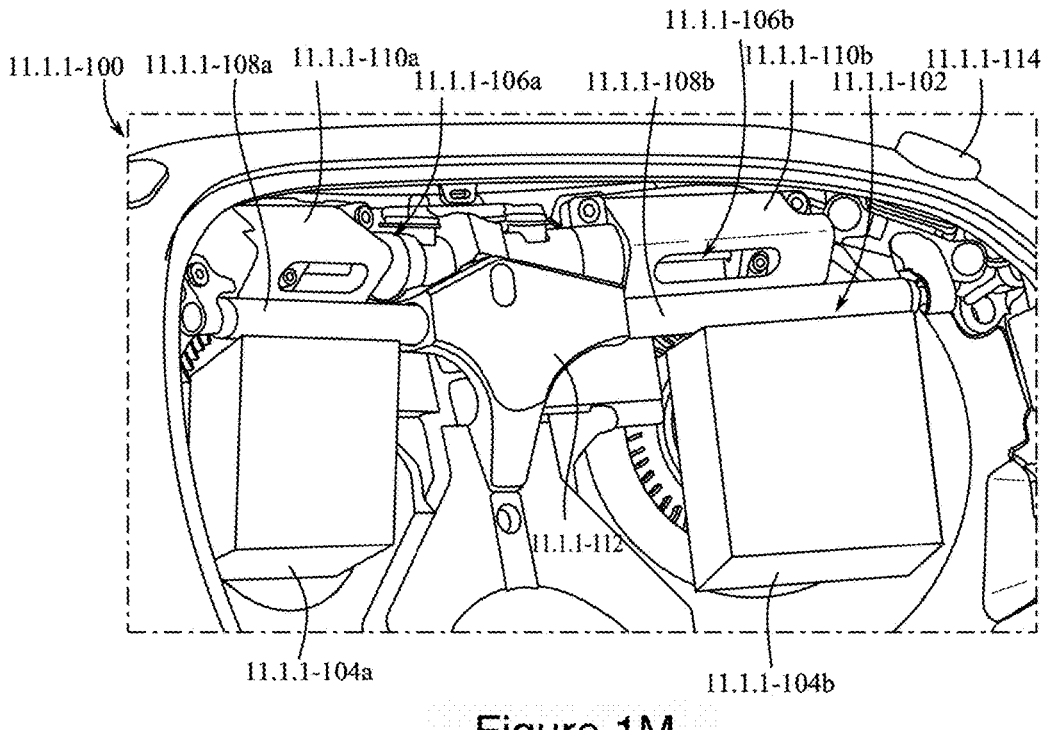
Figure 1N:
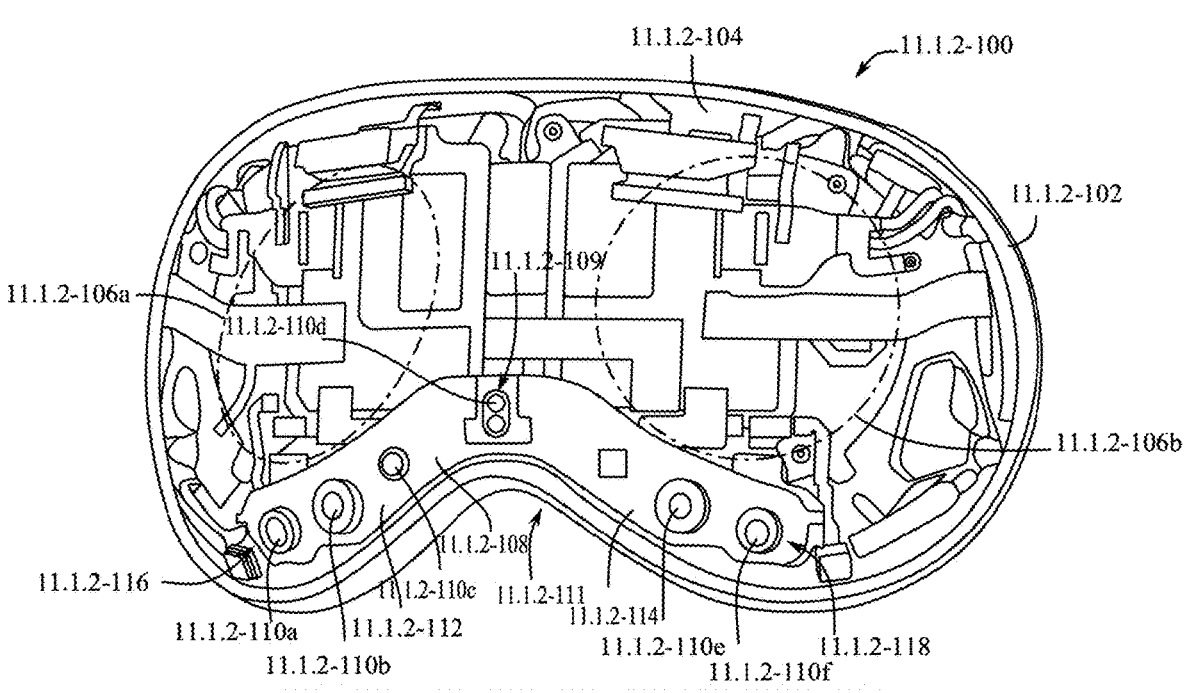
Figures 1O, 1P:
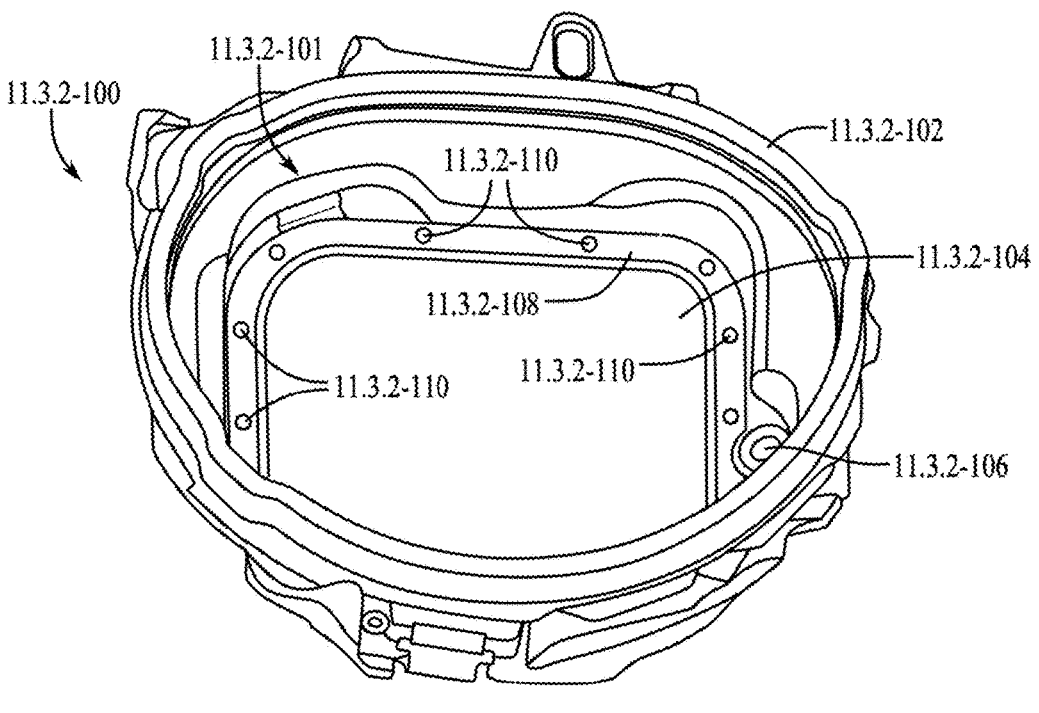

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first secure-ment strap 1-205a can include a first electronic component 1-212a and the second securement strap 1-205b can include a second electronic component 1-212b. In at least one example, the first and second straps 1-205a-b can be remov-ably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors 11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
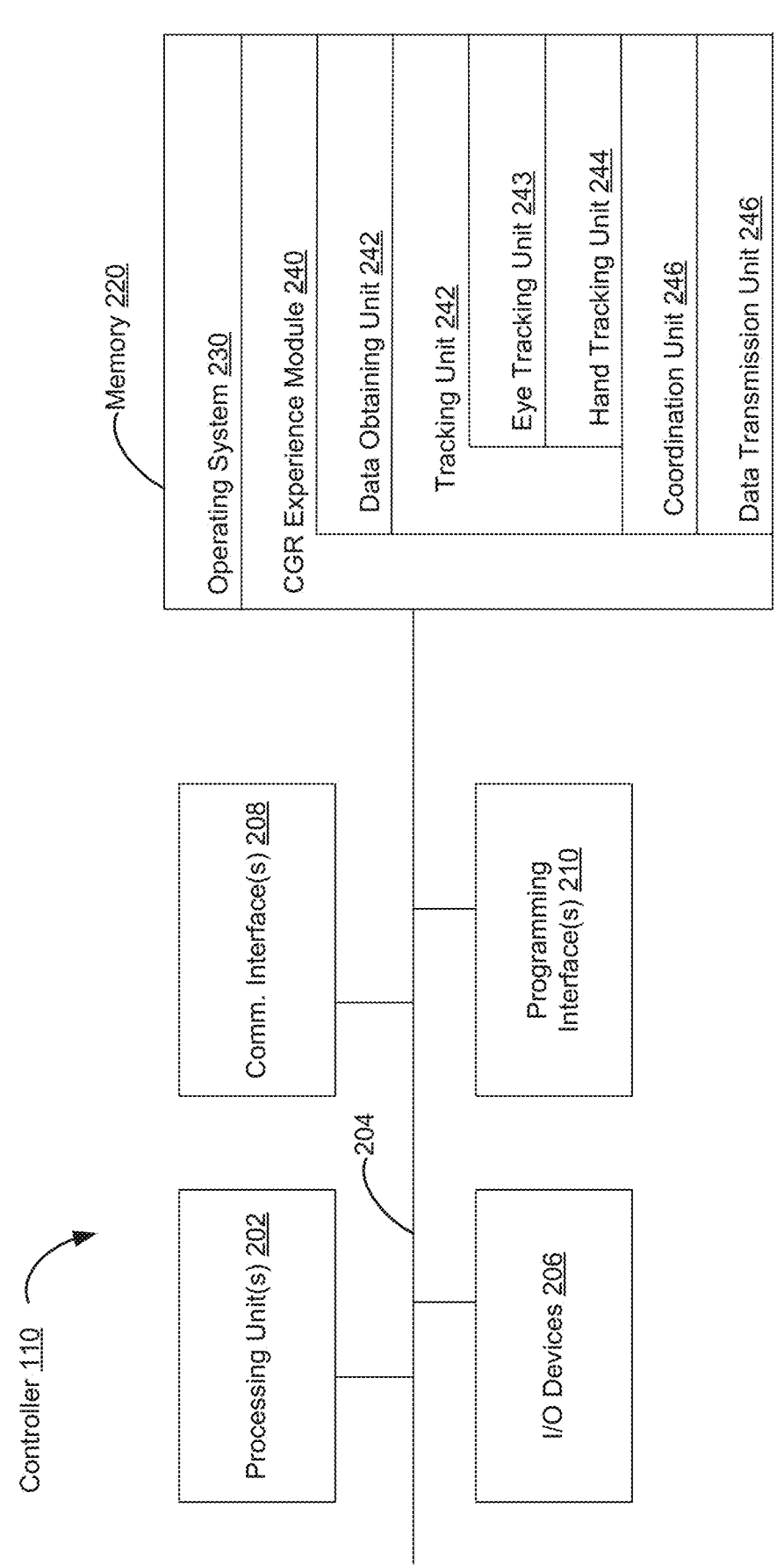
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLU-ETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
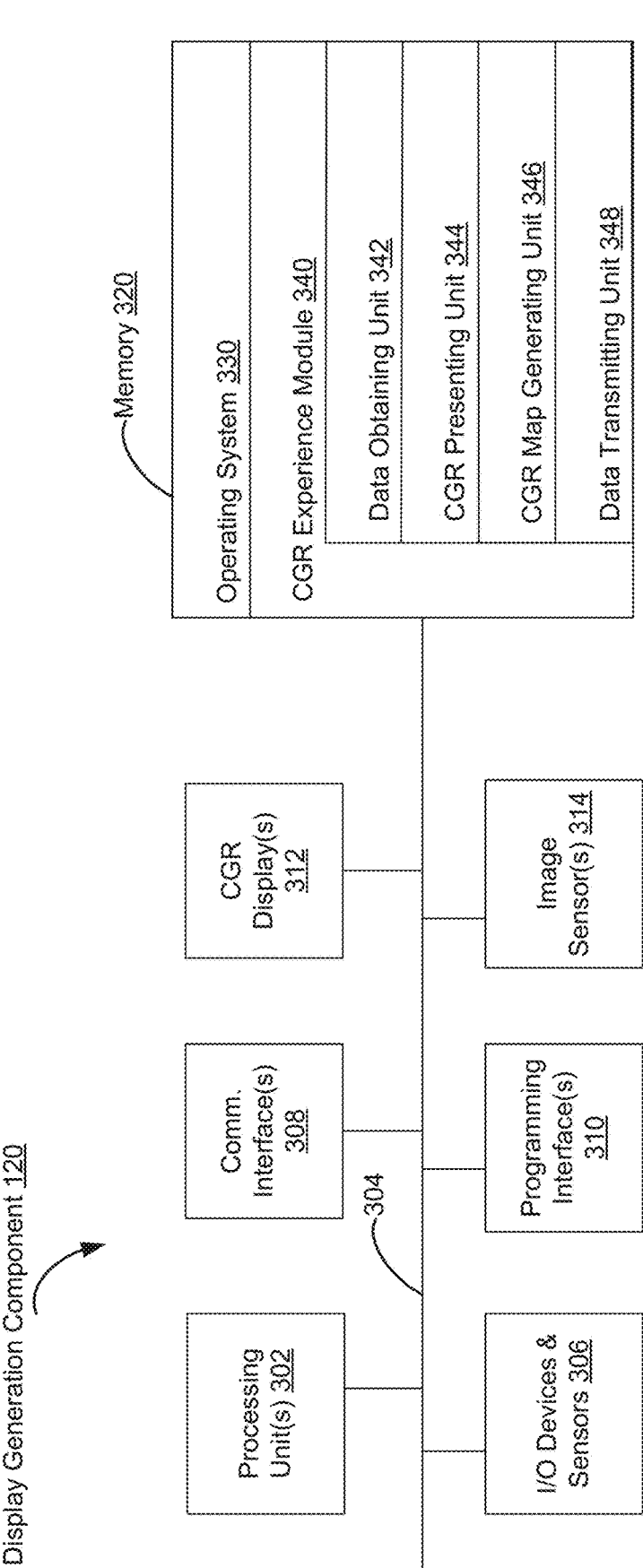
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transistory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
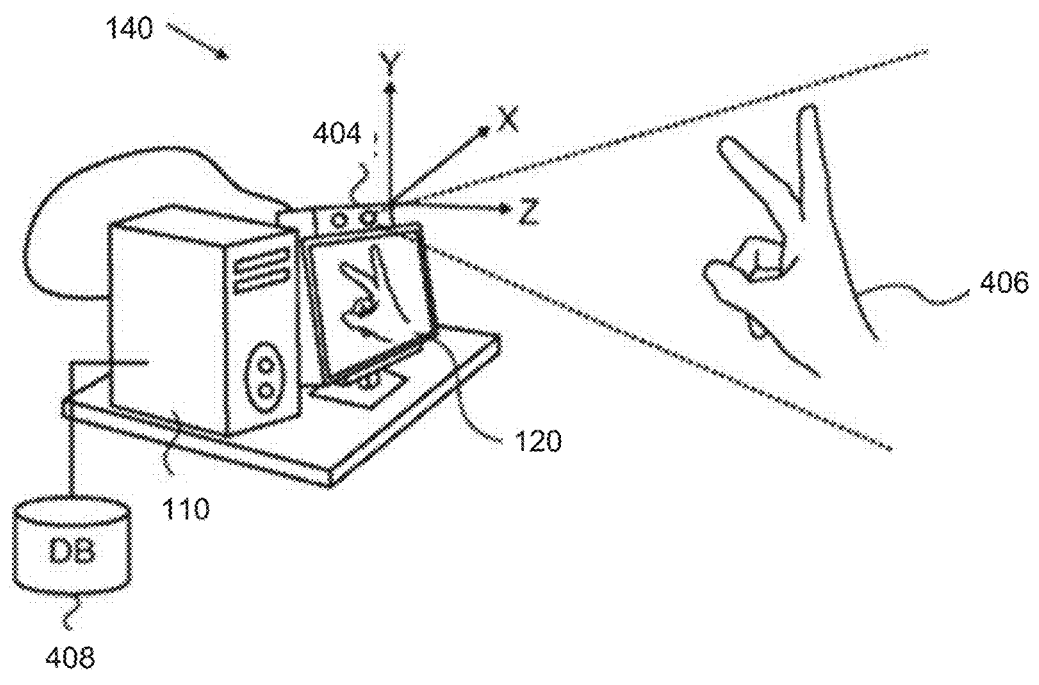
FIG. 4 is a block diagram illustrating a hand tracking unit of a computer system that is configured to capture gesture inputs of the user in accordance with some embodiments.
Figure 4:
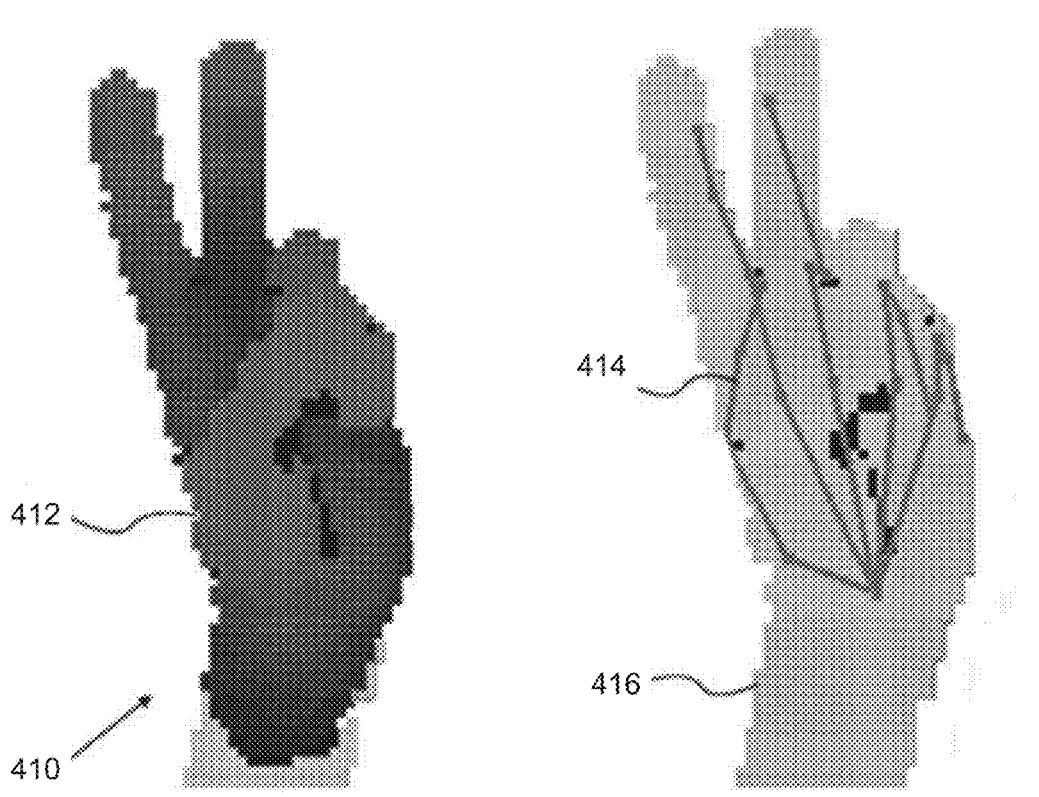

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, over-all size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
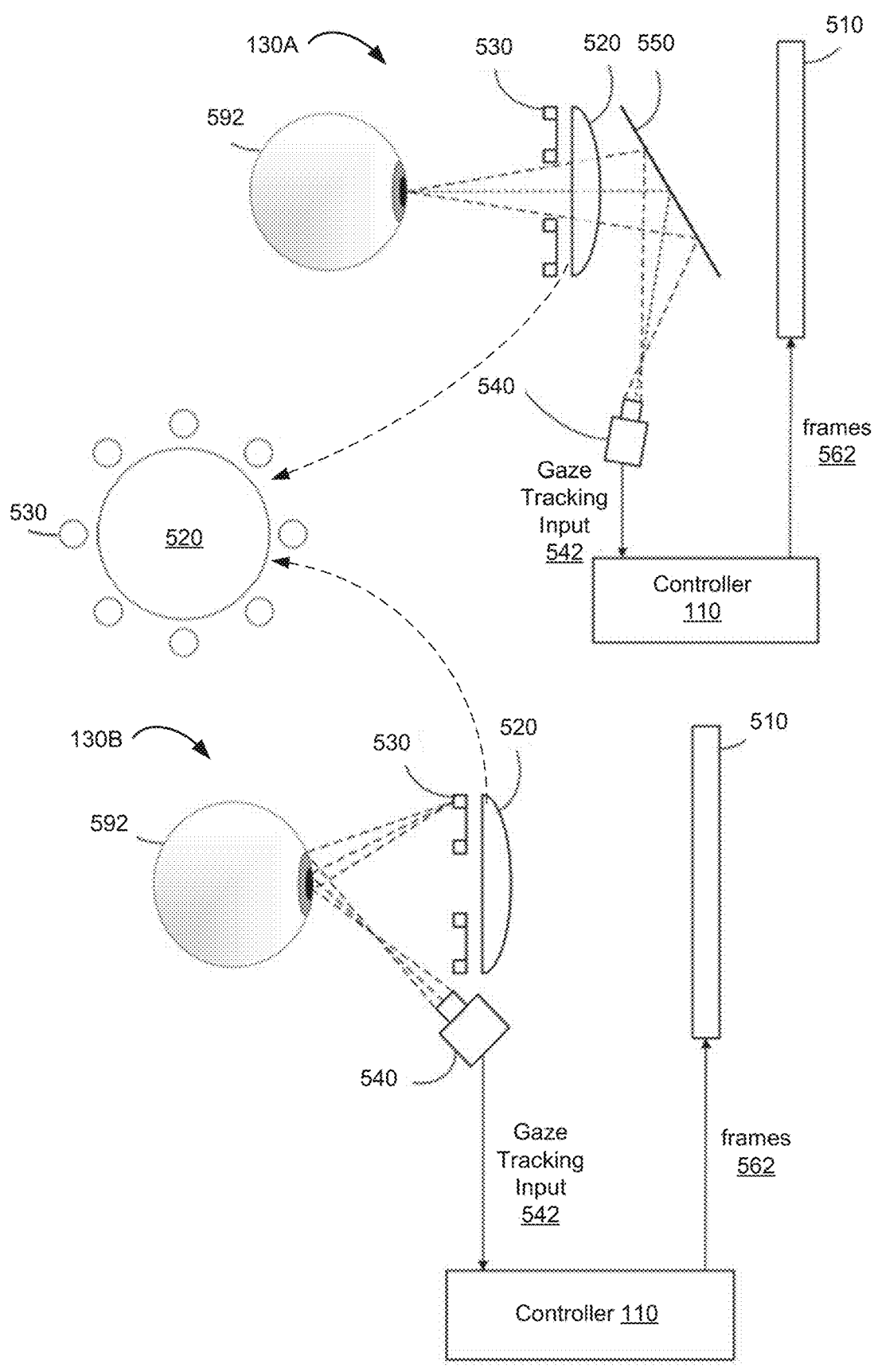
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
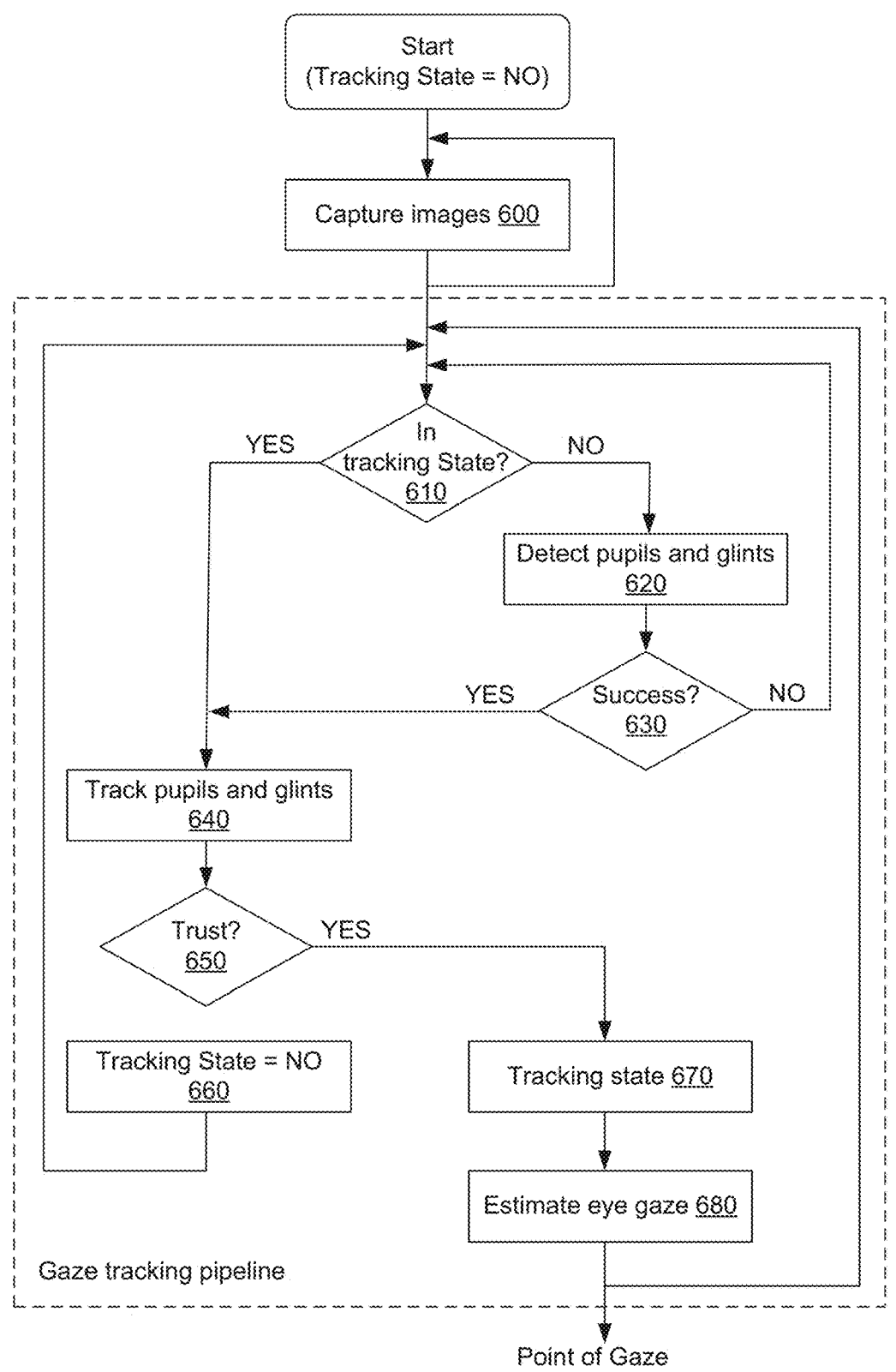
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7H illustrate examples of a computer system facilitating immersion control for a virtual environment in accordance with some embodiments.

Figure 7A:
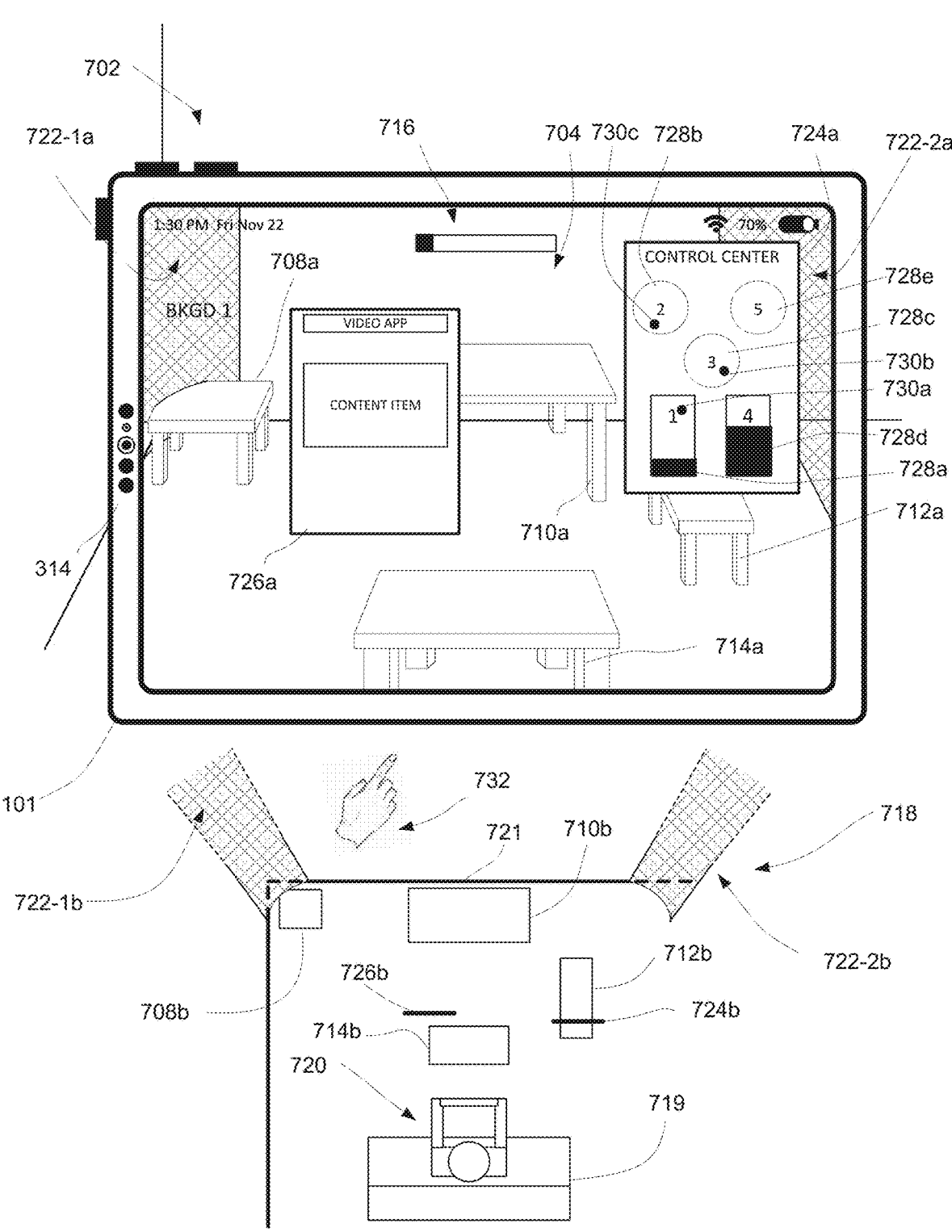
FIGS. 7A-7H illustrate examples of a computer system facilitating immersion control for a virtual environment in accordance with some embodiments.

FIG. 7A illustrates a computer system 101 displaying, in a real world environment 702 and via a display generation component (e.g., display generation component 120 of FIG. 1), a three-dimensional environment 704 on a user interface. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user while the user interacts with the computer system 101. In some embodiments, the user interfaces described below are implemented on a head-mounted display that includes a display generation component that displays the user interfaces to the user and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user). The figures herein illustrate a three-dimensional environment that is presented to the user by computer system 101 (e.g., and displayed by the display generation component of computer system 101) and an overhead view 718 of the physical and/or three-dimensional environment 704 associated with computer system 101 to illustrate the relative locations of objects in the real world environment and the locations of virtual objects in the three-dimensional environment.

As shown in FIG. 7A, computer system 101 captures one or more images of the real world environment 702 around computer system 101 (e.g., operating environment 100), including one or more objects in the real world environment 702 around computer system 101. In some embodiments, computer system 101 displays representations of the real world environment 702 in three-dimensional environment 704 or portions of the real world environment 702 are visible via the display generation component 120 in three-dimensional environment. For example, three-dimensional environment 704 includes a room including a representation of corner table 708a (corner table 708b in overhead view 718), a representation of desk 710a (e.g., real object desk 710b in overhead view 718), a representation of coffee table 714a (e.g., real object coffee table 714b in overhead view 718), and a representation of side table 712a (e.g., real object side table 712b in overhead view 718), each of which are optionally photorealistic representations, simplified representations, cartoons, caricatures, and/or digital or passive passthrough representations, as described with reference to method 800.

As shown in overhead view 718, user 720 of computer system 101 is seated on couch 719 and is holding computer system 101 (e.g., or wearing computer system 101 if, for example, computer system 101 were a head-mounted device) in such a way that one or more sensors are facing towards the other end of the room, thus capturing corner table 708b, desk 710b, side table 712b and coffee table 714b, and displaying representations of the objects in three-dimensional environment 704.

In FIG. 7A, computer system 101 is displaying immersion level indicator 716. Immersion level indicator 716 indicates the current level of immersion (e.g., out of a maximum level of immersion) with which computer system 101 is displaying three-dimensional environment 704. In some embodiments, a level of immersion corresponds to the amount that the view of the physical environment (e.g., the view of objects in real world environment 702) is obscured by a virtual environment (e.g., a simulated environment that is optionally different than real world environment 702 around the user) or the amount that the objects of the physical environment are modified to achieve a certain spatial effect (e.g., as will be described in further detail below with respect to method 800). For example, a maximum level of immersion (e.g., full immersion) optionally refers to a state in which none of the physical environment is viewable in three-dimensional environment 704 via display generation component 120, and the entirety of the three-dimensional environment 704 is encompassed by a virtual environment.

In some embodiments, an intermediate level of immersion (e.g., an immersion level less than maximum and more than no immersion) refers to a state in which some of real world environment 702 is viewable in three-dimensional environment 704 via display generation component 120, and the portions of real world environment 702 that otherwise would have been viewable (e.g., if not for the immersion) have been replaced with the virtual environment. In some embodiments, immersion level indicator 716 optionally includes a plurality of elements associated with the plurality of immersion levels. In some embodiments, as the immersion level increases, computer system 101 presents more elements of the virtual environment.

In FIG. 7A, immersion level indicator 716 indicates that the current level of immersion is a first level, corresponding to the amounts of virtual environment 722-1a (e.g., 722-1b in overhead view 718), 722-2a (e.g., 722-2b in overhead view 718) illustrated in FIG. 7A being displayed by computer system 101. The virtual environment 722-1a, 722-2a includes a display corresponding to a background 1 (BKGD 1), which optionally includes features of a simulated place or atmosphere. For example, the display corresponding to BKGD 1 optionally includes a sunny day at a hill. Further details of the virtual environment and immersion levels are described with reference to the method 800.

In the illustrated embodiment, the computer system 101 displays the three-dimensional environment 704 including a control center user interface 724a (e.g., a system user interface and/or a first user interface of the control center user interface) and a video application user interface 726a (e.g., a user interface of an application). As shown in the overhead view 718, the control center user interface 724b and the video application user interface 726b are located at different positions in the three-dimensional environment 704. The control center user interface includes an immersion slider user interface element 728a, a system environment setting user interface element 728b, an auto-dim user interface element 728c, a volume control user interface element 728d, and a focus mode control user interface element 728e. The immersion slider user interface element 728a is displayed at a first fill-level corresponding to a current immersion level (e.g., the current immersion level of immersion indicator 716). Likewise, the volume control user interface element 728d includes display of a slider element at a position that corresponds to a current volume level of the computer system 101. The auto-dim user interface element 728c is in an active state. Further details about the control center user interface 724a are described with reference to methods 800, 1000, and/or 1200.

In the illustrated embodiment in FIG. 7A, user attention 730a-c (e.g., gaze of the user 720) and input from the hand 732 of the user 720 are alternatively directed to the immersion slider user interface element 728a, the system environment setting user interface element 728b, and the auto-dim user interface element 728c. In some embodiments, the user interface elements are selectable via user attention or input from the hand 732 (e.g., an air gesture), or via a combination of both user attention 730 and input from the hand 732, and such characteristics of the input and processes for detecting such inputs are described in more detail with reference to the method 800.

FIG. 7A1 illustrates similar and/or the same concepts as those shown in FIG. 7A (with many of the same reference numbers). It is understood that unless indicated below, elements shown in FIG. 7A1 that have the same reference numbers as elements shown in FIGS. 7A-7H have one or more or all of the same characteristics. FIG. 7A1 includes computer system 101, which includes (or is the same as) display generation component 120. In some embodiments, computer system 101 and display generation component 120 have one or more of the characteristics of computer system 101 shown in FIGS. 7A-7H and display generation component 120 shown in FIGS. 1 and 3, respectively, and in some embodiments, computer system 101 and display generation component 120 shown in FIGS. 7A-7H have one or more of the characteristics of computer system 101 and display generation component 120 shown in FIG. 7A1.

In FIG. 7A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 7A-7H.

In FIG. 7A1, display generation component 120 is illustrated as displaying content that optionally corresponds to the content that is described as being displayed and/or visible via display generation component 120 with reference to FIGS. 7A-7H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7A1.

Display generation component 120 has a field of view (e.g., a field of view captured by external image sensors 314b and 314c and/or visible to the user via display generation component 120, indicated by dashed lines in the overhead view) that corresponds to the content shown in FIG. 7A1. Because display generation component 120 is optionally a head-mounted device, the field of view of display generation component 120 is optionally the same as or similar to the field of view of the user.

In FIG. 7A1, the user is depicted as performing an air pinch gesture (e.g., with hand 732) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7H.

In some embodiments, computer system 101 responds to user inputs as described with reference to FIGS. 7A-7H.

In the example of FIG. 7A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7H and/or described with reference to the corresponding method(s) are optionally implemented on computer system 101 and display generation unit 120 in a manner similar or analogous to that shown in FIG. 7A1.

Figure 7B:
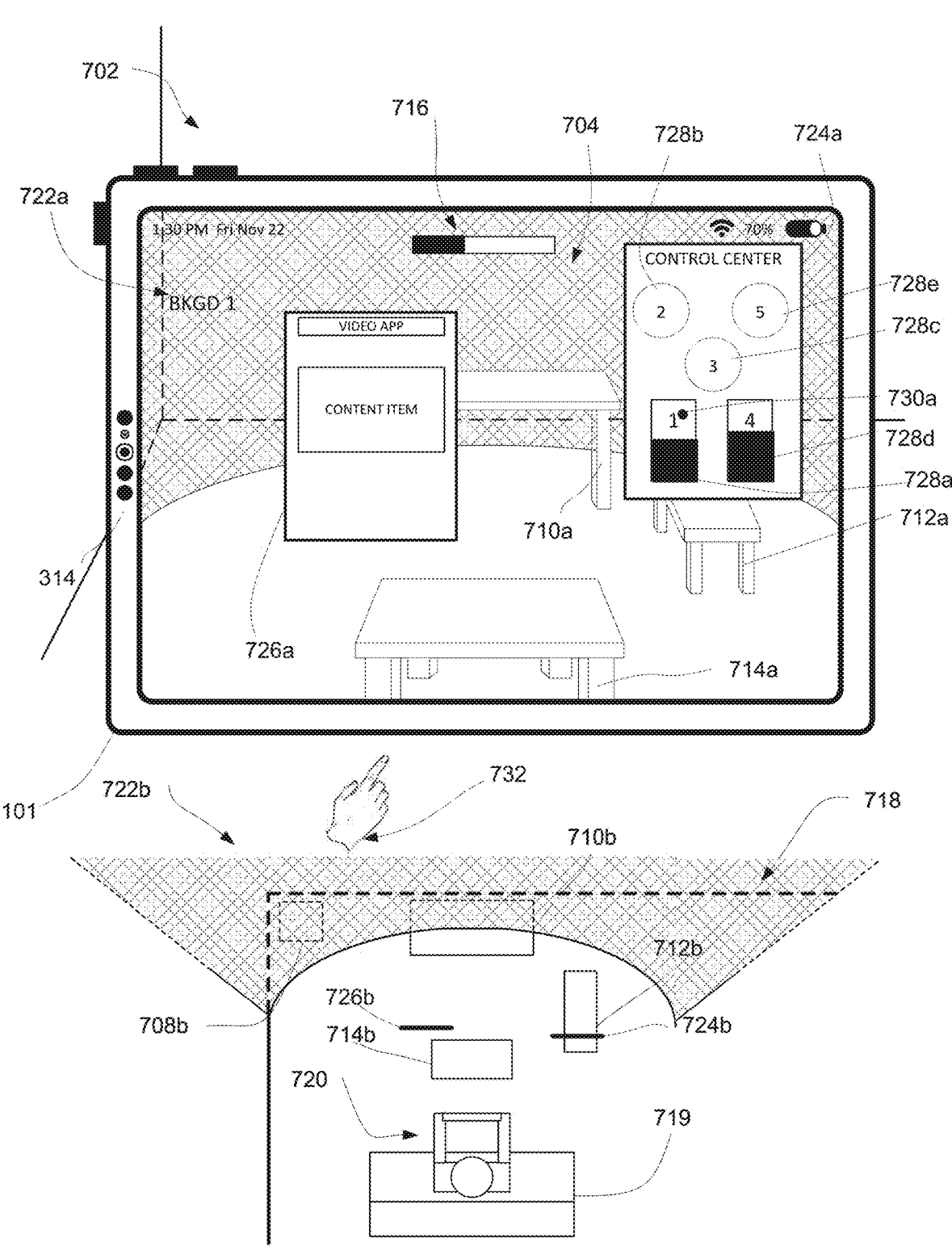

FIG. 7B illustrates the three-dimensional environment 704 having a second level of immersion greater than the first level of immersion illustrated in FIG. 7A in response to input directed to the immersion slider user interface element 728a corresponding to a request to increase an immersion level, in accordance with some embodiments of the present disclosure. For example, from FIG. 7A to FIG. 7B, computer system 101 detects attention 730a of the user directed to element 728a while hand 732 performs and air pinch gesture, followed by upward movement of hand 732 while in the pinch hand shape, as described in more detail with reference to method 800. In response, as shown in FIG. 7B, the immersion slider user interface element 728a includes display of a representation of a current level of immersion that is higher than the representation of the current level of immersion illustrated in FIG. 7A because the current level of immersion in FIG. 7B has increased in response to the input directed to the immersion slider user interface element 728a corresponding to the request to increase an immersion level. Also, the increased in immersion level is illustrated in the immersion level indicator 716. The amount of three-dimensional environment 704 that has been replaced by virtual environment 722a is increased (compared with that of FIG. 7A), thus increasing the size of virtual environment 722a in three-dimensional environment 704 (e.g., increasing the size of the visual "portal" into virtual environment 722a). Further details about increasing immersion are described with reference to method 800. In the illustrated embodiment in FIG. 7B, the control center user interface 724a and the video application user interface 726a remain at their respective locations in response to the increase in the immersion level.

Figure 7C:
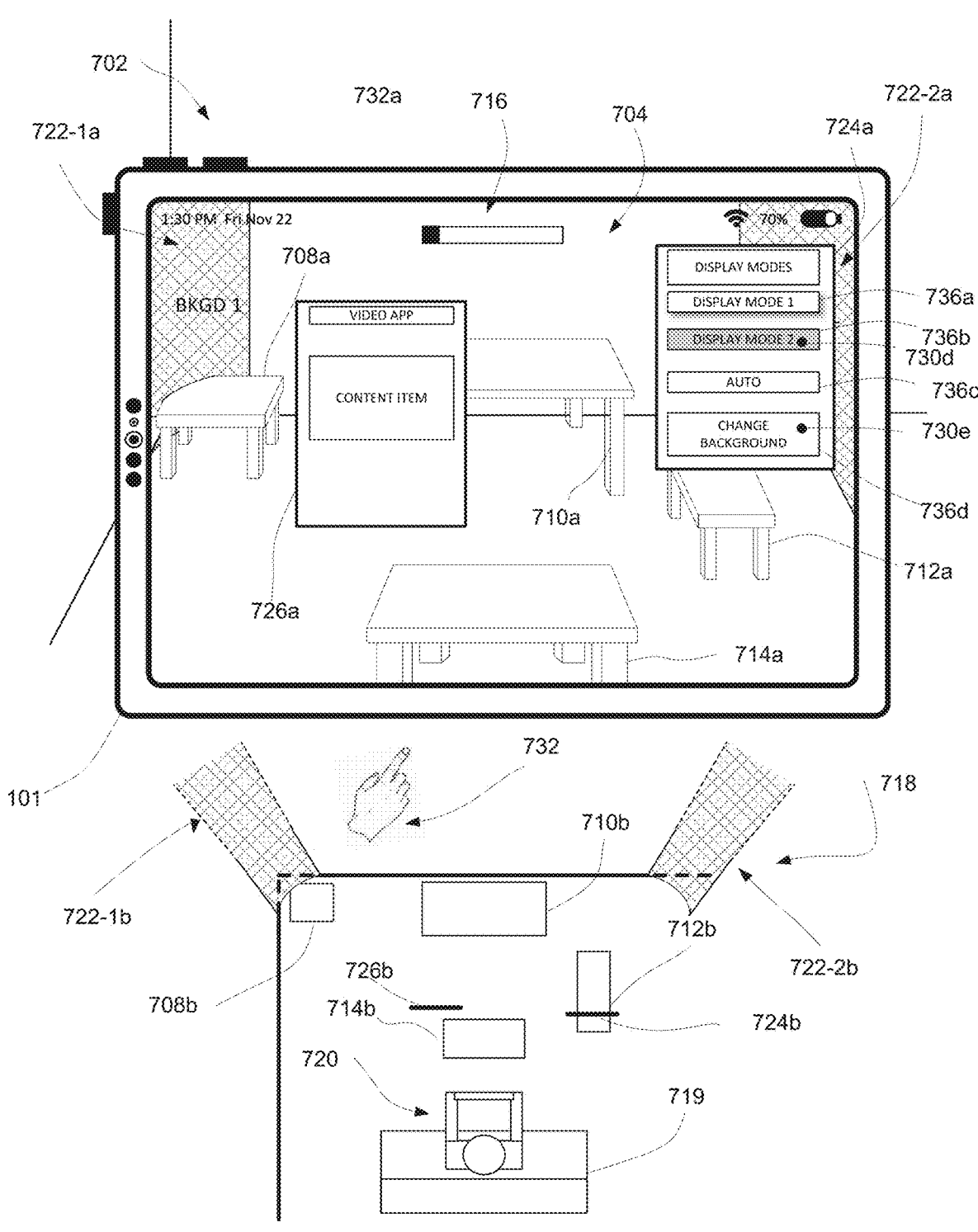

FIG. 7C illustrates the three-dimensional environment 704 including a second user interface of the control user interface 724a for changing a display mode of the virtual environment displayed via the display generation component in response to input directed to the system environment setting user interface element 728b displayed in FIG. 7A, in accordance with some embodiments of the present disclosure. In the illustrated embodiment, in response to input directed to the system environment setting user interface element 728b in FIG. 7A (e.g., an input that includes attention of the user for a threshold time duration, such as described in this disclosure with reference to method 800), a second user interface of the control center user interface replaces and/or overlays display of the first user interface of the control center user interface 724a illustrated in FIG. 7A, such as shown in FIG. 7C. The second user interface of the control center user interface 724a includes selectable options for changing a display mode (e.g., a lighting setting) of the virtual environment 722 (e.g., virtual environment 722-1a, 722-2a). In particular, the illustrated second user interface includes a selectable display mode 1 option 736a (e.g., a simulated light (e.g., including a simulated light source at a first level of brightness and/or from a simulated sun), daytime, or daylight lighting setting) for displaying the virtual environment 722, a selectable display mode 2 option 736b (e.g., a simulated dark (e.g., including a simulated light source at a second level of brightness lower than the first level of brightness and/or from a simulated moon and stars), a simulated nighttime, or a simulated nightlight lighting setting) for displaying the virtual environment 722, a selectable display mode 3 option 736c (AUTO) (e.g., a lighting setting that causes the computer system 101 to transition between different simulated lighting settings based on satisfaction of one or more criteria such as a current time of day at the computer system being a specific time of day) for displaying the virtual environment 722, and a change background option 736d for displaying the virtual environment 722. Further details on the lighting settings are described with reference to the method 800.

Additionally, in the illustrated embodiment in FIG. 7C, user attention 730d and 730e (e.g., gaze of the user 720) and input from the hand 732 of the user 720 are alternatively directed to the selectable display mode 2 option 736b and the change background option 736d. In some embodiments, the user interface elements are selectable via user attention or input from the hand 732, or via a combination of both user attention (e.g., gaze) and input from the hand 732, and such characteristics of the input and processes for detecting such inputs are described in more detail with reference to the method 800. In the illustrated embodiment, selectable display mode 1 option 736a is currently selected, as illustratively detailed in the shadow underneath the selectable display mode 1 option 736a, which causes the virtual environment in FIG. 7C to be displayed with a visual appearance corresponding to the display mode 1 option 736a (e.g., the light setting).

Figure 7D:
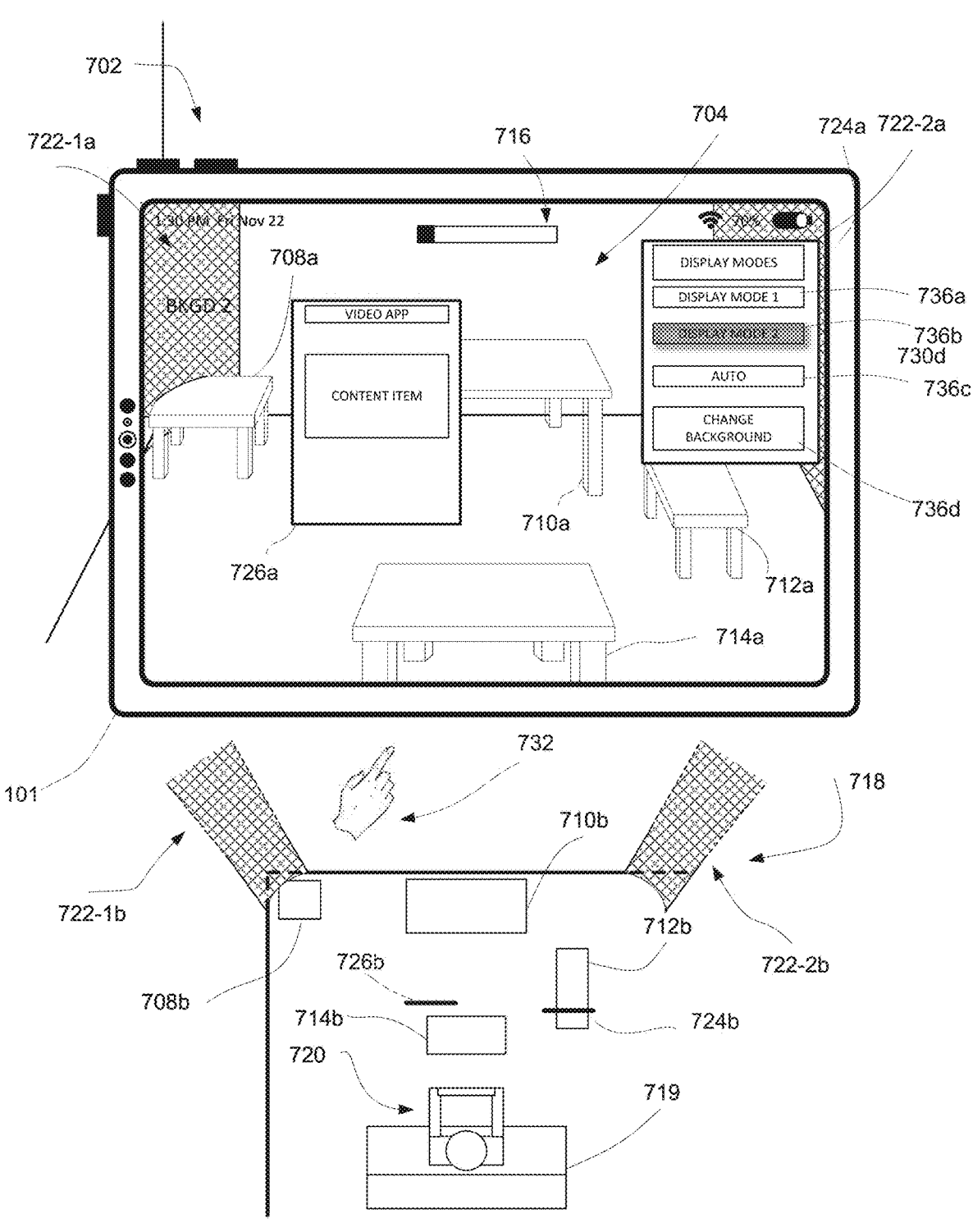

FIG. 7D illustrates the three-dimensional environment 704 including the second user interface of the control user interface 724a for changing a display mode of the virtual environment displayed via the display generation component from the display mode 1 to display mode 2, in response to input (e.g., user attention 730d (e.g., gaze or another type of user attention) and/or input from the hand 732 of FIG. 7C) directed to the selectable display mode 2 option 736b, in accordance with some embodiments of the present disclosure. In some embodiments, FIG. 7D illustrates the state of three-dimensional environment 704 of FIG. 7C that is displayed in response to input directed to the selectable display mode 2 option 736b of FIG. 7C.

In FIG. 7D, the selectable display mode 2 option 736b is selected. In response, the computer system 101 optionally modifies the virtual environment 722 in accordance with the selection. As such, in FIG. 7D, the virtual environment 722-1a, 722-1b has transitioned from BKGD 1 to BKGD 2, while maintaining the same level of immersion. The transition includes the lighting setting with which the virtual environment 722 is displayed visually transitioning from display mode 1, such as a day lighting setting, to display mode 2, such as a night lighting setting (e.g., one or more simulated light sources are dimmed, reduced in brightness, turned off, or the light sources for the virtual environment change from daytime light sources (e.g., a simulated sun) to night time light sources (e.g., a simulated moon and stars)). Further details about the types of lighting settings and the transitions between them are discussed with reference to the method 800.

Figure 7E:
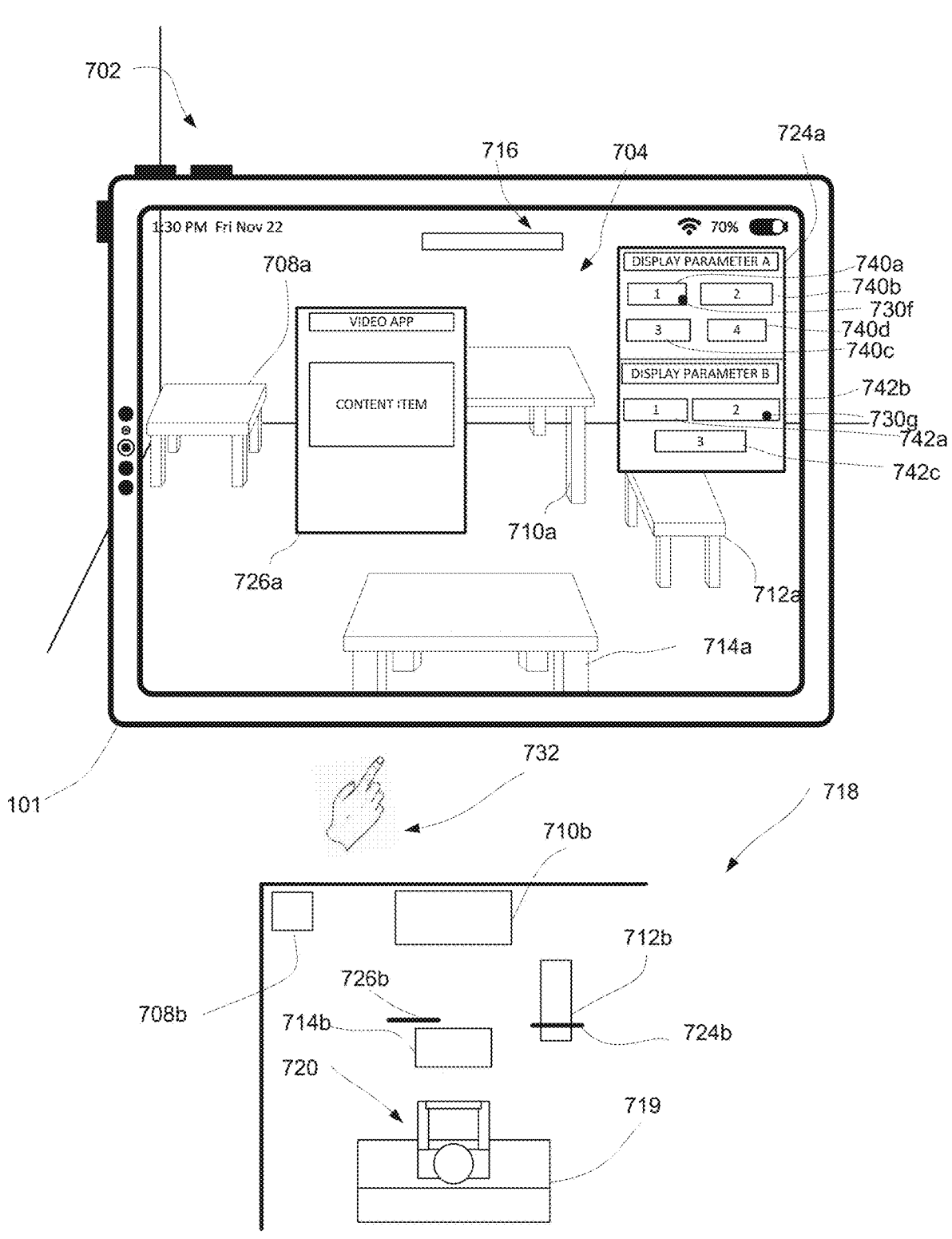

FIG. 7E illustrates the three-dimensional environment 704 including a third user interface of the control user interface 724a for changing a display parameter of a virtual environment displayed via the display generation component, in response to input directed to the selectable change background option 736d of FIG. 7D, in accordance with some embodiments of the present disclosure. In the illustrated embodiment, the current immersion level is no immersion, but it should be noted that in some embodiments, the current immersion level is higher than no immersion, and therefore three-dimensional environment 704 includes a virtual environment, such as the virtual environment 722 (e.g., 722-1a, 722-2a) of FIG. 7D.

In FIG. 7E, the third user interface of the control user interface 724a for changing a display parameter of a virtual environment includes selectable options for changing a display parameter A and selectable options for changing a display parameter B relating to three-dimensional environment. In particular, the third user interface includes selectable options 740a, 740b, 740c, 740d for changing the display parameter A and includes selectable options 742a, 742b, 742c for changing the display parameter B. Upon selection Display parameter A optionally corresponds to a simulation of a physical place, and upon selection of an option corresponding to display parameter A, the computer system 101 optionally displays the three-dimensional environment including a simulated physical place that corresponds to the selected option. For example, upon selection of selectable option 740a, a lake or a body of water scene is optionally simulated; upon selection of selectable option 740b, a street scene is optionally simulated; upon selection of selectable option 740c, a boat or marina scene is optionally simulated; upon selection of selection option 740d, a hill or mountain scene is optionally simulated. Display parameter B optionally corresponds to a simulated atmospheric effect displayed by the display generation component, and upon selection of an option corresponding to display parameter B, the computer system 101 optionally displays the three-dimensional environment including a simulated atmospheric effect that corresponds to the selected option. For example, upon selection of selectable option 742a, a dewy atmosphere is optionally simulated; upon selection of selectable option 742b, a sunny atmosphere is optionally simulated; upon selection of selectable option 742c, a cloudy atmosphere is optionally simulated. Features corresponding to display parameter A and display parameter B are described in detail with reference to the method 800.

In the illustrated embodiment in FIG. 7E, user attention 730f, 730g (e.g., gaze of the user 720) and input from the hand 732 of the user 720 are alternatively directed to user interface element 740a of display parameter A and user interface element 742b of display parameter B. In some embodiments, the user interface elements are selectable via user attention or input from the hand 732, or via a combination of both user attention and input from the hand 732, and such characteristics of the input and processes for detecting such inputs are described in more detail with reference to the method 800.

Figure 7F:
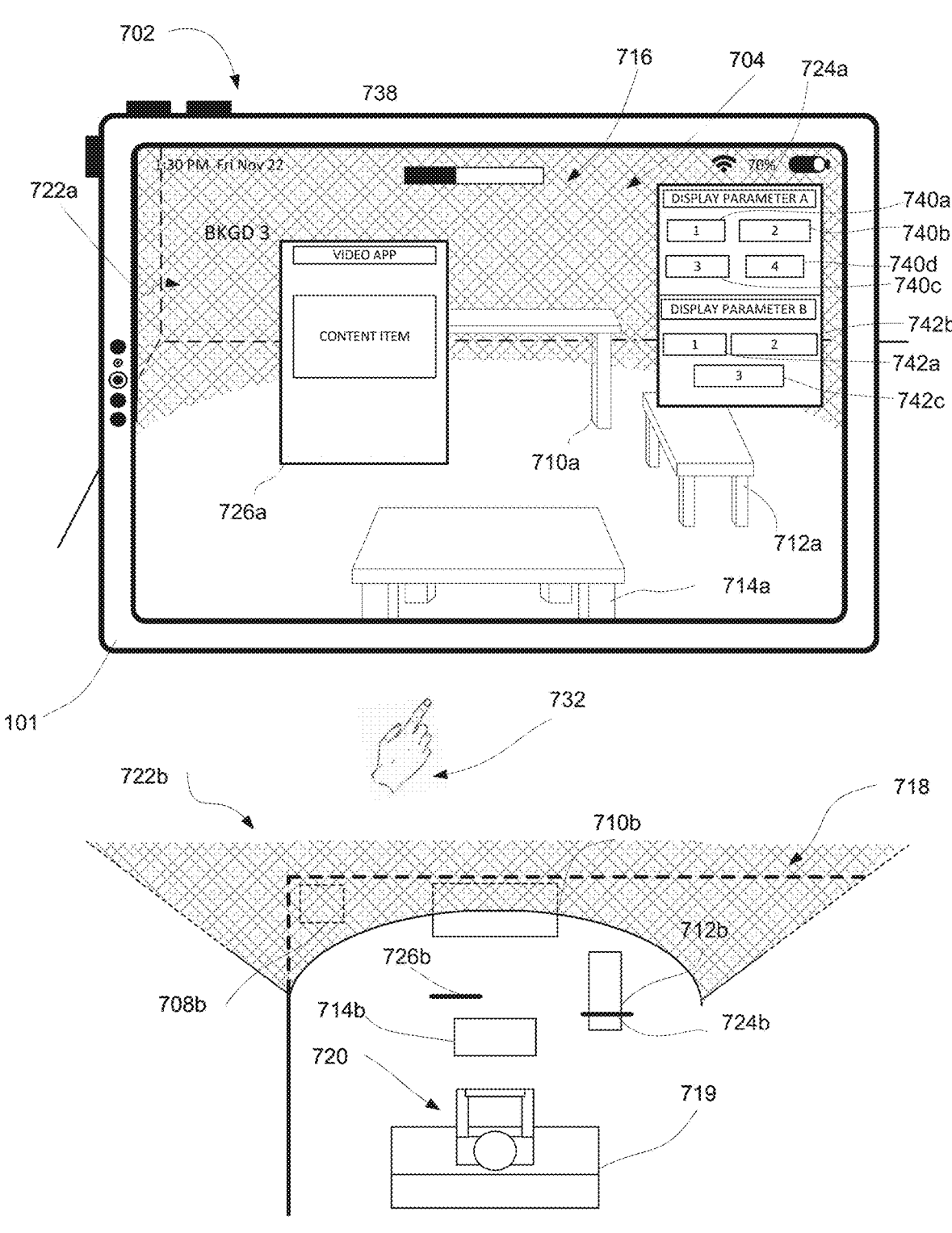

FIG. 7F illustrates the three-dimensional environment 704 including the virtual environment 722 (e.g., 722a) simulating BKGD 3 at a current immersion level indicated by the immersion level indicator 716, in response to input directed to the third user interface of the control user interface 724a of FIG. 7E for changing a display parameter of a virtual environment displayed via the display generation component, in accordance with some embodiments. For example, in response to user attention 730f directed to user interface element 740a of display parameter A in FIG. 7E, the computer system 101 optionally causes display of BKGD 3 (e.g., a preview of the virtual environment 722a) according to selectable option 740a. Even though there was no immersion in FIG. 7E (e.g., the virtual environment was not displayed), the computer system automatically temporarily increases the immersion to display BKGD3 according to selectable option 740a, and then optionally reverts to the level of immersion in FIG. 7E. In another example, in response to user attention 730g directed to user interface element 742a of display parameter B in FIG. 7E, the computer system 101 optionally causes display of BKGD 3 (e.g., a preview of the virtual environment 722a) according to selectable option 742a. Also, even though there was no immersion in FIG. 7E, the computer system 101 automatically temporarily increases the immersion to display BKGD3 according to selectable option 742a, and then optionally reverts to the level of immersion in FIG. 7E. Further details about the virtual preview are described with reference to the method 800.

Figure 7G:
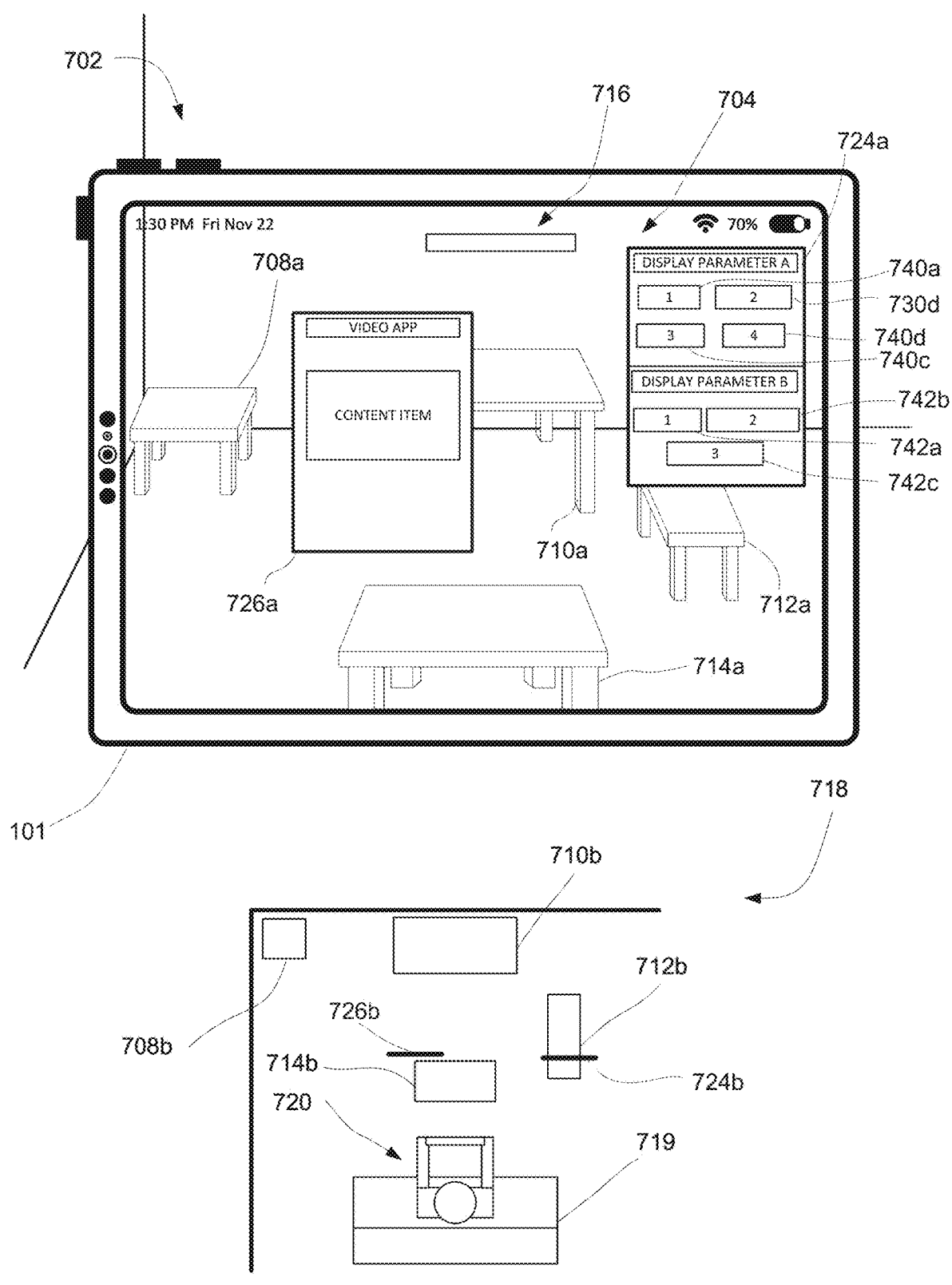

FIG. 7G illustrates the three-dimensional environment 704 including the third user interface of the control user interface 724a for changing a display parameter of a virtual environment displayed via the display generation component, after the preview of the virtual environment 722a in BKGD 3 of FIG. 7F is displayed (e.g., after a threshold time period has elapsed, such as 2 s, 5 s, 10 s, 50 s, 100 s, or another threshold time period since display of the preview). The three-dimensional environment 704 in FIG. 7G returns to the state the three-dimensional environment when the input of FIG. 7E was received. In the illustrated embodiment, when the input of FIG. 7E is received, the three-dimensional environment 704 includes no virtual environment and/or a current immersion level is zero. As such, in the illustrated embodiment of FIG. 7G, the three-dimensional environment 704 returns to a state in which no virtual environment is displayed and/or a current immersion level is zero.

Figure 7H:
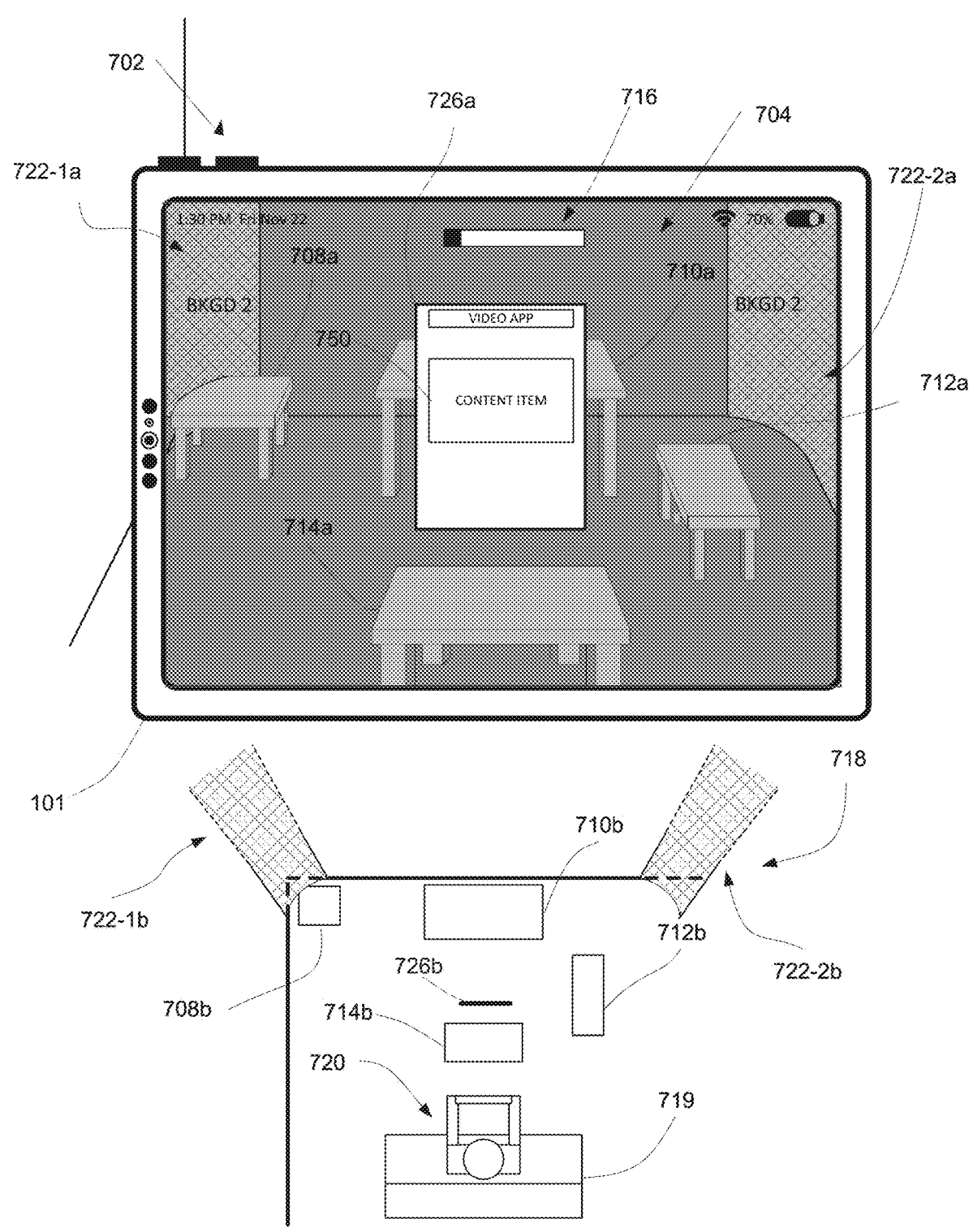
Figure 8C:
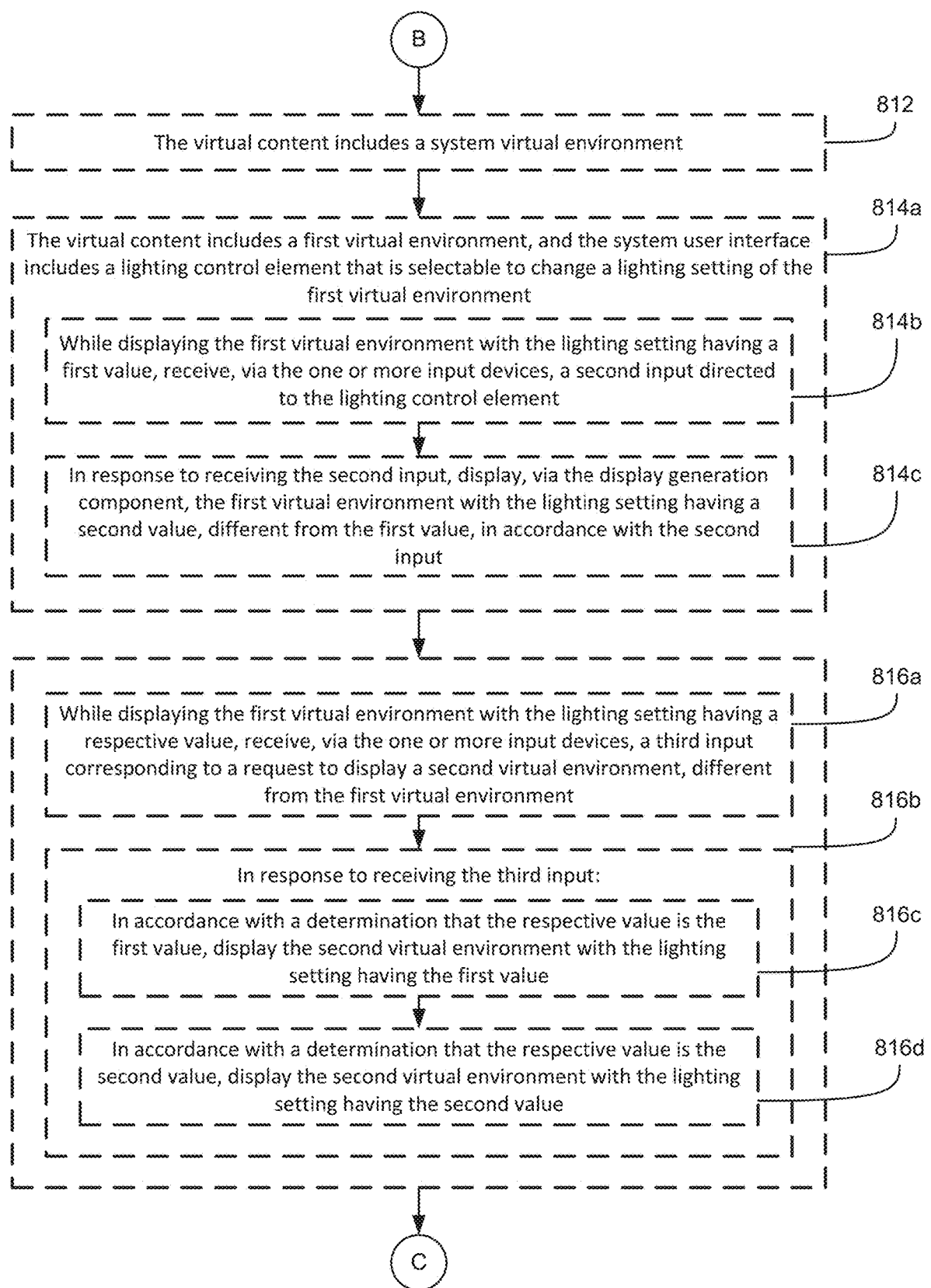
Figure 8D:
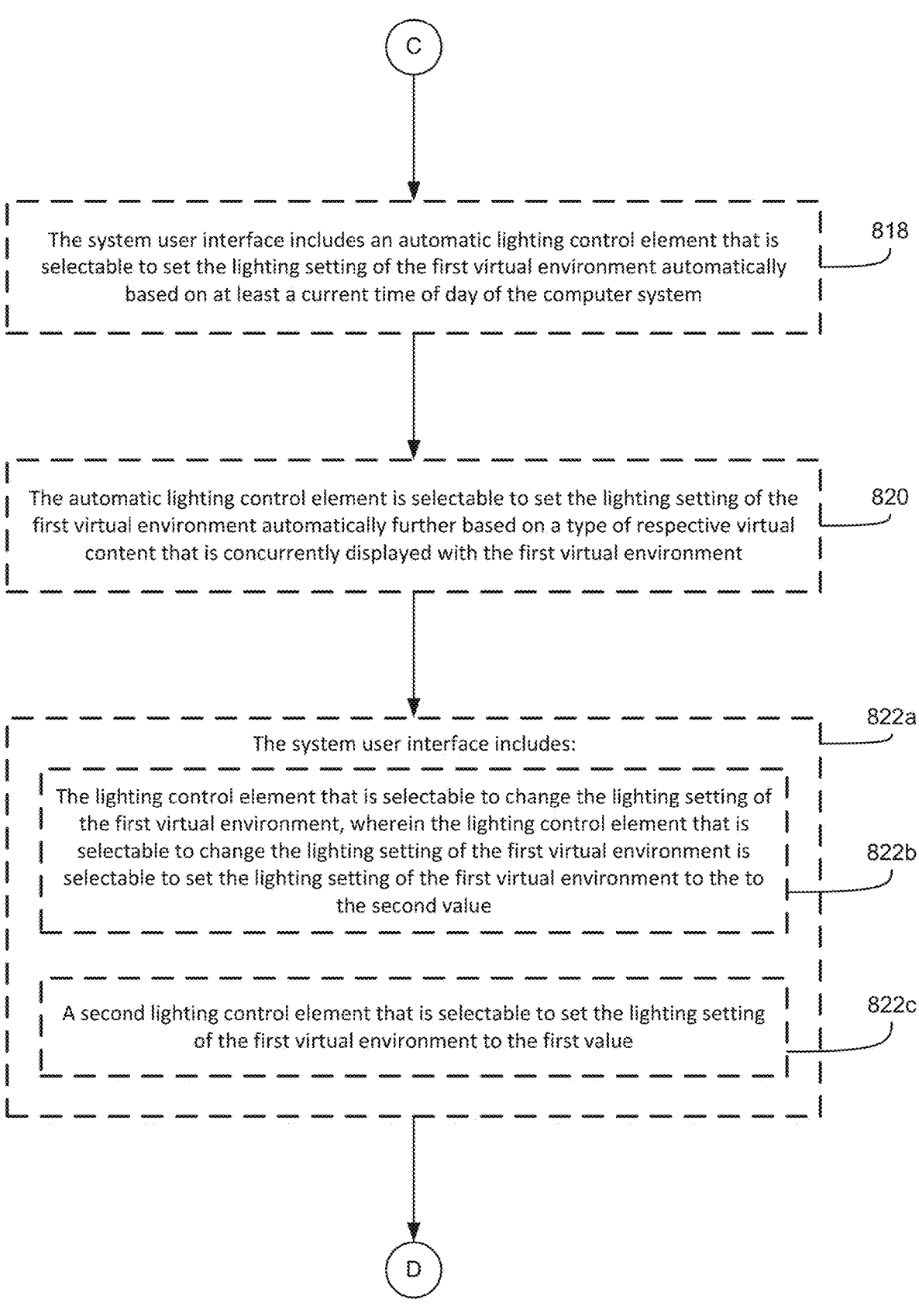
Figure 8F:
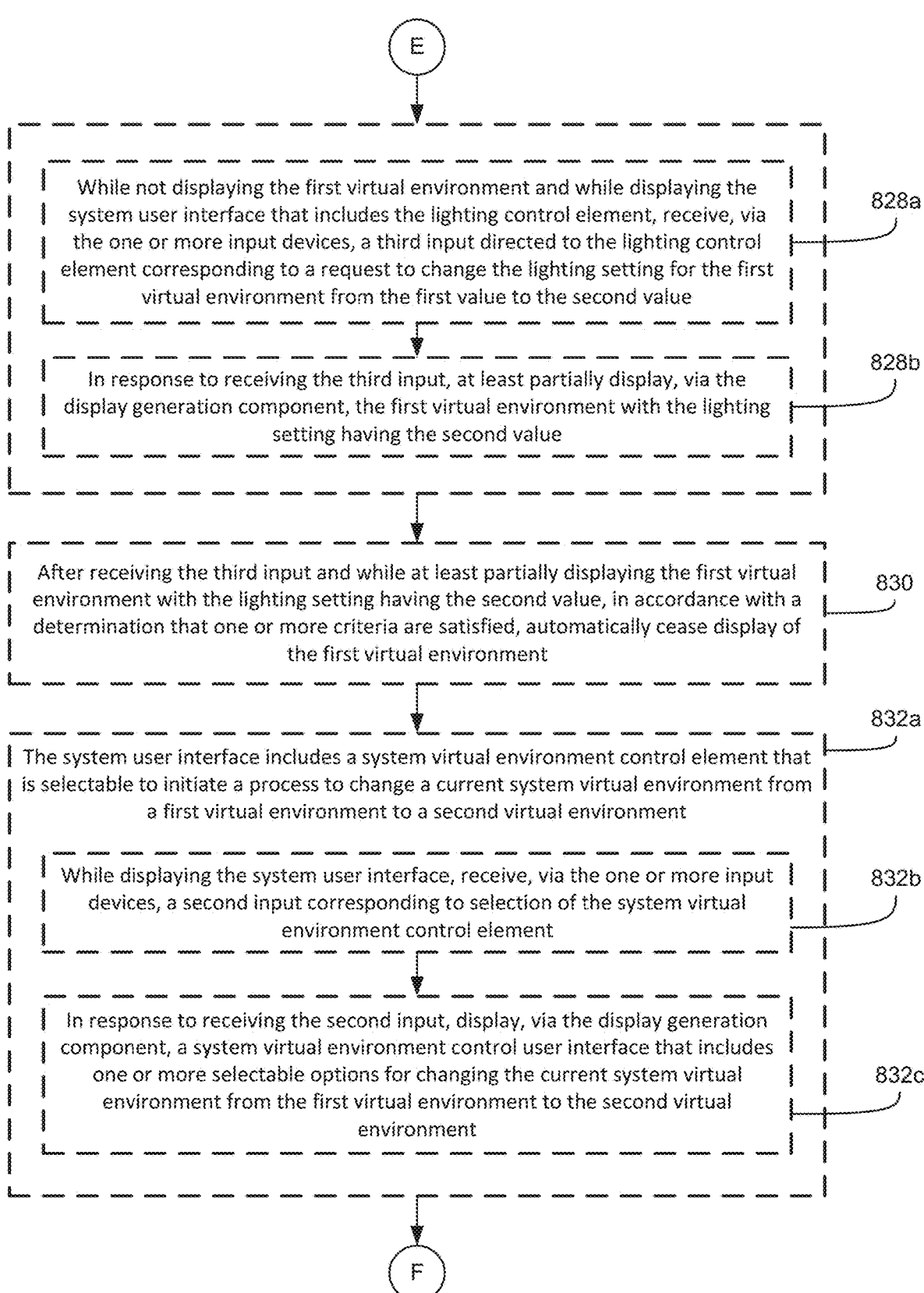
Figure 8G:
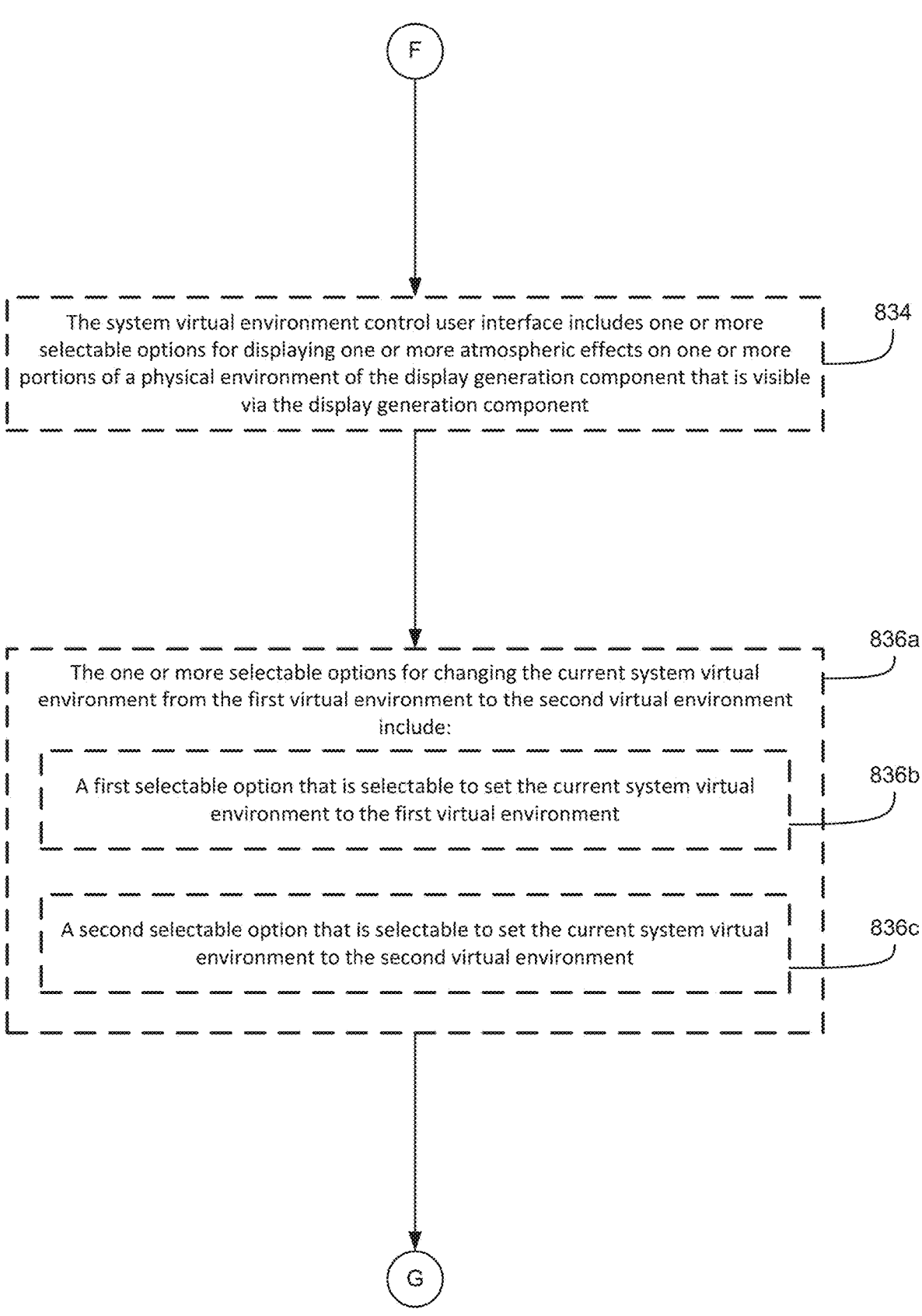
Figure 8H:
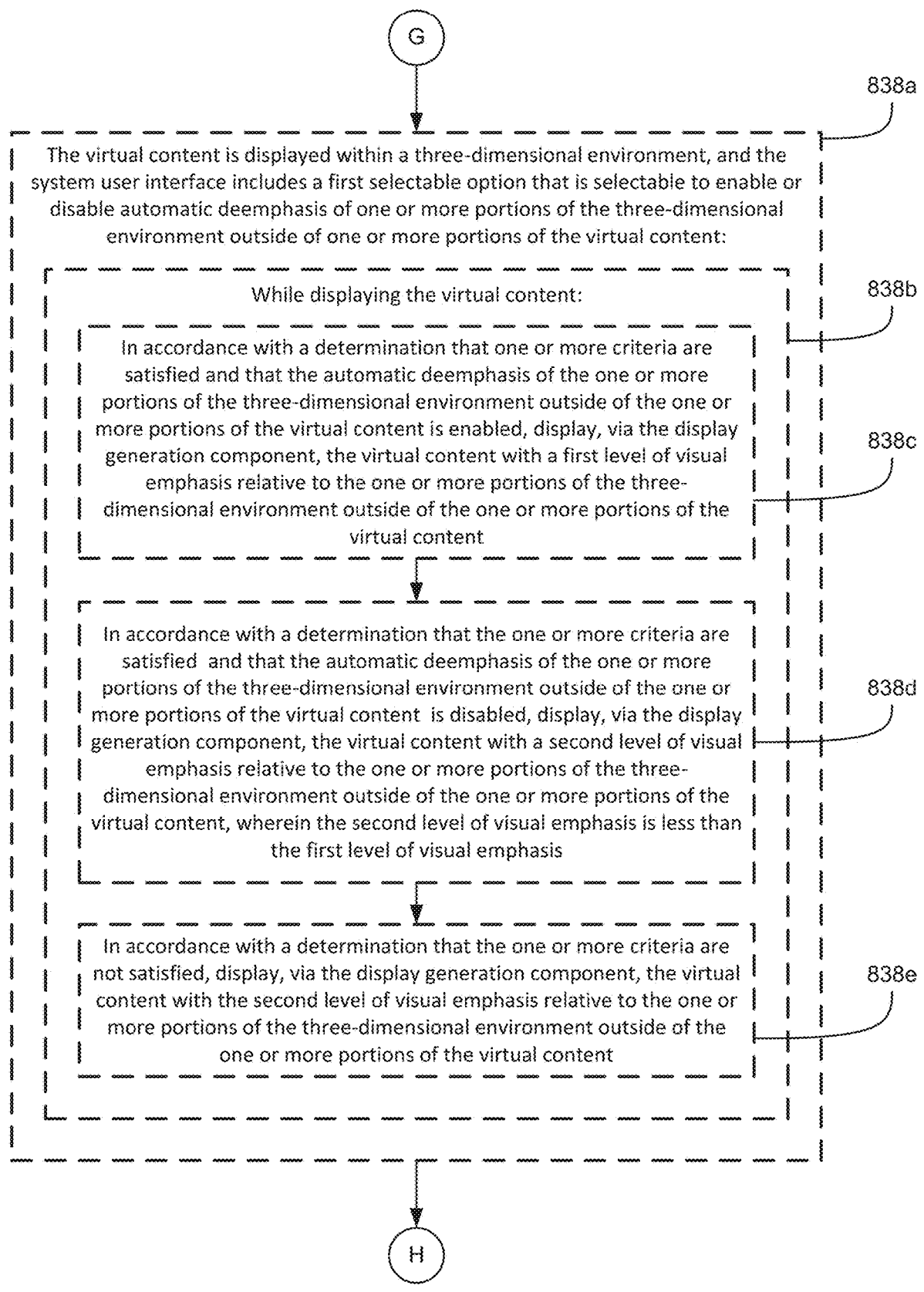

FIG. 7H illustrates the three-dimensional environment 704 in response to input directed to the auto-dim user interface element 728c of FIG. 7A (e.g., the user attention 730b and/or the input from the hand 732 of FIG. 7A) and the content item 750 of the video application user interface 726a is playing. In the illustrated embodiment in FIG. 7H, both the virtual environment 722-1a, 722-2a and portions of the physical environment are reduced in visual prominence (e.g., reduced in brightness and/or dimmed), while the video application user interface 726a (e.g., a user interface of an application) is not reduced in visual prominence (e.g., reduced in brightness and/or dimmed). In some embodiments, the parts of the video application user interface 726a are dimmed while the content item 750 of the video application user interface 726a is not dimmed. Also, in FIG. 7H, the virtual environment 722-1a, 722-2a has transitioned from BKGD 1 (of FIG. 7A) to BKGD 2, while maintaining the same level of immersion. The transition optionally includes the virtual environment 722-1a, 722-2a transitioning from display mode 1 option 736a of FIG. 7C (e.g., a simulated light (e.g., including a simulated light source at a first level of brightness), simulated daytime lighting, or simulated daylight lighting setting) to display mode 2 option 736b of FIG. 7C (e.g., a simulated dark (e.g., including a simulated light source at a second level of brightness lower than the first level of brightness), a simulated nighttime, or a simulated nightlight lighting setting). Further details with reference to the types of lighting settings and the reducing in visual prominence are discussed with reference to the method 800.

It should be noted that, in some embodiments, the user interfaces discussed above such as the control center user interface 724a and the video application user interface 726a are displayed in the three-dimensional environment 704 in an orientation facing the viewpoint of the user 720 (e.g., normals of the control center user interface 724a and/or the video application user interface 726a intersect with and/or are directed toward the viewpoint of the user 720).

Further details with reference to aspects of the illustrated embodiments of FIGS. 11A-11F, in addition to other aspects of the disclosed embodiments, are discussed with reference to the method 800.

FIGS. 8A-8I is a flowchart illustrating an exemplary method of facilitating immersion control for a virtual environment in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system in communication with a display generation component and one or more input devices. For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users. In some embodiments, the one or more input devices include an electronic device or component capable of receiving a user input (e.g., capturing a user input or detecting a user input) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, touch sensors (e.g., a touch screen, track-pad). In some embodiments, the hand tracking device is a wearable device, such as a smart glove. In some embodiments, the hand tracking device is a handheld input device, such as a remote control or stylus.

In some embodiments, while displaying, via the display generation component, virtual content (e.g., a virtual setting, and/or a virtual environment or virtual elements that enhance a physical environment (e.g., AR setting), as described in more detail below) at a first level of immersion (e.g., corresponding to a level of immersing a user of the computer system into a virtual environment or other virtual content, as described below), such as three-dimensional environment 704 in FIGS. 7A and 7A1, the computer system displays (802a), via the display generation component, a system user interface of the computer system, wherein displaying the system user interface includes displaying an immersion control element (e.g., a slider, a dial, a toggle, a segmented control, or another type of control element) configured to control a level of immersion at which the computer system displays the virtual content, such as the control center user interface 724a in FIGS. 7A and 7A1. In some embodiments, the computer system is displaying the virtual content in a three-dimensional environment. In some embodiments, the three-dimensional environment is an extended reality (XR) environment, such as a virtual reality (VR) environment, a mixed reality (MR) environment, or an augmented reality (AR) environment. The virtual content is optionally any type of content that is not in a physical environment of the user and/or computer system. For example, the virtual content is optionally a virtual representation of a place corresponding to a geographical location and/or an atmosphere corresponding to the place at a particular time (e.g., the hill on which the "HOLLYWOOD" sign in Hollywood, California exists during a sunny day or a shore of Lake Houston in Houston, Texas, in the evening time corresponding to evening at the shore), or a user interface of an application on the computer system (e.g., a messaging application, a content playback application, or a presentation application). The system user interface is optionally a virtual interface that displays control elements for controlling one or more aspects or functionalities (e.g., a volume control element or a focus control element) of the computer system. As used herein, the term "or" optionally corresponds to the inclusive "or". In some embodiments, the system user interface, though being a virtual element, is optionally separate and/or distinct from the virtual content. For example, when the system user interface is displayed, the system user interface is optionally displayed in a constant state of immersion regardless of the level of immersion at which the virtual content is displayed. As such, the system user interface and/or one or more elements of the system user interface are optionally displayed with a constant display characteristic, regardless of a change in a display characteristic of other virtual elements displayed via the display generation component based on immersion, as will be described later.

In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed. In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed.

In some embodiments, while displaying the virtual content at the first level of immersion and the system user interface including the immersion control element, the computer system receives (802b), via the one or more input devices, an input directed to the immersion control element, such as user attention 730a in FIGS. 7A and 7A1. In some embodiments, the input directed to the immersion control element includes or is an air gesture or a gaze input from a user. In some embodiments, the input directed to the immersion control element includes user attention directed to the immersion control element (e.g., sight or gaze directed to the immersion control element), a hand of a user in a particular pose (e.g., raised at a position in front of the user, in a pre-pinch hand shape, or the hand of the user in a pinch hand shape for a time period) at greater than a threshold hand distance (e.g., 0.2 cm, 0.5 cm, 1 cm, 2 cm, 3 cm, 5 cm, 10 cm, 20 cm, 40 cm, 100 cm, 200 cm or 500 cm) from the immersion control element, or any combination of the user attention, the hand of the user in the particular pose, and/or the hand of the user greater the threshold hand distance. In addition, in some embodiments, the input directed to the immersion control element includes vector data corresponding to movement of the user's hand in a particular pose in a particular direction and/or movement of the user's attention in a particular direction, to signify a user's request to modify the immersion level via interacting with the immersion control element. For example, the immersion control element is optionally a horizontal or vertical slider bar that, while the computer system displays the virtual content at the first level of immersion, displays an indication or control element of the slider at a first position on the horizontal or vertical slider bar that corresponds to the first level of immersion. The immersion control element is optionally configured to be modified in response to the input directed to the immersion control element. In some embodiments, the input directed to the immersion control element includes vector data corresponding to data of movement of a user's hand in a particular pose in a particular direction and/or from a first location to a second location and/or movement of the user's attention in a particular direction from a first location to a second location, so as to correspond to a request to move the position of the slider to a position and/or in a direction corresponding to the vector data (e.g., move the slider control element rightward, optionally corresponding to increased immersion, in accordance with rightward movement of the hand of the user, and move the slider control element leftward, optionally corresponding to reduced immersion, in accordance with leftward movement of the hand of the user). As another example, in some embodiments, the input directed to the immersion control element includes attention of a user directed to the slider control element, a user's hand in a particular pose such as a pinch hand shape, and movement of the user's hand in a direction while in the particular pose (e.g., corresponding to a pinch hand shape). In some embodiments, the direction and/or magnitude of the change in the immersion/immersion control element is based on the direction and/or magnitude of the hand movement. In some embodiments, the input directed to the immersion control element includes touch inputs detected on a touch-sensitive surface (e.g., a touch screen). In some embodiments, the input directed to the immersion control element includes a user pressing down on a control element on a mouse (e.g., a left-click). In some embodiments, the input directed to the immersion control element is a gaze input without including other inputs such as an air gesture.

In some embodiments, in response to receiving the input directed to the immersion control element, the computer system displays (802c), via the display generation component, the virtual content at a second level of immersion, different from the first level of immersion, in accordance with the input, such as the three-dimensional environment 704 in FIG. 7B. For example, the input directed to the immersion control element optionally corresponds to a request to reduce a level of immersion (e.g., a leftward or downward movement of the hand of the user). When the input directed to the immersion control element corresponds to a request to reduce a level of immersion while the computer system is displaying the virtual content at the first level of immersion, the computer system optionally displays the immersion control element modified in accordance with the reduction and/or displays the virtual content at a second level of immersion that is lower than the first level of immersion. Further, when the display generation component displays the virtual content at the second level of immersion, and the second level of immersion is lower than the first level of immersion, the display generation component optionally displays less virtual content and/or more portions of the physical environment of the user. For example, the portions of the physical environment (e.g., real environment) become less obscured by the virtual content (e.g., virtual environment) as compared with the first level of immersion, the virtual content becomes more transparent at the second level of immersion than at the first level of immersion, the angular range of the virtual content displayed via the display generation component is decreased relative to the angular range at the first level of immersion, and/or the proportion of the field of view displayed via the display generation component that is consumed by the virtual environment is decreased. As another example, the input directed to the immersion control element optionally corresponds to a request to increase a level of immersion. When the input directed to the immersion control element corresponds to a request to increase a level of immersion while the computer system is displaying the virtual content at the first level of immersion, the computer system optionally displays the immersion control element modified in accordance with the increase and/or displays the virtual content at a second level of immersion that is higher than the first level of immersion. Further, when the display generation component displays the virtual content at the second level of immersion, and the second level of immersion is higher than the first level of immersion, the display generation component optionally displays more virtual content and/or fewer portions of the physical environment of the user. For example, the portions of the physical environment (e.g., real environment) become more obscured by the virtual content (e.g., virtual environment) as compared with the first level of immersion, the virtual content becomes less transparent at the second level of immersion than at the first level of immersion, the angular range of the virtual content displayed via the display generation component is increased relative to the angular range at the first level of immersion, and/or the proportion of the field of view displayed via the display generation component consumed by the virtual environment is increased. With respect to the immersion control element, in some embodiments, the immersion control element is optionally a slider bar in which a slider control element of the slider bar is at a first position that corresponds to the first level of immersion. As such, in response to receiving the input directed to the immersion control element, the slider control element of the slider bar is optionally displayed at a second position on the slider bar, different from the first position, where the second position on the slider bar corresponds to the second level of immersion different from the first level of immersion.

Changing a level of immersion of virtual content in response to receiving the input directed to an immersion control element allows the user to easily control a level of immersion while using the computer system and reduces errors in immersion control.

In some embodiments, the virtual content is a virtual reality experience in which a physical environment of the display generation component is not visible (804a), such as the corner table 708b obscured from view in the three-dimensional environment 704 of FIGS. 7A and 7A1 (e.g., the display of the virtual reality (VR) experience (e.g., virtual content) obscures display of the physical environment via active or passive passthrough by way of the display generation component where the virtual content is displayed via the display generation component), while displaying the virtual content at the first level of immersion, the virtual content is displayed within an augmented reality experience in which the physical environment of the display generation component is visible (804b), such as the desk 710 that is visible in FIGS. 7A and 7A1, (e.g., the display of the augmented reality (AR) experience does not (fully) obscure display of the physical environment via active or passive passthrough by way of the display generation component so as to inhibit one or more physical objects from being visible via the display generation component), while displaying the virtual content at the first level of immersion, the virtual content occupies a first proportion of the augmented reality experience (804c), such as the virtual environment 722-1a, 722-1b in FIGS. 7A and 7A1 (e.g., the display device simultaneously displays a VR and an AR experience, and the VR experience consumes a first proportion of the AR experience, such as 10%, 20%, 30% or 40% of the AR experience), and in response to receiving the input directed to the immersion control element, changing a proportion of the augmented reality experience that is occupied by the virtual content to a second proportion, different from (e.g., less than or greater than) the first proportion, in accordance with the input (804d) (e.g., such as 20%, 30%, 50%, 70% or 80% of the AR experience), such as the increase in space occupied by the virtual environment 722a in FIG. 7B from the space occupied by the virtual environment 722-1a,722-2a in FIGS. 7A and 7A1. In some embodiments, the amount of the change in the AR experience is proportional (e.g., indirectly proportional) to the change in the immersion level resulting from the input directed to the immersion control element. For example, when the immersion level increases, the AR experience optionally decreases in proportion to the change in the immersion level. Changing a proportion of the augmented reality experience that is occupied by the virtual content in response to receiving an input directed to an immersion control element increases user control of the AR/VR experience via reduction of inputs involved with modifying the AR/VR experience, and may decrease user fatigue or discomfort from usage of the computer system.

In some embodiments, in response to receiving the input directed to the immersion control element (806a), in accordance with a determination that the input corresponds to a request to change a level of immersion of the virtual content by a first amount (e.g., increase immersion from 0, 3, 5, 10 or 20% immersion to 50, 60, 70, 80 or 100% immersion, or decrease immersion analogously), the virtual content is displayed at a third level of immersion (806b), such as the immersion of the virtual environment 722a in FIG. 7B, and in accordance with a determination that the input corresponds to a request to change the level of immersion of the virtual content by a second amount (e.g., increase immersion from 0, 3, 5, 10 or 20% immersion to 50, 60, 70, 80 or 100% immersion, or decrease immersion analogously), different from the first amount, the virtual content is displayed at a fourth level of immersion, different from the third level of immersion (806c), such as the immersion of the virtual environment of FIG. 7E, which is no immersion. As such, the immersion level of the virtual content can be adjusted through a range of values. Changing a level of immersion of the virtual content by amounts based on an input directed to the immersion control element increases user control of the virtual experience via reduction of inputs involved with modifying the level of immersion and may decrease user fatigue or discomfort from usage of the computer system.

In some embodiments, the virtual content includes a user interface of an application (808) (e.g., an email, Internet, or content playback application). The display of the user interface is optionally changed in immersion level (e.g., transparency or another aspect of immersion discussed above with reference to steps 802(s)) based on the input directed to the immersion control element, such as the video application user interface 726a of FIGS. 7A and 7A1. For example, the user interface of the application optionally occupies a larger portion of the three-dimensional environment and/or display area and/or field of view of the user if the input directed to the immersion control element is an input to increase immersion, or occupies a smaller portion of the three-dimensional environment and/or display area and/or field of view of the user if the input directed to the immersion control element is an input to decrease immersion. Changing a level of immersion of a user interface of an application by an amount based on an input directed to the immersion control element increases user control of the virtual experience via reduction of inputs involved with modifying the level of immersion and may decrease user fatigue or discomfort from usage of the computer system.

In some embodiments, the virtual content includes a first user interface of a first application, and a second user interface of a second application, different from the first application (810) (e.g., user interfaces of applications such as described with reference to step(s) 808, such as one or more of the video application user interface 726a of FIGS. 7A and 7A1. The display of the first and second user interfaces are optionally changed in immersion level (e.g., transparency or another aspect of immersion discussed above) based on the input directed to the immersion control element. The immersion level for both user interfaces optionally changes in the same way and/or by the same amount in response to the input directed to the immersion control element. For example, the user interfaces of the applications optionally occupy a larger portion of the three-dimensional environment and/or display area and/or field of view of the user if the input directed to the immersion control element is an input to increase immersion, or occupies a smaller portion of the three-dimensional environment and/or display area and/or field of view of the user if the input directed to the immersion control element is an input to decrease immersion Changing a level of immersion of user interfaces of multiple different applications by an amount based on an input directed to the immersion control element increases user control of the virtual experience for multiple applications without separate inputs for doing so, and may decrease user fatigue or discomfort from usage of the computer system.

In some embodiments, the virtual content includes a system virtual environment (812) (e.g., a virtual place, setting, and/or atmosphere displayed via the display generation component of the computer system such as described with reference to FIGS. 7A-7H and/or with reference to steps 802(s)), such as the background 1 (BKGD1) in the virtual environment 722-1a, 722-2a of FIGS. 7A and 7A1. For example, the system virtual environment optionally includes a virtual representation of a place corresponding to a geographical location and/or an atmosphere corresponding to the place at a particular time (e.g., the hill on which the "HOLLYWOOD" sign in Hollywood, California exists during a sunny day or a shore of Lake Houston in Houston, Texas, in the evening time corresponding to evening at the shore), including a simulation of objects in the place (e.g., rocks, winds, water, bugs, birds, and the like that is characteristic of the simulated place). The user can interact in the place (e.g., walk, move, turn) and the computer system optionally changes display based on the user interaction with the place. For example, when the user is immersed (e.g., fully immersed) in the virtual content and bends down towards the ground while looking at the ground, the ground optionally occupies a greater view of the display of the three-dimensional environment than when the user was not looking at the ground, so as to increase a realism of the virtual experience. Similarly, when a user walks toward an object in the system virtual environment, the object optionally occupies more display area relative to the display generation component, so as to increase a realism of the virtual experience. The system virtual environment is optionally changed in immersion level based on the input directed to the immersion control element. In addition, different applications can be placed within the same system virtual environment. For example, a user interface of a content playback application, such a user interface of a movie application and a user interface of an Internet application can be placed and/or positioned within the system virtual environment, whether concurrently or at different times. Also, it should be noted that a system virtual environment is optionally similar to or the same as the virtual environment discussed above with reference to steps 802(s), but is a virtual environment displayed when no particular virtual environment is indicated or selected to be displayed by a user at the time the virtual environment is displayed. In some embodiments, the system virtual environment is displayed (optionally by default) in response to input corresponding to a request to display a virtual environment. Changing a level of immersion of the system virtual environment by an amount based on an input directed to the immersion control element increases user control of the virtual experience via reduction of inputs involved with modifying the level of immersion and may decrease user fatigue or discomfort from usage of the computer system.

In some embodiments, the virtual content includes a first virtual environment, such as the virtual environment 722-1a,722-2a of FIGS. 7A and 7A1, and the system user interface includes a lighting control element that is selectable to change a lighting setting of the first virtual environment (814a), such as the control center user interface 724 of FIG. 7C. In some embodiments, While displaying the first virtual environment with the lighting setting having a first value optionally corresponding to different simulated times of day in the virtual environment (e.g., daytime, 1:00 pm at a California beach vs. sunset, 6 pm at the beach vs. nighttime or before sunrise, 3:00 am at the beach) (e.g., a first brightness, a first color, and/or a first amount of virtual objects (e.g., dew or no dew on a ground of the first virtual environment or sunshine or no sunshine displayed by the display generation component)), the computer system receives (814b), via the one or more input devices, a second input directed to the lighting control element, such as user attention 730d of FIG. 7C. In some embodiments, in response to receiving the second input, the computer system displays (814c), via the display generation component, the first virtual environment with the lighting setting having a second value optionally corresponding to a simulated time of day in the virtual environment (e.g., daytime, 1:00 pm at a California beach vs. sunset, 6 pm at the beach vs. nighttime or before sunrise, 3:00 am at the beach) different from the first value (e.g., a second brightness, a second color, and/or a second amount virtual of objects), different from the first value, in accordance with the second input, such as background 2 (BKGD2) in the virtual environment 722-1a,722-2a of FIG. 7B. The first value and the second value is optionally associated with different lighting characteristics. For example, the first value is optionally associated with a brighter (e.g., more intensity) and/or lighter display value than the second value. Further, the second value optionally includes more virtual objects or less virtual objects than the first value. As such, the lighting setting at the first value optionally involves lighting characteristics applied to virtual objects of the first virtual environment, in addition to the controlling other features of the first virtual environment, such as an amount of virtual objects displayed in the first virtual environment. In some embodiments, in response to selection of the lighting control element that is selectable to change a lighting setting of the first virtual environment, the system user interface displays a set of selectable options for setting the lighting setting of the first virtual environment. In some embodiments, the lighting control element that is selectable to change a lighting setting of the first virtual environment is displayed concurrent with display of other selectable lighting control elements. Displaying the first virtual environment with the lighting setting having the second value after receiving the second input directed to the lighting control element when the first virtual environment is displayed with the lighting setting having the first value increases user control of the virtual experience via reduction of inputs involved with changing the lighting setting and may decrease adverse health effects on a user from usage of the computer system.

In some embodiments, while displaying the first virtual environment with the lighting setting having a respective value, the computer system receives (816*a*), via the one or more input devices, a third input corresponding to a request to display a second virtual environment (e.g., a virtual place or setting displayed via the display generation component of the computer system such as described with reference to FIGS. 7A-7H and/or with reference to the method 800), different from the first virtual environment, such as user attention 740*d* of FIG. 7E. For example, the third input is optionally selection of a selectable element corresponding to the second virtual environment that is displayed in an environment selection user interface, such as described with reference to step(s) 832-836 below. In some embodiments, in response to receiving the third input (816*b*), in accordance with a determination that the respective value is the first value, the computer system displays (816*c*) the second virtual environment with the lighting setting having the first value, such as according to display mode 2 option 736*b* of FIG. 7C, and in accordance with a determination that the respective value is the second value, the computer system displays (816*d*) the second virtual environment with the lighting setting having the second value, such as according to display mode 1 option 736*a* of FIG. 7C. As such, the lighting setting is optionally persistent across different virtual environments that are displayed. It is contemplated that, though the respective value of the lighting setting is optionally persistent when transitioning from the first virtual environment to the second virtual environment in response to the third input, in some embodiments, the respective value of the lighting setting in the second virtual environment optionally corresponds to a different time of day in the second virtual environment than the time of day corresponding to the respective value of the lighting setting in the first virtual environment. For example, when the respective value of the lighting setting in the first virtual environment is the first value (e.g., corresponding to 10 am in the first virtual environment), the second virtual environment displayed with the lighting setting having the first value optionally corresponds to a different time of day in the second virtual environment (e.g., 1 pm in the second virtual environment) than the time of day corresponding to the first value of the lighting setting in the first virtual environment. Similarly, when the respective value of the lighting setting in the first virtual environment is the second value (e.g., corresponding to 10 pm in the first virtual environment), the second virtual environment displayed with the lighting setting having the second value optionally corresponds to a different time of day in the second virtual environment (e.g., 11:30 pm in the second virtual environment) than the time of day corresponding to the second value of the lighting setting in the first virtual environment. Causing the lighting setting to be persistent across virtual environment reduces lighting disruption while switching display of virtual environments, reduces inputs involved with switching the display of virtual environments.

In some embodiments, the system user interface includes an automatic lighting control element that is selectable to set the lighting setting of the first virtual environment (e.g., to the first value or to the second value) automatically based on at least a current time of day of the computer system (818) (and/or at the location of the computer system), such as the selectable display mode 3 option 736*c* of FIG. 7*c*. For example, the current time of day is optionally determined by a global positioning system (GPS) component of the computer system. For example, at noon on a summer day in California, the lighting setting is automatically set to the first value, while at 10 pm on the same summer day in California, the lighting setting is automatically set to the second value. As such, both a time of day at the computer system and a location of the computer system are optionally utilized in determining the lighting setting of the first virtual environment when the automatic lighting control element is selected. In some embodiments, the specific times during which the lighting setting of the first virtual environment switches is user-configurable. For example, the user can set the lighting setting to automatically switch to the first value when the current time of day is 1:32 pm and/or to automatically switch to the second value when the current time of day is 8:03 pm. Additionally or alternatively, the time when the lighting setting s witches is optionally based on sunrise/sunset times at the location of the computer system and thus, optionally changes (automatically (e.g., without user input)) during the year as sunrise and sunset times change for the location of the computer system. Additionally or alternatively, the time when the lighting setting switches (automatically (e.g., without user input)) optionally changes when the location of the computer system changes (e.g., moving toward or away from the equator or to a different time zone), so as, for example, to correspond to the sunrise and sunset time of the current location of the computer system Including in the system user interface an automatic lighting control element that is selectable to set the lighting setting of the first virtual environment automatically based on a current time of day reduces undesirable lighting disruption to a user of the computer system between the physical environment of the user and the virtual environment, reduces the number of inputs involved with switching lighting settings, and reduces user fatigue or discomfort from usage of the computer system.

In some embodiments, the automatic lighting control element is selectable to set the lighting setting of the first virtual environment automatically further based on a type of respective virtual content that is concurrently displayed with the first virtual environment (820), such as the based on the video application user interface 726*a* of FIG. 7C. For example, at noon on a summer day in California, the lighting setting is automatically set to the first value (e.g., a daytime setting), when the type of respective virtual content includes or is an email application, while at the same time, when the type of respective virtual content includes or is a user interface of a movie, tv show, or video playback application, the lighting setting is automatically set to the second value (e.g., nighttime setting). As such, based upon selection of the automatic lighting control element, and a type of the respective virtual content being concurrently displayed with the first virtual environment, the lighting setting is optionally automatically set to a value that enhances an immersive experience of the user with the content playback application. Including in the system user interface an automatic lighting control element that is selectable to set the lighting setting of the first virtual environment automatically based on a current time of day and a type of virtual content being displayed reduces an amount of inputs involved with setting the lighting setting.

In some embodiments, the system user interface includes (822*a*), the lighting control element that is selectable to change the lighting setting of the first virtual environment, wherein the lighting control element that is selectable to change the lighting setting of the first virtual environment is selectable to set the lighting setting of the first virtual environment to the second value (822b) (e.g., the daytime lighting setting), such as according to display mode 1 option 736a of FIG. 7C and a second lighting control element that is selectable to set the lighting setting of the first virtual environment to the first value (822c) (e.g., the nighttime lighting setting), such as according to display mode 1 option 736a of FIG. 7C. The lighting control element and the second lighting control elements are optionally located on a level of the system user interface that is different than the immersion control element (e.g., not concurrently displayed with the immersion control element). For example, to get to these elements, as described with reference to step(s) 822, an input is optionally directed to a system environment control element (e.g., a slider, a dial, a toggle, a segmented control, or another type of control element) that is displayed in the system user interface, optionally concurrently with the immersion control element. In response to a detecting of input directed to the system environment control element, such as attention of the user and/or a hand of the user directed to the system environment control element for a period of time, the system user interface optionally displays the lighting control element and the second lighting control elements. In addition, in some embodiments, the automatic lighting control element discussed above is optionally concurrently displayed with display of the lighting control element and the second lighting control element. In some embodiments, the method includes detecting an input directed to the lighting control element or the second lighting control element, and in response to detecting the input, the computer system optionally sets the lighting setting for the first visual environment to the first value or to the second value based on which lighting control element the input is directed toward. For example, in response to detecting an input directed to the lighting control element, the computer system optionally sets the lighting setting for the first virtual environment to the second value. Likewise, in response to detecting an input directed to the second lighting control element, the computer system optionally sets the lighting setting for the first virtual environment to the first value. Displaying user selectable options for switching lighting settings increases user control of a virtual reality experience during a virtual reality experience via reduction of inputs involved with setting the lighting setting.

In some embodiments, the lighting control element that is selectable to change the lighting setting of the first virtual environment is selectable to set the lighting setting of the first virtual environment to the second value and is displayed with an appearance independent of characteristics of the first virtual environment with the lighting setting having the second value (824a), such as display mode 2 option 736b of FIG. 7C and the second lighting control element that is selectable to set the lighting setting of the first virtual environment to the first value is displayed with an appearance independent of characteristics of the first virtual environment with the lighting setting having the first value (824b), such as display mode 1 option 736a of FIG. 7C (e.g., the lighting control elements displayed in the system user interface are displayed with visual indications (e.g., glyphs) that do not include representations of a currently active or displayed virtual environment with the lighting setting having the second or first value). As another example, before the display generation component displays the first virtual environment, the system user interface including the lighting control elements is optionally displayed. The lighting control elements are optionally displayed without previews of a virtual environment, optionally because no virtual environment is currently selected, active, and/or displayed by the display generation component. In some embodiments, the lighting control elements are optionally displayed without previews of (or aspects of) a virtual environment while the display generation component displays the first virtual environment and/or while the first virtual environment is selected to be displayed in the virtual reality experience. For example, the lighting control elements optionally have the same visual appearances independent of whether the computer system is or is not displaying a virtual environment and/or independent of whether the computer system is displaying a first virtual environment or a second virtual environment. Displaying user selectable options for switching lighting settings with consistent visual appearances reduces the likelihood of errors in usage of the computer system.

In some embodiments, the system user interface includes (826a) the lighting control element that is selectable to change the lighting setting of the first virtual environment, wherein the lighting control element that is selectable to change the lighting setting of the first virtual environment is selectable to set the lighting setting of the first virtual environment to the second value (e.g., a nighttime lighting setting), and wherein the lighting control element that is selectable to set the lighting setting of the first virtual environment to the second value includes a visual representation of the first virtual environment with the lighting setting having the second value (826b), such as according to display mode 2 option 736b of FIG. 7C, and a second lighting control element that is selectable to set the lighting setting of the first virtual environment to the first value, wherein the second lighting control element that is selectable to set the lighting setting of the first virtual environment to the first value (e.g., a daytime lighting setting) includes a visual representation of the first virtual environment with the lighting setting having the first value (826c), such as according to display mode 1 option 736a of FIG. 7C. In some embodiments, the automatic lighting control element discussed above includes a visual representation of the first virtual environment with the lighting setting having the second value in a first visual portion of the automatic lighting control element and a visual representation of the first virtual environment with the lighting setting having the first value in a second visual portion of the automatic lighting control element. In some embodiments, the automatic lighting control element includes a representation of the first virtual environment with the lighting setting having a value based on the current time of day and location of the computer system. Displaying user selectable options for switching lighting settings with previews of the respective lighting settings applied to the current virtual reality experience increases user control of a virtual reality experience via reduction of inputs and potential errors involved with setting the lighting setting.

In some embodiments, while not displaying the first virtual environment and while displaying the system user interface that includes the lighting control element, the computer system receives (828a), via the one or more input devices, a third input directed to the lighting control element corresponding to a request to change the lighting setting for the first virtual environment from the first value (e.g., a daytime lighting setting) to the second value (e.g., a nighttime lighting setting), such as the user attention 730d of FIG. 7C, (e.g., the third input optionally includes one or more aspects of the input directed to the immersion control element discussed above with reference to step(s) 802, such as an air gesture or a gaze input from a user, and/or another aspect of the input directed to the immersion control element, directed to the lighting control element). In some embodiments, in response to receiving the third input, the computer system at least partially displays (828*b*) (e.g., in at least a portion of the three-dimensional environment displayed via the display generation component), via the display generation component, the first virtual environment with the lighting setting having the second value (e.g., displaying a preview of the first virtual environment with the lighting setting having the second value, outside of the system user interface, in the three-dimensional environment), such as the virtual environment of 722*a*-1,722-2*a* of FIG. 7D. In some embodiments, displaying the preview of the first virtual environment corresponds to displaying at least a portion of the first virtual environment in the three-dimensional environment. In some embodiments, the third input is received while the first virtual environment is displayed and/or active with the lighting setting of the first virtual environment having the first value concurrent with the system user interface. As such, the preview of the lighting setting at the second value optionally initiates on the first virtual environment that was already displayed when the third input was received. In some embodiments, the immersion level at which the first virtual environment was displayed when the third input was detected is increased, such as discussed with reference to step(s) 802 and 806. Displaying a preview of the first virtual environment with the lighting setting having the second value, outside of the system user interface, in response to selection of the lighting control element provides feedback about the appearance of the first virtual environment with the lighting setting applied, thereby reducing errors in usage of the computer system and reducing inputs involved with correcting such errors.

In some embodiments, after receiving the third input and while at least partially displaying the first virtual environment with the lighting setting having the second value, in accordance with a determination that one or more criteria are satisfied (such as a predetermined amount of time (e.g., 0.1 s, 0.5 s, 1 s, 2 s, 5 s, 10 s, 45 s) having elapsed while partially displaying the first virtual environment with the lighting setting having the second value and/or since receiving the third input), the computer system automatically ceases display of the first virtual environment (830), such as illustrated with the lack of the virtual environment 722 in FIG. 7E (and/or returning to the display state the display generation component had when the third input was received, which is optionally a display state that includes display of the first virtual environment with the lighting setting having the first value or a display state that does not include display of the first virtual environment outside of the system user interface (e.g., different from the representation(s) of the first virtual environment in the system user interface). In some embodiments, the immersion level corresponding to the at least partially displaying the first virtual environment with the lighting setting having the second value is decreased, such as a decrease in immersion as discussed with reference to step(s) 802 and 806. Ceasing display of a preview of the first virtual environment with the lighting setting having the second value outside of the system user interface in response to satisfaction of certain criteria reduces inputs for returning to the prior state of the computer system, and reduces interruption of the user experience with the computer system.

In some embodiments, the system user interface includes a system virtual environment control element that is selectable to initiate a process to change a current system virtual environment from a first virtual environment to a second virtual environment (832*a*), such as the change background option 736*d* of FIG. 7C (e.g., the system virtual environment control element is optionally concurrently displayed with the display of the lighting control element, the second lighting control element, and/or the automatic lighting control element discussed with reference to step(s) 820 and 822). In some embodiments, while displaying the system user interface (and optionally while the display generation component is displaying the first virtual environment), the computer system receives (832*b*), via the one or more input devices, a second input corresponding to selection of the system virtual environment control element, such as user attention 730*e*, (e.g., the second input optionally includes one or more aspects of the input directed to the immersion control element discussed above with reference to the step(s) 802, such as an air gesture or a gaze input from a user, and/or another aspect of the input directed to the immersion control element, directed to the system virtual environment control element).

In some embodiments, in response to receiving the second input, the computer system displays (832*c*), via the display generation component, a system virtual environment control user interface that includes one or more selectable options for changing the current system virtual environment from the first virtual environment to the second virtual environment, such as the control center user interface 724*a* of FIG. 7E, (and/or for causing display of the second virtual environment outside of the boundaries and/or region where the system user interface or the system virtual environment control user interface is/are displayed), such as the system virtual environment described with reference to step(s) 812. In some embodiments, a respective selectable option of the one or more selectable options is selectable for changing the current system virtual environment from the first virtual environment to a respective virtual environment. The system virtual environment control user interface is optionally as illustrated FIG. 7E and/or as described with reference to step(s) 834 and 836. Displaying user selectable options for switching a system virtual environment increases user control of a virtual reality experience via reduction of inputs involved with switching virtual environments.

In some embodiments, the system virtual environment control user interface includes one or more selectable options for displaying one or more atmospheric effects (e.g., a virtual reality, augmented reality, or another computer assisted reality simulation of sunshine, raining, dew, clouds, or another atmospheric effect) on one or more portions of a physical environment of the display generation component that is visible via the display generation component (834), such as the selectable options 742*a*, 742*b*, 742*c* of FIG. 7E, (e.g., the atmospheric effects are optionally applied to the physical environment visible via the display generation component rather than to a virtual environment displayed via the display generation component). For example, the atmospheric effects optionally include one or more of virtual reality (VR) or augmented reality (AR) or another computer assisted reality effects applied to the one or more portions of the physical environments to simulate the atmospheric effects. In some embodiments, the atmospheric effects include a visual modification of at least a portion of the three-dimensional environment (e.g., that is not associated with an object in the three-dimensional environment), such as portions of the three-dimensional environment corresponding to the physical environment and/or virtual content. For example, displaying an ambient lighting effect (e.g., sunrise, sunset, moonlight, starlight, or another environmental lighting effect), a fog effect, a mist effect, and/or smoke/ particle effect. In some embodiments, an atmospheric effect is one in which the air or empty space of the three-dimensional environment appears to be filled with a physical effect). The one or more selectable options for displaying the one more atmospheric effects optionally include a visual representation of the respective one or more atmospheric effects. Providing selectable options for applying atmospheric effects on a physical environment increases user control of the virtual reality/augmented reality experience via reduction of inputs involved with applying atmospheric effects and may decrease adverse health effects on the user from usage of the computer system or from the physical environment itself (e.g., reduces an amount of blue light rays incident on the user's eyes from being in the physical environment via usage of the computer system to set certain atmospheric effects) and/or decrease user fatigue or discomfort from usage of the computer system.

In some embodiments, the one or more selectable options for changing the current system virtual environment from the first virtual environment to the second virtual environment include (836a) A first selectable option that is selectable to set the current system virtual environment to the first virtual environment (836b) (e.g., the first selectable option optionally includes a visual representation (e.g., a preview) of the first virtual environment, such as a pictorial or visual preview of a California beach when the first selectable option corresponds to a virtual environment corresponding to the California beach), such as selectable option 740a of FIG. 7E, and A second selectable option that is selectable to set the current system virtual environment to the second virtual environment (836c), such as selectable option 740b of FIG. 7E. The second selectable option optionally includes a visual representation (e.g., a preview) of the second virtual environment, such as a pictorial or visual preview of a creek in Texas when the second virtual environment corresponds to a virtual environment corresponding to the creek in Texas. In some embodiments, the method includes detecting an input directed to a selectable option, such as directed to the first selectable option or to the second selectable option, and in response to detecting the input, the computer system optionally performs an operation corresponding to selection of the selectable option. For example, in response to detecting an input directed to the first selectable option, the computer system optionally sets the current system virtual environment to the first virtual environment. Likewise, in response to detecting an input directed to the second selectable option, the computer system optionally sets the current system virtual environment to the second virtual environment. Providing selectable options for setting different system virtual environments gives the user more control over virtual experiences via reduction of inputs involved with setting a system virtual environment.

In some embodiments, the virtual content (optionally including a user interface of an application) is displayed within a three-dimensional environment, and the system user interface includes a first selectable option that is selectable to enable or disable automatic deemphasis of one or more portions of the three-dimensional environment outside of one or more portions of the virtual content (836a) (such as outside of a user interface of an application (e.g., a content playback application or a photo application) optionally different from the system user interface), such as the auto-dim user interface element 728c of FIGS. 7A and 7A1. The automatic deemphasis optionally applies to one or more of virtual content such as a virtual environment and user interface(s) of applications. When multiple user interface(s) of applications are displayed via the display generation component, the automatic deemphasis optionally applies to a first user interface of a first application and does not apply to a second user of a second application, optionally based on which user interface the computer system determines the user is focused on and/or which user interface is currently being interacted with and/or consumed (e.g., the automatic deemphasis applies to the virtual content and/or objects that are not currently being interacted with and/or consumed). In some embodiments, the first selectable option is displayed concurrently with display of the lighting control element(s) discussed above.

In some embodiments, while displaying the virtual content (838b), in accordance with a determination that one or more criteria are satisfied and that the automatic deemphasis of the one or more portions of the three-dimensional environment outside of the one or more portions of the virtual content (such as outside of a user interface of an application (e.g., a content playback application or a photo application) optionally different from the system user interface) is enabled, the computer system displays (838c), via the display generation component, the virtual content with a first level of visual emphasis relative to the one or more portions of the three-dimensional environment outside of the one or more portions of the virtual content, such as the level of visual emphasis relative to the three-dimensional environment 704 outside of the video application user interface 724a in FIG. 7H. The one or more criteria optionally include a criterion that is satisfied when a user interface of a type of application, such as a content playback application, or a photo application, or an email application, or another type of application, is active and/or being interacted with and/or a criterion that is satisfied when the user interface of the type of application is currently displayed and/or active such as with respect to playing content (e.g., playing a video). The virtual content is optionally set to be displayed with the first level of visual emphasis relative to the one or more portions of the three-dimensional environment outside of the one or more portions of the virtual content by performance of the operation of deemphasizing the one or more portions of the three-dimensional environment outside of the one or more portions of the virtual content (e.g., reducing a brightness level, reducing an opacity of, reducing a clarity of (e.g., increase a blurriness of), reducing a color saturation of, changing the light setting of a virtual environment surrounding virtual content to the "DARK" setting as discussed with regard to FIG. 7H, and/or changing another lighting setting, as discussed above with regard to the first virtual environment, but applied to the one or more portions of the three-dimensional environment outside of the one or more portions of the virtual content) relative to the virtual content and/or emphasizing (e.g., increasing a brightness, size, saturation and/or another visual characteristic of the one or more portions of the virtual content (e.g., the user interface of the application)) relative to portions outside of the virtual content.

In some embodiments, in accordance with a determination that the one or more criteria are satisfied (optionally including a criterion that is satisfied when instructions to deemphasize are received at the computer system) and that the automatic deemphasis of the one or more portions of the three-dimensional environment outside of the one or more portions of the virtual content (such as outside of a user interface of an application (e.g., a content playback application or a photo application) optionally different from the system user interface) is disabled, the computer system displays (838d), via the display generation component, the virtual content with a second level of visual emphasis relative to the one or more portions of the three-dimensional environment outside of the one or more portions of the virtual content, wherein the second level of visual emphasis is less than the first level of visual emphasis, such as the level of visual emphasis relative to the three-dimensional environment 704 outside of the video application user interface 724*a* of FIGS. 7A and 7A1. The second level of visual emphasis is optionally a default level of visual emphasis that is displayed as if the one or more criteria are not satisfied. For example, the portion of the three-dimensional environment surrounding the virtual content is optionally not visually deemphasized relative to the virtual content.

In some embodiments, in accordance with a determination that the one or more criteria (optionally including the criterion that is satisfied when a user interface of a type of application, such as a content playback application, or a photo application, or an email application, or another type of application, is active and/or being interacted with and/or the criterion that is satisfied when the user interface of the type of application is currently displayed and/or active such as with respect to playing content (e.g., playing a video)) are not satisfied, the computer system displays (838*e*), via the display generation component, the virtual content with the second level of visual emphasis relative to the one or more portions of the three-dimensional environment outside of the one or more portions of the virtual content, such as the level of visual emphasis relative to the three-dimensional environment 704 outside of the video application user interface 724*a* of FIGS. 7A and 7A1. In some embodiments, the first selectable option is selectable for causing a global enablement or disablement of the automatic deemphasis. In some embodiments, individual applications are configurable to enable or disable the automatic deemphasis of the one or more portion of the three-dimensional environment outside of the one or more portions of the virtual content, independent of or overriding the selection or deselection of first selectable option. In some embodiments, when a virtual environment is displayed with the virtual content of steps(s) 838, the automatic deemphasis causes the virtual environment to be displayed with a lighting setting set to the nighttime lighting setting (optionally in addition to or alternatively to simply dimming (or equivalent) the parts of the three-dimensional environment outside of the virtual content, optionally without changing the lighting setting of the virtual environment). In some embodiments, the automatic deemphasis causes dimming (or equivalent) of the virtual environment without changing the lighting setting. In some embodiments, the automatic deemphasis happens without user input to specifically deemphasize, such as user input directed to the first selectable option or another selectable option for configuring automatic deemphasis on a per application basis, as discussed above (e.g., user input might be to do something else, like play the content). As such, the automatic deemphasis optionally occurs in response to the computer system receiving user input corresponding to a request to perform an action different from automatic deemphasis. In some embodiments, when the one or more criteria subsequently become not satisfied (such as a closure of a content playback application or user attention directed outside of the content playback application for a period of time (e.g., 0.9 s, 10 s, 30 s, or another period of time), the various changes we described above, with reference to the deemphasis applied to the one or more portions of the three-dimensional environment outside of the one or more portions of the virtual content are optionally reduced or eliminated (optionally without user input specifically or exclusively for re-emphasizing the one or more portions of the three-dimensional environment). Providing a selectable option for automatically changing a visual emphasis outside of a portion of virtual content increases user control of the virtual experience via reduction of inputs involved with changing the visual emphasis, decreases distraction outside of the virtual content, and may decrease user fatigue or discomfort from usage of the computer system.

In some embodiments, while the system user interface is not displayed and while displaying, via the display generation component, first virtual content (e.g., a first virtual environment, the first virtual environment at a first level of immersion, a first set of user interfaces of applications, a first atmospheric effect, a first place, or other virtual content as described above with reference to step(s) 802), the computer system receives (840*a*), via the one or more input devices, a second input corresponding to a request to display the system user interface (e.g., the second input optionally includes one or more aspects of the input directed to the immersion control element discussed above with reference to step(s) 802, corresponding to a request to display the system user interface), such as an input including one or more aspects user attention 730*a* of FIGS. 7A and 7A1. In some embodiments, in response to receiving the second input, the computer system displays (840*b*), via the display generation component, the first virtual content and the system user interface (e.g., the system user interface optionally obscures or is displayed in front of (e.g., between the viewpoint of the user and) the first virtual content), such as the control center user interface 724*a* of FIGS. 7A and 7A1.

In some embodiments, while the system user interface is not displayed and while displaying, via the display generation component, second virtual content (e.g., a different virtual environment, the first virtual environment at a second level of immersion, different from the first level of immersion, a second set of user interfaces of applications, a second atmospheric effect, a second place, or other virtual content as described above with reference to step(s) 802) that is different from the first virtual content, the computer system receives (840*c*), via the one or more input devices, a third input corresponding to a request to display the system user interface (e.g., the third input optionally includes one or more aspects of the second input and/or the input directed to the immersion control element discussed above with reference to step(s) 802, corresponding to a request to display the system user interface), such as an input including one or more aspects of input from the hand 732 of FIGS. 7A and 7A1. In some embodiments, in response to receiving the third input, the computer system displays (840*d*), via the display generation component, the second virtual content and the system user interface, such as the control center user interface 724*a* of FIGS. 7A and 7A1 (e.g., the system user interface optionally obscures or is displayed in front of (e.g., between the viewpoint of the user and) the second virtual content). In some embodiments, the system user interface, when displayed, is viewpoint locked, as described earlier in this present disclosure. Providing accessibility to a system control user interface from different virtual experiences displayed by the display generation component provides consistent interaction with the computer system, thus reducing errors in usage of the computer system.

In some embodiments, the second input and the third input correspond to gaze inputs (842), such as an input including one or more aspects user attention 730*a* of FIGS. 7A and 7A1. The second and third inputs optionally correspond to attention of a user of the computer system being directed to specific portions of the first virtual content or the second virtual content, respectively, such as a portion of the first virtual content or the second virtual content that is gaze-selectable to initiate display of the system user interface in the three-dimensional environment simulated and/or displayed via the display generation component, optionally without input other than user attention (e.g., attention of the user directed to the gaze-selectable portions for longer than a time threshold such as 0.1, 0.3, 0.5, 1, 2, 3, 5, 10, 20 or 30 seconds, or another time threshold). In an example, the second and third inputs optionally include user attention directed up at a top-center region of the field of view of the user in the three-dimensional environment, optionally for a predetermined time period (e.g., 0.5 s, 1 s, 5 s, 20 s, or another predetermined time period), which optionally causes display of a system user interface such as a control center user interface, such as illustrated and discussed with reference to FIGS. 7A and 7B. In some embodiments, the second and third inputs correspond to attention of the user of the computer system discussed above, in addition to hand gestures performed by the user, such as the air gestures directed to the immersion control element discussed above with reference to step(s) 802, directed to the portion of the first virtual content or the second virtual content that is gaze-selectable. Indeed, in some embodiments, the portion of the first virtual content or the second virtual content that is gaze-selectable to cause display of the system user interface is alternatively or additionally, selectable via gaze and air gestures. Displaying a system control user interface in response to detection of attention of a user (e.g., a gaze of a user) is an efficient manner of displaying the system user interface, may reduce user fatigue or exertion for displaying the system user interface, and increases user control via reduction of inputs involved with accessing a control user interface.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9E illustrate examples for controlling audio settings of a virtual environment in accordance with some embodiments.

Figure 9A:
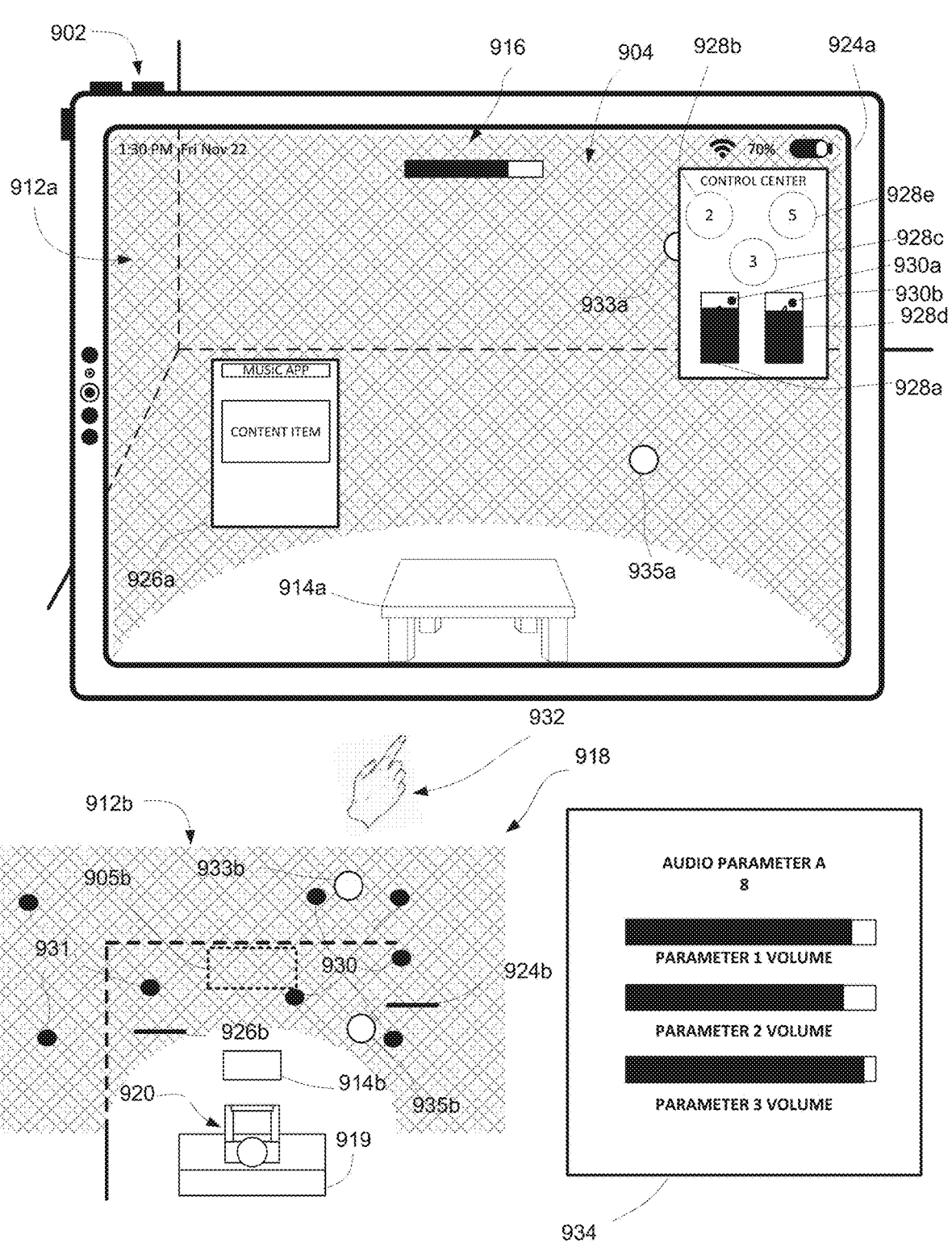
FIGS. 9A-9E illustrate examples for controlling audio settings of a virtual environment in accordance with some embodiments.

FIG. 9A illustrates a computer system 101 in a real world environment 902 displaying, via a display generation component (e.g., display generation component 120 of FIG. 1), a three-dimensional environment 904 including a virtual environment 912a displayed at a first level of immersion, as indicated by the current immersion level indicator 916, in accordance with some embodiments. As described above with reference to FIGS. 1-6, the computer system 101 optionally includes a display generation component (e.g., a touch screen) and a plurality of image sensors (e.g., image sensors 314 of FIG. 3). Further, the computer system 101 is optionally as described with reference to FIGS. 1-7. In some embodiments, the user interfaces described below are implemented on a head-mounted display that includes a display generation component that displays the user interfaces to the user and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user). The figures herein illustrate a three-dimensional environment that is presented to the user by computer system 101 (and displayed by the display generation component of computer system 101) and an overhead view 918 of the physical environment and the three-dimensional environment 904 associated with computer system 101 to illustrate the relative locations of objects in the real world environment and the locations of virtual objects in the three-dimensional environment.

As shown in FIG. 9A, computer system 101 captures one or more images of the real world environment 902 around computer system 101 (e.g., operating environment 100), including one or more objects in the real world environment 902 around computer system 101. In some embodiments, computer system 101 displays representations of the real world environment 902 in three-dimensional environment 904. For example, three-dimensional environment 904 includes a room including a representation of desk 914a (desk 914b in overhead view 916), which is optionally a photorealistic representation, simplified representation, cartoon, caricature, passthrough visibility of desk 914a through display generation component 120 and/or the like. Though not shown in the three-dimensional environment 904, the room includes a real table 905b, which is obscured by the virtual environment 912a, as shown in the overhead view 918. Further, as shown in overhead view 918, user 920 of computer system 101 is seated on couch 919 and is interacting with the computer system 101 (e.g., holding or wearing computer system 101 if, for example, computer system 101 were a head-mounted device).

In the illustrated embodiment in FIG. 9A, the computer system 101 displays the three-dimensional environment 904 including a first user interface of a control center user interface 924a (e.g., a system user interface) and a music application user interface 926a (e.g., a user interface of an application, optionally including one or both of video and audio content for playback). As shown in the overhead view 918, the control center user interface 924b and the video application user interface 926b are located at different positions in the three-dimensional environment 904. The first user interface of the control center user interface 924a includes an immersion slider user interface element 928a, a system environment setting user interface element 928b, an auto-dim user interface element 928c, a volume control user interface element 928d, and a focus mode control user interface element 928e. The immersion slider user interface element 928a is displayed at a first fill-level corresponding to a current immersion level (e.g., the current immersion level shown in immersion indicator 916). Further details about immersion are described with reference to method 1000. Likewise, the volume control user interface element 928d includes display of a slider at a position that corresponds to a current volume level of the computer system 101. Further details about the control center user interface 924a are described with reference to methods 800, 1000, and/or 1200.

In the illustrated embodiment in FIG. 9A, the computer system 101 is associated with audio parameters. For example, in the audio legend 934, an audio parameter A is set to 8, which optionally corresponds to a representative number of point sources of audio simulated in the three-dimensional environment 904 (e.g., the sets 930, 931 corresponding to point sources of audio, generated by computer system 101 as part of virtual environment 912a); an audio parameter 1, corresponding to a system environment volume or a virtual environment volume, is set to a first level; an audio parameter 2, corresponding to an application volume level, such as a volume level of a user interface of an application in the three-dimensional environment, such as the music application user interface 926a, is set to a first level; and audio parameter 3, corresponding to a volume associated with virtual avatars (e.g., virtual representations of persons 933a and 935a in the three-dimensional environment 904 and/or virtual environment 912a simulated by the computer system 101), is set to a first level. Further details about the point sources of audio are described with reference to methods 800, 1000, and/or 1200.

In the illustrated embodiment in FIG. 9A, user attention 930a, 930b and input from the hand 932 of the user 920 are alternatively directed to the immersion slider user interface element 928a and the volume control user interface element 928d. In some embodiments, the user interface elements are selectable via user attention or input from the hand 932, or via a combination of both user attention 930a, 930b and input from the hand 932, and such characteristics of the input and processes for detecting such inputs are described in more detail with reference to the method 800, 1000, and/or 1200.

Figure 9B:
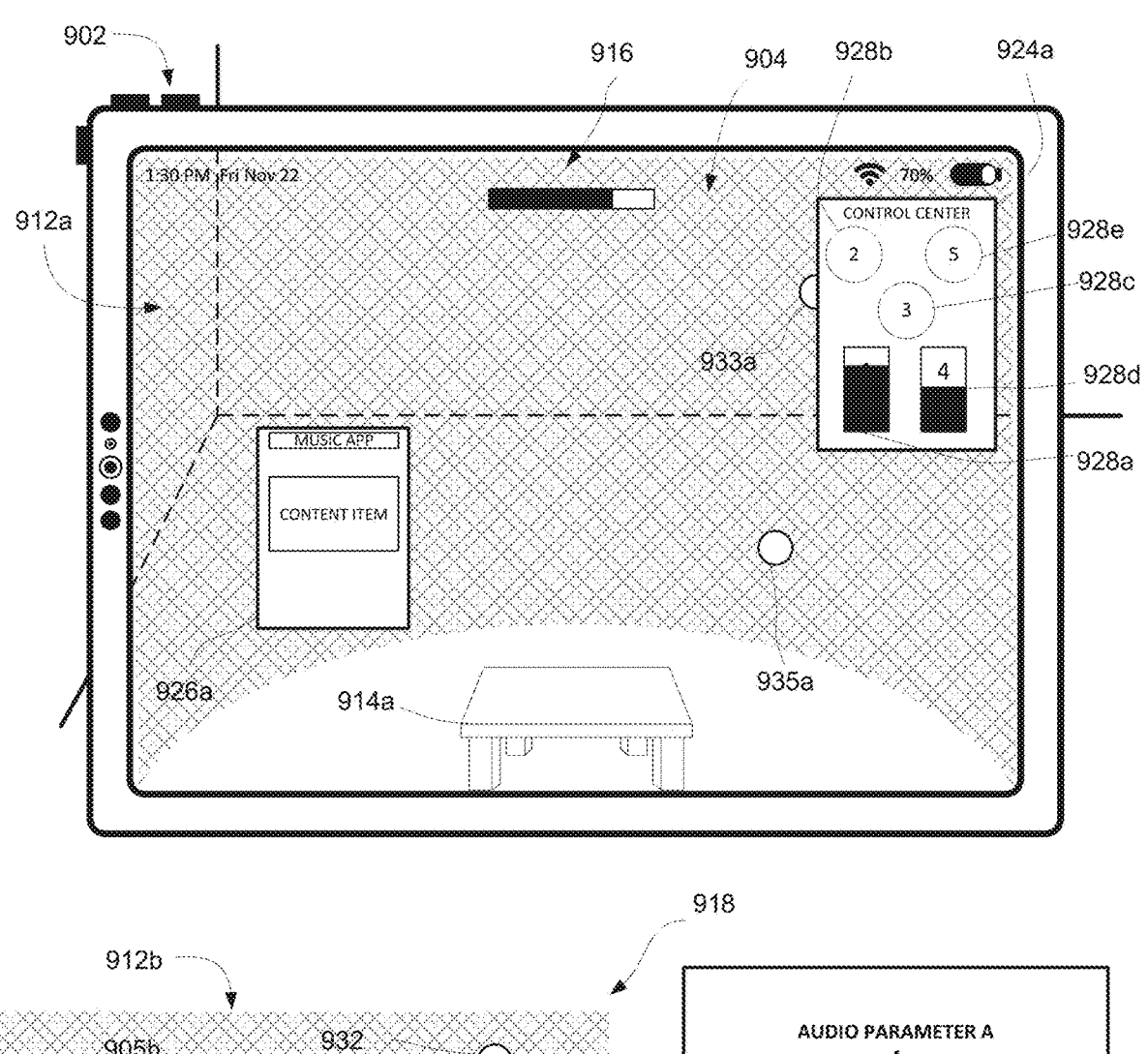

FIG. 9B illustrates the three-dimensional environment 904 and associated volume levels in response to user input directed at the volume control user interface element 928d of FIG. 9A. In the illustrated embodiment in FIG. 9B, the user input directed at the volume control user interface element 928d was an input to decrease the volume level of the computer system 101. In response, the audio parameter A, corresponding to the representative number of point sources of audio (e.g., sets 930, 931) in the three-dimensional environment 904 (e.g., generated by computer system 101 as part of presenting virtual environment 912a) is now set to 4; the audio parameter 1, corresponding to the system environment volume or the virtual environment volume, is decreased to a second audio level lower than the first level it had in FIG. 9A; the audio parameter 2, corresponding to the application volume level, such as a volume level of a user interface of an application in the three-dimensional environment, such as the music application user interface 926a, is decreased to a second audio level lower than the first level it had in FIG. 9A and the audio parameter 3, corresponding to the volume associated with virtual avatars, is decreased to a second audio level lower than the first level it had in FIG. 9A. It is contemplated that one or more of the audio parameter A, audio parameter 1, audio parameter 2, and audio parameter 3 are changed in amplitude and/or frequencies in similar or different amounts, optionally in the same direction (e.g., increased or decreased), in response to the input directed at the volume control user interface element 928d from FIG. 9A to FIG. 9B.

Figure 9C:
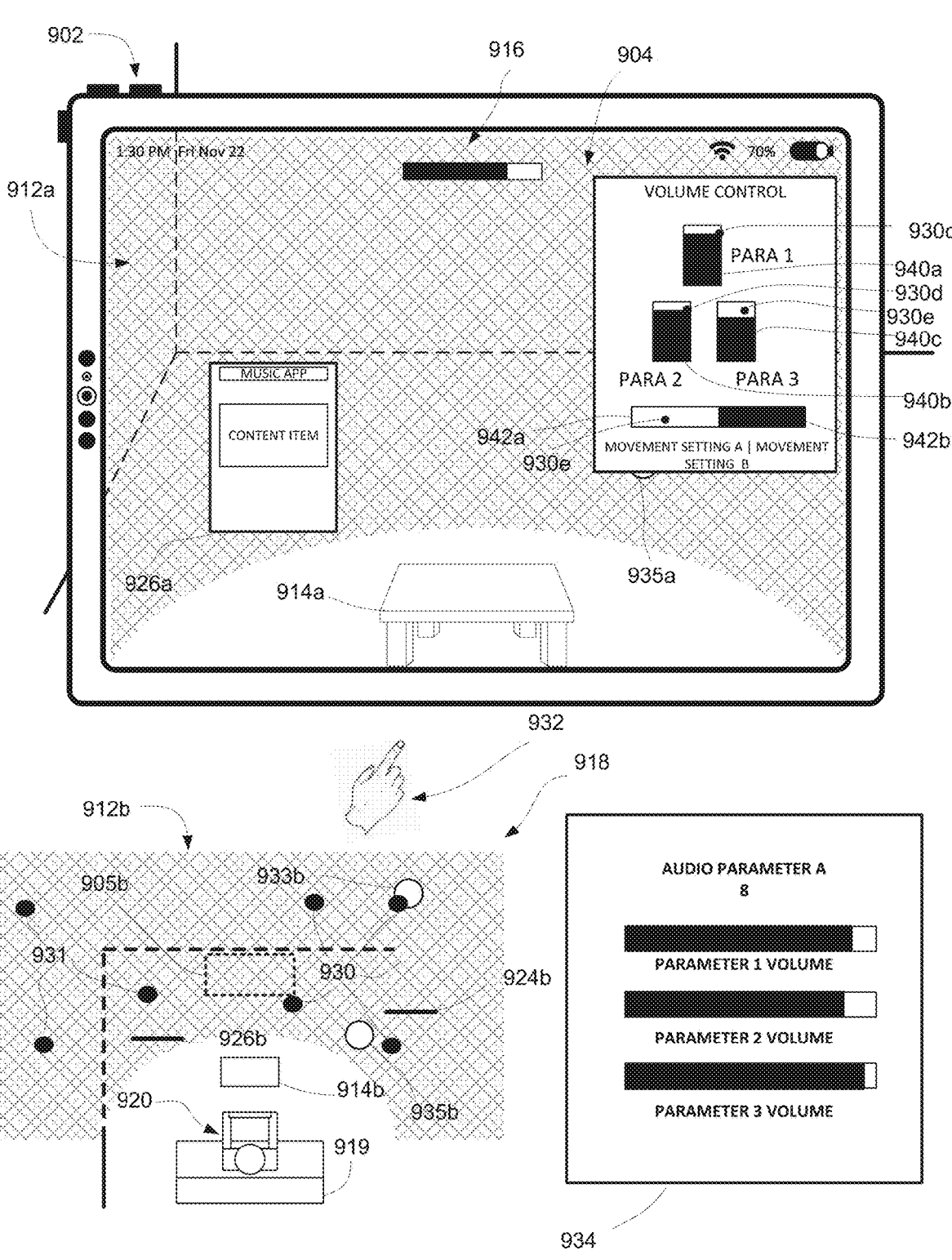

FIG. 9C illustrates the three-dimensional environment 904 in response to a user input direct at the volume control user interface element 928d of FIG. 9A. For example, such input is optionally a gaze and dwell input, such as a gaze of the user and a dwell thereof on the volume control user interface element 928d for a threshold period of time, or another type of input, such as described with reference to the method 1000. In the illustrated embodiment in FIG. 9C, a second user interface of the control center user interface 924a is displayed, which includes a volume control user interface element 940a corresponding to audio parameter 1, a volume control user interface element 940b corresponding to audio parameter 2, a volume control user interface element 940c corresponding to audio parameter 3, and a selectable option for enabling a movement setting A 942a (e.g., a head-tracked spatial audio setting in which audio associated with the virtual environment 912a is optionally generated based on a pose of a head of the user 920 of the computer system 101 optionally with reference to or relative to virtual objects or other virtual content in the virtual environment 912a, such as the music user interface of the application 926a and the representative point sources of audio (e.g., sets 930, 931)) for which the computer system generates audio) or a movement setting B 942b (e.g., a non-head-tracked spatial audio setting in which audio associated with the virtual environment 912a is optionally generated independent of the pose of the head of the user 920 of the computer system 101 optionally with reference to or relative to virtual or other virtual content in the virtual environment 912a, such as the music user interface of the application 926a and the representative point sources of audio (e.g., sets 930, 931)) for which the computer system generates audio). The slider levels of the volume control user interface element 940a corresponding to audio parameter 1, the volume control user interface element 940b corresponding to audio parameter 2, and the volume control user interface element 940c corresponding to audio parameter 3 respectively correspond to the parameter levels in the audio legend 934.

In the illustrated embodiment in FIG. 9C, user attention 930c, 930d, 930e and input from the hand 932 of the user 920 are alternatively directed to the volume control user interface element 940a corresponding to audio parameter 1, the volume control user interface element 940b corresponding to audio parameter 2, the volume control user interface element 940c corresponding to audio parameter 3, and the selectable option for enabling the movement setting A 942a or the movement setting B 942b. In some embodiments, the user interface elements are selectable via user attention or input from the hand 732, or via a combination of both user attention 930c, 930d, 930e and input from the hand 932, and such characteristics of the input and processes for detecting such inputs are described in more detail with reference to the method 800, 1000, and/or 1200.

Figure 9D:
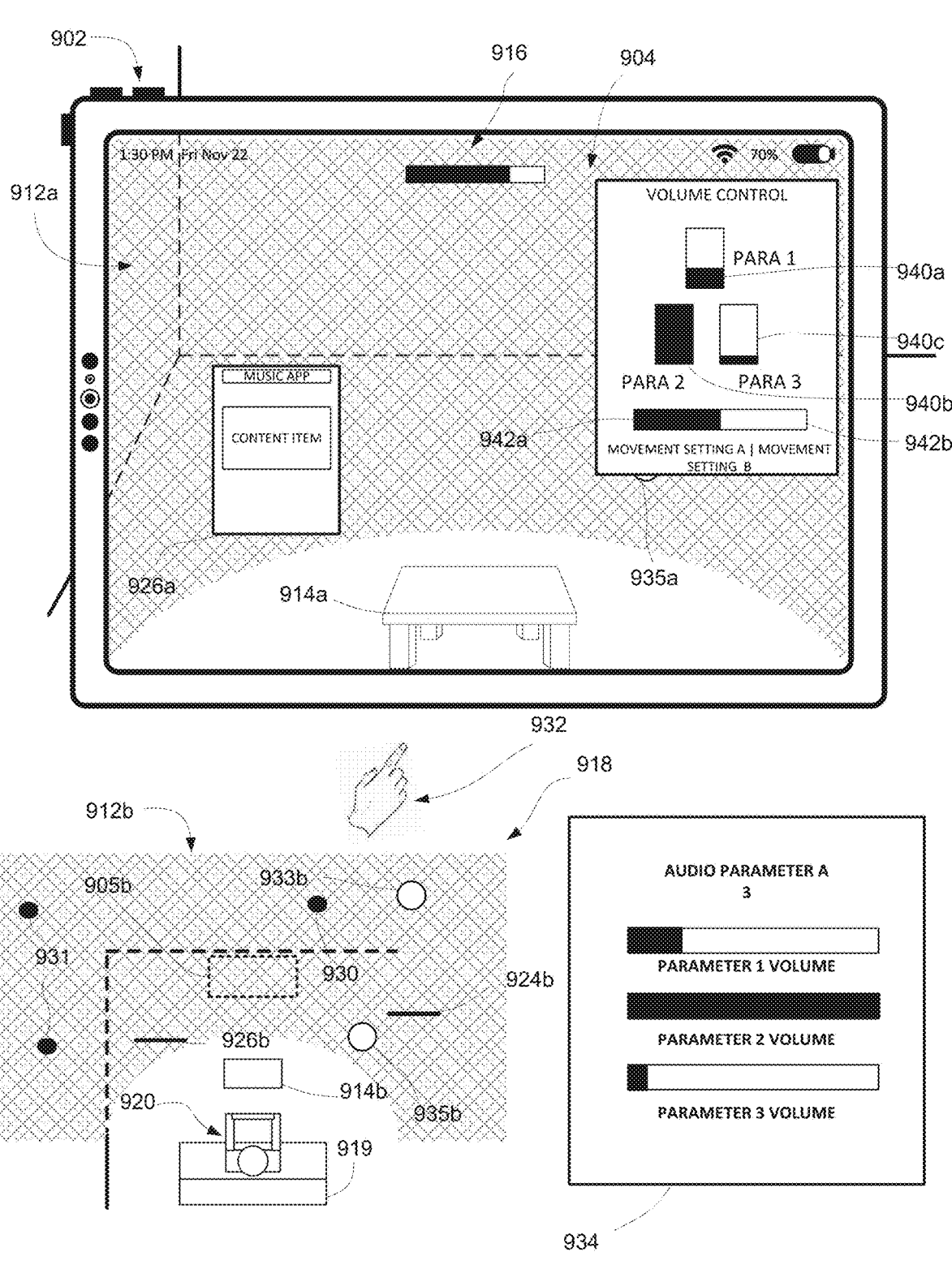

FIG. 9D illustrates the three-dimensional environment 904 in response to the user inputs in FIG. 9C alternatively directed to the volume control user interface element 940a corresponding to audio parameter 1, the volume control user interface element 940b corresponding to audio parameter 2, the volume control user interface element 940c corresponding to audio parameter 3, and the selectable option for enabling the movement setting A 942a or the movement setting B 942b, in accordance with some embodiments. In the illustrated embodiment in FIG. 9D, the slider of the volume control user interface element 940a corresponding to the system environment volume or the virtual environment volume is decreased in fill level in response to a user input corresponding to a request to decrease the slider from FIG. 9C, the slider of the volume control user interface element 940b corresponding to the application volume level, such as a volume level of a user interface of an application in the three-dimensional environment, such as the music application user interface 926a, is increased in fill level in response to a user input corresponding to a request to increase the slider from FIG. 9C, the slider of the volume control user interface element 940c corresponding to the volume associated with virtual avatars is decreased in fill level in response to a user input corresponding to a request to decrease the slider from FIG. 9C, and the selectable option for enabling the movement setting A 942a or the movement setting B 942b is set to enabling the movement setting B in response to user input directed at the selectable option for enabling the movement setting A 942a or the movement setting B 942b. Thus, even though some or all of the slider elements 940a-940c are changed together and in the same direction in response to the slider input directed to the slider, such as in FIG. 9A, slider elements 940a-940c are able to be changed individually and/or in different directions/magnitudes in response to inputs directed to the individual sliders, such as in FIG. 9C. Also, the representative point sources of audio (e.g., sets 930, 931) for which the computer system generates audio also changed in number (and optionally volume) from 8 in FIG. 9C to 3 in FIG. 9D optionally in accordance with the change to the slider of the volume control user interface element 940*a*.

FIG. 9D1 illustrates similar and/or the same concepts as those shown in FIG. 9D (with many of the same reference numbers). It is understood that unless indicated below, elements shown in FIG. 9D1 that have the same reference numbers as elements shown in FIGS. 9A-9E have one or more or all of the same characteristics. FIG. 9D1 includes computer system 101, which includes (or is the same as) display generation component 120. In some embodiments, computer system 101 and display generation component 120 have one or more of the characteristics of computer system 101 shown in FIGS. 9A-9E and display generation component 120 shown in FIGS. 1 and 3, respectively, and in some embodiments, computer system 101 and display generation component 120 shown in FIGS. 9A-9E have one or more of the characteristics of computer system 101 and display generation component 120 shown in FIG. 9D1.

In FIG. 9D1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 9A-9E.

In FIG. 9D1, display generation component 120 is illustrated as displaying content that optionally corresponds to the content that is described as being displayed and/or visible via display generation component 120 with reference to FIGS. 9A-9E. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 9D1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 9D1. Because display generation component 120 is optionally a head-mounted device, the field of view of display generation component 120 is optionally the same as or similar to the field of view of the user.

In FIG. 9D1, the user is depicted as performing an air pinch gesture (e.g., with hand 932) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 9A-9E.

In some embodiments, computer system 101 responds to user inputs as described with reference to FIGS. 9A-9E.

In the example of FIG. 9D1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 9A-9E and/or described with reference to the corresponding method(s) are optionally implemented on computer system 101 and display generation unit 120 in a manner similar or analogous to that shown in FIG. 9D1.

Figure 9E:
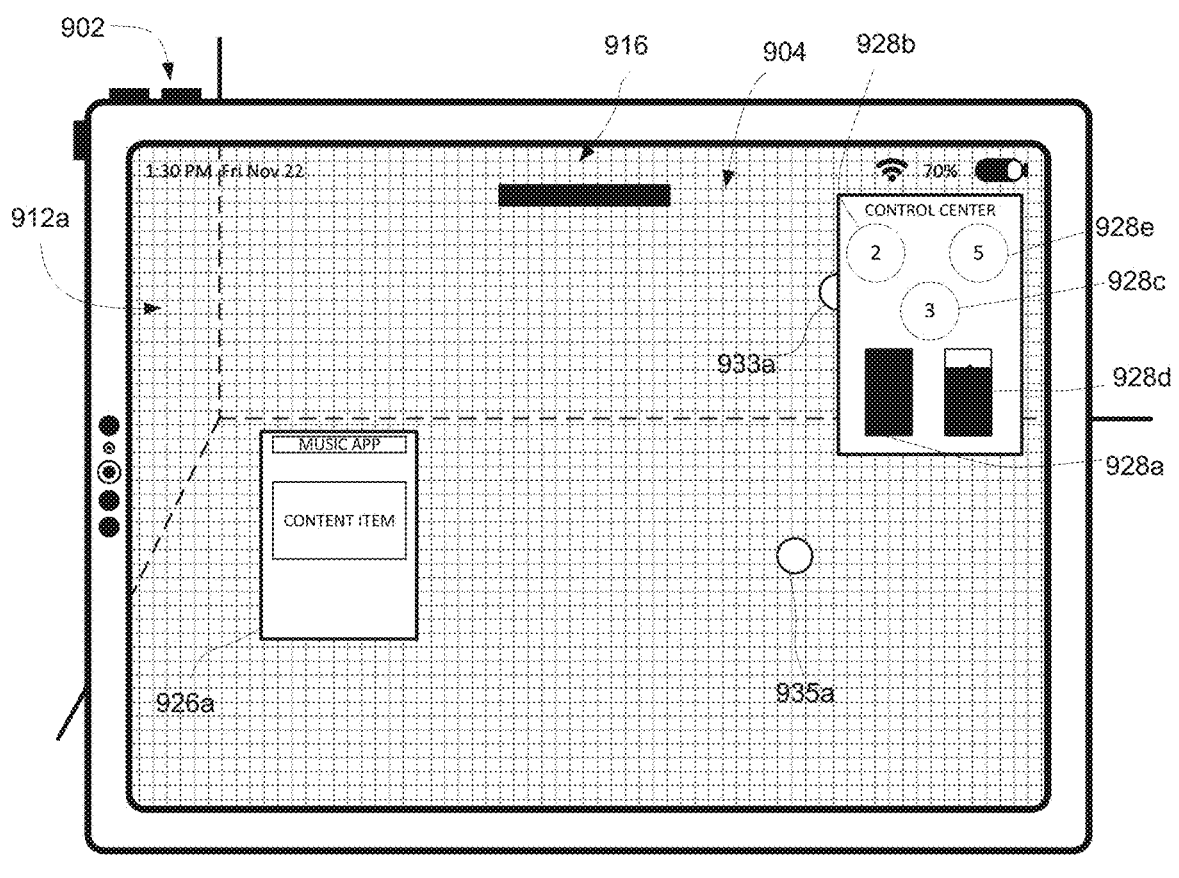
Figure 9E:
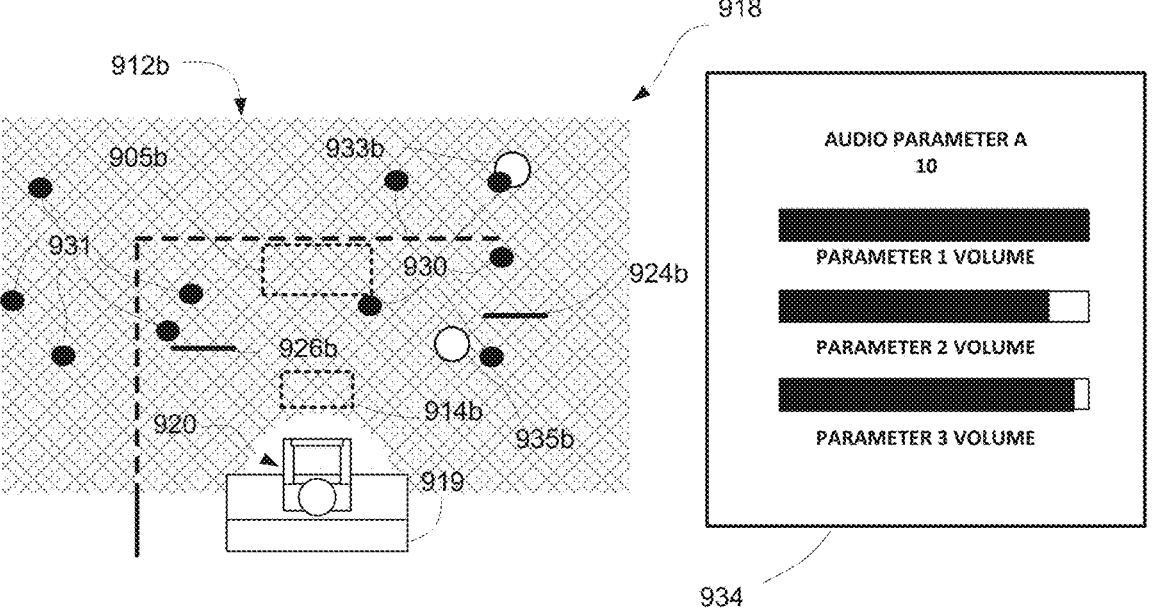
Figure 10B:
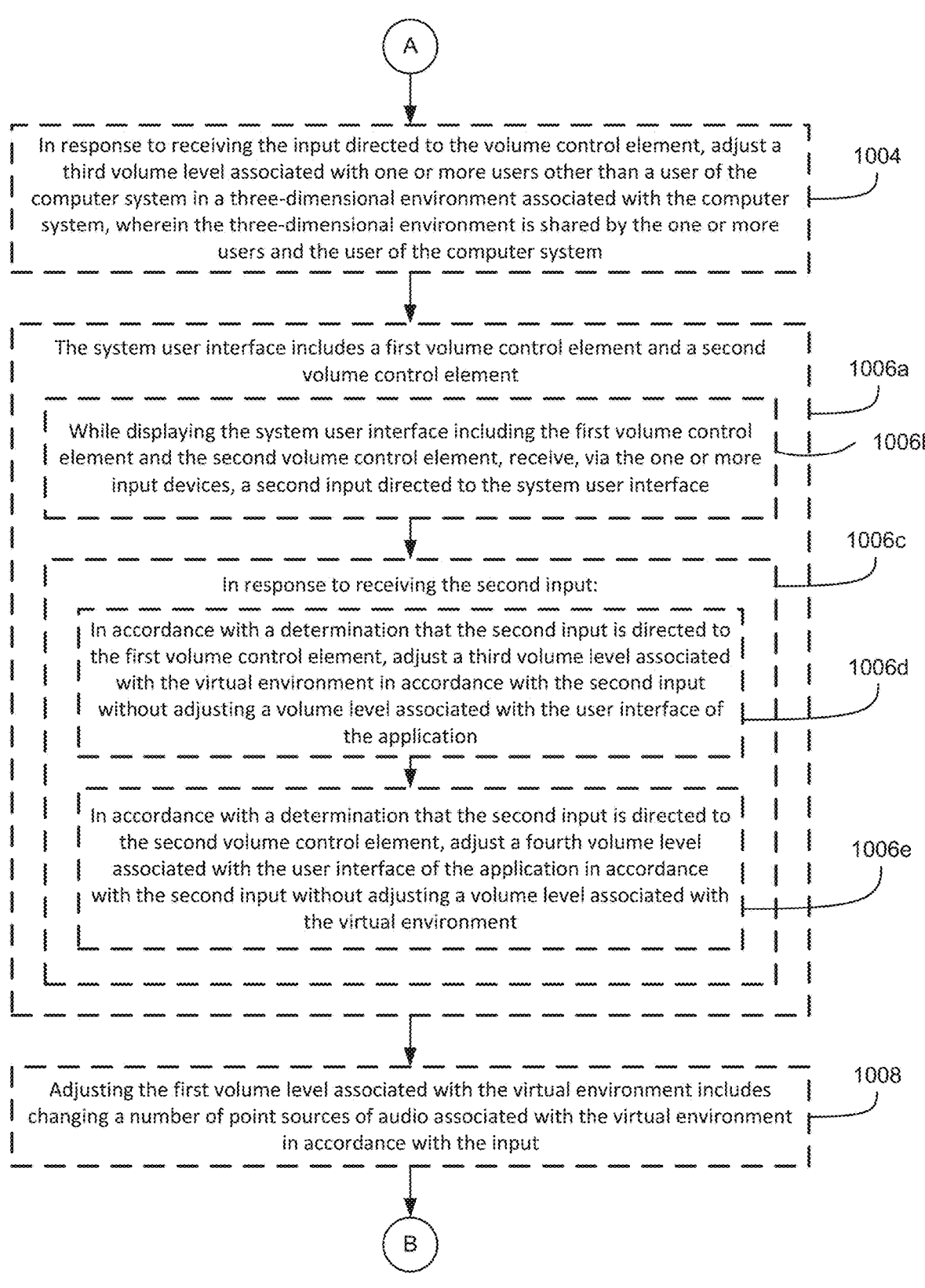
Figure 10D:
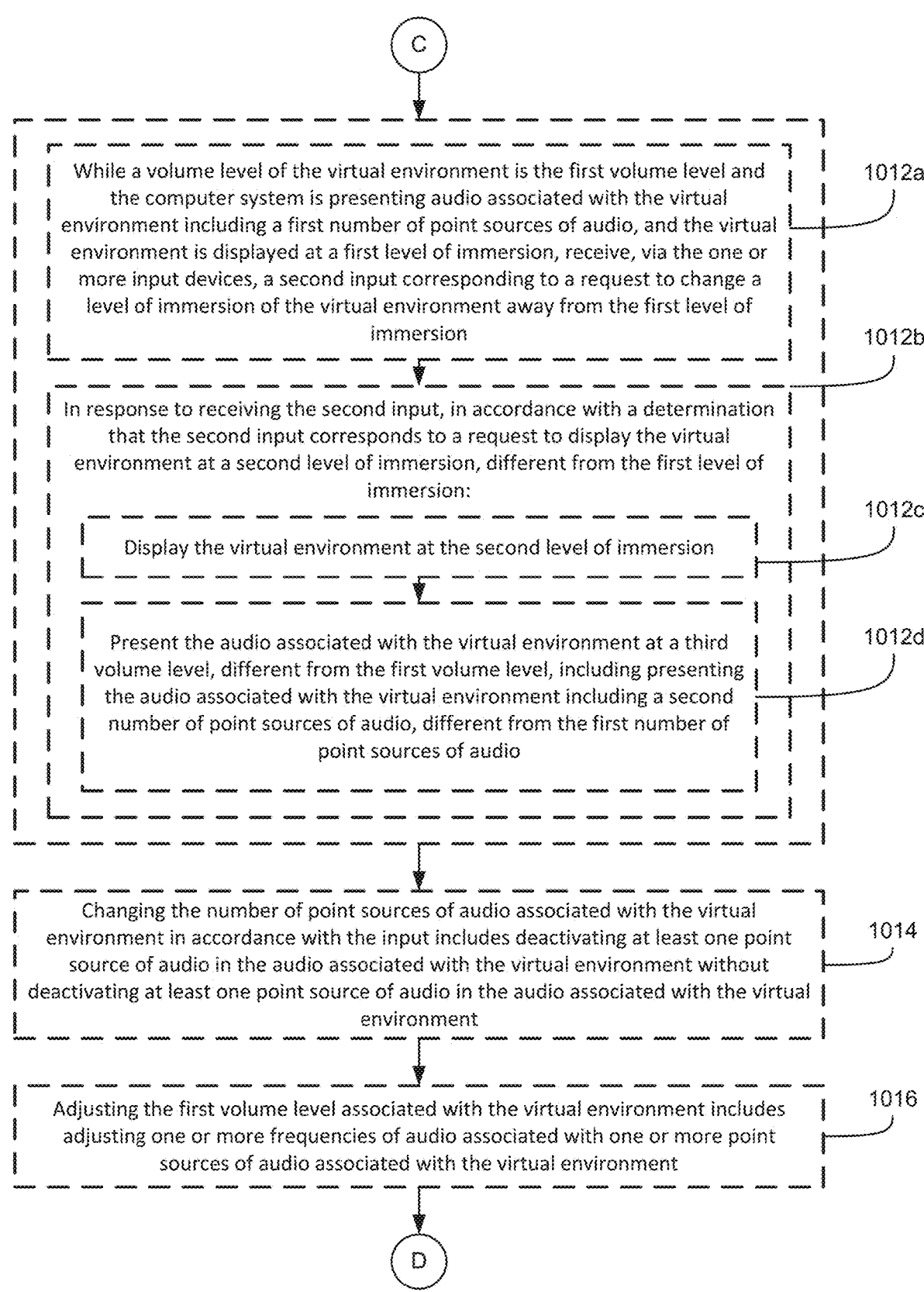

FIG. 9E illustrates the three-dimensional environment 904 in response to a user input directed to the immersion slider user interface element 928*a* of FIG. 9A corresponding to a request to increase the immersion level. In the illustrated embodiment in FIG. 9E, the immersion level has increased, as shown by the current immersion level indicator 916, which shows a full immersion level. In addition, in response to the user input directed to the immersion slider user interface element 928*a* of FIG. 9A corresponding to a request to increase the immersion level, the audio parameter A and the audio parameter 1 has increased. Specifically, the representative point sources of audio (e.g., sets 930, 931) have increased from 8 in FIG. 9A to 10 in FIG. 9E, as shown in the overhead view 918 and the audio legend 934 in response to the user input directed to the immersion slider user interface element 928*a* of FIG. 9A corresponding to a request to increase the immersion level. As such, in some embodiments, the immersion level corresponds to and/or influences one or more types of audio generated or simulated by the computer system for the virtual environment 912*a*, such as the point sources of audio. For example, in response to an increase in immersion level, the audio parameter 1 is optionally increased and in response to a decrease in immersion level, the audio parameter 1 is optionally decreased. Audio parameter 2 and audio parameter 3 optionally did not change in response to the change in immersion level optionally because the change in immersion level was less than a threshold change (e.g., a change resulting in no immersion) and/or because audio parameters 2 and 3 are not related to the level of immersion. Further details with regard to the point sources of audio being influenced by the current immersion level are discussed with reference to the method 1000.

FIGS. 10A-10G is a flowchart illustrating a method 1000 of controlling audio settings of a virtual environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system in communication with a display genera- tion component and one or more input devices. In some embodiments, the computer system has one or more of the characteristics of the computer systems of the methods 800, 1200, 1400, and/or 1600. In some embodiments, the display generation component has one or more of the characteristics of the display generation components of the methods 800, 1200, 1400, and/or 1600. In some embodiments, the one or more input devices has one or more of the characteristics of the one or more input devices of the methods 800, 1200, 1400, and/or 1600.

In some embodiments, the computer system displays (1002*a*), via the display generation component, a system user interface of the computer system, wherein displaying the system user interface includes displaying a volume control element, such as control center user interface 924*a* in FIG. 9A (e.g., a slider, a dial, a toggle, a segmented control, or another type of control element). (e.g., a volume control user interface (UI) element). In some embodiments, the system user interface is displayed in a three-dimensional environment. The three-dimensional environment optionally has one or more of the characteristics of the three-dimen- sional environments described with reference to the methods 800, 1200, 1400, and/or 1600. In some embodiments, the system user interface has one or more of the characteristics of the system user interfaces described relative to the methods 800 and/or 1200.

The volume control element is optionally a user interface element for controlling a volume of or associated with the computer system (e.g., a main volume control). In some embodiments, the volume control element is a slider bar (e.g., a horizontal or vertical slider bar), in which a slider control element of the slider bar is at a first position that corresponds to an initial volume level of the computer system. The initial volume level of the computer system optionally includes a combination of volumes of elements (e.g., source elements) that cause the computer system to emit audio at the initial volume level. For example, the initial volume level of the computer system optionally includes a first volume level of a virtual environment and a second volume level of a user interface of an application, optionally similar or different from the first volume level of the virtual environment, as will be described in more detail below. Also, the volume control element optionally includes a visual indicator that indicates to a user of the computer system that the volume control element is configured to control volume.

In some embodiments, while displaying the system user interface including the volume control element, the com- puter system receives (1002*b*), via the one or more input devices, an input directed to the volume control element, such as user attention 930*b* of FIG. 9A. In some embodi- ments the input directed to the volume control element includes one or more aspects of the inputs described in methods 800 and/or 1200 (e.g., air gestures such as a user's hand in a pinch hand shape and attention of the user (and/or a dwell thereof) directed to the volume control element, followed by movement of the hand of the user while in the pinch hand shape).

In some embodiments, the input directed to the volume control element includes or is an air gesture or a gaze of a user. In some embodiments, the input directed to the volume control element includes user attention directed to the volume control element (e.g., gaze or attention directed to the volume control element), a hand of a user in a particular pose (e.g., raised at a position in front of the user, in a pre-pinch hand shape, or the hand of the user in a pinch hand shape for a time period such as 0.01, 0.05, 0.1, 0.5, 1, 3, 5 or 10 seconds) at greater than a threshold hand distance (e.g., 0.2 cm, 0.5 cm, 1 cm, 2 cm, 3 cm, 5 cm, 10 cm, 20 cm, 40 cm, 100 cm, 200 cm or 500 cm) from the volume control element, or any combination of the user attention, the hand of the user in the particular pose, and/or the hand of the user greater the threshold hand distance. For example, the vol- ume control element is optionally a slider bar (e.g., a vertical or horizontal slider bar) that, while the computer system outputs audio at an initial volume level, displays an indica- tion or control element of the slider at a first position on the slider bar that corresponds to the initial volume level. The volume control element is optionally configured to be modi- fied in response to the input directed to the volume control element. In some embodiments, the input directed to the volume control element includes vector data corresponding to data of movement of a user's hand in a particular pose in a particular direction and/or from a first location to a second location and/or movement of the user's attention in a par- ticular direction from a first location to a second location, so as to correspond to a request to move the position of the slider to a position and/or in a direction corresponding to the vector data (e.g., move the slider control element rightward, optionally corresponding to increased volume (e.g., increased audio output), in accordance with rightward movement of the hand of the user, and move the slider control element leftward, optionally corresponding to reduced volume (e.g., reduced audio output), in accordance with leftward movement of the hand of the user). As another example, in some embodiments, the input directed to the volume control element includes an attention of a user directed to the slider control element, a user's hand in a particular pose such as a pinch hand shape, and movement of the user's hand while in the particular pose involving the pinch hand shape in a direction. In some embodiments, the direction and/or magnitude of the change in the volume/ volume control element is based on the direction and/or magnitude of the hand movement. In some embodiments, the input directed to the volume control element includes touch inputs detected on a touch-sensitive surface (e.g., a touch screen). In some embodiments, the input directed to the volume control element includes a user pressing down on a control element on a mouse (e.g., a left-click). In some embodiments, the input directed to the volume control element is a gaze input without including other inputs such as an air gesture.

In some embodiments, in response to receiving the input directed to the volume control element (1002*c*), the com- puter system adjusts (1002*d*) a first volume level associated with a virtual environment associated with the computer system in accordance with the input, such as volume level of audio parameter 1 represented in the legend 932 of FIG. 9A. In some embodiments, when the volume level of the com- puter system is the initial volume level, the volume level associated with the virtual environment is the first volume level. As discussed earlier, the volume control element (e.g., a slider, a dial, a toggle, a segmented control, or another type of control element) is optionally the slider bar including the slider control element for controlling a volume level of the computer system. As such, when the slider control element of the slider bar is at the first position, the volume level associated with the virtual environment is optionally the first volume level. In response to receiving the input directed to the volume control element, the slider control element of the slider bar optionally is displayed at a second position on the slider bar, different from the first position, where the second position on the slider bar corresponds to the volume level of the computer system being a resulting volume level, different from the initial volume level. Further, the slider control element of the slider bar displayed at the second position on the slider bar optionally corresponds to the volume of the virtual environment being an adjusted first volume level of the virtual environment, different from the first volume level of the virtual environment and is optionally different from the initial volume level and the resulting volume level of the computer system.

The computer system optionally has different volume levels for the virtual environment and the user interface (to be described later). However, the volume level associated with the virtual environment is optionally changed in the same direction and/or with the same (scaled) magnitude as the slider control element for the computer system. Likewise, the volume level associated with the user interface (to be described later) is optionally changed in the same direction and/or with the same (scaled) magnitude as the slider control element for the computer system In some embodiments, the computer system is displaying the virtual environment before, when and/or after the input directed to the volume control element is received. The virtual environment is optionally as described with reference to the method 800. The virtual environment optionally includes virtual audio elements, optionally in addition to virtual visual elements. In some embodiments, the audio elements correspond to the virtual visual elements. For example, the virtual environment is optionally a simulated sunny day at a dog park that includes twenty dogs barking and roaming around the dog park. The computer system optionally audibly and/or visually simulates the barking of the dogs such that a user can hear (and/or see) the (virtual) dogs barking. The audio from the barking of the virtual dogs is optionally at the first volume level when the input directed to the volume control element is received. In response to receiving input directed to the volume control element, the volume level of the audio from the barking of the virtual dogs optionally adjusts to become the adjusted first volume level of the virtual environment. The adjusted first volume level is optionally a lower volume level (optionally down to a muted volume level) or a higher volume level than the first volume level. As such, the computer system is optionally configured to actively change a volume level output corresponding to the virtual environment such that a user can hear the volume changing (e.g., a continuous rate of change of volume) in accordance with the input.

The virtual environment is optionally not displayed while the volume control element is displayed and/or manipulated. However, the virtual environment optionally has an associated volume level even when the virtual environment is not displayed while the volume element is displayed and/or manipulated. When the virtual environment is not displayed while the volume control element is displayed and/or manipulated, the volume level associated with the virtual environment (e.g., the first volume level associated with the virtual environment) is optionally changed such that, when the virtual environment is subsequently displayed, the computer system generates audio for the virtual environment in accordance with the adjusted first volume level, as adjusted in response to receiving the input directed to the volume control element.

In some embodiments, the computer system adjusts (1002e) a second volume level associated with a user interface of an application associated with the computer system in accordance with the input, such as volume level of audio parameter 2 represented in the legend 932 of FIG. 9A. In some embodiments, when the volume level of the computer system is the initial volume level, the volume level associated with the user interface of the application is the second volume level. As such, when the slider control element of the slider bar is at the first position, the volume level associated with the user interface of the application is the second volume level. In some embodiments, the slider control element of the slider bar displayed at the second position on the slider bar (as described above) corresponds to an adjusted second volume level of the user interface of the application, different from the second volume level of the user interface of the application.

In some embodiments, the computer system displays, via the display generation component, a user interface of an application (e.g., an Internet application or a local media player application) optionally while or while not displaying the above-described virtual environment. As an example, the user interface of the application is optionally a user interface of a video application including playback of a video such as a streaming video. The computer system optionally also plays and/or generates audio corresponding to the video at the second volume level associated with the user interface of the application. Specifically, in addition to the one or more input devices, the computer system is optionally in communication with (e.g., via any suitable wired or wireless connection) one or more output devices including a suitable audio output device such as a speaker device, earphones, or headphones that can provide audio to a user. The audio from the user interface of the application, which is, in this example, a video application, optionally corresponds to the second volume level associated with the user interface of the application as controlled by the slider control element of the slider bar. As such, in response to receiving the input directed to the volume control element, the audio level for the user interface of the application optionally changes from being the second volume level to being the adjusted second volume level of the user interface. The adjusted second volume level is optionally a lower volume level (up to a mute) or a higher volume level than the second volume level associated with the user interface of the application. In some embodiments, the relative volume levels associated with the virtual environment and the user interface of the application are maintained before, during, and/or after the input (e.g., the proportion of the first volume level associated with the virtual environment and the second volume level associated with the user interface of the application is equal (or substantially equal to) the proportion of the adjusted first volume level to the adjusted second volume level).

It should be noted that, in some embodiments, the computer system displays the user interface of the application within the virtual environment. For example, in some embodiments, the virtual environment includes an environment simulated by the computer system, and the user interface of the application is optionally positioned within the space encompassed by the virtual environment. In some embodiments, the user interface of the application is positioned outside of a region of the virtual environment in the three-dimensional environment.

The user interface of the application is optionally not displayed while the volume control element is displayed and/or manipulated. However, the user interface of the application optionally has an associated volume level even when the user interface of the application is not displayed while the volume element is displayed and/or manipulated.

When the user interface of the application is not displayed while the volume element is displayed and/or manipulated, the volume level associated when the user interface of the application is optionally changed such that, when the user interface of the application is subsequently displayed, the computer system generates audio for the user interface in accordance with the adjusted second volume level, as adjusted in response to receiving the input directed to the volume control element.

In some embodiments, the user interface of the application is displayed while the volume element is displayed and/or manipulated. As such, the computer system is optionally configured to actively change a volume level output corresponding to the user interface of the application such that a user can hear the volume changing (e.g., a continuous rate of change of volume) in accordance with the input.

The above-mentioned manner of adjusting a volume level associated with a virtual environment and adjusting a volume level associated with a user interface of an application in response to receiving the input directed to the volume control element allows the user to easily control volume level across different types of virtual content presented by the computer system, thus reducing the number of inputs involved with doing so.

In some embodiments, in response to receiving the input directed to the volume control element, the computer system adjusts (1004) a third volume level associated with one or more users other than a user of the computer system in a three-dimensional environment associated with the computer system, wherein the three-dimensional environment is shared by the one or more users (optionally of computers systems different from the computer system) and the user of the computer system, such as volume level of audio parameter 3 represented in the legend 932 of FIG. 9A. In some embodiments, the display generation component displays in the three-dimensional environment virtual avatars corresponding to virtual representations of the one or more users in a communication session including the one or more other users and the user of the computer system. The third volume level is optionally associated with audio generated by the computer system via an output device such as a speaker optionally integrated into the display generation component, such as if emerging or being generated from specific points in the three-dimensional environment corresponding to locations in the three-dimensional environment that the virtual avatars are located. The audio associated with the avatars is optionally audio playback of speech of the users corresponding to those avatars. In some embodiments, the third volume level adjusts the magnitude and/or volume of such audio, optionally in the same direction and/or magnitude as that of the first volume level and/or second volume level discussed in step(s) 1002. Adjusting a volume level of associated virtual avatars corresponding to users virtually present in the three-dimensional environment via the computer system increases user control of the computer system via reduction of inputs involved with modifying audio settings of different types of audio sources and may decrease distraction while using the computer system.

In some embodiments, the system user interface includes a first volume control element and a second volume control element (1006a) (e.g., the first and second volume control elements optionally have one or more of the characteristics of the volume control element described with reference to step(s) 1002), such as in the control center user interface 924a of FIG. 9C. In some embodiments, while displaying the system user interface including the first volume control element and the second volume control element, the computer system receives (1006b), via the one or more input devices, a second input directed to the system user interface, such as user attention 930c, (the second input optionally includes one or more characteristics of the input directed to the volume control element (e.g., one or more of attention of a user and air gestures), directed to the system user interface, as described with reference to step(s) 1002). The first volume control element and the second volume control element are optionally displayed on a different level of the system user interface than the volume control element. For example, the first and second volume control elements are optionally displayed in response to a select-and-hold input directed to the volume control element (e.g., an air pinch and hold input directed to the volume control element for longer than a time threshold such as 0.1, 0.3, 0.5, 1, 3, 5 or 10 seconds, or another time threshold).

In some embodiments, in response to receiving the second input (1006c), in accordance with a determination that the second input is directed to the first volume control element, the computer system adjusts (1006d) a third volume level associated with the virtual environment in accordance with the second input without adjusting a volume level associated with the user interface of the application, such as adjusting volume control user interface element 940a of FIG. 9C. For example, the computer system optionally generates audio corresponding to various features of the virtual environment. For example, the virtual environment displayed by the display generation component optionally includes a meadow environment. In the meadow environment, the computer system optionally generates audio corresponding to a breeze presence, a brook, and crickets in the meadow environment. In some embodiments, adjusting the third volume level changes a number of virtual objects displayed in the virtual environment such as changes a number of crickets visible in the virtual meadow environment example above. In some embodiments, the third volume level is associated with a first part of audio from the virtual environment and a second part of audio from the virtual environment. The first part of audio is optionally associated with a number of virtual objects displayed (or not displayed) in the three-dimensional corresponding to point sources of audio in the three-dimensional environment, while the second part of audio is optionally not associated with the number of virtual objects. As such, though point sources of audio are optionally present, not all audio generated from the virtual environment results from the point sources of audio. In some embodiments, the adjustment of the third volume level (including an adjustment of the magnitude and/or volume of such audio), is in the same direction and/or magnitude as dictated by and/or corresponding to the second input.

In some embodiments, in accordance with a determination that the second input is directed to the second volume control element, the computer system adjusts (1006e) a fourth volume level associated with the user interface of the application in accordance with the second input without adjusting a volume level associated with the virtual environment, such as adjusting volume control user interface element 940b of FIG. 9C. For example, the computer system optionally generates audio corresponding to a user interface of an application (e.g., a content playback application or an application having associated audio) displayed via the display generation component and in the three-dimensional environment. For example, in the case of a content playback application that is playing a movie that includes visual and audio playback, adjusting the fourth volume level optionally changes the volume level of the audio playback of the content playback application. In some embodiments, the adjustment of the fourth volume level (including an adjustment of the magnitude and/or volume of such audio), is in the same direction and/or magnitude as dictated by and/or corresponding to the second input. Adjusting a volume level of associated with a virtual environment separately from adjusting a volume level associated with a user interface of an application increases user control of the computer system via reduction of inputs involved with accessing different types of volume controls and avoids errors in usage of the computer system.

In some embodiments, adjusting the first volume level associated with the virtual environment includes changing a number of point sources of audio associated with the virtual environment in accordance with the input (1008), such as a changing the number of the representative point sources of audio (e.g., sets 930, 931) of FIG. 9C. For example, when the first volume level is increased, a number of point sources of audio associated with or in the virtual environment is optionally increased in accordance with the input, and when the first volume level is decreased, the number of point sources of audio is optionally decreased in accordance with the input. In some embodiments, one or more or all of the point sources of audio are not clearly visible and/or are essentially hidden from view from the viewpoint of the user of the computer system and/or are not associated with displayed objects in the three-dimensional environment; in some embodiments, the point sources of audio are associated with displayed objects in the three-dimensional environment. For example, the point sources of audio optionally correspond to virtual crickets in a pile of virtual tall grass in the three-dimensional environment. Though the point sources of audio are optionally hidden from view from the viewpoint of the user, the point sources of audio nevertheless are optionally associated with various positions in the three-dimensional environment. Changing the volume levels of other items, such as the user interface of the application discussed above with reference to step(s) 1002, avatars discussed above with reference to step(s) 1004, and/or other items having associated volumes discussed herein, optionally does not change the number of point sources of audio that optionally are associated with those items and/or are in the three-dimensional environment. Also, increasing or decreasing the first volume level optionally increases or decreases, respectively, a magnitude of the audio simulated as originating from the point sources of audio. Changing a number of point sources of audio associated with the virtual environment in accordance with the input increases or decreases, as appropriate, the complexity of the audio associated with the virtual environment without further input, and may decrease user distraction during usage of the computer system.

In some embodiments, changing the number of point sources of audio associated with the virtual environment in accordance with the input includes (1010a), when the input corresponds to a request to reduce the first volume level associated with the virtual environment (1010b), such as adjusting volume control user interface element 940a of FIG. 9C, in accordance with a determination that the input is a first input to reduce the first volume level, reducing the number of point sources of audio associated with the virtual environment by removing a first set of point sources of audio from the audio associated with the virtual environment (1010c) (optionally including reducing one or more point sources of audio having representation in the virtual environment), such as via a selection process involving a random or pseudorandom selector generator), such as illustrated by the reduction in the number of the representative point sources of audio (e.g., sets 930, 931) from FIG. 9C to FIGS. 9D and 9D1, and in accordance with a determination that the input is a second input, different from the first input, to reduce the first volume level, reducing the number of point sources of audio associated with the virtual environment by removing a second set, different from the first set, of point sources of audio from the audio associated with the virtual environment (1010d) (optionally including reducing one or more point sources of audio having representation in the virtual environment), such as via a selection process involving the random or pseudorandom selector generator), such as illustrated by the reduction in the number of the representative point sources of audio (e.g., sets 930, 931) from FIG. 9A to FIG. 9B. The point sources of audio that are removed are optionally randomly removed, even if the starting and ending volume levels of the first volume level for the two inputs are the same.

In some embodiments, when the input corresponds to a request to increase the first volume level associated with the virtual environment (1010e), in accordance with a determination that the input is a first input to increase the first volume level, increasing the number of point sources of audio associated with the virtual environment by adding a third set of point sources of audio to the audio associated with the virtual environment (10100 (optionally including adding one or more point sources of audio having representation in the virtual environment), such as via a selection process involving the random or pseudorandom selector generator), such as illustrated by the increase in the number of the representative point sources of audio (e.g., sets 930, 931) from FIG. 9B to FIG. 9C and in accordance with a determination that the input is a second input, different from the first input, to increase the first volume level, increasing the number of point sources of audio associated with the virtual environment by adding a fourth set, different from the third set, of point sources of audio to the audio associated with the virtual environment (1010g), such as increasing the number of the representative point sources of audio (e.g., sets 930, 931) in FIG. 9A (optionally including adding one or more point sources of audio having representation in the virtual environment), such as via a selective process involving the random selector generator, such as via the selective process involving the random or pseudorandom selector generator. The point sources of audio that are added are optionally randomly or pseudo randomly added, even if the starting and ending volume levels of the first volume level for the two inputs are the same. Reducing or increasing a number of point sources of audio differently for different inputs for changing the first volume level, respectively, reduces a number of input involved with adjusting individual point sources of audio.

In some embodiments, while a volume level of the virtual environment is the first volume level and the computer system is presenting (e.g., generating or playing back via an audio output device such as speakers or headphones or another type of audio output device) audio associated with the virtual environment including (generating audio corresponding to) a first number of point sources of audio, such as volume level of audio parameter 1 represented in the legend 932 of FIG. 9A, and the virtual environment is displayed at a first level of immersion (such as a level of immersion described with reference to the method 800), such as the level of immersion of the virtual environment 912a of FIG. 9A, the computer system receives (1012a), via the one or more input devices, a second input corresponding to a request to change a level of immersion of the virtual environment away from the first level of immersion (such as the input directed to the immersion control element described with reference to the method 800, corresponding to a request to change a level of immersion of the virtual environment away from the first level of immersion), such as user attention 930*a* of FIG. 9A. In some embodiments, in response to receiving the second input, in accordance with a determination that the second input corresponds to a request to display the virtual environment at a second level of immersion (such as a level of immersion described with reference to the method 800), different from the first level of immersion (1012*b*), the computer system displays (1012*c*) the virtual environment at the second level of immersion (e.g., such as described with reference to method 800), such as at the level of immersion of the virtual environment 912*a* of FIG. 9E and the computer system presents (1012*d*) (e.g., generating or playing back via an audio output device such as speakers or headphones or another type of audio device) the audio associated with the virtual environment at a third volume level, different from the first volume level, including presenting (e.g., generating) the audio associated with the virtual environment including a second number of point sources of audio, different from the first number of point sources of audio, such as volume level of audio parameter 1 represented in the legend 932 of FIG. 9E. As such, the volume level of the virtual environment (e.g., as described with reference to step(s) 1002 and 1008) is optionally changed in response to changes in immersion of the virtual environment, including optionally changing the number of point sources associated with the virtual environment audio. The adjustment of the first volume level in response to the second input (including an adjustment of the magnitude and/or volume of such audio), is optionally in the same direction and/or magnitude of change in the immersion level. Changing a volume level of the virtual environment in response to a change in immersion level reduces the number of inputs involved with changing volume levels in a coordinated manner.

In some embodiments, changing the number of point sources of audio associated with the virtual environment in accordance with the input includes deactivating at least one point source of audio in the audio associated with the virtual environment without deactivating at least one point source of audio in the audio associated with the virtual environment (1014), such as illustrated with the change in the number of the representative point sources of audio (e.g., sets 930, 931) of FIG. 9A to FIG. 9B. As such, one or more point sources of audio can be optionally turned off (e.g., reduced in volume to a mute volume level) while one or more other point source of audio are optionally continuing to generate audio. It should be noted that the deactivated point sources of audio optionally continue to have virtual representation in the virtual environment (e.g., as dogs, crickets, birds, or another virtual representation the point sources of audio had before they were deactivated with respect to audio generation/presentation) if they were originally associated with displayed virtual objects in the virtual environment. In some embodiments, the volume of the remaining point sources of audio does not change in accordance with the input; in some embodiments, the volume of the remaining point sources of audio does change in magnitude and/or direction corresponding to the magnitude and/or direction of the change in volume level due to the turning off at least one point source of audio. Turning off of some but not all point sources of audio associated with the virtual environment in response to adjusting the first volume level reduces a number of input involved with adjusting volume of the point sources of audio In some embodiments, adjusting the first volume level associated with the virtual environment includes adjusting one or more frequencies of audio (e.g., adjusting an amplitude of audio in some frequency bands more than audio is adjusted in other frequency bands) associated with one or more point sources of audio associated with the virtual environment (1016), such as adjusting one or more frequencies of audio associated with the number of the representative point sources of audio (e.g., sets 930, 931) from FIG. 9A to FIG. 9B. For example, the one or more point sources of audio are optionally associated with virtual crickets in a virtual meadow environment. The audio frequency of the individual chirps of the crickets are optionally configurable and/or adjustable by means of adjusting the first volume level. In some examples, in response to an adjustment of the first volume level (e.g., an adjustment corresponding to an increase or decrease in volume level), the one or more frequencies are optionally optimized (e.g., increased or decreased in the same direction as the adjustment of the first volume level (or in the opposite direction)) to enhance the audio experience relative to the ear of the user for the computer system. As another example, the one or more point sources of audio are optionally associated with birds, frogs, and/or water springs in a virtual forest environment. The audio frequencies of the birds, frogs, and water springs are optionally configurable and/or adjustable so as to increase and/or decrease a frequency (and/or frequency range) of various audios from one or more types of the birds, one or more types of the frogs, and/or one or more water springs in the virtual forest environment. Adjusting frequency of sounds associated with the point sources of audio in response to adjusting the first volume level reduces a number of input involved with adjusting volume of the point sources of audio.

In some embodiments, adjusting the first volume level associated with the virtual environment includes adjusting a rate of occurrence of one or more audio outputs of one or more point sources of audio associated with the virtual environment (1018) (within a given time period (e.g., 0.1 s 1 s, 5 s, 2 min, or another time period), such as adjusting one or more frequencies of audio associated with the number of the representative point sources of audio (e.g., sets 930, 931) from FIG. 9A to FIG. 9B. One or more of the point sources of audio are optionally configured to cause periodic generation of sounds so as to increase an immersive experience of the user of the computer system with the virtual environment. For example, the one or more point sources of audio are optionally associated with virtual crickets in a virtual meadow environment. The chirping of the virtual crickets, optionally as a whole (e.g., aggregated), is optionally periodic. Adjusting the first volume level optionally adjusts the periodic nature of the chirping from a first periodic nature (e.g., chirping at a first rate) to a second periodic nature (e.g., chirping at a second rate). The adjustment of the rate of occurrence of the audio outputs of the point sources of audio in response to the input, is optionally in the same direction and/or magnitude of adjustment of the first volume level. For example, in response to an adjustment of the first volume level (e.g., an adjustment corresponding to an increase or decrease in volume level), the ratio of occurrence of the one or more audio outputs are optionally optimized (e.g., increased or decreased in the same direction as the adjustment of the first volume level (or in the opposite direction)) to enhance the audio experience relative to the ear of the user for the computer system. Adjusting the rate of occurrence of periodic sounds associated with the point sources of audio in response to adjusting the first volume level increases user control of the computer system via reduction of inputs involved with changing periods of periodic sounds.

In some embodiments, adjusting the first volume level associated with the virtual environment such as volume level of audio parameter 1 represented in the legend 932 of FIG. 9A, includes adjusting a volume level (e.g., magnitude) of an audio track for the virtual environment (1020), such as for the virtual environment 912a of FIG. 9B. In some embodiments, the audio associated with the virtual environment includes the audio track (e.g., a background audio track such as a "white noise" audio track) that is played back by the computer system during the duration of the display of the virtual environment. The audio track is optionally a loopable audio track (e.g., able to be repeatedly played) that is associated with the virtual environment. The audio track is optionally different from the point sources of audio discussed above with reference to step(s) 1008-1018 (e.g., the point sources of audio are optionally played on top of or concurrently with the audio track). As such, the adjusted volume level of the audio track is optionally a different adjusted volume level than the point sources of audio. The adjustment of the volume level of the audio track in response to the input, is optionally in the same direction and/or magnitude of adjustment of the first volume level. Adjusting the volume level of the audio track for the virtual environment increases user control of the computer system via reduction of inputs involved with accessing different types of volume controls and may decrease user distraction during usage of the computer system.

In some embodiments, while a volume level of the virtual environment (e.g., the volume level corresponding to the point sources of audio and/or the audio track for the virtual environment) is the first volume level and the virtual environment is displayed at a first level of immersion (such as a level of immersion described with reference to the method 800), the computer system receives, via the one or more input devices, a second input corresponding to a request to change a level of immersion of the virtual environment away from the first level of immersion (1022a), such as user attention 930a of FIG. 9A (such as the input directed to the immersion control element described with reference to the method 800, corresponding to a request to change a level of immersion of the virtual environment away from the first level of immersion).

In some embodiments, in response to receiving the second input (1022b), in accordance with a determination that the second input corresponds to a request to display the virtual environment at a second level of immersion (such as a level of immersion described with reference to the method 800), greater than the first level of immersion (1022c), such as user attention 930a of FIG. 9A the computer system displays (1022d) the virtual environment at the second level of immersion, such as at the level of immersion of the virtual environment 912a of FIG. 9E, and the computer system presents (1022e) (e.g., generating or playing back via an audio output device such as speakers or headphones or another audio output device) the audio associated with the virtual environment at a third volume level, greater than the first volume level, such as volume level of audio parameter 1 represented in the legend 932 of FIG. 9E.

In some embodiments, in accordance with a determination that the second input corresponds to a request to display the virtual environment at a third level of immersion (such as a level of immersion described with reference to the method 800), less than the first level of immersion (10220, the computer system displays (1022g) the virtual environment at the third level of immersion, such as at a level of immersion lower than the level of immersion of the virtual environment 912a of FIG. 9A, and the computer system presents (1022h) (e.g., generating or playing back via the audio output device such as speakers or headphones or another audio output device) the audio associated with the virtual environment at a fourth volume level, less than the first volume level such as at a volume level of audio parameter 1 represented in the legend 932 that is lower than in FIG. 9A. As such, the adjustment of the first volume level associated with the virtual environment in response to the second input is optionally in the same direction and/or magnitude of change in the immersion level. Changing a volume level of the virtual environment in response to changing an immersion level reduces the number of inputs involved with changing volume levels in a coordinated manner.

In some embodiments, when the input directed to the volume control element is received, audio associated with the virtual environment includes one or more point sources of audio of a first type (e.g., of a first type of audio frequency and/or associated with a first type of virtual objects displayed in the virtual environment and/or associated with a first type of object not displayed in the virtual environment) without including one or more point sources of audio of a second type (e.g., of a second type of audio frequency and/or associated with a second type of virtual objects displayed in the virtual environment and/or associated with a second type of object not displayed in the virtual environment), different from the first type (1024a), such as the representative point sources of audio (e.g., sets 930, 931) including the first type without the second type in FIG. 9A. The point sources of audio optionally correspond to audio associated virtual objects displayed in the virtual environment. For example, when the virtual environment includes a meadow in the morning time, bugs and birds are optionally displayed in the meadow. The point sources of audio of the first type optionally correspond to audio emerging from the bugs and the point sources of audio of the second type optionally corresponds to audio emerging from the birds, at the respective locations that the bugs and birds occupy in the virtual environment. When the input directed to the volume control element is received, audio associated with the meadow optionally includes audio corresponding to the bugs, without including audio corresponding to the birds.

In some embodiments, in response to adjusting the first volume level associated with the virtual environment in accordance with the input, the audio associated with the virtual environment includes one or more point sources of audio of the second type (1024b) (in addition to or without including the one or more point sources of audio of the first type), such as the representative point sources of audio (e.g., sets 930, 931) including the first type and the second type in FIG. 9E. For example, in response to the first volume level increasing in accordance with the input, the audio associated with the virtual environment optionally includes the one or more point sources of audio of the first type (e.g., audio from the virtual bugs) and the one or more point sources of audio of the second type (e.g., audio from the virtual birds). As another example, while the audio associated with the virtual environment optionally includes the one or more point sources of audio of the first type (e.g., audio from the virtual bugs) and the one or more point sources of audio of the second type (e.g., audio from the virtual birds), in response to the first volume level decreasing in accordance with the input, the audio associated with the virtual environment optionally includes the one or more point sources of audio of the first type (e.g., audio from the virtual bugs) without including the one or more point sources of audio of the second type (e.g., audio from the virtual birds). Adjusting types of point sources of audio by way of the input directed to the volume control element reduces a number of input involved with changing types of point sources of audio in the virtual environment.

In some embodiments, the system user interface concurrently includes (1026a) a first volume control element (e.g., a slider, a dial, a toggle, a segmented control, or another type of control element) for adjusting a third volume level associated with the virtual environment (1026b) (e.g., having one or more of the characteristics of the volume control elements for the virtual environment described with reference to step(s) 1002), such as volume control user interface element 940a of FIG. 9C and a selectable option (e.g., a toggle, a virtual button, or another type of selectable option) that is selectable to control whether audio associated with the virtual environment is presented (e.g., generated) differently by the computer system based on a pose (e.g., tilt, orientation, position, direction and/or rotation) of a head of a user of the computer system (1026c) (relative to the three-dimensional environment), such as movement setting A 942a of FIG. 9C. When the selectable option is in a first state (e.g., corresponding to the computer system being in a head tracking state), audio associated with the virtual environment is optionally generated based on a pose of a head of a user of the computer system optionally with reference to or relative to virtual objects in the virtual environment or other virtual content (e.g., user interfaces of content playback applications) for which the computer system generates audio. For example, the third volume level associated with the virtual environment is optionally generated at a first level and or from a first direction relative to the front of the user's head when a user's head is facing the virtual environment (or facing a specific object in the virtual environment) and is optionally generated at a second level, lower than the first level and/or from a second direction, different from the first direction relative to the front of the user's head when the user's head is facing away from the virtual environment (or facing away from the specific object in the virtual environment). When the selectable option is in a second state (e.g., corresponding to the computer system being in a non-head tracking (e.g., a fixed state), audio associated with the virtual environment is optionally generated independent of the pose of the head of the user of the computer system optionally with reference to or relative to virtual objects in the virtual environment or other virtual content (e.g., user interfaces of content playback applications) for which the computer system generates audio. Displaying the selectable option to control whether audio generated by the computer system is based on a pose of a head of a user increases user control of the computer system via reduction of inputs involved with accessing different types of volume controls and may decrease user fatigue or discomfort from usage of the computer system.

In some embodiments, the system user interface includes a selectable option that is selectable to control whether audio presented by the computer system is presented differently by the computer system based on a pose of a head of a user of the computer system (1028), such as movement setting A 942a of FIG. 9C, such as the selectable option discussed above with reference to step(s) 1026 (without concurrently displaying the first volume control element for adjusting a third volume level associated with the virtual environment discussed above with the selectable option). Displaying the selectable option to control whether audio generated by the computer system is based on a pose of a head of a user increases user control of the computer system via reduction of inputs involved with enabling different types of spatial audio settings and may decrease user fatigue or discomfort from usage of the computer system.

In some embodiments, the system user interface includes a selectable option that is selectable to control an amount of noise cancellation performed for audio presented (e.g., generated) by the computer system (1030) so as to cancel some amount of noise from various external or internal sources of noise (e.g., sources of noise outside of the audio generated by the computer system). The selectable option that is selectable to control an amount of noise cancellation optionally includes similar selectable features and/or functionality as any of the selectable options of the control center user interface 924a, such as the movement setting A 942a of FIG. 9C and the volume control user interface element 940a of FIG. 9C. In some embodiments, the computer system the selectable option is selectable to enable an active noise cancellation setting, in which active noise cancellation is performed that actively cancels noise from various external or internal sources, optionally based on the frequency and/or amplitude in decibels of the noise from the various external or internal sources. In some embodiments, the system user interface includes a selectable option that is selectable to control an amount of noise allowed to be generated or passed through the computer system and/or an audio output device in communication with the computer system such as a speaker, headphones, or earphones from external sources; such selectable option is optionally additionally or alternatively selectable to increase an amount of noise to be generated or passed through, such as to increase a noise level of noise (e.g., a noise transparency at the user of the computer system) originating from the physical environment of the user of the computer system and outside of the computer system Displaying the selectable option for controlling an amount of noise cancellation performed for audio presented by the computer system increases user control of the computer system via reduction of inputs involved with enabling noise control settings and may decrease user fatigue or discomfort from usage of the computer system.

In some embodiments, before displaying the system user interface, the computer system receives (1032a), via the one or more input devices, a second input corresponding to a request to display the system user interface, such as an input including one or more aspects user attention 930a of FIG. 9A. The second input optionally includes one or more aspects of the input directed to the volume control element discussed above with reference to step(s) 1002, corresponding to a request to display the system user interface.

In some embodiments, in response to receiving the second input (1032b), in accordance with a determination that the computer system was displaying first content associated with a first application, such as the music user interface of the application 926a of FIG. 9A, (that optionally includes one or more characteristics of the user interface of the application described above with reference to step(s) 1002) when the second input was received, the computer system displays (1032c), via the display generation component, the system user interface, such as the control center user interface 924a of FIG. 9A. The system user interface optionally is displayed adjacent to or a distance from display of the first content associated with the second application, or obscures or is displayed in front of (e.g., between the viewpoint of the user and) the first content).

In some embodiments, in accordance with a determination that the computer system was displaying second content associated with a second application (that optionally includes one or more characteristics of the user interface of the application described above with reference to step(s) 1002) when the second input was received, wherein the second content associated with the second application is different from the first content associated with the first application, the computer system displays (1032*d*), via the display generation component, the system user interface, such as the control center user interface 924*a* of FIG. 9A. The system user interface optionally is displayed adjacent to or a distance from display of the second content associated with the second application, or obscures or is displayed in front of (e.g., between the viewpoint of the user and) the second content). In some embodiments, the system user interface, when displayed, is viewpoint locked, as described earlier in this present disclosure. Providing accessibility to a system control user interface from different virtual experiences displayed by the display generation component provides consistent interaction with the computer system, thus reducing errors in usage of the computer system and reducing an amount of inputs involved with accessing controls of the computer system.

In some embodiments, the second input includes attention of a user of the computer system (1034), such as an input including one or more aspects user attention 930*a* of FIG. 9A. The second input optionally corresponds to attention of a user of the computer system being directed to specific portions of virtual content displayed by the display generation component, such as a portion of the virtual content that is gaze-selectable to initiate display of the system user interface in the three-dimensional environment simulated and/or displayed via the display generation component, optionally without input other than user attention (e.g., attention of the user directed to the gaze-selectable portions for longer than a time threshold such as 0.1, 0.3, 0.5, 1, 2, 3, 5, 10, 20 or 30 seconds, or another time threshold). In an example, the second input optionally includes user attention directed up at a top-center region of the field of view of the user in the three-dimensional environment, optionally for a predetermined time period (e.g., 0.5 s, 1 s, 5 s, 20 s, or another predetermined time period), which optionally causes display of a system user interface such as a control center user interface, such as illustrated and discussed with reference to FIGS. 9A and 9B. In some embodiments, the second input corresponds to attention of the user of the computer system discussed above, in addition to hand gestures performed by the user, such as the air gestures directed to the volume control element discussed above with reference to step(s) 1002, directed to the portion of the virtual content that is gaze-selectable. Indeed, in some embodiments, the portion of the virtual content that is gaze-selectable to cause display of the system user interface is alternatively or additionally, selectable via gaze and air gestures. Displaying a system control user interface in response to detection of attention of a user (e.g., a gaze of a user) is an efficient manner of displaying the system user interface, may reduce user fatigue or exertion for displaying the system user interface and reduce an amount of inputs involved with accessing the system control user interface of the computer system.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11F illustrate examples for controlling breakthrough settings of a computer system that displays, via a display generation component, a three-dimensional environment, in accordance with some embodiments.

Figure 11A:
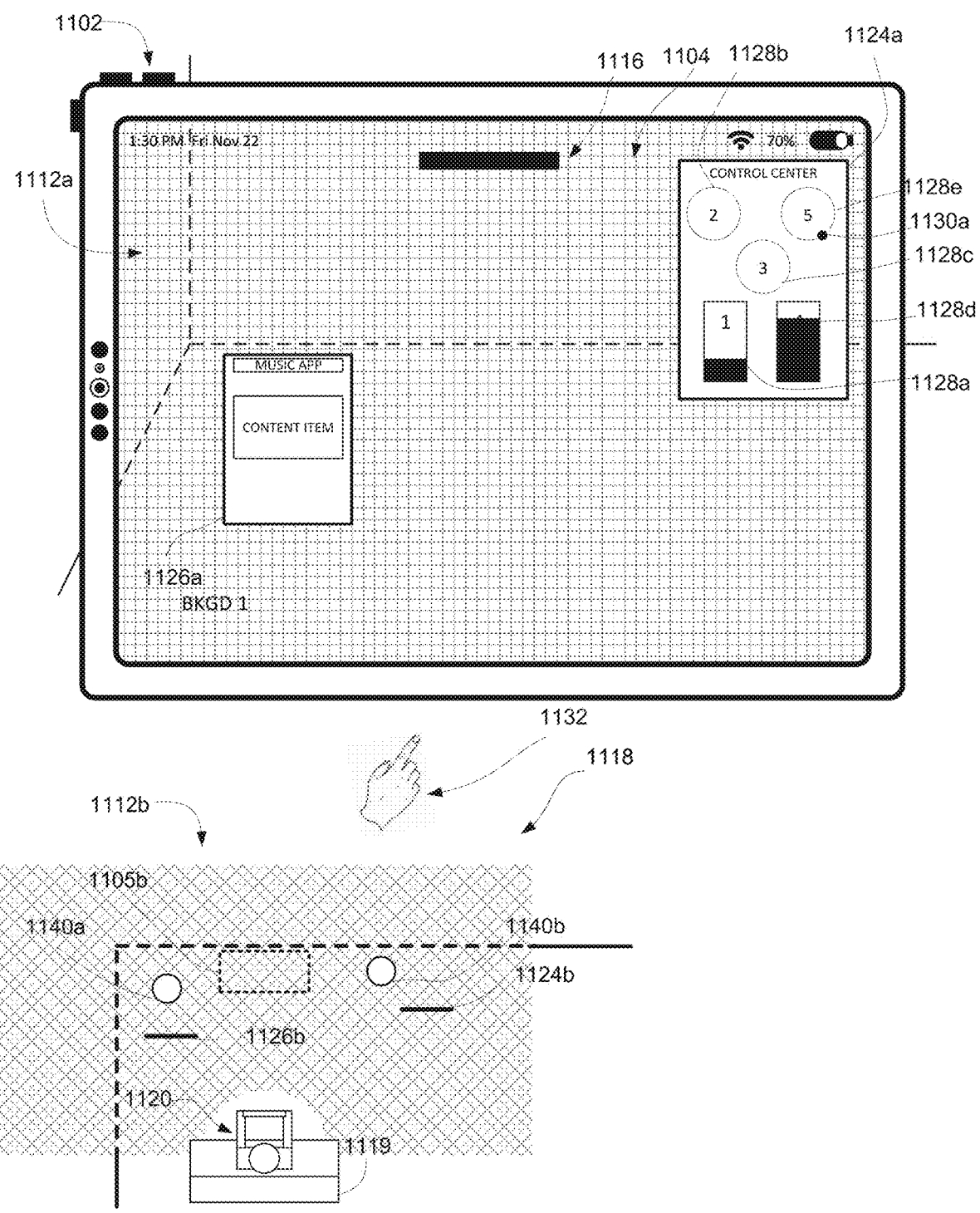
FIGS. 11A-11F illustrate examples for controlling breakthrough settings of a computer system that displays, via a display generation component, a three-dimensional environment, in accordance with some embodiments.

FIG. 11A illustrates a computer system 101 in a real world environment 1102 (e.g., a physical environment) displaying, via a display generation component (e.g., display generation component 120 of FIG. 1), a three-dimensional environment 1104 including a virtual environment 1112*a* ("BKGD 1") such as a virtual environment described with reference to the methods 800 and/or 1000, displayed at a level of immersion corresponding to full immersion (e.g., as described in more detail with reference to method 1200), as indicated by the current immersion level indicator 1116, in accordance with some embodiments. As described above with reference to FIGS. 1-6, the computer system 101 optionally includes a display generation component (e.g., a touch screen) and a plurality of image sensors (e.g., image sensors 314 of FIG. 3). Further, the computer system 101 is optionally as described with reference to FIGS. 1-6. In some embodiments, the user interfaces described below are implemented on a head-mounted display that includes a display generation component that displays the user interfaces to the user and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user). The figures herein illustrate a three-dimensional environment that is presented to the user by computer system 101 (and displayed by the display generation component of computer system 101), and an overhead view 1118 of the physical environment and the three-dimensional environment 1104 associated with computer system 101 to illustrate the relative locations of objects in the real world environment and the locations of virtual objects in the three-dimensional environment.

As shown in FIG. 11A, computer system 101 captures one or more images of the real world environment 1102 around computer system 101 (e.g., operating environment 100), including one or more objects in the real world environment 1102 around computer system 101. In some embodiments, computer system 101 displays representations of the real world environment 1102 in three-dimensional environment 1104. Though not shown in the three-dimensional environment 1104, the room includes a real table 1105*b*, which is obscured by the virtual environment 1104, as shown in the overhead view 1118. Further, as shown in overhead view 1118, user 1120 of computer system 101 is seated on couch 1119 and is holding computer system 101 (e.g., or wearing computer system 101 if, for example, computer system 101 were a head-mounted device).

In the illustrated embodiment of FIG. 11A, the computer system 101 displays the three-dimensional environment 1104 including a first user interface of a control center user interface 1124*a* and a music application user interface 1126*a* (e.g., a user interface of an application). As shown in the overhead view 1118, the first user interface of the control center user interface 1124*b* and the music application user interface 1126*b* are located at different positions in the three-dimensional environment 1104. The first user interface of the control center user interface 1124*b* includes an immersion slider user interface element 1128*a*, a system environment setting user interface element 1128*b*, an auto-dim user interface element 1128*c*, a volume control user interface element 1128*d*, and a focus mode control user interface element 1128*e*. Further, details with reference to the control center user interface 1124*a* are described with reference to methods 800, 1000, and/or 1200.

In the illustrated embodiment of FIG. 11A, person 1140*a* and person 1140*b* are in the real world environment 1102, as shown in the overhead view 1118, yet persons 1140*a*, 1140*b* are obscured from view in the three-dimensional environment 1104 due at least in part to the display of the three-dimensional environment 1104, which in the illustrated embodiment, is at a full level of immersion as indicated by the immersion level indicator 1116 (e.g., computer system 101 is displaying a virtual environment at full immersion).

In the illustrated embodiment of FIG. 11A, user attention 1130*a* and input from the hand 1132 of the user 1120 are alternatively or together directed to the focus mode control user interface element 1128*e*. In some embodiments, the user interface elements are selectable via user attention or input from the hand 1132, or via a combination of both user attention 1130*a* and input from the hand 1132, and such characteristics of the input and processes for detecting such inputs are described in more detail with reference to the method 800, 1000, and/or 1200.

Figure 11B:
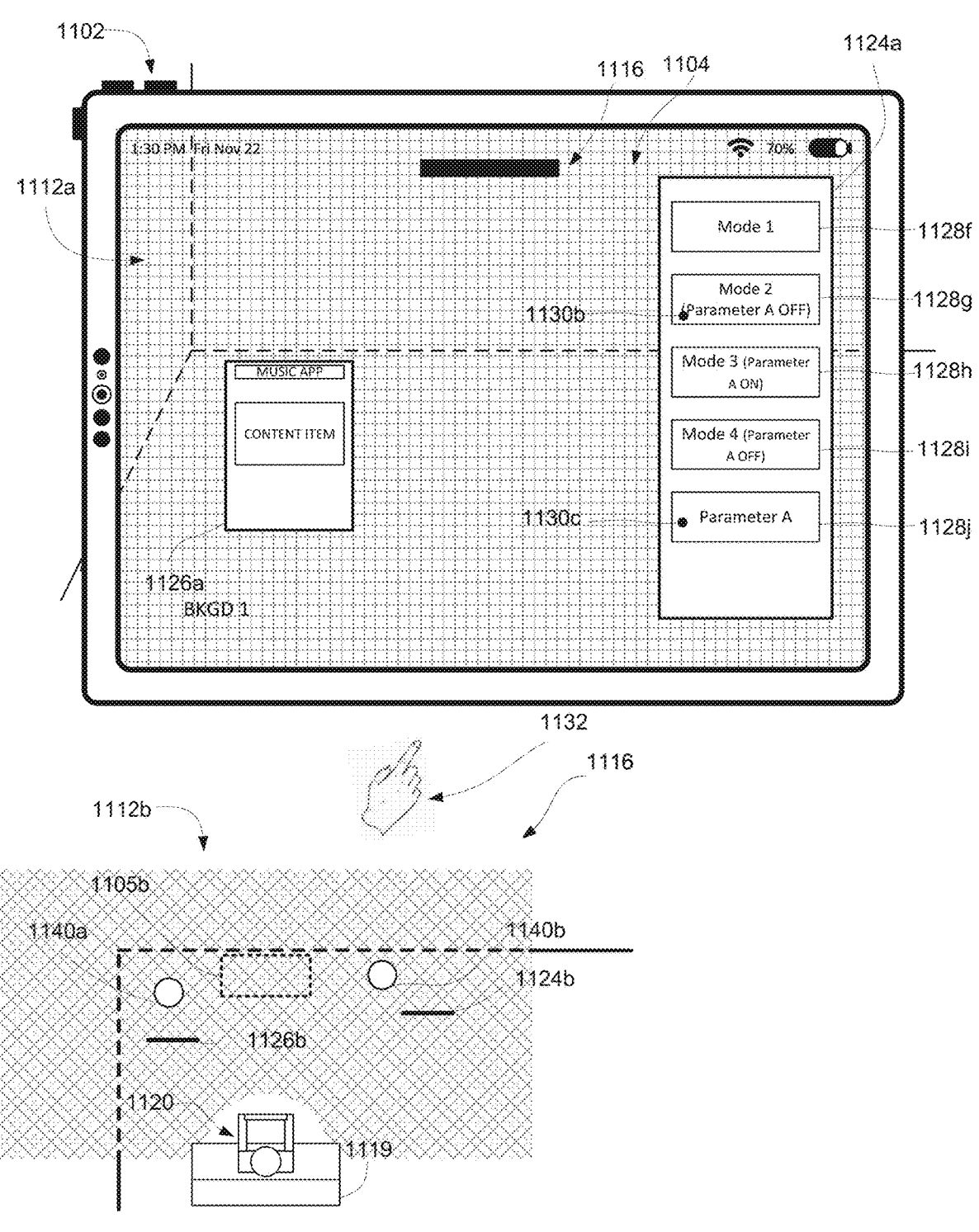

FIG. 11B illustrates the three-dimensional environment 1104 in response the input of FIG. 11A directed to the focus mode control user interface element 1128*e* of the first user interface of the control center user interface 1124*a*, in accordance with some embodiments. For example, in response to user attention 1130*a* directed to the focus mode control user interface element 1128*e* for a threshold time duration, the computer system 101 displays a second user interface of the control center user interface 1124*a*, as shown in FIG. 11B. The second user interface of the control center user interface 1124*a* includes selectable UI elements corresponding to modes of operation of the computer system 101, such as notifications-enabled modes (e.g., modes in which notification events such as incoming calls or incoming messages cause the computer system to present, visually and/or audibly, one or more notifications corresponding to those event), user-configurable notification modes (e.g., modes for which a user selects which types of notifications the user desires the computer system to alert the user of) or specific types of notifications enabled and/or disabled modes (e.g., focus modes in which a user optionally configures computer system 101 to alert and/or not alert the user of one or more or all types of notifications). The selectable UI elements of the second user interface of the control center user interface 1124*a* includes a first mode option 1128*f* (e.g., a do not disturb (DND) mode), a second mode option 1128*g* (e.g., a personal focus mode), in which a Parameter A setting (e.g., a setting in which breakthrough is permitted in response to satisfaction of one or more criteria such as described with reference to the method 1200) of the second mode option 1128*g* is inactive, a third mode option 1128*h* (e.g., a work focus mode), in which the Parameter A setting of the third mode option 1128*h* is active, a fourth mode option 1128*i*, in which the Parameter A setting of the fourth mode option 1128*i* is inactive, and a Parameter A option 1128*j* (e.g., a people awareness mode or a setting that is selectable for enablement or disablement of breakthrough in response to satisfaction of one or more criteria).

When the computer system 101 is operating in a mode in which Parameter A is active, and one or more criteria for breakthrough of one or more portions of the real world environment 1102 through the virtual environment 1104 are satisfied (e.g., a reducing of a visual prominence of one or more portions of the virtual environment 1104), as described in more detail with reference to method 1200, the computer system 101 optionally initiates breakthrough of one or more portions of the real world environment 1102 through the virtual environment 1104. When the computer system is operating in a mode in which Parameter A is inactive, and the one or more criteria for breakthrough of one or more portions of the real world environment 1102 through the virtual environment 1104 are satisfied, the computer system optionally does not initiate breakthrough of the one or more portions of the real world environment 1102 through the virtual environment 1104. Further details with reference to the modes, Parameter A, and one or more criteria for breakthrough are described with reference to the method 1200. It should be noted that the selectable options of the second user interface of the control center user interface 1124*a* in FIG. 11B area selectable for enabling a setting or mode corresponding to the selectable option (e.g., such as a toggle-like functionality).

In the illustrated embodiment of FIG. 11B, user attention 1130*b*, 1130*c* and input from the hand 1132 are alternatively or together directed to the second mode option 1128*g* (e.g., a personal focus mode) and the parameter A option 1128*j* (e.g., people awareness mode or setting that is selectable for enablement or disablement of breakthrough). In some embodiments, the user interface elements are selectable via user attention or input from the hand 1132, or via a combination of both user attention and input from the hand 1132, and such characteristics of the input and processes for detecting such inputs are described in more detail with reference to the method 800, 1000, and/or 1200. It should be noted that the selection options 1128*f*-1128*j* are selectable for causing the computer system 101 to operate in the respective mode of operation corresponding to the selection, optionally with or without further input. In some embodiments, any selectable option disclosed in this disclosure is selectable for performing an operation associated with the selectable option with or without further input.

FIG. 11B1 illustrates similar and/or the same concepts as those shown in FIG. 11B (with many of the same reference numbers). It is understood that unless indicated below, elements shown in FIG. 11B1 that have the same reference numbers as elements shown in FIGS. 11A-11F have one or more or all of the same characteristics. FIG. 11B1 includes computer system 101, which includes (or is the same as) display generation component 120. In some embodiments, computer system 101 and display generation component 120 have one or more of the characteristics of computer system 101 shown in FIGS. 11A-11F and display generation component 120 shown in FIGS. 1 and 3, respectively, and in some embodiments, computer system 101 and display generation component 120 shown in FIGS. 11A-11F have one or more of the characteristics of computer system 101 and display generation component 120 shown in FIG. 11B1.

In FIG. 11B1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 11A-11F.

In FIG. 11B1, display generation component 120 is illustrated as displaying content that optionally corresponds to the content that is described as being displayed and/or visible via display generation component 120 with reference to FIGS. 11A-11F. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 11B1.

Display generation component 120 has a field of view (e.g., a field of view captured by external image sensors 314b and 314c and/or visible to the user via display generation component 120, indicated by dashed lines in the overhead view) that corresponds to the content shown in FIG. 11B1. Because display generation component 120 is optionally a head-mounted device, the field of view of display generation component 120 is optionally the same as or similar to the field of view of the user.

In FIG. 11B1, the user is depicted as performing an air pinch gesture (e.g., with hand 1132) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 11A-11F.

In some embodiments, computer system 101 responds to user inputs as described with reference to FIGS. 11A-11F.

In the example of FIG. 11B1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 11A-11F and/or described with reference to the corresponding method(s) are optionally implemented on computer system 101 and display generation unit 120 in a manner similar or analogous to that shown in FIG. 11B1.

Figure 11C:
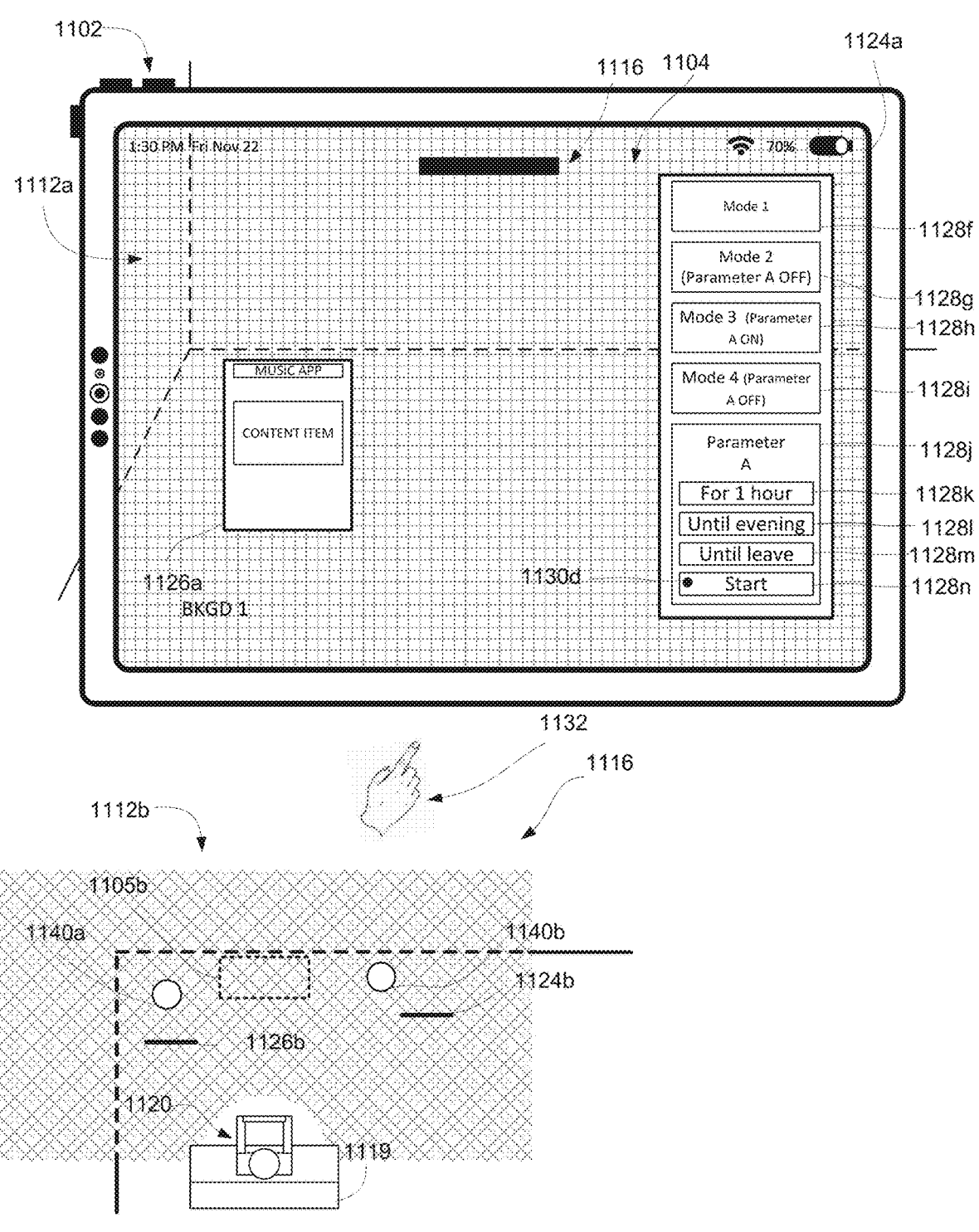

FIG. 11C illustrates the three-dimensional environment 1104 in response to the input of FIG. 11B (e.g., user attention 1130c directed to the parameter A option 1128j (e.g., people awareness mode or setting that is selectable for enablement or disablement of breakthrough)) of the second user interface of the control center user interface 1124a, in accordance with some embodiments. The second user interface of the control center user interface 1124a optionally expands, including selectable UI elements for enabling or setting settings corresponding to the enablement of the parameter A. The selectable UI elements in FIG. 11C include a selectable option 1128k corresponding to a timer for enabling Parameter A for a predetermined amount of time (e.g., 1 hour), a selectable option 1128l corresponding to a timer for enabling Parameter A for an amount of time based on a current location and/or time of day at a location of the computer system 101 (e.g., based on a sunset time at the location of the computer system 101), a selectable option 1128m that enables Parameter A for a time based on a current location of the computer system 101 (e.g., until the computer system 101 leaves its current location), and a selectable option 1128n that is selectable to enable or activate Parameter A independent of a current time and/or location of the computer system 101. Input from the user can be directed to any of the selectable options of Parameter A for enabling Parameter A accordingly, or to other selectable UI elements displayed in the second user interface of the control center user interface 1124a.

In the illustrated embodiment of FIG. 11C, user attention 1130d and input from the hand 1132 are alternatively or together directed to the selectable option 1128n, which is optionally selectable via user attention or input from the hand 1132, or via a combination of both user attention and input from the hand 1132, and such characteristics of the input and processes for detecting such inputs are described in more detail with reference to the method 800, 1000, and/or 1200.

Figure 11D:
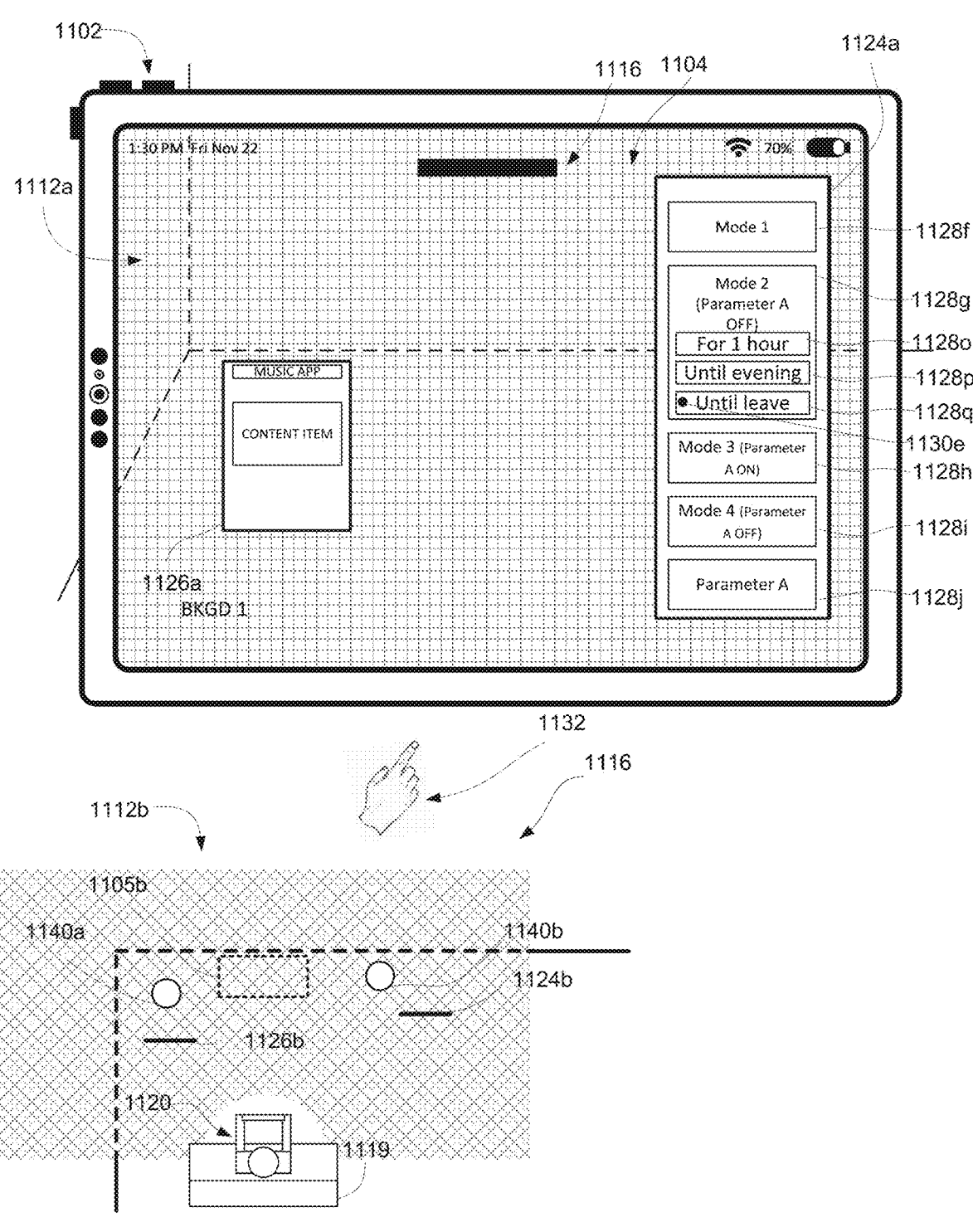

FIG. 11D illustrates the three-dimensional environment 1104 in response to input of FIG. 11B (e.g., user attention 1130b) directed to the second mode option 1128g (e.g., personal focus mode) of the second user interface of the control center user interface 1124a of FIG. 11B, in accordance with some embodiments. In response to the user attention 1130b, for example, the second user interface of the control center user interface 1124a is displayed with selectable options for enabling or setting settings corresponding to the enablement of the mode 1128g. The selectable options in FIG. 11C further includes a selectable option 1128o corresponding to a timer for enabling the second mode 1128g for a predetermined amount of time (e.g., 1 hour), a selectable option 1128p corresponding to a timer for enabling the second mode 1128g for an amount of time based on a current location and/or time of day at a location of the computer system 101 (e.g., based on a sunset time at the location of the computer system 101), and a selectable option 1128q that activates the second mode 1128g for a time based on a current location of the computer system 101 (e.g., until the computer system 101 leaves the current location). Input from the user can be directed to any of the selectable options for Mode 2 for enabling Mode 2 accordingly, or to other selectable UI elements displayed in the second user interface of the control center user interface 1124a.

In the illustrated embodiment of FIG. 11D, user attention 1130e and input from the hand 1132 are alternatively or together directed to the selectable option 1128q, which is optionally selectable via user attention or input from the hand 1132, or via a combination of both user attention and input from the hand 1132, and such characteristics of the input and processes for detecting such inputs are described in more detail with reference to the method 800, 1000, and/or 1200.

Figure 11E:
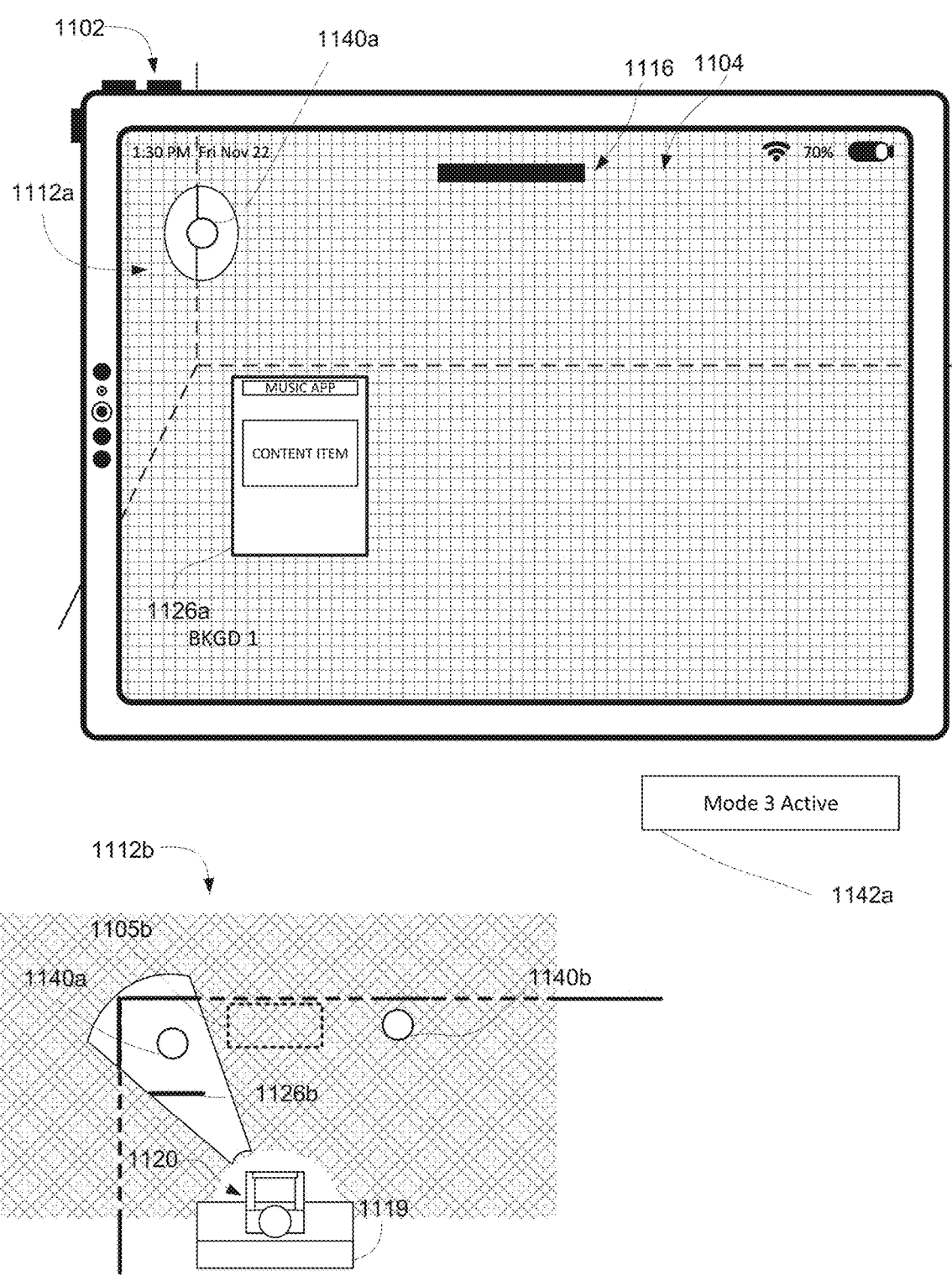

FIG. 11E illustrates the three-dimensional environment 1104 displayed by the computer system 101 while the computer system 101 is operating in the third mode, as indicated by the glyph 1142a of FIG. 11E, or any mode in with Parameter A is enabled (optionally in response to the input of FIG. 11C (e.g., user attention 1130d directed to the selectable option 1128n of the second user interface of the control center user interface 1124a)). Further, in FIG. 11E, person 1140a satisfies the one or more criteria for breakthrough. As shown, the virtual environment 1104 has been reduced in prominence (e.g., increased in transparency, reduced in brightness and/or reduced in color) in a region around and/or corresponding to the person 1140a such that person 1140a in the real world environment 1102 is visible via display generation component 120 without the computer system 101 having to be removed or turned off. This region of breakthrough of virtual environment 1104 optionally includes regions of virtual environment 1104 that are between user 1120 and person 1140*a* and/or regions of the virtual environment 1104 that are behind person 1140*a*, as shown in FIG. 11E. The person 1140*b* in FIG. 11E does not however meet the criteria for breaking through virtual environment 1104, and thus the virtual environment 1104 is not reduced in prominence in the region around and/or corresponding to the person 1140*b*. Further details describing techniques involved with reductions in prominence are discussed with reference to the method 1200.

Figure 11F:
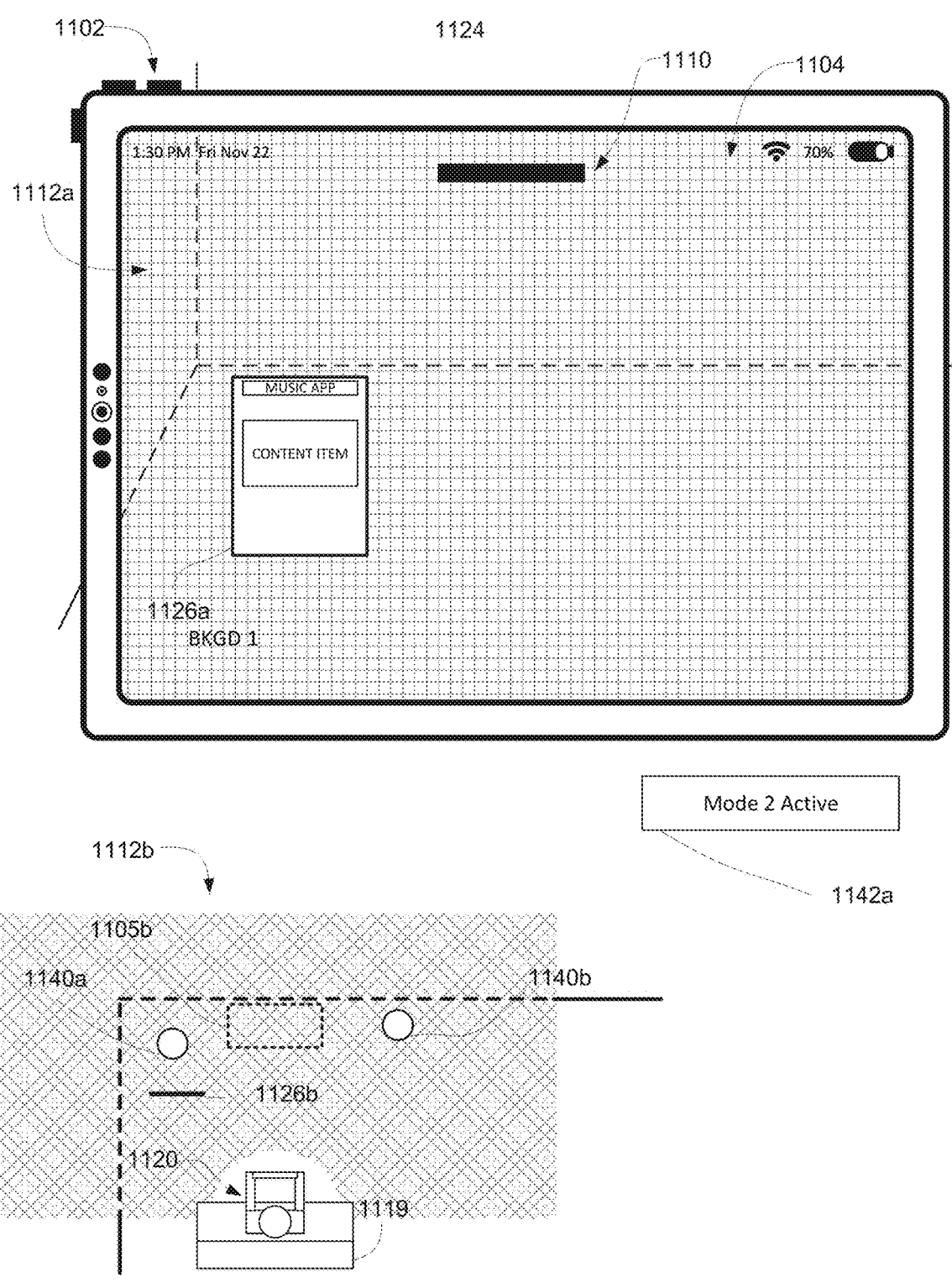
Figure 12D:
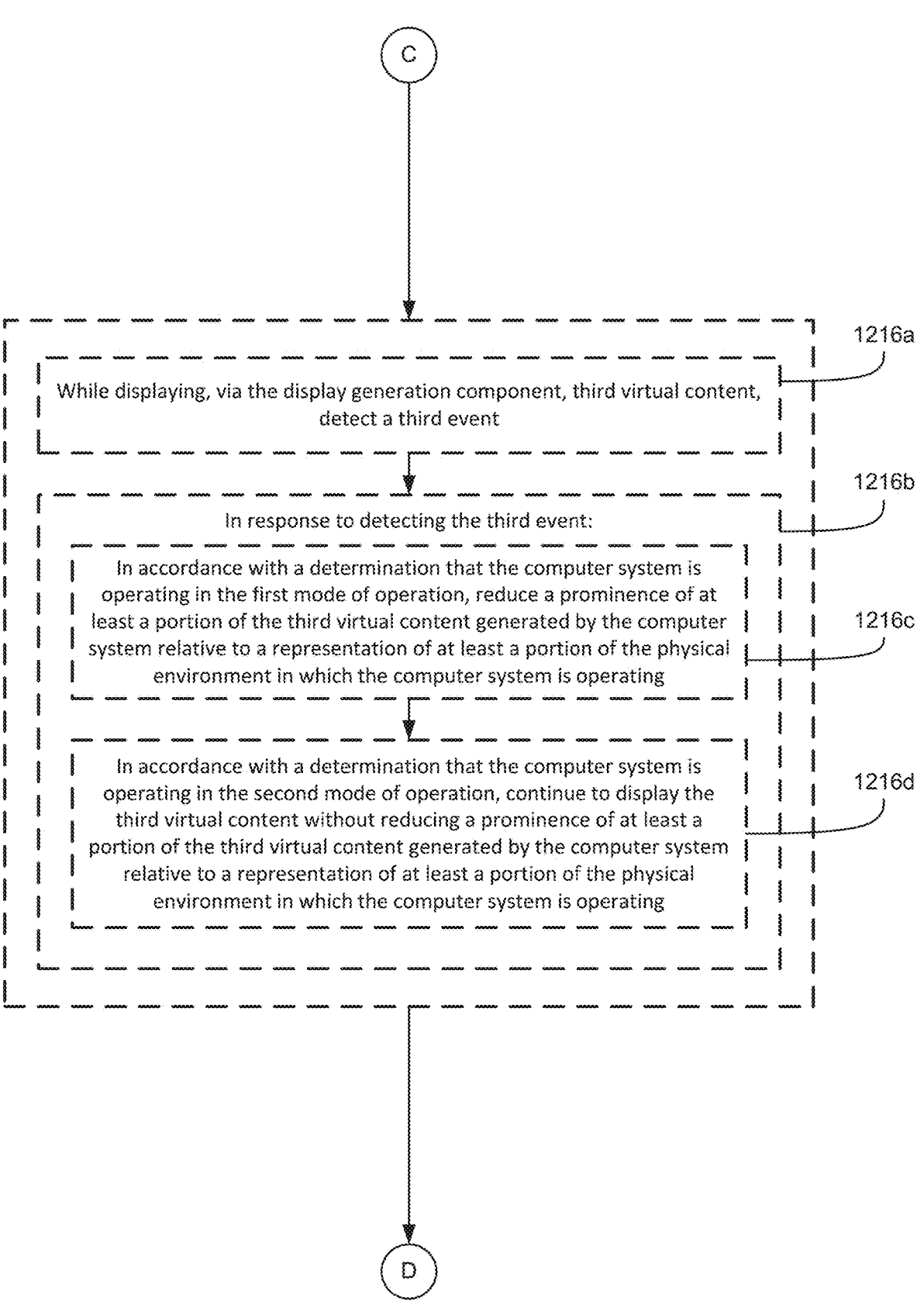
Figure 12E:
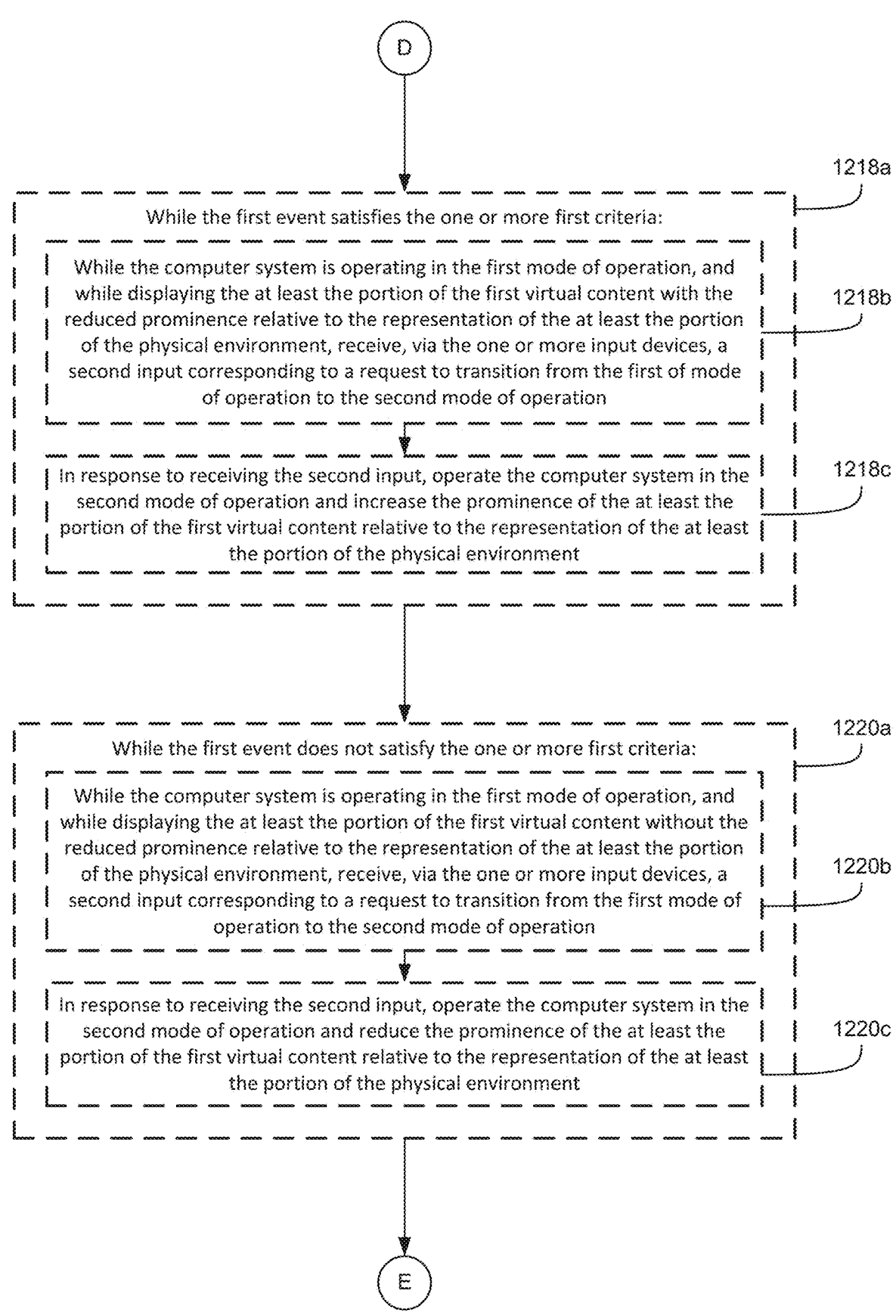
Figure 12G:
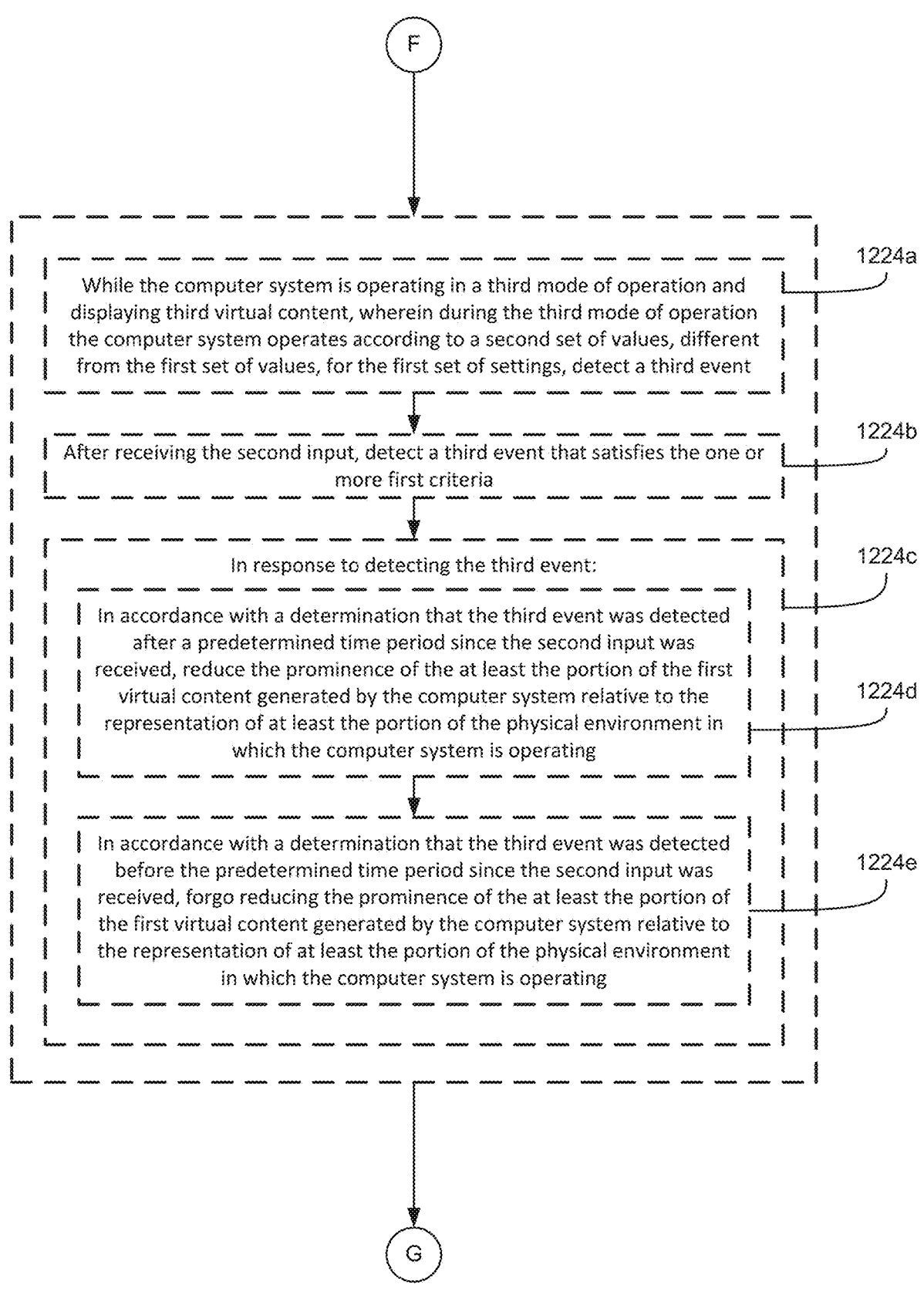
Figure 12I:
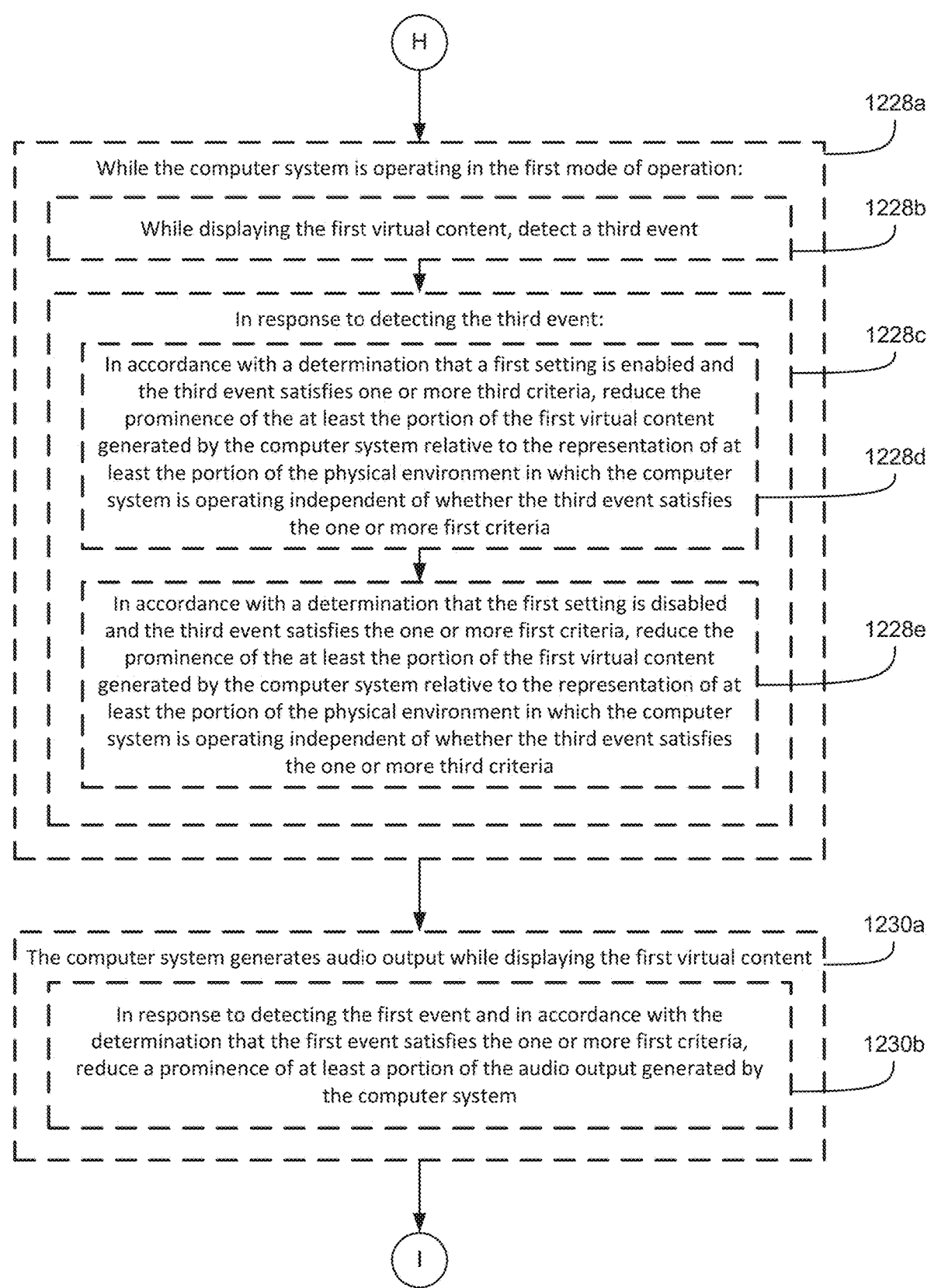
Figure 12J:
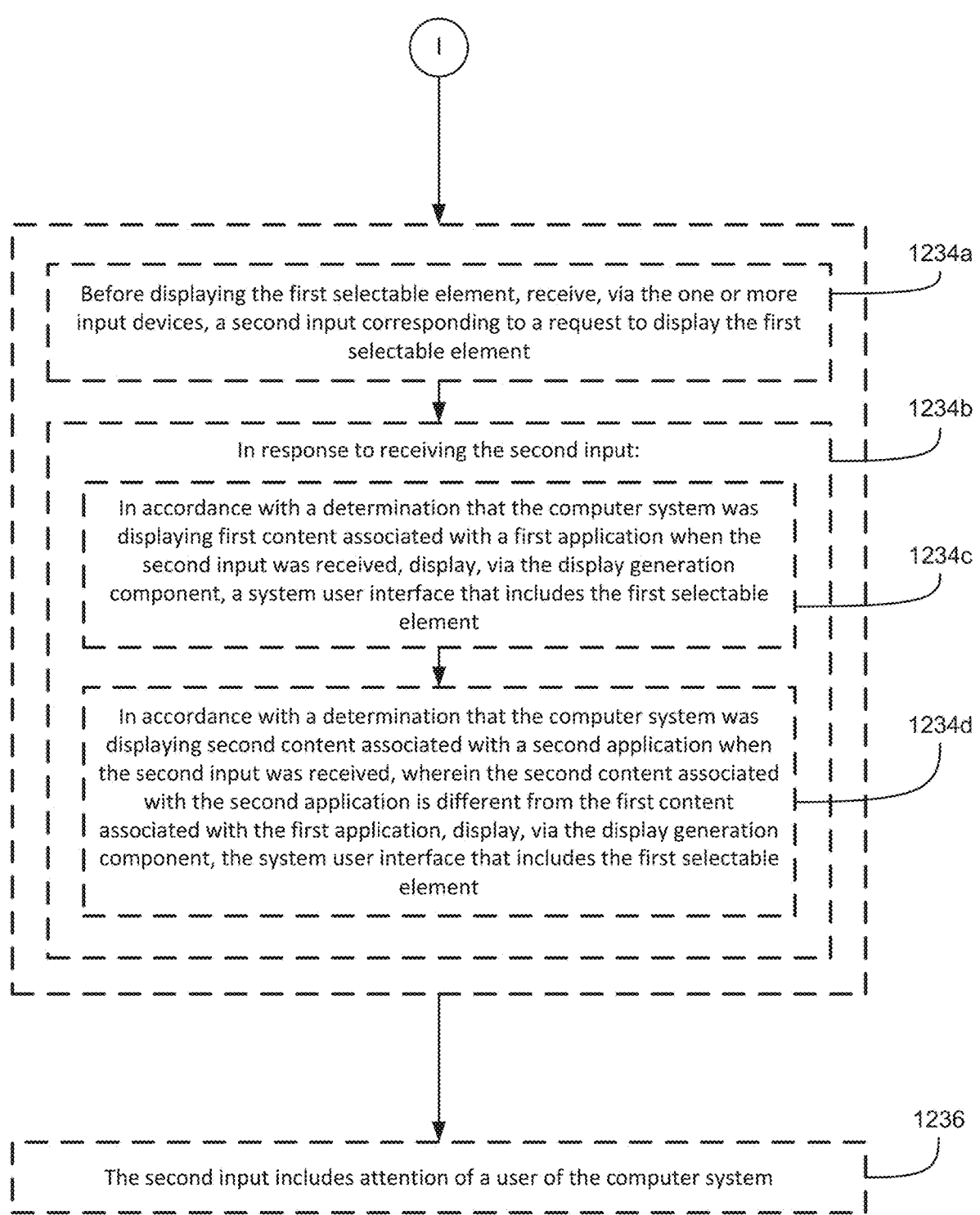

FIG. 11F illustrates the three-dimensional environment 1104 displayed by the computer system 101 while the computer system 101 is operating in the second mode as indicated by the glyph 1142*a* of FIG. 11F, or any mode in with Parameter A is disabled (optionally in response to the input of FIG. 11D (e.g., user attention 1130*d* and/or input from the hand 1132 directed to the selectable option 1128*q* of the second user interface of the control center user interface 1124*a* of FIG. 11D)). Further, in FIG. 11F, person 1140*a* satisfies the one or more criteria for breakthrough. As shown in FIG. 11F, in the second mode 1128*g*, Parameter A is off; thus, even though either or both of persons 1140*a*, 1140*b* optionally satisfy the one or more criteria for breakthrough, breakthrough of virtual environment 1104 does not occur. As such, the prominence of the virtual environment 11104 is optionally maintained even when the one or more criteria are met while the computer system 101 is operating in the second mode.

Further details with reference to aspects of the illustrated embodiments of FIGS. 11A-11F, in addition to other aspects of the disclosed embodiments, are discussed with reference to the method 1200.

FIGS. 12A-12J is a flowchart illustrating a method 1200 of controlling breakthrough settings of a computer system that displays, via a display generation component, a three-dimensional environment, in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at a computer system in communication with a display generation component and one or more input devices. In some embodiments, the computer system has one or more of the characteristics of the computer systems of the methods 800, 1000, 1400, and/or 1600. In some embodiments, the display generation component has one or more of the characteristics of the display generation components of the methods 800, 1000, 1400, and/or 1600. In some embodiments, the one or more input devices has one or more of the characteristics of the one or more input devices of the methods 800, 1000, 1400, and/or 1600.

In some embodiments, while the computer system is operating in a first mode of operation (e.g., while operating computer system according to third mode option 1128*h* of FIG. 11C) and displaying first virtual content, the computer system detects (1202*a*) a first event, such as the person 1140*a* of FIG. 11A, (e.g., a physical environment and/or object corresponding to the first event, a person or an object moving, performing a gesture, being oriented at an orientation relative to a user of the computer system and/or speaking relative to a user of the computer system). The first mode of operation is optionally a mode in which the computer system permits breakthrough of the physical environment and/or a physical object through the virtual content in response to the first event satisfying one or more first criteria, as will be described in more detail below. A breakthrough setting optionally controls whether a user of the computer system is alerted of the physical environment and/or object via the (display generation component of the) computer system. In a first configuration of the breakthrough setting, the computer system optionally allows breakthrough of the physical environment and/or object in response to the one or more first criteria being satisfied. In a second configuration of the breakthrough setting, different from the first configuration, the computer system optionally does not allow breakthrough of the physical environment and/or object in response to the one or more first criteria being satisfied.

In some embodiments, in response to detecting the first event (1202*b*) (e.g., a physical environment and/or object corresponding to the first event, a person or an object moving, performing a gesture, being oriented at an orientation relative to a user of the computer system and/or speaking relative to a user of the computer system) during the first mode of operation, in accordance with a determination that the first event (e.g., a physical environment and/or object corresponding to the first event, a person or an object moving relative to a user of the computer system, performing a gesture, having an orientation relative to a user of the computer system and/or speaking relative to a user of the computer system) satisfies one or more first criteria (e.g., the satisfaction of one or more first criteria optionally corresponds to a salient social interaction or other condition that corresponds to breakthrough of the physical environment and/or a physical object corresponding to the first event, as will be discussed in more detail hereinafter) the computer system reduces (1202*c*) a (visual and/or audible) prominence of at least a portion of the first virtual content (e.g., a level of focus (e.g., sharpness), a brightness, an opacity, a color saturation and/or a conspicuousness of the virtual content is changed (e.g., reduced) in response to the satisfaction of the one or more first criteria in the first mode of operation, and thus a visibility and/or conspicuousness of a physical environment and/or physical object corresponding to the first event through the virtual content is optionally changed (e.g., increased) in response to the satisfaction of the one or more first criteria in the first mode of operation) generated by the computer system relative to a representation of at least a portion of a physical environment in which the computer system is operating, such as reducing the prominence of virtual environment 1112*a* about the person 1140*a* in FIG. 11E. A salient social interaction optionally refers to an interaction of the person with the user of the computer system that the user would want to hear/see. For instance, if the person is the user's spouse asking the user what the user wants for dinner, this is optionally an interaction the user would want to see and/or hear, and such characteristics and/or actions of the first event optionally satisfy the one or more first criteria. As another example, the first event optionally includes a first person who is within a threshold distance (e.g., 0.5 m away, 1 m away, 5 m away, 10 m away, 25 m away, or 50 m away) of the user and/or that is performing a gesture, such as a wave gesture directed toward to the user. In some embodiments, the first event includes an inanimate object such as a basketball or a car that is within the threshold distance of the user. The first event optionally satisfies the one or more first criteria, such as a location-dependent criteria that is satisfied when the first person and/or inanimate object is within the threshold distance of the user, and as such, the computer system, when operating in the first mode of operation, reduces a prominence of the first virtual content.

In some embodiments, the breakthrough caused by the first event (e.g., a physical environment and/or object corresponding to the first event, a person or an object moving, performing a gesture, being oriented at an orientation relative to a user of the computer system and/or speaking relative to a user of the computer system) through the virtual content includes reducing a prominence of the virtual content such that the physical environment and/or object corresponding to the first event becomes (more) visible in the three-dimensional environment, such as illustrated by the reducing of the prominence of virtual content about the person 1140a from FIGS. 11B and 11B1 to FIG. 11E from the viewpoint of the user 1120 and the corresponding visibility of the person 1140a in FIG. 11E from the viewpoint of the user 1120. For example, in some embodiments, the three-dimensional environment includes virtual content (e.g., content that is not in the physical environment) displayed by the computer system and one or more portions of the physical environment of the display generation component. In some embodiments, the one or more portions of the physical environment are displayed in the three-dimensional environment via the display generation component (e.g., via virtual or video passthrough). In some embodiments, the one or more portions of the physical environment are views of the one or more portions of the physical environment of the computer system visible through a transparent portion of the display generation component (e.g., true or real passthrough). In some embodiments, the virtual content is displayed in a manner that occludes or otherwise reduces the visibility of one or more portions of the physical environment. For example, the virtual content is optionally closer than, and between, the one or more portions of the physical environment and the viewpoint of the user from which the three-dimensional environment is visible via the display generation component. In some embodiments, while the virtual content is obscuring the one or more portions of the physical environment, the computer system detects the first event in the one or more portions of the physical environment, and the virtual content also obscures, occludes, or otherwise reduces the visibility of the physical object.

In some embodiments, the computer system ceases display of the virtual content completely, thereby causing the physical environment and/or object corresponding to the first event to be fully visible via the display generation component, such as illustrated by the ceasing of display of virtual content about the person 1140a in FIG. 11E from the viewpoint of the user 1120. In some embodiments, the computer system reduces or changes the opacity, brightness, color saturation, and/or other visual characteristic of the virtual content to reduce the visual prominence of the virtual content relative to the three-dimensional environment less than completely, and increase the visibility of the physical environment and/or object corresponding to the first event through the virtual content (e.g., increase from 0% visible to 20%, 40%, 60% or 80% visible, or increase from 5% visible to 20%, 40%, 60% or 80% visible). In some embodiments, the amount by which the computer system reduces the visual prominence of the virtual content is different depending on user-defined settings that control an amount of breakthrough that occurs in response to the one or more first criteria being satisfied. In some embodiments, one or more portions of the virtual content that are obscuring the physical environment and/or object corresponding to the first event are reduced in visual prominence while the visual prominence of one or more other portions of the virtual content is maintained. In some embodiments, the visual prominence of the entirety of the virtual content is reduced.

In some embodiments, the computer system reduces the prominence of the virtual content by reducing an amount of virtual content displayed on the display generation component (e.g., an amount of the field of view of the user consumed by the virtual content) and/or changing one or more of the previously described characteristics of the virtual content, such as illustrated by the reducing of the prominence of virtual content about the person 1140a from FIGS. 11B and 11B1 to FIG. 11E from the viewpoint of the user 1120. In this way, the user can observe the physical environment and/or object corresponding to the first event through the display generation component, without having to don off the computer system, for example. In some embodiments, the computer system displays an animation (e.g., a virtual feathering around the physical environment and/or object corresponding to the first event) while reducing the visual prominence of the virtual content generated by the computer system. In some embodiments, in accordance with a determination that the first event no longer satisfies the one or more first criteria, operations performed optionally include automatically increasing the prominence of the at least the portion of the first virtual content.

In some embodiments, the computer system additionally or alternatively modifies audio emitted and/or generated by the computer system, in addition to reducing the prominence of the virtual content, as will be described below. For example, in some embodiments, the computer system reduces the volume of virtual audio presented by the computer system (e.g., virtual audio corresponding to the virtual content). In some embodiments, the computer system provides an active audio indication to the user indicative of the physical environment and/or object corresponding to the first event. For example, the computer system optionally emits audio of the phrase "Someone is waving at you" as audio to the user, in addition to reducing a prominence of the virtual content displayed via the display generation component.

In some embodiments, in accordance with a determination that the first event does not satisfy the one or more first criteria, the computer system continues to display (1202d) the first virtual content without decreasing a prominence of at least a portion of the first virtual content generated by the computer system relative to a representation of at least a portion of the physical environment in which the computer system is operating, such as without reducing the prominence of virtual environment 1112a about the person 1140a in FIG. 11E (e.g., a level of focus (e.g., sharpness), a brightness, an opacity, a color saturation and/or a conspicuousness of the virtual content is not changed). For example, if the physical environment and/or object corresponding to the first event is the user's dog that is walking around the physical environment and playing with a toy, this is optionally an interaction the user would not want to see and/or hear, and such characteristics and/or actions of the first event optionally do not satisfy the one or more first criteria. For instance, in some embodiments, the one or more first criteria include a criterion that is not satisfied when the user's spouse is simply walking around the physical environment. Additionally, for example, in some embodiments, the one or more first criteria include a criterion that is not satisfied when the user's spouse is talking to another person (other than the user of the computer system) or animal in the physical environment. As such, the computer system optionally maintains display of the first virtual content without reduction in response the first event not satisfying the one or more first criteria.

In some embodiments, while the computer system is operating in the first mode of operation, the computer system displays (1202e), via the display generation component, a first selectable element, such as the second option 1128g of FIGS. 11B and 11B1. In some embodiments, the first selectable element (e.g., first selectable focus mode control element) is displayed in a system user interface, as described with reference to the methods 800 and/or 1000 and/or is accessible via steps similar to accessing elements of the system user interface, as described with reference to the methods 800 and/or 1000.

In some embodiments, while the computer system is operating in the first mode of operation and/or displaying the first selectable element, the computer system is displaying the virtual content and/or user interface(s) of application(s) in a three-dimensional environment, as described with reference to the methods 800 and/or 1000. The computer system is optionally displaying a virtual environment with immersion, as described with reference to the method 800. In some embodiments, the computer system is not displaying virtual content while operating in the first mode of operation and/or displaying the first selectable element (e.g., a user has provided input to reduce a level of immersion of a virtual environment to zero, and/or a user of the computer system has provided input to cease display of one or more user interfaces of applications).

The first mode of operation is optionally a notifications-enabled mode (e.g., a mode in which notification events such as incoming calls or incoming messages cause the computer system to present, visually and/or audibly, one or more notifications corresponding to those event), a user-configurable notification mode (e.g., a mode that a user selects which types of notifications the user desires the computer system to alert the user of) or a specific type of notifications enabled and/or disabled mode (e.g., a focus mode such as a PERSONAL mode, WORK mode, or another mode, in which a user optionally configures the computer system to alert and/or not alert the user of one or more or all types of notifications). In some embodiments, the different modes have different rules for allowing notifications, such as different levels of notifications or frequencies of the notifications. The first mode of operation of the computer system is optionally a mode in which a setting (e.g., breakthrough setting) for permitting breakthrough of the physical environment and/or object through the virtual content is disabled (e.g., toggled off).

In some embodiments, the determination that the one or more first criteria are satisfied is made at the computer system. For example, the computer system optionally processes image or other data of real-world events and/or physical objects, and then makes a determination that the image or other data includes data that meets the one or more first criteria. In some embodiments, the determination that the one or more first criteria are satisfied is made at a server or other remote computer (e.g., a remote server or remote processors) that is in a different location than the location of the computer system. In some embodiments, the determination that the one or more first criteria are satisfied is made based upon data (e.g., image data) processed at the computer system and/or at the remote server.

In some embodiments, while the computer system is operating in the first mode of operation and while displaying the first selectable element, the computer system receives (1202f), via the one or more input devices, a first input directed to the first selectable element, such as user attention 1130b of FIGS. 11B and 11B1. In some embodiments, the first input directed to the first selectable element includes one or more aspects of the inputs described in the methods 800 and/or 1000 (e.g., air gestures such as a user's hand in a pinch position followed by a release of the pinch position while an attention of a user (and/or a dwell thereof) is directed to the first selectable focus mode control element, corresponding to a selection, a tap, and/or a push of a button). In some embodiments, the first input is a gaze input without other inputs such as an air gesture.

In some embodiments, the input directed to the first selectable element includes or is an air gesture. In some embodiments, the input directed to the first selectable element includes user attention directed to the first selectable element (e.g., gaze or attention directed to the first selectable element), a hand of a user in a particular pose (e.g., raised at a position in front of the user or in a pinch hand shape for a time period) at greater than a threshold hand distance (e.g., 0.2 cm, 0.5 cm, 1 cm, 2 cm, 3 cm, 5 cm, 10 cm, 20 cm, 40 cm, 100 cm, 200 cm or 500 cm) from the first selectable element, or any combination of the user attention, the hand of the user in the particular pose, and/or the hand of the user greater the threshold hand distance. In some embodiments, the input directed to the first selectable element includes touch inputs detected on a touch-sensitive surface (e.g., a touch screen). In some embodiments, the input directed to the first selectable element optionally includes a user pressing down on a control element on a mouse (e.g., a left click). In some embodiments, the input directed to the first selectable element is a gaze input without including other inputs such as an air gesture.

In some embodiments, the first selectable element is an affordance that is selectable to toggle between an active mode and an inactive mode in accordance with the received input. For example, any of selectable options 1128f-1128j of FIGS. 11B and 11B1 (and/or selectable options 1128e of FIG. 11A) is optionally selectable for toggling between an active mode and an inactive mode based on input directed to the respective selectable option. In some embodiments, the state of the first selectable element corresponds to a state of the breakthrough setting. For example, when the state of the first selectable element is in a first active state (e.g., toggled on), the breakthrough setting is in the first configuration (e.g., in a configuration that does not permit breakthrough of virtual content), and when the state of the first selectable element is in an inactive state (e.g., toggled off), the breakthrough setting is in the second configuration (e.g., in a configuration that allows breakthrough of virtual content). In some embodiments, the configuration of the breakthrough setting for an active and/or inactive state of the first selectable element is user configurable. In some embodiments, the computer system has or displays separate control elements for controlling the breakthrough setting, different from the first selectable element. In some embodiments, the first selectable element is a multi-state control, where the different states correspond to the different modes of the computer system, or a slider that is selectable to configure a variable breakthrough settings mode. For example, a variable breakthrough setting mode optionally corresponds to a breakthrough setting that allows breakthrough based on one or more second criteria, different from the one or more first criteria, as will be discussed in detail below.

In some embodiments, in response to receiving the first input directed to the first selectable element, the computer system operates (1202*g*) in a second mode of operation (e.g., a reduced breakthrough mode), different from the first mode of operation, such as illustrated in by the glyph 1142*a* of FIG. 11F.

In some embodiments, while operating the computer system in the second mode of operation and displaying second virtual content (optionally the same or different from the first virtual content), the computer system detects (1202*h*) a second event (e.g., a person or an object moving, performing a gesture, having an orientation relative to a user of the computer system and/or speaking, optionally different than, similar to, or same as the first event, relative to a user of the computer system), such as the person 1140*b* of FIG. 11F.

In some embodiments, in response to detecting the second event, and in accordance with a determination that the second event does not satisfy one or more second criteria (e.g., a salient social interaction or other condition that corresponds to breakthrough of the second event (e.g., physical environment and/or a physical object associated with the second event, in addition to one or more additional criteria, such as a criterion related to an identity corresponding to the second event (e.g., a relationship of the person relative to the user)), different from the one or more first criteria, the computer system continues to display (1202*i*) the second virtual content without decreasing a prominence of at least a portion of the second virtual content generated by the computer system relative to a representation of at least a portion of the physical environment in which the computer system is operating without regard to (e.g., independent of) whether or not the second event satisfies the one or more first criteria, such as without reducing the prominence of virtual environment 1112*a* about the person 1140*a* in FIG. 11F. The one or more first criteria is optionally used in determining if a prominence of the first virtual content should be reduced, without regard to the one or more second criteria, and the one or more second criteria is optionally criteria used in determining if a prominence of the second virtual content should be reduced, without regard to the one or more first criteria. In some embodiments, the one or more second criteria have one or more characteristics of the one or more first criteria.

Controlling whether a prominence of virtual content generated by the computer system will be reduced in response to a determination that one or more criteria is satisfied based on the mode of operation of the computer system reduces the number of inputs involved with controlling user interaction with real world objects or persons while the computer system is displaying virtual content.

In some embodiments, in response to detecting the second event while operating the computer system in the second mode of operation, and in accordance with a determination that the second event satisfies the one or more second criteria, the computer system reduces (1204) a (visual and/or audible) prominence of at least a portion of the second virtual content (e.g., a level of focus (e.g., sharpness), a brightness, an opacity, a color saturation and/or a conspicuousness of the virtual content) generated by the computer system relative to a representation of at least a portion of a physical environment in which the computer system is operating, such as reducing the prominence of virtual environment 1112*a* about the person 1140*b* in FIG. 11F such as shown with reference to the reduction in prominence of virtual environment 1112*a* about the person 1140*a* in FIG. 11E (e.g., without regard to (e.g., independent of) whether or not the second event satisfies the one or more first criteria), such as described above with reference to step(s) 1202 relative to the reduction the prominence of the at least a portion of the first virtual content generated by the computer system relative to the representation of at least a portion of the physical environment in which the computer system is operating, applied to the at least a portion of the second virtual content). Thus, in some embodiments, in the second mode of operation, the computer system reduces (or does not reduce) the prominence of the virtual content according to the one or more second criteria, and in the first mode of operation, the computer system reduces (or does not reduce) the prominence of the virtual content according to the one or more first criteria. In some embodiments, in accordance with a determination that the second event no longer satisfies the one or more second criteria, operations performed optionally include automatically increasing the prominence of the at least the portion of the second virtual content. Controlling whether a prominence of virtual content generated by the computer system will be reduced in response to a determination that one or more criteria is satisfied based on the mode of operation of the computer system reduces the number of inputs involved with controlling user interaction with real world objects or persons while the computer system is displaying virtual content.

In some embodiments, reducing the visual prominence of the portion of the first virtual content includes revealing, at a location of the portion of the first virtual content in the three-dimensional environment, a portion of the physical environment in which the computer system is operating, (such as by reducing an amount of virtual content of the first virtual content displayed at the location of the at least the portion of the first virtual content in the three-dimensional environment and/or by reducing the translucency of the portion of the first virtual content) wherein a location of the portion of the physical environment in the three-dimensional environment corresponds to the location of the portion of the first virtual content in the three-dimensional environment (1206), such as illustrated with the revealing of the portion of the physical environment surrounding or about the person 1140*a* in FIG. 11E. As such, the one or more first criteria, as discussed above with reference to the step(s) 1202, optionally affect or control when physical objects and/or physical environments corresponding to the first event replace display of portions of virtual objects and/or virtual environment. When the event (e.g., the first event or the second event) occurs at different locations, different portions of the physical environment are optionally revealed at the different locations in the first virtual content, while the physical environment is optionally not revealed in locations other than the different locations in the first virtual content (e.g., the portions of the first virtual content that does not correspond to the event). Controlling whether a portion of the physical environment replaces a portion of the first virtual content generated by the computer system based on the mode of operation of the computer system reduces the number of inputs needed to control user interaction with real world objects or persons while the computer system is displaying virtual content, and further makes the user away of their physical surroundings—thus, increasing user safety.

In some embodiments, the first event corresponds to one or more actions of a person in the physical environment, (such as a person facing the user of the computer system, talking to the user of the computer system, or moving toward the user of the computer system) and wherein the one or more first criteria include a criterion that is satisfied based on an attention of the person (1208) (e.g., the criterion is optionally satisfied in response to the person facing, talking to, or moving toward the user of the computer system for a predetermined time threshold (e.g., 0.5 s, 1 s, 5 s, 10 s, or another time threshold)). For example, the person 1140a of FIG. 11E optionally has performed a salient social interaction with the user 1120 of the computer system. The computer system optionally detects satisfaction of the one or more first criteria via the one or more input or more devices (e.g., one or more sensors, such as the image sensors and other sensors discussed in this present disclosure). Controlling whether a prominence of virtual content generated by the computer system will be reduced in response to a determination that a criterion that is based on an attention of a person is satisfied reduces the number of inputs needed to interact with such a person while the computer system is displaying virtual content.

In some embodiments, the one or more first criteria include a criterion that is satisfied based on motion of a user of the computer system in the physical environment (1210) (e.g., the criterion is optionally satisfied in response to the user moving above a threshold speed (e.g., 9 cm/s, 0.2 m/s, 0.5 m/s, 1 m/s, 3 m/s, or another threshold speed) or a portion of the user is moving above the threshold speed, such as the head and torso of the user falling toward the ground). For example, the person 1140a of FIG. 11E optionally has moved toward the user 1120 of the computer system, thus satisfying the criterion. Controlling whether a prominence of virtual content generated by the computer system will be reduced in response to a determination that a criterion that is based motion of a user of the computer system is satisfied reduces the number of inputs needed to reveal the physical environment while the computer system is displaying virtual content, and also enhances user safety.

In some embodiments, while displaying, via the display generation component, third virtual content (optionally the same or different from the first virtual content and the second virtual content), the computer system detects (1212a) a third event (e.g., a physical environment and/or object corresponding to the third event, a person or an object moving, performing a gesture, being oriented at an orientation relative to a user of the computer system and/or speaking relative to a user of the computer system, optionally different from the first event and the second event or the same as the first event or the second event), such as the person 1140a of FIG. 11E.

In some embodiments, in response to detecting the third event, in accordance with a determination that the third event satisfies one or more third criteria, including a criterion that is associated with alerting the user of a feature of the physical environment that is in a region with which a user of the computer system is likely to interact (such as a criterion that is based on a location of the computer system, display generation component, and/or user of the computer system being beyond a positional boundary within the physical environment (e.g., a boundary centered around the location of the user when the third virtual content was first displayed, such as a circular boundary with a 0.05, 0.1, 0.3, 0.5, 1, 2, 3, 5 or 10 meter radius), and/or based on detection of the user of the computer system being proximate to (e.g., within a 0.1 m, or 1 m, or 10 m, or another radius) or swiftly moving in the direction of an obstacle in the physical environment (e.g., a table, a staircase, a hole in a ground, a positional boundary set by the user of the computer system, or another obstacle detected by the computer system in the physical environment of the computer system), and independent of whether the computer system is operating in the first mode of operation or the second mode of operation, the computer system reduces (1212b) a prominence of at least a portion of the third virtual content generated by the computer system relative to a representation of at least a portion of the physical environment in which the computer system is operating (such as described above with reference to step(s) 1202 and/or reducing the prominence of the third virtual content where the obstacle described above is located in the three-dimensional environment) without regard to (e.g., independent of) whether or not the third event satisfies the one or more first criteria or the one or more second criteria, such as reducing the prominence of virtual environment 1112a about the person 1140a in FIG. 11E when the one or more third criteria is satisfied, without regard to whether the one or more first criteria or second criteria is satisfied by the person 1140a in FIG. 11E. As such, the computer system optionally continuously determines if the third event satisfies the one or more third criteria regardless of the mode of operation of the computer system. Maintaining the reducing of the prominence of virtual content in response to an event satisfying safety criteria regardless of the mode of operation of the computer system and or other criteria for reducing the prominence of virtual content increases user safety when using the computer system.

In some embodiments, the computer system detects (1214a) (e.g., receives) a notification event (e.g., an event for which the computer system is configured to notify the user, such as a newly received email, a call, a text message, or another notification event), such as a notification event for the user 1120 of FIG. 11F. In some embodiments, in response to detecting the notification event (1214b), in accordance with a determination that the computer system is operating in the first mode of operation, the computer system selectively generates (1214c) a notification associated with the notification event based on whether one or more third criteria are satisfied without regard to whether one or more fourth criteria are satisfied. For example, the user 1120 of FIG. 11E is optionally notified of the notification based on whether one or more third criteria that are optionally associated with the third mode option 1128h of FIG. 11C are satisfied without regard to whether one or more fourth criteria are satisfied. The one or more third criteria are optionally associated with the first mode of operation, such that the computer system will generate notifications corresponding to notification events meeting the one or more third criteria, and will not generate notifications corresponding to notification events not meeting the one or more third criteria.

In some embodiments, in accordance with a determination that the computer system is operating in the second mode of operation, the computer system selectively generates (1214d) the notification associated with the notification event based on whether the one or more fourth criteria are satisfied without regard to (e.g., independent of) whether the one or more third criteria are satisfied. For example, the user 1120 of FIG. 11F is optionally notified of the notification based on whether the one or more fourth criteria are satisfied optionally associated with the second mode option 1128h of FIG. 11C without regard to whether the one or more third criteria are satisfied. For example, the one or more fourth criteria are optionally associated with the second mode of operation, such that the computer system will generate notifications corresponding to notification events meeting the one or more fourth criteria, and will not generate notifications corresponding to notification events not meeting the one or more fourth criteria. Accordingly, the mode of operation of the computer system is optionally user-configurable for controlling notification settings for device notification (e.g., system notifications), in addition to controlling the criteria controlling whether the prominence of virtual content will be reduced in response to detected events. As such, different modes of operation optionally have the same, similar, or different criteria for enabling different types of notifications in the respective modes of operation. For example, in the first mode of operation, notifications corresponding to calls and/or text messages from a first set of people (and/or from a first set of applications) are optionally generated, while notifications are not generated from a second set of people (and/or from a second set of applications). As another example, in the second mode of operation, notifications corresponding to calls and/or text message from the first set of people and the second set of people are optionally generated (and/or from the first and second sets of applications), while notifications are not generated from a third set of people (and/or from a third set of applications). Selectively generating notifications based on respective criteria associated with respective modes of operation of the computer system increases user control of the computer system, and reduces the number of inputs involved with coordinating control of the response of the computer system to detected events and detected notification events.

In some embodiments, while displaying, via the display generation component, third virtual content (optionally the same or different from the first virtual content and the second virtual content), the computer system detects (1216a) a third event, such as the person 1140a of FIG. 11A (e.g., a physical environment and/or object corresponding to the third event, a person or an object moving, performing a gesture, being oriented at an orientation relative to a user of the computer system and/or speaking relative to a user of the computer system, optionally different from the first event and the second event or the same as the first event or the second event). In some embodiments, in response to detecting the third event (1216b), in accordance with a determination that the computer system is operating in the first mode of operation, the computer system reduces (1216c) a prominence of at least a portion of the third virtual content generated by the computer system relative to a representation of at least a portion of the physical environment in which the computer system is operating, such as reducing the prominence of virtual environment 1112a about the person 1140a in FIG. 11E (such as with one or more characteristics described above with reference to step(s) 1202 relative to the reducing the prominence of the at least the portion of the first virtual content, applied to the third virtual content).

In some embodiments, in accordance with a determination that the computer system is operating in the second mode of operation, the computer system continues to display (1216d) the third virtual content without reducing a prominence of at least a portion of the third virtual content generated by the computer system relative to a representation of at least a portion of the physical environment in which the computer system is operating, such as without reducing the prominence of virtual environment 1112a about the person 1140a in FIG. 11E. As such, the computer system optionally permits breakthrough of the third event when the computer system is operating in the first mode of operation (optionally because the first event satisfies breakthrough criteria (e.g., the one or more first criteria) associated with the first mode of operation) and does not permit breakthrough of the third event when the computer system is operating in the second mode of operation optionally because the first event does not satisfy breakthrough criteria (e.g., the one or more second criteria) associated with the second mode of operation. Controlling whether a prominence of virtual content generated by the computer system will be reduced based on the mode of operation of the computer system reduces the number of inputs involved with controlling user interaction with real world objects or persons while the computer system is displaying virtual content.

In some embodiments, while the first event satisfies the one or more first criteria (1218a), while the computer system is operating in the first mode of operation, and while displaying the at least the portion of the first virtual content with the reduced prominence relative to the representation of the at least the portion of the physical environment, the computer system receives (1218b), via the one or more input devices, a second input corresponding to a request to transition from the first of mode of operation to the second mode of operation, such as receiving user attention 1130b in FIGS. 11B and 11B1 while the computer system is operation in accordance with third mode option 1128h of FIGS. 11B and 11B1, (optionally including one or more characteristics of the first input directed to the first selectable element discussed with reference to the step(s) 1202, but corresponding to a request to transition from the first mode of operation to the second mode of operation). For example, the second input optionally includes user attention directed up at a top-center region of the field of view of the user in the three-dimensional environment, which optionally causes display of a system user interface such as a control center user interface, from which the user can select modes of operation of the computer system, such as illustrated and discussed with reference to FIGS. 11A-11D.

In some embodiments, in response to receiving the second input, the computer system operates (1218c) the computer system in the second mode of operation and increasing the prominence of the at least the portion of the first virtual content relative to the representation of the at least the portion of the physical environment (optionally such that the at least the portion of the physical environment is less visible or more or fully obscured in the three-dimensional environment due to the portion of the virtual content being increased in prominence (e.g., partially or fully), or such that the at least the portion of the first virtual content relative to the representation of the at least the portion of the physical environment returns to a prominence state that it had immediately before the at least the portion of the first virtual content was reduced in prominence relative to the representation of the at least the portion of the physical environment in response to detecting the first event). For example, the visual prominence of the virtual environment 1112a in FIG. 11E is optionally increased to the visual prominence of the virtual environment 1112a in FIG. 11F in response to the second input. The increase optionally occurs because the first event optionally does not satisfy the one or more second criteria, else the prominence would optionally remain reduced. Ceasing breakthrough of a portion of a physical environment in response to a change in the mode of operation of the computer system ensures that display of the physical environment corresponds to the current mode of operation of the computer system.

In some embodiments, while the first event does not satisfy the one or more first criteria (1220a), while the computer system is operating in the first mode of operation (e.g., while operating computer system according to third mode option 1128h of FIG. 11C), and while displaying the at least the portion of the first virtual content without the reduced prominence relative to the representation of the at least the portion of the physical environment, the computer system receives (1220*b*), via the one or more input devices, a second input corresponding to a request to transition from the first mode of operation to the second mode of operation, such as input from the hand 1132 directed to fourth mode option 1228*i* of FIGS. 11B and 11B1, (optionally including one or more characteristics of the first input directed to the first selectable element discussed with reference to the step(s) 1202, but corresponding to a request to transition from the first mode of operation to the second mode of operation). For example, the second input optionally includes user attention directed up at a top-center of field of view, which optionally causes display of a system user interface, from which the user can select modes of operation of the computer system, such as illustrated and discussed with reference to FIGS. 11A-11D.

In some embodiments, in response to receiving the second input, the computer system operates (1220*c*) the computer system in the second mode of operation and reducing the prominence of (e.g., reducing a brightness or color saturation, or increasing a blurriness or transparency associated with) the at least the portion of the first virtual content relative to the representation of the at least the portion of the physical environment, such as reducing the prominence of virtual environment 1112*a* about the person 1140*b* in FIG. 11F such as shown with reference to the reduction in prominence of virtual environment 1112*a* about the person 1140*a* in FIG. 11E, such as described above with reference to step(s) 1202 relative to the reduction the prominence of the at least a portion of the first virtual content generated by the computer system relative to the representation of at least a portion of the physical environment in which the computer system is operating, optionally because the first event satisfies the one or more second criteria. For example, a user may transition from a first focus mode, such a WORK mode, to a second focus mode, such as a PERSONAL mode. In the WORK mode, one or more persons, such as a person without a work association with the user of the computer system and/or just a friend association with the user, optionally do not satisfy the one or more first criteria, while one or more other persons, such as persons with a work association with the user optionally do satisfy the one or more first criteria, and as such, a salient interaction performed by the one or more persons with the work association with the user optionally causes the reduction in prominence discussed above, while a salient interaction performed by the one or more other persons without the work association with the user and/or just the friend association with the user optionally do not cause the reduction in prominence discussed above. Continuing with this example, the user's work hours or business hours may end for the day, and when or after the user's work hours or business hours end, the user may desire to transition from the WORK focus mode to the PERSONAL mode. When the user transitions to the PERSONAL mode (e.g., a personal focus mode) one or more persons, such as persons indicated in the computer system as friends of the user optionally satisfy the one or more first criteria, and as such, a salient interaction performed by the one or more friends optionally causes the reduction in prominence discussed above. Causing breakthrough of a portion of a physical environment in response to a change in the mode of operation of the computer system ensures that display of the physical environment corresponds to the current mode of operation of the computer system.

In some embodiments, during the first mode of operation (e.g., while operating computer system according to third mode option 1128*h* of FIGS. 11B and 11B1), the computer system operates according to a first set of values (set for the first mode of operation, such as notification delivery settings (e.g., methods delivery notifications via haptic technology, audio, and/or visual technology) for notifying a user of the computer system and configured for the first mode of operation, notification events settings such as discussed with reference to step(s) 1214, and/or allowed notifications for a set of applications and/or a set of people) for a first set of settings (1222*a*). In some embodiments, while the computer system is operating in a third mode of operation (e.g., while operating computer system according to parameter A option 1128*j* of FIGS. 11B and 11B1) (optionally different from the first mode of operation and the second mode of operation, or the same as the second mode of operation) and displaying third virtual content (optionally the same or different from the first virtual content and the second virtual content), wherein during the third mode of operation the computer system operates according to a second set of values (set for the third mode of operation, such as notification delivery settings (e.g., methods delivery notifications via haptic technology, audio, and/or visual technology) for notifying a user of the computer system and configured for the third mode of operation), different from the first set of values, for the first set of settings, the computer system detects (1222*b*) a third event (e.g., a physical environment and/or object corresponding to the first event, a person or an object moving, performing a gesture, being oriented at an orientation relative to a user of the computer system and/or speaking relative to a user of the computer system optionally different from the first event and the second event or the same as the first event or the second event).

In some embodiments, in response to detecting the third event during the third mode of operation (1222*c*), in accordance with a determination that the third event satisfies the one or more first criteria (e.g., the salient social interaction or other condition that corresponds to breakthrough of the physical environment and/or a physical object corresponding to the first event, as discussed above with reference to step(s) 1202), the computer system reduces (1222*d*) a (visual and/or audible) prominence of at least a portion of the first virtual content, such as described with reference to step(s) 1202) generated by the computer system relative to a representation of at least a portion of a physical environment in which the computer system is operating, such as the reduction of prominence of virtual environment 1112*a* about the person 1140*a* in FIG. 11E. In some embodiments, in accordance with a determination that the third event does not satisfy the one or more first criteria, the computer system continues to display (1222*e*) the first virtual content without decreasing a prominence of at least a portion of the first virtual content generated by the computer system relative to a representation of at least a portion of the physical environment in which the computer system is operating, such as illustrated with the virtual environment 1112*a* about the person 1140*a* in FIG. 11F not being reduced in prominence, such as described with reference to step(s) 1202. As such, multiple modes of operations (e.g., focus modes) having different settings, such as different notification delivery settings, optionally have the same breakthrough settings (e.g., the one or more first criteria). Configuring multiple focus modes with different settings for controlling different aspects of user interacting with the computer system to have the same breakthrough setting increases user control of the computer system and maintains consistent operation of the computer system for the user.

In some embodiments, while the computer system is operating in the first mode of operation, the computer system receives (1224a), via the one or more input devices, a second input corresponding to a request to forgo reducing the visual prominence of the at least the portion of the first virtual content in response to detecting a respective event that satisfies the one or more first criteria, such as input from hand 1132 directed to selectable option 1128o of FIG. 11D, in which Parameter A is configured to be inactive or off for a 1 hour, optionally for a predetermined time period, as discussed in detail below. Also, the second input optionally includes one or more characteristics of the first input directed to the first selectable element discussed with reference to the step(s) 1202, but corresponding to a request to forgo reducing the visual prominence of the at least the portion of the first virtual content in response to detecting a respective event that satisfies the one or more first criteria. For example, the second input optionally includes user attention directed up at a top-center region of the field of view of the user in the three-dimensional environment, which optionally causes display of a system user interface such as a control center user interface, from which the user can select modes of operation of the computer system, and further, enable or disable reducing the visual prominence of the at least the portion of the virtual content, such as illustrated and discussed with reference to FIGS. 11A-11D.

In some embodiments, after receiving the second input, the computer system detects (1224b) a third event (e.g., a physical environment and/or object corresponding to the third event, a person or an object moving, performing a gesture, being oriented at an orientation relative to a user of the computer system and/or speaking relative to a user of the computer system optionally different from the first event and the second event or the same as the first event or the second event) that satisfies the one or more first criteria discussed above with reference to step(s) 1202, 1208, and 1210, such as the person 1140a of FIG. 11D.

In some embodiments, in response to detecting the third event (1224c), in accordance with a determination that the third event was detected after a predetermined time period (e.g., 1 min, 5 min, 9 min, 30 min, 1 hr, 5 hr, 10 hr, 12 hr, 24 hr, or another predetermined time period that is optionally user-configurable as part of the second input) since the second input was received, such as one hour after the selectable option 1128o of FIG. 11D was selected, the computer system reduces (1224d) the prominence of the at least the portion of the first virtual content generated by the computer system relative to the representation of at least the portion of the physical environment in which the computer system is operating, such as described herein with reference to step(s) 1202 and 1206, such as reducing the prominence of virtual environment 1112a about the person 1140a in FIG. 11E.

In some embodiments, in accordance with a determination that the third event was detected before the predetermined time period (e.g., 1 min, 5 min, 9 min, 30 min, 1 hr, 5 hr, 10 hr, 12 hr, 24 hr, or the other predetermined time period that is optionally user-configurable as part of the second input) since the second input was received, such as before one hour has passed since the selectable option 1128o of FIG. 11D was selected the computer system forgoes reducing (1224e) the prominence of the at least the portion of the first virtual content generated by the computer system relative to the representation of at least the portion of the physical environment in which the computer system is operating, such as maintaining the prominence of virtual environment 1112a about the person 1140a as illustrated in FIG. 11F. As such, the computer system is optionally configurable for enabling and disabling breakthrough in a given mode of operation for a predetermined amount of time. Configuring the computer system for enabling and disabling breakthrough in a given mode of operation for a predetermined amount of time increases user control of the computer system, and reduces the number of inputs involved with returning to the default breakthrough setting of the current mode of operation.

In some embodiments, while the computer system is operating in the first mode of operation, the computer system receives (1226a), via the one or more input devices, a second input corresponding to a request to forgo reducing the visual prominence of the at least the portion of the first virtual content in response to detecting a respective event that satisfies the one or more first criteria, such as input from hand 1132 directed to selectable option 1128q of FIG. 11D, in which Parameter A is configured to be inactive or off for a until the computing system leaves a location, optionally until a predetermined event occurs, as discussed in detail below. Also, the second input optionally includes one or more characteristics of the first input directed to the first selectable element discussed with reference to the step(s) 1202, but corresponding to a request to forgo reducing the visual prominence of the at least the portion of the first virtual content in response to detecting a respective event that satisfies the one or more first criteria. For example, the second input optionally includes user attention directed up at a top-center region of the field of view of the user in the three-dimensional environment, which optionally causes display of a system user interface such as a control center user interface, from which the user can select modes of operation of the computer system, and further, enable or disable reducing the visual prominence of the at least the portion of the virtual content based on criteria related to the occurrence of a predetermined event, such as illustrated and discussed with reference to FIGS. 11A-11D.

In some embodiments, after receiving the second input, the computer system detects (1226b) a third event (e.g., a physical environment and/or object corresponding to the third event, a person or an object moving, performing a gesture, being oriented at an orientation relative to a user of the computer system and/or speaking relative to a user of the computer system optionally different from the first event and the second event or the same as the first event or the second event) that satisfies the one or more first criteria, such as described with reference to step(s) 1202, 1208, and 1210.), such as the person 1140a of FIG. 11D.

In some embodiments, in response to detecting the third event (1226c), in accordance with a determination that the third event was detected after a predetermined event (e.g., a time of day at the computer system being or reaching a certain time of day or a certain time period of the day (e.g., "tomorrow morning"), the computer system leaving a current or specified location, or another predetermined event that is optionally user-configurable) has occurred after the second input was received, such as after the computer system has left the location of the computer system when the input directed to the selectable option 1128q of FIG. 11D was selected, the computer system reduces (1226d) the prominence of the at least the portion of the first virtual content generated by the computer system relative to the representation of at least the portion of the physical environment in which the computer system is operating, such as described herein with reference to step(s) 1202 and 1206, such as illustrated by the reduction the prominence of virtual environment 1112*a* about the person 1140*a* in FIG. 11E.

In some embodiments, in accordance with a determination that the predetermined event has not occurred since the second input was received, such as before the computer system has left the location of the computer system when the input directed to the selectable option 1128*q* of FIG. 11D was selected, the computer system forgoes reducing (1226*e*) the prominence of the at least the portion of the first virtual content generated by the computer system relative to the representation of at least the portion of the physical environment in which the computer system is operating, such as maintaining the prominence of virtual environment 1112*a* about the person 1140*a* as illustrated in FIG. 11F. As such, the computer system is optionally configurable for enabling and disabling breakthrough in a given mode of operation until the occurrence of a particular event. In some embodiments, the particular event is user-configurable as part of the second input. Configuring the computer system for enabling and disabling breakthrough in a given mode of operation until the occurrence of a particular event increases user control of the computer system, and reduces the number of inputs involved with returning to the default breakthrough setting of the current mode of operation.

In some embodiments, while the computer system is operating in the first mode of operation (1228*a*), while displaying the first virtual content, the computer system detects (1228*b*) a third event, such as the person 1140*a* of FIG. 11A (e.g., a physical environment and/or object corresponding to the third event, a person or an object moving, performing a gesture, being oriented at an orientation relative to a user of the computer system and/or speaking relative to a user of the computer system, optionally different from the first event and the second event or the same as the first event or the second event).

In some embodiments, in response to detecting the third event (1228*c*), in accordance with a determination that a first setting (that is different from breakthrough setting of the first mode of operation and from the breakthrough setting of the second mode of operation) is enabled, such as the parameter A option 1128*j*, in FIG. 11D being selected, such as a setting for controlling breakthrough, and more specifically, optionally for controlling breakthrough of a specific type, such as for controlling breakthrough of a person(s) corresponding to an event, but not of an inanimate object, for example, and the third event satisfies one or more third criteria (optionally the same or different from the one or more first criteria or the one or more second criteria, such as a criterion that is satisfied based on an attention of a person, as discussed with reference to step(s) 1208), the computer system reduces (1228*d*) the prominence of the at least the portion of the first virtual content generated by the computer system relative to the representation of at least the portion of the physical environment in which the computer system is operating independent of whether the third event satisfies the one or more first criteria (e.g., such as described with reference to step(s) 1202), such as reducing the prominence of virtual environment 1112*a* about the person 1140*a* in FIG. 11E. The breakthrough setting that corresponds to the first setting, enabled, is optionally independent from the breakthrough setting of the first mode of operation and from the breakthrough setting of the second mode of operation.

In some embodiments, in accordance with a determination that the first setting is disabled such as, if such parameter A option 1128*j* in FIG. 11D was not selected, and the third event satisfies the one or more first criteria, the computer system reduces (1228*e*) the prominence of the at least the portion of the first virtual content generated by the computer system relative to the representation of at least the portion of the physical environment in which the computer system is operating independent of whether the third event satisfies the one or more third criteria, such as, such as reducing the prominence of virtual environment 1112*a* about the person 1140*a* in FIG. 11E in while in the third mode as illustrated by the glyph 1142*a* of FIG. 11F and as illustrated by the third mode option 1128*h* of FIG. 11D. Further, in accordance with a determination the one or more third criteria is not satisfied, an operation performed optionally includes forgoing reducing the prominence. As such, the computer system is optionally configurable for controlling breakthrough of specific types of events independent from breakthrough setting associated with a specific mode of operation of the computer system (e.g., so as to optionally override a breakthrough setting associated with the current mode of operation of the computer system, optionally without overriding a breakthrough setting associated with safety of the user, such as discussed with reference to step(s) 1212). In some embodiments, the computer system displays a second selectable element optionally concurrent with the display of the first selectable element and optionally in the system user interface described with reference to the methods 800 and/or 1000. The second selectable element is optionally selectable for enabling or disabling (e.g., toggling) the first setting discussed above. Configuring the computer system for enabling and disabling breakthrough of specific types of event independent from a configured breakthrough setting of a specific mode of operation increase user control of the computer system.

In some embodiments, the computer system generates audio output while displaying the first virtual content (1230*a*) such as generating audio output via one or more speakers, headphones, or earphones or another output device in communication with the computer system that provides audio output that optionally corresponds to the user experience and/or the first virtual content. In some embodiments, in response to detecting the first event and in accordance with the determination that the first event satisfies the one or more first criteria, the computer system reduces (1230*b*) a prominence of at least a portion of the audio output generated by the computer system (optionally relative to audio emitted by sources external to the computer system and/or audio from the physical environment and/or audio not generated by the computer system). For example, audio associated with the virtual environment 1112*a* is optionally reduced along with reducing the prominence of virtual environment 1112*a* about the person 1140*a* in FIG. 11E. Reducing the prominence optionally includes reducing a volume level of audio generated by the computer system or increasing an amount of audio permitted through the audio generating device such as by turning off a noise cancellation system or turning on a transparency system of the audio generating device. Other ways of reducing the audio prominence may also be used, alternatively or in addition to the above recited ways. Further, one or more operations described with reference to the method 1400 are also optionally involved in the process of reducing the audio prominence. Reducing a prominence of audio output generated by the computer system in response to an event meeting breakthrough criteria reduces the number of inputs involved with controlling user interaction with the physical environment while the computer system is displaying virtual content, thus increasing user safety.

In some embodiments, before displaying the first selectable element, the computer system receives (1234*a*), via the one or more input devices, a second input corresponding to a request to display the first selectable element, such as an input including one or more aspects user attention 1130a of FIG. 11A. The second input optionally includes one or more aspects of the input directed to the volume control element discussed above with reference to step(s) 1202, corresponding to a request to display the first selectable element. In some embodiments, in response to receiving the second input (1234b), in accordance with a determination that the computer system was displaying first content associated with a first application (that optionally includes one or more characteristics of the user interface of the application described above with reference to (step(s) 1202 of) the method 1000), such as the music user interface of the application 1126a of FIG. 11A, when the second input was received, the computer system displays (1234c), via the display generation component, a system user interface that includes the first selectable element, such as the control center user interface 1124a of FIG. 11A such as the system user interface illustrated in FIGS. 7A and 9A and/or described with reference to the methods 800 and 1000. The system user interface optionally is displayed adjacent to or a distance from display of the first content associated with the second application, or obscures or is displayed in front of (e.g., between the viewpoint of the user and) the first virtual content).

In some embodiments, in accordance with a determination that the computer system was displaying second content associated with a second application (that optionally includes one or more characteristics of the user interface of the application described above with reference to (step(s) 1202 of) the method 1000) when the second input was received, wherein the second content associated with the second application is different from the first content associated with the first application, the computer system displays (1234d), via the display generation component, the system user interface that includes the first selectable element, such as the control center user interface 1124a of FIG. 11A. The system user interface optionally is displayed adjacent to or a distance from display of the second content associated with the second application, or obscures or is displayed in front of (e.g., between the viewpoint of the user and) the second content). In some embodiments, the system user interface, when displayed, is viewpoint locked, as described earlier in this present disclosure. Providing accessibility to a system control user interface from different virtual experiences displayed by the display generation component provides consistent interaction with the computer system, thus reducing errors in usage and enhancing user experience with the computer system.

In some embodiments, the second input includes attention of a user of the computer system (1236), such as an input including one or more aspects user attention 1130a of FIG. 11A. The second input optionally corresponds to attention of a user of the computer system being directed to specific portions of virtual content displayed by the display generation component, such as a portion of the virtual content that is gaze-selectable to initiate display of the system user interface in the three-dimensional environment simulated and/or displayed via the display generation component, optionally without input other than user attention (e.g., attention of the user directed to the gaze-selectable portions for longer than a time threshold such as 0.1, 0.3, 0.5, 1, 2, 3, 5, 10, 20 or 30 seconds, or another time threshold). In an example, the second input optionally includes user attention directed up at a top-center region of the field of view of the user in the three-dimensional environment, optionally for a predetermined time period (e.g., 0.5 s, 1 s, 5 s, 20 s, or another predetermined time period), which optionally causes display of a system user interface such as a control center user interface, such as illustrated and discussed with reference to FIG. 11A. In some embodiments, the second input corresponds to attention of the user of the computer system discussed above, in addition to hand gestures performed by the user, such as the air gestures directed to the first selectable element discussed above with reference to step(s) 1202, directed to the portion of the virtual content that is gaze-selectable. Indeed, in some embodiments, the portion of the first content or the second content that is gaze-selectable to cause display of the system user interface is alternatively or additionally, selectable via gaze and air gestures. Displaying a system control user interface in response to detection of attention of a user (e.g., a gaze of a user) is an efficient manner of displaying the system user interface, may reduce user fatigue or exertion for displaying the system user interface, and enhances user experience with the computer system.

It should be understood that the particular order in which the operations in method 1200 have been described is merely exemplary and is not intended to indicate that the described order is the only order in which the operations could be performed. One of ordinary skill in the art would recognize various ways to reorder the operations described herein.

FIGS. 13A-13D illustrate examples of a first computer system facilitating display of a representation of content from a second computer system in a three-dimensional environment, in accordance with some embodiments.

Figure 13A:
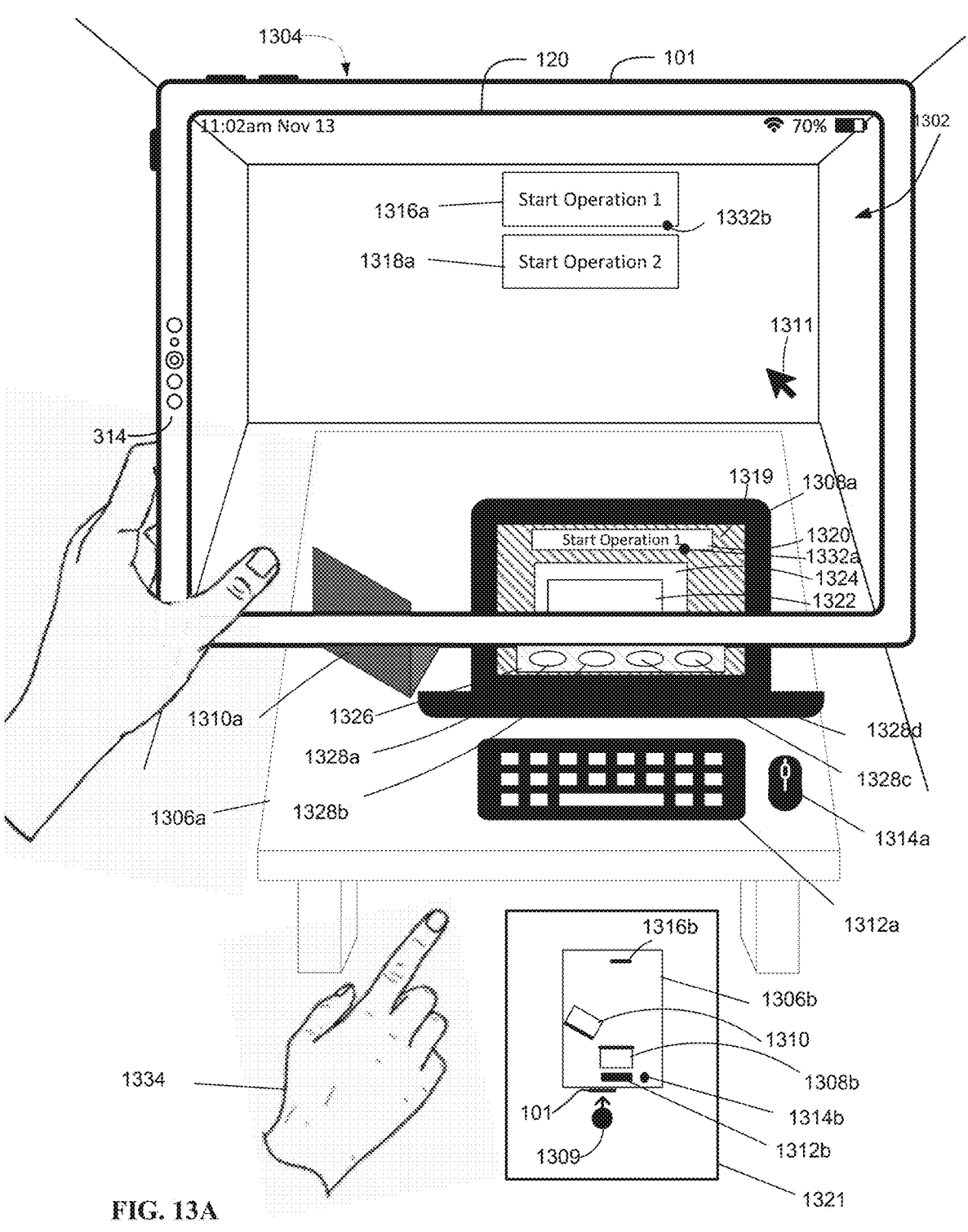
FIGS. 13A-13D illustrate examples of a first computer system facilitating display of a representation of content from a second computer system in a three-dimensional environment, in accordance with some embodiments.

FIG. 13A illustrates a computer system 101 displaying, in a real world environment 1304 and via a display generation component (e.g., display generation component 120 of FIG. 1), a three-dimensional environment 1302. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user while the user interacts with the computer system 101. In some embodiments, the user interfaces described below are implemented on a head-mounted display that includes a display generation component that displays the user interfaces to the user and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user). The figures herein illustrate a three-dimensional environment that is presented to the user by computer system 101 (e.g., and displayed by the display generation component of computer system 101) and an overhead view 1321 of the physical and/or three-dimensional environment 1302 associated with computer system 101 to illustrate the relative locations of objects in the real world environment and the locations of virtual objects in the three-dimensional environment.

In some embodiments, computer system 101 captures one or more images of the real world environment 1304 around computer system 101 (e.g., operating environment 100), including one or more objects in the real world environment 1304 around computer system 101. In some embodiments, computer system 101 displays representations of the real world environment 1304 in three-dimensional environment 1302 or portions of the real world environment 1304 are visible via the display generation component 120 in three-dimensional environment 1302. In the illustrated embodiment in FIG. 13A, objects in the real world environment 1304 include a table 1306a, a second computer system 1308a having a second display generation component that is facing the viewpoint of the user 1309, a third computer system 1310a having a third display generation component that is facing away from the viewpoint of the user 1309, a keyboard 1312a, and a mouse 1314a. In the illustrated embodiment of FIG. 13A, a portion of the second computer system 1308 and a portion of the third computer system 1310a is visible via in the display generation component 120. The computer system 101 is optionally communicatively coupled to the second computer system 1308a and the third computer system 1310a and also, optionally communicatively coupled to the keyboard 1312a and/or the mouse 1314a.

The three-dimensional environment 1302 displayed via the display generation component 120 includes a first selectable option 1316a that is selectable to display a representation of content from the second computer system 1308a and a second selectable option 1318a that is selectable to display a second representation of content from the third computer system 1310a. In some embodiments, option 1316a is displayed at a position in three-dimensional environment 1302 based on the location of computer system 1308a in three-dimensional environment, and option 1318a is displayed at a position in three-dimensional environment 1302 based on the location of computer system 1310a in three-dimensional environment. Further details regarding the display of the first selectable option and the second selectable options are discussed with reference to the method 1400. The display generation component 120 is also displaying a cursor 1311.

In the illustrated embodiment in FIG. 13A, the second computer system 1308a is displaying a background portion 1319 (e.g., desktop wallpaper), a third selectable option 1320 that is selectable to display a representation of content from the second computer system 1308a, a first application window 1322, a second application window 1324 that is behind the first application window 1322, and an application launch interface 1326 (e.g., a dock) that includes selectable options 1328a-d that are selectable for initiating display of applications on the second computer system 1308a.

In the illustrated embodiment of FIG. 13A, user attention 1332a, 1332b and input from the hand 1334 of the user 1309 are alternatively or together directed to options 1316a and option 1320. In some embodiments, the user interface elements are selectable via user attention or input from the hand 1334, via a combination of both user attention and input from the hand 1334, or via keyboard 1312a and/or mouse 1314a, and such characteristics of the input and processes for detecting such inputs are described in more detail with reference to method 1400.

FIG. 13A1 illustrates similar and/or the same concepts as those shown in FIG. 13A (with many of the same reference numbers). It is understood that unless indicated below, elements shown in FIG. 13A1 that have the same reference numbers as elements shown in FIGS. 13A-13D have one or more or all of the same characteristics. FIG. 13A1 includes computer system 101, which includes (or is the same as) display generation component 120. In some embodiments, computer system 101 and display generation component 120 have one or more of the characteristics of computer system 101 shown in FIGS. 13A-13D and display generation component 120 shown in FIGS. 1 and 3, respectively, and in some embodiments, computer system 101 and display generation component 120 shown in FIGS. 13A-13D have one or more of the characteristics of computer system 101 and display generation component 120 shown in FIG. 13A1.

In FIG. 13A1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 13A-13D.

In FIG. 13A1, display generation component 120 is illustrated as displaying content that optionally corresponds to the content that is described as being displayed and/or visible via display generation component 120 with reference to FIGS. 13A-13D. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 13A1.

Display generation component 120 has a field of view (e.g., a field of view captured by external image sensors 314b and 314c and/or visible to the user via display generation component 120, indicated by dashed lines in the overhead view) that corresponds to the content shown in FIG. 13A1. Because display generation component 120 is optionally a head-mounted device, the field of view of display generation component 120 is optionally the same as or similar to the field of view of the user.

In FIG. 13A1, the user is depicted as performing an air pinch gesture (e.g., with hand 1334) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 13A-13D.

In some embodiments, computer system 101 responds to user inputs as described with reference to FIGS. 13A-13D.

In the example of FIG. 13A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 13A-13D and/or described with reference to the corresponding method(s) are optionally implemented on computer system 101 and display generation unit 120 in a manner similar or analogous to that shown in FIG. 13A1.

Figure 13B:
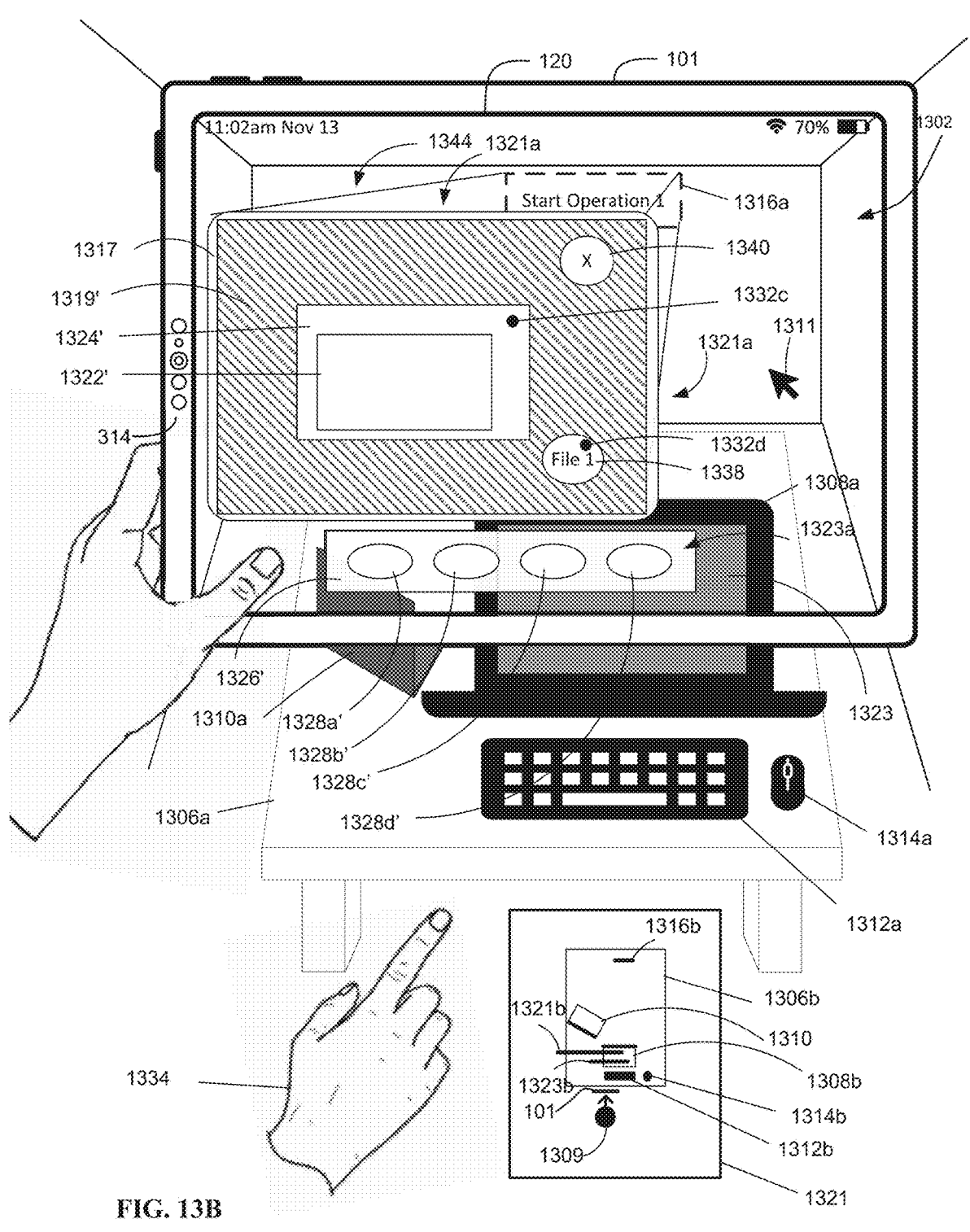

In response to the alternative inputs directed to option 1316a and option 1320 in FIG. 13A, computer system 101 initiates a virtual experience of computer system 1308a, as shown in FIG. 13B. For example, as shown in FIG. 13B, computer system 101 optionally displays an animation of option 1316*a* growing into representation 1317. In FIG. 13B, computer system 101 is displaying representation 1317 of content that was displayed by computer system 1308*a* when the input(s) in FIG. 13A were detected. For example, representation 1317 includes representation of the background 1319' (corresponding to background 1319), application window 1322' (corresponding to application window 1322), and application window 1324' (corresponding to application window 1324) behind application window 1322'. The content of representation 1317 is optionally interactable via computer system 101 to change the operating state of computer system 1308*a*, as will be described later and as described with reference to method 1400. Further, in FIG. 13B, computer system 1308*a* has ceased display of the content via its display in FIG. 13B. In some embodiments, computer system 101 displays representation 1317 in front of (e.g., overlapping and/or closer to the viewpoint of user 1309) the display of computer system 1308*a*. In some embodiments, computer system 101 displays representation 1317 at a default distance (e.g., 0.5, 1, 3, 10 or 20 meters) from the viewpoint of user 1309, independent of the distance of computer system 1308*a* from the viewpoint of user 1309. Further, in some embodiments, representation 1317 is curved (e.g., curved with a focal point of the viewpoint of user 1309).

Computer system 101 in FIG. 13B is also displaying, as a separate object from representation 1317, object 1326' (corresponding to dock 1326) in three-dimensional environment 1302. Object 1326' includes selectable options 1328*a*'-1328*d*' (corresponding to options 1328*a*-1328*d*). In some embodiments, representation 1317 and object 1326' are separately moveable in three-dimensional environment 1302. Further, representation 1317 and object 1326' are optionally displayed on simulated glass-like platters that are at least partially transparent in three-dimensional environment 1302, as shown in FIG. 13B.

In FIG. 13B, computer system 101 detects alternative inputs directed to representation 1317. For example, computer system 101 detects an input directed to application window 1324' (e.g., via attention 1332*c* and an air gesture input from hand 1334, such as an air pinch gesture), and an input directed to representation 1338 (e.g., via attention 1332*d* and an air gesture input from hand 1334, such as an air pinch gesture), which is optionally a representation of a file (e.g., a picture file, a video file, or any other kind of file) that is stored on computer system 1308*a*.

Figure 13C:
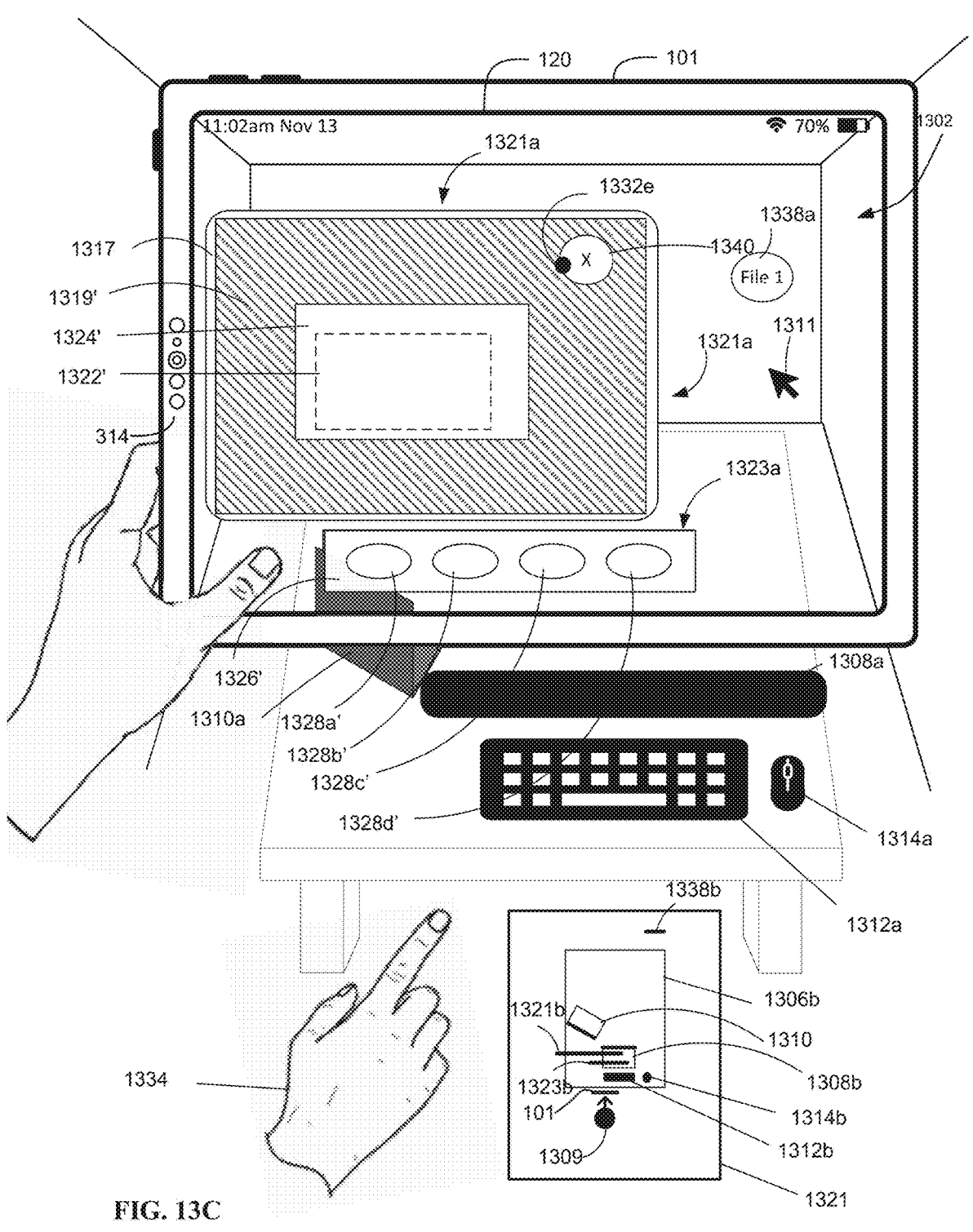

In response, in FIG. 13C, computer system 101 has brought application window 1324' in front of application window 1322' in representation 1317. Further, the input directed to representation 1338 in FIG. 13B was optionally an input dragging representation 1338 out of representation 1317 and into three-dimensional environment, as shown by representation 1338*a* in FIG. 13C. In response to the dragging of representation 1338 out of representation 1317, computer system 108*a* optionally transfer the file corresponding to representation 1338 to computer system 101. Further, as shown in FIG. 13C, computer system 101 continues to display the virtual experience of computer system 1308*a* even when computer system 1308*a* is closed, powered off, or otherwise put in a state in which computer system 1308*a* is not directly interactable. For example, in FIG. 13C, computer system 1308*a* has been closed (e.g., the display has been folded down onto the base assembly of computer system 1308*a*), and computer system 101 continues to display representation 1317, which optionally continues to be interactable as described previously.

Figure 13D:
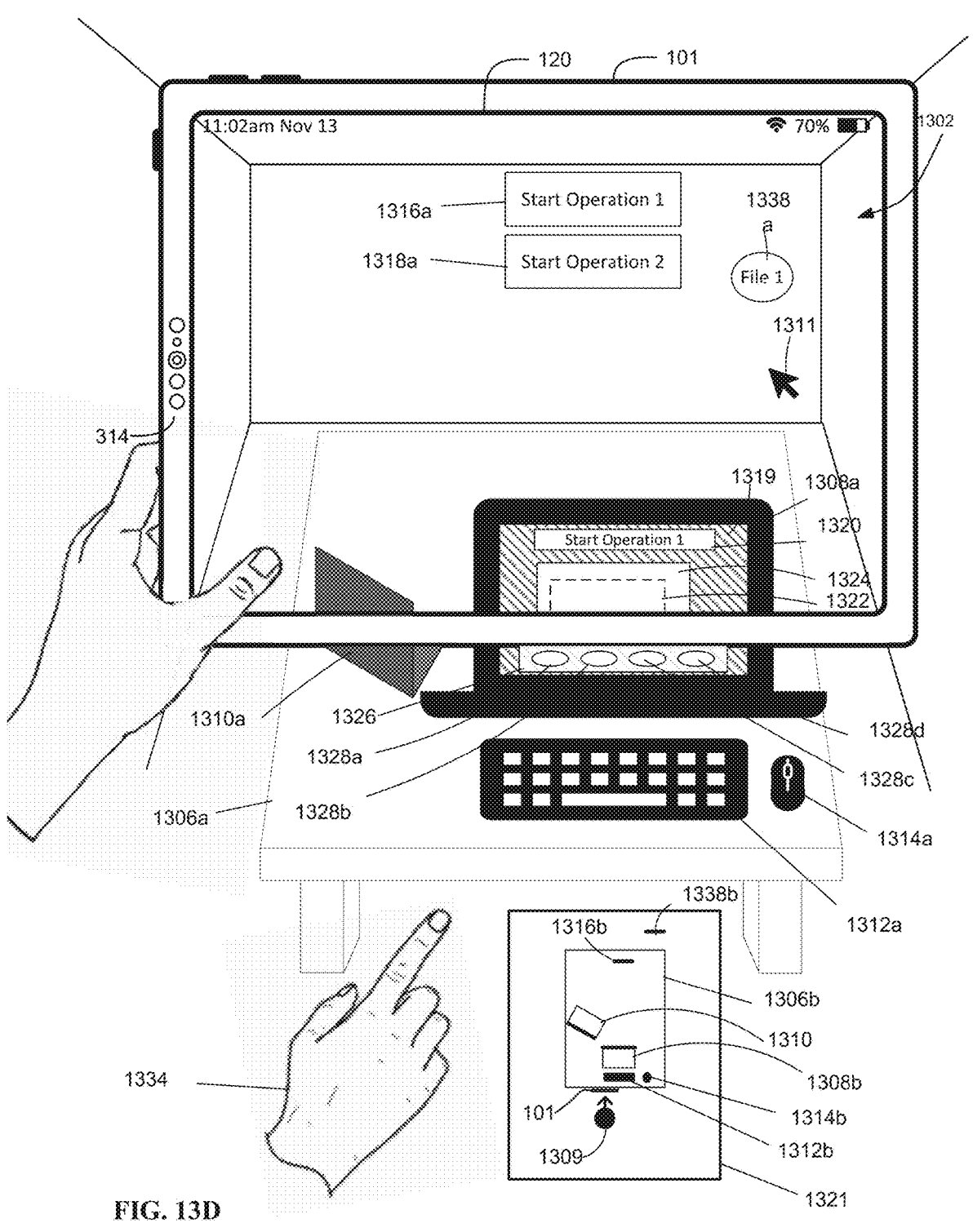
Figure 14E:
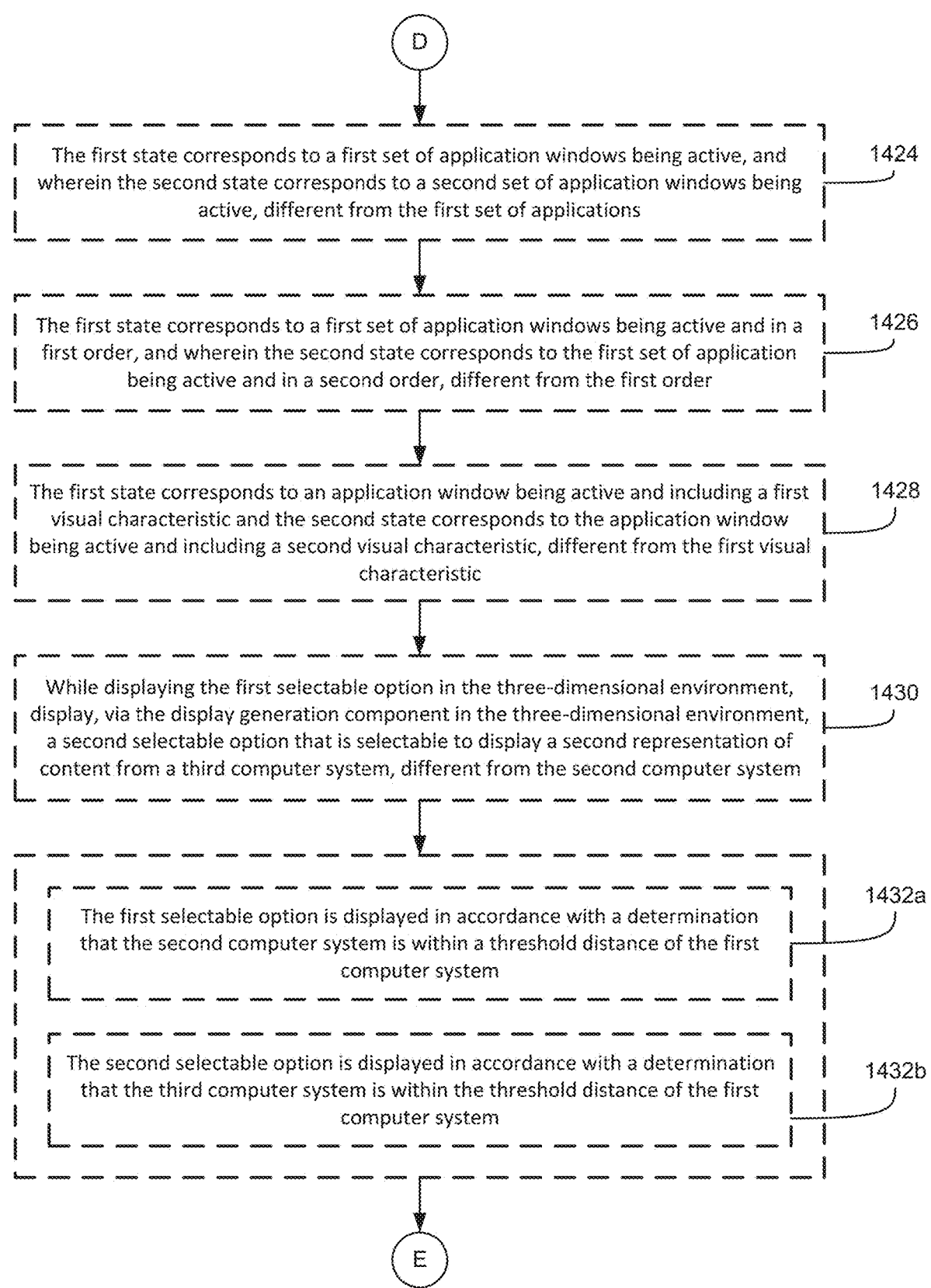
Figure 14F:
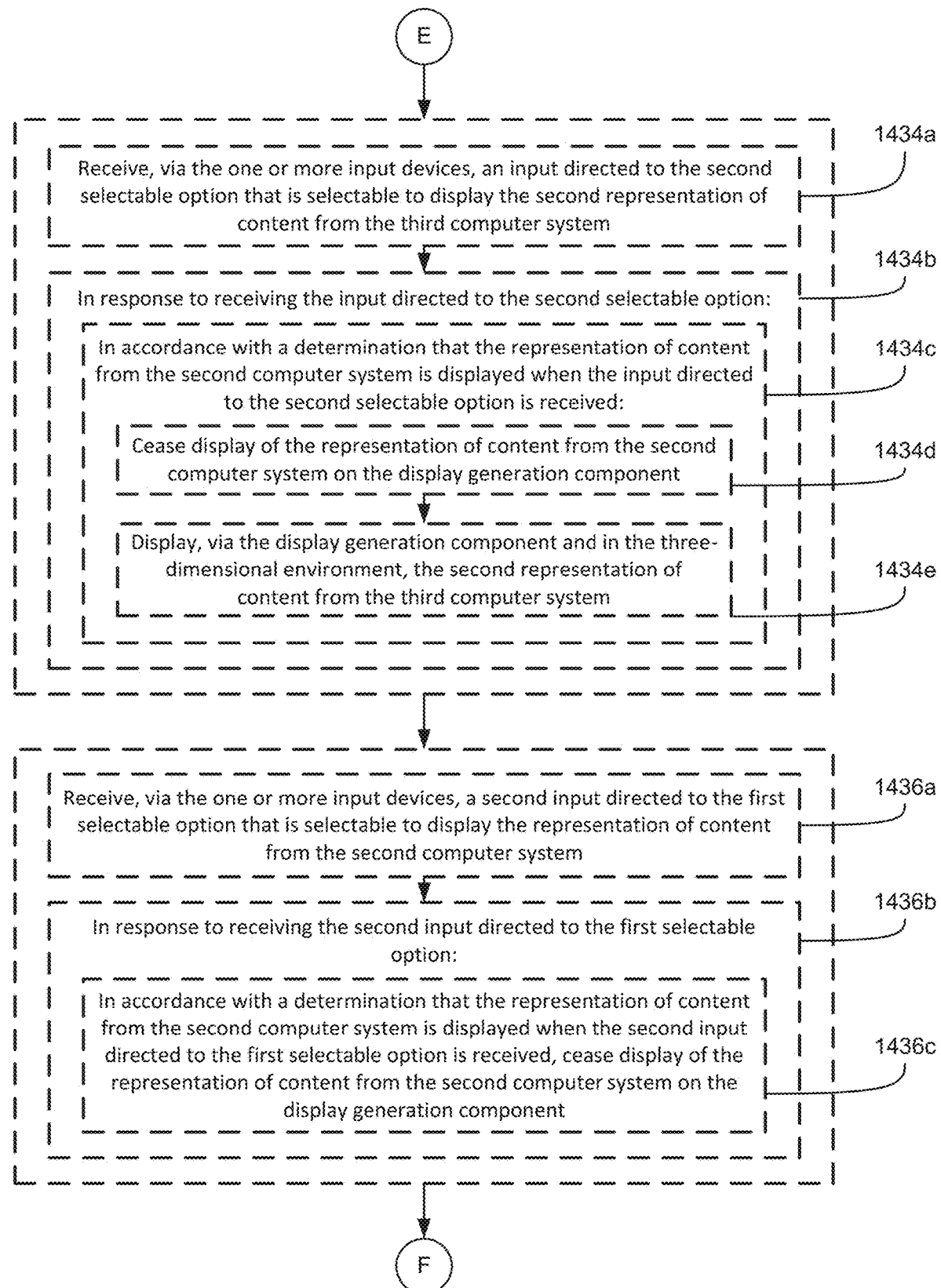

In FIG. 13C, computer system 101 detects an input selecting option 1340 (e.g., via attention 1332*e* and an air gesture input from hand 1334, such as an air pinch gesture), which is optionally displayed in or with representation 1317 and is selectable to cease the display of the virtual experience of computer system 1308*a*. In response, and after computer system 1308*a* is changed to an open state again (e.g., the display has been folded up from the base assembly of computer system 1308*a*), in FIG. 13D computer system 101 has ceased display of representation 1317 and object 1326'. However, as shown via the display of computer system 1308*a*, the changes to the states of application windows 1322 and 1324 that were made via representation 1317 have been maintained in the states of application windows 1322 and 1324 displayed by the display of computer system 1308*a* in FIG. 13D. Thus, in some embodiments, interactions with representation 1317 via computer system 101 optionally have the same or similar effect as interactions directly with computer system 1308*a*. Further in FIG. 13D, computer system 101 maintains display, in three-dimensional environment 1302, of representation 1338*a* of the file that was transferred from computer system 1308*a* to computer system 101, because the file optionally remains stored on computer system 101. In some embodiments, in response to input dragging representation 1338*a* (or the representation of any other content stored on computer system 101) to computer system 1308*a* in three-dimensional environment 1302, computer system 101 initiates a process transfer or copy the corresponding content to computer system 1308*a*. In FIG. 13D, computer system 101 redisplays options 1316*a* and 1318*a* in three-dimensional environment 1302, because computer systems 1308*a* and 1310*a* are both in the vicinity of computer system 101. Computer system 1308*a* in FIG. 13D similarly redisplays option 1320 for similar reasons.

FIGS. 14A-14H is a flowchart illustrating a method of facilitating display of a representation of content from a second computer system in a three-dimensional environment in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, method 1400 is performed at a first computer system in communication with a display generation component and one or more input devices. In some embodiments, the computer system has one or more of the characteristics of the computer systems of the methods 800, 1000, and/or 1200. In some embodiments, the display generation component has one or more of the characteristics of the display generation components of the methods 800, 1000, and/or 1200. In some embodiments, the one or more input devices have one or more of the characteristics of the one or more input devices of the methods 800, 1000, and/or 1200.

In some embodiments, while a second computer system is visible via the display generation component in a three-dimensional environment (e.g., the three-dimensional environment optionally has one or more of the characteristics of the three-dimensional environments described in methods 800, 1000, 1200 and/or 1600), such as the second computer system 1308a of FIGS. 13A and 13A1, the first computer system displays (1402a), via the display generation component in the three-dimensional environment, a first selectable option that is selectable to display a representation of content from the second computer system, such as the first selectable option 1316a of FIGS. 13A and 13A1 (e.g., user interface object associated with the second computer system such as a virtual instance of the second computer system and/or a virtual computer experience of the second computer system). In some embodiments, the first computer system displays the first selectable option in accordance with a determination that the second computer system is within a field of view of one or more cameras of the first computer system that are capturing images of the physical environment of the first computer system and/or the user of the first computer system; in some embodiments, the first computer system forgoes displaying the first selectable option in accordance with a determination that the second computer system is not within a field of view of one or more cameras of the first computer system.

In some embodiments, the second computer system is a mobile device (e.g., a tablet, a smartphone, a media player, or a wearable device), or a computer or other electronic device. The second computer system is optionally in communication with a second display generation component that displays one or more (virtual) objects via the second display generation component. One or more of the one or more objects displayed via the second display generation component are optionally visible via the display generation component that is in communication with the first computer system (e.g., via active or passive passthrough). The second display generation component optionally has similar or different characteristics from the above-described characteristics of the display generation component of the first computer system.

The display generation component of the first computer system optionally includes a transparent portion such that light from the three-dimensional environment and/or physical environment is able to pass through the transparent portion of the display generation component. Thus, in some embodiments, the second computer system is optionally visible via the display generation component by virtue of such passive passthrough of the second computer system. As such, when the second computer system is displaying a user interface via the second display generation component, light from the user interface optionally passes through the display generation component that is in communication with the first computer system via the transparent portion of the display generation component, and the user interface is optionally visible via the display generation component (e.g., in addition to the second computer system being visible via the display generation component).

The display generation component of the first computer system optionally performs active passthrough. For example, the first computer system optionally captures images of a physical environment (and/or the virtual content displayed via the second display generation component) and actively displays the captured images (e.g., displays the three-dimensional environment that corresponds to and/or includes the captured images of the physical environment and/or the virtual content displayed via the second display generation component).

The first selectable option is optionally selectable to launch a virtual computer experience associated with the second computer system. The virtual computer experience is optionally a virtual instance of the second computer system. Displaying the first selectable option optionally includes displaying information associated with the second computer system, such as a name assigned to the second computer system.

The representation of content from the second computer system is optionally the same content that is displayed by the second computer system via the second display generation component. The representation of content from the second computer system will be described in more detail later herein. For example, the second computer system is optionally displaying a first application window (e.g., an Internet application window such as a web browser window or an email application window, a desktop, or an icon) via the second display generation component. The first window is optionally visible via the display generation component of the first computer system. When the first selectable option is selected, the display generation component of the first computer system optionally displays the first window that was visible via the display generation component of the first computer system, and that was displayed via the second display generation component of the second computer system.

In some embodiments, the first computer system and the second computer system are both associated with the same user (e.g., the user of the first computer system). For example, the first computer system and the second computer system are optionally associated with the same user due to a same user credential, account and/or profile associated with the user being signed into on the first computer system and the second computer system. For example, the user is optionally logged into the first computer system via a first user credential associated with the user and the user is optionally logged into the second computer system via the first user credential associated with the user. The first selectable option is optionally displayed via the display generation component of the first computer system because the second computer system and the first computer system are logged into and/or configured with the same user credential. In some embodiments, when the second computer system is not logged into and/or configured with the same user credential as the first computer system, the first computer system does not display the first selectable option that is selectable to display the representation of content from the second computer system.

In some embodiments, the first computer system detects the existence of the second computer system before, during and/or after displaying the first selectable option. For example, the first computer system optionally detects the second computer system via any suitable wired and/or wireless detection method such as via BLUETOOTH, WiFi, another Internet Protocol, and/or USB-C. In some embodiments, the first computer system uses an image recognition technique to detect the second computer system in one or more images captured by one or more cameras of the first computer system.

In some embodiments, the second computer system detects the first computer system before, during and/or after the first computer system displays the first selectable option. For example, the second computer system optionally detects the first computer system via any suitable wired and/or wireless detection method such as via BLUETOOTH, WiFi, another Internet Protocol, and/or USB-C. In some embodiments, in response to detecting the first computer system, the second computer system determines whether the first computer system is authorized to receive data (e.g., content, virtual content, and/or a virtual computer instance) from the second computer system (e.g., via a confirmation signal indicating that the first computer system shares a user credential and/or user account with the second computer system). In response to determining that the first computer system is authorized to receive data from the second system, the second computer system optionally transmits a signal to the first computer system or another server or processor to indicate that the first computer system is authorized to receive data from the second computer system. In response to receiving the signal, the first computer system optionally displays the first selectable option that is selectable to display the representation of content from the second computer system. The first computer system optionally does not display the first selectable option if the first and/or second computer system determines that the first computer system is not authorized to receive data from the second computer system.

In some embodiments, while displaying the first selectable option in the three-dimensional environment, the first computer system receives (1402b), via the one or more input devices, an input directed to the first selectable option, such as attention 1332b in FIGS. 13A and 13A1. In some embodiments, the input directed to the first selectable option includes one or more aspects of the inputs described in the methods 800, 1000, and/or 1200 (e.g., air gestures such as a user's hand in a pinch hand shape followed by a release of the pinch hand shape while an attention of the user (and/or a dwell thereof) is directed to the first selectable option, signifying a selection, a tap, and/or a push of a button (e.g., a real or virtual button)). In some embodiments, the input directed to the first selectable option includes user attention directed to the first selectable option (e.g., sight or attention directed to the first selectable option), a hand of a user in a particular pose (e.g., raised at a position in front of the user, in a pre-pinch hand shape) at greater than a threshold hand distance (e.g., 0.2 cm, 0.5 cm, 1 cm, 2 cm, 3 cm, 5 cm, 10 cm, 20 cm, 40 cm, 100 cm, 200 cm or 500 cm) from the first selectable option, or any combination of the user attention, the hand of the user in the particular pose, and/or the hand of the user at the threshold hand distance. For example, the input directed to the first selectable option optionally includes user attention directed to the first selectable option and a hand of the user performing a pinch and release gesture. The input directed to the first selectable option optionally corresponds to a request to select the first selectable object. In some embodiments, the first selectable object is optionally selectable via attention, an input from a hand of a user, a pressing of a key on a keyboard, touch inputs (e.g., a tap and/or a touch and hold) detected on a touch-sensitive surface (e.g., a touch screen), and/or a click from a mouse. In some embodiments, the input directed to the first selectable option is a gaze-only input without including other inputs such as an air gesture (e.g., attention of the user directed to the first selectable option for longer than a time threshold, such as 0.01, 0.05, 0.1, 0.2, 0.5, 1, 3, 5, 10, 30 or 60 seconds).

In some embodiments, in response to receiving the input directed to the first selectable option, the first computer system displays (1402c), via the display generation component and in the three-dimensional environment, the representation of content from the second computer system, such as the representation 1321a of FIG. 13B.

In some embodiments, while displaying the representation of the content from the second computer system in the three dimensional environment, the first computer system detects (1402d), via the one or more input devices, one or more inputs directed to the representation of content from the second computer system, such as attention 1332c of FIG. 13B. For example, an input for causing a process such as a selection process selecting a portion of the representation of the content, an editing process editing the content and/or editing display of the content (e.g., changing an order of display of windows or icons corresponding to the content, as will be described below with reference to step(s) 1422-1428) is optionally included in the one or more inputs. Further, as other examples, an input causing a saving process, an updating process, a downloading process, a querying process, a selection process, or any other process that may occur with the content from the second computer system being interacted upon, as will be described more below, is optionally included in the one or more inputs. In addition, an input of the one or more inputs optionally includes one or more characteristics of the input directed to the first selectable option. In some embodiments, the one or more inputs have one or more characteristics of the input directed to the first selectable option.

In some embodiments, in response to detecting the one or more inputs directed to the representation of content from the second computer system, the first computer system performs (1402e) one or more operations corresponding to the one or more inputs with respect to the content from the second computer system, such as moving application window 1324' of FIG. 13B in front of application window 1322' of FIG. 13B, such as illustrated in FIG. 13C (e.g., and, optionally, updating an appearance of the representation of the content from the second computer system in the three dimensional environment).

For example, in response to selection of the first selectable option, the second computer system initiates a virtual instance of the second computer system, and shares the virtual instance with the first computer system, and/or the first computer system initiates the virtual instance of the second computer system. The first computer system is optionally authorized to display, interact with, and/or modify the virtual instance of the second computer system. For example, data accessible on the second computer system is optionally accessible on the first computer system via the virtual instance of the second computer system displayed via the display generation component of the first computer system. In some embodiments, no additional user authorization is required to display the virtual instance of the second computer system via the display generation component of the first computer system.

The second computer system optionally becomes a remotely controlled computer system in response to the first computer system receiving the input directed to the first selectable option. As such, the first computer system is optionally able to access the data, functionalities, and/or network of the second computer system. Interaction with the second computer system optionally includes interaction with the virtual instance of the second computer system that causes corresponding actions to occur at the second computer system. Interaction with the second computer system optionally includes establishing a connection between the first computer system and the second computer system such that the first computer system displays the virtual instance of the second computer system. In some embodiments, a user interface for verifying a user's identity is optionally not displayed by the first computer system when the second computer system establishes the virtual instance of the second computer system to be displayed via the display generation component of the first computer system, because the first computer system is optionally already authorized by the user to have access to content accessible via the instance of the second computer system.

In some embodiments, in response to selection and/or interaction with the representation of content from the second computer system displayed via the displayed generation component, the first computer system transmits data indicative of the selection and/or interaction to the second computer system. The second computer system, upon receiving and/or processing the data transmitted by the first computer system, optionally responds as if the selection and/or interaction happened at the second computer system. Such response optionally includes the second computer system transmitting, to the first computer system, instructions for updating display of the representation of content from the second computer system on the first computer system in response to the interaction. For example, a representation of content from the second computer system including a user interface for accessing a local network of the second computer system is optionally displayed via display generation component of the first computer system. Upon the first computer system receiving a selection indicative of a request to search the local network of the second computer system for a file on the second computer system, the first computer system optionally transmits, to the second computer system, data indicative of the request to search the local network of the second computer system for the file. In response, processors of the second computer system optionally search the local memory and/or storage of the second computer system for the file. In addition, the second computer system optionally transmits, to the first computer system, instruction for updating display of the representation of content from the second computer system such that the user interface for accessing the local network of the second computer system displays results of the request, including displaying content of the file and or metadata of the file. As another example, as the first computer system is displaying a user interface element that includes content (e.g., representations of images or videos), the first computer system receives an input to remove a content item from the user interface element (e.g., a dragging input to drag the content item out of the user interface element and into another user interface element, such as via a drag and drop operation). In response to receiving the input to remove the content item from the user interface element, the first computer system optionally displays the user interface element without the content item and displays the removed content item in the other user interface element—and such actions are also tracked and/or performed at the second computer system.

Displaying, via a display of a first computer system, a representation of content from the second computer system in response to receiving input directed the first selectable option allows for a user to interact with the second computer system via components of the first computer system, which avoids interrupting the use of the first computer system and reduces steps involved with accessing the second computer system when the user is using the first computer system.

In some embodiments, in response to receiving the input directed to the first selectable option, the computer system displays (1404), via the display generation component, an animation including transformation of the first selectable option into the representation of content from the second computer system, such as the animation 1344 of FIG. 13B illustrating an animation of the transformation of the first selectable option 1316a of FIG. 13B to the representation 1321a of FIG. 13B. In some embodiments, the animation corresponds to a process including displaying the first selectable option transforming (e.g., increasing or reducing in size) into the representation of content from the second computer system. In some embodiments, the first selectable option is no longer displayed in the location that the first selectable option was displayed prior to the display of the animation (e.g., is displayed at a new location in the three-dimensional environment, different from the location at which the selectable option was displayed in the three-dimensional environment). In some embodiments, the display generation component displays the first selectable option enlarging and morphing to become the representation of content from the second computer system. Displaying the animation of transformation of the first selectable option into the representation of content from the second computer system visually indicates initiation of the virtual instance from the second computer system and clearly indicates the location of the representation of content in the three-dimensional environment, which reduces errors in user interaction with the first computer system.

In some embodiments, the first selectable option is displayed at a respective position relative to the second computer system in the three-dimensional environment (1406) such as the first selectable option 1316a of FIGS. 13A and 13A1 being displayed at a respective position relative to the second computer system 1308a of FIGS. 13A and 13A1 (optionally including adjacent to a second display generation component in communication with the second computer system). For example, the respective position relative to the second computer system is optionally located in the three-dimensional environment at any position (e.g., above, below, to the left and/or to the right of) and/or distance relative to the second computer system (e.g., 0.1 cm, 1 cm, 3 cm, 10 cm, 80 cm, 1 m, or 5 m). In some embodiments, the respective position relative to the second computer system is from the perspective of the viewpoint of the user; as such, in some embodiments, as the viewpoint of user changes, the computer system updates the position of the first selectable option in the three-dimensional environment to maintain the first selectable option at the respective position relative to the second computer system from the perspective of the updated viewpoint of the user. In some embodiments, in accordance with a determination that the second computer system is visible at a first location in the three-dimensional environment, the first selectable option is displayed at a first respective location in the three-dimensional environment and at the respective position relative to the second computer system, and in accordance with a determination that the second computer system is visible at a second, different, location in the three-dimensional environment, the first selectable option is displayed at a second respective location, different from the first respective location, in the three-dimensional environment and at the respective position relative to the second computer system. Thus, in some embodiments, the first selectable option is displayed at different locations in the field of view of the user, based on a location of the second computer system in the field of view of the user; the first selectable option is optionally displayed at the same respective position relative to the second computer system in such embodiments. Displaying the first selectable option at a respective position relative to the second computer system in the three-dimensional environment provides a visual indication to the user that the first selectable option corresponds to the second computer system, and that the second computer system corresponding to the first selectable option is available for launching a virtual instance, reducing errors in usage.

In some embodiments, displaying the representation of content from the second computer system includes (1408a) displaying the representation of content from the second computer system overlaying the second computer system (and/or overlaying a portion of the second computer system, optionally including a portion of a second display generation component of the second computer system) in the three-dimensional environment from a viewpoint of a user of the first computer system (1408b), such as illustrated by the partial overlap of the representation 1321a of FIG. 13B over the second computer system 1308a in FIG. 13B. For example, in the three-dimensional environment and from the viewpoint of the user of the first computer system, the second computer system in the three dimensional environment is optionally at least partially obscured (e.g., reduced in visual prominence partially or fully) from the perspective of the viewpoint of the user of the first computer system due to the display of the representation of content from the second computer system being in front of at least a portion of the second computer system from the viewpoint of the user of the first computer system. In some embodiments, one or more portions of the representation of content from the second computer system are partially or fully transparent such that one or more portions of objects (e.g., the second computer system) that are behind the one or more portions of the representation of content from the second computer system are visible from a viewpoint of the user of the first computer system while displaying the representation of content from the second computer system. In some embodiments, the position at which the first selectable option is displayed in the three-dimensional environment is from the perspective of the viewpoint of the user; as such, in some embodiments, as the viewpoint of user changes, the computer system optionally updates the position of the first selectable option in the three-dimensional environment to maintain the first selectable option at the position from the perspective of the updated viewpoint of the user. In some embodiments, the position of the representation of content from the second computer system does not change as the viewpoint of the user changes; however, the representation of content from the second computer system is optionally displayed (e.g., launched or initially displayed) at different locations corresponding to respective initial viewpoints of the user. Displaying the representation of content from the second computer system overlaying the second computer system in the three-dimensional environment from the viewpoint of the user of the first computer system allows a user to easily identify the computer system to which the virtual instance corresponds, thus reducing errors in usage of the computer system.

In some embodiments, the first selectable option is displayed in a first system user interface of the first computer system or the second computer system, such as the option 1319 of FIGS. 13A and 13A1 displayed in the second computer system 1308a, such as one or more of the control center user interfaces (e.g., system user interfaces) described with reference to the methods 800, 1000, 1200, and wherein the first system user interface is accessible while any of a first plurality of user interfaces of a first plurality of applications is displayed by the first computer system or the second computer system (1410), such as the user interface of the application illustrated in FIGS. 7A-7H, 9A-9E, 11A-11F and/or the user interface of the application described with reference to the method 1000. Displaying the first selectable option in a system user interface that is assessable during display of multiple different user interfaces of applications provides increased accessibility for initiation of a virtual instance of a computer system.

In some embodiments, displaying the representation of content from the second computer system includes (1412a) displaying the representation of content from the second computer system at a first distance from a viewpoint of a user of the first computer system in the three-dimensional environment, wherein the first distance is independent of a distance from the viewpoint of the user to the second computer system in the three-dimensional environment (1412b), such as the distance between the viewpoint of the user 1309 and the representation 1321a in FIG. 13B. The first distance is optionally a default distance (e.g., 0.1 cm, 1 cm, 10 cm, 2 m, 10 m, 30 m, or another distance), optionally determined by the first computer system, the second computer system, or another computer system. In some embodiments, in accordance with a determination that the second computer system is at a first location relative to the viewpoint of the user, the method 1400 includes displaying the representation of content from the second computer system at the first distance from the viewpoint of the user, and in accordance with a determination that the second computer system is at a second location, different from the first location, relative to the viewpoint of the user, the method 1400 includes displaying the representation of content from the second computer system at the same first distance from the viewpoint of the user. As such, the representation of content from the second computer system is optionally displayed at the same location in the field of view of the user independent of a location of the second computer system relative to the viewpoint of the user; as such, the second computer system can be located at different locations in the field of view of the user while the location of the display of the representation of the content from the second computer system is the same. Displaying the representation of content from the second computer system at a first distance independent of a distance from the viewpoint of the user of the second computer system visually assists the user with locating the display of the representation of content from the second computer system, and reduces the number of inputs involved with placing the representation of content from the second computer system at a distance from the viewpoint at which it is efficiently interactable.

In some embodiments, displaying the representation of content from the second computer system includes (1414a) displaying the representation of content from the second computer system at a first position relative to a system user interface (of the first computer system or of the second computer system), such as one or more of the control center user interfaces (e.g., system user interfaces) illustrated in FIGS. 7A-7H, 9A-9E, 11A-11F and/or described with reference to the methods 800, 1000, 1200, that includes the first selectable option (1414b), such as the distance between the viewpoint of the user 1309 and the representation 1321a in FIG. 13B. For example, the option 1319 of FIGS. 13A and 13A1 optionally continue to be displayed in response to initiation of display of the representation 1321a in FIG. 13B, and the representation 1321a in FIG. 13B is optionally displayed at the first position relative to the system user interface of the second computer system 1308a that includes the option 1319 of FIGS. 13A and 13A1. For example, the first position relative to the system user interface is optionally located in the three-dimensional environment at any position and/or distance relative to the second computer system such as in front of, behind, or beside the system user interface and/or 1 cm, 10 cm, 2 m, 10 m, 30 m, or another distance from the system user interface. In some embodiments, in accordance with a determination that the second computer system is at a first location relative to a viewpoint of the user, the method 1400 includes displaying the representation of content from the second computer system at a first position relative to the system user interface and/or relative to the second computer system, and in accordance with a determination that the second computer system is at a second location, different from the first location, relative to the viewpoint of the user, the method 1400 includes displaying the representation of content from the second computer system at the same first position relative to the system user interface and/or relative to the second computer system from the viewpoint of the user (or at a different position or location relative to the system user interface and/or relative to the second computer system from the viewpoint of the user). As such, the representation of content from the second computer system is optionally displayed at a location in the field of view of the user independent of a location of the second computer system relative to the viewpoint of the user (e.g., and rather based on the location of the system user interface); as such, the second computer system can be located at different locations in the field of view of the user while the location of the display of the representation of the content from the second computer system is the same. In some embodiments, the representation of content from the second computer system is displayed at different locations in the field of view of the user, based on a location of second computer system in the field of view of the user; the representation of content from the second computer system is optionally at the same or different position relative to the system user interface of the second computer system in such embodiments (e.g., the first position relative to system user interface is optionally corresponds to different positions in the field of view of the user in different embodiments). Displaying the representation of content from the second computer system at a first position relative to the system user interface in the three-dimensional environment allows a user to easily identify the computer system to which the virtual instance corresponds, thus reducing errors in usage of the computer system.

In some embodiments, displaying the representation of content from the second computer system includes displaying the representation of content from the second computer system behind a system user interface (of the first computer system or of the second computer system, such as one or more of the control center user interfaces (e.g., system user interfaces) illustrated in FIGS. 7A-7H, 9A-9E, 11A-11F and/or described with reference to the methods 800, 1000, 1200) from a viewpoint of a user of the first computer system in the three-dimensional environment (1416), such as displaying the representation 1321a in FIG. 13B behind the display of the second computer system 1308a in FIG. 13B. In some embodiments, the representation of content from the second computer system is displayed further from the viewpoint of the user in the three-dimensional environment than the display of the system user interface in the three-dimensional environment such that some, all, or none of the representation of content from the second computer system is obscured (e.g., by the system user interface) from the viewpoint of the user of the first computer system while the representation of content from the second computer system is displayed behind the system user interface. In some embodiments, the system user interface includes a selectable option that changes in visual characteristic in response to detection of activation of a display of a representation of content from a computer system (e.g., the second computer system), so as to visually confirm that a virtual computer experience is active when the virtual computer experience is displayed or active, even if the virtual computer experience is displayed behind the system user interface. Displaying the virtual computer experience of the second computer system behind the system user interface reduces an amount of visual disruption involved with displaying the virtual computer experience, as the display of the system user interface is preserved at a location in the three-dimensional environment that is closer to a viewpoint of the user of the first computer system than the virtual computer experience of the second computer system; thus, reducing errors in usage of the computer system and enhancing user experience with the virtual computer experience of the second computer system displayed by the display generation component of the first computer system.

In some embodiments, while displaying the representation of content from the second computer system behind the system user interface from the viewpoint of the user of the first computer system in the three-dimensional environment, the computer system receives (1418a), via the one or more input devices, user input that includes attention of the user directed to the representation of content from the second computer system, such as including one or more aspects of attention 1332a of FIGS. 13A and 13A1. In some embodiments, in response to receiving the user input that includes the attention of the user, the computer system displays (1418b) the representation of content from the second computer system in front of the system user interface (of the first computer system) from the viewpoint of the user, such as displaying the representation 1321a in FIG. 13B. As such, the representation of the content from the second computer system is optionally accessible via attention of a user of the first computer system (or via a gaze of the user and a gesture of the user, such as the gaze and gestures described above with reference to step(s) 802, 1002, and 1202 of the methods 800, 1000, and 1200, respectively) (e.g., to cause movement the representation of content from the second computer system from behind the system user interface and/or to reduce a prominence of the system user interface so as to make more visible the representation of content from the second computer system from the viewpoint of the user of the first computer system). Likewise, the system user interface is optionally accessible via gaze of the user (e.g., attention of the user) and/or hand gestures performed by the user, such as discussed with reference to step(s) 1234 and 1236 of the method 1200. Providing gaze accessibility for accessing the virtual computer experience of the second computer system when the virtual computer experience is displayed behind the system user interface permits a user to move and/or make more prominent the virtual computer experience in accordance with the user's preferences without further inputs; thus, enhancing user experience with the virtual computer experience of the second computer system displayed by the display generation component of the first computer system.

In some embodiments, in response to receiving the input directed to the first selectable option (1420a), in accordance with a determination that a state of operation of the second computer system is a first state of the second computer system (e.g., includes a first arrangement of virtual elements, such as application windows) when the input directed to the first selectable option is received, such as the second computer system 1308a of FIG. 13A including application window 1322 and application window 1324 of FIGS. 13A and 13A1, a state of operation indicated by the representation of content from the second computer system is a first state of the representation of content from the second computer system that is based on the first state of the second computer system (1420*b*) (e.g., includes a second arrangement of corresponding virtual elements based on the first state), such as the representation 1321*a* in FIG. 13B including application window 1322' and application window 1324' in FIG. 13B.

In some embodiments, in accordance with a determination that the state of operation of the second computer system is a second state of the second computer system (e.g., includes a second arrangement of virtual elements, such as application windows), different from the first state of the second computer system, when the input directed to the first selectable option is received, such as if second computer system 1308*a* of FIG. 13A includes application window 1322 and application window 1324 of FIGS. 13A and 13A1, and another application window, the state of operation indicated by the representation of content from the second computer system is a second state of the representation of the content from the second computer system, different from the first state of the representation of the content from the second computer system, wherein the second state of the representation of the content from the second computer system is based on the second state of the second computer system (1420*c*) (e.g., includes a third arrangement of corresponding virtual elements based on the second state) such as the representation 1321*a* in FIG. 13B including application window 1322', application window 1324' in FIG. 13B, and the other application window. In some embodiments, the current window state (e.g., the current application window state) of the remote computer system (e.g., the second computer system) becomes the current window state of the virtual instance of the remote computer system. In some embodiments, the first state of the second computer system and/or the second state of the second computer system includes a set of applications and/or application windows active on the second computer system and/or displayed via the second display generation component of the second computer system when the input directed to the first selectable option is received. In some embodiments, the first state of the representation of content from the second computer system and/or the second state of the representation of content from the second computer system includes the same set of applications and/or application windows active on the second computer system and/or displayed via the second display generation component of the second computer system when the input directed to the first selectable option is received. Corresponding the state of the representation of content from the second computer system displayed via the display generation component of the first computer system in accordance with a state of operation of the second computer system ensures the first computer system simulates the second computer system in the computing environment of the first computer system.

In some embodiments, before detecting the one or more inputs directed to the representation of content from the second computer system, a state of operation of the second computer system is a first state (1422*a*), such as the second computer system 1308*a* of FIG. 13A including application window 1322 and application window 1324 of FIGS. 13A and 13A1 in the illustrated arrangement. In some embodiments, in response to performing the one or more operations corresponding to the one or more inputs with respect to the content from the second computer system (e.g., opening or closing an application of the content from the second computer system, a display of an application window, modifying an application such as by inserting text into an application, or another operation), the computer system changes (1422*b*) the state of operation of the second computer system to a second state, different from the first state, based on the one or more inputs directed to the representation of content from the second computer system, such as changing the arrangement of application window 1322 and application window 1324 on the computer system 1308*a* of FIGS. 13A and 13A1 to be similar or the same as the arrangement of the application window 1322' and application window 1324' in FIG. 13C. For example, in accordance with the respective non-limiting examples of the operations including opening or closing an application of the content from the second computer system, a display of an application window, modifying an application such as by inserting text into an application enumerated above, the second state optionally includes the second computer system initiating an operation, such as a display operation via a second display generation component of the second computer system, with the application of the content closed or open, the display of the application window, and/or the modification of the application, respectively, when the second computer system is next used. As such, changing the state of the virtual instance of the second computer system (e.g., the representation of content from the second computer system) optionally changes the state of instance of the remote computer system (e.g., the second computer system) when the remote computer system is used again. Changing the state of operation of the second computer system based on inputs received at the one or more input devices of the first computer system and directed to the representation of content form the second computer system preserves a user's modification applied to an instance of the second computer system, permitting the user's modification of the content to seamlessly transition to the second computer system from the first computer system after performing modifications to the instance of the second computer system used by the first computer system.

In some embodiments, the first state (of operation of the second computer system before detecting the one or more inputs directed to the representation of content from the second computer system) corresponds to a first set of application windows being active (e.g., one or more applications running as focus applications and/or as background application or consuming a portion of power of the computer system), and wherein the second state (of operation of the second computer system based on the one or more inputs directed to the representation of content from the second computer system, including the one more inputs corresponding to the one or more operations discussed above (e.g., activating, opening, closing, or deactivating an application window or an application)) corresponds to a second set of application windows being active, different from the first set of applications (1424). For example, performing the one or more operations optionally include closing the application window 1322' of FIG. 13C. As such, changing the state of the virtual instance of the second computer system (e.g., the representation of content from the second computer system) optionally changes the state of instance of the remote computer system (e.g., the second computer system), including changing which applications windows are active or open on the remote computer system when the remote computer system is used again. Changing the state of operation of the second computer system from a first state corresponding to a first set of application windows being active to a second state of operation of the second computer system corresponding to a second set of application windows being active in response to performing operations on the representation of content from the second computer system permits the user's modification of changing which applications windows are open (or displayed) to seamlessly transition to the second computer system from the first computer system after performing the modification(s) to the instance of the second computer system used by the first computer system.

In some embodiments, the first state (of operation of the second computer system before detecting the one or more inputs directed to the representation of content from the second computer system) corresponds to a first set of application windows being active (e.g., one or more applications running as focus applications and/or as background applications or consuming a portion of power of the computer system) and in a first order (e.g., a first application window is displayed in front of and/or adjacent to a second application window), and wherein the second state corresponds to the first set of application being active and in a second order (e.g., the first application window is displayed behind the second application window and/or in a different adjacent location relative to the second application window), different from the first order (1426), such as illustrated with the change in order of the application window 1322' and application window 1324' between FIGS. 13B and 13C. As such, changing the state of the virtual instance of the second computer system (e.g., the representation of content from the second computer system) optionally changes the state of instance of the remote computer system (e.g., the second computer system), including changing an organization of applications windows that is displayed on the remote computer system when the remote computer system is used again Changing the state of operation of the second computer system from a first state corresponding to a first set of application windows being active and in a first order to a second state of operation of the second computer system corresponding to a second set of application windows being active and in a second order in response to performing operations on the representation of content from the second computer system permits the user's modification of changing the organization of application windows to seamlessly transition to the second computer system from the first computer system after performing modifications to the instance of the second computer system used by the first computer system.

In some embodiments, the first state corresponds to an application window being active and including a first visual characteristic (e.g., a first set of content) and the second state corresponds to the application window being active and including a second visual characteristic (e.g., a second set of content), different from the first visual characteristic (1428). For example, performing the one or more operations optionally include closing the application window 1324' of FIG. 13C. For example, the state of operation of the second computer system optionally changes from the first state to the second state in response to performing operations such as adding, removing, or editing content of the application window application via the instance of the second computer system (e.g., the representation of content from the second computer system) used by the first computer system. In an example, the state of operation of the second computer system optionally changes from the first state to the second state in response to a user editing a text message on a text messaging application. Changing the state of operation of the second computer system from a first state corresponding to an application window being active and including a first visual characteristic to a second state of operation of the second computer system corresponding to the application window being active and including a second visual characteristic in response to performing operations on the representation of content from the second computer system permits the user's modification of an application (e.g., adding, removing, or editing content of the application) to seamlessly transition to the second computer system from the first computer system after performing the modification(s) to the instance of the second computer system used by the first computer system.

In some embodiments, while displaying the first selectable option in the three-dimensional environment, the computer system displays, via the display generation component in the three-dimensional environment, a second selectable option that is selectable to display a second representation of content from a third computer system (e.g., a user interface object associated with the third computer system such as a virtual instance of the third computer system and/or a virtual computer experience of the third computer system; the second representation of content from the third computer system optionally includes one or more characteristics of the representation of content from the first computer system discussed above with reference to step(s) 1402), different from the second computer system (1430), such as illustrated with the options 1316a and 1318a in FIGS. 13A and 13A1. A result of selecting the second selectable option optionally includes one or more of the characteristics of the results and/or functionality described with reference to the first selectable option that is selectable to display the representation of content from the second computer system. In some embodiments, the first computer system displays and/or forgoes displaying the second selectable option in accordance with determinations similar to those discussed above with reference to the method 800 regarding the first computer system displaying and/or forgoing displaying the first selectable option. Displaying the first selectable option and the second selectable option for respective computers provides confirmation to the user regarding which computer systems are available for interaction via the first computer system.

In some embodiments, the first selectable option is displayed in accordance with a determination that the second computer system is within a threshold distance (e.g., 0.2 m, 5 m, 10 m, 15 m, or 30 m, or another distance) of the first computer system (1432a) (e.g., and/or the viewpoint of the user and/or the display generation component of the first computer system), such as the option 1316a corresponding to the second computer system 1308a of FIGS. 13A and 13A1.

In some embodiments, the second selectable option is displayed in accordance with a determination that the third computer system is within the threshold distance (e.g., 0.2 m, 5 m, 10 m, 15 m, or 30 m, or the other distance) of the first computer system (1432b), such as the option 1318a corresponding to the second third system 1310a of FIGS. 13A and 13A1 (e.g., and/or the viewpoint of the user and/or the display generation component of the first computer system). In some embodiments, the first computer system detects the third computer system using similar operations as discussed above with reference to step(s) 1402 regarding the first computer system detecting the second computer system. When a remote computer system is not within the threshold distance, a selectable option corresponding to the remote computer system is optionally not displayed. Displaying the first selection option and the second selectable option in accordance with determinations that the second computer system and the third computer system are within a threshold distance provides confirmation to the user regarding which computer systems are available for interaction via the first computer system.

In some embodiments, the computer system receives (1434a), via the one or more input devices, an input directed to the second selectable option that is selectable to display the second representation of content from the third computer system, such as input from the hand 1334 directed to the option 1318a of FIGS. 13A and 13A1. The input directed to the second selectable option optionally includes one or more aspects of the inputs described above with reference to step(s) 1402 regarding the input directed to the first selectable option, directed to the second selectable option.

In some embodiments, in response to receiving the input directed to the second selectable option (1434b), in accordance with a determination that the representation of content from the second computer system is displayed when the input directed to the second selectable option is received (1434c) (e.g., as described with reference to step(s) 1402), such as the representation 1321a in FIG. 13B, the computer system ceases display (1434d) of the representation of content from the second computer system on the display generation component, such as the cease of display of the representation 1321a in FIG. 13B illustrated in FIG. 13D and the computer system displays (1434e), via the display generation component and in the three-dimensional environment, the second representation of content from the third computer system, such as display a representation like the representation 1321a in FIG. 13B but corresponding to the third computer system 1310a (e.g., a user interface object associated with the third computer system such as a virtual instance of the third computer system and/or a virtual computer experience of the third computer system; the second representation of content from the third computer system optionally includes one or more characteristics of the representation of content from the first computer system discussed above with reference to step(s) 1402). The third computer system optionally performs similar operations and initial interactions with the first computer system as the second computer system when selection of the first selectable option was made as discussed above with reference to step(s) 1402 regarding the second computer system. Ceasing display of a virtual computer experience associated with the second computer system and displaying a virtual computer experience associated with a third computer system in response to a determination that the virtual computer experience associated with the second computer system is displayed when input directed to an option to initiate a virtual computer experience associated with the first computer system is received enables a user to interact with content from different computer systems without, for example, taking a head-mounted display device of or in communication with the first computer system on and off, reduces an amount of steps to display the second representation of content from the third computer system and reduces the number of inputs involved with reducing clutter and distraction in the three-dimensional environment while also reducing the load on the first computer system required to display representations of content from other computer systems.

In some embodiments, the computer system receives (1436a), via the one or more input devices, a second input directed to the first selectable option that is selectable to display the representation of content from the second computer system, such as input from the hand 1334 directed to the option 1316a of FIGS. 13A and 13A1. The second input directed to the first selectable option optionally includes one or more aspects of the inputs described above with reference to step(s) 1402 regarding the input directed to the first selectable option.

In some embodiments, in response to receiving the second input directed to the first selectable option (1436b), in accordance with a determination that the representation of content from the second computer system is displayed when the second input directed to the first selectable option is received, such as the representation 1321a in FIG. 13B, the computer system ceases display (1436c) of the representation of content from the second computer system on the display generation component, such as the cease of display of the representation 1321a in FIG. 13B illustrated in FIG. 13D. In some embodiments, selectable options such as the first selectable option includes toggle-like functionality. As such, in some embodiments, in response to a first selection of the first selectable option, the first computer system displays the representation of content from the second computer system and, in response to a second selection of the first selectable option, the first computer system ceases display of the representation of content from the second computer system. Further, in response to receiving the second input directed to the first selectable option, and in accordance with a determination that the representation of content from the second computer is not displayed when the second input directed to the first selectable option is option, the operations optionally include displaying the representation of content from the second computer system. Associating toggle functionality with the selectable options selectable to initiate a virtual experience of a computer system simplifies display of controls for displaying and ceasing display of a virtual computer experience of a computer system.

In some embodiments, the representation of content from the second computer system is curved (e.g., non-planar and concave, so as to simulate a 1000R, 1800R, 2300R, 3800R, or another curved monitor radius, curved either or both horizontally and vertically) around a viewpoint of a user of the first computer system in the three-dimensional environment (1438). For example, such as the representation 1321a in FIG. 13B is optionally curved, such that an edge of the representation 1321a in FIG. 13B is optionally closer to the viewpoint of the user 1309 than a center of the representation 1321a in FIG. 13B. The representation of content from the second computer system is optionally displayed so as to simulate a display of a 25 in, 27 in, 34 in, 49 in size monitor, or another monitor size. The resolution of the representation of content from the second computer system is optionally as described with reference to step(s) 1628 and 1630 of the method 1600. In some embodiments, the viewpoint of the user lies at, within, or beyond the radius of curvature of the representation of content from the second computer system. Curving the representation of content from the second computer system about the viewpoint of the user of the first computer system in the three-dimensional environment immerses the user in the virtual computer experience of the second computer system displayed by the display generation component of the first computer system.

In some embodiments, the representation of content from the second computer system includes background content (e.g., wallpaper content) corresponding to background content (e.g., wallpaper content) displayed by the second computer system when the input directed to the first selectable option is received (1440), such as the background 1319' of FIG. 13B corresponding to the background 1319 of FIGS. 13A and 13A1. Displaying similar or same background content in the representation of content from the second computer system as the background content of the second computer system when the input directed to the first selectable option is received clearly indicates the correspondence between the representation of content and the second computer system, thereby reducing errors in usage of the first computer system.

In some embodiments, the representation of content from the second computer system is displayed on a simulated glass material in the three-dimensional environment (1442), such as the simulated glass material 1317 of FIG. 13B. The simulated glass material is optionally transparent to a degree such that objects behind the simulated glass material are visible from the viewpoint of the user, optionally to the degree of transparency of the simulated glass material. The simulated glass material optionally blurs objects behind the simulated glass material that are visible from the viewpoint of the user. In some embodiments, a length and/or width of the simulated glass material is longer than a length and/or width of the representation of content from the second computer system. In some embodiments, a portion of the length and/or width of the simulated glass material not covered by the representation of content from the second computer system is visible from the viewpoint of the user of the first computer system in the three-dimensional environment. Displaying the representation of content from the second computer system on a simulated glass material in the three-dimensional environment immerses the user in the virtual computer experience of the second computer system displayed by the display generation component of the first computer system, thereby enhancing usage of the first computer system.

In some embodiments, while displaying the representation of content from the second computer system and while the second computer system is displaying content (and/or while the display of the second computer system is not powered off and/or deactivated), the computer system detects (1444a), via the one or more input devices, a change in a state of the second computer system, including changing of a state of a display device of the second computer system, such as detecting the display of the second computer system 1308a changing between FIGS. 13A and 13B. For example, the first computer system optionally detects that the second computer system has changed orientation configuration such as from an open configuration (e.g., an open laptop computer) to a closed configuration (e.g., a closed laptop computer). As another example, the first computer system optionally detects that a second display generation component of the second computer system is turned off (e.g., in an off or sleep configuration or inactive state) and/or has ceased display of the content.

In some embodiments, after (e.g., in response to) detecting the change in the state of the second computer system, the computer system continues display (1444b) of the representation of the content from the second computer system in the three-dimensional environment, such as illustrated with the continued display of the representation 1321a in FIG. 13B (e.g., without visible disruption of the representation of content from the second computer system displayed on the display generation component of the first computer system). Continuing display of the representation of the content from the second computer system in the three-dimensional environment in response to detecting that the second computer system has ceased display of the content reduces an amount of interruptions displayed by the display generation component of the first computer system.

In some embodiments, while displaying the representation of content from the second computer system in the three-dimensional environment, the computer system receives (1446a), via the one or more input devices, a first input corresponding to a request to transfer respective content (e.g., files, messages, updates, application data, or other content) from the first computer system to the second computer system, such as the input from the hand 1334 of FIG. 13C directed to representation 1338a in FIG. 13C.

In some embodiments, in response to receiving the first input, the computer system initiates (1446b) a process to transfer the respective content from the first computer system to the second computer system, such as initiating a process to move representation 1338a in FIG. 13C to the representation 1321a in FIG. 13B. The process optionally includes transferring the respective content via a drag and drop operation. For example, a content item saved, downloaded and/or otherwise present on the first computer system outside of the representation of content from the second computer system (e.g., outside of the virtual instance of the second computer system displayed via the display generation component of the first computer system) can be moved to the representation of content from the second computer system (e.g., to a location inside of the virtual instance of the second computer system displayed via the display generation component of the first computer system); thus, the content item is transferred to the second computer system, such that the content item is saved, downloaded, and/or otherwise present on the second computer system and is accessible and/or displayed on the second computer system when the second computer system is next used, optionally at a location on the second computer system corresponding to a location that the content item was dropped (e.g., at a location corresponding to (e.g., on, near, or inside of) the representation of content from the second computer system). The process optionally includes transmitting the respective content via a similar or different connection or medium that hosted the transfer of the representation of content from the second computer system to the first computer system. Initiating a process to transfer content from the first computer system to the second computer system in response to receiving an input to transfer content increases the capabilities of the first computer system and second computer system interaction and reduces the number of inputs involved with such interactions.

In some embodiments, while displaying the representation of content from the second computer system in the three-dimensional environment, the computer system receives (1448a), via one or more input devices of the second computer system, a second input corresponding to a request to transfer respective content (e.g., files, messages, updates, application data, or other content) from the second computer system to the first computer system, such as attention 1332d of FIG. 13B directed to representation 1338 in FIG. 13B.

In some embodiments, in response to receiving the second input, the computer system initiates (1448b) a process to transfer the respective content from the second computer system to the first computer system, such as initiating a process to move representation 1338 in FIG. 13B to be out of representation 1321a in FIG. 13B. The process optionally includes transferring the respective content via a drag and drop operation. For example, a content item saved, downloaded and/or otherwise present on the representation of content from the second computer system (e.g., inside of the virtual instance of the second computer system displayed via the display generation component of the first computer system) can be moved to outside of the display the representation of content from the second computer system (e.g., to a location outside of the virtual instance of the second computer system displayed via the display generation component (which is optionally inside the instance of the first computer system displayed via the display generation component of the first computer system)); thus, the content item is transferred to the first computer system, such that the content item is saved, downloaded, and/or otherwise present on the first computer system and is accessible and/or displayed on the first computer system when the first computer system is next used, optionally at a location on the first computer system corresponding to a location that the content item was dropped (e.g., at a location corresponding to (e.g., on, near, or inside of) the display of the instance of the first computer system. The process optionally includes transmitting the respective content via a similar or different connection or medium that hosted the transfer of the representation of content from the second computer system to the first computer system. Initiating a process to transfer content from the second computer system to the first computer system in response to receiving an input to transfer content increases the capabilities of the first computer system and second computer system interaction and reduces the number of inputs involved with such interactions.

It should be understood that the particular order in which the operations in method 1400 have been described is merely exemplary and is not intended to indicate that the described order is the only order in which the operations could be performed. One of ordinary skill in the art would recognize various ways to reorder the operations described herein.

FIGS. 15A-15E illustrate examples of facilitating initiation of a virtual computer experience in a three-dimensional environment, in accordance with some embodiments.

Figure 15A:
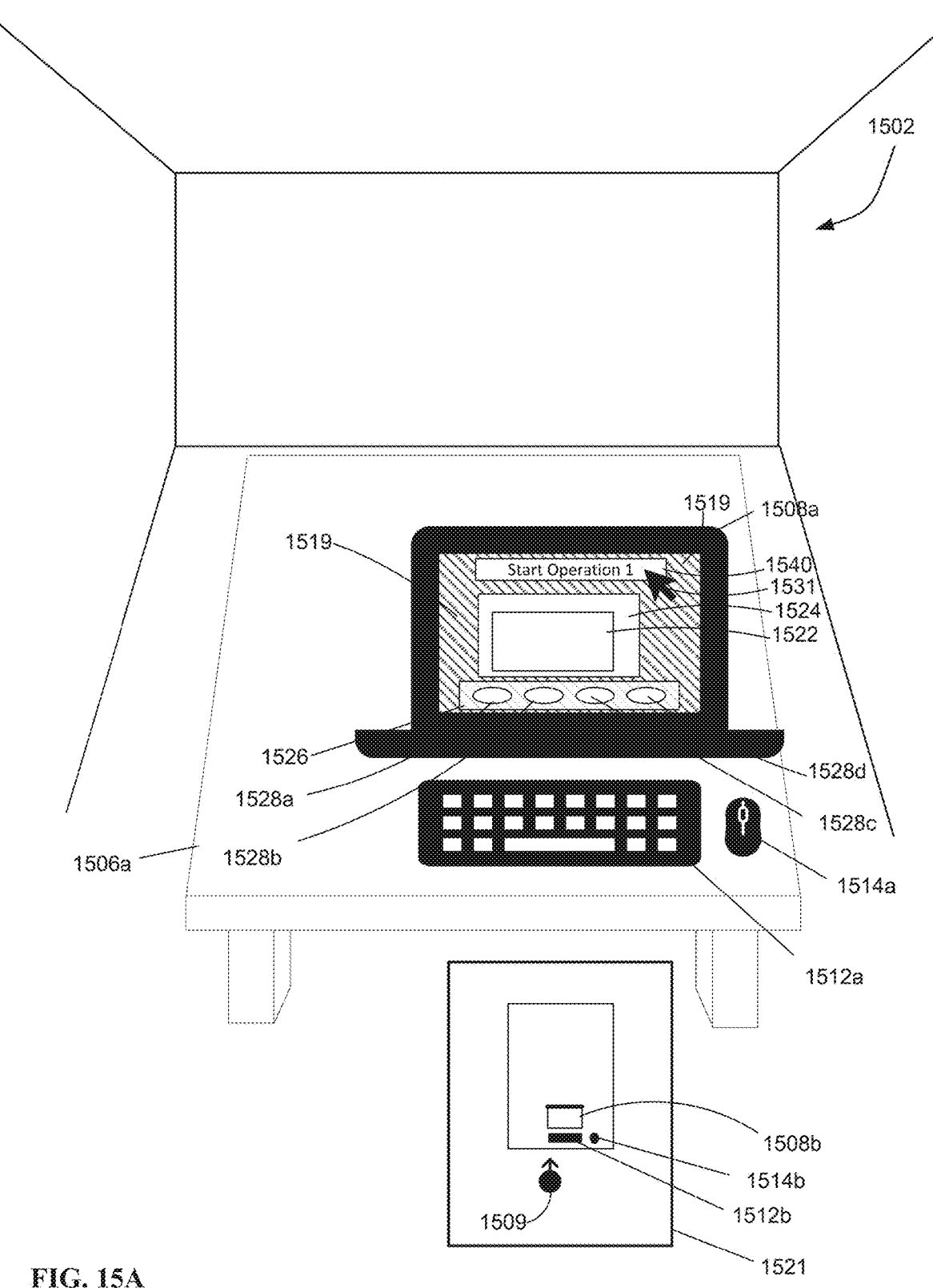
FIGS. 15A-15E illustrate examples of facilitating initiation of a virtual computer experience in a three-dimensional environment, in accordance with some embodiments.

FIG. 15A illustrates a physical environment that includes table 1506a. On table 1506a is positioned computer system 1508a, keyboard 1512a and mouse 1514a, which are optionally communicatively coupled to computer system 1508a. Computer system 1508a is displaying a background portion 1519 (e.g., desktop wallpaper), a selectable option 1540 that is selectable to initiate display of a virtual computer experience for computer system 1508a via a different computer system (as described in more detail with reference to method 1600), a first application window 1522, a second application window 1524 that is behind the first application window 1522, and an application launch interface 1526 (e.g., a dock) that includes selectable options 1528a-d that are selectable for initiating display of applications on the computer system 1508a. In FIG. 15A, no second computer system that is able to display the virtual experience of computer system 1508a is activated or nearby computer system 1508a.

Figure 15B:
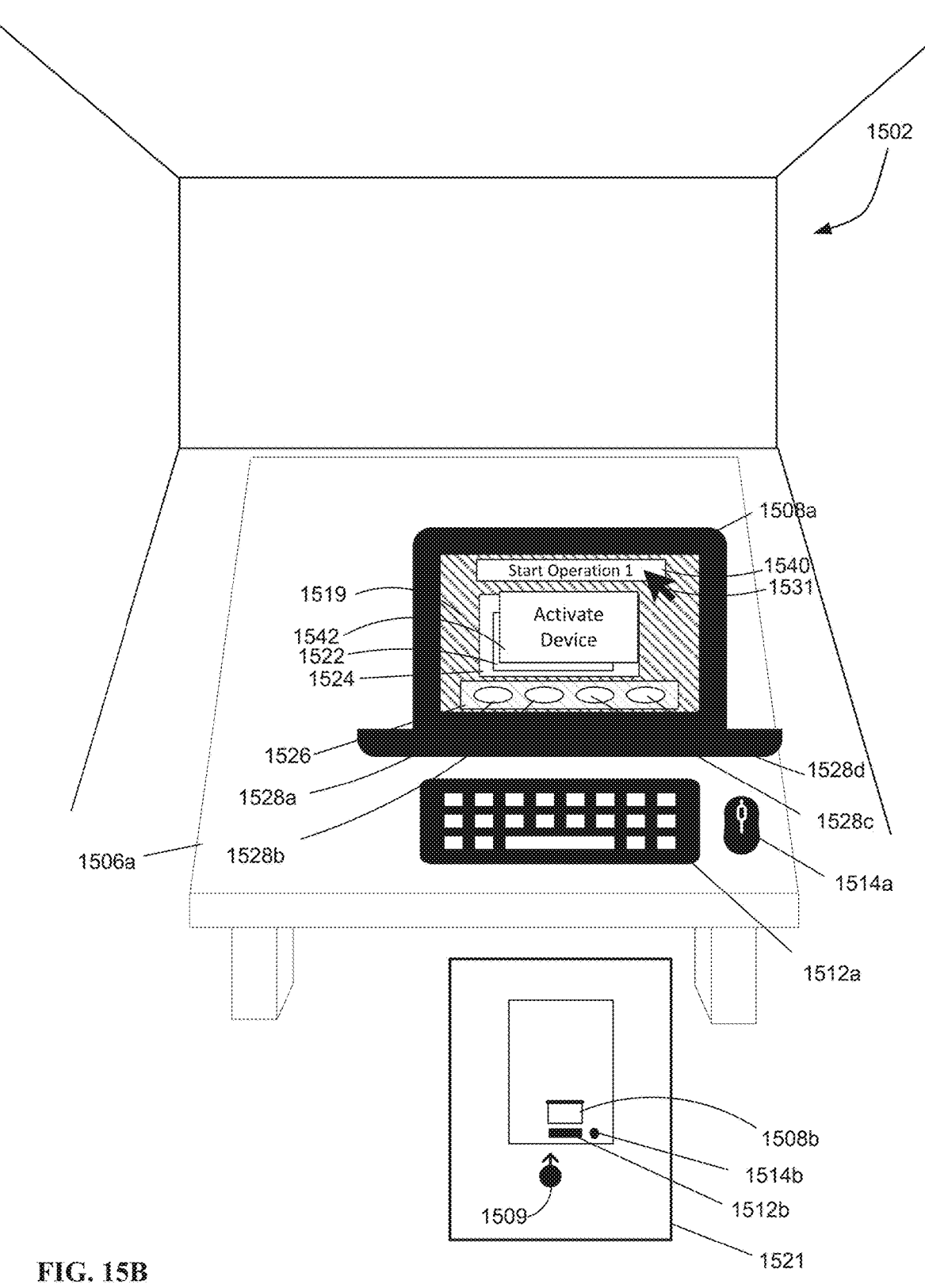

In FIG. 15A, computer system 1508a detects selection of option 1540 (e.g., via cursor 1531 controlled by mouse 1514a). In response, because no second computer system that is able to display the virtual experience of computer system 1508a is activated or nearby computer system 1508a, computer system 1508a displays indication 1542 as shown in FIG. 15B. Indication 1542 optionally indicates that no second computer system that is able to display the virtual experience of computer system 1508a is activated or nearby computer system 1508a and/or includes instructions to activate or bring such a device nearby. Additional or alternative details relating to indication 1542 are described with reference to method 1600.

Figure 15C:
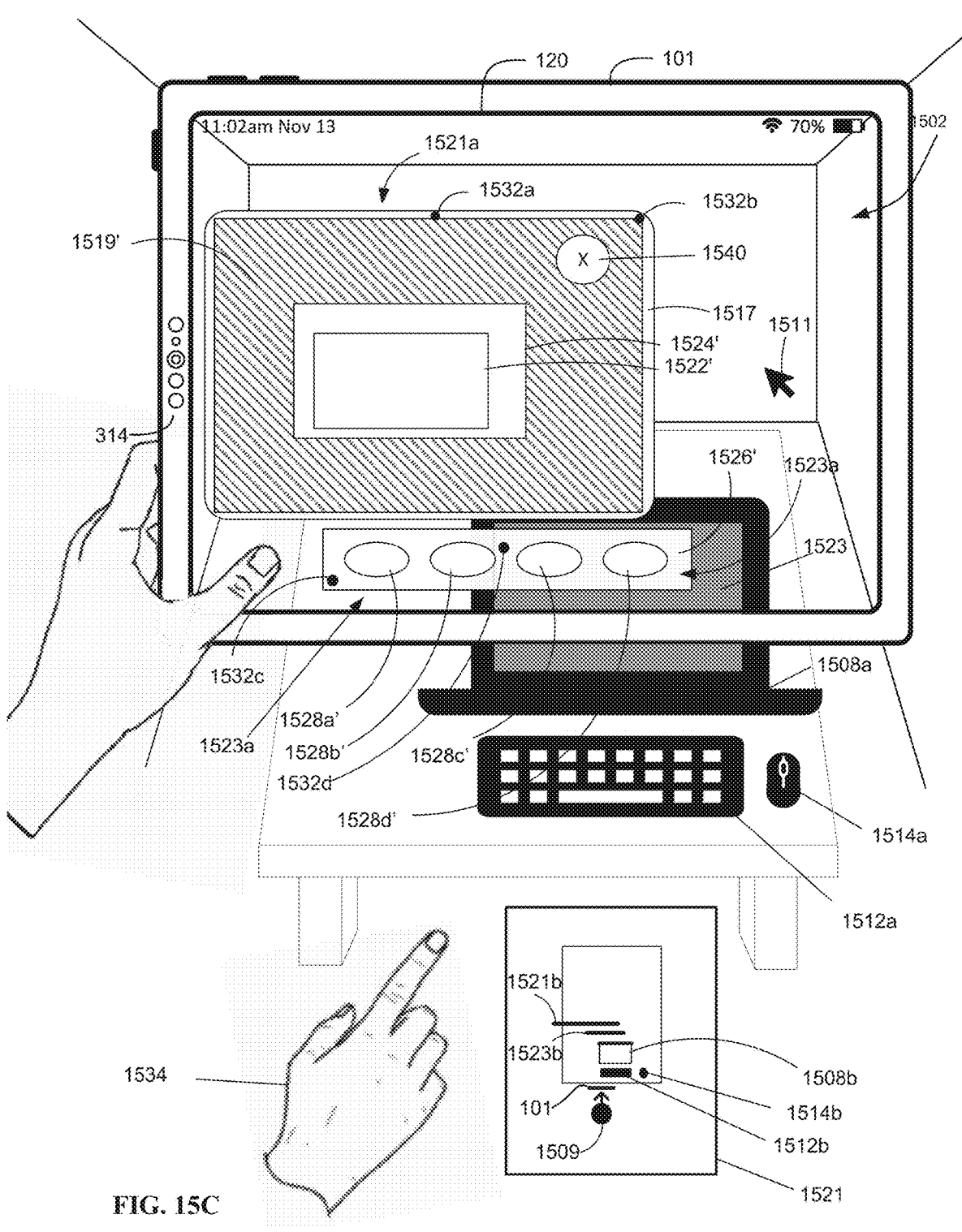

In FIG. 15C, computer system 101 is activated and/or brought nearby computer system 1508a, and in response, computer system 101 automatically begins displaying a virtual experience for computer system 1508a. For example, in the case that computer system 101 is a head-mounted computer system and/or display, in FIG. 15C, computer system 101 has been placed on the head of the user 1509. Computer system 101 optionally has one or more of the characteristics of computer system 101 in FIGS. 13A-13D and/or method 1400. Further, in FIG. 15C, computer system 1508a has reduced the visual prominence of the content that it was displaying in FIG. 15A and/or 15B. For example, computer system 1508a has ceased display of all content via its display. Additional or alternative details relating to computer system 1508a reducing the visual prominence of its display are described with reference to method 1600.

Display by computer system 101 of the virtual computer experience for computer system 1508a optionally includes computer system 101 is displaying representation 1517 of content that was displayed by computer system 1508a when the virtual experience was initiated. For example, representation 1517 includes representation of the background 1519' (corresponding to background 1519), application window 1522' (corresponding to application window 1522), and application window 1524' (corresponding to application window 1524) behind application window 1522'. Representation 1517, as shown in FIG. 15C, is larger than the size of the display of computer system 1508a. The content of representation 1517 is optionally interactable via computer system 101 to change the operating state of computer system 1508a, as described with reference to methods 1400 and/or 1600. Additional or alternative details relating to displaying the virtual experience for computer system 1508a are described with reference to method 1600.

Computer system 101 in FIG. 15C is also displaying, as a separate object from representation 1517, object 1526' (corresponding to dock 1526) in three-dimensional environment 1502. Object 1526' includes selectable options 1528a'-1528d' (corresponding to options 1528a-1528d). In some embodiments, representation 1517 and object 1526' are separately moveable in three-dimensional environment 1502. Further, representation 1517 and object 1526' are optionally displayed on simulated glass-like platters that are at least partially transparent in three-dimensional environment 1502, as shown in FIG. 15C.

Figure 15D:
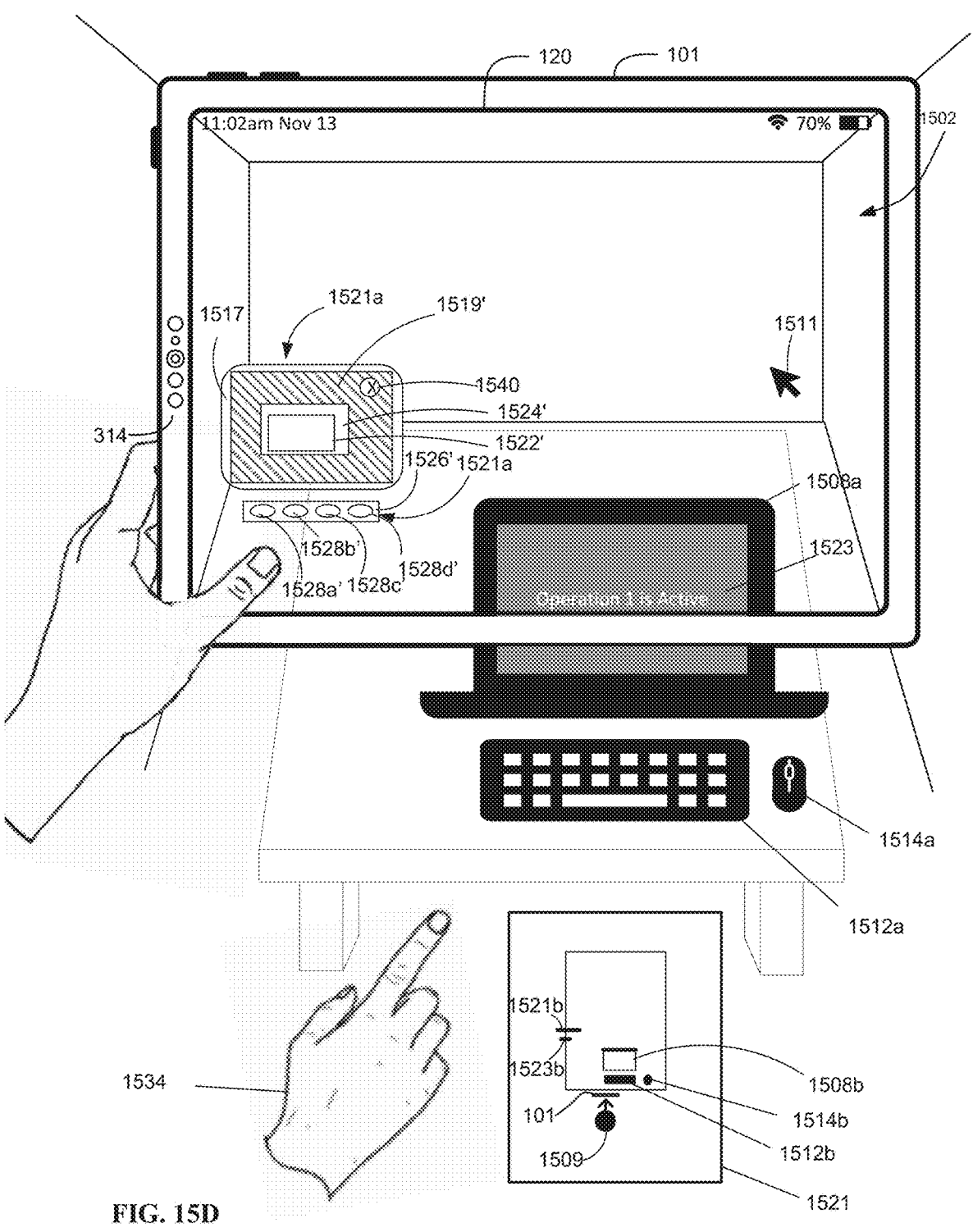

From FIG. 15C to FIG. 15D, computer system 101 detects input for scaling representation 1517. For example, in FIG. 15C, computer system 101 detects selection inputs directed to the top edge of representation 1517 (e.g., via attention 1532a) or the top-right corner of representation 1517 (e.g., via attention 1532b), including an air pinch gesture from hand 1534 followed by movement of hand 1534 while in the air pinch hand shape. In response, as shown in FIG. 15D, computer system 101 has scaled (e.g., reduced in size) representation 1517 in accordance with the movement of hand 1534. For example, hand 1534 moved down and/or to the left to reduce the size of representation 1517 accordingly. In FIG. 15D, computer system 101 has optionally also reduced the size of object 1526' correspondingly. In some embodiments, computer system 101 controls the size of representation 1517 and object 1526' independently from one another. For example, in FIG. 15D, object 1526' is optionally scaled in response to different input detected in FIG. 15C—for example, inputs analogous to the selection inputs described above, but with respect to attention 1532c directed to the lower left corner of object 1526', or with respect to attention 1532d directed to the upper edge of object 1526' as shown in FIG. 15C. In response to movement of hand 1534 as part of those inputs, computer system 101 optionally similarly scales object 1526' as shown in FIG.

15D. Additional or alternative details relating to scaling representation 1517 and/or object 1526' are described with reference to method 1600.

In some embodiments, while the virtual experience of computer system 1508a is active via computer system 101, computer system 1508a displays an indication of this via its display. For example, in FIG. 15D, computer system 1508a is displaying indication 1523 indicating that the virtual experience of computer system 1508a is currently active (e.g., via computer system 101).

Figure 15E:
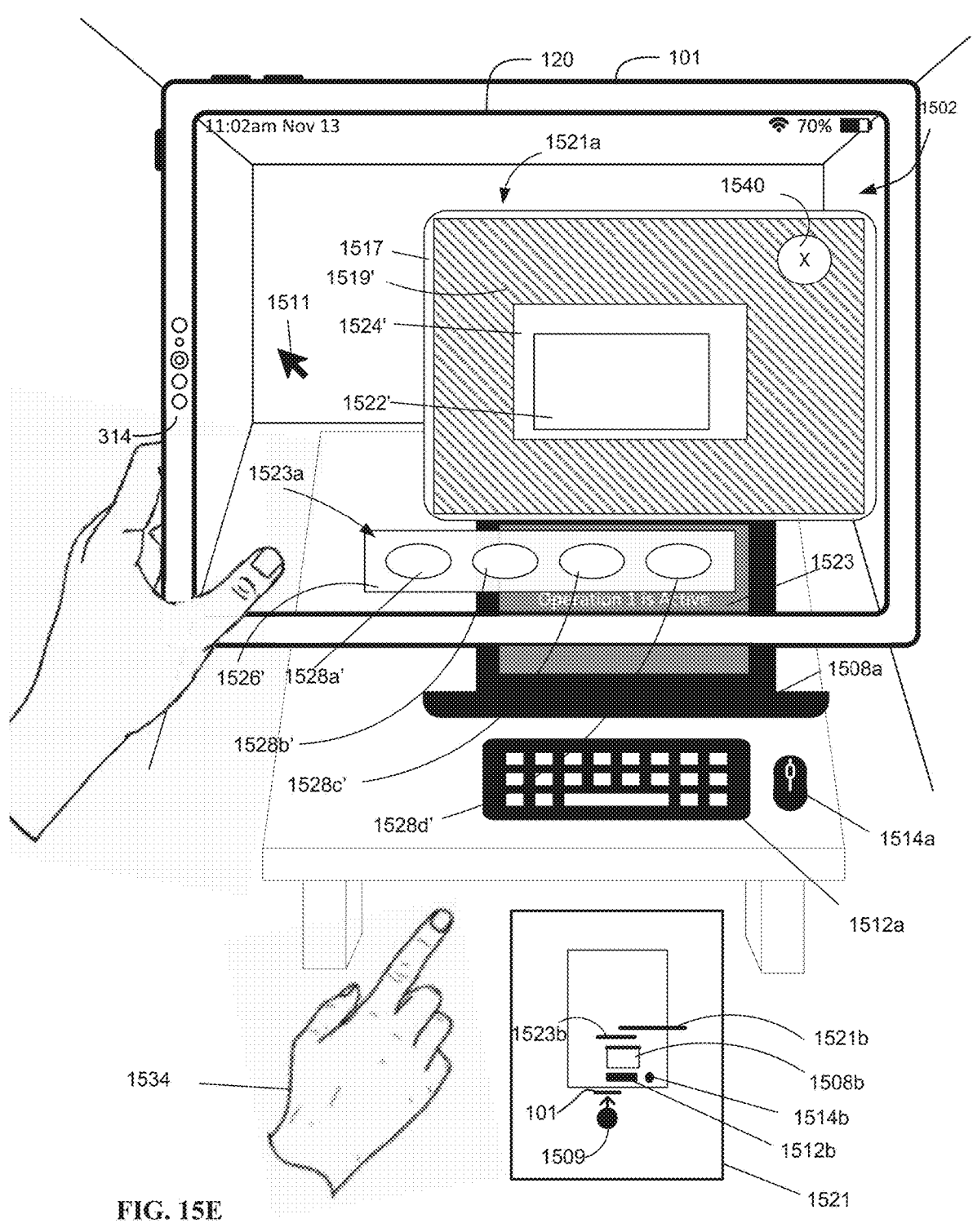
Figure 16B:
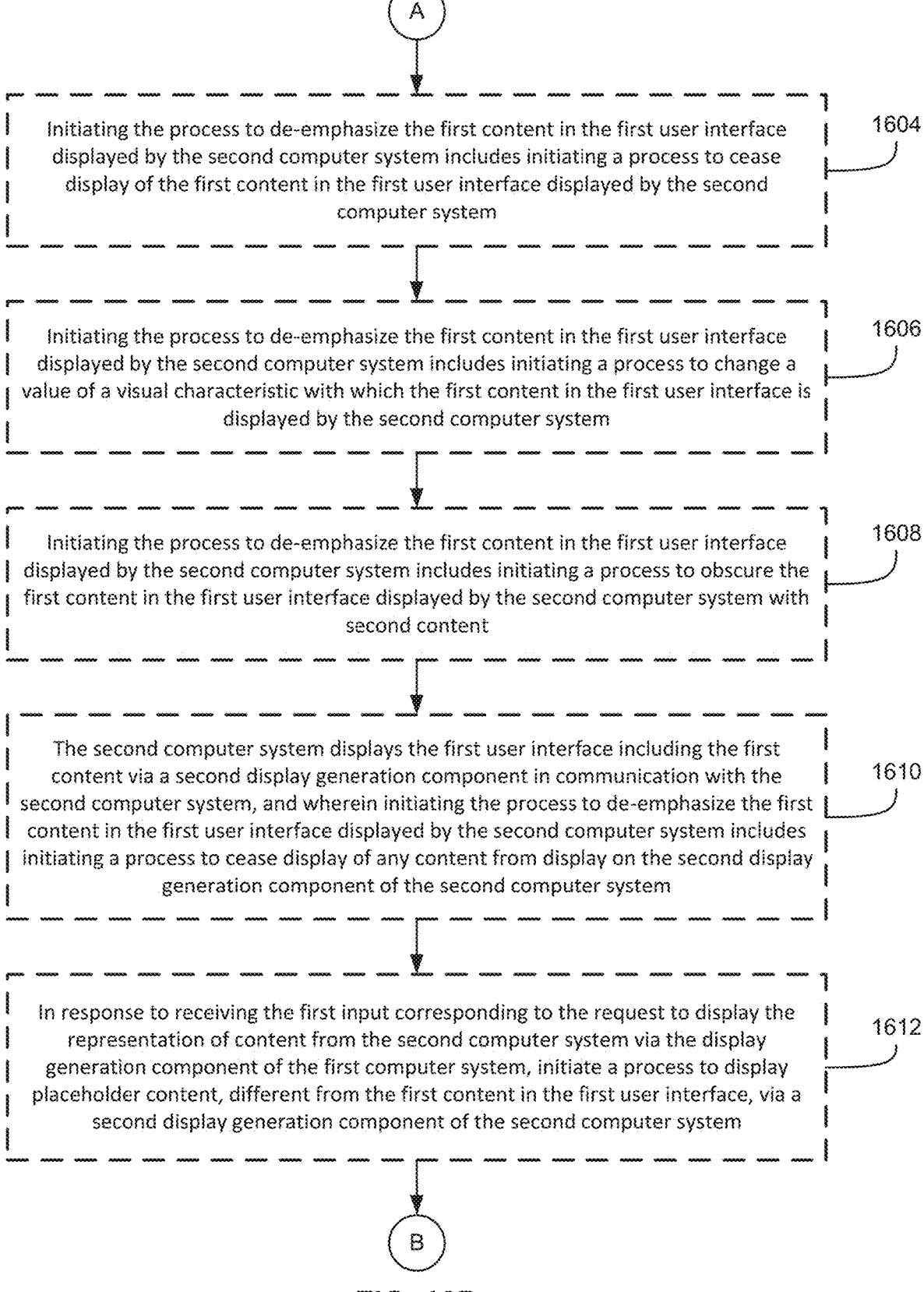
Figure 16D:
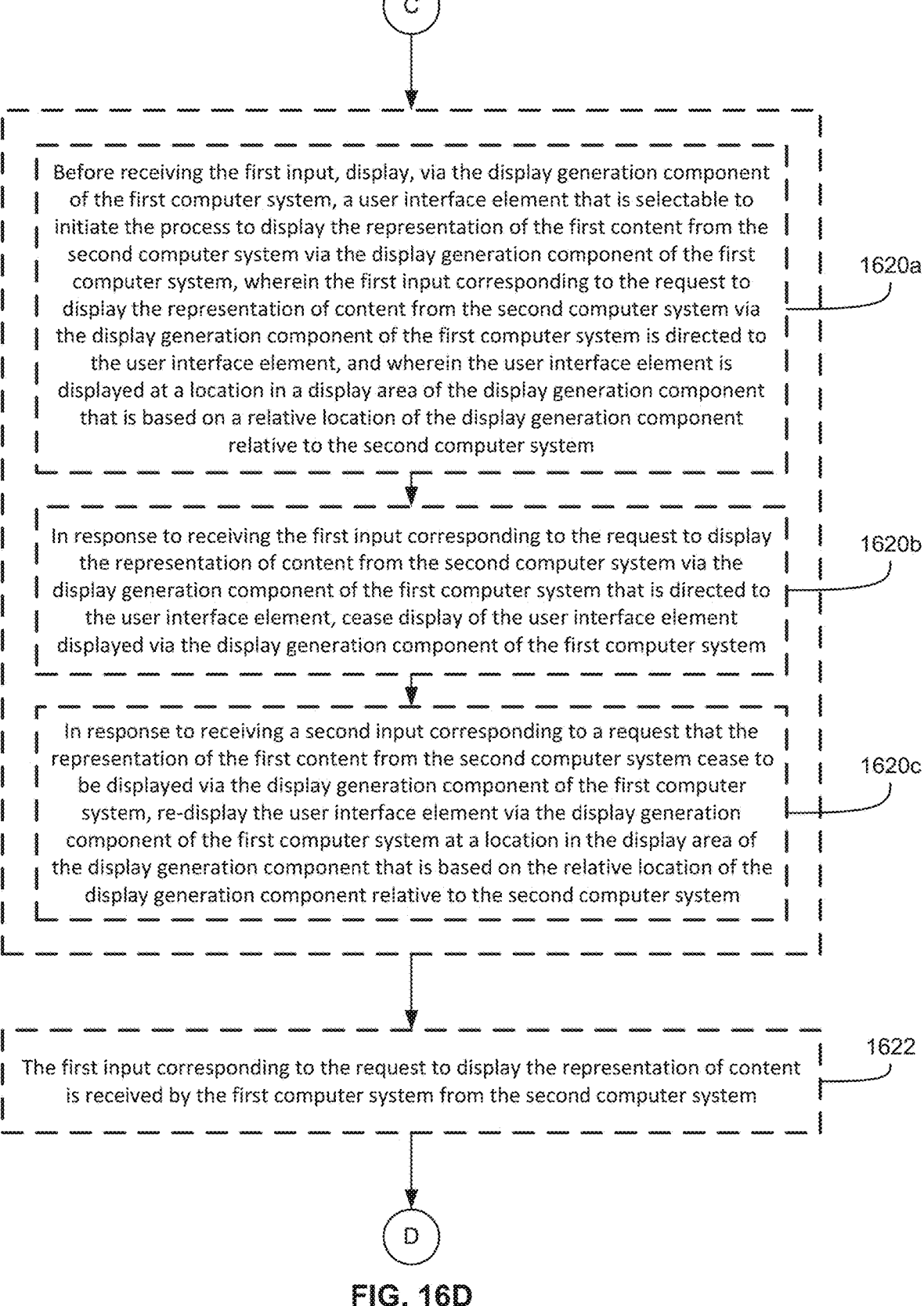
Figure 16E:
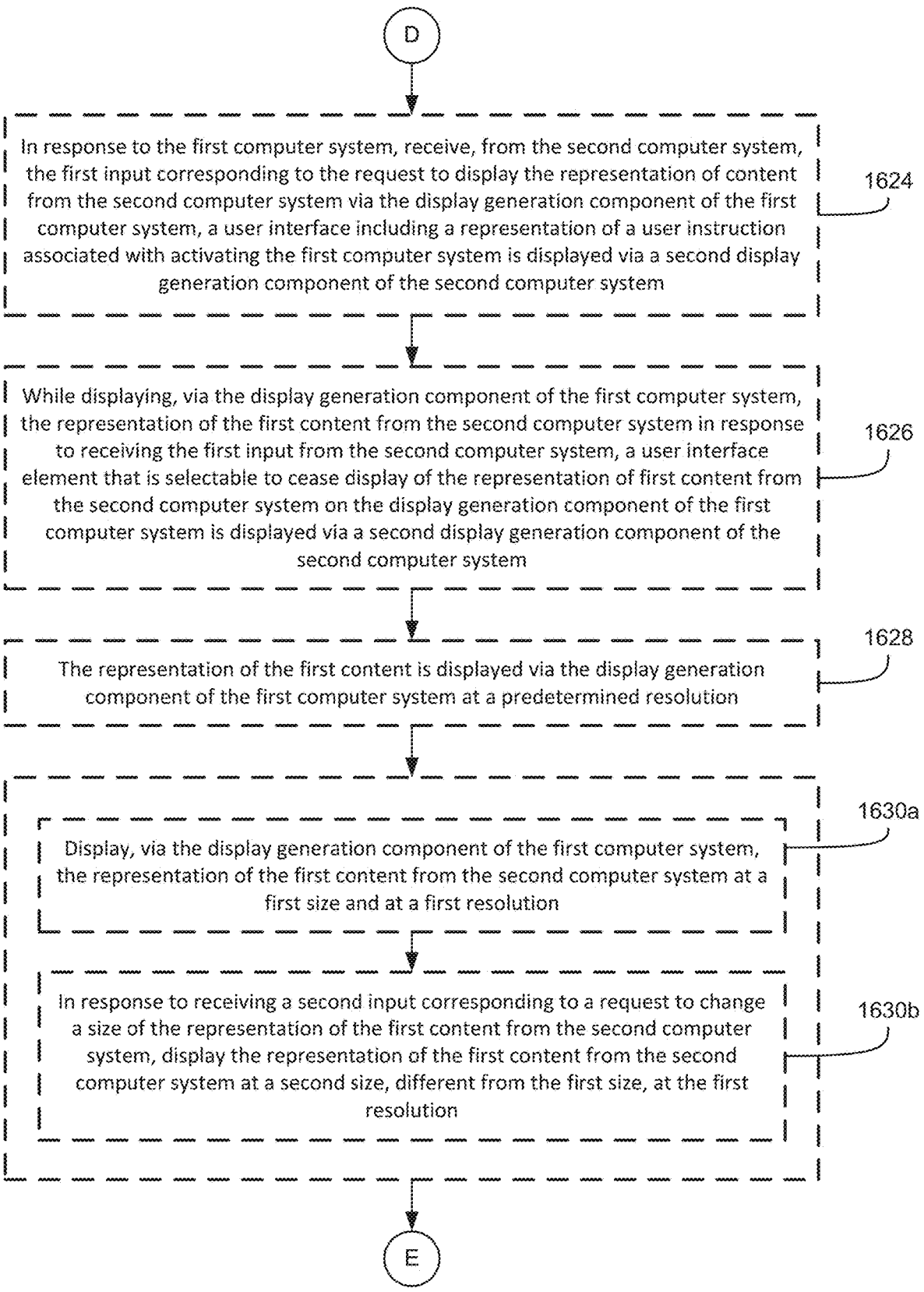
Figure 16J:
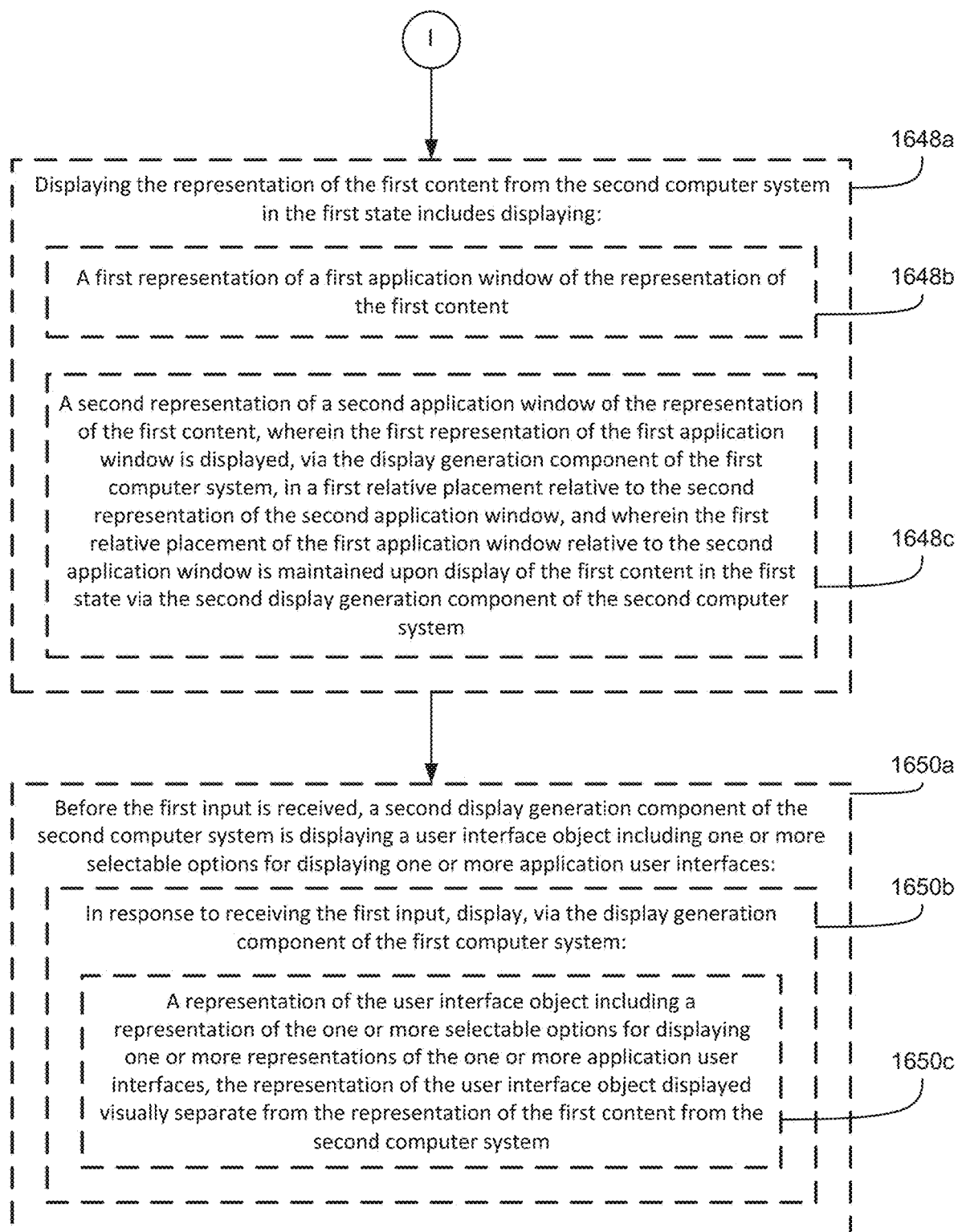

As mentioned previously, in some embodiments, representation 1517 is independently movable in three-dimensional environment 1502 from object 1526'. For example, from FIG. 15C to FIG. 15E, computer system 101 detects input to move representation 1517 without detecting input to move object 1526'. For example, in FIG. 15C, computer system 101 optionally detects an air pinch gesture from hand 1534 while attention 1532a is directed to representation 1517, followed by movement of hand 1534 rightward while holding the air pinch hand shape. In response, as shown in FIG. 15E, computer system 101 has moved representation 1517 rightward in three-dimensional environment 1502, while object 1526' continues to be displayed at its prior location in three-dimensional environment 1502. Additional or alternative details relating to movement of representation 1517 and object 1526' in three-dimensional environment 1502 are described with reference to method 1600.

FIG. 15D1 illustrates similar and/or the same concepts as those shown in FIG. 15D (with many of the same reference numbers). It is understood that unless indicated below, elements shown in FIG. 15D1 that have the same reference numbers as elements shown in FIGS. 15A-15E have one or more or all of the same characteristics. FIG. 15D1 includes computer system 101, which includes (or is the same as) display generation component 120. In some embodiments, computer system 101 and display generation component 120 have one or more of the characteristics of computer system 101 shown in FIGS. 15A-15E and display generation component 120 shown in FIGS. 1 and 3, respectively, and in some embodiments, computer system 101 and display generation component 120 shown in FIGS. 15A-15E have one or more of the characteristics of computer system 101 and display generation component 120 shown in FIG. 15D1.

In FIG. 15D1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 15A-15E.

In FIG. 15D1, display generation component 120 is illustrated as displaying content that optionally corresponds to the content that is described as being displayed and/or visible via display generation component 120 with reference to FIGS. 15A-15E. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 15D1.

Display generation component 120 has a field of view (e.g., a field of view captured by external image sensors 314b and 314c and/or visible to the user via display generation component 120, indicated by dashed lines in the overhead view) that corresponds to the content shown in FIG. 15D1. Because display generation component 120 is optionally a head-mounted device, the field of view of display generation component 120 is optionally the same as or similar to the field of view of the user.

In FIG. 15D1, the user is depicted as performing an air pinch gesture (e.g., with hand 1534) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 15A-15E.

In some embodiments, computer system 101 responds to user inputs as described with reference to FIGS. 15A-15E.

In the example of FIG. 15D1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 15A-15E and/or described with reference to the corresponding method(s) are optionally implemented on computer system 101 and display generation unit 120 in a manner similar or analogous to that shown in FIG. 15D1.

FIGS. 16A-16J is a flowchart illustrating a method 1600 of facilitating initiation of a virtual computer experience in a three-dimensional environment in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In some embodiments, method 1600 is performed at a first computer system in communication with a display generation component and one or more input devices. In some embodiments, the computer system has one or more of the characteristics of the computer systems of the methods 800, 1000, 1200, and/or 1400. In some embodiments, the display generation component has one or more of the characteristics of the display generation components of the methods 800, 1000, 1200, and/or 1400. In some embodiments, the one or more input devices have one or more of the characteristics of the one or more input devices of the methods 800, 1000, 1200, and/or 1400.

In some embodiments, while a second computer system is displaying (via a second display generation component of the second computer system) a first user interface including first content, such as the first application window 1522 and second application window 1524 that is behind the first application window 1522 in computer system 1508 of FIG. 15A, and while the first computer system is not displaying (via the display generation component of the first computer system) a representation of content from the second computer system (e.g., such as described with reference to method 1400), the first computer system receives (1602a), via the one or more input devices, a first input corresponding to a request to display the representation of content from the second computer system via the display generation component of the first computer system, such as selection of option 1540 via cursor 1531 controlled by mouse 1514a of FIG. 15A. In some embodiments, the first input corresponding to the request to initiate the virtual experience of the second computer system includes one or more aspects of the inputs described in the methods 800, 1000, 1200, and/or 1400 (e.g., air gestures such as a user's hand in a pinch hand shape followed by a release of the pinch hand shape and/or an attention of the user (and/or a dwell thereof) directed to an element for launching the virtual experience of the second computer system, corresponding to a selection, a tap, and/or a push of a button (e.g., a real or virtual button).

In some embodiments, the first input corresponding to the request to initiate the virtual experience of the second computer system includes user attention directed to an element for launching the virtual experience of the second computer system (e.g., sight or attention directed to the element), a hand of a user in a particular pose (e.g., raised at a position in front of the user, in a pre-pinch hand shape) at greater than a threshold hand distance (e.g., 0.2 cm, 0.5 cm, 1 cm, 2 cm, 3 cm, 5 cm, 10 cm, 20 cm, 40 cm, 100 cm, 200 cm or 500 cm) from the element, or any combination of the user attention, the hand of the user in the particular pose, and/or the hand of the user at the threshold hand distance. For example, the input directed to the first selectable option optionally includes user attention directed to the element and a hand of the user forming the pinch hand shape and subsequent releasing the pinch hand shape. The input directed to the element optionally corresponds to a request to select the element. As such, the element is optionally selectable via attention input, an input from a hand of a user, a pressing of a key on a keyboard, touch inputs (e.g., a tap and/or a touch and hold) detected on a touch-sensitive surface (e.g., a touch screen), and/or a click from a mouse.

In some embodiments, the element for launching the virtual experience of the second computer system is displayed in a system user interface of the first computer system such as in the system user interface described with reference to the methods 800, 1000, 1200, and/or 1400. In some embodiments, the element for launching the virtual experience of the second computer system has one or more of the characteristics of the first selectable option of method 1400.

In some embodiments, the first input is detected via one or more second input devices of the second computer system. For example, in some embodiments, the element for launching the virtual experience of the second computer system is displayed in a system user interface displayed via a second display generation component of the second computer system, and the user (of the second computer system) optionally clicks or selects (or provides other selection inputs, such as air gesture selection inputs) the element for launching the virtual experience of the second computer system, via a mouse or a touch-sensitive trackpad or other input devices in communication with the second computer system. In some embodiments, the element is a selectable button (e.g., a selectable two-dimensional virtual button) displayed via the second display generation component of the second computer system.

In some embodiments, the first computer system is displaying the element for launching the virtual experience of the second computer system in a first orientation relative to a viewpoint the user of the first computer system in a three-dimensional environment (e.g., the element is displayed in the three-dimensional environment), such as the three-dimensional environment discussed throughout this present disclosure (e.g., the three-dimensional environment discussed with reference to the methods 800, 1000, 1200, 1400, and/or 1600). The first orientation is optionally an orientation such that a normal of the element for launching the virtual experience of the second computer system is aligned with (e.g., is parallel to) the orientation of the viewpoint. In some embodiments, when the orientation of the viewpoint of the user changes (e.g., when the user of the first computer system moves to a different location in the physical environment and/or the user of the first computer system changes orientation in the physical environment), the first computer system optionally updates display of the element to maintain the normal of the element to be oriented towards the viewpoint of the user.

In some embodiments, the first computer system and/or second computer system perform the detection techniques described above with regard to the method 1400 to detect the presence of the first computer system and/or the second computer system and/or to interact with the first computer system and/or the second computer system once the virtual experience of the second computer system is initiated (e.g., the first computer system and the second computer system interact with each other via a wireless connection). In some embodiments, the first and second computer systems have one or more of the characteristics of the first and second computer systems of method 1400.

In some embodiments, in response to receiving the first input corresponding to the request to display the representation of content from the second computer system (e.g., a virtual experience of the second computer system) via the display generation component of the first computer system, the first computer system initiates (1602b) a process to display (1602c) a representation of the first content from the second computer system via the display generation component of the first computer system, such as initiating a process to display representation 1521a of FIG. 15C (e.g., user interface object associated with the second computer system such as a virtual instance of the second computer system and/or a virtual computer experience of the second computer system, as discussed with reference to step(s) 1402) of the method 1400. In some embodiments, the process includes initiating a virtual instance of the second computer system to be displayed on the first computer system, such as described with reference to method 1400. In some embodiments, interaction with the first computer system causes corresponding interaction with the data and/or functionalities of the second computer system, such as described with reference to method 1400.

In some embodiments, the representation of the first content from the second computer system includes an application window. For example, the application window is optionally an Internet application window such as a web browser window, an email application window, a desktop, and/or an icon. When the representation of the first content from the second computer system is displayed via the display generation component of the first computer system, the display generation component of the first computer system optionally displays the representation of the first content from the second computer system including the application window (e.g., a second user interface including the first content).

In some embodiments, user authorization techniques and/or processes described with reference to the method 1400 for authorizing the first computer system and/or the second computer system to access information on the first computer system and/or the second computer system are included in the process of the method 1600.

In some embodiments, the first computer system initiates a process to de-emphasize (1602*d*) the first content in the first user interface displayed by (a second display generation component of the) second computer system, such as illustrated with initiating a process to de-emphasize the display of the first application window 1522 and second application window 1524 that is behind the first application window 1522 in computer system 1508*a* that was displayed in FIG. 15A, as illustrated in the display of the computer system 1508*a* in FIG. 15C. In some embodiments, deemphasizing the first content in the first user interface includes the second computer system reducing a prominence of the first content in the first user interface, such as by reducing a brightness, opacity, color, saturation and/or sharpness of the first content. In some embodiments, deemphasizing the first content in the first user interface occurs concurrently with the first computer system displaying the representation of the first content from the second computer system via the display generation component of the first computer system.

De-emphasizing the first content in the first user interface of the second computer system in response to receiving input corresponding to a request to display a representation of content from the second computer system allows for a user to have a virtual experience of the second computer system via the first computer system, reduces energy dissipated via the second display generation component of the second computer system, and reduces distractions for the user of the first computer system, thus reducing errors in usage of the first computer system.

In some embodiments, initiating the process to de-emphasize the first content in the first user interface displayed by the second display generation component of the second computer system includes initiating a process to cease display of the first content in the first user interface displayed by the second computer system (1604), such as illustrated with initiating a process to cease the display of the first application window 1522 and second application window 1524 that is behind the first application window 1522 in computer system 1508*a* that was displayed in FIG. 15A, as illustrated in the display of the computer system 1508*a* in FIG. 15C. In some embodiments, the second computer system initiates the process. In some embodiments, after ceasing to display the first content, the second display generation component remains active (e.g., continues to display other content that was displayed when the first input was received). Ceasing display of the first content in the first user interface displayed by the second computer system reduces an amount of energy dissipated by a display generation component of the second computer system, thus increasing energy efficiency in the second computer system, and also reduces distraction in using the first computer system, thus reducing errors in usage of the first computer system.

In some embodiments, initiating the process to de-emphasize the first content in the first user interface displayed by the second display generation component of the second computer system includes initiating a process to change a value of a visual characteristic with which the first content in the first user interface is displayed by the second display generation component of the second computer system (1606), such as illustrated with initiating a process to de-emphasize the display of the first application window 1522 and second application window 1524 that is behind the first application window 1522 in computer system 1508*a* that was displayed in FIG. 15A, as illustrated in the display of the computer system 1508*a* in FIG. 15C, such as changing the value of the visual characteristic to blur, dim, and/or reduce a resolution of the first content in the first user interface. In some embodiments, the second computer system initiates the process. In some embodiments, the first content in the first user interface is displayed concurrent with second content. In some embodiments, the first content and the second content are blurred. In some embodiments, the first content is blurred while the second content is not blurred. Changing a value of a visual characteristic with which the first content in the first user interface displayed by the second computer system reduces visual distraction and may increase user efficiency with the first computer system.

In some embodiments, initiating the process to de-emphasize the first content in the first user interface displayed by the second display generation component of the second computer system includes initiating a process to obscure or block the first content in the first user interface displayed by the second display generation component of the second computer system with second content (1608), such as illustrated with initiating a process to obscure the display of the first application window 1522 and second application window 1524 that is behind the first application window 1522 in computer system 1508*a* that was displayed in FIG. 15A, as illustrated in the display of the computer system 1508*a* in FIG. 15C. For example, the second content is optionally a visual indication (e.g., an application window) that indicates that the representation of the first content from the second computer system is actively being displayed by the first computer system and/or instructions instructing the user of the first computer system to activate and/or put on a component of the first computer system and/or a component in communication with the first computer system, such as the display generation component (e.g., a head-mounted display or another type of display device)). Obscuring content displayed by the second display generation component of the second computer system increases user efficiency with the computer systems, reduces visual distraction and may increase user efficiency with the first computer system.

In some embodiments, the second computer system displays the first user interface including the first content via a second display generation component in communication with the second computer system, and wherein initiating the process to de-emphasize the first content in the first user interface displayed by the second computer system includes initiating a process to cease display of any (or all) content from display on (or via) the second display generation component of the second computer system (1610), such as illustrated with initiating a process to obscure the display of the first application window 1522 and second application window 1524 that is behind the first application window 1522 in computer system 1508*a* that was displayed in FIG.

15A, as illustrated in the display of the computer system 1508a in FIG. 15C including the first content in the first user interface. For example, the second display generation component of the second computer system ceases to display any content in response to the first computer system receiving the first input. Also, initiating the process to cease display of any content from display on the second display generation component of the second computer system optionally includes the first computer system transmitting, via any suitable wired or wireless medium, an input or command corresponding to a request to cease display of the content, which optionally causes the second computer system to cease display of the content. Ceasing display of any content from display on the second display generation component reduces visual distraction and may increase user efficiency with the first computer system during the virtual experience of the second computer system on the first computer system.

In some embodiments, in response to receiving the first input corresponding to the request to display the representation of content from the second computer system via the display generation component of the first computer system, the first computer system initiates (1612) a process to display placeholder content (e.g., symbolic and/or pictorial content such as an image, icon and/or textual content indicating that the first computer system has received the representation of the first content from the second computer system or that the representation of the first content from the second computer system is actively being displayed on the display generation component of the first computer system), different from the first content in the first user interface though optionally not located at a location different from a location of the first user interface displayed by a second display generation component of the second computer system, via a second display generation component of the second computer system, such as illustrated with the initiating a process to display the indication 1523 in FIG. 15C via the display of the computer system 1508a in FIG. 15C. Displaying placeholder content displayed by the second display generation component of the second computer system reduces visual distraction, indicates that the virtual experience of the second computer system is active, reduces errors in usage and may increase user efficiency with the first computer system during the virtual experience of the second computer system on the first computer system.

In some embodiments, the first input corresponding to the request to display the representation of content from the second computer system via the display generation component of the first computer system includes detection of placement of the display generation component on a portion of a user of the first computer system (1614) (e.g., a head or hand, or another portion), such as detection of placement of the computer system 101 of FIG. 15C on the user 1509 of FIG. 15A. For example, when the display generation component is a head-mounted display, the first computer system receiving the first input optionally corresponds to the first computer system receiving data indicative of a detection of the display generation component being placed on the head of the user. Using detection of contact of the display generation component with a portion of the user reduces an amount of steps or inputs involved in displaying a virtual experience of the second computer system by the first computer system.

In some embodiments, while placement of the display generation component on the portion of the user is detected such as described with reference to step(s) 1614 above, and while the display generation component is displaying the representation of the first content from the second computer system, wherein the representation of the first content is in a first state, the first computer system detects (1616a) that the display generation component is no longer placed on the portion of the user, such as detecting that the computer system 101 of FIG. 15C is no longer placed on the portion of the user 1509 of FIG. 15C. The first content in the first state optionally corresponds to the first content comprising a set of application windows that are active and/or displayed (e.g., one or more applications running as focus applications and/or as background applications), in a specific order (e.g., a first application window is displayed in front of and/or adjacent to a second application window), and/or in which one or more applications of the set of application windows include certain content, such as generally discussed with reference to (step(s) 1420-1428) of the method 1400.

In some embodiments, in response to detecting that the display generation component is no longer placed on the portion of the user, the first computer system initiates (1616b) a process to cause the first content to be displayed in the first state on the second display generation component of the second computer system, such as initiating a process to cause the first application window 1522' and second application window 1524' that is behind the first application window 1522', as illustrated in the representation 1521a, to be displayed by the computer system 1508a in FIG. 15A, in the same arrangement as first application window 1522' and second application window 1524' are in FIG. 15C (optionally including transmitting, via any suitable wired or wireless medium and to the second computer system, an input or command corresponding to a request to display the first content in the first state on the second display generation component of the second computer system, which optionally causes the second computer system to display the first content in the first state on the second display generation component). Displaying the content from the virtual instance in the state that the content had while in the virtual instance increases user efficiency with the content, as the state of the content transitions between the virtual computer experience and the second computer system (e.g., the remote computer) without further input.

In some embodiments, the first input corresponding to the request to display the representation of content from the second computer system via the display generation component of the first computer system is received while placement of the display generation component on a predefined portion of a user of the first computer system (e.g., a head or hand, or another predefined portion) is detected (1618) such as receiving the selection of option 1540 while placement of the computer system 101 of FIG. 15C on the user 1509 of FIG. 15A is detected. For example, the display generation component optionally displays the element for launching the virtual experience of the second computer system (e.g., a selectable option), as described above with reference to step(s) 1602, in a three-dimensional environment, such as the three-dimensional environment discussed with reference to the methods 800, 1000, 1200, 1400 and/or 1600, that is displayed and/or visible via the display generation component through augmented reality, virtual reality, or another computer-generated and/or computer-assisted reality. The element is optionally displayed via the display generation component proximate to the second computer system including proximate to the second display generation component of the second computer system and/or in a system user interface of the first computer system, such as in a system user interface as described with reference to methods 800, 1000, 1200, and/or 1400. The element is optionally displayed with one or more characteristics and/or functionality of the first selectable option described in step(s) 1402, 1406, and/or 1410 of the method 1400. Receiving the request to display the representation of content from the second computer system while user contact with the display generation component is detected reduces an amount of steps or inputs involved in displaying a virtual experience of the second computer system via the first computer system, and also reduces erroneous initiation of the virtual experience of the computer system.

In some embodiments, before receiving the first input, the first computer system displays (1620a), via the display generation component of the first computer system, a user interface element that is selectable to initiate the process to display the representation of the first content from the second computer system via the display generation component of the first computer system (the user interface element is optionally displayed with one or more characteristics and functionality of the first selectable option described in step(s) 1402, 1406, and/or 1410 of the method 1400), wherein the first input corresponding to the request to display the representation of content from the second computer system via the display generation component of the first computer system is directed to the user interface element, such as directed to the element for launching the virtual experience of the second computer system as discussed above with reference to step(s) 1602, and wherein the user interface element is displayed at a location in a display area of the display generation component (and/or at a location in the three-dimensional environment) that is based on a relative location of the display generation component relative to the second computer system, such as shown in FIGS. 13A-D. For example, the user interface element is optionally displayed within a 0.1 m, 1 m, 5 m, 10 m, or 20 m radius from the second computer system, or at another location in the display area of the display generation component that is based on a location of the display generation component relative to the second computer system.

In some embodiments, in response to receiving the first input corresponding to the request to display the representation of content from the second computer system via the display generation component of the first computer system that is directed to the user interface element, the first computer system ceases display (1620b) of the user interface element displayed via the display generation component of the first computer system, such as shown in FIGS. 13A-D.

In some embodiments, in response to receiving a second input corresponding to a request that the representation of the first content from the second computer system cease to be displayed via the display generation component of the first computer system, the first computer system re-displays (1620c) the user interface element via the display generation component of the first computer system at a location in the display area of the display generation component (and/or at a location in the three-dimensional environment) that is based on the relative location of the display generation component relative to the second computer system, such as shown in FIGS. 13A-D. Displaying, ceasing displaying, and re-displaying the element for launching the virtual experience of the second computer system, in the manner recited above, increases user efficiency with the first computer system and reduces errors in user interaction with the first computer system.

In some embodiments, the first input corresponding to the request to display the representation of content is received by the first computer system from the second computer system (1622), such as selection of option 1540 via cursor 1531 controlled by mouse 1514a of FIG. 15A, and/or such as via BLUETOOTH or another wireless or wired connection. In an example, the request is received at the second computer system via a selection of a user interface element such as the first selectable option described with reference to step(s) 1402 of the method 1400, optionally within a system user interface of the second computer system such as described with reference to the methods 800, 1000, 1200, and/or 1400, displayed by a display generation component of the second computer system. Receiving the request to display the representation of content at the first computer system from the second computer system increases ways to initiate a virtual computer experience of the second computer system, thus enhancing user experience with the virtual experience operation.

In some embodiments, in response to the first computer system receiving, from the second computer system, the first input corresponding to the request to display the representation of content from the second computer system via the display generation component of the first computer system (and optionally in accordance with a determination that the display generation component of the first computer system is not active, properly worn, or otherwise not in a configuration in which the virtual experience of the second computer system can be displayed via the first computer system) a user interface including a representation of a user instruction associated with activating the first computer system is displayed via a second display generation component of the second computer system (1624), such as the indication 1542 of FIG. 15B. (e.g., instructions for a user to put on a head-mounted display corresponding to the display generation component of the first computer system). For example, in some embodiments, the first computer system sends commands including instructions to the second computer system, including instructions to display, via a second display generation component of the second computer system, a user interface including a representation of a user instruction associated with the first computer system. In some embodiments, the commands are sent to a server, different from the second computer system, and then sent to the second computer system from the server. In some embodiments, the second computer system initiates display of the instruction to activate the first computer system, such as to don the first computer system and/or a head-mounted display in communication with the first computer system. Displaying instructions to activate the first computer system in response to receiving a request to initiate a virtual experience of the second computer system on the first computer system increases user efficiency with the computer system and reduces errors associated with the user attempting to initiate the virtual experience.

In some embodiments, while displaying, via the display generation component of the first computer system, the representation of the first content from the second computer system in response to receiving the first input from the second computer system, a user interface element that is selectable to cease display of the representation of first content from the second computer system on the display generation component of the first computer system is displayed via a second display generation component of the second computer system (1626). For example, the indication 1523 of FIGS. 15D and 15D1 optionally includes a selectable option to cease display of the representation 1521a of FIGS. 15D and 15D1. The user interface element optionally ceases to be displayed in response to the ceasing of the display of the representation of the first content from the second computer system. Displaying on a display of the remote computer (e.g., the second computer system) an option to end the virtual computer experience on the first computer system increases user control of the virtual experience and reduces errors associated with the user attempting to end the virtual computer experience session.

In some embodiments, the representation of the first content is displayed via the display generation component of the first computer system at a predetermined resolution (1628), such as the representation 1521a of FIGS. 15D and 15D1 being displayed at the predetermined resolution, such as 2560×1440, 3440×1440, or another predetermined resolution (and corresponding predetermined aspect ratio, e.g., 16:9 aspect ratio, 21:9 aspect ratio (ultrawide), or another aspect ratio). In some embodiments, the predetermined resolution is the same resolution at which the first content was displayed by the second computer system when the first input was received. In some embodiments, the predetermined resolution is different from the resolution at which the first content was displayed by the second computer system when the first input was received. In some embodiments, the predetermined resolution is set by and/or corresponds to the system or default resolution of the display generation component of the first computer system. Displaying the virtual experience of the second computer system via the first computer system with a predetermined resolution ensures consistent presentation of the first content regardless of the computer system view which the first content is displayed, thereby reducing errors in usage of the first computer system.

In some embodiments, the first computer system displays (1630a), via the display generation component of the first computer system, the representation of the first content from the second computer system at a first size (e.g., a first length and/or width of display in the three-dimensional environment, optionally from the viewpoint of the user of the first computer system) and at a first resolution, such as illustrated with the size of the representation 1521a of FIG. 15C.

In some embodiments, in response to receiving a second input corresponding to a request to change a size of the representation of the first content from the second computer system, the first computer system displays (1630b) the representation of the first content from the second computer system at a second size (e.g., a second length and/or width of display in the three-dimensional environment, optionally from the viewpoint of the user of the first computer system), different from the first size, at the first resolution, such as illustrated with the size of the representation 1521a of FIGS. 15D and 15D1. As such, the resizing of the display of the representation of the first content from the second computer system optionally includes maintaining the aspect ratio of the display of the representation of the first content from the second computer system. In some embodiments, the aspect ratio and/or resolution of the display of the representation of the first content from the second computer system via the display generation component of the first computer system is based on processing capabilities of the second computer system (e.g., a speed at which information is processed on the second computer system and/or at which operations are performed on the second computer system). For example, in some embodiments, the second computer system functions as a virtual machine for the first computer system, while the first computer system is displaying, via the display generation component, the representation of the first content from the second computer system. Resizing the display of the virtual experience of the second computer system increases user control of the virtual experience and reduces errors with interaction with the virtual computer experience while maintaining consistent presentation of the first content.

In some embodiments, the first computer system displays (1632a), via the display generation component of the first computer system, the representation of the first content from the second computer system at a first position in a three-dimensional environment, such as illustrated with the position of the representation 1521a of FIG. 15C, such as a position described with reference to step(s) 1402 and 1412-1416 of the method 1400 in the three-dimensional environment discussed throughout this present disclosure (e.g., the three-dimensional environment discussed with reference to the methods 800, 1000, 1200, 1400, and/or 1600).

In some embodiments, while displaying the representation of the first content at the first position in the three-dimensional environment, the first computer system receives (1632b), via the one or more input devices, a second input corresponding to a request to move (e.g., reposition) the representation of the first content from the second computer system from the first position to a second position, such as to another position in the three-dimensional environment discussed throughout this present disclosure (e.g., the three-dimensional environment discussed with reference to the methods 800, 1000, 1200, 1400, and/or 1600), different from the first position, in the three-dimensional environment, such as attention 1532a of FIG. 15C (e.g., the second input optionally including one or more characteristics of the first input corresponding to the request to initiate the virtual experience of the second computer system discussed with reference to the step(s) 1602, but corresponding to a request to move the representation of the first content from the second computer system, e.g., air gestures such as a user's hand in a pinch hand shape directed to the representation of the first content from the second computer system, so as to grab the representation of the first content from the second computer system followed by movement of the hand in the pinch hand shape and a release of the pinch hand shape, so as to move to the representation of the first content from the second computer system to a position in the three-dimensional environment that corresponds to where the pinch hand shape was directed when the pinch was released).

In some embodiments, in response to receiving the second input corresponding to the request to move the representation of the first content from the second computer system, the first computer system moves (1632c) (e.g., repositioning) the representation of the first content from the second computer system from the first position to the second position in the three-dimensional environment, such as to the position of the representation 1521a of FIG. 15E. For example, the representation of the first content is optionally moved in the three-dimensional environment by a magnitude and/or in a direction based on the magnitude and/or direction of the movement of the hand of the user in the second input. Repositioning the virtual computer experience of the second computer system displayed via the display generation component of the first computer system increases user control of the virtual experience and reduces errors with interaction with the virtual computer experience.

In some embodiments, displaying the representation of the first content from the second computer system via the display generation component of the first computer system in response to receiving the first input corresponding to the request to display the representation of content from the second computer system includes (1634a) in accordance with a determination that the second computer system is at a first location relative to a field of view from a viewpoint of the user, displaying the representation of the first content from the second computer system at a second location relative to the field of view from the viewpoint of the user, wherein the second location has a predetermined spatial relationship relative to the first location (1634*b*), such as illustrated with the position of the representation 1521*a* of FIG. 15C, (e.g., at a spatial position that is within a 0.1 m, 1 m, 5 m, 10 m, or 20 m radius from the first location of the second computer system, or at another position in the three-dimensional environment that is based the first location of the second computer system, such as in front of the second display generation component of the second computer system and/or adjacent to the second display generation component of the second computer system), and in accordance with a determination that the second computer system is at a third location, different from the first location, relative to the field of view from the viewpoint of the user, displaying the representation of the first content from the second computer system at a fourth location, different from the second location, relative to the field of view from the viewpoint of the user, wherein the fourth location has the predetermined spatial relationship relative to the second location (1634*c*) (e.g., at the spatial position that is within a 0.1 m, 1 m, 5 m, 10 m, or 20 m radius from the third location of the second computer system, or at another position in the three-dimensional environment that is based the third location of the second computer system, such as in front of the second display generation component of the second computer system and/or adjacent to the second display generation component of the second computer system). For example, if the computer system 1508*a* was located at a different location that in FIG. 15C, then representation 1521*a* is optionally displayed in a different location than in FIG. 15C, with the same predetermined spatial relationship. Displaying the virtual computer experience of the second computer system via the display generation component of the first computer system near the second computer system reduces errors with interaction with the virtual computer experience, and clearly conveys the relationship between the virtual computer experience and the second computer system.

In some embodiments, a size at which the representation of the first content from the second computer system (e.g., a length and/or width of display in the three-dimensional environment from the viewpoint of the user of the first computer system) is displayed via the display generation component of the first computer system is larger than a size of a display area of a second display generation component of the second computer system (1636), such as the representation 1521*a* of FIG. 15C being larger that the display generation component of the computer system 1508*a* in FIG. 15C (e.g., a length and/or width of the display second display generation component in the three-dimensional environment from the viewpoint of the user of the first computer system and/or of a length and/or width of the second display generation component in the physical environment). Displaying the virtual computer experience of the second computer system via the display generation component of the first computer system at a size larger than a size of the display generation component of the second computer system enhances user experience and reduces errors with interaction with the virtual computer experience.

In some embodiments, the first user interface including the first content includes (1638*a*) a first application window (1638*b*), a second application window that is displayed at a first location relative to the first application window in the first user interface (1638*c*), such as the first application window 1522 and second application window 1524 that is behind the first application window 1522 in computer system 1508 of FIG. 15A, initiating the process to display the representation of the first content from the second computer system via the display generation component of the first computer system includes initiating a process to (automatically, without user input for doing so) display a representation of the second application window relative to a representation of the first application window to a location in the display of the representation of the first content from the second computer system that is different from the first location (1638*d*) (e.g., does not correspond to a corresponding location of the first location in the first user interface). For example, the location of the second application window 1524' relative to the location of the first application window 1522' in FIG. 15C is optionally a different location than a corresponding location of the second application window 1524 relative to the location of the first application window 1522 in FIG. 15A, optionally before operations are performed with respect to the first application window 1522' and the second application window 1524' in FIG. 15C. For example, the application window spacing between application window in the representation of the first content from the second computer system optionally does not proportionally mirror the application window spacing between application windows in the first content in the first user interface. For example, the first application window is optionally displayed in front of and covering a portion of the second application window in the first content of the first user interface. When the display of the representation of the first content from the second computer system is initiated, the representation of the first application window optionally does not cover a portion (e.g., the corresponding portion of the representation of the second application window) or any portion of the representation of the second application window. Instead, the representation of the first application window and/or the representation of the second application window is optionally moved such that both the representation of the first application window and the representation of the second application window are fully displayed, even though the sizes/areas of the application windows relative to the first user interface and/or of the representation of the application windows relative the representation of the first content are not changed. Relocating the representation of the second application window relative to the representation of the first application window to a location in the display of the virtual computer experience of the second computer system displayed via the display generation component of the first computer system increases interactability with the application windows, thereby enhancing user experience and accessibility and assisting users by displaying content at more optimal positions.

In some embodiments, when detecting an event corresponding to termination of display of the representation of the first content from the second computer system via the display generation component of the first computer system, the representation of the first content from the second computer system is in a first state (1640*a*), such as detecting selection of option 1540 of FIG. 15E while the first application window 1522' and the second application window 1524' of FIG. 15E are displayed. For example, the representation of the first content in the first state optionally corresponds to the first content comprising a set of application windows that are active (e.g., one or more applications running as focus applications and/or as background application), in a specific order (e.g., a first application window is displayed in front of and/or adjacent to a second application window), and/or in which one or more applications of the set of application windows include certain content, such as generally discussed with reference to step(s) 1420-1428)

of the method 1400, and/or the first state includes one or more characteristics of the second state of operation discussed with reference to step(s) 1422 of the method 1400).

In some embodiments, in response to detecting the event corresponding to termination of display of the representation of first content from the second computer system, the first computer system initiates (1640*b*) a process to display, via a second display generation component of the second computer system, the first content in the first state, such as illustrated with initiating a process to display the first application window 1522 and second application window 1524 on the computer system 1508*a* of FIG. 15E in accordance with the arrangement of the display of the first application window 1522' and the second application window 1524' of FIG. 15E in the representation 1521*a* when the event is detected. In some embodiments, the second computer system detects the event and proceeds to displaying the first content in the first state via the second display generation component of the second computer system. In some embodiments, the process includes transmitting the first state to the second computer system, directly or indirectly such as via an intermediate server. Displaying content corresponding to the virtual computer experience of the second computer system at its last state via the second display generation component of the second computer system when presentation of the virtual computer system experience ends ensures consistent presentation of information to the user and reduces the number of inputs involved with doing so, thereby reducing errors in usage of the computer system(s).

In some embodiments, detecting the event corresponding to termination of display of the representation of the first content from the second computer system from the display generation component of the first computer system includes detecting that the display generation component is no longer placed on a predefined portion of a user of the first computer system (1642), such as the predefined portion of the user described with reference to step(s) 1614 above and/or such as a cease of detection of placement of the computer system 101 of FIG. 15C on the user 1509 of FIG. 15A. For example, when the display generation component is a head-mounted display, the first computer system detecting that the display generation component is no longer placed on the predefined portion of the user optionally includes the first computer system receiving data indicative of no detection of the display generation component on the head of the user. Associating termination of the virtual computer experience of the second computer system via the display generation component of the first computer system with a detection of the display generation component no longer having contact with the predefined portion of the user reduces an amount of steps or inputs involved in ceasing display of the virtual experience of the second computer system and enhances user experience.

In some embodiments, detecting the event corresponding to termination of display of the representation of the first content from the second computer system from the display generation component of the first computer system includes detecting user selection of a user interface element that is displayed concurrently with the representation of the first content from the second computer system, wherein the user interface element is selectable to initiate a process to cease display of the representation of the first content from the second computer system via the display generation component of the first computer system (1644), such as detecting selection of option 1540 of FIG. 15E. The user interface element is optionally displayed within or beyond a system user interface (e.g., a control user interface) displayed via the display generation component of the first computer system. For example, the user interface element is optionally displayed in a system user interface, such as the system user interface described with reference to the methods 800, 1000, 1200, and/or 1400, such as step(s) 802 of the method 800, and/or is accessible via steps similar to accessing elements (e.g., user interface elements) discussed with reference to the methods 800, 1000, 1200, and/or 1400, such as step(s) 840 and 842 of the method 800, optionally being accessible via an attention of the user and/or a hand of the user directed to a specific portion of the three-dimensional and/or via a hand or other predefined portion of the user being in a specific pose or orientation. Associating selection of a user interface element with a request to end the virtual computer experience of the second computer system via the display generation component of the first computer system is an efficient manner of ceasing the virtual computer experience.

In some embodiments, a state of the representation of the first content from the second computer system was a second state that optionally includes one or more characteristics of the first state of operation discussed with reference to (step(s) 1422) of the method 1400, different from the first state, when the first input was received (1646*a*).

In some embodiments, while displaying the representation of the first content from the second computer system in the second state, one or more operations corresponding to one or more inputs directed to the representation of the first content from the second computer system are performed with respect to the first content from the second computer system, (such as the one or more operations corresponding to the one or more inputs described with reference to step(s) 1402 and 1422-1428 of the method 1400 such that in response to the one or more operations being performed, the representation of the first content from the second computer system is in the first state (1646*b*), such as shown in FIGS. 13B and 13C. Reflecting changes made to the virtual computer experience of the second computer system (e.g., the representation of the first content from the second computer system) displayed via the display generation component of the first computer system on the second display generation component of the second computer system when presentation of the virtual computer system experience ends ensures continuity of information displayed to the user, enhances user experience and reduces errors in interaction with the virtual computer experience and/or the computer systems.

In some embodiments, displaying the representation of the first content from the second computer system in the first state includes displaying (1648*a*) a first representation of a first application window of the representation of the first content (1648*b*), and a second representation of a second application window of the representation of the first content, wherein the first representation of the first application window is displayed, via the display generation component of the first computer system, in a first relative placement relative to the second representation of the second application window (and/or at a first size and/or at a first relative size relative to the second representation of the second application window), and wherein the first relative placement of the first application window relative to the second application window (and/or the first size and/or the first relative size relative to the second representation of the second application window) is maintained upon display of the first content in the first state via the second display generation component of the second computer system (1648*c*), such as shown in FIGS. 13C and 13D. Further, when switching between operating on the second computer system and the first computer system, if the first application window and the second application window of the second computer system are in a different arrangement on the second computer system, the first representation of the first application window and the second representation of the second application window will optionally be in a correspondingly different arrangement on the display generation component of the first computer system. As such, the relative placement and/or size of application windows is optionally preserved when switching between the virtual experience of the second computer system displayed via the display generation component of the first computer system and the second display generation component of the second computer system. Preserving the relative placement and/or size of application windows of the first content in the first state when switching between the virtual experience of the second computer system displayed via the display generation component of the first computer system and the second display generation component of the second computer system ensures continuity of information displayed to the user, enhances user experience and reduces errors in interaction with the virtual computer experience and/or the computer systems.

In some embodiments, before the first input is received, a second display generation component of the second computer system is displaying a user interface object including one or more selectable options for displaying one or more application user interfaces (1650a), such as the dock 1526 including selection options 1528a-d (and/or for displaying one or more application windows, such as an email application window or an Internet application window), such as an application launch user interface (e.g., a dock) optionally concurrent with display of the first user interface. In some embodiments, the one or more selectable options for displaying the one or more application user interfaces are application icons that are selectable to display the corresponding one or more application user interfaces).

In some embodiments, in response to receiving the first input, the first computer system displays (1650b), via the display generation component of the first computer system, a representation of the user interface object including a representation of the one or more selectable options for displaying one or more representations of the one or more application user interfaces, the representation of the user interface object displayed visually separate from the representation of the first content from the second computer system (1650c), such as the dock 1526' of FIG. 15C including selectable option 1528a'-d' (e.g., at a different position and/or plane in the three-dimensional environment, such as illustrated and discussed with reference to FIGS. 15A-15E). The representation of the user interface object can be moved or relocated in the three-dimensional environment separately and independently from the representation of the first content from the second computer system, such as the repositioning described with reference to step(s) 1632 applied to the representation of the user interface object. Likewise, the representation of the user interface object can be resized in the three-dimensional environment separately and independently from the representation of the first content from the second computer system, such as the repositioning described with reference to step(s) 1630 applied to the representation of the user interface object. In some embodiments, the representation of the first content from the second computer system includes the representation of the user interface object. In some embodiments, the representation of the first content from the second computer system does not include the representation of the user interface object. While in virtual computer experience session, displaying a separate platter that includes a selectable option for displaying an application user interface reduces clutter in the representation of the first content and provides more space for usage by other content in the representation of the first content, thereby reducing errors in interaction with the virtual computer experience of the second computer system displayed via the display generation component of the first computer system.

It should be understood that the particular order in which the operations in method 1600 have been described is merely exemplary and is not intended to indicate that the described order is the only order in which the operations could be performed. One of ordinary skill in the art would recognize various ways to reorder the operations described herein.

FIGS. 17A-17H illustrate examples of a first computer system facilitating disambiguation of a second computer system from a plurality of computer systems for display of a representation of content from the second computer system in a three-dimensional environment, in accordance with some embodiments.

Figure 17A:
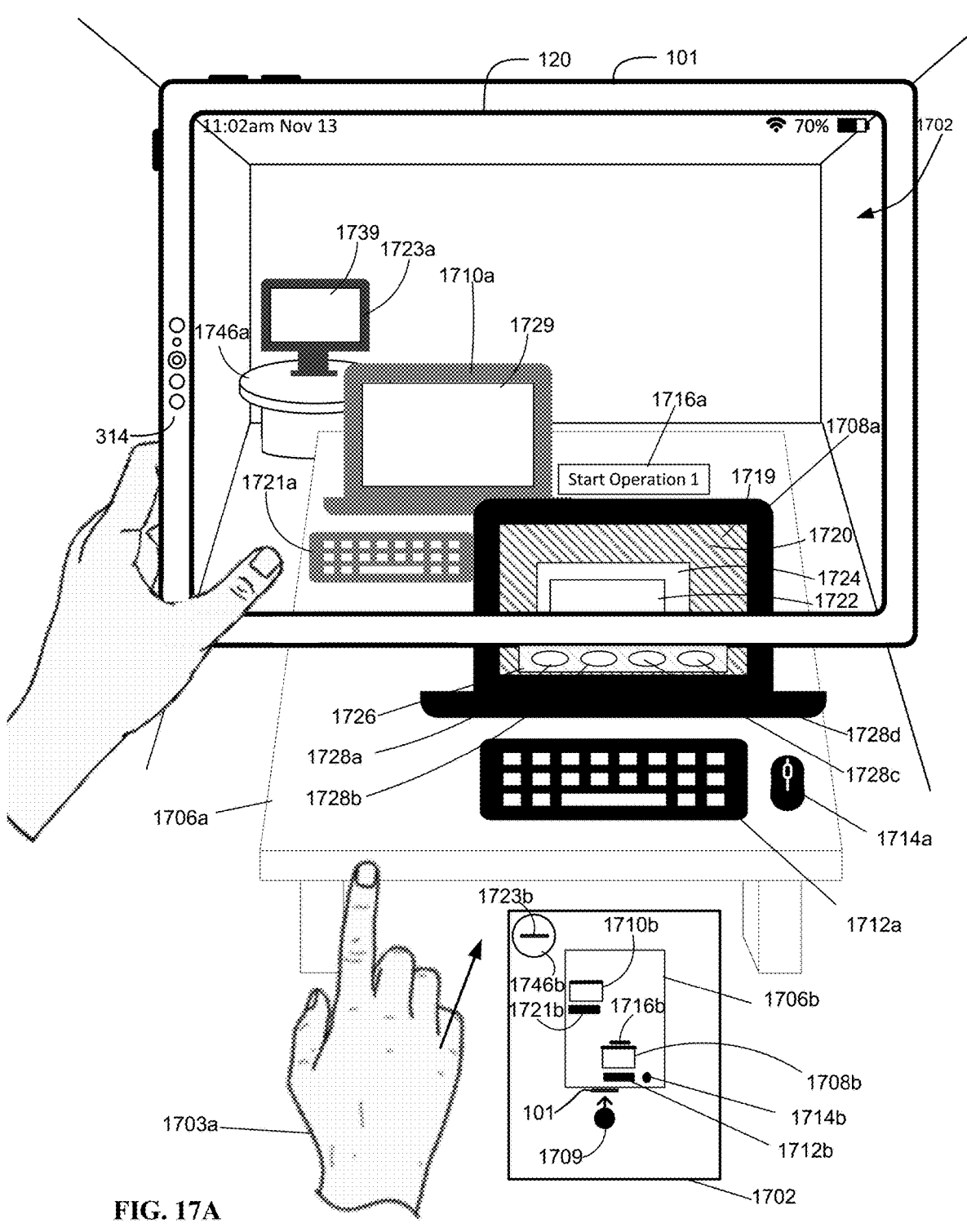
FIGS. 17A-17H illustrate examples of a first computer system facilitating disambiguation of a second computer system from a plurality of computer systems for display of a representation of content from the second computer system in a three-dimensional environment, in accordance with some embodiments.
Figure 18:
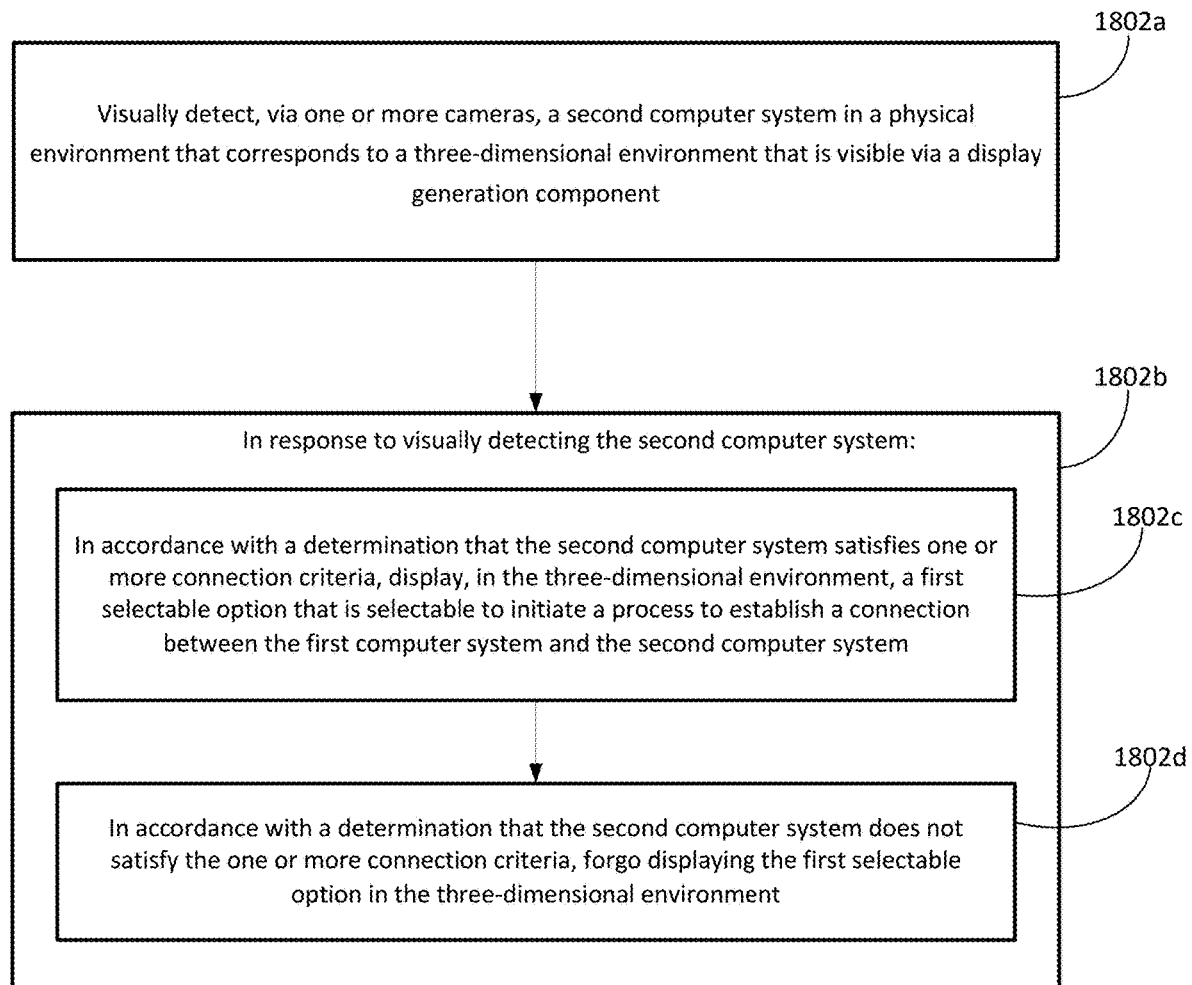
FIG. 18 is a flowchart illustrating a method of facilitating disambiguation of a second computer system from a plurality of computer systems for display of a representation of content from the second computer system in a three-dimensional environment in accordance with some embodiments.

FIG. 17A illustrates a first computer system 101 displaying, in a real world environment and via a display generation component (e.g., display generation component 120 of FIG. 1), a three-dimensional environment 1702. As described above with reference to FIGS. 1-6, the first computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the first computer system 101 would be able to use to capture one or more images of a user or a part of the user while the user interacts with the first computer system 101. In some embodiments, the user interfaces described below are implemented on a head-mounted display that includes a display generation component that displays the user interfaces to the user and sensors to detect the physical environment and/or movements of the user's hands (e.g., external sensors facing outwards from the user) such as movements that are interpreted by the first computer system as gestures such as air gestures, and/or gaze of the user (e.g., internal sensors facing inwards towards the face of the user). The figures herein illustrate a three-dimensional environment that is presented to the user by first computer system 101 (e.g., and displayed by the display generation component 120 of first computer system 101) and an overhead view 1321 of the physical and/or three-dimensional environment 1702 associated with the first computer system 101 to illustrate the relative locations of objects in the real world environment and the locations of virtual objects in the three-dimensional environment 1702.

In some embodiments, first computer system 101 captures one or more images of the real world environment around the first computer system 101 (e.g., operating environment 100), including one or more objects in the real world environment around the first computer system 101. In some embodiments, the first computer system 101 displays representations of the real world environment in three-dimensional environment 1702 and/or portions of the real world environment are visible via the display generation component 120 in three-dimensional environment 1702. In the illustrated embodiment in FIG. 17A, objects in the real world environment include a table 1706a (e.g., corresponding to 1706b in the overhead view), a second computer system 1708a (e.g., corresponding to 1708b in the overhead view) having a second display generation component 1719 that is facing the viewpoint of the user 1709, a third computer system 1710a (e.g., corresponding to 1710b in the overhead view) having a third display generation component 1729 that is facing the viewpoint of the user 1709, a first keyboard 1712a (e.g., corresponding to 1712b in the overhead view) in communication with the second computer system 1708a, a mouse 1714a (e.g., corresponding to 1714b in the overhead view) in communication with the second computer system 1708a, a second keyboard 1721a (e.g., corresponding to 1721b in the overhead view) in communication with the third computer system 1710a, a round table 1746a (e.g., corresponding to 1746b in the overhead view) and a fourth computer system 1723a (e.g., corresponding to 1723b in the overhead view) having a fourth display generation component 1739 that is facing the viewpoint of the user 1709. In the illustrated embodiment of FIG. 17A, a portion of the second computer system 1708a, the third computer system 1710a, and the fourth computer system 1723a are visible via in the display generation component 120. The first computer system 101 is optionally communicatively coupled to (e.g., configured to communicate with) the second computer system 1708a, the third computer system 1710a, and the fourth computer system 1723a and also, optionally communicatively coupled to the first keyboard 1712a, the mouse 1714a, and/or the second keyboard 1721a.

In some embodiments, the three-dimensional environment 1702 displayed via the display generation component 120 includes a first selectable option 1716a (e.g., corresponding to 1716b in the overhead view) that is selectable to display a representation of content from the second computer system 1308a in accordance with a determination that one or more connection criteria are satisfied. For example, in FIG. 17A, the first computer system 101 visually detects (e.g., via the one or more cameras of the first computer system 101) the second computer system 1708a, the third computer system 1710a, and the fourth computer system 1723a in the portion of the physical environment that is visible in the three-dimensional environment 1702. In some embodiments, in response to visually detecting the computer systems 1708a, 1710a, and 1723a, the first computer system 101 determines whether any of the computer systems satisfies the one or more connection criteria. In the example of FIG. 17A, the first computer system 101 determines that the second computer system 1708a satisfies the one or more connection criteria and displays the first selectable option 1716a in the three-dimensional environment 1702, as discussed in more detail below.

In some embodiments, the satisfaction of the one or more criteria is based on a wireless communication between the first computer system 101 and a respective computer system. For example, in FIG. 17A, the first computer system 101 is in communication with the second computer system 1708a (e.g., via Bluetooth, Wi-Fi, or any other suitable wireless communications means), and is not in communication with the third computer system 1710a and the fourth computer system 1723a. Accordingly, the second computer system 1708a satisfies the one or more connection criteria. In some embodiments, the satisfaction of the one or more criteria is based on detecting that a respective computer system is in a wake state. For example, in FIG. 17A, the first computer system 101 visually detects and/or detects an indication from the second computer system 1708a that the second computer system 1708a is in a wake state and/or is in an unlocked state. As shown in FIG. 17A, the second display generation component 1719 of the second computer system 1708a is active and is displaying content, such as user interface 1720, as discussed in more detail below. In FIG. 17A, the third display generation component 1729 of the third computer system 1710a is not in a wake state (e.g., is in a sleep state or a powered off state) and the fourth display generation component 1739 of the fourth computer system 1723a is also not in the wake state. Accordingly, the second computer system 1708a satisfies the one or more connection criteria. In some embodiments, the satisfaction of the one or more connection criteria is based on detecting that a respective computer system is the closest computer system of a plurality of computer systems to the first computer system 101. For example, as shown in the overhead view in FIG. 17A, the second computer system 1708b is closer to the first computer system 101 than both the third computer system 1710b and the fourth computer system 1723b. Accordingly, the second computer system 1708b satisfies the one or more connection criteria. In some embodiments, detecting that the second computer system 1708a is the closest computer system to the first computer system 101 is based on a strength of a wireless signal emitted from the second computer system 1708a. For example, the second computer system 1708a, the third computer system 1710a and the fourth computer system 1723a are all emitting wireless signals that are detectable by the first computer system 101, but the wireless signal emitted by the second computer system 1708a is the strongest of the wireless signals. Additional details regarding the one or more connection criteria are provided below with reference to method 1800.

In some embodiments, as shown in FIG. 17A, the first selectable option 1716a is displayed at a position in three-dimensional environment 1702 based on the location of the second computer system 1708a in three-dimensional environment. Further details regarding the display of the first selectable option are discussed below with reference to the method 1800. In the illustrated embodiment in FIG. 17A, the second computer system 1708a is displaying a user interface 1720 (e.g., desktop or home screen user interface), a first application window 1722, a second application window 1724 that is behind the first application window 1722, and an application launch interface 1726 (e.g., a dock) that includes selectable options 1728a-d (e.g., icons) that are selectable for initiating display of applications on the second computer system 1708a.

Figure 17B:
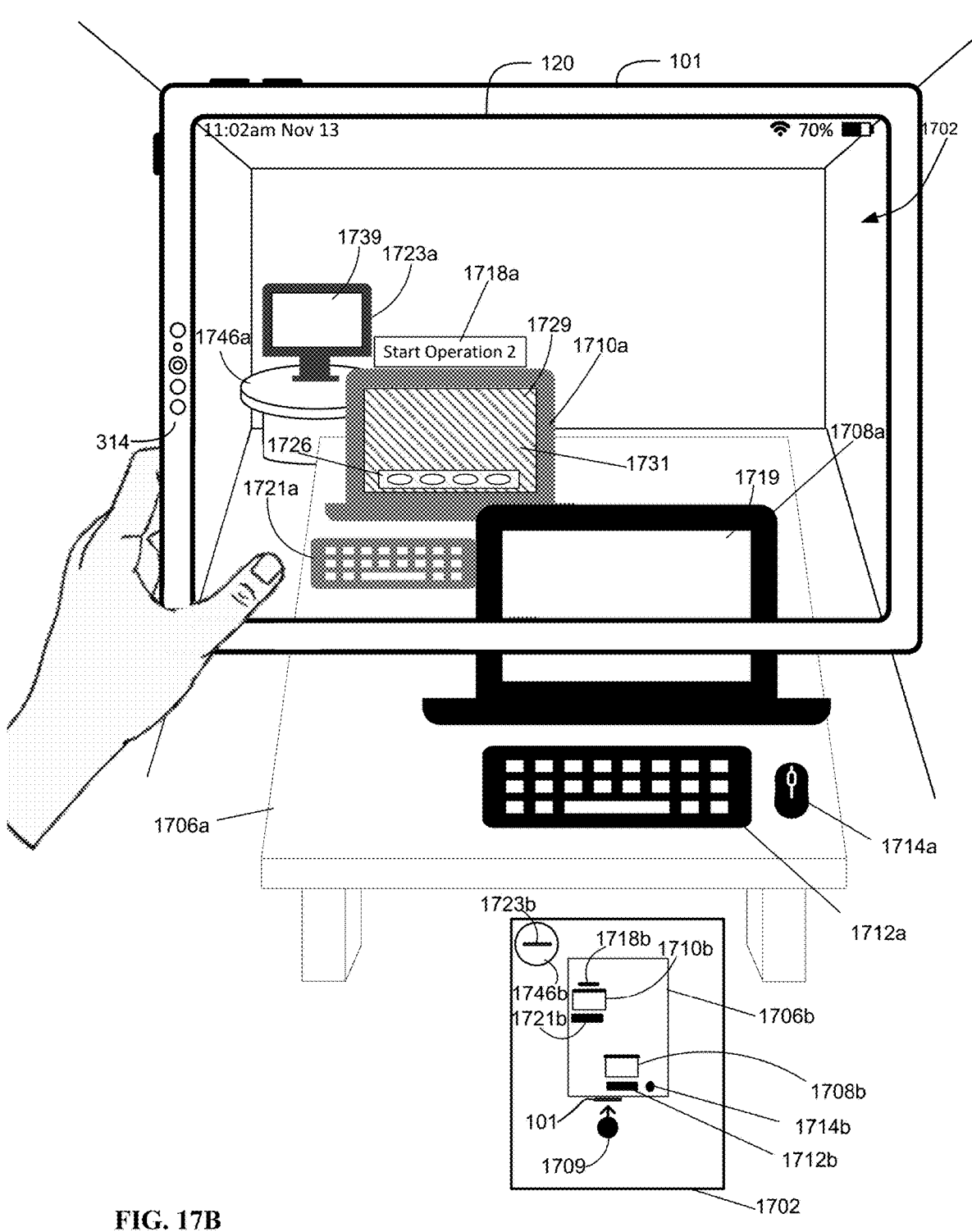

In some embodiments, in response to visually detecting the computer systems 1708a, 1710a, and 1723a as discussed above, the first computer system 101 alternatively determines that the third computer system 1710a satisfies the one or more connection criteria, without the second computer system 1708a and the fourth computer system 1723a satisfying the one or more connection criteria, as shown in FIG. 17B. For example, as shown in FIG. 17B, the first computer system 101 displays a second selectable option 1718a (e.g., corresponding to 1718b in the overhead view) that is selectable to display a representation of content from the third computer system 1710a in the three-dimensional environment 1702. Additionally, as shown in FIG. 17B, the first computer system 101 displays the second selectable option 1718a without displaying the first selectable option 1716a discussed above because the second computer system 1708a does not satisfy the one or more connection criteria (e.g., because the second computer system 1708a is not in a wake state, the second computer system 1708a is emitting a wireless signal that is weaker than that emitted by the third computer system 1710a, and/or the second computer system 1708a is not in communication with the first computer system 101). In some embodiments, the third computer system 1710a satisfies the one or more connection criteria based on any one or more of the factors discussed previously above. In some embodiments, as shown in FIG. 17B and as similarly discussed above, the second selectable option 1718a is displayed at a position in three-dimensional environment 1702 based on the location of the third computer system 1710a in three-dimensional environment.

Returning to FIG. 17A, while the first selectable option 1716a is displayed in the three-dimensional environment 1702, the first computer system 101 detects movement of the second computer system 1708a within the portion of the physical environment that is visible in the three-dimensional environment 1702. For example, in FIG. 17A, the hand 1703a of the user 1709 moves toward the second computer system 1708a and away from a body of the user 1709 and grabs/grips/picks up the second computer system 1708a for movement of the second computer system 1708a (e.g., without the first computer system 101 detecting movement of the viewpoint of the user 1709).

Figure 17C:
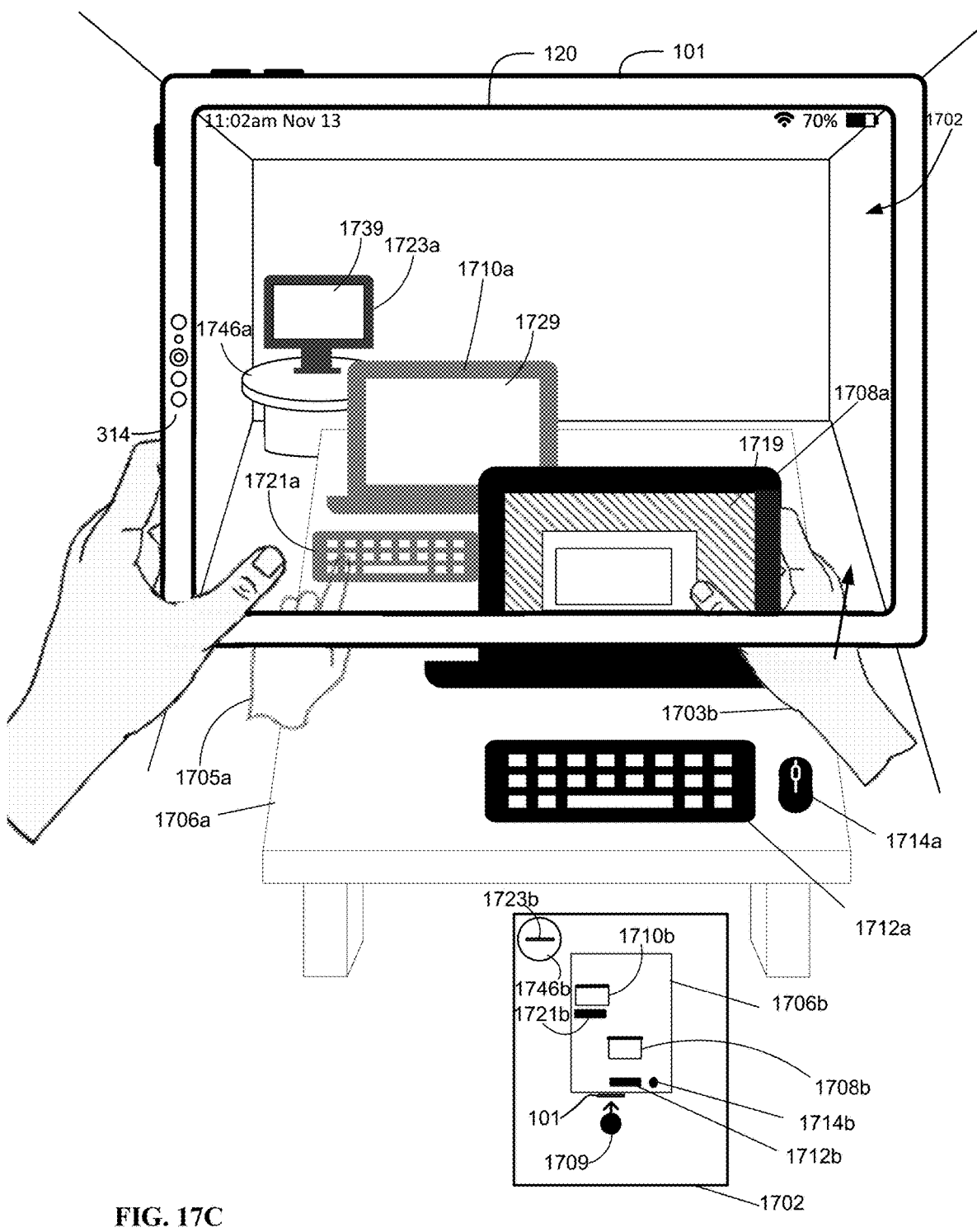

In some embodiments, as shown in FIG. 17C, while detecting the movement of the second computer system 1708a within the portion of the physical environment that is visible in the three-dimensional environment caused by the hand 1703a, the first computer system 101 ceases display of the first selectable option 1716a in the three-dimensional environment 1702. As shown in FIG. 17C, the first computer system 101 detects further movement of the second computer system 1708a caused by the movement of hand 1703b. Additionally, in FIG. 17C, the third computer system 1710a detects input provided by hand 1705a directed to the third computer system 1710a corresponding to a request to awaken and/or unlock the third computer system 1710a. For example, as shown in FIG. 17C, the third computer system 1710a detects the hand 1705a provide one or more taps or presses of one or more keys of the second keyboard 1721a that is in communication with the third computer system 1710a for awakening and/or unlocking the third computer system 1710a. In some embodiments, the first computer system 101 visually detects the hand 1705a move toward the second keyboard 1721a in the three-dimensional environment 1702. It should be understood that while multiple hands and corresponding inputs are illustrated in FIGS. 17C-17H, such hands and inputs need not be detected by first computer system 101 concurrently; rather, in some embodiments, first computer system 101 independently responds to the hands and/or inputs illustrated and described in response to detecting such hands and/or inputs independently.

Figure 17D:
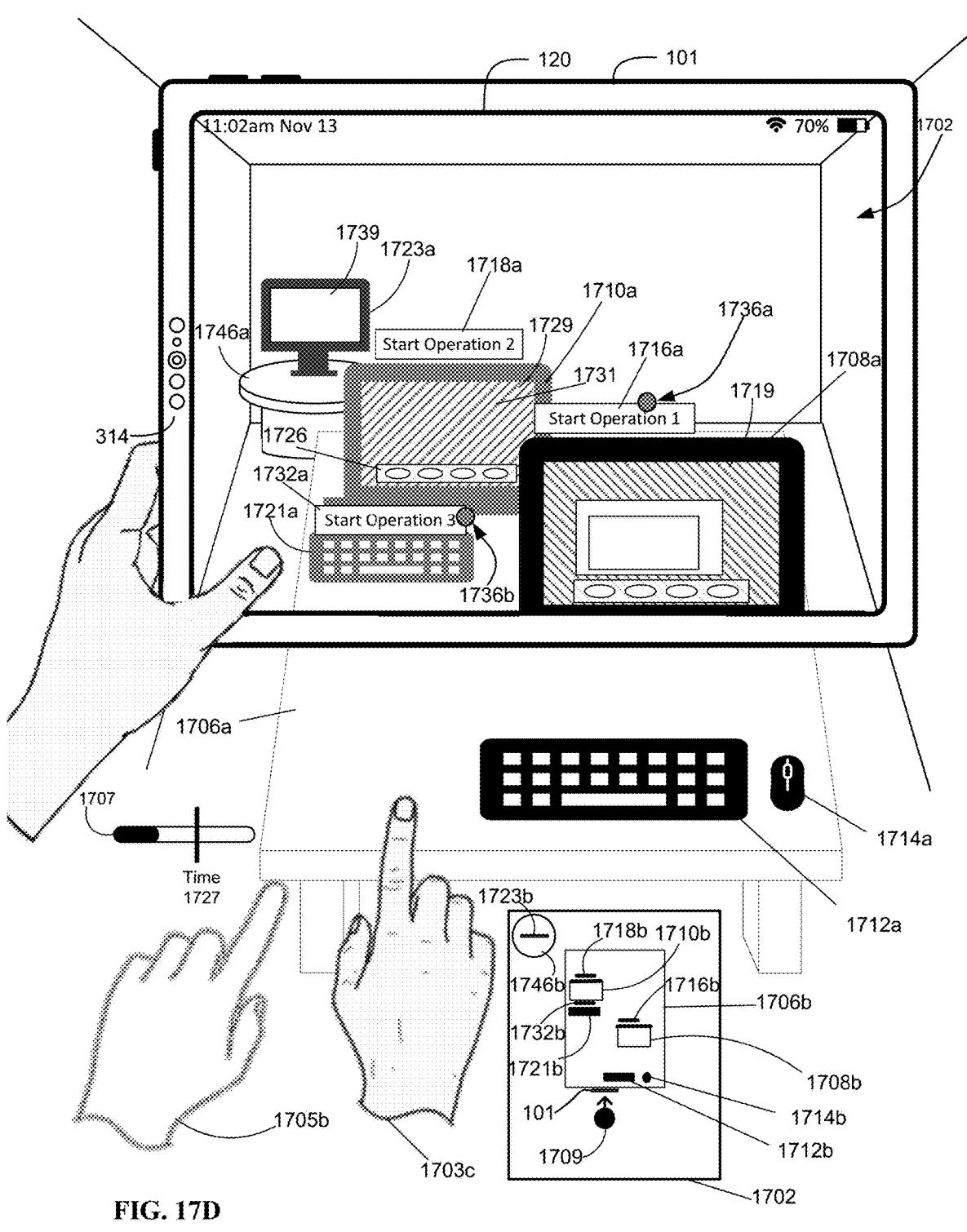

In some embodiments, as shown in FIG. 17D, after detecting an end of the movement of the second computer system 1708a within the portion of the physical environment that is visible in the three-dimensional environment 1702 (e.g., caused by a release of the second computer system 1708a by the hand 1703b), the first computer system 101 redisplays the first selectable option 1716a in the three-dimensional environment 1702. In some embodiments, as shown in FIG. 17D, when the first computer system 101 redisplays the first selectable option 1716a, the first selectable option 1716a is displayed at a different location in the three-dimensional environment 1702 relative to the second computer system 1708a than prior to the movement of the second computer system 1708a. For example, in FIG. 17A, the first selectable option 1716a is displayed at a first location that is centered above a top edge of the second computer system 1708a, and in FIG. 17D, after the movement of the second computer system 1708a, the first selectable option 1716a is displayed at a second location that is shifted leftward relative to the first location in the three-dimensional environment 1702.

Additionally, in some embodiments, as shown in FIG. 17D, in response to the third computer system 1710a detecting the hand 1705a provide input to awaken and/or unlock the third computer system 1710a, the first computer system 101 (e.g., visually) detects the third computer system 1710a in the wake and/or unlocked state. For example, the first computer system 101 visually detects the third display generation component 1729 display user interface 1731 (e.g., a desktop or home screen user interface) and/or receives an indication from the third computer system 1710a that the third computer system 1710a is in the wake and/or unlocked state, as shown in FIG. 17D.

In some embodiments, in accordance with a determination that multiple computer systems in the portion of the physical environment that is visible in the three-dimensional environment 1702 satisfy the one or more connection criteria discussed above, the first computer system 101 concurrently displays multiple selectable options that are selectable to display representations of content from the computer systems. For example, in FIG. 17D, as similarly discussed above, the first computer system 101 visually detects the second computer system 1708a, the third computer system 1710a, the second keyboard 1721a in communication with the third computer system 1710a, and the fourth computer system 1723a. In the example of FIG. 17D, the first computer system 101 does not visually detect the first keyboard 1712a and the mouse 1714a because the first keyboard 1712a and the mouse 1714a are located in a portion of the physical environment that are not visible in the three-dimensional environment 1702 (e.g., are not in the field of view of the user 1709). In some embodiments, the first computer system 101 determines that the second computer system 1708a, the third computer system 1710a, and the second keyboard 1721a satisfy the one or more connection criteria discussed above. Accordingly, as shown in FIG. 17D, in some embodiments, the first computer system 101 concurrently displays the first selectable option 1716a discussed above, the second selectable option 1718a discussed above, and a third selectable option 1732a (e.g., corresponding to 1732b in the overhead view) that is selectable to establish a connection between the first computer system 101 and the second keyboard 1721a to configure the second keyboard 1721a as an input device for the first computer system 101. In some embodiments, as similarly discussed above, the third selectable option 1732a is displayed at a position in three-dimensional environment 1702 based on the location of the second keyboard 1721a in three-dimensional environment.

In some embodiments, the first computer system 101 maintains display of the first selectable option 1716a, the second selectable option 1718a, and/or the third selectable option 1732a until the first computer system 101 detects a respective event for causing the first computer system 101 to cease display of the first selectable option 1716a, the second selectable option 1718a, and/or the third selectable option 1732a. For example, as shown in FIG. 17D, detecting the respective event includes detecting that a threshold amount of time (e.g., 0.5, 1, 1.5, 2, 3, 5, 8, 10, 15, 20, 30, or 60 seconds), represented by time 1727 in time bar 1707, has elapsed since displaying the first selectable option 1716a, the second selectable option 1718a, and/or the third selectable option 1732a. As shown in FIG. 17D, the threshold amount of time (e.g., time 1727) has not elapsed, so the first computer system 101 maintains display of the first selectable option 1716a, the second selectable option 1718a, and/or the third selectable option 1732a in the three-dimensional environment 1702. In some embodiments, detecting the respective event includes detecting input directed to the first selectable option 1716a, the second selectable option 1718a, and/or the third selectable option 1732a. For example, as discussed below, the first computer system 101 detects a selection of the first selectable option 1716a, the second selectable option 1718a, and/or the third selectable option 1732a.

In FIG. 17D, the first computer system 101 detects an input provided by hand 1703c corresponding to a selection of the first selectable option 1716a in the three-dimensional environment 1702. For example, as shown in FIG. 17D, while a gaze 1736a is directed to the first selectable option 1716a, the first computer system 101 detects the hand 1703c provide an air pinch gesture (e.g., in which an index finger and thumb of the hand of the user 1709 come together to make contact), an air tap or touch gesture, and/or a similar selection input. Additionally, in FIG. 17D, the first computer system 101 detects an input provided by hand 1705b corresponding to a selection of the third selectable option 1732a in the three-dimensional environment 1702. For example, as shown in FIG. 17D, while a gaze 1736b is directed to the third selectable option 1732a, the first computer system 101 detects the hand 1705b provide an air pinch gesture (e.g., in which an index finger and thumb of the hand of the user 1709 come together to make contact), an air tap or touch gesture, and/or a similar selection input. It should be understood that, while multiple gaze points are illustrated in FIG. 17D, such gaze points need not be detected by first computer system 101 concurrently; rather, in some embodiments, first computer system 101 independently responds to the gaze points illustrated and described in response to detecting such gaze points independently.

FIG. 17D1 illustrates similar and/or the same concepts as those shown in FIG. 17D (with many of the same reference numbers). It is understood that unless indicated below, elements shown in FIG. 17D1 that have the same reference numbers as elements shown in FIGS. 17A-17H have one or more or all of the same characteristics. FIG. 17D1 includes computer system 101, which includes (or is the same as) display generation component 120. In some embodiments, computer system 101 and display generation component 120 have one or more of the characteristics of computer system 101 shown in FIGS. 17A-17H and display generation component 120 shown in FIGS. 1 and 3, respectively, and in some embodiments, computer system 101 and display generation component 120 shown in FIGS. 17A-17H have one or more of the characteristics of computer system 101 and display generation component 120 shown in FIG. 17D1.

In FIG. 17D1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 17A-17H.

In FIG. 17D1, display generation component 120 is illustrated as displaying content that optionally corresponds to the content that is described as being displayed and/or visible via display generation component 120 with reference to FIGS. 17A-17H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 17D1.

Display generation component 120 has a field of view (e.g., a field of view captured by external image sensors 314b and 314c and/or visible to the user via display generation component 120) that corresponds to the content shown in FIG. 17D1. Because display generation component 120 is optionally a head-mounted device, the field of view of display generation component 120 is optionally the same as or similar to the field of view of the user.

In FIG. 17D1, the user is depicted as performing a pointing gesture (e.g., with hand 1703c) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 17A-17H.

In some embodiments, computer system 101 responds to user inputs as described with reference to FIG. 17H.

In the example of FIG. 17D1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 17A-17H and/or described with reference to the corresponding method(s) are optionally implemented on computer system 101 and display generation unit 120 in a manner similar or analogous to that shown in FIG. 17D1.

Figure 17E:
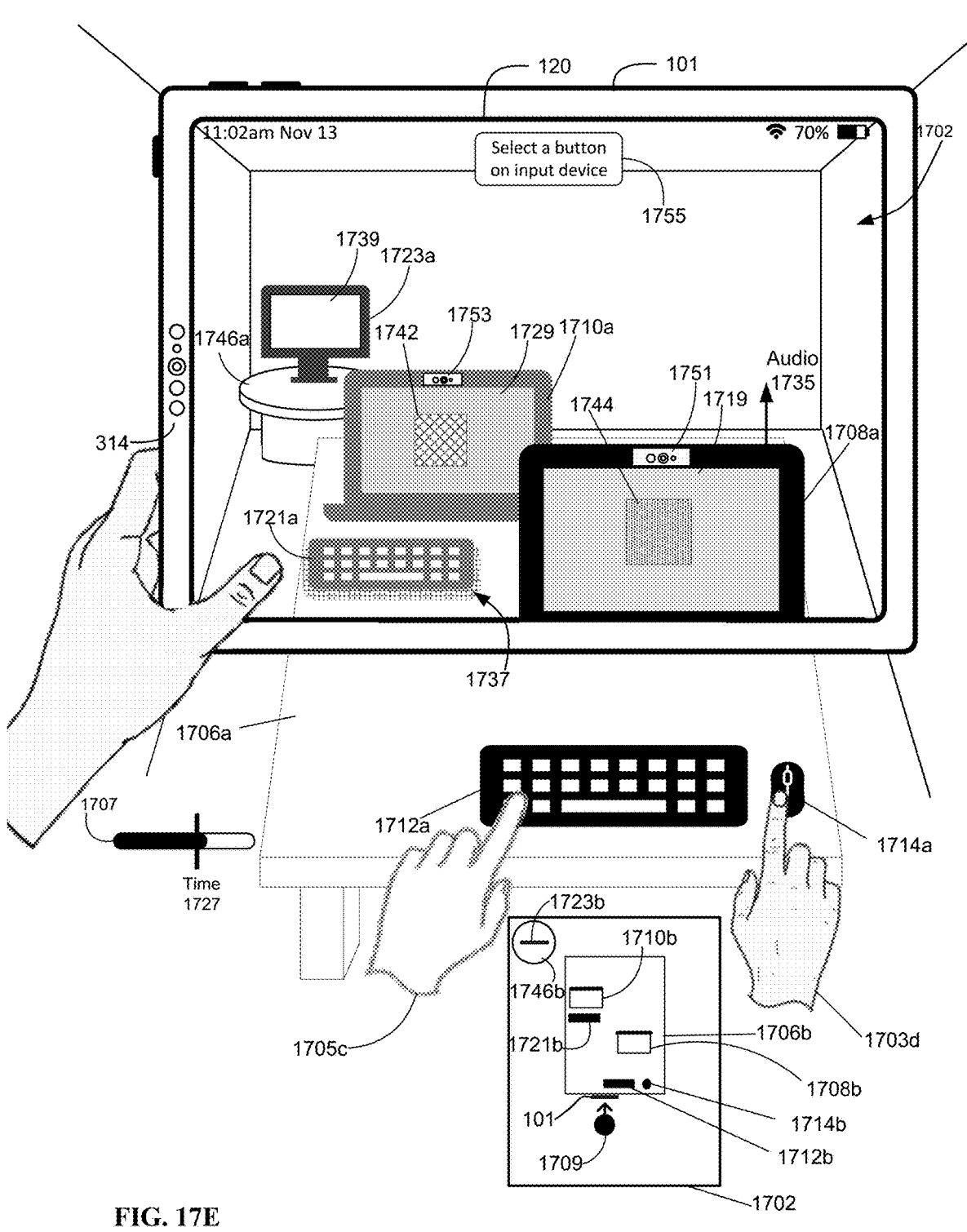

In some embodiments, as shown in FIG. 17E, in response to detecting the selection of the third selectable option 1732a, the first computer system 101 establishes a connection between the first computer system 101 and the second keyboard 1721a, such that the second keyboard 1721a is configured as an input device for the first computer system 101. In some embodiments, as shown in FIG. 17E, when the first computer system 101 establishes the connection with the second keyboard 1721a, the first computer system 101 displays an animation 1737 indicating that the connection has been established. For example, the first computer system 101 displays a highlight and/or glow effect in the three-dimensional environment 1702. In some embodiments, as shown in FIG. 17E, the animation 1737 is displayed at a position in the three-dimensional environment 1702 that is based on the location of the second keyboard 1721a in the three-dimensional environment. For example, as shown in FIG. 17E, the animation 1737 is displayed around and/or below the second keyboard 1721a such that the animation 1737 visually appears to emanate and/or originate from the second keyboard 1721a.

Additionally, in some embodiments, as shown in FIG. 17E, in response to detecting the selection of the third selectable option 1732a, the first computer system 101 ceases display of the third selectable option 1732a in the three-dimensional environment 1702. In FIG. 17E, the first computer system 101 optionally determines that the threshold amount of time discussed above, represented by the time 1727 in the time bar 1707, has elapsed since displaying the second selectable option 1718a in the three-dimensional environment 1702. Accordingly, as shown in FIG. 17E, the first computer system 101 optionally ceases display of the second selectable option 1718a in the three-dimensional environment 1702, as shown in FIG. 17E.

In some embodiments, in response to detecting the selection of the first selectable option 1716a in the three-dimensional environment 1702, as shown in FIG. 17E, the first computer system 101 determines whether the second computer system 1708a satisfies one or more disambiguation criteria. For example, the first computer system 101 determines whether the one or more disambiguation criteria are satisfied because there are multiple computer systems (e.g., the second computer system 1708a and the third computer system 1710a) that satisfy the one or more connection criteria discussed above, and satisfaction of the one or more disambiguation criteria enables the first computer system 101 to distinguish the second computer system 1708a from the third computer system 1710a and/or the fourth computer system 1723a. In some embodiments, as discussed below, in accordance with a determination that the second computer system 1708a satisfies the one or more disambiguation criteria, the first computer system 101 displays a representation of content from the second computer system 1708a.

In some embodiments, satisfaction of the one or more disambiguation criteria is based on visually detecting the second computer system 1708a with which the first selectable option 1716a is associated. For example, because the first selectable option 1716a is displayed at a location that is based on the location of the second computer system 1708a when the selection of the first selectable option 1716a is detected, first computer system 101 interprets the input as being directed to the second computer system 1708a (e.g., due to the proximity of the first selectable option 1716a to the second computer system 1708a in the three-dimensional environment 1702). In some embodiments, satisfaction of the one or more disambiguation criteria is based on detecting audio 1735 that is output by the second computer system 1708a. For example, in response to detecting the selection of the first selectable option 1716a, the first computer system 101 transmits a request to the second computer system 1708a (e.g., because the first selectable option 1716a is associated with the second computer system 1708a) for causing the second computer system 1708a to output the audio 1735 (e.g., audio that is, optionally, not audible to the user 1709 because it is at a frequency that is outside of the range of human hearing) that is detectable by the first computer system 101. In some embodiments, satisfaction of the one or more disambiguation criteria is based on detecting light and/or a pattern of light emitted by a light source of the second computer system 1708a. For example, as shown in FIG. 17E, the second computer system 1708a includes a first set of light sources 1751 and the third computer system 1710a includes a second set of light sources 1753. In some embodiments, the first computer system 101 transmits a request to the second computer system 1708a (e.g., because the first selectable option 1716a is associated with the second computer system 1708a) for causing the second computer system 1708a to emit, via the first set of light sources, light (e.g., light that is not visible to the user 1709, such as infrared light, emitted by an infrared light source) and/or a pattern of light (e.g., a pattern of light flashes emitted by a light source such as an LED) that is detectable by the first computer system 101.

Additionally, in some embodiments, satisfaction of the one or more disambiguation criteria is based on (e.g., visually) detecting unique content that is displayed (e.g., via the second display generation component 1719) by the second computer system 1708a. For example, as shown in FIG. 17E, the second computer system 1708a is displaying a first image 1744 that is visually detectable by the first computer system 101 that enables the first computer system 101 to distinguish the first computer system 101 from other computer systems in the physical environment. As an example, as shown in FIG. 17E, the third computer system 1710a is also displaying unique content, such as second image 1742, that is detectable by the first computer system 101. In some embodiments, the second computer system 1708a and the third computer system 1710a display the first image 1744 and the second image 1742, respectively, in response to receiving image data from the first computer system 101 for displaying the first image 1744 and the second image 1742. In some embodiments, the fourth computer system 1723a is not displaying unique content in a similar fashion because the fourth computer system 1723a does not satisfy the one or more connection criteria discussed previously above. In some embodiments, while the first image 1744 and the second image 1742 are concurrently displayed, the first computer system 101 visually detects the first image 1744 and the second image 1742 and determines that the first image 1744 is displayed by the second computer system 1708a (e.g., based on the unique image data transmitted to the second computer system 1708a), which enables the first computer system 101 to distinguish the second computer system 1708a from the third computer system 1710a. In some embodiments, satisfaction of the one or more disambiguation criteria is based on detecting user input that is directed to and/or that is detectable by the second computer system 1708a. For example, as shown in FIG. 17E, the first computer system 101 displays prompt 1755 in the three-dimensional environment 1702 that instructs the user 1709 to provide input (e.g., such as via selection of a button) on an input device of the computer system for which the user desires the representation of the content to be displayed in the three-dimensional environment 1702. As shown in FIG. 17E, the second computer system 1708a detects hand 1703d provide a selection of a button on the mouse 1714a that is in communication with the second computer system 1708a and/or detects hand 1705c provide a selection of a key of the first keyboard 1712a that is in communication with the second computer system 1708a. In some embodiments, when the second computer system 1708a detects the input provided by the hand 1705c and/or the hand 1703d, the second computer system 1708a transmits an indication to the first computer system 101 that the input has been detected.

Figure 17F:
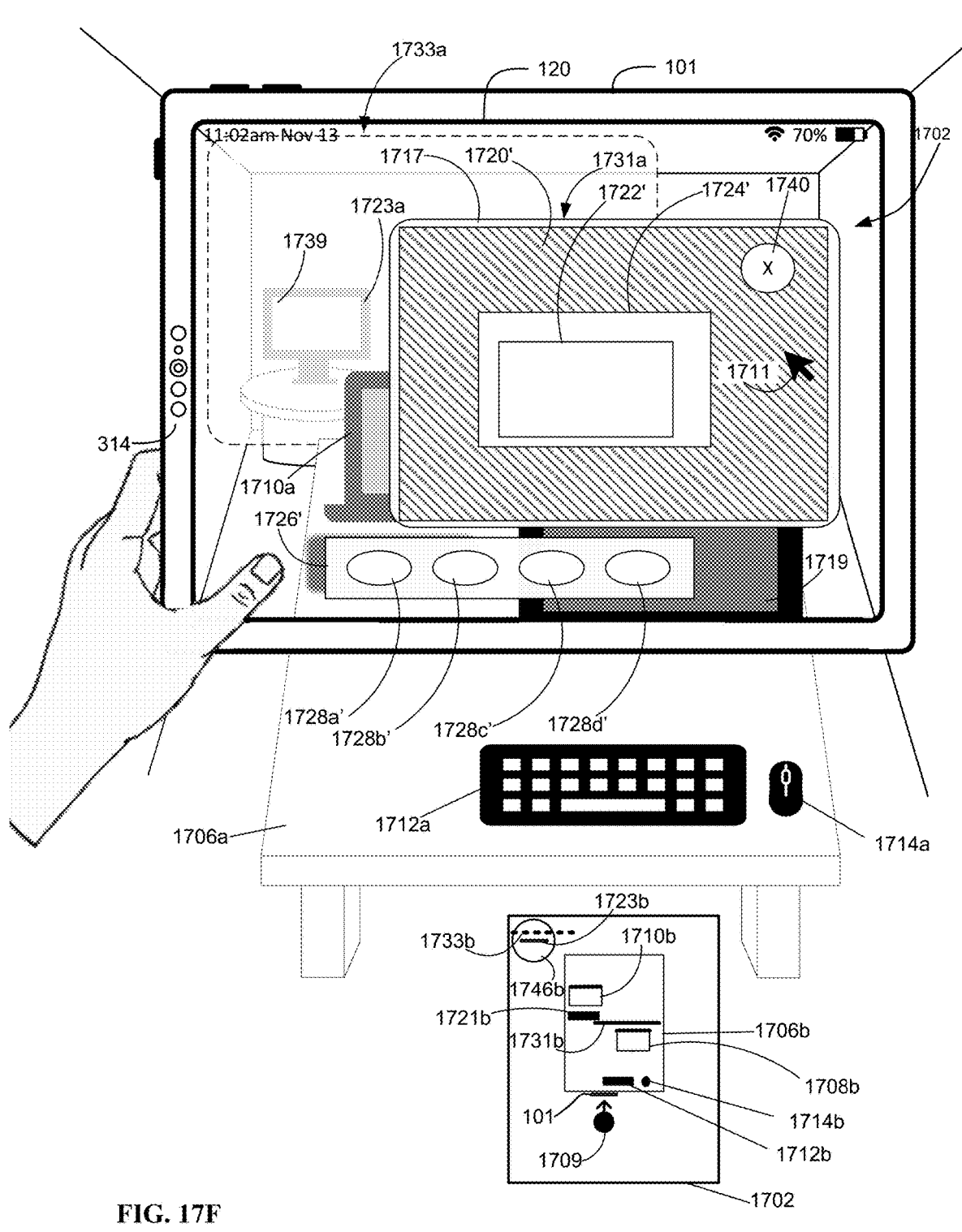

In some embodiments, as shown in FIG. 17F, in accordance with the determination that the second computer system 1708a satisfies the one or more disambiguation criteria, without the third computer system 1710a and the fourth computer system 1723a satisfying the one or more disambiguation criteria, the first computer system 101 displays a representation of content from the second computer system 1708a in the three-dimensional environment 1702. For example, the first computer system 101 initiates a virtual experience of the second computer system 1708a, as shown in FIG. 17F. In FIG. 17F, the first computer system 101 is displaying representation 1717 (e.g., within virtual object 1731a (e.g., corresponding to 1731b in the overhead view)) of content that was displayed by the second computer system 1708a when the input(s) in FIG. 17D were detected.

For example, representation 1717 includes representation of the user interface 1720' (corresponding to the user interface 1720), application window 1722' (corresponding to application window 1722), application window 1724' (corresponding to application window 1724) behind application window 1722', option 1740 that is selectable to cease display of the virtual object 1731*a*, and a virtual cursor 1711. The content of representation 1717 is optionally interactable via input detected by the first computer system 101. Further, in FIG. 17F, the second computer system 1708*a* has ceased display of the content via its display generation component 1719. In some embodiments, as shown in the overhead view in FIG. 17F, the first computer system 101 displays the virtual object 1731*b* that includes the representation 1717 at a position in the three-dimensional environment 1702 that is behind the second display generation component 1719 of the second computer system 1708*b*, with the representation 1717 at least partially obscuring (e.g., visible in front of (e.g., overlapping and/or closer to the viewpoint of user 1709)) the second display generation component 1719 of the second computer system 1708*a*. In some embodiments, the first computer system 101 displays representation 1717 at a default distance (e.g., 0.5, 1, 3, 5, 10, 15 or 20 meters) from the second display generation component 1719 of the second computer system 1708*a* from the viewpoint of user 1709.

In some embodiments, as shown in FIG. 17F, the first computer system 101 is also displaying, as a separate object from the virtual object 1731*a* that includes the representation 1717, object 1726' (corresponding to dock 1726) in three-dimensional environment 1702. In some embodiments, the object 1726' includes selectable options 1728*a*'-1728*d*' (corresponding to options 1728*a*-1728*d*). In some embodiments, representation 1717 and object 1726' are separately moveable in three-dimensional environment 1702.

In some embodiments, referring back to FIG. 17D, if the fourth computer system 1723*a* satisfies the one or more connection criteria discussed above, the first computer system 101 would display a fourth selectable option (e.g., similar to the first selectable option 1716*a* and the second selectable option 1718*a*) that is selectable to display a representation of content from the fourth computer system 1723*a*. In some embodiments, while displaying the fourth selectable option in the three-dimensional environment 1702, if the first computer system 101 detects a selection of the fourth selectable option (e.g., such as via an input provided by a hand of the user, similar to the input provided by the hand 1703*c* in FIG. 17D), the first computer system 101 would determine whether the fourth computer system 1723*a* satisfies the one or more disambiguation criteria discussed previously above. In some embodiments, in accordance with a determination that the fourth computer system 1723*a* satisfies the one or more disambiguation criteria in any one or combination of the ways discussed above, the first computer system 101 would display a representation of content from the fourth computer system 1723*a* in a similar fashion as the representation 1717 discussed above with reference to FIG. 17F. For example, as shown in FIG. 17F, the first computer system 101 would display virtual object 1733*a* (e.g., corresponding to 1733*b* in the overhead view) including the representation of content from the fourth computer system 1723*a* in the three-dimensional environment 1702. In some embodiments, as shown in the overhead view in FIG. 17F, the first computer system 101 would display the virtual object 1733*b* at a position in the three-dimensional environment 1702 that is behind the fourth display generation component 1739 of the fourth computer system 1723*b*, with the virtual object 1733*a* obscuring (e.g., visible in front of (e.g., overlapping and/or closer to the viewpoint of user 1709)) the fourth display generation component 1739 of the fourth computer system 1723*a*. In some embodiments, the first computer system 101 displays the virtual object 1733*a* at a default distance (e.g., 0.5, 1, 3, 5, 10, 15 or 20 meters) from the fourth display generation component 1739 of the fourth computer system 1723*a* from the viewpoint of user 1709.

Figure 17G:
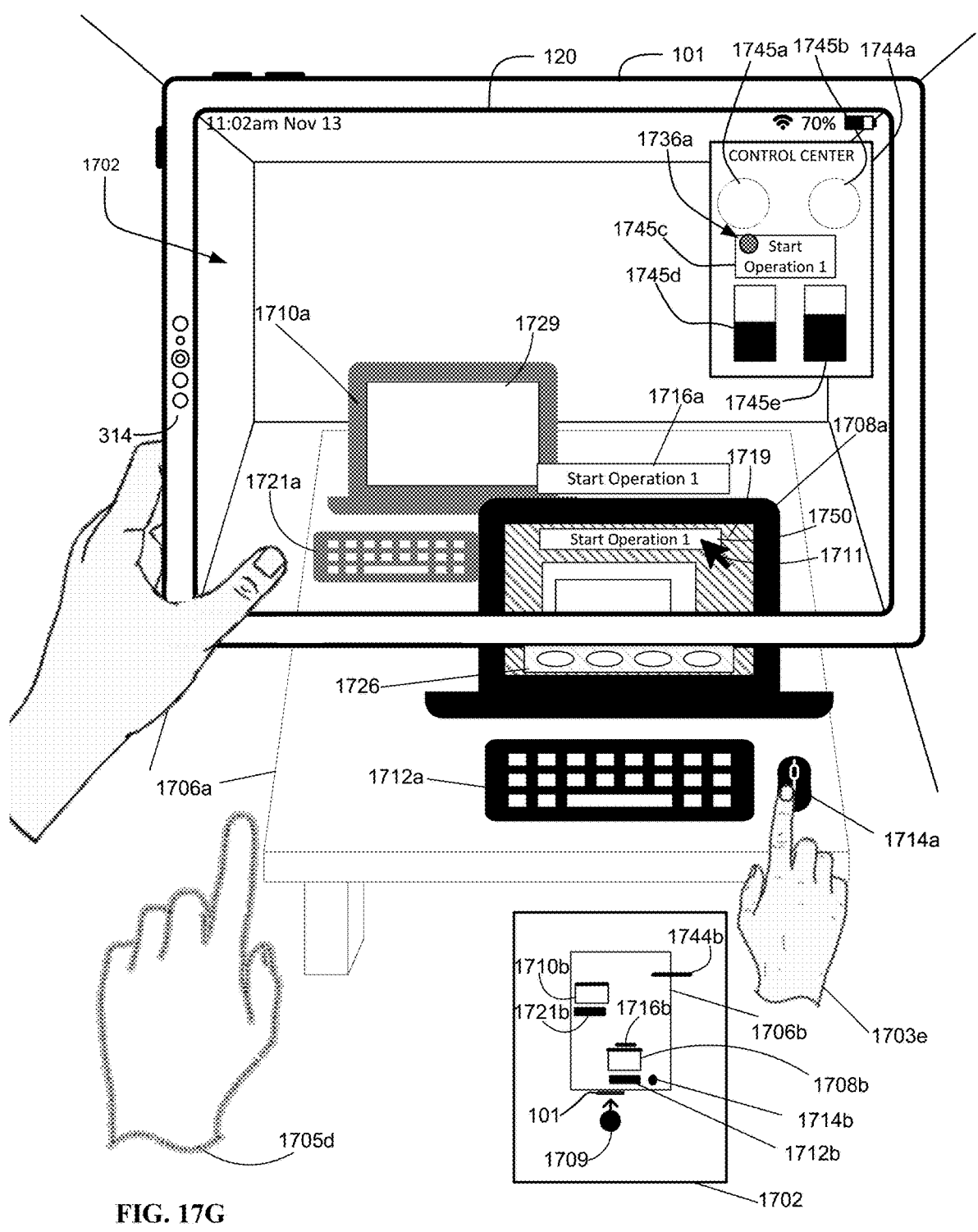

In some embodiments, the first computer system 101 displays the representation 1717 based on the viewpoint of the user 1709, rather than based on the location of the second display generation component 1719, in the three-dimensional environment 1702 in accordance with a determination that input for displaying the representation 1717 is detected as being directed to a system user interface. For example, as shown in FIG. 17G, the first computer system 101 is displaying a system user interface 1744*a* (e.g., corresponding to 1744*b* in the overhead view) of the first computer system 101 (e.g., a control center user interface and/or a first user interface of the control user interface of the first computer system 101) in the three-dimensional environment 1702. In some embodiments, the system user interface 1744*a* includes a plurality of user interface objects 1745*a*-*e* that are selectable to initiate control of one or more parameters of the display of the three-dimensional environment 1702 and/or to cause the first computer system 101 to perform a respective operation in the three-dimensional environment 1702. For example, the one or more user interface objects 1745*a*-*e* enable control of a brightness level of the three-dimensional environment 1702, a level of audio of content being displayed in the three-dimensional environment 1702, a Wi-Fi and/or a Bluetooth setting, and/or display of a representation of content from a respective computer system. As an example, in FIG. 17G, the system user interface 1744*a* includes user interface object 1745*c* that is selectable to display a representation of content from the second computer system 1708*a* (e.g., because the second computer system 1708*a* satisfies the one or more connection criteria discussed above, as indicated by the display of the first selectable option 1716*a* described previously above).

Additionally, as shown in FIG. 17G, the second computer system 1708*a* is optionally displaying selectable option 1750 on the second display generation component 1719. In some embodiments, the selectable option 1750 is displayed in a region of the second display generation component 1719 that is associated with a system user interface (e.g., a control center user interface) of the second computer system 1708*a*. In some embodiments, the selectable option 1750 is selectable to cause the first computer system 101 to display a representation of content from the second computer system 1708*a* (e.g., because the second computer system 1708*a* satisfies the one or more connection criteria as similarly discussed above).

In FIG. 17G, the first computer system 101 detects an input provided by hand 1705*d* corresponding to a selection of the user interface object 1745*c* in the system user interface 1744*a* in the three-dimensional environment 1702. For example, as shown in FIG. 17G, the first computer system 101 detects the hand 1705*d* provide an air pinch gesture or similar selection input while the gaze 1736*a* is directed to the user interface object 1745*c*. Additionally, in FIG. 17G, the second computer system 1708*a* detect a selection of the selectable option 1750. For example, as shown in FIG. 17G, the second computer system 1708*a* detects a press or click of a button on the mouse 1714*a* provided by hand 1703*e* while cursor 1711 is positioned over the selectable option 1750. In some embodiments, when the second computer system 1708*a* detects the selection of the selectable option 1750, the second computer system 1708*a* transmits an indication to the first computer system 101 of a request to display the representation of content from the second computer system 1708*a*.

Figure 17H:
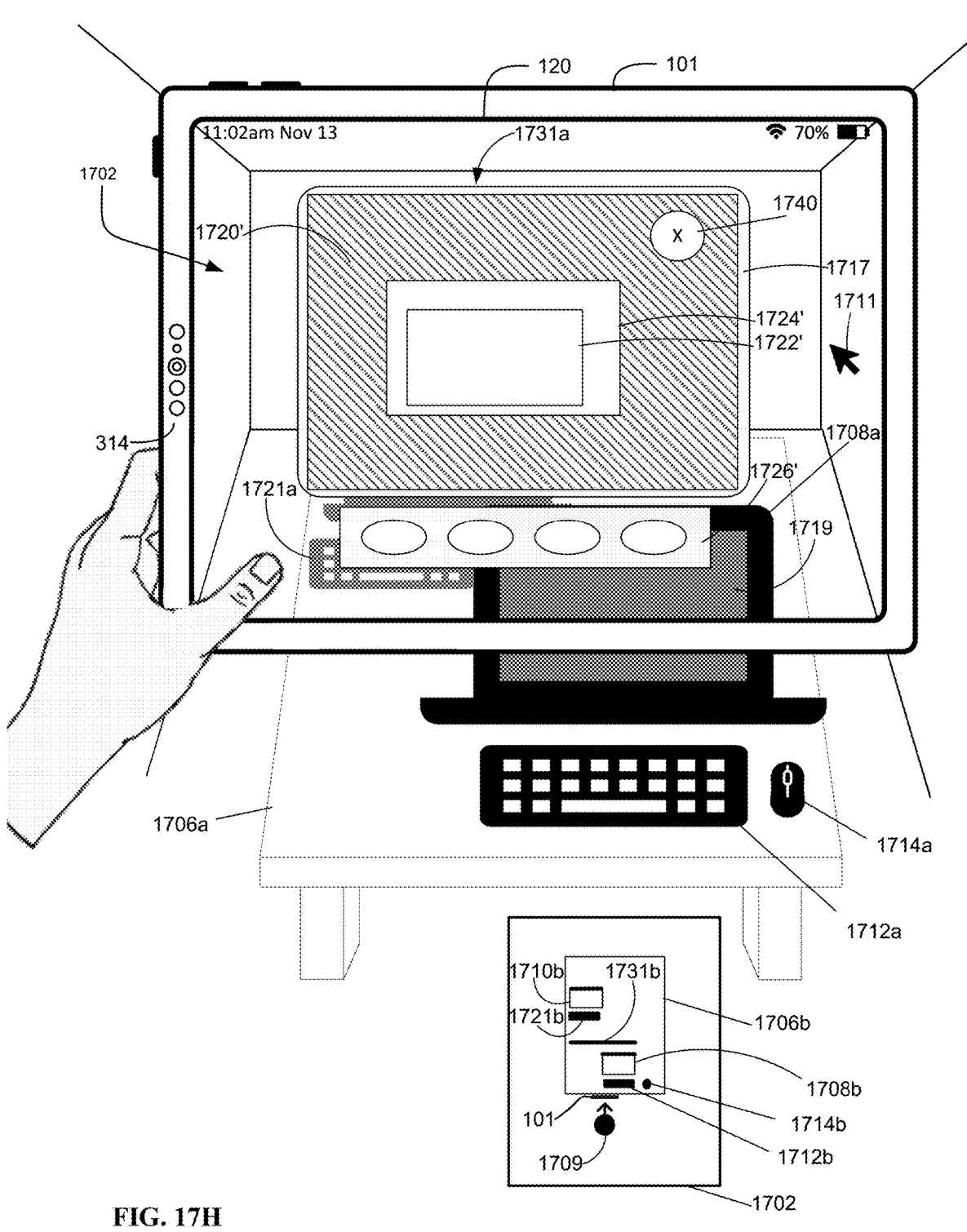

In some embodiments, as shown in FIG. 17H, in response to detecting the selection of the user interface object 1745*c* and/or in response to detecting an indication of the selection of the selectable option 1750 from the second computer system 1708*a*, the first computer system 101 displays the virtual object 1731*a* that includes the representation 1717 discussed previously above with reference to FIG. 17F. In some embodiments, as shown in FIG. 17H, because the input for causing the display of the virtual object 1731*a* was detected as being directed to a system user interface as discussed above (e.g., via the system user interface 1744*a* and/or the selectable option 1750), the first computer system 101 displays the virtual object 1731*a* at a location in the three-dimensional environment 1702 that is based on the viewpoint of the user 1709, rather than based on the second display generation component 1719 of the second computer system 1708*a*. For example, as shown in the overhead view in FIG. 17H, the first computer system 101 displays the virtual object 1731*b* at a location that is at a center of the field of view of the three-dimensional environment 1702 from the viewpoint of the user 1709.

FIG. 18 is a flowchart illustrating a method 1800 of facilitating disambiguation of a second computer system from a plurality of computer systems for display of a representation of content from the second computer system in a three-dimensional environment in accordance with some embodiments. In some embodiments, the method 1800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1800 are, optionally, combined and/or the order of some operations is, optionally, changed.

In some embodiments, method 1800 is performed at a first computer system in communication with a display generation component, one or more input devices and one or more cameras. In some embodiments, the computer system has one or more of the characteristics of the computer systems of the methods 800, 1000, 1200, 1400, 1600, and/or 1900. In some embodiments, the display generation component has one or more of the characteristics of the display generation components of the methods 800, 1000, 1200, 1400, 1600, and/or 1900. In some embodiments, the one or more input devices has one or more of the characteristics of the one or more input devices of the methods 800, 1000, 1200, 1400, 1600, and/or 1900. In some embodiments, the one or more cameras are configured to capture images of a portion of a physical environment of a user of the first computer system (e.g., the physical environment surrounding the display generation component) for generating/reproducing a representation of the portion of the physical environment, as discussed below.

In some embodiments, the first computer system visually detects (1802*a*), via the one or more cameras, a second computer system, such as second computer system 1708*a* in FIG. 17A, in a physical environment that corresponds to a three-dimensional environment (e.g., three-dimensional environment 1702) that is visible via the display generation component (e.g., the three-dimensional environment optionally has one or more of the characteristics of the three-dimensional environments described in methods 800, 1000, 1200, 1400, 1600, and/or 1900). In some embodiments, a representation of the second computer system is visible in a viewport (as defined herein) of the three-dimensional environment that is visible from the viewpoint of a user of the computer system. In some embodiments, the physical environment is visible via the display generation component as an image view/stream or a computer-generated representation of the portion of the physical environment via optical (e.g., passive) passthrough of the physical environment. In some embodiments, the second computer system is a mobile device (e.g., a tablet, a smartphone, a media player, or a wearable device), or a computer or other electronic device. In some embodiments, the second computer system has one or more of the characteristics of the first computer system. The second computer system is optionally in communication with a second display generation component that displays one or more (e.g., virtual) objects via the second display generation component. One or more objects displayed via the second display generation component are optionally visible via the display generation component that is in communication with the first computer system (e.g., via virtual (e.g., active) or optical (e.g., passive) passthrough). The second display generation component optionally has similar or different characteristics from the above-described characteristics of the display generation component of the first computer system. Additionally, in some embodiments, the second computer system is in communication with second one or more input devices that have similar or different characteristics from the above-described characteristics of the one or more input devices of the first computer system. In some embodiments, the second computer system has one or more characteristics of the second computer system in methods 1400 and/or 1600. In some embodiments, the display generation component of the first computer system includes a transparent portion such that the second computer system is visible via the display generation component by virtue of passive passthrough of the second computer system, as similarly described above with reference to method 1600. Alternatively, in some embodiments, the display generation component of the first computer system performs active passthrough, such that the second computer system is visible in the three-dimensional environment via display of captured images of the physical environment, as similarly described above with reference to methods 1400 and/or 1600. In some embodiments, the first computer system visually detects the existence of the second computer system using an image recognition technique to detect the second computer system in one or more images captured by the one or more cameras of the first computer system. In some embodiments, the first computer system detects the second computer system via any suitable wired or wireless detection method, such as via Bluetooth, Wi-Fi, another Communication Protocol, and/or USB-C. In some embodiments, visually detecting the second computer system has one or more characteristics of detecting the second computer system as described in methods 1400 and/or 1600.

In some embodiments, in response to visually detecting the second computer system (1802*b*), in accordance with a determination that the second computer system satisfies one or more connection criteria, the first computer system displays (1802*c*), in the three-dimensional environment, a first selectable option (e.g., first selectable option 1716*a* in FIG. 17A) that is selectable to initiate a process to establish a connection between the first computer system and the second computer system. In some embodiments, the one or more connection criteria include a criterion that is satisfied if the second computer system is in communication with the first computer system (e.g., via any suitable wired or wireless communication means, such as those discussed above). In some embodiments, the one or more connection criteria include a criterion that is satisfied if the first computer system and the second computer system are both associated with the same user (e.g., the user of the first computer system). For example, the first computer system and the second computer system are associated with the same user (or same user account) due to a same user credential, account, and/or profile associated with the user being signed into the first computer system and the second computer system. Accordingly, in some embodiments, the one or more connection criteria are not satisfied if the second computer system is not logged into and/or configured with the same user credential as the first computer system, as similarly described above with reference to method 1600. In some embodiments, the one or more connection criteria include a criterion that is satisfied if the second display generation component of the second computer system is active (e.g., on/awake). For example, the one or more connection criteria are satisfied if the second computer system is displaying a user interface (e.g., a lock screen user interface, a home screen user interface, or other user interface including content (e.g., a user interface of an application running on the second computer system, such as a web-browsing user interface, a media player user interface, a note-taking user interface, among other possibilities)). Similarly, in some embodiments, the one or more connection criteria include a criterion that is satisfied if the second computer system is in an unlocked state, rather than just awake. For example, the one or more connection criteria are satisfied if the second computer system is displaying a user interface other than the lock screen user interface of the second computer system. In some embodiments, the one or more connection criteria include a criterion that is satisfied if the second computer system is a computer system that is closest to a viewpoint of the user of the first computer system in the field of view of the three-dimensional environment. For example, if a plurality of computer systems, including the second computer system, is visible in the field of view of the three-dimensional environment, the second computer system satisfies the one or more connection criteria if the second computer system is located at a location that is smallest (e.g., in distance) of a plurality of locations of the plurality of computer systems from the viewpoint of the user of the first computer system. In some embodiments, the second computer system satisfies the one or more connection criteria if the second computer system has a strongest communication strength (e.g., wireless signal strength or wired communication) of the plurality of computer systems relative to the first computer system (e.g., irrespective of whether the second computer system is physically the closest computer system to the viewpoint of the user of the first computer system). In some embodiments, the one or more connection criteria include a criterion that is satisfied if the first computer system has not detected a respective event for ceasing display of the first selectable option. For example, the first computer system displays the first selectable option in the three-dimensional environment in response to visually detecting the second computer system and continues to display the first selectable option until the first computer system detects user input (e.g., directed to the first selectable option (e.g., selecting the first selectable option) and/or directed to the second computer system (e.g., moving the second computer system)) and/or a threshold amount of time (e.g., 0.5, 1, 3, 5, 8, 10, 15, 20, 30, 45, 60, 90, 120, 240, and/or 300 minutes) elapses since (e.g., initially) displaying the first selectable option in the three-dimensional environment. In some embodiments, the computer system displays the first selectable option that is selectable to initiate the process to establish the connection between the first computer system and the second computer system in response to any one or a combination of the one or more connection criteria described above being satisfied. Additionally, in some embodiments, the one or more connection criteria include any one of the connection requirements discussed with reference to methods 1400, 1600, and/or 1900. In some embodiments, as discussed in more detail below, if multiple computer systems that are in the field of view of the three-dimensional environment, including the second computer system, satisfy the one or more connection criteria discussed above, the first computer system concurrently displays multiple selectable options that are individually selectable to initiate a process to establish a connection between the first computer system and the multiple computer systems.

In some embodiments, the first computer system displays the first selectable option at a location in the three-dimensional environment that is near or proximate to the second computer system. For example, the first computer system displays the first selectable option above the second computer system (e.g., anchored to a top edge or surface of the second computer system), to a side of the second computer system, below the second computer system, and/or in front of the second computer system from the viewpoint of the user of the first computer system. In some embodiments, the first selectable option remains displayed with the second computer system as long as the second computer system remains stationary in the field of view of the three-dimensional environment. For example, if the first computer system detects a change in position of the second computer system (e.g., caused by input provided by the user to physically move the second computer system), the first computer system ceases displaying the first selectable option in the three-dimensional environment (but optionally redisplays the first selectable option after the movement of the second computer system terminates and the second computer system still satisfies the one or more connection criteria).

In some embodiments, initiating a process to establish a connection between the first computer system and the second computer system includes initiating a process to display a representation of content from the second computer system. For example, if the first computer system detects a selection of the first selectable option, the first computer system displays a user interface object associated with the second computer system, such as a virtual instance of the second computer system and/or a virtual computer experience of the second computer system, in the three-dimensional environment. In some embodiments, the representation of content from the second computer system has one or more characteristics of the representations described with reference to methods 1400 and/or 1600. In some embodiments, the representation of content from the second computer system is configured to be interactive in the three-dimensional environment, such as via the interactions described above with reference to methods 1400 and/or 1600. In some embodiments, initiating the process to establish the connection between the first computer system and the second computer system includes transferring/transmitting data (e.g., content, virtual content, and/or a virtual computer instance) between the second computer system and the first computer system (e.g., for generating and displaying the representation of content from the second computer system discussed above). In some embodiments, initiating the process to establish the connection between the first computer system and the second computer system includes prompting the user of the first computer system to provide a disambiguation input for disambiguating the second computer system from other computer systems in the field of view of the three-dimensional environment before displaying the representation of content discussed above. For example, as described in more detail below, the first computer system displays an alert (e.g., a notification) or other user interface object in the three-dimensional environment requesting the user of the first computer system to provide (e.g., physical) input directed to the second computer system (e.g., via the second one or more input devices of the second computer system).

In some embodiments, in accordance with a determination that the second computer system does not satisfy the one or more connection criteria (e.g., described above), the first computer system forgoes (1802*d*) displaying the first selectable option in the three-dimensional environment, such as forgoing displaying a selectable option with third computer system 1710*a* as shown in FIG. 17A. In some embodiments, the first computer system alternatively displays a selectable option that is selectable to initiate a process to establish a connection between the first computer system and a third computer system, different from the second computer system. For example, the third computer system satisfies the one or more connection criteria discussed above, rather than the second computer system, and so the first computer system displays the selectable option for the third computer system rather than for the second computer system in the three-dimensional environment. Displaying, at a first computer system, a first selectable option that is selectable to establish a connection between the first computer system and a second computer system if the second computer system satisfies one or more connection criteria facilitates discovery that the second computer system is configurable to be connected to the first computer system for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, satisfaction of the one or more connection criteria is based on a wireless connection between the first computer system and the second computer system (e.g., as similarly discussed above with reference to step(s) 1802), such as a Bluetooth connection between the first computer system 101 and the second computer system 1708*a* in FIG. 17A. In some embodiments, the first computer system detects the second computer system via any suitable wireless detection method, such as via Bluetooth, Wi-Fi, and/or another Communication Protocol. In some embodiments, in accordance with a determination that the first computer system is not in communication with and/or is not configured to communicate with the second computer system via the wireless connection, the second computer system does not satisfy the one or more connection criteria. For example, the first computer system forgoes displaying the first selectable option described above with reference to step(s) 1802 in the three-dimensional environment. Displaying, at a first computer system, a first selectable option that is selectable to establish a connection between the first computer system and a second computer system if the second computer system satisfies one or more connection criteria based on a wireless connection between the computer systems facilitates discovery that the second computer system is configurable to be connected to the first computer system for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, satisfaction of the one or more connection criteria is in accordance with a determination that the first computer system and the second computer system are associated with a same user account (e.g., as similarly discussed above with reference to step(s) 1802), as similarly described with reference to FIG. 17A. In some embodiments, the first computer system and the second computer system are associated with the same user account in accordance with a determination that the first computer system and the second computer system belong to and/or are operated by a same user or a same group of users. In some embodiments, the first computer system and the second computer system are associated with the same user account in accordance with a determination that the user is logged into the first computer system and the second computer system using the same user account. In some embodiments, the same user account is a shared account (e.g., which the first computer system and the second computer system are optionally registered with). For example, a user who is operating and/or interacting with the first computer system has access to one or more aspects of user(s) (e.g., the user of the first computer system and/or additional users sharing the same user account) associated with the second computer system, such as content purchases and/or downloads (e.g., movie, book, music, and/or television show purchases and/or downloads). In some embodiments, in accordance with a determination that the first computer system is not associated with the same user account as the second computer system, the second computer system does not satisfy the one or more connection criteria. For example, the first computer system forgoes displaying the first selectable option described above with reference to step(s) 1802 in the three-dimensional environment. Displaying, at a first computer system, a first selectable option that is selectable to establish a connection between the first computer system and a second computer system if the second computer system satisfies one or more connection criteria based on a the computer systems being associated with the same user account facilitates discovery that the second computer system is configurable to be connected to the first computer system for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, satisfaction of the one or more connection criteria is in accordance with a determination that the second computer system is in a wake state (e.g., as similarly discussed above with reference to step(s) 1802), such as the second computer system 1708a being in the wake state as discussed with reference to FIG. 17A. In some embodiments, the second computer system is in the wake state if a second display generation component, different from the display generation component, of the second computer system is displaying content, such as a user interface. For example, the second display generation component is powered on and is actively displaying a lock screen user interface of the second computer system, a home screen (and/or desktop) user interface of the second computer system, and/or a user interface of an application that is running on the second computer system (e.g., a web-browsing user interface, a messaging user interface, a media player user interface, a note-taking user interface, and/or a playback user interface). In some embodiments, the second computer system is in the wake state if the second computer system is powered on (e.g., irrespective of whether the second display generation component is actively displaying content). In some embodiments, in accordance with a determination that the second computer system is not in the wake state discussed above, the second computer system does not satisfy the one or more connection criteria. For example, the first computer system forgoes displaying the first selectable option described above with reference to step(s) 1802 in the three-dimensional environment. Displaying, at a first computer system, a first selectable option that is selectable to establish a connection between the first computer system and a second computer system if the second computer system satisfies one or more connection criteria based on whether the second computer system is in a wake state facilitates discovery that the second computer system is configurable to be connected to the first computer system for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, satisfaction of the one or more connection criteria is in accordance with a determination that the second computer system is in an unlocked state (e.g., as similarly discussed above with reference to step(s) 1802), such as the second computer system 1708a being in the unlocked state as described with reference to FIG. 17A. In some embodiments, the second computer system is in the unlocked state if a second display generation component, different from the display generation component, of the second computer system is displaying content, such as a user interface. For example, the second display generation component is powered on and is actively displaying a user interface that is different from a lock screen user interface of the second computer system, such as a home screen (and/or desktop) user interface of the second computer system and/or a user interface of an application that is running on the second computer system (e.g., a web-browsing user interface, a messaging user interface, a media player user interface, a note-taking user interface, and/or a playback user interface). In some embodiments, the second computer system is not in the unlocked state if the second computer system is not powered on or is powered on but is in a sleep state or low power mode (e.g., in which the second display generation component is not actively displaying content). In some embodiments, the second computer system is in the unlocked state if the second computer system has received correct/accurate access credentials from a user of the second computer system (e.g., such as the user of the first computer system). For example, the second computer system is in the unlocked state after (e.g., in response to) the second computer system detects a password input (e.g., entered via a keyboard of the second computer system), a username input (e.g., entered via the keyboard of the second computer system), a biometric input (e.g., a fingerprint detected via a touch-sensitive surface of the second computer system, a facial scan detected via one or more cameras of the second computer system, and/or voice recognition detected via one or more speakers of the second computer system), or other input for accessing the second computer system. In some embodiments, in accordance with a determination that the second computer system is not in the unlocked state discussed above, the second computer system does not satisfy the one or more connection criteria. For example, the first computer system forgoes displaying the first selectable option described above with reference to step(s) 1802 in the three-dimensional environment. Displaying, at a first computer system, a first selectable option that is selectable to establish a connection between the first computer system and a second computer system if the second computer system satisfies one or more connection criteria based on whether the second computer system is in an unlocked state facilitates discovery that the second computer system is configurable to be connected to the first computer system for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, the physical environment of the first computer system includes a plurality of computer systems, including the second computer system, such as the second computer system 1708a and the third computer system 1710a in FIG. 17A. For example, the portion of the physical environment that is visible in the three-dimensional environment via the display generation component further includes at least a third computer system, different from the first computer system and the second computer system. In some embodiments, the third computer system has one or more characteristics of the first computer system and/or the second computer system.

In some embodiments, satisfaction of the one or more connection criteria is in accordance with a determination that the second computer system is the closest computer system of the plurality of computer systems relative to the first computer system (e.g., as similarly discussed above with reference to step(s) 1802), such as the second computer system 1708b being closer to the first computer system 101 than the third computer system 1710b as shown in the overhead view in FIG. 17A. In some embodiments, the second computer system is the closest computer system of the plurality of computer systems relative to the first computer system if a distance between the second computer system and the first computer system is smaller than a distance between the third computer system discussed above and the first computer system (e.g., and smaller than distances of other computer systems in the plurality of computer systems relative to the first computer system). In some embodiments, as discussed in more detail below, the second computer system is the closest computer system of the plurality of computer systems relative to the first computer system if a strength of a wireless connection between the first computer system and the second computer system is stronger than that of a wireless connection between the first computer system and the third computer system (e.g., and stronger than strengths of wireless connections of other computer systems in the plurality of computer systems with the first computer system). In some embodiments, the second computer system is the closest computer system of the plurality of computer systems relative to the first computer system based on image recognition/processing. For example, when the first computer system visually detects the plurality of computer systems, the second computer system determines, based on the image recognition/processing, that the second computer system is the closest computer system of the plurality of computer systems (e.g., based on determining that the second computer system is the largest computer system relative to the one or more cameras, signifying that the second computer system is closer than others of the plurality of computer systems). In some embodiments, in accordance with a determination that the second computer system is not the closest computer system of the plurality of computer systems relative to the first computer system, the second computer system does not satisfy the one or more connection criteria. For example, the first computer system forgoes displaying the first selectable option described above with reference to step(s) 1802 in the three-dimensional environment (e.g., and optionally displays a second selectable option similar to the first selectable option for the third computer system if the third computer system is the closest computer system relative to the first computer system). Displaying, at a first computer system, a first selectable option that is selectable to establish a connection between the first computer system and a second computer system if the second computer system satisfies one or more connection criteria based on whether the second computer system is the closest computer system to the first computer system helps automatically facilitate connection to the second computer system versus other computer systems for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, the determination that the second computer system is the closest computer system of the plurality of computer systems is based on a strength of a wireless signal transmitted by the second computer system (e.g., the strength of the wireless connection between the first computer system and the second computer system), as similarly described with reference to FIG. 17A. In some embodiments, the strength of the wireless signal transmitted by the second computer system corresponds to a strength of a Bluetooth (or Wi-Fi or other Communication Protocol) signal transmitted by the second computer system and detected by the first computer system. Accordingly, the second computer system satisfies the one or more connection criteria if the wireless signal strength between the second computer system and the first computer system is greater/stronger than those of other computer systems of the plurality of computer systems and the first computer system. Displaying, at a first computer system, a first selectable option that is selectable to establish a connection between the first computer system and a second computer system if the second computer system satisfies one or more connection criteria based on whether the second computer system has the strongest wireless connection with the first computer system helps automatically facilitate connection to the second computer system versus other computer systems for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, satisfaction of the one or more connection criteria is in accordance with a determination that the first computer system has not detected a respective event for ceasing display (e.g., and/or preventing display) of the first selectable option (e.g., as similarly discussed above with reference to step(s) 1802), such as not detecting that a threshold amount of time 1727 has elapsed since displaying the first selectable option 1716a in FIGS. 17D and 17D1. In some embodiments, detecting the respective event for ceasing display of the first selectable option includes determining that a threshold amount of time (e.g., 0.5, 1, 2, 3, 5, 10, 15, 30, 60, or 120 seconds) has elapsed since (e.g., initially) displaying the first selectable option in the three-dimensional environment. For example, if the first computer system determines that the threshold amount of time has elapsed since the first selectable option was displayed in the three-dimensional environment (e.g., without detecting input (e.g., selection input) directed to the first selectable option), the one or more connection criteria are not satisfied. In some embodiments, detecting the respective event for ceasing display of the first selectable option includes detecting, via the one or more input devices, user input for causing the first computer system to cease display of and/or prevent display of the first selectable option in the three-dimensional environment. For example, if the first computer system detects an input provided by the user for moving the second computer system in the physical environment of the first computer system (e.g., the hand of the user picks up and physically moves the second computer system within the portion of the physical environment that is visible in the three-dimensional environment and/or moves the second computer system outside the portion of the physical environment), the one or more connection criteria are not satisfied. As another example, if the first computer system detects an input provided by the user that causes the second computer system to power down, turn off its display generation component, and/or enter a sleep or locked state (e.g., via a selection of a power button of the second computer system), the one or more connection criteria are not satisfied. In some embodiments, in accordance with a determination that the second computer system detects the respective event for ceasing display (e.g., and/or preventing display) of the first selectable option, the second computer system does not satisfy the one or more connection criteria. For example, the first computer system forgoes displaying and/or ceases displaying the first selectable option described above with reference to step(s) 1802 in the three-dimensional environment. Displaying, at a first computer system, a first selectable option that is selectable to establish a connection between the first computer system and a second computer system if the second computer system satisfies one or more connection criteria based on whether the second computer system is the closest computer system to the first computer system facilitates discovery that the second computer system is configurable to be connected to the first computer system for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, the physical environment of the first computer system includes a third computer system (e.g., such as the third computer system discussed previously above), different from the second computer system, such as the third computer system 1710a in FIG. 17A. In some embodiments, in response to visually detecting the second computer system and the third computer system, in accordance with a determination that the second computer system satisfies the one or more connection criteria and the third computer system satisfies the one or more connection criteria (e.g., the second computer system and the third computer system both satisfy any one or combination of the requirements of the one or more criteria discussed above), the first computer system concurrently displays, via the display generation component, the first selectable option (e.g., the first selectable option 1716a in FIGS. 17D and 17D1), and a second selectable option (e.g., second selectable option 1718a in FIGS. 17D and 17D1) that is selectable to initiate a process to establish a connection between the first computer system and the third computer system. For example, the first computer system concurrently visually detects, via the one or more cameras, the second computer system and the third computer system in the portion of the physical environment that is visible in the three-dimensional environment, as similarly discussed above with reference to step(s) 1802. In some embodiments, the second selectable option is the same as or similar to the first selectable option, but its functionality, display, and/or interactivity is specific to the third computer system. In some embodiments, the first selectable option and the second selectable option are displayed at different locations in the three-dimensional environment. For example, the first selectable option is displayed at a first location that is based on the location of the second computer system in the portion of the physical environment that is visible in the three-dimensional environment, and the second selectable option is displayed at a second location, different from the first location, that is based on the location of the third computer system in the portion of the physical environment that is visible in the three-dimensional environment. In some embodiments, as similarly discussed below, the second selectable option is displayed at a location in the three-dimensional environment that is within a threshold distance (e.g., 0.1 cm, 1 cm, 3 cm, 10 cm, 80 cm, 1 m, or 5 m) of a portion of the third computer system (e.g., a top edge or a side edge, such as the left or right edge, of the third computer system). Concurrently displaying, at a first computer system, a first selectable option and a second selectable option that are selectable to establish a connection between the first computer system and a second computer system or a third computer system if the second computer system and the third computer system satisfy one or more connection criteria facilitates discovery that the second computer system and the third computer system are configurable to be connected to the first computer system for displaying a representation of content from the second computer system or the third computer system and/or reduces the number of inputs needed to display the representation of content from the second computer system or the third computer system, which avoids interrupting the use of the first computer system and/or helps avoid erroneous connection attempts when the one or more criteria are not satisfied, thereby improving user-device interaction.

In some embodiments, the first selectable option is displayed at a first location in the three-dimensional environment that is within a threshold distance (e.g., 0.1 cm, 1 cm, 3 cm, 10 cm, 80 cm, 1 m, or 5 m) of a portion of the second computer system (e.g., as similarly discussed above with reference to step(s) 1802), as similarly described with reference to FIG. 17A. In some embodiments, the first location is within the threshold distance of a top edge of the second computer system (e.g., and/or a second display generation component of the second computer system). In some embodiments, the first location is within the threshold distance of a side edge, such as the left or right edge, of the second computer system (e.g., and/or the second display generation component). In some embodiments, the first location is below and/or is in front of the second computer system (e.g., and/or the second display generation component) from the viewpoint of the user of the first computer system. In some embodiments, while the first selectable option is displayed in the three-dimensional environment, the first selectable option at least partially obscures a portion of a physical object in the physical environment of the first computer system, such as a portion of the second computer system, a portion of a table on which the second computer system is positioned, a portion of a wall behind the second computer system from the viewpoint of the user, and/or a portion of another computer system (e.g., a third computer system) in the physical environment of the first computer system. Displaying the first selectable option at a respective position relative to the second computer system in the three-dimensional environment provides a visual indication to the user that the first selectable option corresponds to the second computer system, and that the second computer system corresponding to the first selectable option is available for launching a virtual instance, thereby reducing errors in usage.

In some embodiments, while displaying the first selectable option in accordance with the determination that the second computer system satisfies the one or more connection criteria in response to visually detecting the second computer system, the first computer system detects movement of the second computer system in the physical environment, such as movement of the second computer system 1708a as shown in FIG. 17C. For example, the first computer system visually detects a hand of the user move in the physical environment and pick up, grab, and/or grip the second computer system in the physical environment, followed by movement of the hand of the user while the hand is holding/gripping the second computer system. In some embodiments, the movement of the hand of the user causes the second computer system to be moved in the physical environment relative to the viewpoint of the user. In some embodiments, the movement is provided by a second user, different from the user of the first computer system. For example, the first computer system visually detects the second user pick up/grab and move the second computer system in the physical environment. In some embodiments, the first computer system visually detects that the second computer system is moving in the portion of the physical environment that is visible in the three-dimensional environment, without necessarily detecting/determining that the movement is caused by a hand of a user. In some embodiments, detecting the movement of the second computer system in the physical environment is in accordance with a determination that the second computer system is being moved with at least a threshold speed (e.g., 0.01, 0.05, 0.1, 0.5, 0.75, 1, or 1.5 m/s) and/or at least a threshold distance (e.g., 0.01, 0.05, 0.1, 0.5, 1, 2 or 3 meters).

In some embodiments, in response to (e.g., while and/or after) detecting the movement, the first computer system ceases display of the first selectable option in the three-dimensional environment, such as ceasing display of the first selectable option 1716a as shown in FIG. 17C. In some embodiments, the first computer system ceases display of the first selectable option for a duration of the movement of the second computer system in the physical environment. For example, the first computer system redisplays the first selectable option after detecting a conclusion/end of the input (e.g., after the second computer system is no longer being moved in the physical environment), such as after detecting that the movement of the second computer system is below the threshold speed and/or threshold distance above. In some embodiments, if the movement of the second computer system concludes and the first computer system determines that the second computer system no longer satisfies the one or more connection criteria discussed previously above (e.g., and/or visually detects that the second computer system is no longer in the portion of the physical environment that is visible in the three-dimensional environment from the viewpoint of the user), the first computer system forgoes redisplaying the first selectable option in the three-dimensional environment. Ceasing display of the first selectable option in the three-dimensional environment in response to detecting movement of the second computer system provides a visual indication to the user that a virtual instance of the second computer system is not able to be launched while the second computer system is being moved, thereby reducing errors in usage and/or erroneous inputs corresponding to a request to select the first selectable option.

In some embodiments, while displaying the first selectable option in accordance with the determination that the second computer system satisfies the one or more connection criteria in response to visually detecting the second computer system, the first computer system detects movement of the second computer system in the physical environment (e.g., similar to the movement of the second computer system discussed above), such as the movement of the second computer system 1708a as shown in FIG. 17C. In some embodiments, in response to (e.g., while and/or after) detecting the movement, the first computer system displays, via the display generation component, the first selectable option at a second location, different from the first location, in the three-dimensional environment that is within the threshold distance (e.g., 0.1 cm, 1 cm, 3 cm, 10 cm, 80 cm, 1 m, or 5 m) of the portion of the second computer system, such as displaying the first selectable option 1716a at a different location relative to the second computer system 1708a as shown in FIGS. 17D and 17D1. For example, if the portion of the second computer system is a top or bottom edge of the second computer system, the second location is located rightward or leftward of the first location from the viewpoint of the user. In some embodiments, if the portion of the second computer system is a side (e.g., left or right) edge of the second computer system, the second location is located above or below the first location from the viewpoint of the user. In some embodiments, the second location is selected based on the viewpoint of the user. For example, after the movement of the second computer system, the second location is closer to a center of a field of view of the three-dimensional environment and/or the viewpoint of the user than the first location. In some embodiments, in response to detecting the movement, the first computer system displays the first selectable option at the same location relative to the portion of the second computer system in the three-dimensional environment, but that is different relative to the viewpoint of the user of the first computer system due to the movement of the second computer system in the portion of the physical environment that is visible in the three-dimensional environment. Changing a position at which the first selectable option is displayed relative to the second computer system in the three-dimensional environment in response to detecting movement of the second computer system enables the first selectable option to remain more centrally located relative to the viewpoint of the user after the second computer system is moved, which facilitates input for selecting the first selectable option and/or helps reduce errors in usage.

In some embodiments, the second computer system is in communication with a second display generation component, different from the display generation component (e.g., as similarly discussed above with reference to step(s) 1802), such as second display generation component 1719. Displaying, at a first computer system, the first selectable option that is selectable to establish a connection between the first computer system and a second computer system that includes a second display generation component if the second computer system satisfies one or more connection criteria facilitates discovery that the second computer system is configurable to be connected to the first computer system for displaying a representation of content that is displayed via the second display generation component and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, the second computer system is in communication (e.g., wireless communication or wired communication) with a keyboard (e.g., a separate keyboard or an integrated keyboard, as similarly discussed above with reference to step(s) 1802), such as keyboard 1712a in FIG. 17A. Displaying, at a first computer system, the first selectable option that is selectable to establish a connection between the first computer system and a second computer system that includes a keyboard if the second computer system satisfies one or more connection criteria facilitates discovery that the second computer system is configurable to be connected to the first computer system for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, the second computer system is in communication (e.g., wireless communication or wired communication) with a trackpad (e.g., a separate trackpad or an integrated trackpad, as similarly discussed above with reference to step(s) 1802), such as mouse 1714a in FIG. 17A. Displaying, at a first computer system, the first selectable option that is selectable to establish a connection between the first computer system and a second computer system that includes a trackpad if the second computer system satisfies one or more connection criteria facilitates discovery that the second computer system is configurable to be connected to the first computer system for displaying a representation of content from the second computer system and/or reduces the number of inputs needed to display the representation of content from the second computer system, which avoids interrupting the use of the first computer system and/or helps avoid erroneous connection attempts when the one or more criteria are not satisfied, thereby improving user-device interaction.

In some embodiments, the physical environment of the first computer system includes a third computer system (e.g., such as the third computer system discussed previously above), different from the second computer system, such as the third computer system 1710a in FIG. 17A. In some embodiments, while displaying the first selectable option in accordance with the determination that the second computer system satisfies the one or more connection criteria in response to visually detecting the second computer system, the first computer system detects, via the one or more input devices, an input corresponding to selection of the first selectable option, such as selection of the first selectable option 1716a provided by hand 1703c. For example, the first computer system detects an air gesture provided by a hand of the user of the computer system directed to the first selectable option. In some embodiments, the air gesture is an air pinch gesture in which an index finger and thumb of the hand of the user come together to make contact. In some embodiments, the air gesture is an air tap or touch gesture in which a finger (e.g., index finger) moves to contact the first selectable option in space. In some embodiments, the air gesture is detected while attention (e.g., including gaze) of the user is directed toward the first selectable option. In some embodiments, the input is detected via a hardware input device (e.g., a controller) that is in communication with the first computer system. For example, the input includes a press or tap of a physical button, knob, or joystick of the controller provided by one or more fingers of the hand of the user.

In some embodiments, in response to detecting the input, the first computer system provides an indication of a request (e.g., an audio, haptic and/or visual prompt) for a user of the first computer system to provide a disambiguation input, such as displaying notification 1755 as shown in FIG. 17E. For example, the first computer system provides an indication (e.g., a message or notification) that prompts the user of the first computer system to provide input for disambiguating the second computer system from the third computer system, such that the first computer system displays a representation of content from the second computer system (as desired by the user) rather than a representation of content from the third computer system. Some examples of the input for disambiguating the second computer system from the third computer system are provided below. In some embodiments, disambiguating the second computer system from the third computer system (and/or other computer systems in the physical environment) has one or more characteristics of the same as discussed in method 1900). Requesting a disambiguation input when a request to establish a connection between a first computer system and a second computer system of a plurality of computer systems is detected helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the second computer system is in communication with one or more second input devices, different from the one or more input devices, that include one or more physical buttons, such as keyboard 1712a and/or mouse 1714a in FIG. 17A. For example, as similarly discussed above with reference to step(s) 1802, the second computer system is in communication with a keyboard and/or a trackpad or mouse. In some embodiments, the keyboard and/or trackpad or mouse include one or more physical buttons (e.g., and/or keys) that are selectable via input provided by one or more fingers of the hand of the user of the first computer system. In some embodiments, the one or more physical buttons correspond to mechanical buttons (e.g., buttons that are raised relative to a surface, such as a surface of an input device or a surface of the second computer system) or solid-state buttons (e.g., buttons that do not physically move in response to physical input and for which activation is triggered based on an input meeting a force or intensity threshold and that optionally provide haptic feedback generated with a tactile output generator when the force or intensity threshold is met).

In some embodiments, the disambiguation input includes selection of a first button of the one or more physical buttons, such as selection of a key of the keyboard 1712a or a selection of a button of the mouse 1714a as shown in FIG. 17E. For example, the first computer system prompts the user of the first computer system to select a first button of the one or more physical buttons of the one or more second input devices. In some embodiments, the first button corresponds to any button on the keyboard, trackpad, and/or mouse in communication with the second computer system. In some embodiments, the first button corresponds to a particular button on the keyboard, trackpad, and/or mouse (e.g., a button that is specified by the first computer system via the message or notification discussed above). In some embodiments, the first button corresponds to any button on the keyboard, trackpad, and/or mouse with the exception of a subset of the one or more physical buttons. For example, the disambiguation input includes selection of any button of the keyboard, trackpad, and/or mouse except for a power button (e.g., that is selectable to power down and/or induce a sleep state for the input device and/or the second computer system), one or more volume buttons (e.g., that are selectable to increase and/or decrease a volume of audio emitted by the second computer system), and/or one or more brightness buttons (e.g., that are selectable to increase or decrease a brightness of the second display generation component of the second computer system). In some embodiments, if the second computer system detects a selection of the first button discussed above, the first computer system determines that the disambiguation input has been received (e.g., in response to receiving input data from the second computer system) and displays the representation of content from the second computer system (and forgoes displaying a representation of content from the third computer system). Alternatively, in some embodiments, if the third computer system detects a selection of a first button of one or more physical buttons of one or more third input devices of the third computer system in a similar manner as discussed above, the first computer system determines that the disambiguation input has been received (e.g., in response to receiving input data from the third computer system) and displays the representation of content from the third computer system (and forgoes displaying the representation of content from the second computer system in the three-dimensional environment). Establishing a connection between a first computer system and a second computer system of a plurality of computer systems in response to detecting a selection of a first button of an input device of the second computer system that disambiguates the second computer system from others of the plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the second computer system is in communication with one or more second input devices, different from the one or more input devices, that include a touch-sensitive surface (e.g., of a trackpad or other remote input device in communication with the second computer system), such as the mouse 1714a in FIG. 17A. In some embodiments, the disambiguation input includes an input of a contact (e.g., a finger of the hand of the user or a stylus) on the touch-sensitive surface, such as contact by hand 1703d on the mouse 1714a as shown in FIG. 17E. For example, the disambiguation input includes a tap or a sequence of taps of the contact on the touch-sensitive surface. In some embodiments, the disambiguation input includes a swipe or a sequence of swipes of the contact on the touch-sensitive surface. In some embodiments, the disambiguation input includes a press/selection of the contact on the touch-sensitive surface (e.g., the touch-sensitive surface is responsive to push inputs). In some embodiments, if the second computer system detects an input from the contact on the touch-sensitive surface as discussed above, the first computer system determines that the disambiguation input has been received (e.g., in response to receiving input data from the second computer system) and displays the representation of content from the second computer system (and forgoes displaying a representation of content from the third computer system). Alternatively, in some embodiments, if the third computer system detects an input from a contact on a touch-sensitive surface of one or more third input devices of the third computer system in a similar manner as discussed above, the first computer system determines that the disambiguation input has been received (e.g., in response to receiving input data from the third computer system) and displays the representation of content from the third computer system (and forgoes displaying the representation of content from the second computer system in the three-dimensional environment). Establishing a connection between a first computer system and a second computer system of a plurality of computer systems in response to detecting an input from a contact on a touch-sensitive surface of an input device of the second computer system that disambiguates the second computer system from others of the plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, providing the indication of the request for the user of the first computer system to provide the disambiguation input includes displaying, via the display generation component, a visual prompt (e.g., a message or notification) of the request (e.g., in the three-dimensional environment), such as notification 1755 shown in FIG. 17E.

In some embodiments, the visual prompt includes specific instructions for providing the disambiguation input, such as selecting a (e.g., particular) button/key on an input device of the second computer system and/or the third computer system as discussed above and/or tapping or swiping a contact on a touch-sensitive surface of an input device of the second computer system and/or the third computer system as discussed above. In some embodiments, the display of the visual prompt of the request is accompanied by audio prompting the user to provide the disambiguation input. For example, a virtual assistant associated with an operating system of the second computer system verbalizes the instructions included in the visual prompt. Displaying a visual prompt of a request for a disambiguation input when a request to establish a connection between a first computer system and a second computer system of a plurality of computer systems is detected helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the physical environment of the first computer system includes a first input device (e.g., a keyboard, trackpad, mouse, controller, or other remote input device that is not currently connected to and/or in communication with the first computer system), different from the one or more input devices, such as second keyboard 1721a in FIG. 17A. In some embodiments, in response to visually detecting the first input device, in accordance with a determination that the first input device satisfies one or more second connection criteria (e.g., the same or different from the one or more connection criteria discussed above, and/or any one or combination of the requirements of the one or more connection criteria discussed above), the first computer system displays, via the display generation component, a second selectable option that is selectable to initiate a process to establish a connection between the first computer system and the first input device, such as display of third selectable option 1732a as shown in FIGS. 17D and 17D1. For example, the first computer system concurrently visually detects, via the one or more cameras, the second computer system and the first input device in the portion of the physical environment that is visible in the three-dimensional environment, as similarly discussed above with reference to step(s) 1802. In some embodiments, the second selectable option is the same as or similar to the first selectable option, but its functionality, display, and/or interactivity is specific to the first input device. In some embodiments, establishing the connection between the first computer system and the first input device includes configuring the first input device as an input device for the first computer system. For example, input (e.g., such as selection of a physical button, key, touch-sensitive surface, and/or knob) detected via the first input device is detectable by the first computer system as input directed to content (e.g., a user interface or other virtual elements) displayed in the three-dimensional environment. In some embodiments, configuring the first input device as an input device for the first computer system includes configuring the first input device as an input device for a virtual instance of and/or a virtual experience of another computer system, such as the second computer system. In some embodiments, if the physical environment of the first computer system further includes a second input device, different from the first input device, that is visually detected by the first computer system and that satisfies the one or more second connection criteria, the first computer system displays a third selectable option that is selectable to initiate a process to establish a connection between the first computer system and the second input device in a similar manner as discussed above. In some embodiments, the first selectable option and the second selectable option are displayed at different locations in the three-dimensional environment. For example, the first selectable option is displayed at a first location that is based on the location of the second computer system in the portion of the physical environment that is visible in the three-dimensional environment, and the second selectable option is displayed at a second location, different from the first location, that is based on the location of the first input device in the portion of the physical environment that is visible in the three-dimensional environment. Displaying a second selectable option that is selectable to establish a connection between the first computer system and a first input device in the three-dimensional environment in accordance with a determination that the first input device satisfies one or more connection criteria provides a visual indication to the user that the second selectable option corresponds to the first input device, and that the first input device corresponding to the second selectable option is available for being configured as an input device for the first computer system, reducing errors in usage and/or a number of inputs needed to connect to the first input device.

In some embodiments, while displaying the second selectable option in accordance with the determination that the first input device satisfies the one or more second connection criteria in response to visually detecting the first input device, the first computer system detects, via the one or more input devices, an input corresponding to a selection of the second selectable option, such as selection of the third selectable option 1732*a* provided by hand 1705*b* as shown in FIGS. 17D and 17D1. For example, the first computer system detects an air gesture provided by a hand of the user of the computer system directed to the first selectable option. In some embodiments, the air gesture is an air pinch gesture in which an index finger and thumb of the hand of the user come together to make contact. In some embodiments, the air gesture is an air tap or touch gesture in which a finger (e.g., index finger) moves to contact the second selectable option in space. In some embodiments, the air gesture is detected while attention (e.g., including gaze) of the user is directed toward the second selectable option. In some embodiments, the input is detected via a hardware input device (e.g., a controller) that is in communication with the first computer system. For example, the input includes a press or tap of a physical button, knob, or joystick of the controller provided by one or more fingers of the hand of the user.

In some embodiments, in response to detecting the input, the first computer system initiates a process to establish the connection between the first computer system and the first input device, as similarly described with reference to FIG. 17F. For example, as discussed above, the first computer system configures the first input device as an input device for the first computer system. Establishing a connection between a first computer system and an input device in response to detecting a selection of a selectable option corresponding to the input device reduces the number of inputs needed to establish the connection between the first computer system and the input device, which helps avoid interrupting the use of the first computer system, thereby improving user-device interaction.

In some embodiments, in response to detecting the input, the first computer system displays, via the display generation component, a visual animation (e.g., a visual glow, highlight, and/or bold effect) indicating the connection at one or more locations in the three-dimensional environment that are within a threshold distance (e.g., 0.1 cm, 1 cm, 3 cm, 10 cm, 80 cm, 1 m, or 5 m) of a portion of the first input device, such as display of animation 1737 as shown in FIGS. 17D and 17D1. For example, the visual animation indicates and/or visually confirms that the connection between the first computer system and the first input device was successful. In some embodiments, displaying the visual animation indicating the connection at the location that is within the threshold distance of the first input device includes displaying the visual animation below the first input device, such that the visual animation visually appears to emanate from and/or extend outwardly from the first input device from the viewpoint of the user in the three-dimensional environment. In some embodiments, the visual animation is displayed around (e.g., edge portions of) the first input device in the three-dimensional environment. In some embodiments, the visual animation is displayed above, in front of, and/or behind the first input device in the three-dimensional environment relative to the viewpoint of the user. In some embodiments, the visual animation is at least partially translucent in the three-dimensional environment, such that one or more physical objects in the physical environment, including the first input device, remain at least partially visible through the visual animation. Displaying a visual animation in the three-dimensional environment in response to detecting selection of the second selectable option corresponding to the first input device provides a visual indication to the user that the first input device has been connected for input to the first computer system, and facilitates discovery that input detected via the first input device will be directed to content that is displayed via the display generation component of the first computer system, thereby improving user-device interaction.

In some embodiments, while displaying the first selectable option in accordance with the determination that the second computer system satisfies the one or more connection criteria in response to visually detecting the second computer system, the first computer system detects, via the one or more input devices, an input corresponding to selection of the first selectable option (e.g., such as the input corresponding to the selection of the first selectable option discussed above), such as selection of the first selectable option 1716*a* by the hand 1703*c* as shown in FIGS. 17D and 17D1. In some embodiments, in response to detecting the input, the first computer system establishes the connection between the first computer system and the second computer system, including displaying, via the display generation component, a representation of content from the second computer system in the three-dimensional environment, such as display of representation 1717 as shown in FIG. 17F. For example, the first computer system displays a user interface object associated with the second computer system, such as a virtual instance of the second computer system and/or a virtual computer experience of the second computer system, in the three-dimensional environment, as similarly described above with reference to step(s) 1802. In some embodiments, displaying the representation of content from the second computer system has one or more characteristics of the same in methods 1400 and/or 1600. Displaying a representation of content from the second computer system in response to receiving input directed the first selectable option allows for a user to interact with the second computer system via components of the first computer system, which avoids interrupting the use of the first computer system and reduces steps involved with accessing the second computer system when the user is using the first computer system, thereby improving user-device interaction.

In some embodiments, the second computer system is in communication with a second display generation component, different from the display generation component, such as second display generation component 1719 in FIG. 17A. For example, the second display generation component is a separate display that is in communication with the second computer system or is an integrated display of the second computer system. In some embodiments, the second display generation component has one or more characteristics of the display generation component in communication with the first computer system.

In some embodiments, displaying the representation of content from the second computer system in the three-dimensional environment includes displaying the representation of content from the second computer system at a location that is a (optionally predetermined) distance (e.g., a default distance, such as 0.1 cm, 1 cm, 10 cm, 50 cm, 2 m, 10 m, or 30 m, and/or spatial arrangement (e.g., location and/or orientation)) behind the second display generation component in the three-dimensional environment, such as display of the representation in virtual object 1731b behind the second display generation component 1719 as shown in the overhead view in FIG. 17F. For example, the first computer system displays the representation of content from the second computer system at a location in the three-dimensional environment that is based on the location of the second display generation component (e.g., and thus the second computer system) in the portion of the physical environment that is visible in the three-dimensional environment. In some embodiments, the representation of content from the second computer system is displayed at the predetermined distance relative to the second display generation component independent of the location of the second computer system in the portion of the physical environment that is visible in the three-dimensional environment. In some embodiments, while displaying the representation of content from the second computer system at the location that is a predetermined distance behind the second display generation component in the three-dimensional environment, the representation of content from the second computer system at least partially obscures the second display generation component relative to the viewpoint of the user of the first computer system. In some embodiments, the representation of content from the second computer system is displayed with a predetermined orientation relative to the second display generation component in the three-dimensional environment. For example, the representation of content is displayed with a particular angular and/or distance offset relative to the second display generation component, such that, from the viewpoint of the user of the first computer system, the representation of content visually appears to be parallel with the second display generation component or offset (e.g., tilted) to the right or the left relative to the second display generation component. Displaying, via a display of a first computer system, a representation of content from the second computer system at a predetermined depth behind a second display generation component of the second computer system in response to receiving input directed the first selectable option allows for a user to interact with the second computer system via components of the first computer system, which avoids interrupting the use of the first computer system and reduces steps involved with accessing the second computer system when the user is using the first computer system, and/or facilitates user input for interacting with the representation of content by obscuring a portion of the second display generation component, thereby improving user-device interaction.

In some embodiments, in accordance with a determination that, when the input is detected, the first selectable option is displayed in a system user interface (e.g., a control center user interface of the first computer system or a control center user interface of the second computer system), such as element 1745c in control center user interface 1744a in FIG. 17G, displaying the representation of content from the second computer system in the three-dimensional environment includes displaying the representation of content from the second computer system at a location that is based on a viewpoint of a user of the first computer system, such as displaying the representation 1717a based on the viewpoint of the user 1709 as shown in FIG. 17H. In some embodiments, the system user interface has one or more characteristics of the system user interface discussed with reference to methods 800, 1400, and/or 1600. In some embodiments, if the first selectable option is not displayed in the system user interface, the first selectable option is displayed in the three-dimensional environment at a location that is based on the location of the second computer system, as similarly discussed above. For example, the first selectable option is displayed at a location in the three-dimensional environment that is within a threshold distance (e.g., 0.1 cm, 1 cm, 3 cm, 10 cm, 80 cm, 1 m, or 5 m) of a portion (e.g., top or side edge) of the second computer system. In some embodiments, if the first computer system detects the selection of the first selectable option that is displayed in the control center user interface of the first computer system, the first computer system displays the representation of content from the second computer system at a location in the three-dimensional environment that is based on the viewpoint of the user, rather than based on a location of the second display generation component of the second computer system as discussed above. Alternatively, in some embodiments, if the second computer system detects, via one or more second input devices in communication with the second computer system, a selection of the first selectable option that is displayed in the control center user interface of the second computer system (e.g., displayed via the second display generation component), the first computer system displays the representation of content from the second computer system at the location in the three-dimensional environment that is based on the viewpoint of the user as discussed above. For example, when the second computer system detects the selection of the first selectable option, the second computer system transmits an indication of the selection of the first selectable option to the first computer system, which causes the first computer system to display the representation of content from the second computer system. In some embodiments, when the first computer system detects the selection of the first selectable option in the system user interface, if the viewpoint of the user is positioned at a first location in the physical environment relative to the three-dimensional environment, the first computer system displays the representation of the content from the second computer system with a first spatial arrangement (e.g., position and/or orientation) relative to the viewpoint of the user, such that the representation of the content is displayed with a first orientation and at a first distance relative to the viewpoint. In some embodiments, when the first computer system detects the selection of the first selectable option in the system user interface, if the viewpoint of the user is positioned at a second location, different from the first location, in the physical environment relative to the three-dimensional environment, the first computer system displays the representation of the content from the second computer system with the first spatial arrangement relative to the viewpoint of the user, and is thus displayed at a different position and/or orientation relative to the three-dimensional environment than when the viewpoint of the user was the first viewpoint when the first selectable option was selected. In some embodiments, if the first selectable option is not displayed in the system user interface and is displayed in the three-dimensional environment near the second computer system, as similarly discussed above with reference to step(s) 1802, the first computer system displays the representation of content from the second computer system at a location that is a predetermined distance behind the second display generation component of the second computer system, as similarly discussed above, rather than at a location that is based on the viewpoint of the user. Displaying the representation of content from the second computer system at a location in the three-dimensional environment that is based on the viewpoint of the user of the first computer system visually assists the user with locating the representation of content from the second computer system in the three-dimensional environment, which reduces the number of inputs involved with placing the representation of content from the second computer system at a location relative to the viewpoint at which it is efficiently interactable, thereby improving user-device interaction.

It should be understood that the particular order in which the operations in method 1800 have been described is merely exemplary and is not intended to indicate that the described order is the only order in which the operations could be performed. One of ordinary skill in the art would recognize various ways to reorder the operations described herein.

FIG. 19 is a flowchart illustrating a method 1900 of facilitating disambiguation of a second computer system from a plurality of computer systems for display of a representation of content from the second computer system in a three-dimensional environment in accordance with some embodiments. In some embodiments, the method 1900 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1900 are, optionally, combined and/or the order of some operations is, optionally, changed.

In some embodiments, method 1900 is performed at a first computer system in communication with a display generation component, one or more input devices and one or more cameras. In some embodiments, the computer system has one or more of the characteristics of the computer systems of the methods 800, 1000, 1200, 1400, 1600, and/or 1800. In some embodiments, the display generation component has one or more of the characteristics of the display generation components of the methods 800, 1000, 1200, 1400, 1600, and/or 1800. In some embodiments, the one or more input devices have one or more of the characteristics of the one or more input devices of the methods 800, 1000, 1200, 1400, 1600, and/or 1800. In some embodiments, the one or more cameras have one or more of the characteristics of the one or more cameras of method 1800.

In some embodiments, the first computer system detects (1902a), via the one or more input devices, a request to establish a connection with a respective computer system, different from the first computer system, such as second computer system 1708a in FIG. 17A, that is within a respective region of a physical environment of the first computer system (e.g., a physical environment of a user of the first computer system and surrounding the display generation component that is captured by the one or more cameras and is included in the region of the physical environment that is captured by the one or more cameras), such as selection of first selectable option 1716a provided by hand 1703c as shown in FIGS. 17D and 17D1. In some embodiments, the computer system detects the request to establish the connection with the respective computer system while the first computer system is displaying a three-dimensional environment, such as the three-dimensional environments described in methods 800, 1000, 1200, 1400, 1600, and/or 1800. In some embodiments, the respective computer system is a mobile device (e.g., a tablet, a smartphone, a media player, or a wearable device), or a computer or other electronic device. The respective computer system is optionally in communication with a second display generation component that displays one or more (e.g., virtual) objects via the second display generation component. One or more objects displayed via the second display generation component are optionally visible via the display generation component that is in communication with the first computer system (e.g., via active or passive passthrough). The second display generation component optionally has similar or different characteristics from the above-described characteristics of the display generation component of the first computer system. Additionally, in some embodiments, the respective computer system is in communication with second one or more input devices that have similar or different characteristics from the above-described characteristics of the one or more input devices of the first computer system. In some embodiments, the respective computer system has one or more characteristics of the computer systems in method 1400, 1600 and/or 1800. In some embodiments, detecting the request to establish the connection with the respective computer system corresponds to a selection of a first selectable option that is displayed with the respective computer system in the three-dimensional environment, such as the first selectable option described with reference to methods 1600 and/or 1800. In some embodiments, the first selectable option is included in a plurality of controls of the first computer system that is displayed in a predetermined portion/region of the display generation component of the first computer system. For example, the plurality of controls, including the first selectable option, is displayed at a top region, along a side edge, and/or at a bottom region of the display generation component of the first computer system. In some embodiments, the first selectable option is included in a plurality of controls of the respective computer system. For example, the plurality of controls, including the first selectable option, is displayed in a predetermined portion/region (e.g., a top region, along a side edge, and/or a bottom region) of the second display generation component of the respective computer system. In some embodiments, the selection of the first selectable option has one or more characteristics of selection inputs described with referent to methods 800, 1000, 1200, 1400, 1600, and/or 1800.

In some embodiments, in response to detecting the request (1902b), in accordance with a determination that a second computer system of a plurality of computer systems satisfies one or more criteria while the plurality of computer systems is within the respective region (e.g., the plurality of computer systems is included in the portion of the physical environment that is captured by the one or more cameras and is included in the three-dimensional environment as discussed above), the first computer system establishes (1902c) a connection between the first computer system and the second computer system, as similarly described with reference to FIG. 17F, without establishing a connection between the first computer system and others of the plurality of computer systems. In some embodiments, the first computer system detects that multiple computer systems in the plurality of computer systems that are within the respective region are available for connection to the first computer system (e.g., and then checks for the one or more criteria to determine which of the plurality of computer systems that are available for connection satisfies the one or more criteria (e.g., which computer system to connect to)). For example, the first computer system is configured to establish a connection with one computer system at a time if that computer system satisfies the one or more criteria and the request is directed to the computer system satisfying the one or more criteria (e.g., even if multiple of the plurality of computer systems are configured to be connected to the first computer system)). In some embodiments, if the respective region includes a plurality of computer systems when the request to establish the connection between the first computer system and the respective computer system is detected, the first computer system initiates a process to disambiguate the respective computer system from others of the plurality of computer systems. In some embodiments, initiating the process to disambiguate the second computer system from the others of the plurality of computer systems includes determining whether any of the plurality of computer systems satisfies the one or more criteria. In some embodiments, the second computer system satisfies the one or more criteria if the first computer system detects a disambiguation input for the second computer system. In some embodiments, detecting the disambiguation input for the second computer system includes detecting a physical input one the second one or more input devices of the second computer system. For example, the first computer system detects (e.g., via image detection using images captured via the one or more cameras or via input data transmitted by the second computer system) a selection (e.g., a tap or press) of a key of a keyboard of the second computer system and/or a press or tap of a button or touch-sensitive surface of a trackpad of the second computer system. In some embodiments, detecting the disambiguation input for the second computer system includes detecting audio output by the second computer system (e.g., sound that is output with a frequency, period, and/or wavelength that is detectable by the first computer system (e.g., via one or more speakers of the first computer system)), without necessarily being audible to the user of the first computer system. In some embodiments, detecting the disambiguation input for the second computer system includes detecting an image (e.g., a screenshot) of content that is displayed via the second display generation component of the second computer system. For example, the first computer system detects (e.g., via image detection using images captured via the one or more cameras or via image data transmitted by the second computer system) the second computer system produce a screenshot of at least a portion of a user interface (e.g., including images, text, and/or other objects) that is displayed via the second display generation component of the second computer system. In some embodiments, detecting the disambiguation input for the second computer system includes detecting display, by the second computer system, of unique content that is generated based on image data transmitted to the second computer system (e.g., directly or indirectly via a server (e.g., wireless communications terminal) that is in communication with the second computer system). For example, when the first computer system detects the request discussed above, the first computer system transmits image data to the second computer system, which causes the second computer system to display a unique image (e.g., or other unique content) that is distinct from the content that is or may be displayed by the others of the plurality of computer systems. In some embodiments, the first computer system detects the unique image that is displayed via the second display generation component of the second computer system using image detection based on images captured by the one or more cameras. In some embodiments, detecting the disambiguation input for the second computer system includes detecting (e.g., using image detection) a change in a visual appearance of the second computer system (e.g., and/or the second one or more input devices of the second computer system). For example, the first computer system detects light being emitted from keys of a keyboard of the second computer system (e.g., an integrated keyboard or a wired or wirelessly connected keyboard).

As mentioned above, because the second computer system of the plurality of computer systems satisfies the one or more criteria, the first computer system establishes the connection with the second computer system (e.g., without establishing the connection with the others of the plurality of computer systems). In some embodiments, the first computer system establishes the connection with the second computer system in one or more manners similar to those described above with reference to methods 1400, 1600, and/or 1800. For example, the first computer system displays a representation of content from the second computer system, as similarly described with reference to methods 1400, 1600, and/or 1800. As another example, as similarly described with reference to method 2000, establishing the connection between the first computer system and the second computer system includes configuring the second computer system as an input device for the first computer system.

In some embodiments, in accordance with a determination that a third computer system, different from the second computer system, such as third computer system 1710a in FIG. 17A, of the plurality of computer systems satisfies the one or more criteria while the plurality of computer systems is within the respective region (e.g., the plurality of computer systems is included in the portion of the physical environment that is captured by the one or more cameras and is included in the three-dimensional environment as discussed above), the first computer system establishes (1902d) a connection between the first computer system and the third computer system (e.g., as similarly described above but specific to the third computer system), as similarly described with reference to FIG. 17F, without establishing a connection between the first computer system and others of the plurality of computer systems, including the second computer system (e.g., because the others of the plurality of computer systems do not satisfy the one or more criteria discussed above). In some embodiments, as discussed above, the computer system detects that multiple computer systems in the plurality of computer systems that are within the respective region are available for connection to the first computer system (e.g., and then checks for the one or more criteria to determine which of the plurality of computer systems that are available for connection satisfies the one or more criteria (e.g., which computer system to connect to)). Establishing a connection between a first computer system and a second computer system that satisfies one or more criteria in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, in response to detecting the request, in accordance with a determination that the respective region includes the second computer system without including other computer systems, the first computer system establishes the connection between the first computer system and the second computer system (e.g., as similarly described above) independent of whether the second computer system satisfies the one or more criteria, as similarly described with reference to FIG. 17F. For example, as previously discussed above, the satisfaction of the one or more criteria is required for establishing the connection between the first computer system and the second computer system in the event that the physical environment of the first computer system includes a plurality of computer systems. In some embodiments, because the respective region of physical environment only includes the second computer system, the request is applicable to the second computer system specifically, which causes the first computer system to establish the connection with the second computer system without requiring any disambiguation input (e.g., such as those discussed above). In some embodiments, in accordance with a determination that the respective region includes the third computer system without including other computer systems, the first computer system establishes the connection between the first computer system and the third computer system (e.g., as similarly discussed above) independent of whether the third computer system satisfies the one or more criteria. Establishing a connection between a first computer system and a second computer system irrespective of satisfaction of the one or more criteria in response to detecting a request to establish a connection with a respective computer system of a plurality of computer systems if the second computer system is the only computer system in the physical environment reduces the number of inputs needed to establish the connection between the first computer system and the second computer system, which helps avoid interrupting the use of the first computer system, thereby improving user-device interaction.

In some embodiments, establishing the connection between the first computer system and the second computer system, without establishing a connection between the first computer system and others of the plurality of computer systems, includes displaying, via the display generation component, a representation of content from the second computer system in the three-dimensional environment, such as display of representation 1717 as shown in FIG. 17F, without displaying a representation of content from others of the plurality of computer systems. For example, the first computer system displays a virtual instance of the second computer system and/or a virtual computer experience of the second computer system, in the three-dimensional environment, as similarly described with reference to methods 1400, 1600, and/or 1800.

In some embodiments, establishing the connection between the first computer system and the third computer system, without establishing a connection between the first computer system and others of the plurality of computer systems, including the second computer system, includes displaying a representation of content from the third computer system in the three-dimensional environment (e.g., as similarly described above but specific to the third computer system), such as display of representation 1733a as shown in FIG. 17F, without displaying a representation of content from others of the plurality of computer systems, including the representation of content from the second computer system. Displaying a representation of content from a respective computer system of a plurality of computer systems, without displaying representations of content from others of the plurality of computer systems, in response to detecting a request to establish a connection between the first computer system and the respective computer system allows for the user to interact with the respective computer system via components of the first computer system, which avoids interrupting the use of the first computer system and reduces steps involved with accessing the respective computer system when the user is using the first computer system, thereby improving user-device interaction.

In some embodiments, the respective region further includes one or more respective input devices (e.g., one or more of a keyboard, trackpad, mouse, controller, or other remote input device that is not currently connected to and/or in communication with the first computer system), such as keyboard 1721a in FIG. 17A. In some embodiments, in response to detecting the request (e.g., the request is specific to the first input device), in accordance with a determination that a first input device of the one or more respective input devices satisfies one or more second criteria (e.g., the same or different from the one or more criteria discussed above, and/or any one or combination of the requirements of the one or more connection criteria discussed above) while the one or more respective input devices are within the respective region (e.g., the first input device is located in the portion of the physical environment that is visible in the three-dimensional environment and satisfies the one or more criteria discussed above), the first computer system establishes a connection between the first computer system and the first input device (e.g., as similarly discussed above with reference to step(s) 1902 but specific to the first input device), as similarly described with reference to FIG. 17E, including configuring the first input device to operate as an input device for the first computer system. For example, when the connection between the first computer system and the first input device is established, input (e.g., such as selection of a physical button, key, touch-sensitive surface, and/or knob) detected via the first input device is detectable by the first computer system as input directed to content (e.g., a user interface or other virtual elements) displayed in the three-dimensional environment. In some embodiments, configuring the first input device as an input device for the first computer system includes configuring the first input device as an input device for a virtual instance of and/or a virtual experience of another computer system, such as the second computer system or the third computer system discussed above. For example, while the first input device is configured to operate as an input device for the first computer system and while the first computer system is displaying content, such as a user interface, in the three-dimensional environment, if the user of the first computer system provides an input on the first input device, such as a selection of a button or movement of a contact on a touch-sensitive surface of the first input device, the first computer system performs an operation in accordance with the input detected via the first input device, such as interacting with the content in the three-dimensional environment or displaying additional or alternative content (e.g., user interfaces) in the three-dimensional environment. In some embodiments, establishing the connection between the first computer system and the first input device has one or more characteristics of the same in method 1800. In some embodiments, in accordance with a determination that the first input device of the one or more respective input devices does not satisfy the one or more second criteria while the one or more respective input devices are within the respective region, the first computer system forgoes establishing a connection between the first computer system and the first input device. For example, the first input device is not configured to operate as an input device for the first computer system. Establishing a connection between a first computer system and a first input device that satisfies one or more criteria in response to detecting a request to establish a connection with a respective computer system of a plurality of computer systems enables the first input device to automatically be configured as an input device for the first computer system and/or reduces the number of inputs needed to establish the connection between the first computer system and the first input device, which helps avoid interrupting the use of the first computer system, thereby improving user-device interaction.

In some embodiments, the determination that the second computer system satisfies the one or more criteria is based on detecting an indication that the second computer system has detected (e.g., via one or more second input devices, different from the one or more input devices, that are in communication with the second computer system) selection of a first button associated with the second computer system, such as selection of a key of keyboard 1712*a* or a button of mouse 1714*a* as shown in FIG. 17E. For example, as similarly discussed with reference to method 1800, the second computer system is in communication with a keyboard and/or a trackpad or mouse. In some embodiments, the keyboard and/or trackpad or mouse include one or more physical buttons (e.g., and/or keys) that are selectable via input provided by one or more fingers of the hand of the user of the first computer system. In some embodiments, as similarly discussed with reference to method 1800, the first computer system prompts the user of the first computer system to select a first button of the one or more physical buttons of the one or more second input devices in response to detecting the request. In some embodiments, the first button corresponds to any button on the keyboard, trackpad, and/or mouse in communication with the second computer system. In some embodiments, as similarly discussed above with reference to step(s) 1902, in response to detecting the request, because the physical environment includes the plurality of computer systems, the first computer system prompts the user of the first computer system to provide a disambiguation input that causes the second computer system to satisfy the one or more criteria, such as selection of the first button associated with the second computer system. In some embodiments, the first button corresponds to a particular button on the keyboard, trackpad, and/or mouse (e.g., a button that is specified by the first computer system via a message or notification that is displayed in the three-dimensional environment in response to detecting the request). In some embodiments, the first button corresponds to any button on the keyboard, trackpad, and/or mouse with the exception of a subset of the one or more physical buttons. For example, the disambiguation input includes selection of any button of the keyboard, trackpad, and/or mouse except for a power button (e.g., that is selectable to power down and/or induce a sleep state for the input device and/or the second computer system), one or more volume buttons (e.g., that are selectable to increase and/or decrease a volume of audio emitted by the second computer system), and/or one or more brightness buttons (e.g., that are selectable to increase or decrease a brightness of the second display generation component of the second computer system). In some embodiments, if the second computer system detects a selection of the first button discussed above, the first computer system determines that the disambiguation input has been received (e.g., in response to receiving input data from the second computer system), and thus the second computer system satisfies the one or more criteria. In some embodiments, the indication is transmitted to the first computer system directly from the second computer system or indirectly via a server (e.g., a wireless communications terminal) in communication with the first computer system and the second computer system.

In some embodiments, the determination that the third computer system satisfies the one or more criteria is based on detecting an indication that the third computer system has detected (e.g., via one or third more input devices, different from the one or more input devices, that are in communication with the third computer system) selection of a second button associated with the third computer system (e.g., as similarly described above but specific to the third computer system), such as selection of a key of keyboard 1721*a* in FIG. 17E. Establishing a connection between a first computer system and a second computer system that satisfies one or more criteria that are based on detecting a selection of a physical button associated with the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the determination that the second computer system satisfies the one or more criteria is based on detecting first audio outputted from the second computer system (e.g., via one or more speakers in communication with the second computer system), such as audio 1735 as shown in FIG. 17E. In some embodiments, when the first computer system detects the request, the first computer system transmits data (e.g., instructions and/or commands) to the second computer system for causing the second computer system to output the first audio that is detectable by the second computer system (e.g., and not necessarily audible to the user of the first computer system). In some embodiments, the first computer system transmits the data to the second computer system because the request discussed above with reference to step(s) 1902 is specific to the second computer system. For example, as discussed with reference to method 1800, the three-dimensional environment includes a first selectable option that corresponds to the second computer system and that is selectable to establish the connection between the first computer system and the second computer system. In some embodiments, as discussed above with reference to step(s) 1902, the request includes a selection of the first selectable option, which is indicative of user intent to request connection to the second computer system (e.g., based on the known locations of the first selectable option and the second computer system, and their proximity to each other). In some embodiments, as similarly discussed above with reference to step(s) 1902, in response to detecting the request, because the physical environment includes the plurality of computer systems, the first computer system awaits detection of a disambiguation input that causes the second computer system to satisfy the one or more criteria, such as the detection of the first audio outputted from the second computer system. In some embodiments, the first audio is outputted at a first frequency, a first wavelength, a first volume, a first period, and/or a first velocity, which are optionally specified by the first computer system (e.g., via the data transmitted to the second computer system as discussed above). In some embodiments, when the second computer system outputs the first audio as discussed above, the third computer system does not output any audio that is detectable by the first computer system. In some embodiments, when the second computer system outputs the first audio, the third computer system also outputs second audio, different from the first audio (e.g., having characteristics that are different from those of the first audio, such as the characteristics discussed above). For example, the first computer system detects (e.g., via a microphone of the first computer system) the first audio and the second audio and differentiates (e.g., via audio recognition/processing) the first audio from the second audio to determine that the second computer system satisfies the one or more criteria. In some embodiments, if the second computer system detects the first audio outputted from the second computer system as discussed above, the first computer system determines that the disambiguation input has been received, and thus that the second computer system satisfies the one or more criteria.

In some embodiments, the determination that the third computer system satisfies the one or more criteria is based on detecting audio outputted from the third computer system (e.g., as similarly described above but specific to the third computer system), similar to audio 1735 as shown in FIG. 17E. Establishing a connection between a first computer system and a second computer system that satisfies one or more criteria that are based on detecting audio that is output from the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system and/or affecting and/or distracting attention of the user, thereby improving user-device interaction.

In some embodiments, the determination that the second computer system satisfies the one or more criteria is based on detecting an indication of a first image (e.g., a screenshot or screen capture) captured by the second computer system, as similarly described with reference to FIG. 17E. For example, the first image is an image of a user interface or a portion of the user interface that is currently displayed via the second display generation component of the second computer system. In some embodiments, when the first computer system detects the request, the first computer system transmits data (e.g., instructions and/or commands) to the second computer system that causes the second computer system to capture the first image (e.g., to take a screenshot or screen capture of the content displayed via the second display generation component). In some embodiments, the first computer system transmits the data to the second computer system because the request discussed above with reference to step(s) 1902 is specific to the second computer system. For example, as discussed with reference to method 1800, the three-dimensional environment includes a first selectable option that corresponds to the second computer system and that is selectable to establish the connection between the first computer system and the second computer system. In some embodiments, as discussed above, the request includes a selection of the first selectable option, which is indicative of user intent to request connection to the second computer system (e.g., based on the known locations of the first selectable option and the second computer system, and their proximity to each other). In some embodiments, as similarly discussed above with reference to step(s) 1902, in response to detecting the request, because the physical environment includes the plurality of computer systems, the first computer system awaits detection of a disambiguation input that causes the second computer system to satisfy the one or more criteria, such as the detection of the indication that the second computer system has captured the first image. In some embodiments, the first computer system visually detects, via the one or more cameras, that the second computer system has captured the first image (e.g., the first computer system visually detects the first image that is displayed via the second display generation component or a visual confirmation that the first image has been captured that is displayed via the second display generation component). In some embodiments, when the second computer system captures the first image as discussed above, the third computer system does not capture any image and does not transmit an indication of an image that has been captured by the third computer system to the first computer system. In some embodiments, when the second computer system captures the first image and transmits the indication to the first computer system, the third computer system also captures a second image, different from the first image (e.g., the content included in the second image is specific to the third computer system) and transmits an indication of such to the first computer system as similarly discussed above. For example, the first computer system detects (e.g., visually or via data) the indication that the second computer system has captured the first image and the indication that the third computer system has captured the second image and differentiates (e.g., via image and/or data recognition/processing) the indication of the first image from the indication of the second image to determine that the second computer system satisfies the one or more criteria. In some embodiments, the first computer system receives image data from the second computer system indicating that the second computer system has captured the first image. In some embodiments, if the second computer system detects the indication of the second image captured by the second computer system as discussed above, the first computer system determines that the disambiguation input has been received, and thus that the second computer system satisfies the one or more criteria.

In some embodiments, the determination that the third computer system satisfies the one or more criteria is based on detecting an indication of a second image captured by the third computer system (e.g., as similarly described above but specific to the third computer system), as similarly described with reference to FIG. 17E. Establishing a connection between a first computer system and a second computer system that satisfies one or more criteria that are based on detecting an indication of an image captured by the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the determination that the second computer system satisfies the one or more criteria is based on visually detecting, via the one or more cameras, first content (e.g., a first unique image or a first unique cluster and/or sequence of images) that is displayed by the second computer system (e.g., via a second display generation component, different from the display generation component, that is in communication with the second computer system), such as first content 1744 as shown in FIG. 17E. In some embodiments, when the first computer system detects the request, the first computer system transmits data (e.g., instructions and/or commands) to the second computer system for causing the second computer system to display, via the second display generation component, the first content that is visually detectable by the first computer system (e.g., and not necessarily visible to the user of the first computer system). In some embodiments, as similarly discussed above with reference to step(s) 1902, in response to detecting the request, because the physical environment includes the plurality of computer systems, the first computer system awaits detection of a disambiguation input that causes the second computer system to satisfy the one or more criteria, such as the visual detection of the first content displayed via the second display generation component of the second computer system. In some embodiments, the first content corresponds to one or more first images of a user interface, a photograph or screenshot, a quick response (QR) code, a barcode, and/or other detectable/scannable image(s) that are specified by the first computer system, as discussed in more detail below. In some embodiments, when the second computer system displays the first content as discussed above, the third computer system does not display (e.g., via a third display generation component in communication with the third computer system) second content that is visually detectable by the first computer. In some embodiments, as discussed in more detail below, when the second computer system displays the first content, the third computer system also displays the second content, wherein the first content is different from the second content. In some embodiments, if the second computer system visually detects the first content that is displayed via the second display generation component of the second computer system as discussed above, the first computer system determines that the disambiguation input has been received, and thus that the second computer system satisfies the one or more criteria.

In some embodiments, the determination that the third computer system satisfies the one or more criteria is based on visually detecting second content that is displayed by the third computer system (e.g., via a third display generation component, different from the display generation component, that is in communication with the third computer system) (e.g., as similarly described above but specific to the third computer system), such as second content 1742 as shown in FIG. 17E. Establishing a connection between a first computer system and a second computer system that satisfies one or more criteria that are based on detecting unique content that is displayed by the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the first content is displayed by the second computer system when the second computer system detects first data transmitted by the first computer system, as similarly described with reference to FIG. 17E. In some embodiments, the first computer system transmits the first data to the second computer system because the request discussed above with reference to step(s) 1902 is specific to the second computer system. For example, as discussed with reference to method 1800, the three-dimensional environment includes a first selectable option that corresponds to the second computer system and that is selectable to establish the connection between the first computer system and the second computer system. In some embodiments, as discussed above with reference to step(s) 1902, the request includes a selection of the first selectable option, which is indicative of user intent to request connection to the second computer system (e.g., based on the known locations of the first selectable option and the second computer system, and their proximity to each other). In some embodiments, the first data is transmitted to the second computer system directly or indirectly via a server (e.g., a wireless communications terminal) in communication with the first computer system and the second computer system). In some embodiments, the first data includes instructions and/or commands that cause the second computer system to display, via the second display generation component, the first images of a user interface, a photograph or screenshot, a quick response (QR) code, a barcode, and/or other detectable/scannable image(s) discussed above. In some embodiments, as discussed in more detail below, the first computer system transmits data (e.g., similar to the first data) to multiple or all of the plurality of computer systems in the respective region of the physical environment in response to detecting the request (e.g., selection of the first selectable option discussed above).

In some embodiments, the second content is displayed by the third computer system when the third computer system detects second data transmitted by the first computer system (e.g., as similarly described above but specific to the third computer system), as similarly described with reference to FIG. 17E. Establishing a connection between a first computer system and a second computer system that satisfies one or more criteria that are based on detecting unique content specified by the first computer system that is displayed by the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the first content and the second content are concurrently displayed by the second computer system and the third computer system, respectively, such as concurrently display of the first content 1744 and the second content 1742 as shown in FIG. 17E. In some embodiments, the first content is different from the second content. For example, when the first computer system detects the request to establish a connection with a respective computer system of the plurality of computer systems, the first computer system transmits both the first data and the second data discussed above to the second computer system and the third computer system, respectively (and/or to additional computer systems of the plurality of computer systems in the respective region), for causing the second computer system and the third computer system (and/or the additional computer systems) to display their respective unique content that is detectable by the first computer system. Particularly, the first computer system optionally transmits the first data to the second computer system and the second data to the second computer system in response to detecting selection of the first selectable option discussed previously above that corresponds to the first computer system or selection of a second selectable option (e.g., similar to the first selectable option) that corresponds to the second computer system. In some embodiments, the first computer system transmits the first data and the second data to both the second computer system and the third computer system because the second computer system and the third computer system are both configurable to be connected to the first computer system, as similarly discussed above with reference to step(s) 1902. In some embodiments, while the first content and the second content are concurrently visible in the portion of the physical environment that is visible in the three-dimensional environment, the first computer system determines whether the first content or the second content corresponds to the computer system to which the request was directed. For example, as similarly discussed above, the three-dimensional environment includes a first selectable option corresponding to the second computer system and a second selectable option corresponding to the third computer system. In some embodiments, the first selectable option is displayed near the second computer system and the second selectable option is displayed near the third computer system. Accordingly, if the first computer system detects a selection of the first selectable option, when the second computer system and the third computer system display the first content and the second content, respectively, as discussed above, the first computer system visually detects the first content and the second content but determines that the first content displayed by the second computer system corresponds to the disambiguation input discussed above, rather than the second content. Alternatively, if the first computer system detects a selection of the second selectable option, when the second computer system and the third computer system display the first content and the second content, respectively, as discussed above, the first computer system visually detects the first content and the second content but determines that the second content displayed by the third computer system corresponds to the disambiguation input discussed above, rather than the first content. Establishing a connection between a first computer system and a second computer system that satisfies one or more criteria that are based on detecting first content that is displayed by the second computer system, that is different from second content that is displayed by a third computer system of the plurality of computer systems, in response to detecting a request to establish a connection with a respective computer system of a plurality of computer systems helps avoid unintentional connection between the first computer system and the third computer system of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the determination that the second computer system satisfies the one or more criteria is based on visually detecting, via the one or more cameras, a change in a visual appearance of a first input device (e.g., a first keyboard, trackpad, mouse, controller, or other remote input device that is not currently connected to and/or in communication with the first computer system) that is in communication with the second computer system, such as a change in a visual appearance of keyboard 1721_a_ as shown in FIG. 17E. In some embodiments, when the first computer system detects the request, the first computer system transmits data (e.g., instructions and/or commands) to the second computer system for causing the second computer system to change a visual appearance of the first input device that is in communication with the second computer system. In some embodiments, the first computer system transmits the data to the second computer system because the request discussed above with reference to step(s) 1902 is specific to the second computer system. For example, as discussed with reference to method 1800, the three-dimensional environment includes a first selectable option that corresponds to the second computer system and that is selectable to establish the connection between the first computer system and the second computer system. In some embodiments, as discussed above with reference to step(s) 1902, the request includes a selection of the first selectable option, which is indicative of user intent to request connection to the second computer system (e.g., based on the known locations of the first selectable option and the second computer system, and their proximity to each other). In some embodiments, as similarly discussed above with reference to step(s) 1902, in response to detecting the request, because the physical environment includes the plurality of computer systems, the first computer system awaits detection of a disambiguation input that causes the second computer system to satisfy the one or more criteria, such as the visual detection of the change in the visual appearance of the first input device in communication with the second computer system. In some embodiments, the first input device includes one or more light sources (e.g., one or more light-emitting diodes (LEDs) that are disposed below the keys of the keyboard, an LED within the mouse or trackpad, and/or other light sources) that are configured to emit light that visually causes the appearance of the first input device to change. For example, prior to detecting the request, the one or more light sources of the first input device are off (e.g., not emitting light). In some embodiments, in response to detecting the request, the first computer system communicates with the second computer system, which causes the second computer system to cause the one or more light sources of the first input device to emit light, thereby changing the visual appearance of the first input device. In some embodiments, when the second computer system causes the visual appearance of the first input device to change as discussed above, the third computer system does not cause a visual appearance of a second input device that is in communication with the third computer system to change. In some embodiments, when the second computer system causes the visual appearance of the first input device to change, the third computer system also causes the visual appearance of the second input device that is in communication with the third computer system to change, optionally in a different manner (e.g., with different light intensity, pattern, and/or flashes). For example, the first computer system detects (e.g., visually via the one or more cameras) the change in the visual appearance of the first input device and the change in the visual appearance of the second input device and differentiates (e.g., via image recognition/processing) the change in the visual appearance of the first input device from the change in the visual appearance of the second input device to determine that the second computer system satisfies the one or more criteria. In some embodiments, if the second computer system visually detects the change in the visual appearance of the first input device as discussed above, the first computer system determines that the disambiguation input has been received, and thus that the second computer system satisfies the one or more criteria.

In some embodiments, the determination that the third computer system satisfies the one or more criteria is based on visually detecting a change in a visual appearance of a second input device (e.g., a second keyboard, trackpad, mouse, controller, or other remote input device that is not currently connected to and/or in communication with the first computer system) that is in communication with the third computer system (e.g., as similarly described above but specific to the third computer system), similar to the change in visual appearance of the keyboard 1721a as shown in FIG. 17E. Establishing a connection between a first computer system and a second computer system that satisfies one or more criteria that are based on detecting a change in a visual appearance of an input device of the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the determination that the second computer system satisfies the one or more criteria is based on detecting, via the one or more input devices, first light emitted from a first light source (e.g., non-visible (e.g., by the user of the first computer system) light, such as infrared (IR), radio, ultraviolet, X-ray, and/or gamma-ray light, that is detectable by the first computer system (e.g., via one or more light sensors)) associated with the second computer system, such as first light emitted from first light source 1751 in FIG. 17E. In some embodiments, when the first computer system detects the request, the first computer system transmits data (e.g., instructions and/or commands) to the second computer system for causing the second computer system to emit, via the first light source, the first non-visible light that is visually detectable by the first computer system. In some embodiments, the first computer system transmits the data to the second computer system because the request discussed above with reference to step(s) 1902 is specific to the second computer system. For example, as discussed with reference to method 1800, the three-dimensional environment includes a first selectable option that corresponds to the second computer system and that is selectable to establish the connection between the first computer system and the second computer system. In some embodiments, as discussed above with reference to step(s) 1902, the request includes a selection of the first selectable option, which is indicative of user intent to request connection to the second computer system (e.g., based on the known locations of the first selectable option and the second computer system, and their proximity to each other). In some embodiments, as similarly discussed above with reference to step(s) 1902, in response to detecting the request, because the physical environment includes the plurality of computer systems, the first computer system awaits detection of a disambiguation input that causes the second computer system to satisfy the one or more criteria, such as the visual detection of the first light emitted by the first light source of the second computer system. In some embodiments, the first light is emitted with a first wavelength, a first frequency, a first period, and/or a first amplitude. In some embodiments, the first light source is separate from the second computer system or is integrated with the second computer system (e.g., within a housing of the second computer system). In some embodiments, when the second computer system causes the first light source to emit the first light as discussed above, the third computer system does not cause a second light source associated with the third computer system to emit second light that is detectable by the first computer system. In some embodiments, when the second computer system causes the first light source to emit the first light, the third computer system also causes the second light source that is associated with the third computer system to emit the second light, wherein one or more characteristics of the first light are different from those of the second light (e.g., such as the characteristics discussed above). For example, the first computer system detects (e.g., visually via the one or more cameras) the first light emitted by the first light source associated with the second computer system and the second light emitted by the second light source associated with the third computer system and differentiates (e.g., via image recognition/processing) the first light from the second light to determine that the second computer system satisfies the one or more criteria. In some embodiments, if the second computer system visually detects the first light emitted from the first light source of the second computer system as discussed above, the first computer system determines that the disambiguation input has been received, and thus that the second computer system satisfies the one or more criteria.

In some embodiments, the determination that the third computer system satisfies the one or more criteria is based on detecting second light emitted from a second light source associated with the third computer system (e.g., as similarly described above but specific to the third computer system), such as second light emitted from second light source 1753 in FIG. 17E. Establishing a connection between a first computer system and a second computer system that satisfies one or more criteria that are based on detecting non-visible light emitted from a light source of the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system and/or affecting and/or distracting attention of the user, thereby improving user-device interaction.

In some embodiments, the determination that the second computer system satisfies the one or more criteria is based on visually detecting, via the one or more cameras, a first pattern of light (e.g., a first pattern (e.g., sequence) of visible or non-visible (e.g., to the user of the first computer system) light flashes or flares) emitted from a first light source (e.g., one or more light-emitting diodes (LEDs), an incandescent light bulb, a fluorescent light bulb, and/or induction lighting that are separate from the second computer system or integrated with the second computer system (e.g., within a housing of the second computer system)) associated with the second computer system, such as a first pattern of light emitted from first light source 1751. In some embodiments, when the first computer system detects the request, the first computer system transmits data (e.g., instructions and/or commands) to the second computer system for causing the second computer system to emit, via the first light source, the first pattern of light that is visually detectable by the first computer system (e.g., and not necessarily visible to the user of the first computer system). In some embodiments, the first computer system transmits the data to the second computer system because the request discussed above with reference to step(s) 1902 is specific to the second computer system. For example, as discussed with reference to method 1800, the three-dimensional environment includes a first selectable option that corresponds to the second computer system and that is selectable to establish the connection between the first computer system and the second computer system. In some embodiments, as discussed above with reference to step(s) 1902, the request includes a selection of the first selectable option, which is indicative of user intent to request connection to the second computer system (e.g., based on the known locations of the first selectable option and the second computer system, and their proximity to each other). In some embodiments, the data is transmitted to the second computer system directly or indirectly via a server (e.g., a wireless communications terminal) in communication with the first computer system and the second computer system). In some embodiments, as similarly discussed above with reference to step(s) 1902, in response to detecting the request, because the physical environment includes the plurality of computer systems, the first computer system awaits detection of a disambiguation input that causes the second computer system to satisfy the one or more criteria, such as the visual detection of the first pattern of light emitted by the first light source of the second computer system. In some embodiments, the first pattern of light is emitted with a first brightness (e.g., intensity), a first duration, a first number/sequence of light flashes, and/or a first color (e.g., tint and/or filter). In some embodiments, when the second computer system causes the first light source to emit the first pattern of light as discussed above, the third computer system does not cause a second light source associated with the third computer system to emit a second pattern of light that is detectable by the first computer system. In some embodiments, when the second computer system causes the first light source to emit the first pattern of light, the third computer system also causes the second light source that is associated with the third computer system to emit the second pattern of light, wherein one or more characteristics of the first pattern of light are different from those of the second pattern of light (e.g., such as the characteristics discussed above). For example, the first computer system detects (e.g., visually via the one or more cameras) the first pattern of light emitted by the first light source associated with the second computer system and the second pattern of light emitted by the second light source associated with the third computer system and differentiates (e.g., via image recognition/processing) the first pattern of light from the second pattern of light to determine that the second computer system satisfies the one or more criteria. In some embodiments, if the second computer system visually detects the first pattern of light emitted from the first light source of the second computer system as discussed above, the first computer system determines that the disambiguation input has been received, and thus that the second computer system satisfies the one or more criteria.

In some embodiments, the determination that the third computer system satisfies the one or more criteria is based on visually detecting a second pattern of light emitted from a second light source associated with the third computer system (e.g., as similarly described above but specific to the third computer system), such as a second pattern of light emitted from second light source 1753 in FIG. 17E. Establishing a connection between a first computer system and a second computer system that satisfies one or more criteria that are based on detecting a pattern of light emitted from a light source of the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, the determination that the second computer system satisfies the one or more criteria is based on detecting, via the one or more input devices, a first signal (e.g., a first ultrawideband signal, a first Bluetooth signal, a first Wi-Fi signal, or other short-range, wireless communication protocol (e.g., based on radio waves)) produced by the second computer system (e.g., via one or more antenna of second computer system), such as location information shared by the second computer system 1708a in FIG. 17E. For example, the first signal includes location (e.g., spatial) data and/or directional data of the second computer system that enables the first computer system to locate and/or track the location of the second computer system in the physical environment relative to the first computer system. In some embodiments, the first computer system has access to the location of the second computer system because a user of the second computer system has granted access to the location of the second computer system to the user of the first computer system. In some embodiments, the first computer system has access to the location of the second computer system because the first computer system and the second computer system are associated with the same user account (e.g., as similarly discussed with reference to method 1800). In some embodiments, when the first computer system detects the request, the first computer system requests spatial and/or directional data from the second computer system. In some embodiments, in response to receiving the request for the spatial and/or directional data, the second computer system produces the first signal that is detectable by the first computer system, which, when detected, enables the first computer system to determine an approximate location and/or direction of the second computer system relative to the first computer system. In some embodiments, when the second computer system produces the first signal as discussed above, the third computer system does not produce a second signal that is detectable by the first computer system. In some embodiments, when the second computer system produces the first signal, the third computer system also produces the second signal, wherein one or more characteristics of the first signal are different from those of the second signal (e.g., such as the characteristics discussed above). For example, the first computer system detects (e.g., via the one or more sensors and/or antenna) the first signal produced by the second computer system and the second signal produced by the third computer system and differentiates (e.g., via sensor/antenna data recognition/processing) the first signal from the second signal to determine that the second computer system satisfies the one or more criteria. In some embodiments, if the location that is determined based on the first signal at least partially corresponds to the location of the second computer system that is visually detected in the field of view of the user, the first computer system determines that the disambiguation input has been received, and thus that the second computer system satisfies the one or more criteria.

In some embodiments, the determination that the third computer system satisfies the one or more criteria is based on detecting a second signal produced by the third computer system (e.g., as similarly described above but specific to the third computer system), such as location information shared by the third computer system 1710a in FIG. 17E. Establishing a connection between a first computer system and a second computer system that satisfies one or more criteria that are based on detecting a first signal produced by the second computer system in response to detecting a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, detecting the request to establish the connection with the respective computer system includes detecting, via the one or more input devices, respective input associated with a location that is within a threshold distance (e.g., 0.1 cm, 1 cm, 3 cm, 10 cm, 80 cm, 1 m, or 5 m) of a portion of the respective computer system (e.g., the second computer system or the third computer system discussed previously above), such as selection of the first selectable option 1716a that is displayed near the second computer system 1708a as shown in FIGS. 17D and 17D1. For example, as similarly described with reference to method 1800, the three-dimensional environment includes a first selectable option that is selectable to establish a connection between the first computer system and the respective computer system. In some embodiments, the first selectable option is displayed at the location in the three-dimensional environment that is within the threshold distance of the portion of the respective computer system. In some embodiments, displaying the first selectable option near the portion of the respective computer system has one or more characteristics of the same in method 1800. In some embodiments, detecting the respective input includes detecting a selection of the first selectable option that is provided by the user of the first computer system. For example, the first computer system detects an air gesture provided by a hand of the user of the first computer system directed to the first selectable option. In some embodiments, the air gesture is an air pinch gesture in which an index finger and thumb of the hand of the user come together to make contact. In some embodiments, the air gesture is an air tap or touch gesture in which a finger (e.g., index finger) moves to contact the first selectable option in space. In some embodiments, the air gesture is detected while attention (e.g., including gaze) of the user is directed toward the first selectable option. In some embodiments, the respective input is detected via a hardware input device (e.g., a controller) that is in communication with the first computer system. For example, the input includes a press or tap of a physical button, knob, or joystick of the controller provided by one or more fingers of the hand of the user. In some embodiments, when the first computer system detects the selection of the first selectable option, the first computer system initiates the process to establish a connection between the first computer system and the respective computer system, as similarly discussed above with reference to step(s) 1902. For example, based on visually detecting/recognizing that the first selectable option is displayed within the threshold distance of the portion of the respective computer system, the first computer system determines that the respective input is directed to the respective computer system (e.g., versus others of the plurality of computer systems in the respective region of the physical environment). Establishing a connection between a first computer system and a second computer system that satisfies one or more criteria in response to detecting input at a location near the second computer system that corresponds to a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, detecting the request to establish the connection with the respective computer system (e.g., the second computer system or the third computer system discussed above) includes detecting, via the one or more input devices, respective input corresponding to the request, such as selection of the first selectable option 1716a provided by the hand 1703c as shown in FIGS. 17D and 17D1. For example, the first computer system detects a selection (e.g., provided by the user of the first computer system) of a first selectable option that is displayed in a system user interface of the first computer system (e.g., a control center user interface of the first computer system). In some embodiments, as described with reference to method 1800, the first selectable option is selectable to establish a connection between the first computer system and the respective computer system. In some embodiments, the system user interface has one or more characteristics of the system user interface discussed with reference to methods 800, 1400, and/or 1600. In some embodiments, when the first computer system detects the selection of the first selectable option, the first computer system initiates the process to establish a connection between the first computer system and the respective computer system, as similarly discussed above with reference to step(s) 1902. Establishing a connection between a first computer system and a second computer system that satisfies one or more criteria in response to detecting input corresponding to a request to establish a connection with a respective computer system of a plurality of computer systems helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

In some embodiments, detecting the request to establish the connection with the respective computer system includes detecting an indication that the respective computer system (e.g., the second computer system or the third computer system discussed above) has detected respective input corresponding to the request, such as the second computer system 1708a detecting a selection of selectable option 1750 via mouse 1714a as shown in FIG. 17G. For example, the respective computer system detects a selection (e.g., provided by a user, such as the user of the first computer system) of a first selectable option that is displayed in a system user interface of the respective computer system (e.g., a control center user interface of the respective computer system). In some embodiments, as described with reference to method 1800, the first selectable option is selectable to establish a connection between the first computer system and the respective computer system. In some embodiments, the system user interface has one or more characteristics of the system user interface discussed with reference to methods 800, 1400, and/or 1600. In some embodiments, when the respective computer system detects (e.g., via one or more input devices of the respective computer system) the selection of the first selectable option, the respective computer system transmits an indication of the selection of the first selectable option to the first computer system, which causes the first computer system to initiate the process to establish a connection between the first computer system and the respective computer system, as similarly discussed above with reference to step(s) 1902. In some embodiments, if the third computer system discussed above with reference to step(s) 1902, rather than the second computer system, detects the selection of the first selectable option, the third computer system transmits an indication of the selection of the first selectable option to the first computer system, which causes the first computer system to initiate the process to establish a connection between the first computer system and the third computer system. Establishing a connection between a first computer system and a second computer system that satisfies one or more criteria in response to detecting an indication of a request to establish a connection with a respective computer system of a plurality of computer systems that is detected at the second computer system helps avoid unintentional connection between the first computer system and others of the plurality of computer systems and/or reduces the number of inputs needed to establish the connection between the first computer system and the second computer system of the plurality of computer systems, which helps avoid interrupting the use of the first computer system, thereby improving user-device interaction.

It should be understood that the particular order in which the operations in method 1900 have been described is merely exemplary and is not intended to indicate that the described order is the only order in which the operations could be performed. One of ordinary skill in the art would recognize various ways to reorder the operations described herein.

In some embodiments, aspects/operations of methods 800, 1000, 1200, 1400, 1600, 1800, and/or 1900 may be interchanged, substituted, and/or added between these methods. For example, the three-dimensional environments of methods 800, 1000, 1200, 1400, 1600, 1800, and/or 1900, the virtual content of methods 800, 1000, 1200, 1400, 1600, 1800, and/or 1900, the virtual computer experiences of methods 800, 1000, 1200, 1400, 1600, 1800, and/or 1900, the control center user interfaces of methods 800, 1000, 1200, 1400, 1600, 1800, and/or 1900, the attention and attention-based inputs of methods 800, 1000, 1200, 1400, 1600, 1800, and/or 1900, and/or increase or decrease prominence of virtual content in methods 800, 1000, 1200, 1400, 1600, 1800, and/or 1900 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
at a first computer system in communication with a display generation component and one or more input devices:
while a second computer system is visible via the display generation component in a three-dimensional environment, displaying, via the display generation component in the three-dimensional environment, a first selectable option that is selectable to display a representation of content from the second computer system;
while displaying the first selectable option in the three-dimensional environment, receiving, via the one or more input devices, an input directed to the first selectable option;
in response to receiving the input directed to the first selectable option, displaying, via the display generation component and in the three-dimensional environment, the representation of content from the second computer system;
while displaying the representation of the content from the second computer system in the three-dimensional environment, detecting, via the one or more input devices, one or more inputs directed to the representation of content from the second computer system; and
in response to detecting the one or more inputs directed to the representation of content from the second computer system, performing one or more operations corresponding to the one or more inputs with respect to the content from the second computer system.

2. The method of claim 1, comprising:
in response to receiving the input directed to the first selectable option, displaying, via the display generation component, an animation including transformation of the first selectable option into the representation of content from the second computer system.

3. The method of claim 1, wherein the first selectable option is displayed at a respective position relative to the second computer system in the three-dimensional environment.

4. The method of claim 1, wherein displaying the representation of content from the second computer system includes:
displaying the representation of content from the second computer system overlaying the second computer system in the three-dimensional environment from a viewpoint of a user of the first computer system.

5. The method of claim 1, wherein the first selectable option is displayed in a first system user interface of the first computer system or the second computer system, and wherein the first system user interface is accessible while any of a first plurality of user interfaces of a first plurality of applications is displayed by the first computer system or the second computer system.

6. The method of claim 1, wherein displaying the representation of content from the second computer system includes:
displaying the representation of content from the second computer system at a first distance from a viewpoint of a user of the first computer system in the three-dimensional environment, wherein the first distance is independent of a distance from the viewpoint of the user to the second computer system in the three-dimensional environment.

7. The method of claim 1, wherein displaying the representation of content from the second computer system includes:
displaying the representation of content from the second computer system at a first position relative to a system user interface, that includes the first selectable option.

8. The method of claim 1, wherein displaying the representation of content from the second computer system includes displaying the representation of content from the second computer system behind a system user interface from a viewpoint of a user of the first computer system in the three-dimensional environment.

9. The method of claim 8, comprising:

while displaying the representation of content from the second computer system behind the system user interface from the viewpoint of the user of the first computer system in the three-dimensional environment, receiving, via the one or more input devices, user input that includes attention of the user directed to the representation of content from the second computer system; and in response to receiving the user input that includes the attention of the user, displaying the representation of content from the second computer system in front of the system user interface from the viewpoint of the user.

10. The method of claim 1, wherein in response to receiving the input directed to the first selectable option:

in accordance with a determination that a state of operation of the second computer system is a first state of the second computer system when the input directed to the first selectable option is received, a state of operation indicated by the representation of content from the second computer system is a first state of the representation of content from the second computer system that is based on the first state of the second computer system, and in accordance with a determination that the state of operation of the second computer system is a second state of the second computer system, different from the first state of the second computer system, when the input directed to the first selectable option is received, the state of operation indicated by the representation of content from the second computer system is a second state of the representation of the content from the second computer system, different from the first state of the representation of the content from the second computer system, wherein the second state of the representation of the content from the second computer system is based on the second state of the second computer system.

11. The method of claim 1, wherein before detecting the one or more inputs directed to the representation of content from the second computer system, a state of operation of the second computer system is a first state, and wherein the method comprises:

in response to performing the one or more operations corresponding to the one or more inputs with respect to the content from the second computer system, changing the state of operation of the second computer system to a second state, different from the first state, based on the one or more inputs directed to the representation of content from the second computer system.

12. The method of claim 11, wherein the first state corresponds to a first set of application windows being active, and wherein the second state corresponds to a second set of application windows being active, different from the first set of applications.

13. The method of claim 11, wherein the first state corresponds to a first set of application windows being active and in a first order, and wherein the second state corresponds to the first set of application being active and in a second order, different from the first order.

14. The method of claim 11, wherein the first state corresponds to an application window being active and including a first visual characteristic and the second state corresponds to the application window being active and including a second visual characteristic, different from the first visual characteristic.

15. The method of claim 1, comprising while displaying the first selectable option in the three-dimensional environment, displaying, via the display generation component in the three-dimensional environment, a second selectable option that is selectable to display a second representation of content from a third computer system, different from the second computer system.

16. The method of claim 15, wherein:

the first selectable option is displayed in accordance with a determination that the second computer system is within a threshold distance of the first computer system, and the second selectable option is displayed in accordance with a determination that the third computer system is within the threshold distance of the first computer system.

17. The method of claim 15, comprising:

receiving, via the one or more input devices, an input directed to the second selectable option that is selectable to display the second representation of content from the third computer system; and in response to receiving the input directed to the second selectable option:

in accordance with a determination that the representation of content from the second computer system is displayed when the input directed to the second selectable option is received:

ceasing display of the representation of content from the second computer system on the display generation component; and displaying, via the display generation component and in the three-dimensional environment, the second representation of content from the third computer system.

18. The method of claim 15, comprising:

receiving, via the one or more input devices, a second input directed to the first selectable option that is selectable to display the representation of content from the second computer system; and in response to receiving the second input directed to the first selectable option:

in accordance with a determination that the representation of content from the second computer system is displayed when the second input directed to the first selectable option is received, ceasing display of the representation of content from the second computer system on the display generation component.

19. The method of claim 1, wherein:

the representation of content from the second computer system is curved around a viewpoint of a user of the first computer system in the three-dimensional environment.

20. The method of claim 1, wherein:

the representation of content from the second computer system includes background content corresponding to background content displayed by the second computer system when the input directed to the first selectable option is received.

21. The method of claim 1, wherein:

the representation of content from the second computer system is displayed on a simulated glass material in the three-dimensional environment.

22. The method of claim 1, comprising:

while displaying the representation of content from the second computer system and while the second computer system is displaying content, detecting, via the one or more input devices, a change in a state of the second computer system, including changing of a state of a display device of the second computer system; and after detecting the change in the state of the second computer system, continuing display of the representation of the content from the second computer system in the three-dimensional environment.

23. The method of claim 1, comprising:

while displaying the representation of content from the second computer system in the three-dimensional environment, receiving, via the one or more input devices, a first input corresponding to a request to transfer respective content from the first computer system to the second computer system; and in response to receiving the first input, initiating a process to transfer the respective content from the first computer system to the second computer system.

24. The method of claim 1, comprising:

while displaying the representation of content from the second computer system in the three-dimensional environment, receiving, via one or more input devices of the second computer system, a second input corresponding to a request to transfer respective content from the second computer system to the first computer system; and in response to receiving the second input, initiating a process to transfer the respective content from the second computer system to the first computer system.

25. A first computer system that is in communication with a display generation component and one or more input devices, the first computer system comprising:

one or more processors;

memory; and one or more programs, wherein the one or more programs are stored in the memory and configured to be executed by the one or more processors, the one or more programs including instructions for:

while a second computer system is visible via the display generation component in a three-dimensional environment, displaying, via the display generation component in the three-dimensional environment, a first selectable option that is selectable to display a representation of content from the second computer system;

while displaying the first selectable option in the three-dimensional environment, receiving, via the one or more input devices, an input directed to the first selectable option; and in response to receiving the input directed to the first selectable option, displaying, via the display generation component and in the three-dimensional environment, the representation of content from the second computer system;

while displaying the representation of the content from the second computer system in the three-dimensional environment, detecting, via the one or more input devices, one or more inputs directed to the representation of content from the second computer system; and in response to detecting the one or more inputs directed to the representation of content from the second computer system, performing one or more operations corresponding to the one or more inputs with respect to the content from the second computer system.

26. A non-transitory computer readable storage medium storing one or more programs, the one or more programs comprising instructions, which when executed by one or more processors of a first computer system that is in communication with a display generation component and one or more input devices, cause the first computer system to perform a method comprising:

while a second computer system is visible via the display generation component in a three-dimensional environment, displaying, via the display generation component in the three-dimensional environment, a first selectable option that is selectable to display a representation of content from the second computer system;

while displaying the first selectable option in the three-dimensional environment, receiving, via the one or more input devices, an input directed to the first selectable option;

in response to receiving the input directed to the first selectable option, displaying, via the display generation component and in the three-dimensional environment, the representation of content from the second computer system;

while displaying the representation of the content from the second computer system in the three-dimensional environment, detecting, via the one or more input devices, one or more inputs directed to the representation of content from the second computer system; and in response to detecting the one or more inputs directed to the representation of content from the second computer system, performing one or more operations corresponding to the one or more inputs with respect to the content from the second computer system.

27. The first computer system of claim 25, wherein the first selectable option is displayed at a respective position relative to the second computer system in the three-dimensional environment.

28. The first computer system of claim 25, wherein displaying the representation of content from the second computer system includes:

displaying the representation of content from the second computer system overlaying the second computer system in the three-dimensional environment from a viewpoint of a user of the first computer system.

29. The first computer system of claim 25, wherein the first selectable option is displayed in a first system user interface of the first computer system or the second computer system, and wherein the first system user interface is accessible while any of a first plurality of user interfaces of a first plurality of applications is displayed by the first computer system or the second computer system.

30. The first computer system of claim 25, wherein displaying the representation of content from the second computer system includes:

displaying the representation of content from the second computer system at a first distance from a viewpoint of a user of the first computer system in the three-dimensional environment, wherein the first distance is independent of a distance from the viewpoint of the user to the second computer system in the three-dimensional environment.

31. The first computer system of claim 1, wherein displaying the representation of content from the second computer system includes displaying the representation of content from the second computer system behind a system user interface from a viewpoint of a user of the first computer system in the three-dimensional environment, the one or more programs further comprising instructions for:

while displaying the representation of content from the second computer system behind the system user interface from the viewpoint of the user of the first computer system in the three- dimensional environment, receiving, via the one or more input devices, user input that includes attention of the user directed to the representation of content from the second computer system; and in response to receiving the user input that includes the attention of the user, displaying the representation of content from the second computer system in front of the system user interface from the viewpoint of the user.

32. The first computer system of claim 25, wherein in response to receiving the input directed to the first selectable option:

in accordance with a determination that a state of operation of the second computer system is a first state of the second computer system when the input directed to the first selectable option is received, a state of operation indicated by the representation of content from the second computer system is a first state of the representation of content from the second computer system that is based on the first state of the second computer system, and in accordance with a determination that the state of operation of the second computer system is a second state of the second computer system, different from the first state of the second computer system, when the input directed to the first selectable option is received, the state of operation indicated by the representation of content from the second computer system is a second state of the representation of the content from the second computer system, different from the first state of the representation of the content from the second computer system, wherein the second state of the representation of the content from the second computer system is based on the second state of the second computer system.

33. The first computer system of claim 25, wherein before detecting the one or more inputs directed to the representation of content from the second computer system, a state of operation of the second computer system is a first state, and wherein the one or more programs further comprise instructions for:

in response to performing the one or more operations corresponding to the one or more inputs with respect to the content from the second computer system, changing the state of operation of the second computer system to a second state, different from the first state, based on the one or more inputs directed to the representation of content from the second computer system.

34. The first computer system of claim 25, the one or more programs further including instructions for:

while displaying the first selectable option in the three-dimensional environment, displaying, via the display generation component in the three-dimensional environment, a second selectable option that is selectable to display a second representation of content from a third computer system, different from the second computer system, wherein:

the first selectable option is displayed in accordance with a determination that the second computer system is within a threshold distance of the first computer system, and the second selectable option is displayed in accordance with a determination that the third computer system is within the threshold distance of the first computer system.

35. The first computer system of claim 25, the one or more programs further including instructions for:

while displaying the first selectable option in the three-dimensional environment, displaying, via the display generation component in the three-dimensional environment, a second selectable option that is selectable to display a second representation of content from a third computer system, different from the second computer system;

receiving, via the one or more input devices, an input directed to the second selectable option that is selectable to display the second representation of content from the third computer system; and in response to receiving the input directed to the second selectable option:

in accordance with a determination that the representation of content from the second computer system is displayed when the input directed to the second selectable option is received:

ceasing display of the representation of content from the second computer system on the display generation component; and displaying, via the display generation component and in the three- dimensional environment, the second representation of content from the third computer system.

36. The first computer system of claim 25, the one or more programs further including instructions for:

while displaying the first selectable option in the three-dimensional environment, displaying, via the display generation component in the three-dimensional environment, a second selectable option that is selectable to display a second representation of content from a third computer system, different from the second computer system;

receiving, via the one or more input devices, a second input directed to the first selectable option that is selectable to display the representation of content from the second computer system; and in response to receiving the second input directed to the first selectable option:

in accordance with a determination that the representation of content from the second computer system is displayed when the second input directed to the first selectable option is received, ceasing display of the representation of content from the second computer system on the display generation component.

37. The first computer system of claim 25, the one or more programs further including instructions for:

while displaying the representation of content from the second computer system in the three-dimensional environment, receiving, via the one or more input devices, a first input corresponding to a request to transfer respective content from the first computer system to the second computer system; and in response to receiving the first input, initiating a process to transfer the respective content from the first computer system to the second computer system.

38. The first computer system of claim 25, the one or more programs further including instructions for:

while displaying the representation of content from the second computer system in the three-dimensional environment, receiving, via one or more input devices of the second computer system, a second input corresponding to a request to transfer respective content from the second computer system to the first computer system; and in response to receiving the second input, initiating a process to transfer the respective content from the second computer system to the first computer system.

39. The non-transitory computer readable storage medium of claim 26, wherein the first selectable option is displayed at a respective position relative to the second computer system in the three-dimensional environment.

40. The non-transitory computer readable storage medium of claim 26, wherein displaying the representation of content from the second computer system includes:

displaying the representation of content from the second computer system overlaying the second computer system in the three-dimensional environment from a viewpoint of a user of the first computer system.

41. The non-transitory computer readable storage medium of claim 26, wherein the first selectable option is displayed in a first system user interface of the first computer system or the second computer system, and wherein the first system user interface is accessible while any of a first plurality of user interfaces of a first plurality of applications is displayed by the first computer system or the second computer system.

42. The non-transitory computer readable storage medium of claim 26, wherein displaying the representation of content from the second computer system includes:

displaying the representation of content from the second computer system at a first distance from a viewpoint of a user of the first computer system in the three-dimensional environment, wherein the first distance is independent of a distance from the viewpoint of the user to the second computer system in the three-dimensional environment.

43. The non-transitory computer-readable storage medium of claim 1, wherein displaying the representation of content from the second computer system includes displaying the representation of content from the second computer system behind a system user interface from a viewpoint of a user of the first computer system in the three-dimensional environment, the one or more programs further comprising instructions for:

while displaying the representation of content from the second computer system behind the system user interface from the viewpoint of the user of the first computer system in the three- dimensional environment, receiving, via the one or more input devices, user input that includes attention of the user directed to the representation of content from the second computer system; and in response to receiving the user input that includes the attention of the user, displaying the representation of content from the second computer system in front of the system user interface from the viewpoint of the user.

44. The non-transitory computer readable storage medium of claim 26, wherein in response to receiving the input directed to the first selectable option:

in accordance with a determination that a state of operation of the second computer system is a first state of the second computer system when the input directed to the first selectable option is received, a state of operation indicated by the representation of content from the second computer system is a first state of the representation of content from the second computer system that is based on the first state of the second computer system, and in accordance with a determination that the state of operation of the second computer system is a second state of the second computer system, different from the first state of the second computer system, when the input directed to the first selectable option is received, the state of operation indicated by the representation of content from the second computer system is a second state of the representation of the content from the second computer system, different from the first state of the representation of the content from the second computer system, wherein the second state of the representation of the content from the second computer system is based on the second state of the second computer system.

45. The non-transitory computer readable storage medium of claim 26, wherein before detecting the one or more inputs directed to the representation of content from the second computer system, a state of operation of the second computer system is a first state, and wherein the method comprises:

in response to performing the one or more operations corresponding to the one or more inputs with respect to the content from the second computer system, changing the state of operation of the second computer system to a second state, different from the first state, based on the one or more inputs directed to the representation of content from the second computer system.

46. The non-transitory computer readable storage medium of claim 26, the method further comprising:

while displaying the first selectable option in the three-dimensional environment, displaying, via the display generation component in the three-dimensional environment, a second selectable option that is selectable to display a second representation of content from a third computer system, different from the second computer system, wherein:

the first selectable option is displayed in accordance with a determination that the second computer system is within a threshold distance of the first computer system, and the second selectable option is displayed in accordance with a determination that the third computer system is within the threshold distance of the first computer system.

47. The non-transitory computer readable storage medium of claim 26, the method further comprising:

while displaying the first selectable option in the three-dimensional environment, displaying, via the display generation component in the three-dimensional environment, a second selectable option that is selectable to display a second representation of content from a third computer system, different from the second computer system;

receiving, via the one or more input devices, an input directed to the second selectable option that is selectable to display the second representation of content from the third computer system; and in response to receiving the input directed to the second selectable option:

in accordance with a determination that the representation of content from the second computer system is displayed when the input directed to the second selectable option is received:

ceasing display of the representation of content from the second computer system on the display generation component; and displaying, via the display generation component and in the three- dimensional environment, the second representation of content from the third computer system.

48. The non-transitory computer readable storage medium of claim 26, the method further comprising:

while displaying the first selectable option in the three-dimensional environment, displaying, via the display generation component in the three-dimensional environment, a second selectable option that is selectable to display a second representation of content from a third computer system, different from the second computer system;

receiving, via the one or more input devices, a second input directed to the first selectable option that is selectable to display the representation of content from the second computer system; and in response to receiving the second input directed to the first selectable option:

in accordance with a determination that the representation of content from the second computer system is displayed when the second input directed to the first selectable option is received, ceasing display of the representation of content from the second computer system on the display generation component.

49. The non-transitory computer readable storage medium of claim 26, the method further comprising:

while displaying the representation of content from the second computer system in the three-dimensional environment, receiving, via the one or more input devices, a first input corresponding to a request to transfer respective content from the first computer system to the second computer system; and in response to receiving the first input, initiating a process to transfer the respective content from the first computer system to the second computer system.

50. The non-transitory computer readable storage medium of claim 26, the method further comprising:

while displaying the representation of content from the second computer system in the three-dimensional environment, receiving, via one or more input devices of the second computer system, a second input corresponding to a request to transfer respective content from the second computer system to the first computer system; and in response to receiving the second input, initiating a process to transfer the respective content from the second computer system to the first computer system.

* * * * *